US007107285B2

(12) United States Patent
von Kaenel et al.

(10) Patent No.: US 7,107,285 B2
(45) Date of Patent: Sep. 12, 2006

(54) METHOD, SYSTEM, AND PROGRAM FOR AN IMPROVED ENTERPRISE SPATIAL SYSTEM

(75) Inventors: Tim A. von Kaenel, Coto de Caza, CA (US); David Neil Dyrnaes, Newport Coast, CA (US); C. Suresh Kumar, Ladera Ranch, CA (US); Jared Paul Wayman, Laguna Niguel, CA (US); Jonathan David Goodwin, Laguna Niguel, CA (US); Craig Evan Trivelpiece, Newport Beach, CA (US); Joseph Mihalich, Rancho Santa Margarita, CA (US); Anthony Page Jenkins, Aliso Viejo, CA (US); Richard Hoyt Odom, Jr., Charlottesville, VA (US); Mark Andrew Stier, Laguna Niguel, CA (US); Anne Janetta Obee, Santa Ana, CA (US)

(73) Assignee: Questerra Corporation, Aliso Viejo, CA (US)

( * ) Notice: Subject to any disclaimer, the term of this patent is extended or adjusted under 35 U.S.C. 154(b) by 408 days.

(21) Appl. No.: 10/388,666

(22) Filed: Mar. 14, 2003

(65) Prior Publication Data

US 2004/0117358 A1 Jun. 17, 2004

Related U.S. Application Data

(60) Provisional application No. 60/364,807, filed on Mar. 16, 2002, provisional application No. 60/433,597, filed on Dec. 16, 2002, provisional application No. 60/437,990, filed on Jan. 6, 2003.

(51) Int. Cl.
*G06F 17/30* (2006.01)

(52) U.S. Cl. ....................................... 707/104.1; 707/3

(58) Field of Classification Search ............. 707/1–10, 707/100–104.1, 200–206; 342/357; 704/9
See application file for complete search history.

(56) References Cited

U.S. PATENT DOCUMENTS

| | | | | |
|---|---|---|---|---|
| 6,184,823 | B1 * | 2/2001 | Smith et al. | 342/357.13 |
| 6,216,130 | B1 | 4/2001 | Hougaard et al. | 707/10 |
| 6,236,996 | B1 | 5/2001 | Bapat et al. | 707/9 |
| 6,272,457 | B1 * | 8/2001 | Ford et al. | 704/9 |
| 6,343,290 | B1 | 1/2002 | Cossins et al. | 707/10 |
| 6,473,770 | B1 * | 10/2002 | Livshutz et al. | 707/103 R |

FOREIGN PATENT DOCUMENTS

| | | |
|---|---|---|
| EP | 0860787 | 8/1998 |
| WO | WO 9921108 | 4/1999 |
| WO | WO 0196906 | 12/2001 |

OTHER PUBLICATIONS

PCT/US04/08296 International Search Report mailed Oct. 6, 2004.

(Continued)

*Primary Examiner*—Jeffrey Gaffin
*Assistant Examiner*—Yicun Wu
(74) *Attorney, Agent, or Firm*—Janaki K. Davoa; Konrad Raynes & Victor LLP

(57) ABSTRACT

Disclosed is a method, system, and program for providing access to spatial data. A request for data is received. Enterprise and third party data are integrated. The integrated data is processed. Spatially referenced results are generated using the processed data. The spatially referenced results are returned in response to the request.

42 Claims, 182 Drawing Sheets

OTHER PUBLICATIONS

Brody, R. "GIS Applications in Competitive Intelligence," Proc. 20th National Online Meeting, May 18-20, 1999; BNSDOCID: <XP_8032590>; pp. 41-46.

Mattos, et al. "Integrating Spatial Data with Business Data," 1999, retrieved from http://www.db2mag.com/db_area/archives/1999/q1/99sp_mattos.shtml; 8 pp.

Mohraz, Karim. "Geographical Analysis on SAP Business Information Warehouse," 8th ACM Symposium on GIS, Nov. 2000, Washington, D.C.; BNSDOCID:<XP_2296715A_1>; pp. 191-193.

Stephenson, et al. "IMACTS: An Interactive, Multiterabyte Image Archive," IEEE Symposium on Mass Storage Systems, 1995; BNSDOCID: <XP_10194189A_1>; pp. 146-161.

Wang, L. "Implementation Issue: TCP Handoff," Feb. 20, 2000, retrieved from http://www.cs.princeton.edu/~lmwang/pubps/wcw/node10.html; 1 pg.

Yates, et al. "Searching the Web using a Map," IEEE 2000; BNSDOCID:<XP_10521858A_1>; pp. 222-229.

PCT/US04/08296 Invitation to Restrict mailed Oct. 25, 2004.

PCT/US04/08296 Written Opinion mailed Dec. 7, 2004.

PCT/US03/08296 Int'l Preliminary Exam. Report mailed Mar. 15, 2005.

PCT Response to Written Opinion, filed Dec. 7, 2004, for International Application No. PCT/US03/08296.

* cited by examiner

1100

3810

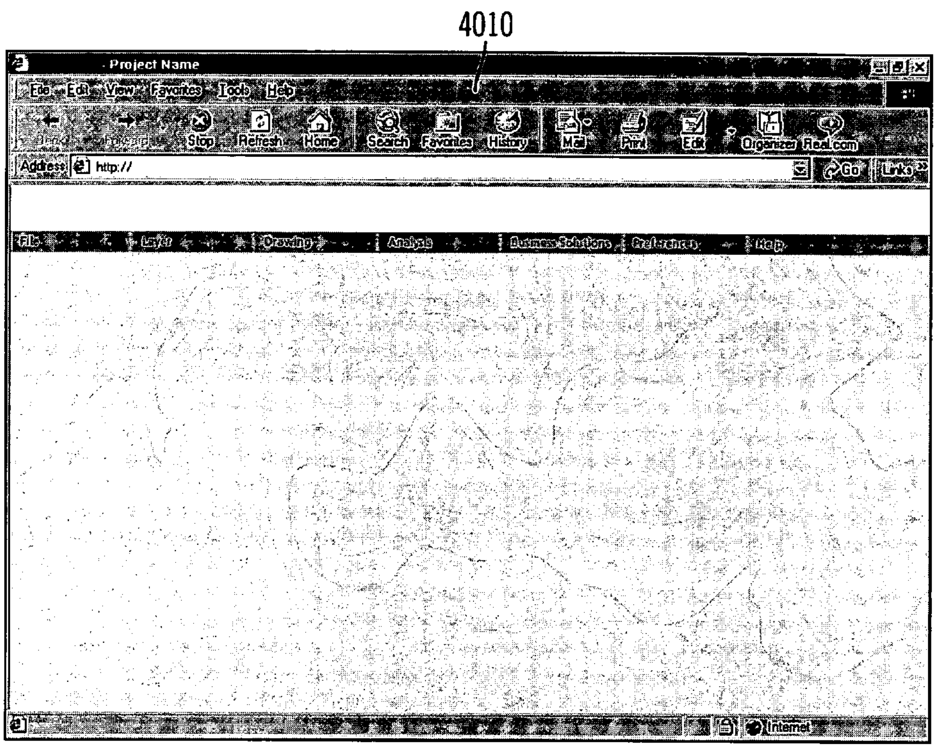
FIG. 40A
FIG. 40B
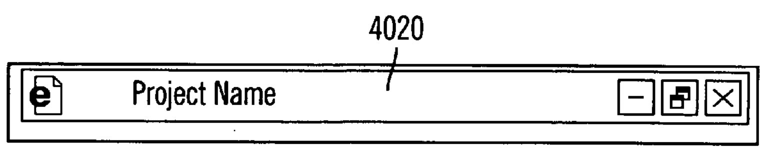
FIG. 40C
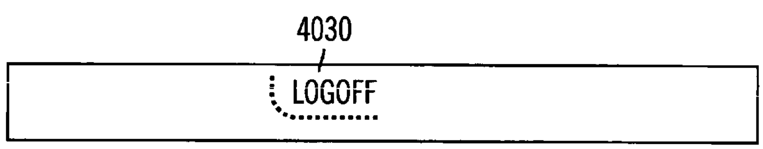
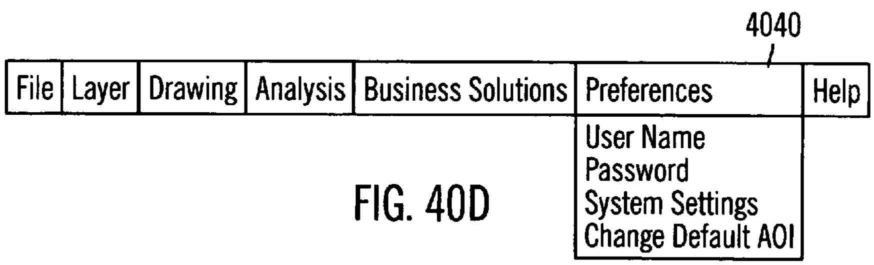
FIG. 40D

6110

6210

6410

7010

8810

9010
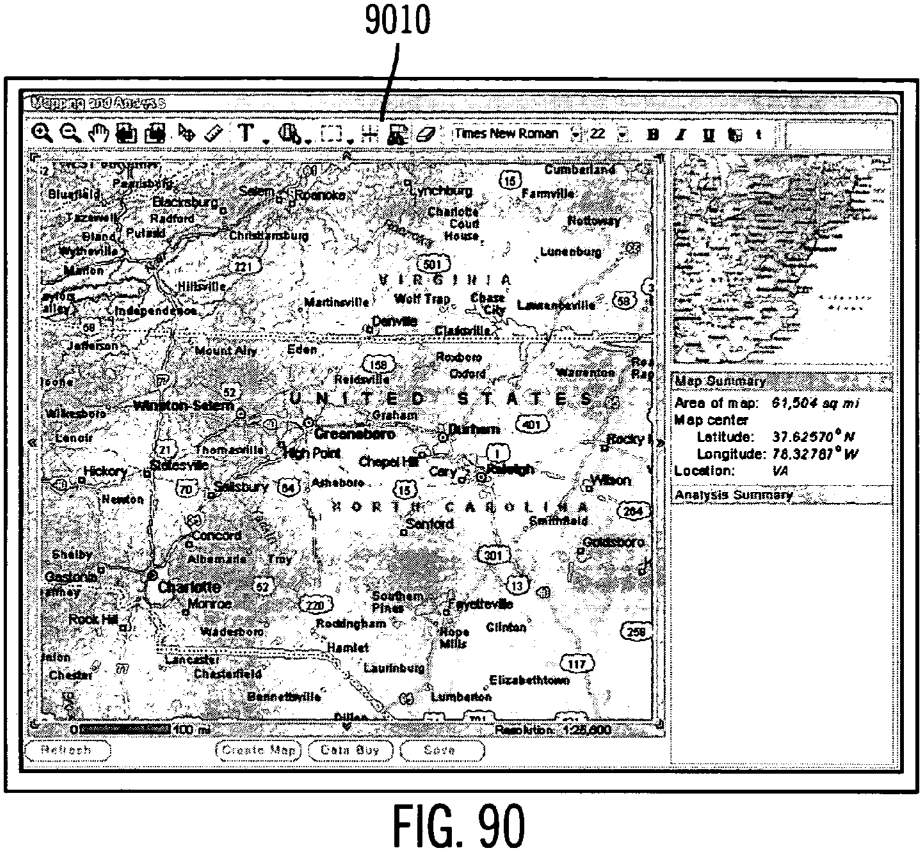
FIG. 90
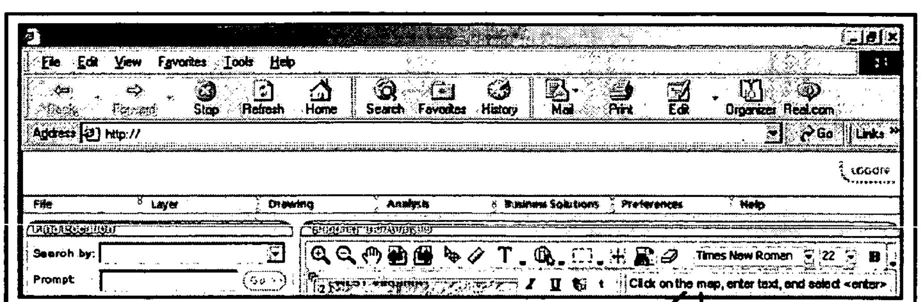
FIG. 91 Expansion Docking 9110

9310

FIG. 94L
FIG. 94M
FIG. 94N
FIG. 94O
FIG. 94P
FIG. 94Q
FIG. 94R
Rectangle Selection Tool
9430
Ellipse Selection Tool
9432
Polygon Selection Tool
9434
Select by Copy
9436
Buffer Tool
9438
Query Tool
9440
Clear Tool
9442

9610

| Tool Name | Section | Expansion Toolbar |
|---|---|---|
| Find Area Tool | Area of Interest | n/a |
| Zoom in Tool | Area of Interest | n/a |
| Zoom Out Tool | Area of Interest | n/a |
| Pan Tool | Area of Interest | n/a |
| Previous Extent Tool | Area of Interest | n/a |
| Selection | Select / Measure | n/a |
| Measure | Select / Measure | n/a |
| Measure Polyline | Select / Measure | n/a |
| Point n' View | Information Tools | Information Tools E.T. |
| Global Point n' View | Information Tools | Information Tools E.T. |
| Point n' Attribute | Information Tools | Information Tools E.T. |
| Text Tool | Drawing Tools | Drawing Tools E. T. |
| Lin Tool | Drawing Tools | Drawing Tools E. T. |
| Polyline Tool | Drawing Tools | Drawing Tools E. T. |
| Rectangle Tool | Drawing Tools | Drawing Tools E. T. |
| Ellipse Tool | Drawing Tools | Drawing Tools E. T. |
| Polygon Tool | Drawing Tools | Drawing Tools E. T. |
| Attribute Tool | Drawing Tools | Drawing Tools E. T. |
| Select Point Tool | Analysis Tools | Analysis Tools E.T. |
| Select Line Tool | Analysis Tools | Analysis Tools E.T. |
| Select Rectangle | Analysis Tools | Analysis Tools E.T. |
| Select Ellipse | Analysis Tools | Analysis Tools E.T. |
| Select Polygon | Analysis Tools | Analysis Tools E.T. |
| Select by Copy | Analysis Tools | Analysis Tools E.T. |
| Buffer Tool | Analysis Tools | n/a |
| Clear Tool | Analysis Tools | n/a |

Point n' attribute Push

11010

| Screen resolution | Map Window Size (in pixels) |
|---|---|
| 800 x 600 | 325 x 325 |
| 1024 x 768 | 493 x 493 |
| 1280 x 1024 | 749 x 749 |
| 1400 x 1050 | 775 x 775 |
| 1600 x1200 | 925 x 925 |

FIG. 119 11910
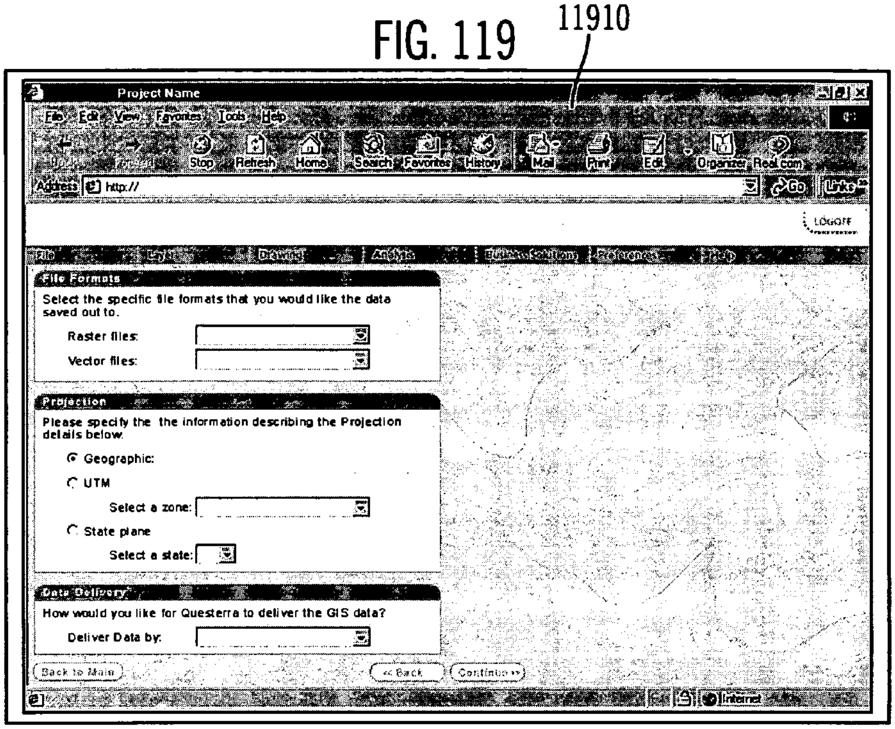
FIG. 120 12010
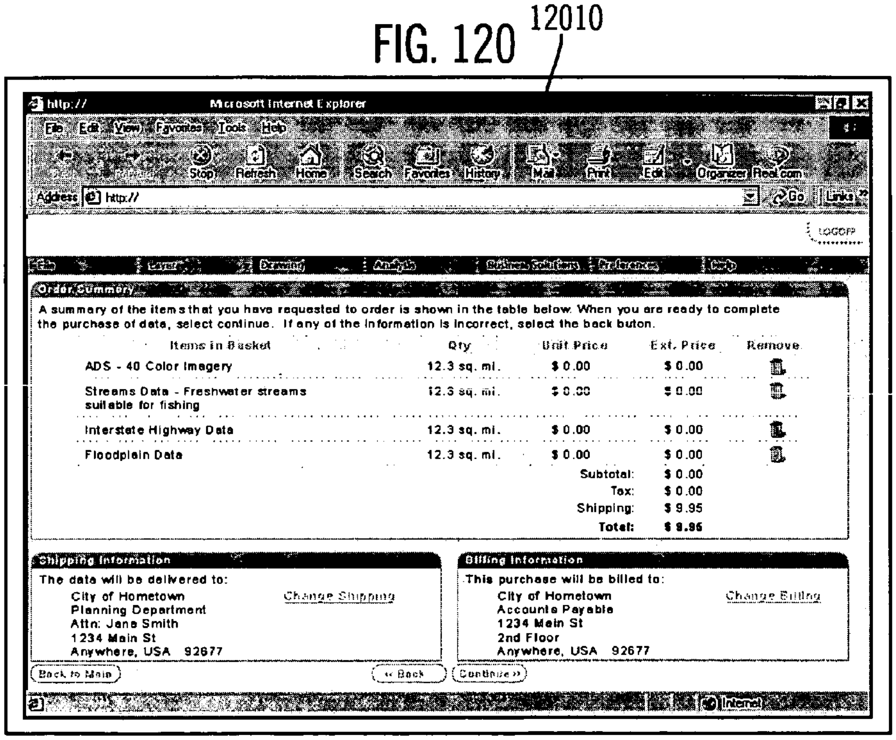

12310

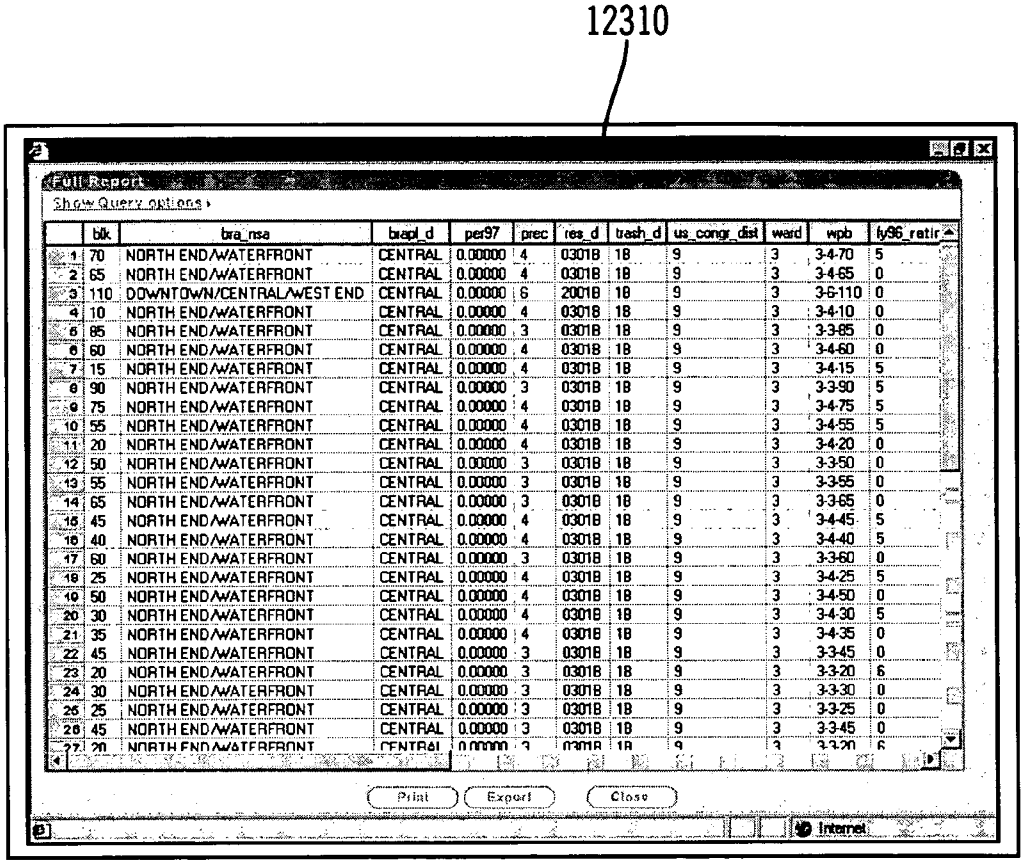

| | blk | bra_nsa | brapl_d | per97 | prec | res_d | trash_d | us_congr_dist | ward | wpb | fy96_retir |
|---|---|---|---|---|---|---|---|---|---|---|---|
| 1 | 70 | NORTH END/WATERFRONT | CENTRAL | 0.00000 | 4 | 0301B | 1B | 9 | 3 | 3-4-70 | 5 |
| 2 | 65 | NORTH END/WATERFRONT | CENTRAL | 0.00000 | 4 | 0301B | 1B | 9 | 3 | 3-4-65 | 0 |
| 3 | 110 | DOWNTOWN/CENTRAL/WEST END | CENTRAL | 0.00000 | 6 | 2001B | 1B | 9 | 3 | 3-6-110 | 0 |
| 4 | 10 | NORTH END/WATERFRONT | CENTRAL | 0.00000 | 4 | 0301B | 1B | 9 | 3 | 3-4-10 | 0 |
| 5 | 85 | NORTH END/WATERFRONT | CENTRAL | 0.00000 | 3 | 0301B | 1B | 9 | 3 | 3-3-85 | 0 |
| 6 | 60 | NORTH END/WATERFRONT | CENTRAL | 0.00000 | 4 | 0301B | 1B | 9 | 3 | 3-4-60 | 0 |
| 7 | 15 | NORTH END/WATERFRONT | CENTRAL | 0.00000 | 4 | 0301B | 1B | 9 | 3 | 3-4-15 | 5 |
| 8 | 90 | NORTH END/WATERFRONT | CENTRAL | 0.00000 | 3 | 0301B | 1B | 9 | 3 | 3-3-90 | 5 |
| 9 | 75 | NORTH END/WATERFRONT | CENTRAL | 0.00000 | 4 | 0301B | 1B | 9 | 3 | 3-4-75 | 5 |
| 10 | 55 | NORTH END/WATERFRONT | CENTRAL | 0.00000 | 4 | 0301B | 1B | 9 | 3 | 3-4-55 | 5 |
| 11 | 20 | NORTH END/WATERFRONT | CENTRAL | 0.00000 | 4 | 0301B | 1B | 9 | 3 | 3-4-20 | 0 |
| 12 | 50 | NORTH END/WATERFRONT | CENTRAL | 0.00000 | 3 | 0301B | 1B | 9 | 3 | 3-3-50 | 0 |
| 13 | 55 | NORTH END/WATERFRONT | CENTRAL | 0.00000 | 3 | 0301B | 1B | 9 | 3 | 3-3-55 | 0 |
| 14 | 65 | NORTH END/WATERFRONT | CENTRAL | 0.00000 | 3 | 0301B | 1B | 9 | 3 | 3-3-65 | 0 |
| 15 | 45 | NORTH END/WATERFRONT | CENTRAL | 0.00000 | 4 | 0301B | 1B | 9 | 3 | 3-4-45 | 5 |
| 16 | 40 | NORTH END/WATERFRONT | CENTRAL | 0.00000 | 4 | 0301B | 1B | 9 | 3 | 3-4-40 | 5 |
| 17 | 60 | NORTH END/WATERFRONT | CENTRAL | 0.00000 | 3 | 0301B | 1B | 9 | 3 | 3-3-60 | 0 |
| 18 | 25 | NORTH END/WATERFRONT | CENTRAL | 0.00000 | 4 | 0301B | 1B | 9 | 3 | 3-4-25 | 5 |
| 19 | 50 | NORTH END/WATERFRONT | CENTRAL | 0.00000 | 4 | 0301B | 1B | 9 | 3 | 3-4-50 | 0 |
| 20 | 30 | NORTH END/WATERFRONT | CENTRAL | 0.00000 | 4 | 0301B | 1B | 9 | 3 | 3-4-30 | 5 |
| 21 | 35 | NORTH END/WATERFRONT | CENTRAL | 0.00000 | 4 | 0301B | 1B | 9 | 3 | 3-4-35 | 0 |
| 22 | 45 | NORTH END/WATERFRONT | CENTRAL | 0.00000 | 3 | 0301B | 1B | 9 | 3 | 3-3-45 | 0 |
| 23 | 20 | NORTH END/WATERFRONT | CENTRAL | 0.00000 | 3 | 0301B | 1B | 9 | 3 | 3-3-20 | 6 |
| 24 | 30 | NORTH END/WATERFRONT | CENTRAL | 0.00000 | 3 | 0301B | 1B | 9 | 3 | 3-3-30 | 0 |
| 25 | 25 | NORTH END/WATERFRONT | CENTRAL | 0.00000 | 3 | 0301B | 1B | 9 | 3 | 3-3-25 | 0 |
| 26 | 45 | NORTH END/WATERFRONT | CENTRAL | 0.00000 | 3 | 0301B | 1B | 9 | 3 | 3-3-45 | 0 |
| 27 | 20 | NORTH END/WATERFRONT | CENTRAL | 0.00000 | 3 | 0301B | 1B | 9 | 3 | 3-3-20 | 6 |

Example of the File Menu

| | |
|---|---|
| AA | NC |
| AE | ND |
| AK | NE |
| AL | NH |
| AP | NJ |
| AR | NM |
| AS | NV |
| CA | NY |
| CO | OH |
| CT | OK |
| DC | OR |
| DE | PA |
| FL | PR |
| FM | PW |
| GA | RI |
| GU | SL |
| HI | SD |
| IA | TN |
| ID | TX |
| IL | UT |
| IN | VI |
| KS | VT |
| KY | WA |
| LA | WI |
| MA | WV |
| MD | WY |
| ME | |
| MH | |
| MI | |
| MN | |
| MO | |
| MP | |
| MS | |
| MT | |

16310

| USER PROVIDED INFORMATION | LOCATION COLUMN DISPLAYS THE FOLLOWING INFORMATION |
|---|---|
| ADDRESS | ADDRESS, CITY, COUNTY, STATE AND ZIP |
| ADDRESS AND CITY | ADDRESS, CITY, COUNTY, STATE AND ZIP |
| ADDRESS AND COUNTY | ADDRESS, CITY, COUNTY, STATE AND ZIP |
| ADDRESS AND STATE | ADDRESS, CITY, COUNTY, STATE AND ZIP |
| ADDRESS AND ZIP | ADDRESS, CITY, COUNTY, STATE AND ZIP |
| ADDRESS, CITY AND COUNTY | ADDRESS, CITY, COUNTY, STATE AND ZIP |
| ADDRESS, CITY AND STATE | ADDRESS, CITY, COUNTY, STATE AND ZIP |
| ADDRESS, CITY AND ZIP | ADDRESS, CITY, COUNTY, STATE AND ZIP |
| ADDRESS, COUNTY AND STATE | ADDRESS, CITY, COUNTY, STATE AND ZIP |
| ADDRESS, COUNTY AND ZIP | ADDRESS, CITY, COUNTY, STATE AND ZIP |
| ADDRESS, STATE AND ZIP | ADDRESS, CITY, COUNTY, STATE AND ZIP |
| ADDRESS, CITY, COUNTY AND STATE | ADDRESS, CITY, COUNTY, STATE AND ZIP |
| ADDRESS, CITY, COUNTY AND ZIP | ADDRESS, CITY, COUNTY, STATE AND ZIP |
| ADDRESS, CITY, STATE AND ZIP | ADDRESS, CITY, COUNTY, STATE AND ZIP |
| ADDRESS, COUNTY, STATE AND ZIP | ADDRESS, CITY, COUNTY, STATE AND ZIP |
| ADDRESS, CITY, COUNTY, STATE AND ZIP | ADDRESS, CITY, COUNTY, STATE AND ZIP |
| CITY | CITY, COUNTY, STATE, ZIP |
| CITY AND COUNTY | CITY, COUNTY, STATE, ZIP |
| CITY AND STATE | CITY, COUNTY, STATE, ZIP |
| CITY AND ZIP | CITY, COUNTY, STATE, ZIP |
| CITY, COUNTY AND STATE | CITY, COUNTY, STATE, ZIP |
| CITY, COUNTY AND ZIP | CITY, COUNTY, STATE, ZIP |
| CITY, STATE AND ZIP | CITY, COUNTY, STATE, ZIP |
| CITY, COUNTY, STATE AND ZIP | CITY, COUNTY, STATE, ZIP |
| COUNTY | COUNTY, STATE, ZIP |
| COUNTY AND STATE | COUNTY, STATE, ZIP |
| COUNTY AND ZIP | COUNTY, STATE, ZIP |
| COUNTY, STATE AND ZIP | COUNTY, STATE, ZIP |
| STATE | STATE AND ZIP |
| STATE AND ZIP | STATE AND ZIP |
| ZIP | N/A |

| MAP LAYER DESCRIPTION | LAYER NAME | DATA TYPE | < 1:1M | 1:1M TO 1:100K | 1:100K TO 1:24K | 1:24K TO 1:10K | < 1:10K |
|---|---|---|---|---|---|---|---|
| POLITICAL | | | | | | | |
| US BOUNDARY | USBDY | POLY | ● | | | | |
| US STATES | USSTATE | POLY | ● | ● | | | |
| US COUNTIES | USCOUNTY | POLY | | ● | ● | | |
| US PLACES | USPLACE | POINT | | ● | ● | | |
| CONGRESSIONAL DISTRICTS | CONGDIST | POLY | | ● | ● | | |
| INDEX | | | | | | | |
| 1:24K TOPO MAP BOUNDARIES | TOPIDX24 | POLY | | | ● | | |
| PUBLIC LAND SURVEY (MAJOR) | PLS1 | LINE | | ● | | | |
| PUBLIC LAND SURVEY (MINOR) | PLS2 | LINE | | | ● | ● | ● |
| DEMOGRAPHIC | | | | | | | |
| SMSAS | SMSA | POLY | ● | ● | ● | ● | |
| US POPULATION | USPOP | RASTER | | ● | ● | ● | |
| NIGHTLIGHTS™ | NITELITE | RASTER | ● | ● | | | |
| INFRASTRUCTURE | | | | | | | |
| SMALL SCALE TRANSPORTATION | TRANS1M | LINE | | ● | | | |
| SMALL SCALE PIPELINES | PIP1M | LINE | | ● | | | |
| MEDIUM SCALE TRANSPORTATION | TRANS100 | LINE | | ● | ● | | |
| LARGE SCALE TRANSPORTATION | TRANS24 | LINE | | | | ● | ● |
| ENVIRONMENTAL | | | | | | | |
| SMALL SCALE HYDROLOGY | WATER1M | LINE | | ● | | | |
| MEDIUM SCALE HYDROLOGY | WATER100 | LINE | | | ● | | |
| LARGE SCALE HYDROLOGY | WATER24 | LINE | | | | ● | ● |
| NATIONAL WETLANDS INVENTORY | NWI24 | POLY | | | | ● | ● |
| STATSGO (SOIL) | XX_SOIL1M | POLY | | ● | ● | | |
| STATE GEOLOGIC FORMATIONS | GEO1M | POLY | | ● | ● | | |
| TOPOGRAPHIC | | | | | | | |
| 1KM HILLSHADE | HILL1M | RASTER | ● | ● | | | |
| 90M HILLSHADE | HILL250 | RASTER | | ● | ● | | |
| 30M HILLSHADE | HILL24 | RASTER | | | ● | ● | |
| 7.5' DRG | DRG24 | RASTER | | | ● | ● | ● |
| LARGE SCALE CONTOUR LINES | CONTOUR24 | LINE | | | | ● | ● |
| IMAGERY | | | | | | | |
| LANDSAT IMAGERY | L7_XX | RASTER | | ● | ● | | |
| 1M COLOR AERIAL PHOTOGRAPHY | ADSCOL1M | RASTER | | | | ● | ● |
| 1M CIR AERIAL PHOTOGRAPHY | ADSCIR1M | RASTER | | | | ● | ● |
| 1M B&W AERIAL PHOTOGRAPHY | ADSBW1M | RASTER | | | | ● | ● |
| 30CM COLOR AERIAL PHOTOGRAPHY | ADSCOL30 | RASTER | | | | | ● |
| 30CM CIR AERIAL PHOTOGRAPHY | ADSCIR30 | RASTER | | | | | ● |
| 10CM B&W AERIAL PHOTOGRAPHY | ADSBW10 | RASTER | | | | | ● |

| DATA TYPE | DATA DESCRIPTION | DATA SOURCE |
|---|---|---|
| CATEGORY: IMAGERY | | |
| LANDSAT 7 | 15 METER RESOLUTION MOSAICED PRODUCTS IN BOTH COLOR AND COLOR-INFRARED FOR CONTERMINOUS US. IMAGERY DATES FROM 1999 TO 2001 | UNITED STATES GEOLOGICAL SURVEY |
| DIGITAL ORTHO QUARTER QUADS (DOQQS) | 1 METER RESOLUTION AERIAL PHOTOGRAPHY SCANNED AND PROCESSED TO REMOVE DISTORTIONS. MOST IMAGERY IS BLACK AND WHITE WITH SOME COLOR AND COLOR INFRARED. IMAGERY DATES FROM 1994 TO 2000. COVERAGE FOR OVER 85% OF THE CONTERMINOUS US. | UNITED STATES GEOLOGICAL SURVEY |
| HIGH RESOLUTION IMAGERY | 15CM - 1M COLOR, COLOR INFRARED AND BLACK AND WHITE IMAGERY. COVERAGE OF MOST MAJOR METRO AREAS AND SOME NON-METRO AREAS | VARIOUS PROVIDERS |
| DIGITAL RASTER GRAPHICS (DRG) | SCANNED IMAGES OF USGS TOPOGRAPHIC MAPS FOR THE CONTERMINOUS US | UNITED STATES GEOLOGICAL SURVEY |
| NATIONAL ELEVATION DATASET (NED) | CORRECTED DIGITAL ELEVATION MODELS (DEMS) FOR THE CONTERMINOUS US | UNITED STATES GEOLOGICAL SURVEY |

| DATA TYPE | DATA DESCRIPTION | DATA SOURCE |
|---|---|---|
| CATEGORY: TRANSPORTATION | | |
| TRANSPORTATION | GEOCODED INTERSTATE, US AND STATE HIGHWAYS, ARTERIAL ROADS, LIGHT DUTY ROADS, ALLEYS, UNPAVED ROADS, RAILROADS THAT ALLOW ADDRESS SEARCHES AND ROUTING REQUESTS; AIRPORTS, RAILROAD AND BUS STATIONS, HIGHWAY INTERCHANGES, FERRY TERMINALS. | TELE ATLAS |
| CATEGORY: LANDMARKS | | |
| PARKS | NATIONAL, STATE, REGIONAL AND LOCAL PARKS | TELE ATLAS |
| LANDMARKS | AIRPORTS, RAILROAD AND BUS STATIONS, HIGHWAY INTERCHANGES, FERRY TERMINALS, MAJOR BUILDINGS, TOWN CENTERS, CITY HALLS, PUBLIC LIBRARIES, CONVENTION CENTERS, OBSERVATORIES, COLLEGES, UNIVERSITIES, MONUMENTS, MEMORIALS, SHOPPING CENTERS, GOLF COURSES, AMUSEMENT PARKS, FAIRGROUNDS, SKI RESORTS, HORSE AND AUTO RACETRACKS, STADIUMS, MUSEUMS, HALLS, AUDITORIUMS, ZOOS, AQUARIUMS, CITY CENTERS | TELE ATLAS |
| CATEGORY: BOUNDARIES | | |
| US COUNTY BOUNDARIES | BOUNDARIES OF COUNTIES IN CONTERMINOUS US, COUNTRY AND STATE CODES, COUNTRY NAMES AND AREA. | UNITED STATES GEOLOGICAL SURVEY |
| METROPOLITAN STATISTICAL AREAS | BOUNDARIES OF METROPOLITAN AREAS WITH AREA AND POPULATION | BUREAU OF STATISTICS |
| US CONGRESSIONAL DISTRICTS | 104TH, 105TH AND 106TH CONGRESSIONAL DISTRICT BOUNDARIES | TELE ATLAS |
| ZIP CODES | ZIP +4 BOUNDARIES FOR CONTERMINOUS US | BUREAU OF TRANSPORTATION |
| CATEGORY: DEMOGRAPHICS | | |
| CENSUS DATA | 1990 AND 2000 US CENSUS DATA INCLUDING DEMOGRAPHIC INFORMATION AND CENSUS TRACT BOUNDARIES | UNITED STATES CENSUS BUREAU |
| METROPOLITAN STATISTICAL AREAS | BOUNDARIES OF METROPOLITAN AREAS WITH AREA AND POPULATION | BUREAU OF STATISTICS |
| CATEGORY: WATER | | |
| NATIONAL WATERWAY NETWORK | NAVIGABLE WATERWAYS OF THE CONTERMINOUS US | UNITED STATES ARMY CORPS OF ENGINEERS |

FIG. 166A

| | | |
|---|---|---|
| NATIONAL INVENTORY OF DAMS | MAJOR DAMS AND ASSOCIATED LAKES | UNITED STATES ARMY CORPS OF ENGINEERS |
| NATIONAL WETLANDS INVENTORY | WETLAND BOUNDARIES AND CLASSIFICATIONS | UNITED STATES FISH AND WILDLIFE SERVICE |
| HYDROLOGY | VECTOR REPRESENTATIONS OF RIVERS AND STREAMS | UNITED STATES GEOLOGICAL SURVEY |
| FLOOD PLAINS | 100 YR AND 500 YR FLOOD PLAIN BOUNDARIES | FEDERAL EMERGENCY MANAGEMENT AGENCY |
| WATERSHEDS | HYDROLOGIC UNITS FOR MAJOR RIVERS AND TRIBUTARIES | UNITED STATES GEOLOGICAL SURVEY |
| INFRASTRUCTURE | | |
| OIL/GAS/ELECTRICAL DISTRIBUTION LINES | MAJOR PIPELINES, TRANSMISSION LINES AND FACILITIES | UNITED STATES DEPARTMENT OF ENERGY |
| NATIONAL INVENTORY OF DAMS | MAJOR DAMS AND ASSOCIATED LAKES | UNITED STATES ARMY CORPS OF ENGINEERS |
| CATEGORY: ENVIRONMENTAL | | |
| SOILS | LARGE AND SMALL SCALE SOIL CLASSIFICATION DATA | NATURAL RESOURCE CONSERVATION SERVICE |
| GEOLOGY | SMALL SCALE GEOLOGIC CLASSIFICATION DATA | UNITED STATES GEOLOGICAL SURVEY |
| HYPSOGRAPHY | VECTOR REPRESENTATIONS OF LANDSCAPE TOPOGRAPHY | UNITED STATES GEOLOGICAL SURVEY |

FIG. 166B

METHOD, SYSTEM, AND PROGRAM FOR AN IMPROVED ENTERPRISE SPATIAL SYSTEM

CROSS-REFERENCE TO PROVISIONAL APPLICATION

This application is a non-provisional application that claims the benefit of following applications:

U.S. Provisional Application No. 60/364,807, entitled "A SYSTEM AND METHOD AND COMPUTER PRODUCT FOR COUPLING A DATA PROCESSING CENTER TO A LIVE DATA PROCESSING CENTER TO PROVIDE FOR SPATIALLY VIEWING, ANALYZING, AND SHARING ENTERPRISE DATA AND GEOSPATIAL DATA ACROSS MULTIPLE USERS," by T. von Kaenel et al., filed on Mar. 16, 2002, and which is incorporated by reference herein in its entirety.

U.S. Provisional Application No. 60/433,597, entitled "SYSTEMS AND METHODS FOR REAL-TIME EVALUATING AND REPORTING ASSOCIATED WITH INSURANCE POLICY UNDERWRITING AND RISK MANAGEMENT," by S. Kumar et al., filed on Dec. 16, 2002, and which is incorporated by reference herein in its entirety.

U.S. Provisional Application No. 60/437,990, entitled "SYSTEMS AND METHODS FOR REAL-TIME EVALUATING AND REPORTING ASSOCIATED WITH INSURANCE POLICY UNDERWRITING AND RISK MANAGEMENT," by S. Kumar et al., filed on Jan. 6, 2003, and which is incorporated by reference herein in its entirety.

BACKGROUND OF THE INVENTION

1. Field of the Invention

The present invention is generally related to improved spatial systems and geospatial information systems. Spatial and geospatial information systems involve the use of spatial and/or geospatial information to explore, analyze, visualize, and communicate spatial relationships.

2. Description of the Related Art

Businesses have a great deal of data. Some of the data is spatially referenced data (i.e., the data is associated with a point on the earth using a latitude and longitude), while much of the data is non-spatially referenced data (e.g., sales data that may be in a tabular format). Currently, there is no convenient way for users to spatially analyze non-spatially referenced data. Instead, data is analyzed by comparing tabular data from spreadsheets or data stores and creating pie charts or bar charts to represent tabular data graphically. With these limited options, it is difficult for users to determine the interaction of various data to a spatial perspective.

Spatial Information Management (SIM) enables business applications to use business data in a spatial context by assigning real earth coordinates (i.e., latitude and longitude) to the business data. Associating location information with business data allows SIM users to make more informed decisions quickly by visualizing spatially referenced business data on a map or by executing spatial queries which return results based on an intersection of proximity of various data sets. That is, SIM allows data to be represented in a spatial context and provides information in various formats (e.g., graphical, tabular, text, etc.) by combining various data elements, such as geographic information, demographic information, business information or psychographic information. The SIM industry is made up several areas, including, for example: Geographic Information Systems (GIS), Business Support Systems (BSS), Personal Productivity Applications, and the Internet.

Geographic Information Systems (GIS) are used to handle geographic information reliably. GISs are designed mainly for handling spatial data conversion, data analysis and cartographic display.

Business Support Systems (BSS) are designed mainly to support specific business processes. The following are a few examples of different types of Business Support Systems: Enterprise Resource Planning (ERP), data mining, Customer Relationship Management (CRM), and Supply Chain Management (SCM). ERP integrates departments and functions across a company onto a single computer system that can serve the particular needs of different departments. CRM is a comprehensive way to integrate customer information in areas of business. SCM provides a solution for companies to find the raw components needed to make a product or service, manufacture that product or service, and deliver the product or service to customers. These applications are not, however, designed to support business data in spatial form. Yet, users would be more informed if these applications were enabled to analyze business data spatially using geocoded business records that have information.

Personal Productivity Applications are tools that help improve users' productivity in their daily jobs. Spatially referenced data can also help users manage their daily tasks.

The Internet is a worldwide system of computer networks that allows computers connected to the computer networks to access information from other computers. As the Internet replaces the client server architecture for managing data access, more Internet products are becoming available to support spatially referenced data (e.g., MapQuest®, Autodesk MapGuide™, etc.). Examples of the use of spatially referenced data include obtaining driving directions to a nearest coffee shop or finding all gas stations within ten miles of a specific location.

Currently, SIM users are able to access static, pre-spatially referenced data sets that have been stored on very large storage devices. A data set is a subset of related data. Whenever a user requests certain information using existing conventional software, a user has access only to static data that has been previously stored and referenced (i.e., raster imagery, such as LanSat, DOQQs, DRGs, etc. or vector data such as roads, lakes, landmarks, etc). The term "raster data" refers to one or more pre-generated images. The term "vector data" refers to a set of coordinate numbers that are converted to an image.

It is difficult for users simultaneously to view spatially referenced data and non-spatially referenced data, such as customer information, sales results, and inventory levels. In order to do this, it is necessary for the non-spatially referenced data and spatially referenced data to be accessed in real time from wherever the data exists in an enterprise (i.e., an organization that uses computers), and the information must be spatially referenced or geocoded by associating a longitude and latitude value with each data record to be viewed spatially.

For example, if a salesperson wants to make informed decisions by visualizing how certain marketing promotions are working out, the sales person needs to be able to view the sales data overlaid with other geospatial information, e.g., maps, county boundaries, competitor locations, etc. Then, a salesperson needs to be able to select certain areas on the map to determine why some areas are providing poor results based on the specific marketing promotions which have been used in the specific areas. To accomplish this, a salesperson must have the ability to simultaneously access enterprise data (i.e., data generated by an enterprise, which may also be referred to as "corporate data" or "enterprise data", such as sales data, marketing data, employee data, etc.) and third party data (i.e., data generated outside of the enterprise accessing the data, such as, public data, data retrieved from third party sources such as the U.S. Postal Service or Dunn & Bradstreet, etc.) that provide demographic information about the selected area. Since there are so many different possible results that can be generated based on user requests, it is very difficult to anticipate all of the possible results, and preload and pre-reference static data (e.g., images) that represent all of the possible results.

Thus, there are numerous problems in the existing spatial systems solutions. One problem is dynamically accessing data sets and generating spatial references (i.e., geocoding) for enterprise data sets that are typically not spatially-referenced (e.g., sales results, customer information, inventory levels, plant or asset locations, etc.). Another problem is simultaneously combining enterprise data with third party data (e.g., geographical data) to allow enterprises to spatially analyze and visualize enterprise data and other data (e.g., traditional spatially referenced data sets in a spatial context).

Yet another problem is illustrated with reference to FIGS. 1–2. Referring to FIG. 1, a client application sends a request 101 via a network 102 to a server computer 103. The server computer 103 retrieves the requested data from a data store 104 and generates individual images for each data layer 105. The individual images are spatially referenced images (e.g., an image in which each point is associated with a longitude and latitude). The server computer 103 obtains data from the data store 104. The server computer 103 combines the individual image layers 106 into one single composite image 107. The composite image 107 is then sent via a network to the client application 101 to be displayed.

Since the server computer needs to combine the images into one composite image, and then send the composite image to the client, several problems occur. For example, when a user wants to view the composite image with some changes (e.g., view a new data layer, view one less data layer, or change the order of the layers), the server computer 103 regenerates individual images for each data layer to be viewed and sends a new composite image to the client application. This adds additional processing load on the server computer and requires many roundtrip transactions between the client application 101 and the server computer 103. Additionally, the response time becomes slow when the user wants to view a new data layer (in addition to the ones currently being viewed or accessed) or when the user wants to view one less data layer, since each type of request results in new roundtrip requests to the server computer 103 to generate a new composite image.

Referring to FIG. 2, a client application 201 sends a request via a network 202 to a server computer 203. The server computer 203 retrieves the requested data from a data store 204. The raw data for each data layer is retrieved as individual data sets 205 and sent via network 202 to a complex client application 201. The client application 201 stores each data set in data store 208. The client application 201 will render and convert 209 individual sets of raw data to displayable images 210. Then the client application 201 will combine the displayable images into one composite image 211 and finally display the composite image 211 to the user.

Several problems occur with the technique illustrated in FIG. 2. For example, the technique requires a complex client software application 201 to contain the logic to convert and, possibly, combine raw spatially referenced data into viewable data layers. Additionally, raw data, rather than images, are sent to the client application 201, which results in data being copied to and stored on client computers, rather than being centralized in a single data store.

Yet another problem is that Geographic Information Systems (GIS) require data to be in a very specific format that allows client applications to process and allows users to view the data spatially. Due to this need, the process of generating and linking spatial coordinate data often requires the conversion of the format of the initial data set to a new spatially referenced format. The processing for conversion of the format is typically performed manually, which is time consuming and error prone. The conventional process for converting data so that the data may be viewed spatially cannot be easily automated because of the manual processing required. The manual processes also make it very difficult to track the chain of custody for the data. This is a problem in a server computer that handles data from different customers. The manual processes also make it difficult to generate data validation procedures that can guarantee the integrity of the data across all the processes.

FIG. 3 illustrates a conventional process for converting data. For example, customer data 312 is tabular data. The customer data 312 is uploaded in block 320. To make the tabular data viewable spatially, location information (e.g., addresses) that is associated with the customer data 312 is cleansed in block 340 using conventional cleansing techniques known in the art. Cleansing of location information refers to determining that the location information is valid and accurate by, for example, comparing the location information to data in a data store available from the U.S. Postal Service or Dunn and Bradstreet (which maintains information on businesses). Also in block 340, a set of spatial coordinates are generated from the cleansed location information, and this is often done using a conventional geocoding application that generates a set of spatial coordinates (e.g., latitude and longitude) for each data element (e.g., customer record) in this example. The result of geocoding is spatial coordinate data 370, which is stored in spatial data store 360.

Next, a new data set is created by merging the customer data 312 with the spatial coordinate data 370. This data then needs to be uploaded back to the server computer 320 from the spatial data store 360. Then, rendering specification data is generated, which describes how the data should be presented as a spatial layer, and the hardcoded table is displayed in block 380.

The resulting transformed data is typically no longer usable by existing applications. A common solution to this problem is to keep the original data intact and create a new data set to be loaded and viewed spatially, which includes the original data concatenated with the spatial coordinate data. This causes data integrity problems with the original data getting out of synch with the data created for spatial viewing.

Moreover, the resulting data cannot be made visible to the client applications without restarting the client and server processes. Conventional systems use configuration files at startup time to read information about the data presented to the client applications. The server applications or server processes are shut down, configuration files are updated, and the server applications or server processes are restarted in order to provide access to new or modified data to client applications. This process logs out the client applications, and the client server session may need to be restarted before the new or modified data can be accessed and displayed.

A further problem is that conventional systems provide access control to data with one of two approaches. First, access control is done at the application level. In other words, a user is granted or denied access to the application based on the user's credentials. Once the user is granted access to the application, the user may view all data the application can access. Therefore, all users who use the application may view all the data at the server computer. Second, access to data is controlled by access control mechanisms provided by back end data store technology. This requires the application to access the back end data store with the same credentials used to access the application itself. Both approaches have several problems.

With the first approach, all users of an application get to view all data that the application can access, and access is not restricted to a subset of the data based on the user of the application. If different users need to be granted access to different sets or groupings of data, multiple instances of the application or multiple processes within the same application need to be run, each working with a different set or grouping of data. Also, users view all data within a data set, and access is not restricted to some records or data elements within a data set based on attributes associated with the user (e.g., security clearance level). Take for example a data set that contains the customer data for a company. The data set contains customer data for the entire country. Conventional spatial systems do not restrict access of users that are part of the west coast sales team to only the customer data for the west coast. A completely new data set that contains only the west coast customer information would have to be created in conventional systems for access to be limited. Moreover, it is very difficult to customize the presentation of data to the user based on access information associated with the user.

With the second approach, the credentials of the users of the application are tied directly to the credentials used to access the back end data store. This creates a very cumbersome process of user access right management within the application and from the perspective of the personnel setting up access rights to the server computer. Moreover, the application gets tied into the back end data store technology used, and it is extremely difficult to replace back end data store technology with a new technology as it becomes available. Also, application code gets extremely complex when multiple data stores with different access requirements are used.

Further problems occur in conventional systems when displaying images from pyramided data. A set of related spatially referenced data is commonly referred to as a data layer. A typical image, seen by a user in client software, will consist of spatially referenced images, each of which is a data layer, overlaid on top of one another utilizing spatial queries of spatial coordinates (e.g., latitude and longitude).

When a user changes the viewing area of a data layer displayed by client software by zooming in or out, various amounts of data need to be retrieved from the server computer to display the spatially referenced data to the user. When the user zooms out, more data needs to be retrieved from the server computer, since the area being viewed is larger. As the user zooms out, since the actual display area on the client software display device is fixed, more and more data is retrieved from the server computer to produce an image having more detail. This leads to the server computer taking progressively longer times to generate a composite spatially referenced image as the user zooms out. Conventional systems use "pyramiding" to handle such zooming.

Pyramiding is a technique in which the data for a data layer is stored in more than one data set. All the data sets contain data for the same subject matter in the same geographical area of interest (i.e., subsets of data based on a particular area being viewed), but the level of detail varies from one data set to another. These data sets can be arranged in a pyramid, such that the data sets at the top of the pyramid have the data with the least amount of detail. Data in the data sets at the lower levels in the pyramid have progressively higher level of detail, with the data set at the lowest level in the pyramid containing the most detailed data.

For the same geographical area of interest, each data set at a higher level in the pyramid contains less data than the data set at the pyramid level immediately below. Therefore, it takes less time to convert the data to a spatially referenced image at a higher level in the pyramid than at the pyramid level below. As the user zooms out, if the spatially referenced image is generated from data sets at progressively higher levels in the pyramid, the time taken by the server computer to create the spatially referenced image should not increase as a user zooms out.

The typical pyramid consist of several levels with the data set at each level being used for a fixed range of zoom scales, with a predefined minimum zoom scale and a predefined maximum zoom scale. When the user zooms out beyond the maximum zoom scale, the data set from the next higher level in the pyramid will be used to generate the spatially referenced image. When the user zooms in below the minimum zoom scale for a pyramid level, the data set from the pyramid level at the next lower level in the pyramid is used to generate the spatially referenced image. The data for each level in the pyramid will be stored as separate data sets.

FIG. 4 illustrates a pyramid 410 for roads data. If the roads data of a pyramid (e.g., pyramid 410) is stored in data store tables, there would be five data tables in the data store, each containing data for one level in the pyramid 410. FIG. 5 illustrates conventional processing when data is pyramided. Each level of the pyramid 410 is stored as a table 550 at GIS system 530. Each table is a data set, and each data set stored in the data store is represented as one data layer in a user interface (UI) screen presented to a user. For example, the pyramid depicted in FIG. 4 is presented as five data layers to the user in FIG. 5. So instead of seeing the related data in the different levels of a pyramid as one data layer, the user sees five different data layers.

Conventional systems use special client computer or server computer logic to make a data layer available for viewing based on the zoom scale the user is using. Since at any given time the user will be at only one zoom scale, only one out of the five layers in the pyramid will be available for viewing. Via client software 510, a user selects multiple layers and a zoom scale (block 512), and the selection is sent to the server computer 520 via a network. A data store is accessed, image layers are generated, and a consolidated image is returned to the client software 510 (block 532).

The one-to-one relationship between data sets and their corresponding data layer representation by the client software creates several problems. For example, unnecessary information about how data is stored on the back end data store is exposed to the client software. That is, data is seen as multiple data layers matching the different data sets stored in the data storage device for the same set of spatial data (e.g., roads). Therefore, in a typical application, a user can be presented with an overwhelming number of data layers, many of which are duplicate data layers for the same set of data at different zoom scales.

Since the user is allowed to view only one individual data layer at a time in a pyramid based on the user's zoom scale, as the user zooms in or out, the data layer the user is currently viewing may suddenly become unavailable for viewing. The user then has to manually choose to view the next data layer in the pyramid to view data. That is, the switchover from one level in the pyramid to the next is not always transparent.

Some conventional systems that store raster data, store the data as a pyramid to speed up the retrieval of the raster data. These conventional systems, however, do not store any other form of spatially referenced data, such as vector data.

A further problem involves third party systems. A third party system is one that is outside of a spatial system. If an organization wishes to apply custom business logic and validations to the manipulation and viewing of spatially enabled information, many steps are necessary and the process is expensive. Some examples of business logic include, for example, when editing a spatial layer, it may be necessary, that prior to saving the edit, to verify that the areas of plots of land must be smaller than a certain size, a minimum distance from a river, contained within other plots, etc. Validations may include basic editable data element (e.g., graphical object, tabular data, etc.) validations (e.g., validations that make sure only well formed graphical objects are created). Other validations may include the rules about the relationships between various graphical objects or data layers. Often, several different software packages are purchased, installed, and configured to get spatial capability. Additionally, custom software is written and maintained. Then, various base or background layer information is purchased, configured, and maintained. Moreover, access control, storage, and distribution problems must also be solved. Often in-house expertise must be developed in order to configure and maintain these systems.

Another problem in conventional Geographic Information Systems (GIS) is the difficulty in editing images. In particular, a composite image viewed by a user consists of images from multiple data layers overlaid on top of one another. The spatial data may be in a raster data or vector data format. Raster data refers to pre-generated images that may need to be cropped to fit the viewing area desired by the user. Vector data is a set of coordinate numbers that are converted to an image.

Conventional editors are typically on dedicated desktop applications because of the processing power, user interface, and data storage needed for editing. In some conventional systems, editing requests are sent from the client computer to the server computer, the server computer performs the editing, and the server computer returns a composite image to the client computer. There are several problems with trying to implement an effective editor in client software. For example, it is difficult to separate a data layer to be edited from all of the other data layers forming the displayed composite image. It is difficult to gather needed information about the elements in the data layer to be edited and to transfer this information from the server computer to the client software quickly. Also, there is typically a slow response during editing because interactions with users are transmitted back to the server computer for processing. Moreover, the typical user interface is cumbersome. There is difficulty in matching complicated graphical object boundaries to avoid overlaps or exclusion areas by use of "snap to" functions, which match new vertices to existing vertices. Furthermore, it is difficult to copy portions of graphical objects from various data layers to assist with building or modifying graphical objects. Conventional editors also lack the ability to tailor the user interface.

A further problem in a conventional Geographic Information Systems (GIS), involves sharing of customized views of data layers among different users. Some conventional GIS systems may provide the users the ability customize a view of data (i.e., a "data view"). Customizing the data view includes actions such as turning on or off a layer, reordering data layers and highlighting layer objects within a data layer by selecting the objects with a selection tool. Users may also add annotations to the view by drawing on the image viewing area using an annotation tool. These functions are preformed by the client application at the client computer and the results of such customizations are not saved on the server computer.

Conventional systems provide two types of functionality for saving customized views of data. In terms of a first type of functionality, some GIS systems provide the ability to save only a limited subset of customizations, such as annotations, in a specific user area on the server system, but they do not provide a means to share these customized views with other users of the server computer. In terms of a second type of functionality, other GIS systems allow a limited set of customizations to be shared with other users, but they do not provide the ability to limit access to a subset of the users of the server computer.

Additionally, the first type of functionality provides access limited to only the editor/author of the customized view of the data (i.e., the project) and no other user. These GIS systems do not have the ability to save all customization done by the user as a project, then share this project with other users, to properly discuss and possibly enable the other users to provide their inputs, comments, and modifications to the project on-line. That is, the first type of functionality lacks on-line collaboration of a project within a GIS system.

On the other hand, the second type of functionality provides access to all users of the system of the newly customized data (i.e., the project). Such open access creates the problem that the project will not be confidential and all users of the system will be able to view and further modify the project on-line. This functionality creates lack of on-line confidentiality, security, and integrity of a project within a GIS system.

Regardless of the many benefits of using geographic information to make business decisions, it is very costly for companies to build spatial information system infrastructure and to maintain the infrastructure properly. Also, current techniques for acquiring and manipulating spatial data are cumbersome and very time consuming. Furthermore, as noted above, there are no easy techniques for integrating enterprise data that is not spatially referenced with geographic information data to fully maximize the spatial capabilities of geographic information data.

To fully support data access for geographic information in a cost effective way, there is a need for a solution for standardizing data, integrating different business rules to support the integration of enterprise data and geographic information data for spatial representation. Also there is a need for a web-based architecture that is secure and easily scalable to support multiple users who need to access the geographic information, as well as, to share and collaborate using the geographic information with other users.

SUMMARY OF THE INVENTION

Provided are a method, system, and program for providing access to spatial data. A request for data is received. Enterprise and third party data are integrated. The integrated data is processed. Spatially referenced results are generated using the processed data. The spatially referenced results are returned in response to the request.

The described implementations of the invention provide a method, system, and program to support data access for spatially referenced and non-spatially referenced data. Solutions are provided for standardizing data and integrating different business rules to support the integration of both enterprise data and third party data for spatial representation. Moreover, a secure, scalable, web-based architecture is provided that allows enterprise and third party data to be viewed, analyzed, and shared.

BRIEF DESCRIPTION OF THE DRAWINGS

Referring now to the drawings in which like reference numbers represent corresponding parts throughout:

FIGS. 40A–40E illustrate UI screens in accordance with certain implementations of the invention.

FIG. 90 illustrates a docking bar with a toolbar, attributes bar, and prompt bar in accordance with certain implementations of the invention.

FIG. 91 illustrates expansion docking in accordance with certain implementations of the invention.

FIG. 96 illustrates a table in which tools described herein may be grouped in accordance with certain implementations of the invention.

FIG. 110 illustrates table that identifies the size of the Map window at some resolutions in accordance with certain implementations of the invention.

FIG. 119 illustrates a second data buy UI screen providing data options in accordance with certain implementations of the invention.

FIG. 120 illustrates a third data buy UI screen with a purchase summary in accordance with certain implementations of the invention.

FIG. 123 illustrates a Full Report pop up dialog in accordance with certain implementations of the invention.

FIG. 128 illustrates processing for a New operation in accordance with certain implementations of the invention.

FIG. 129 illustrates a New Project UI screen in accordance with certain implementations of the invention.

FIG. 130 illustrates a Select Template UI screen in accordance with certain implementations of the invention.

FIG. 131 illustrates processing for an Open operation in accordance with certain implementations of the invention.

FIG. 132 illustrates an Open Project UI screen in accordance with certain implementations of the invention.

FIG. 133 illustrates logic for processing a Save operation in accordance with certain implementations of the invention.

FIG. 134 illustrates a Save Project UI screen in accordance with certain implementations of the invention.

FIG. 135 illustrates an Email Form UI screen in accordance with certain implementations of the invention.

FIG. 136 illustrates logic for supporting transactional customers in accordance with certain implementations of the invention.

FIG. 137 illustrates a main UI screen for supporting transactional customers in accordance with certain implementations of the invention.

FIG. 138 illustrates a first Shopping UI screen with an Order Summary in accordance with certain implementations of the invention.

FIG. 139 illustrates a second Shopping UI screen with Contact Information in accordance with certain implementations of the invention.

Figure 140:
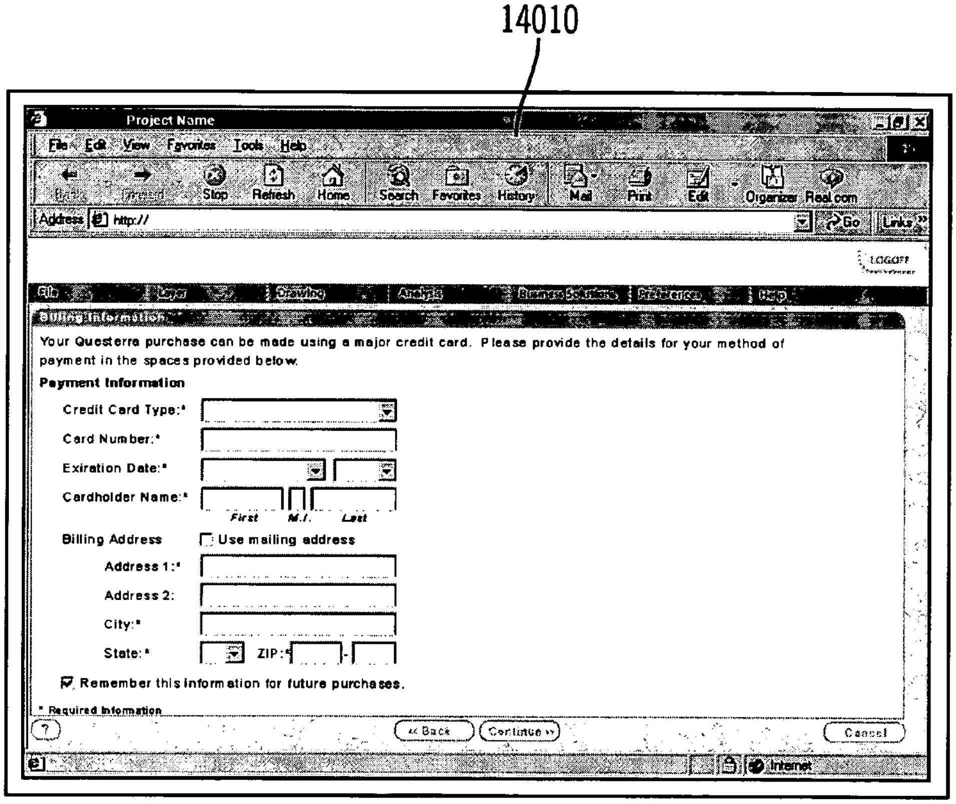

FIG. 140 illustrates a third Shopping UI screen with Payment Information in accordance with certain implementations of the invention.

Figure 141:
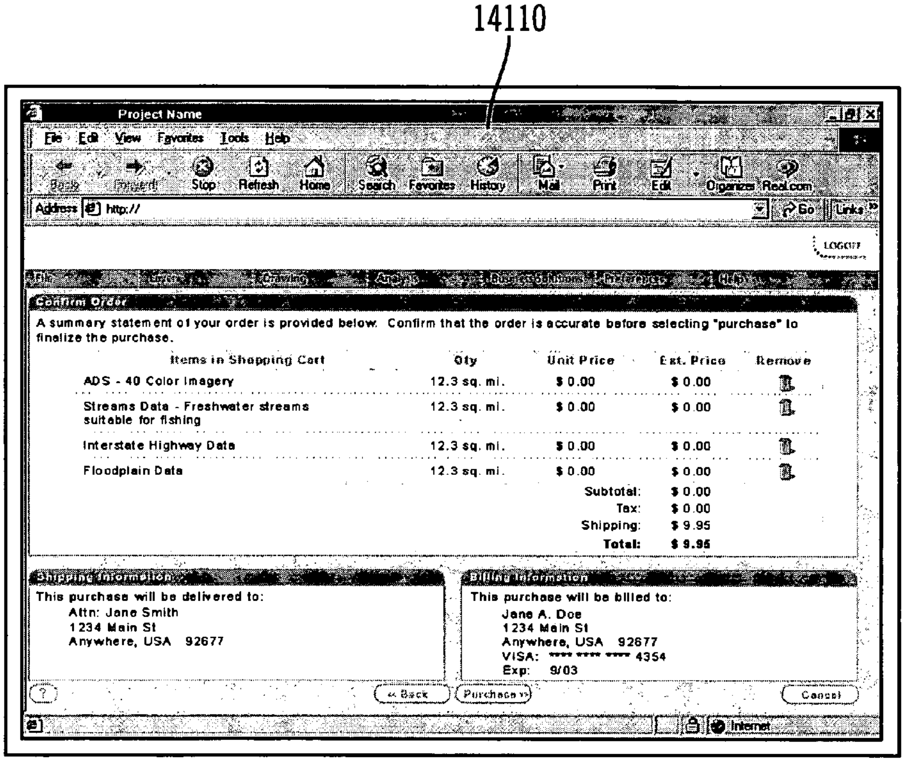

FIG. 141 illustrates a fourth Shopping UI screen with Purchase Summary in accordance with certain implementations of the invention.

Figure 142:
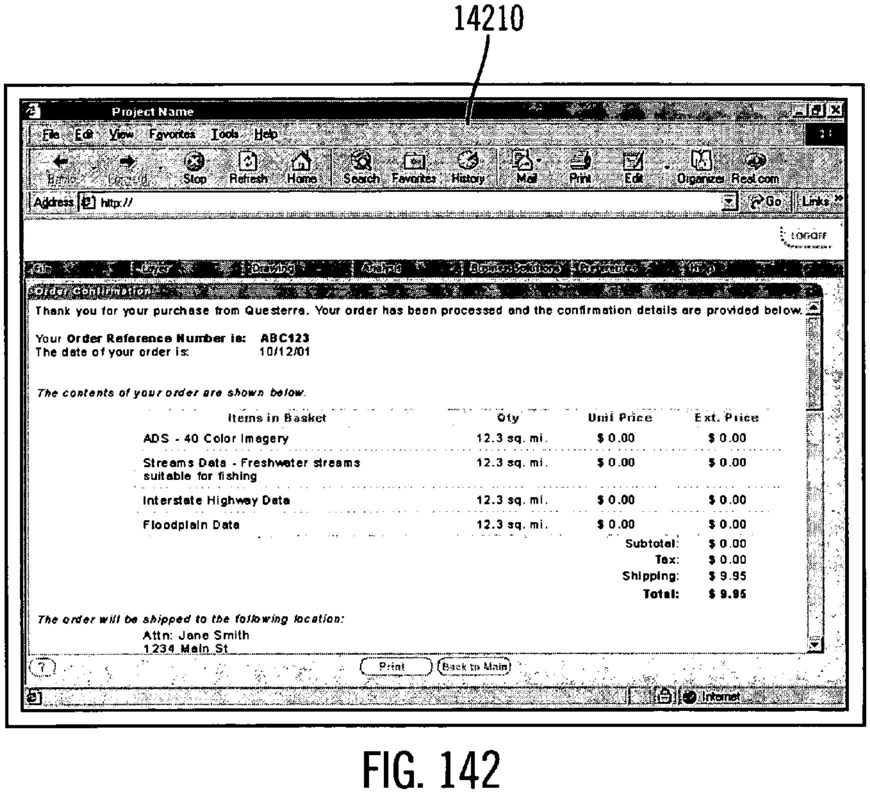

FIG. 142 illustrates a fifth Shopping UI screen with Acknowledgment in accordance with certain implementations of the invention.

Figure 143:
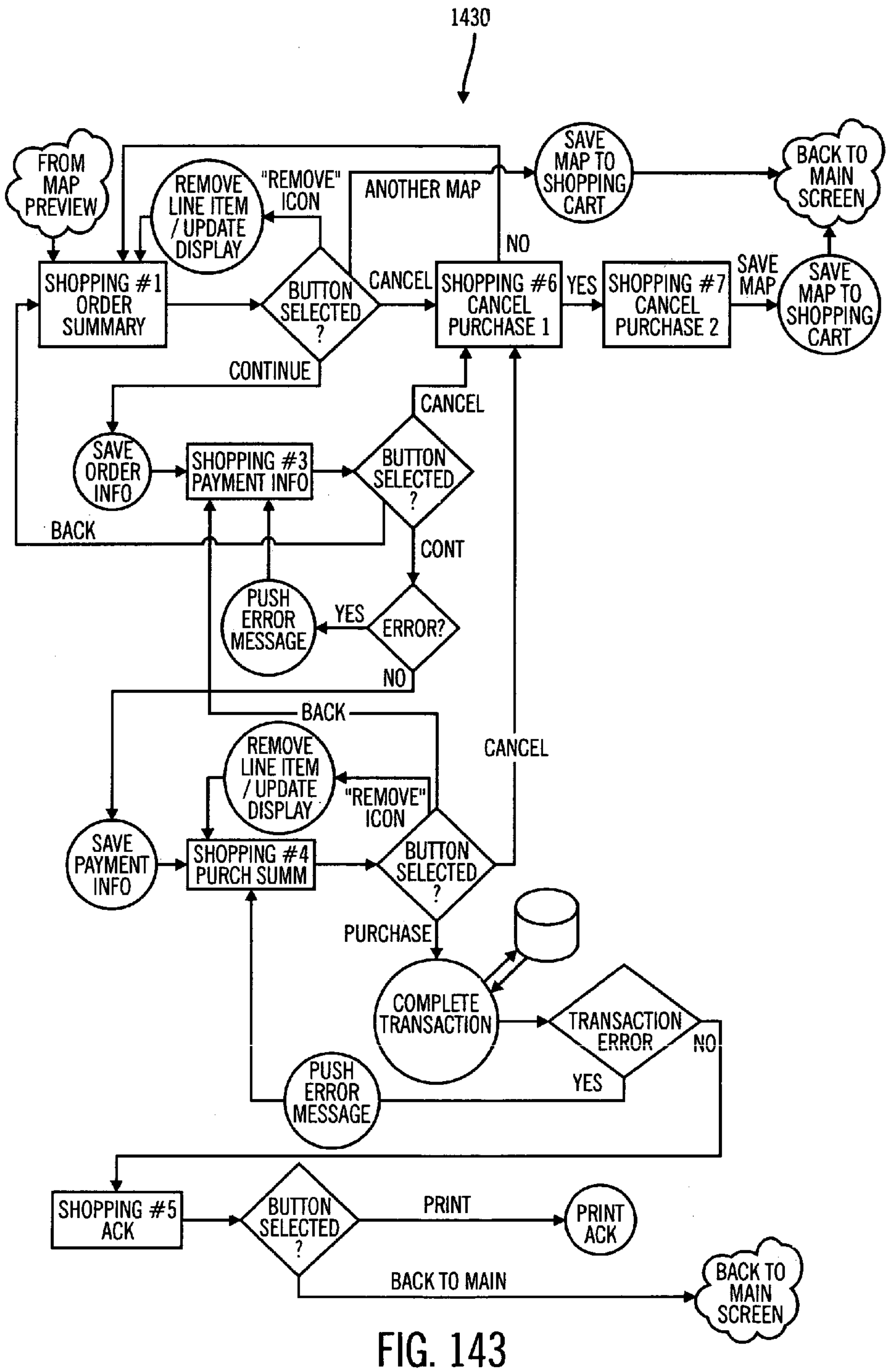

FIG. 143 illustrates logic for entering the shopping cart from the create map functionality in accordance with certain implementations of the invention.

Figure 144:
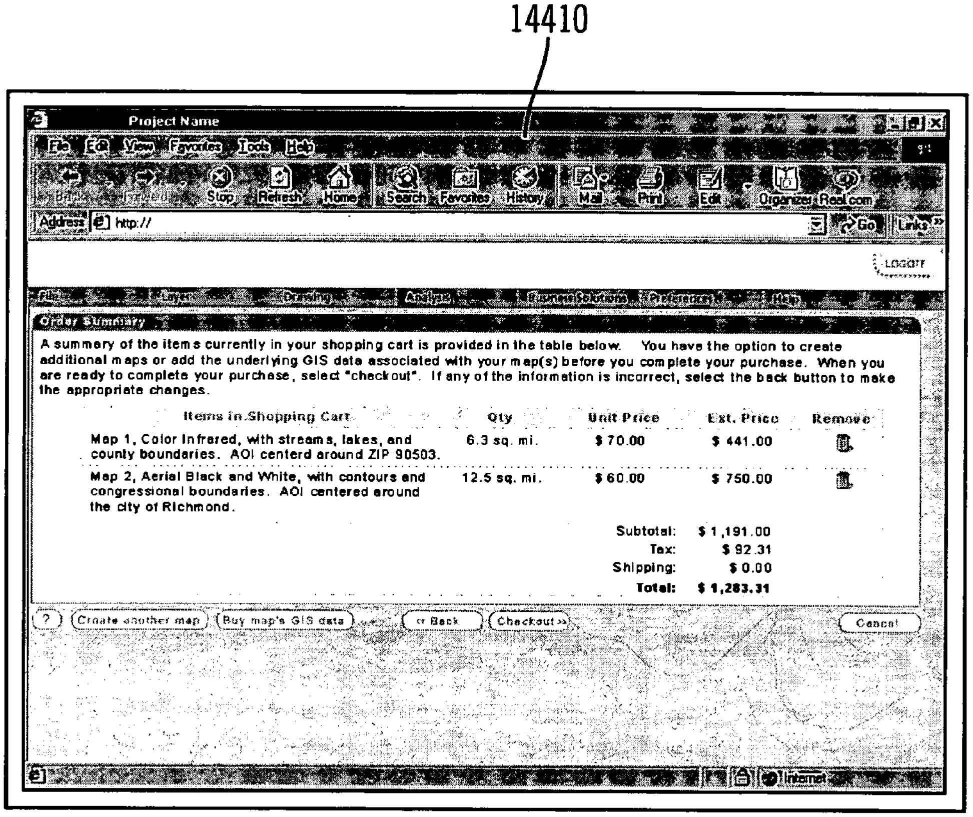

FIG. 144 illustrates a first Map Shopping UI screen with Order Summary in accordance with certain implementations of the invention.

Figure 145:
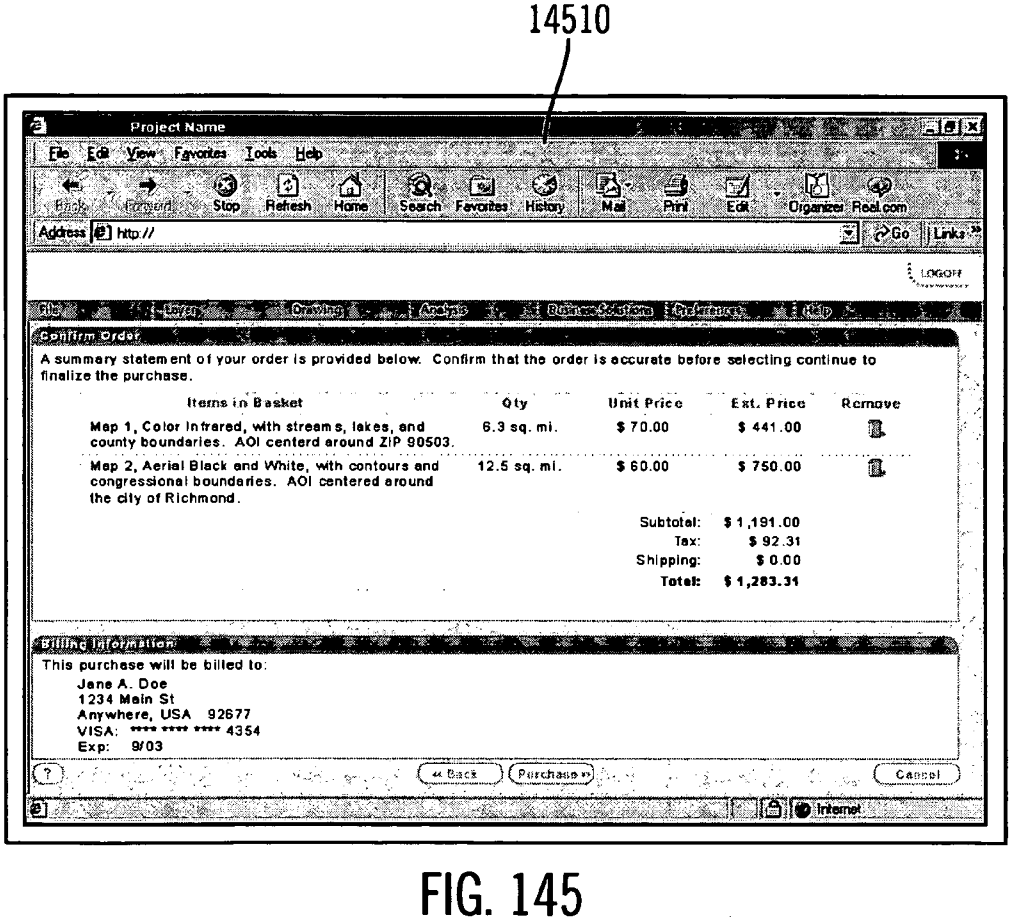

FIG. 145 illustrates a second Map Shopping UI screen with Purchase Summary in accordance with certain implementations of the invention.

Figure 146:
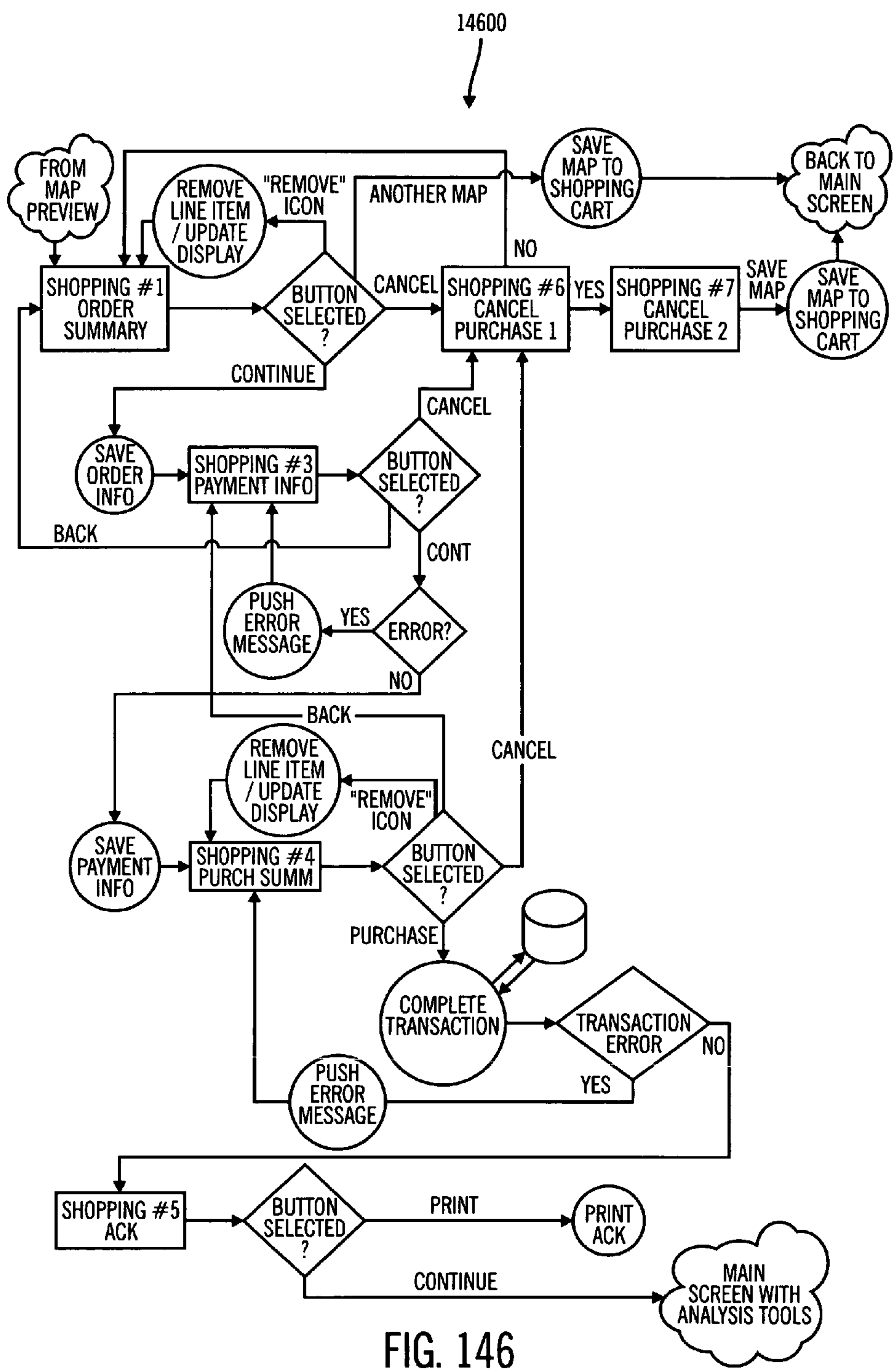

FIG. 146 illustrates logic for entering the shopping cart by selecting analysis form the main UI screen in accordance with certain implementations of the invention.

Figure 147:
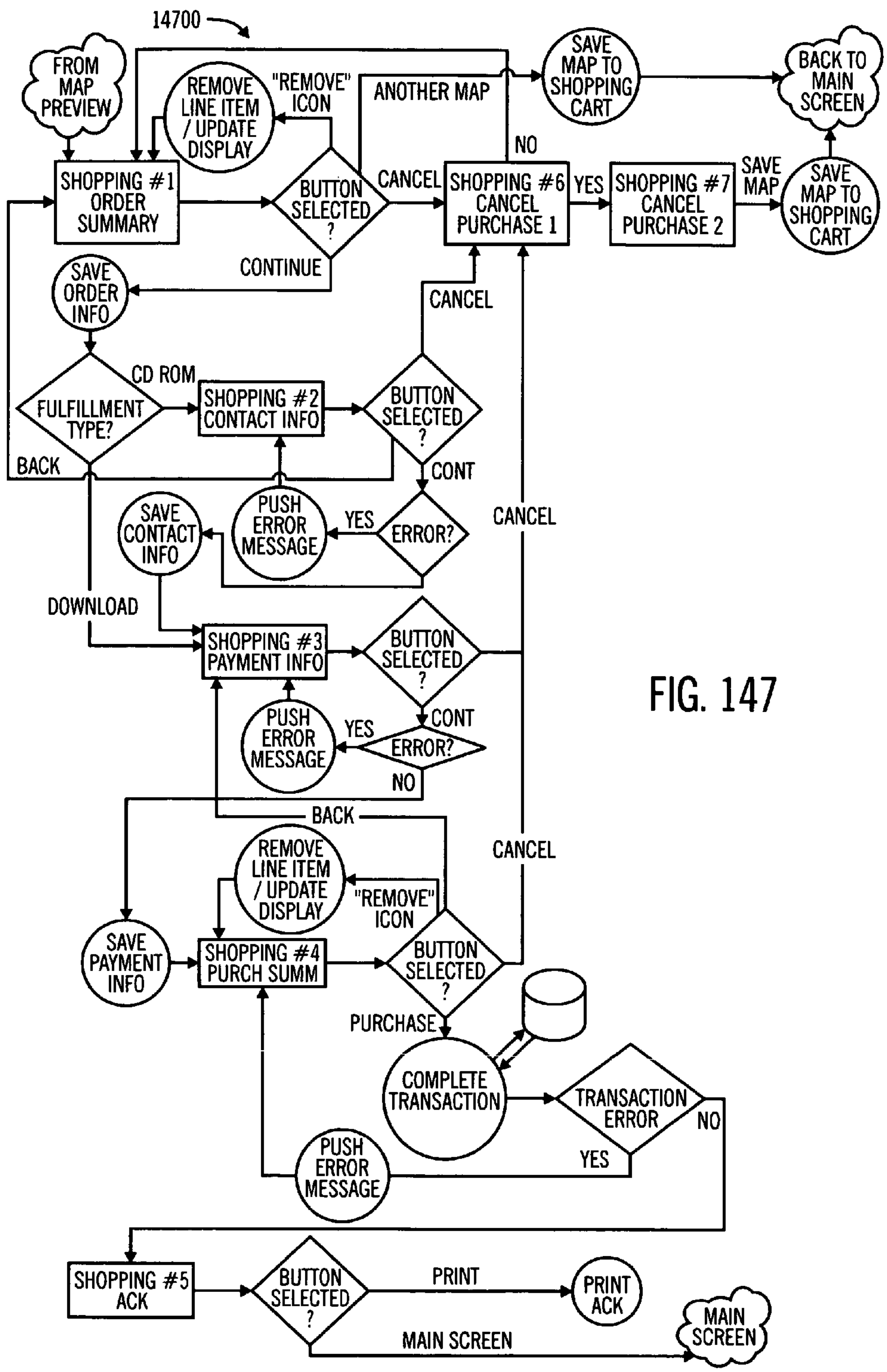

FIG. 147 illustrates logic for shopping cart functionality when the user enters the shopping cart from the data purchase UI screens in accordance with certain implementations of the invention.

Figure 148:
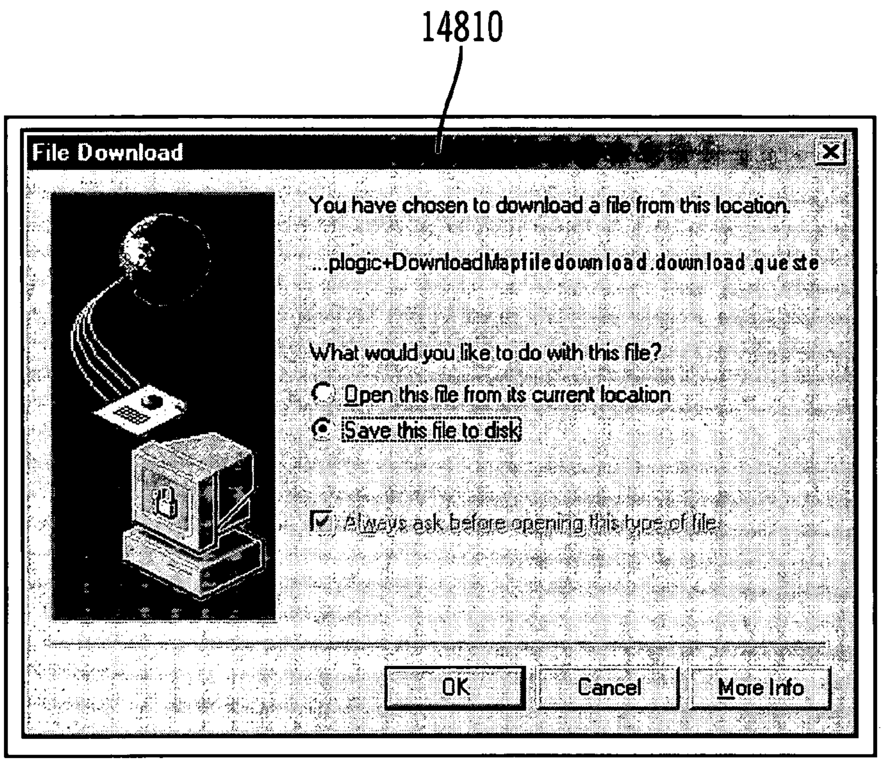

FIG. 148 illustrates a download dialog box in accordance with certain implementations of the invention.

Figure 149:
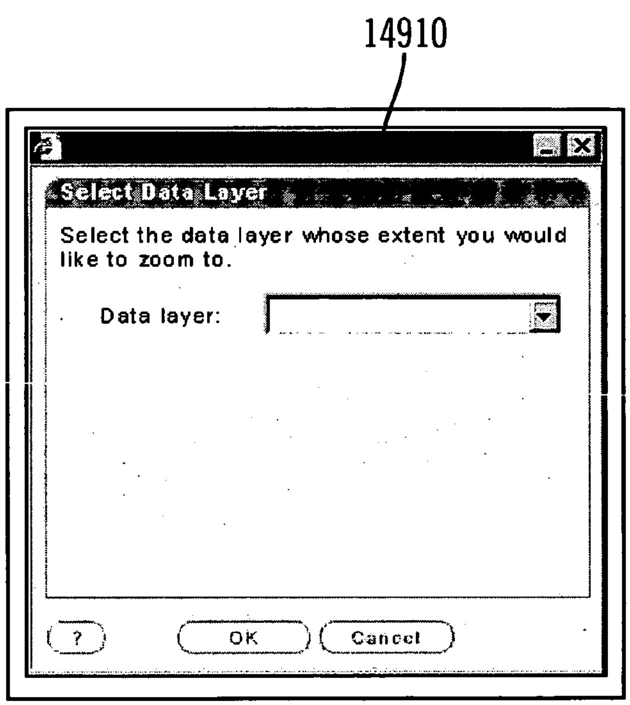

FIG. 149 illustrates a Zoom layer pop up dialog box in accordance with certain implementations of the invention.

Figure 150:
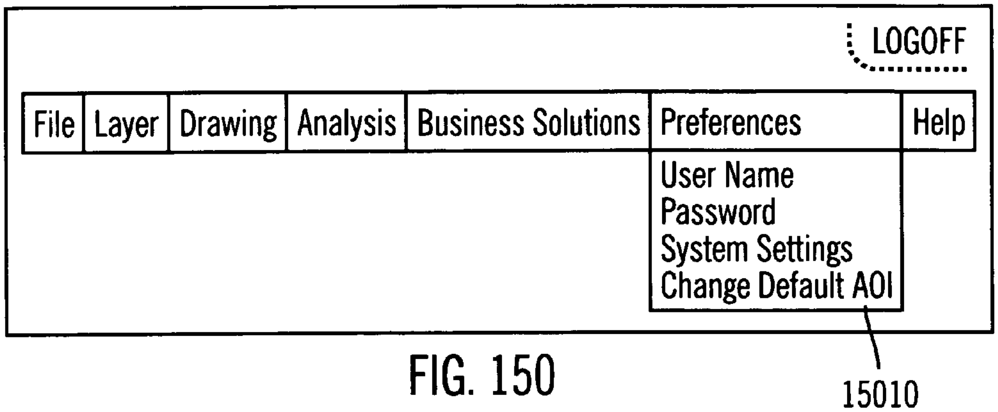

FIG. 150 illustrates selection of the Preferences menu in accordance with certain implementations of the invention.

Figure 151:
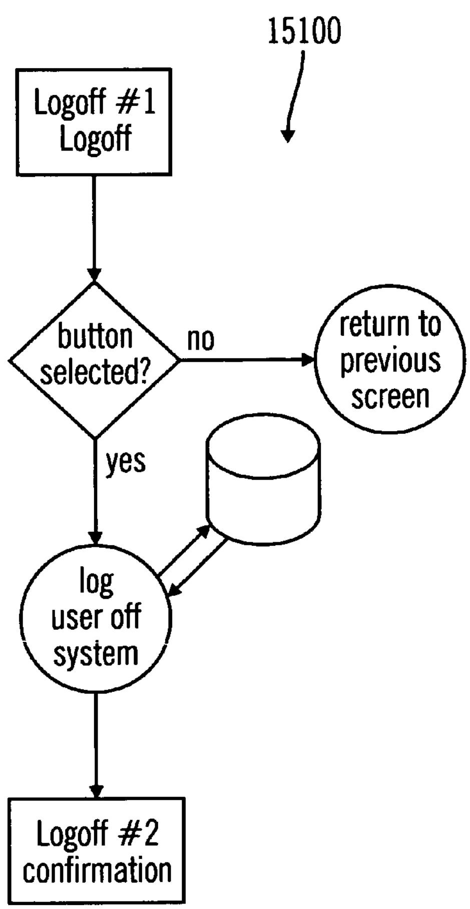

FIG. 151 illustrates logic for processing a logoff in accordance with certain implementations of the invention.

Figure 152:
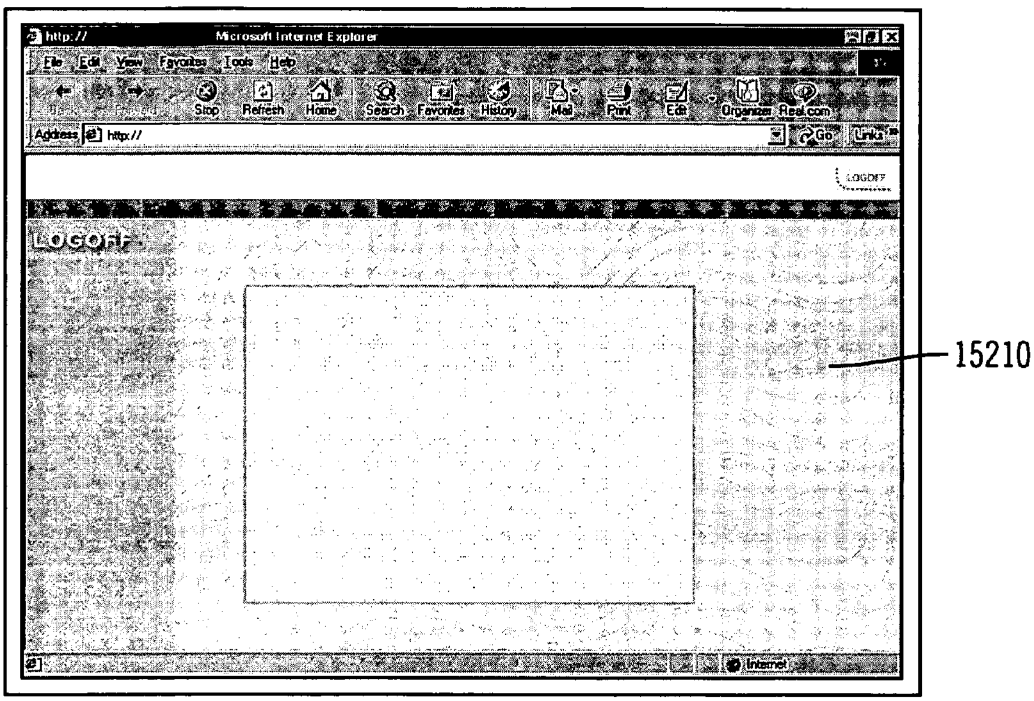

FIG. 152 illustrates common Logoff UI screen elements in accordance with certain implementations of the invention.

Figure 153:
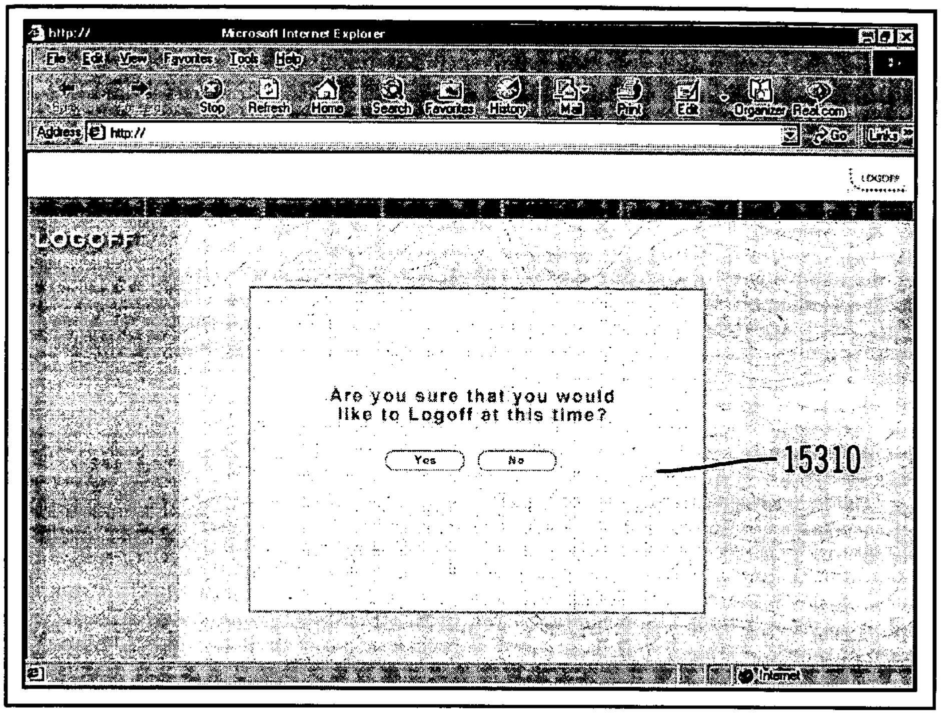

FIG. 153 illustrates a first Logoff UI screen in accordance with certain implementations of the invention.

Figure 154:
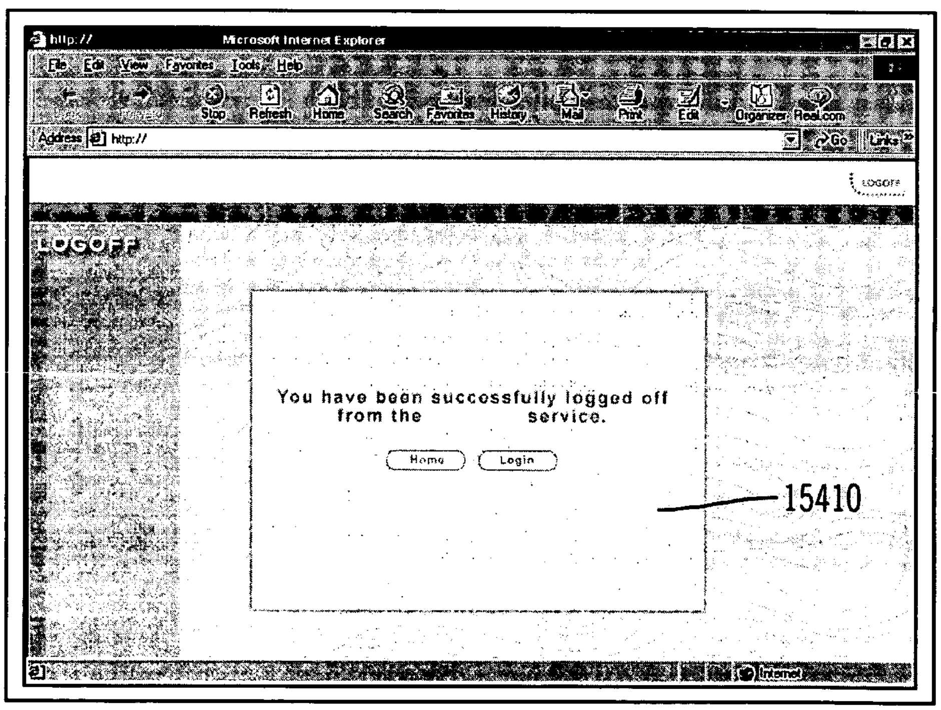

FIG. 154 illustrates a Logoff Confirmation UI screen in accordance with certain implementations of the invention.

Figure 155:
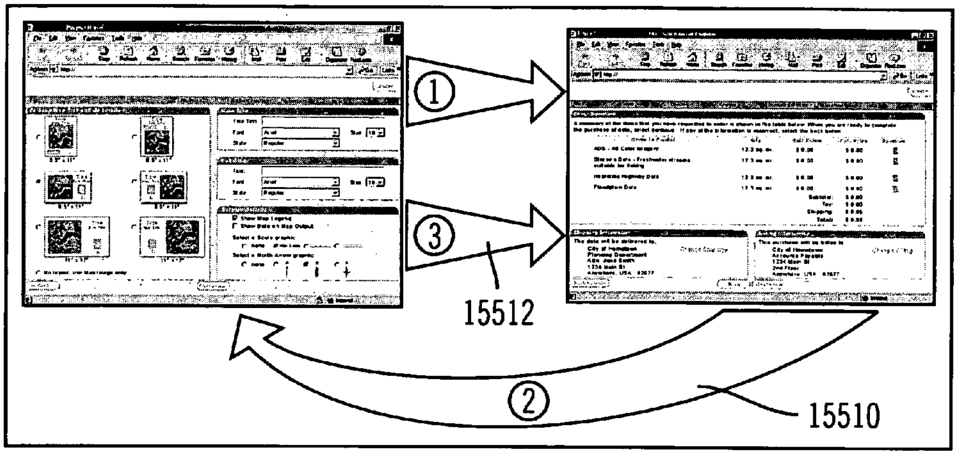

FIG. 155 illustrates navigation using the Back button and using the continue button in accordance with certain implementations of the invention.

Figure 156:
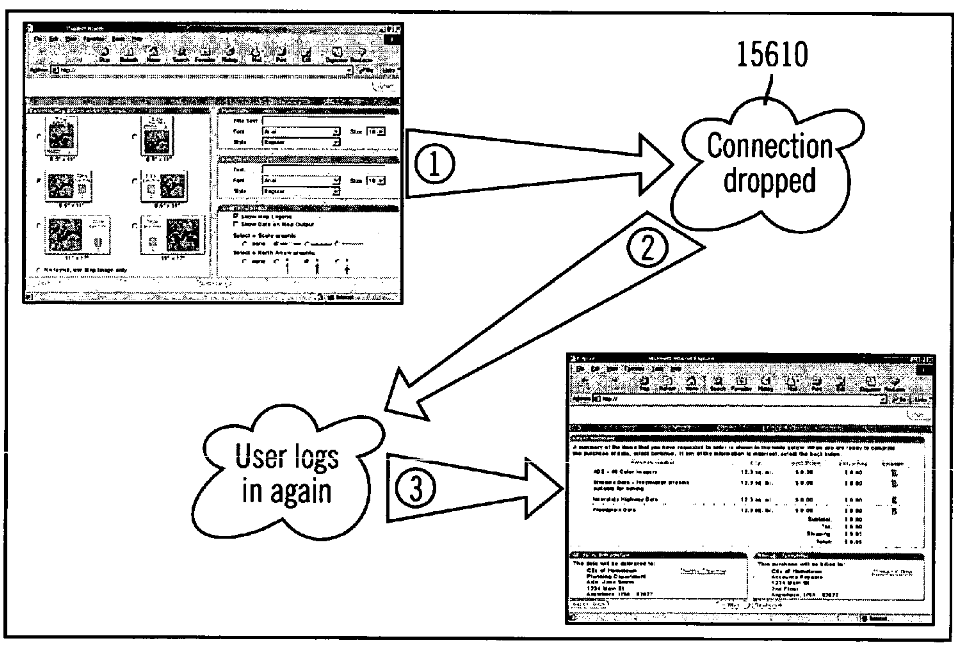

FIG. 156 illustrates processing when there is a dropped connection in accordance with certain implementations of the invention.

Figure 157:
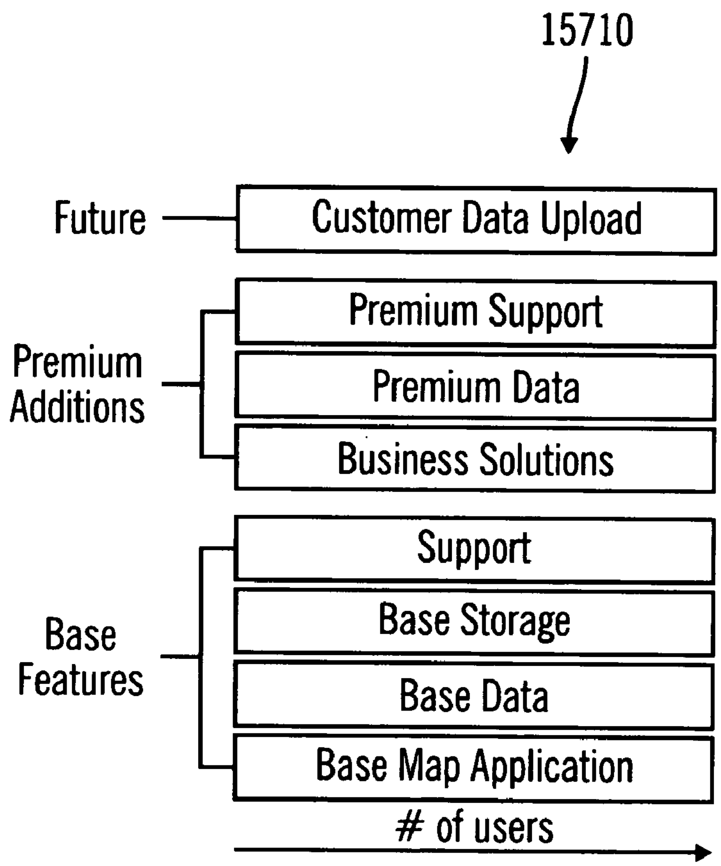

FIG. 157 illustrates a structure that shows variables that are involved in the pricing structure in accordance with certain implementations of the invention.

Figure 158:
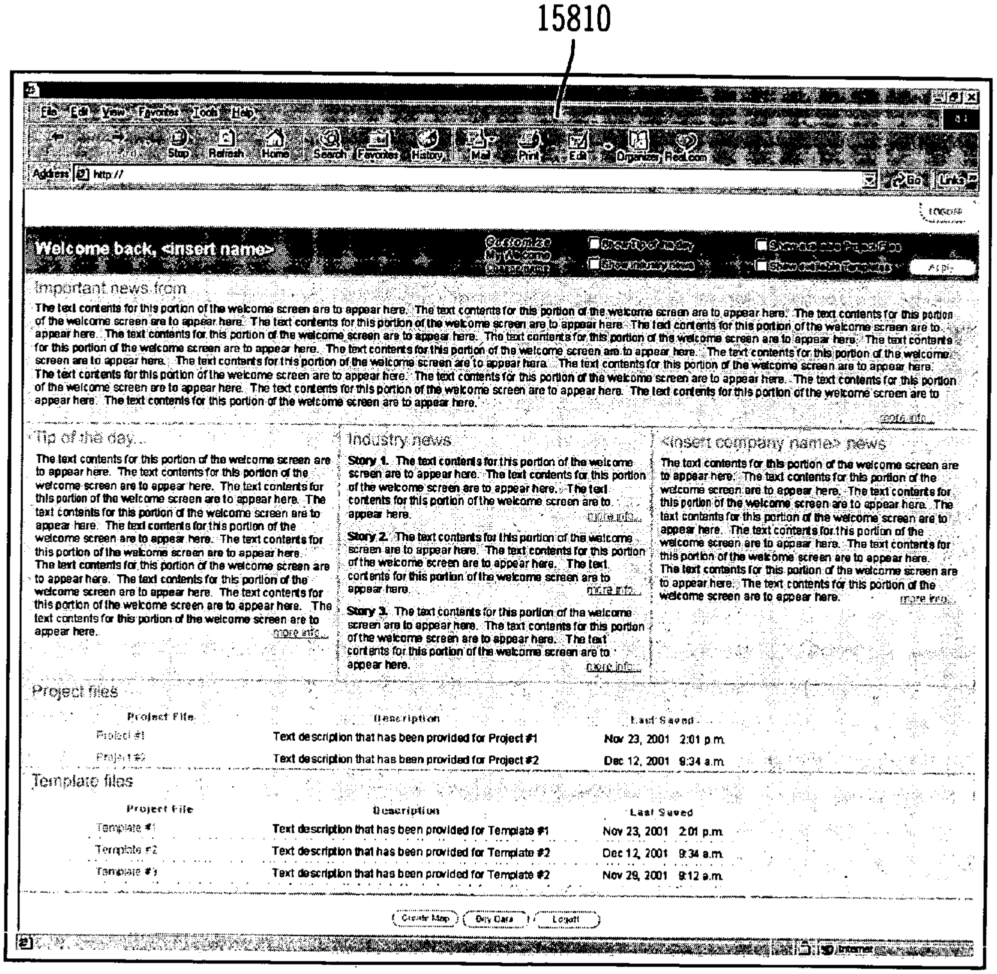

FIG. 158 illustrates co-branding for a welcome UI screen in accordance with certain implementations of the invention.

Figure 159:
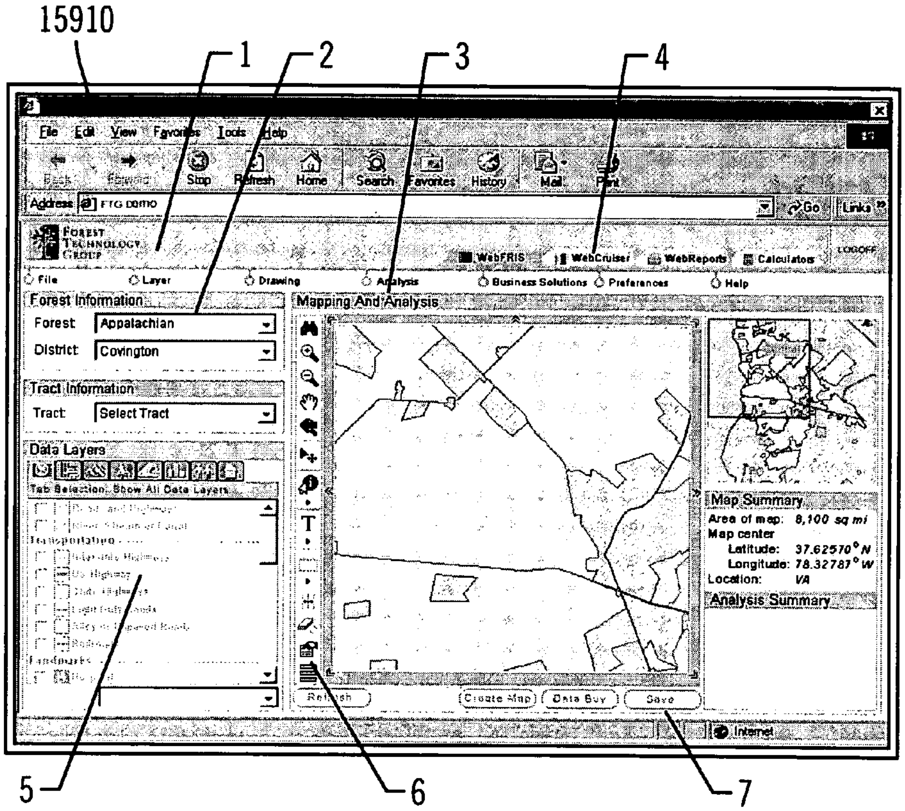

FIG. 159 illustrates an example of a co-branded version of the main UI screen in accordance with certain implementations of the invention.

Figure 160:
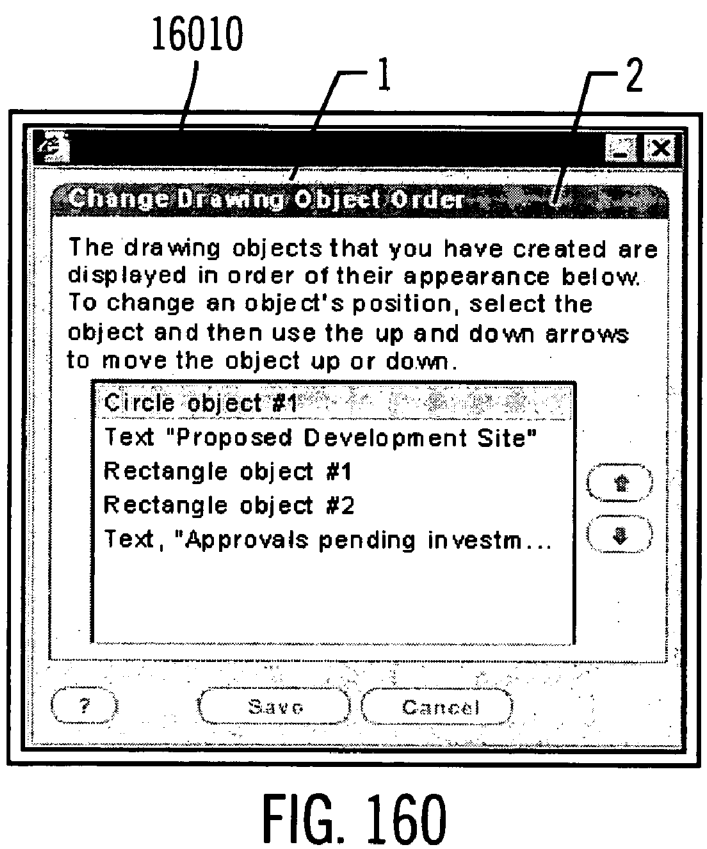
Figure 161:
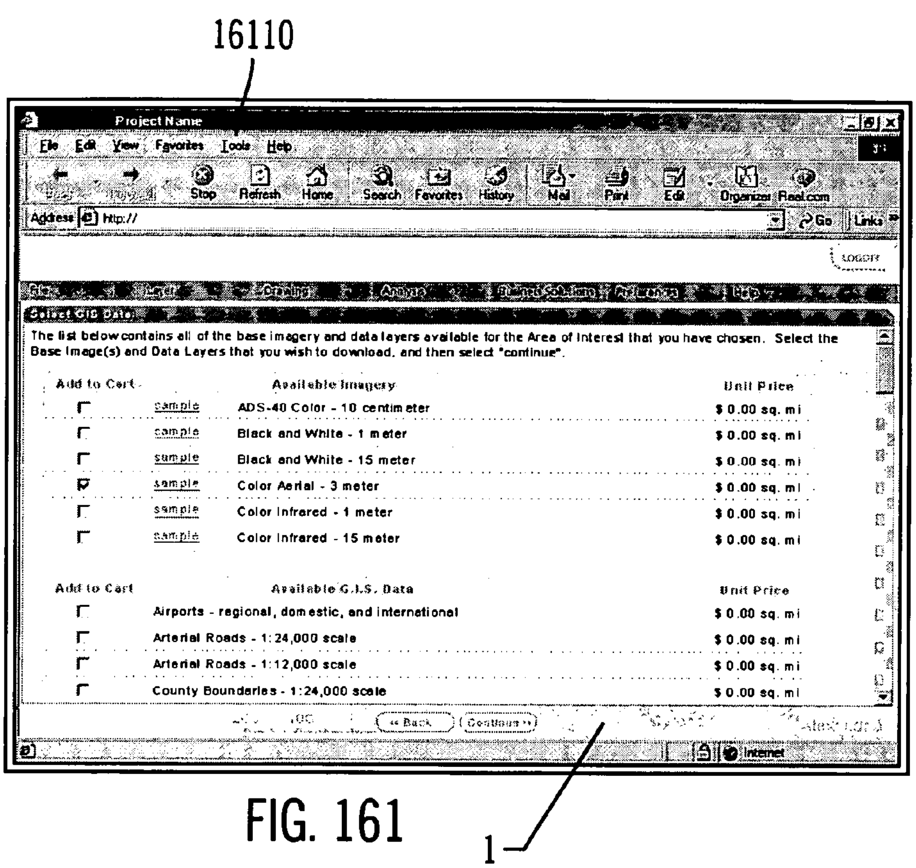

FIGS. 160 and 161 illustrate examples of a pop up dialog box and of a co-branded version of a secondary UI screen in accordance with certain implementations of the invention.

FIG. 162 illustrates a table of valid US state codes in accordance with certain implementations of the invention.

FIG. 163 illustrates a table of information to display in the Ambiguous Address pop up dialog box in accordance with certain implementations of the invention.

FIG. 164 illustrates a table of map layers of scale dependency in accordance with certain implementations of the invention.

FIG. 165 illustrates a table of some raster and vector data to be used in the enterprise spatial system software in accordance with certain implementations of the invention.

FIGS. 166A–166B illustrate another table of some raster and vector data to be used in the enterprise spatial system software in accordance with certain implementations of the invention.

Figure 167:
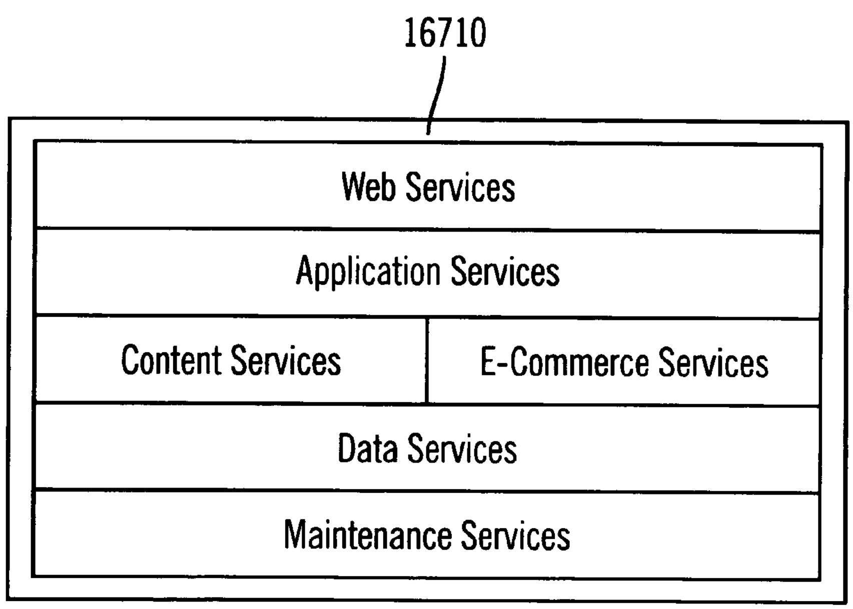

FIG. 167 illustrates the business process and data flow supported by the enterprise spatial system service and operational facilities in accordance with certain implementations of the invention.

Figure 168:
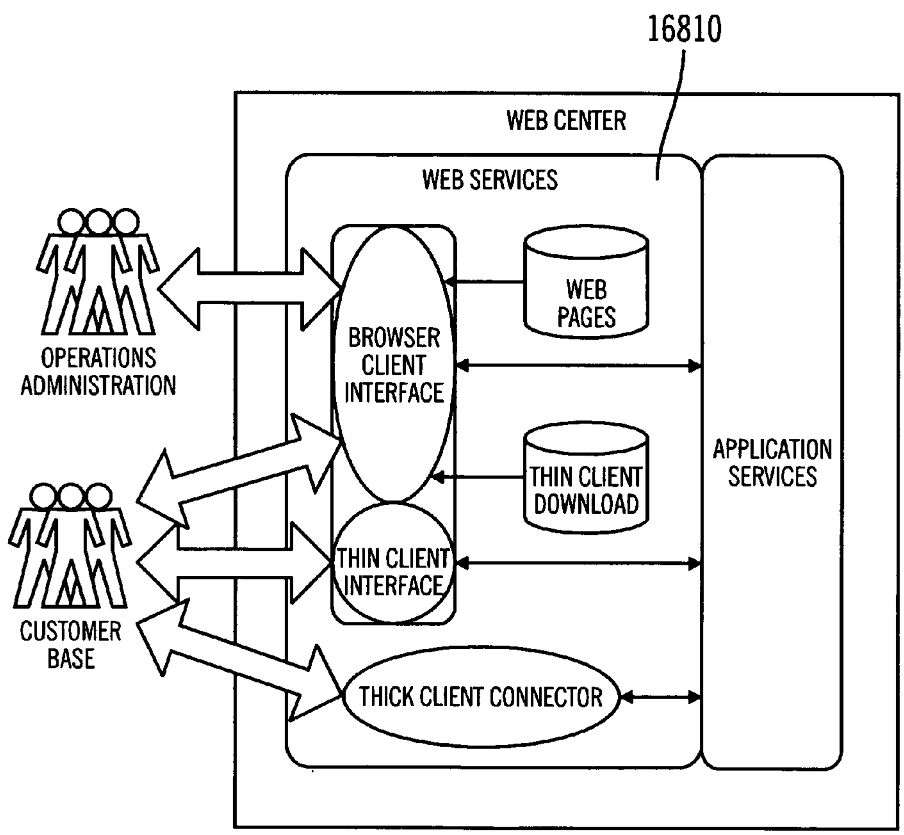

FIG. 168 illustrates Web Services in accordance with certain implementations of the invention.

Figure 169:
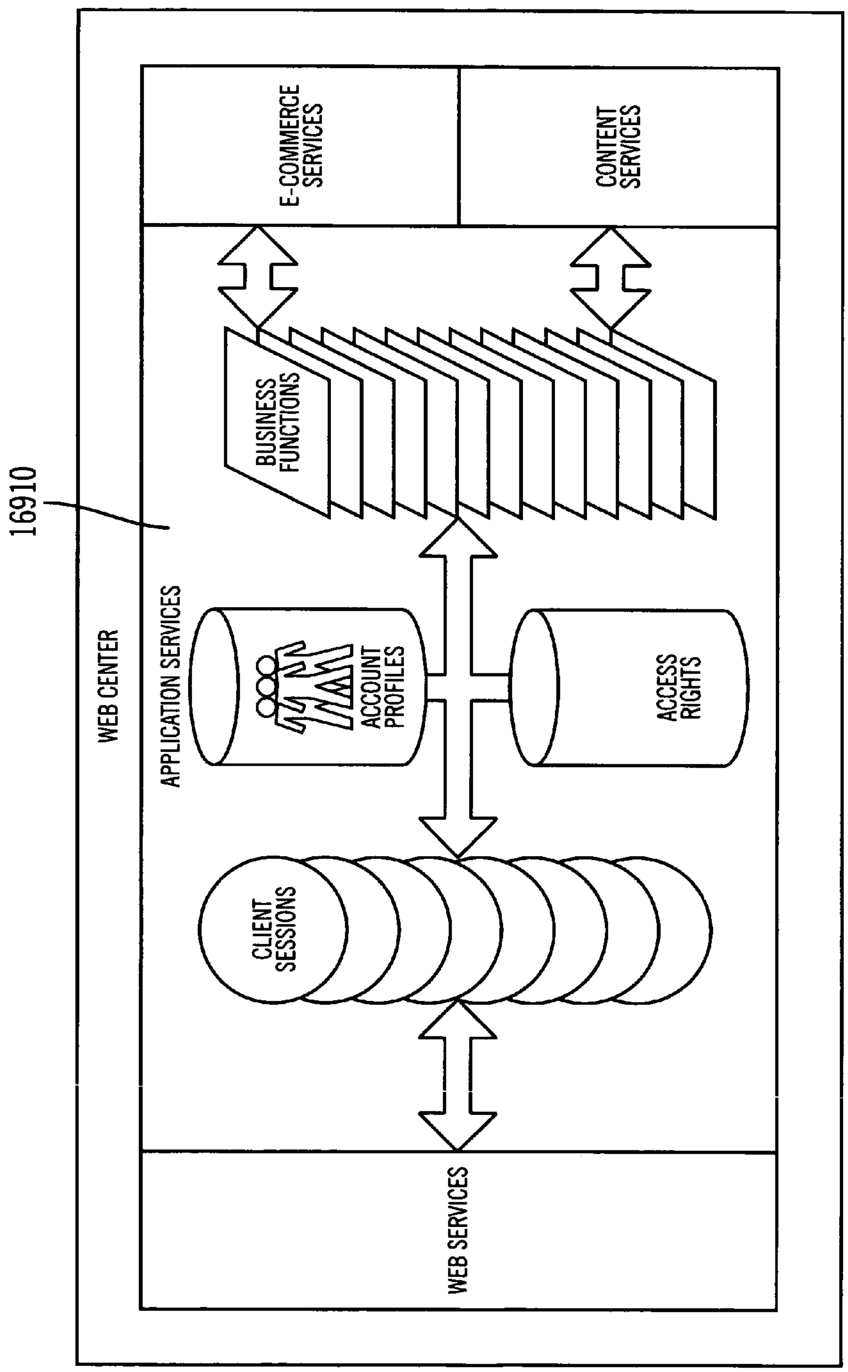

FIG. 169 illustrates an application services overview in accordance with certain implementations of the invention.

Figure 170:
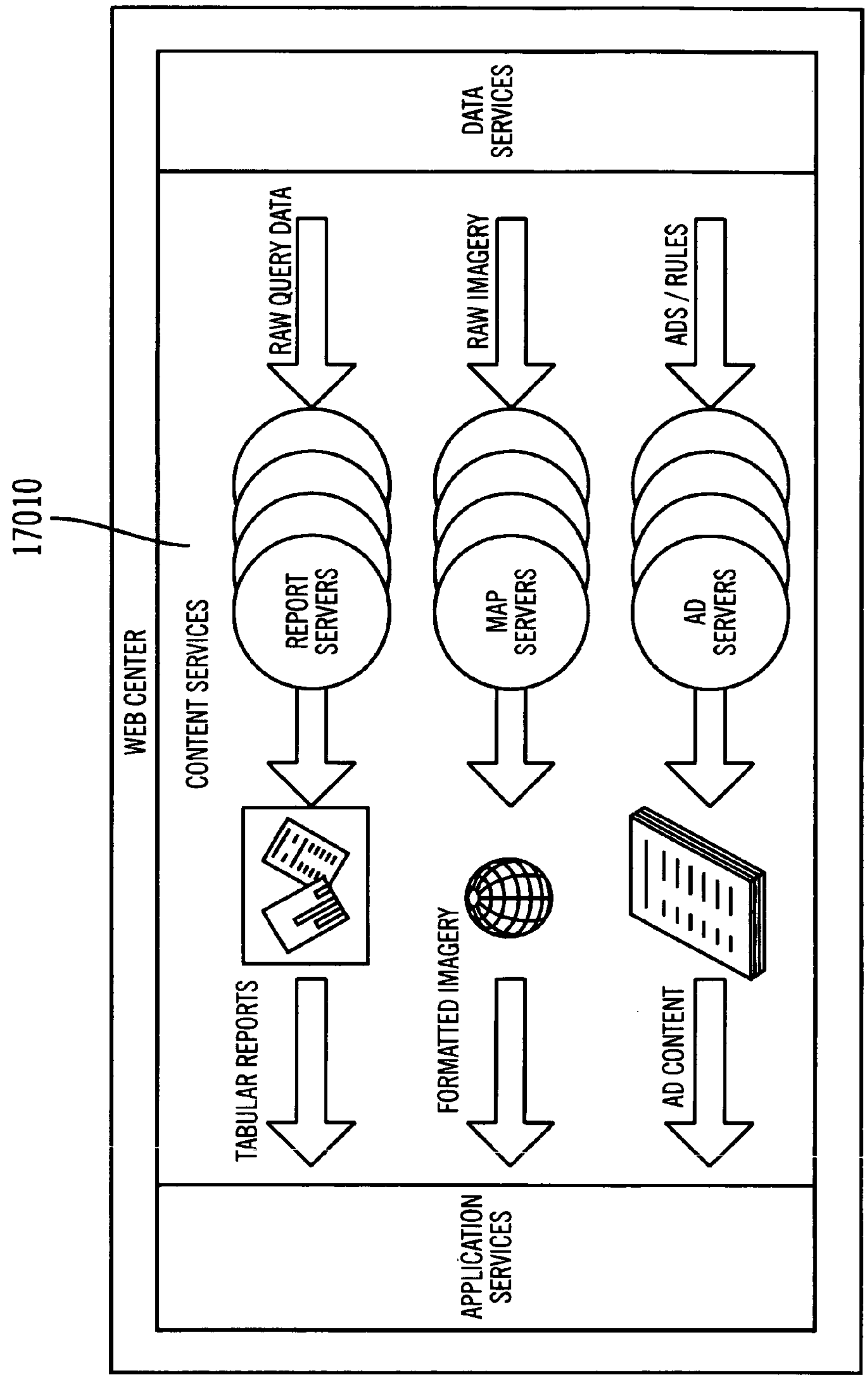

FIG. 170 illustrates content services in accordance with certain implementations of the invention.

Figure 171:
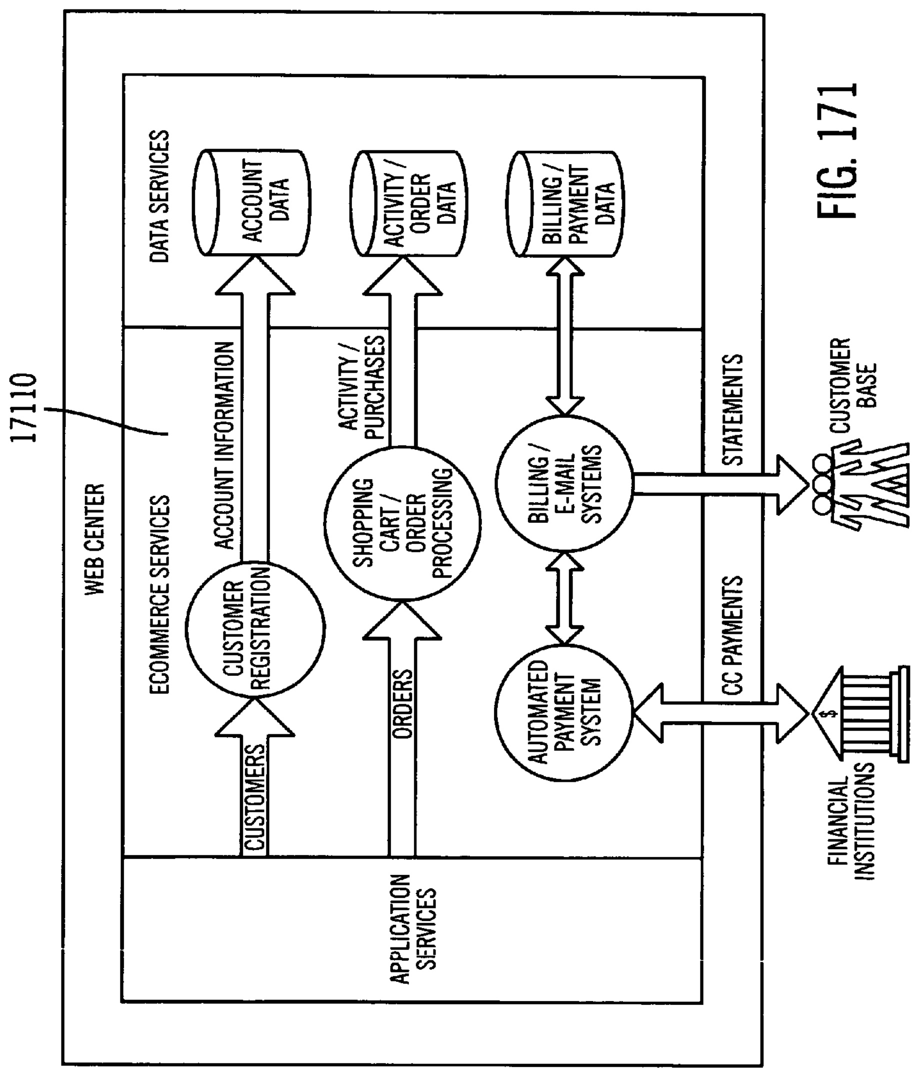

FIG. 171 illustrates e-commerce services in accordance with certain implementations of the invention.

Figure 172:
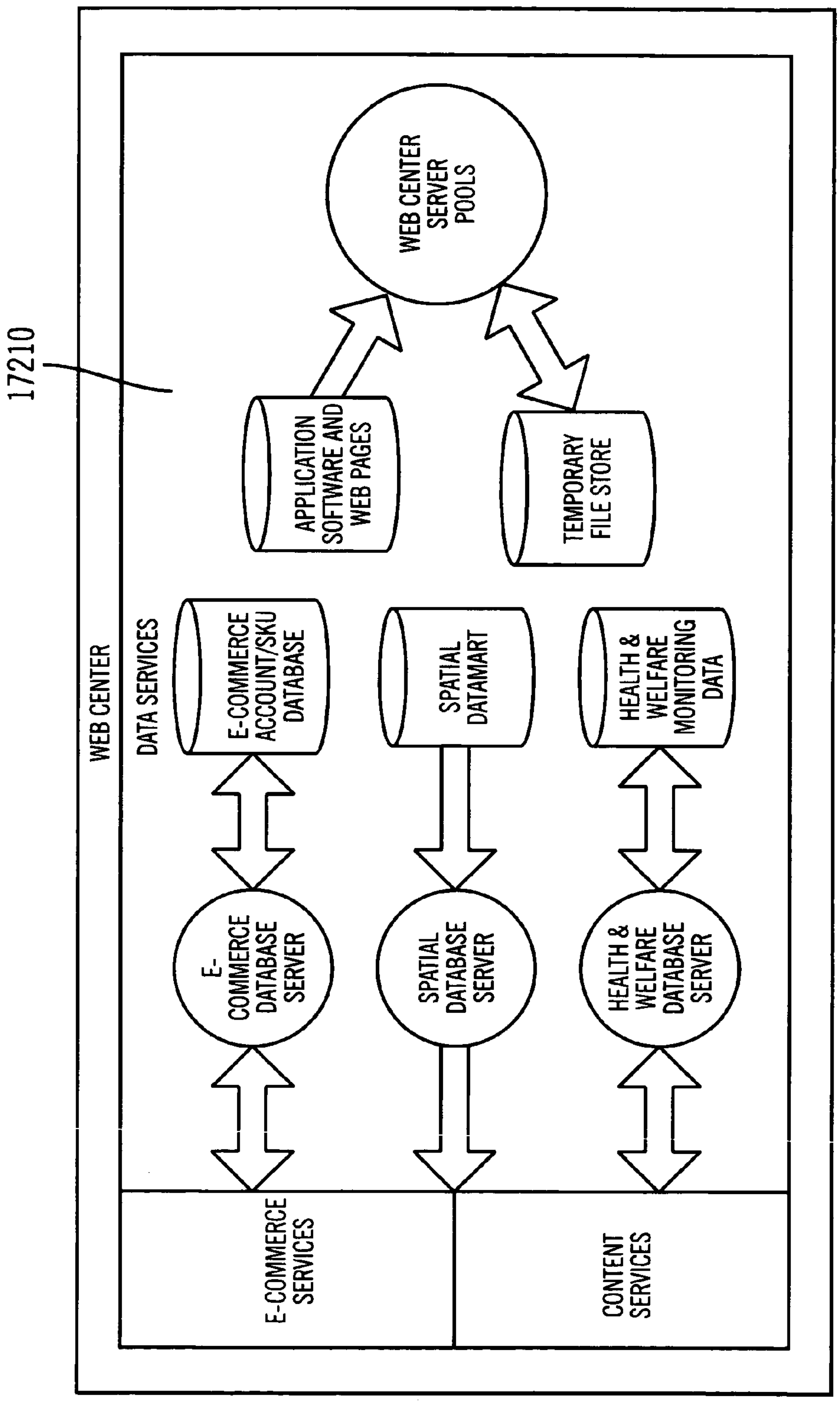

FIG. 172 illustrates data services in accordance with certain implementations of the invention.

Figure 173:
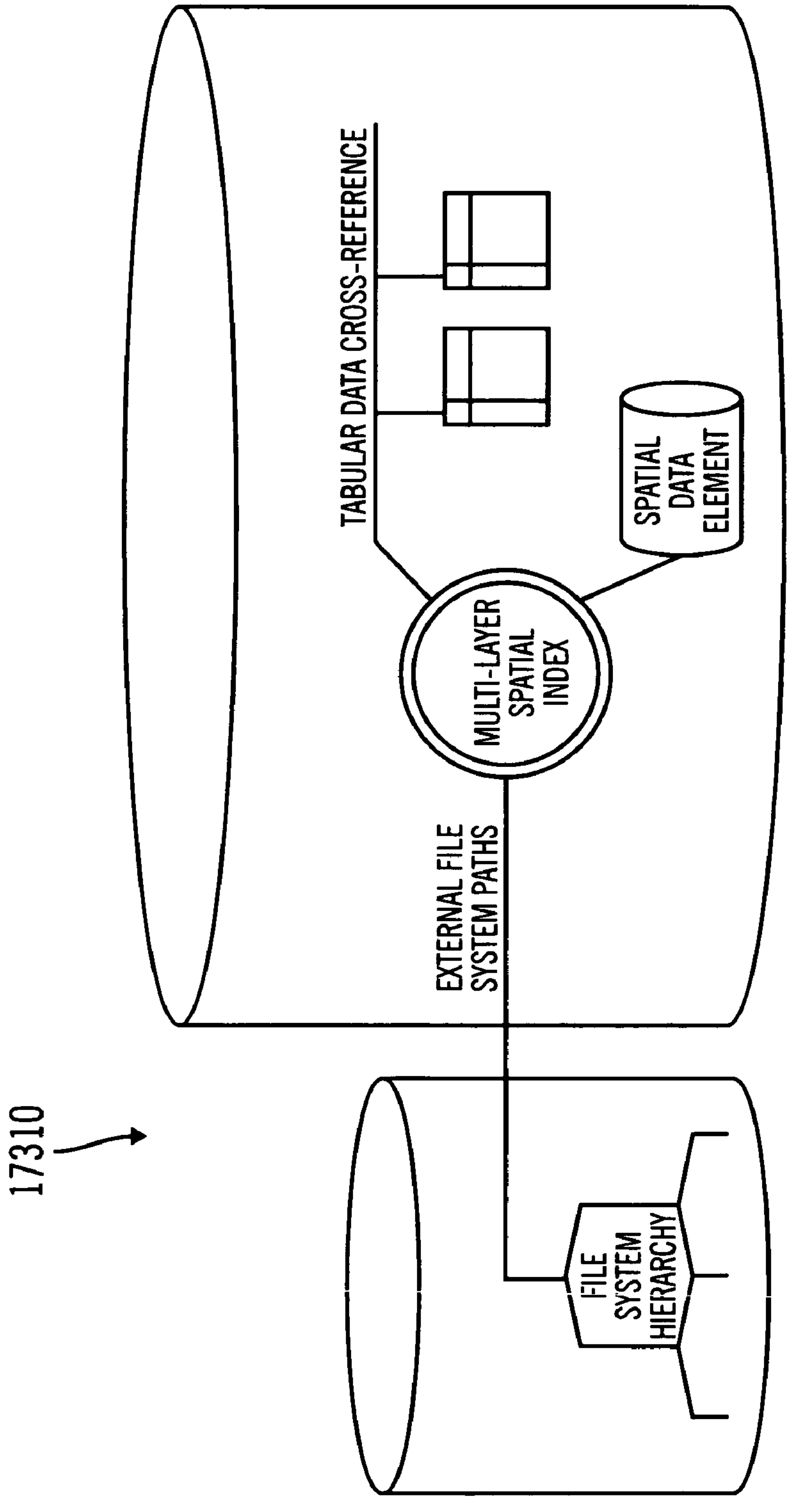

FIG. 173 illustrates a spatial datamart in accordance certain implementations of the invention.

Figure 174:
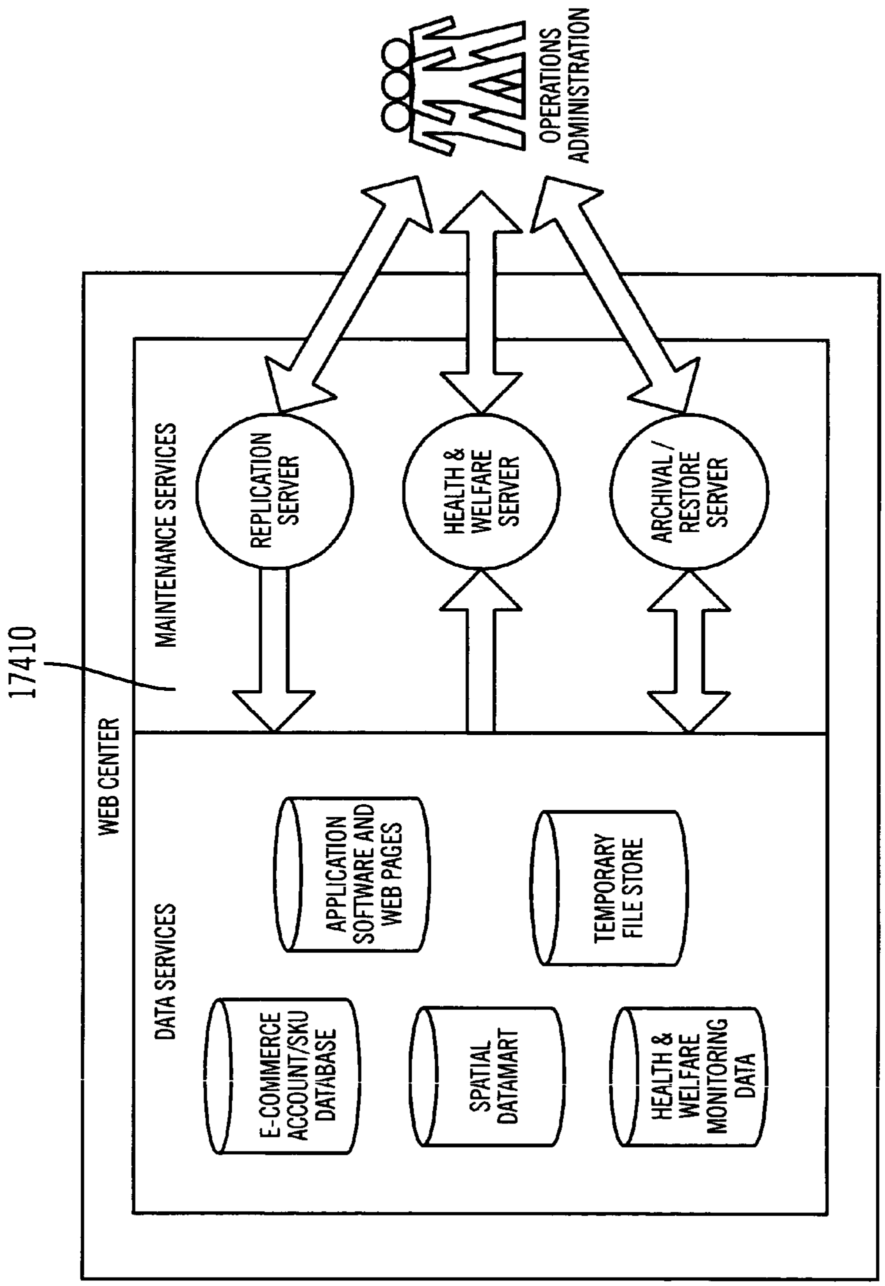

FIG. 174 illustrates maintenance services in accordance with certain implementations of the invention.

Figure 175:
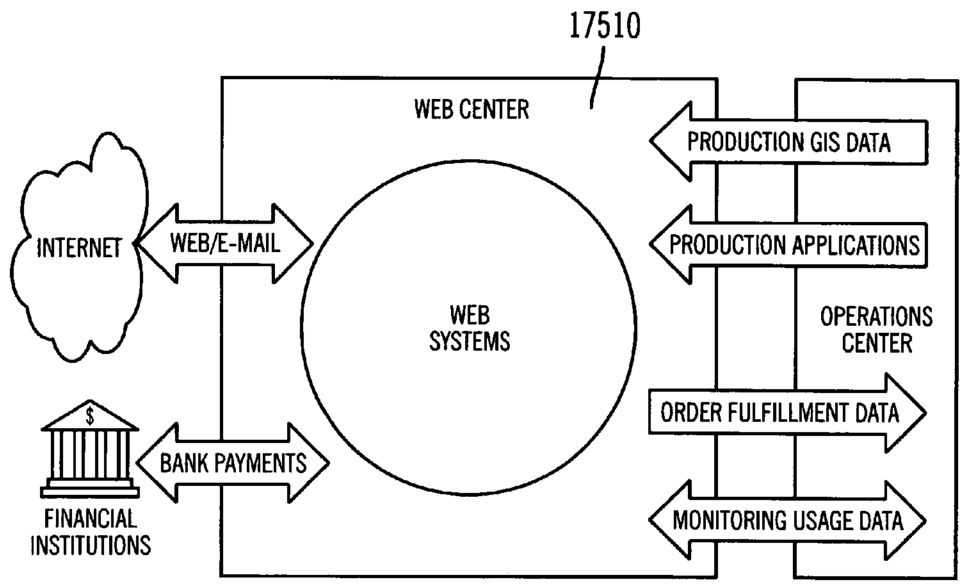

FIG. 175 illustrates operational dataflow for a Web Center in accordance with certain implementations of the invention.

Figure 176:
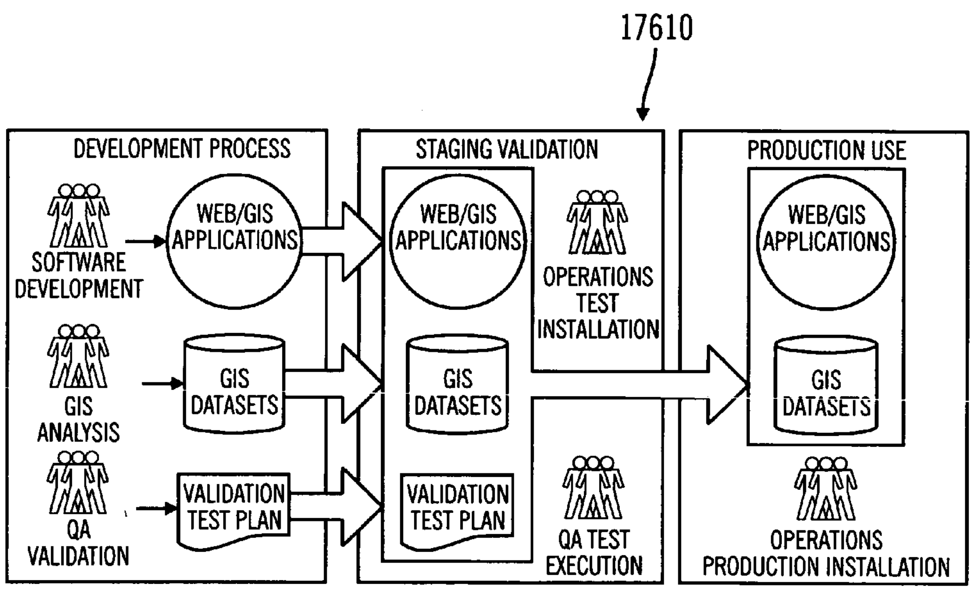

FIG. 176 illustrates a deployment process workflow in accordance with certain implementations of the invention.

Figure 177:
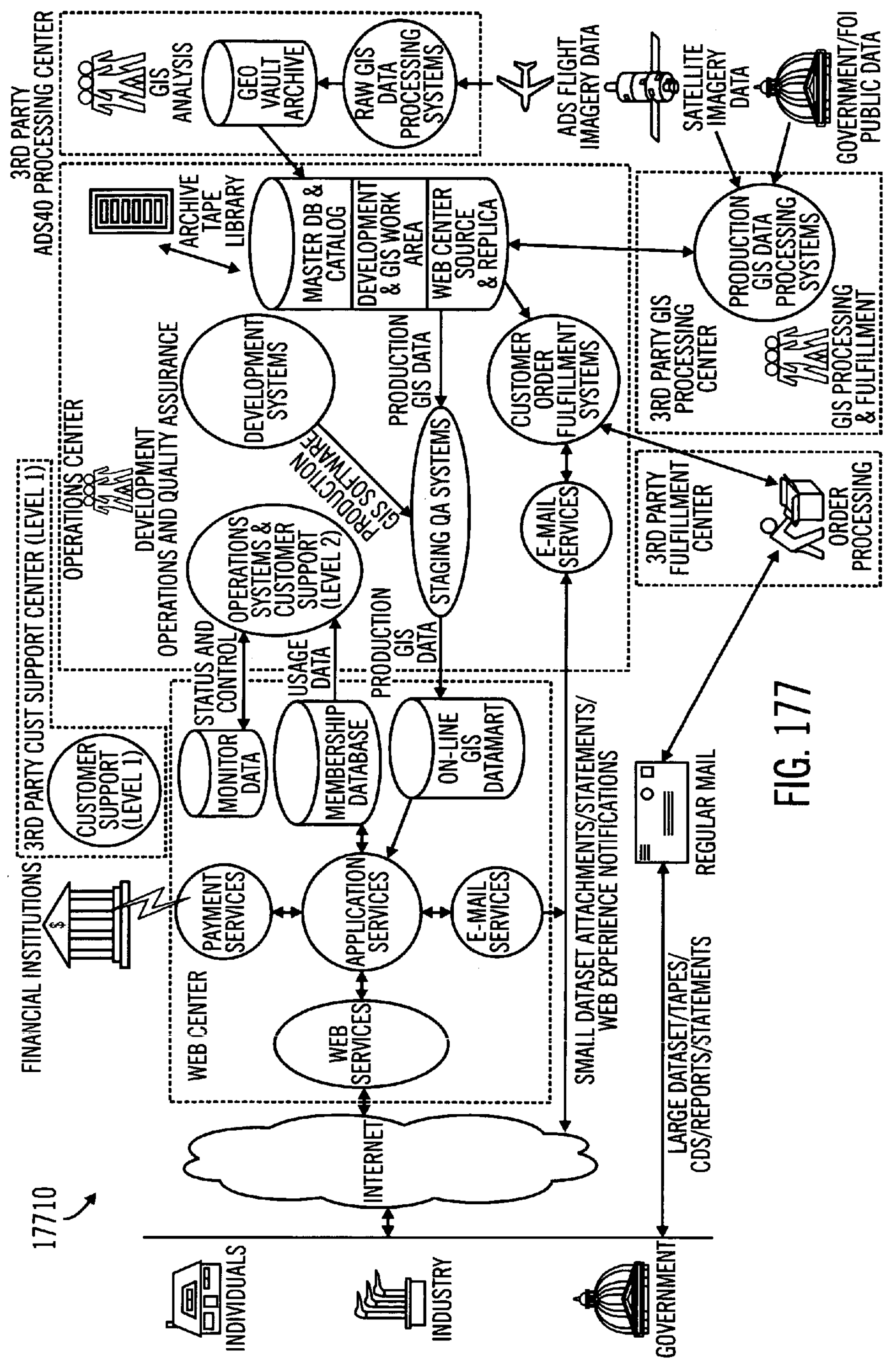

FIG. 177 illustrates data flow in accordance with certain implementations of the invention.

Figure 178:
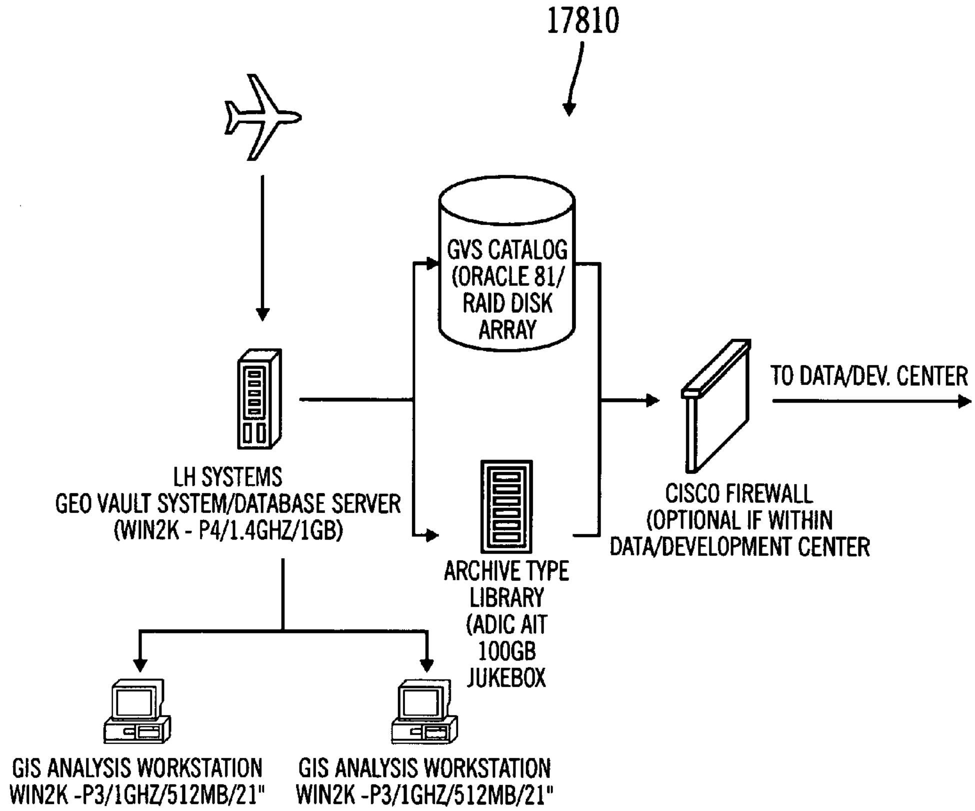

FIG. 178 illustrates an ADS40 center architecture in accordance with certain implementations of the invention.

Figure 179:
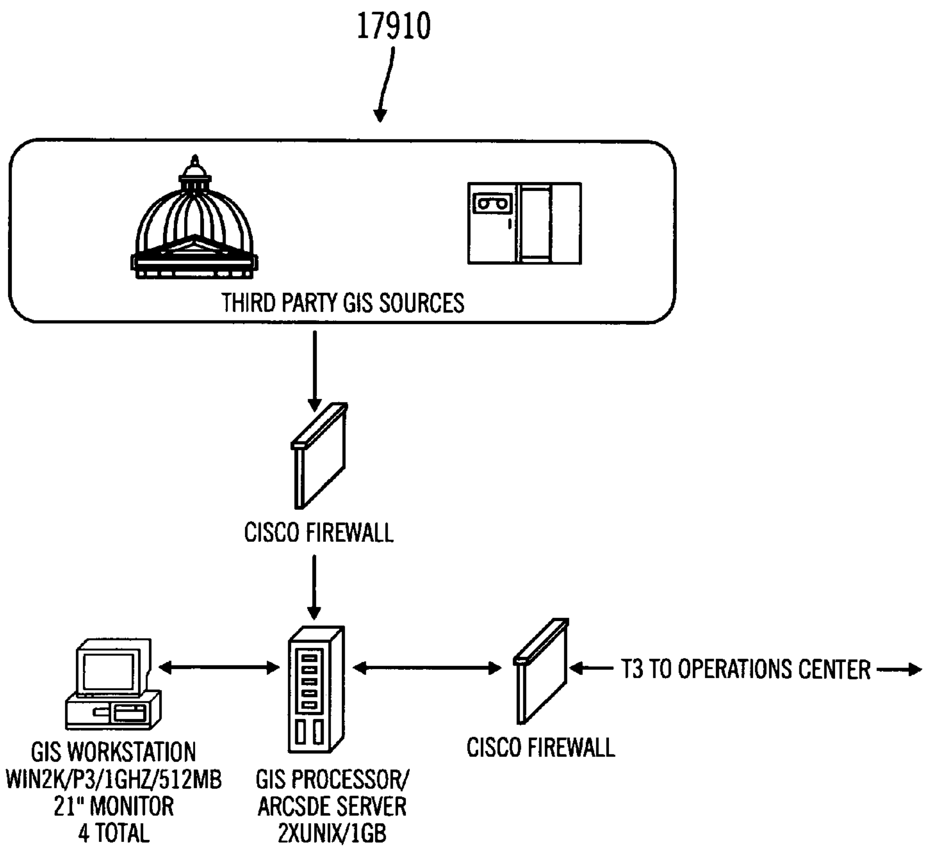

FIG. 179 illustrates a GIS processing center in accordance with certain implementations of the invention.

Figure 180:
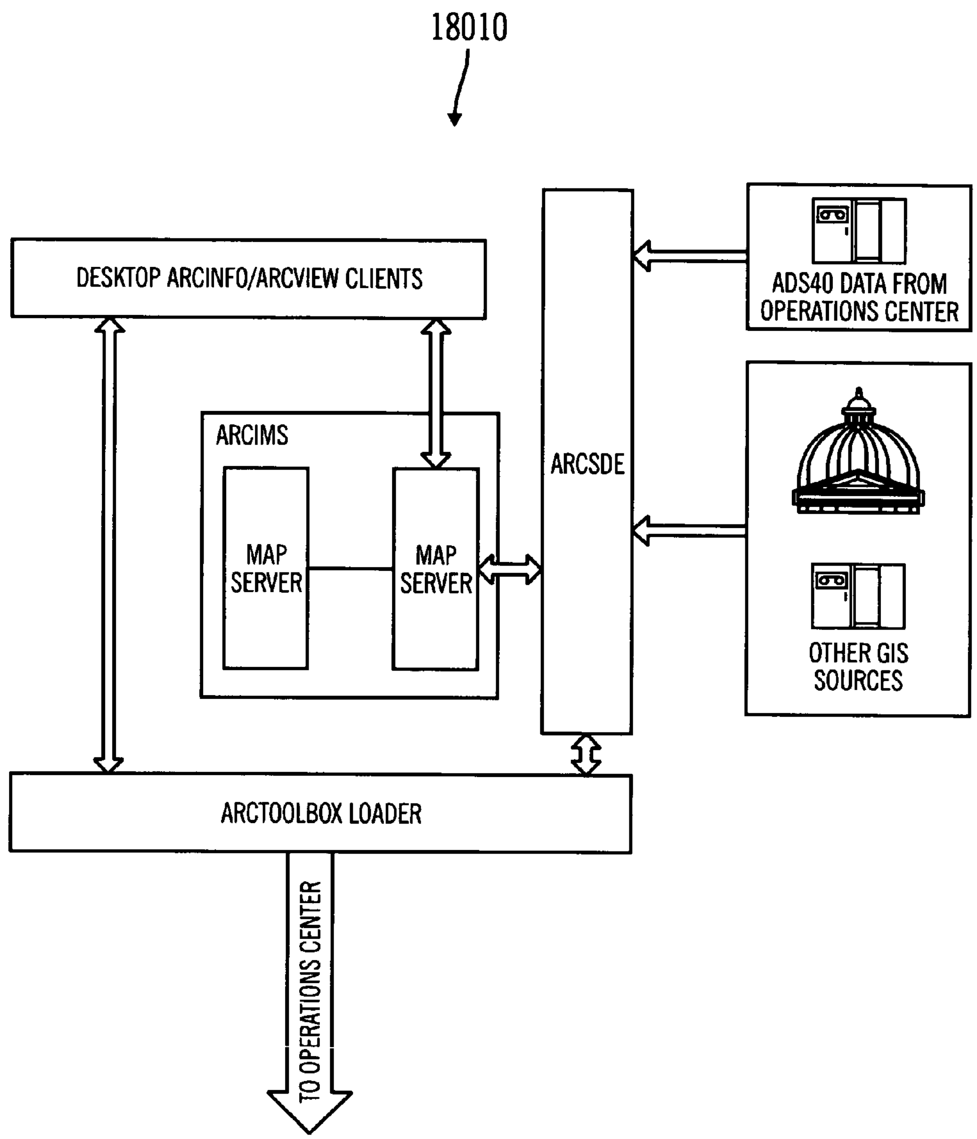

FIG. 180 illustrates a GIS processing component architecture in accordance with certain implementations of the invention.

Figure 181:
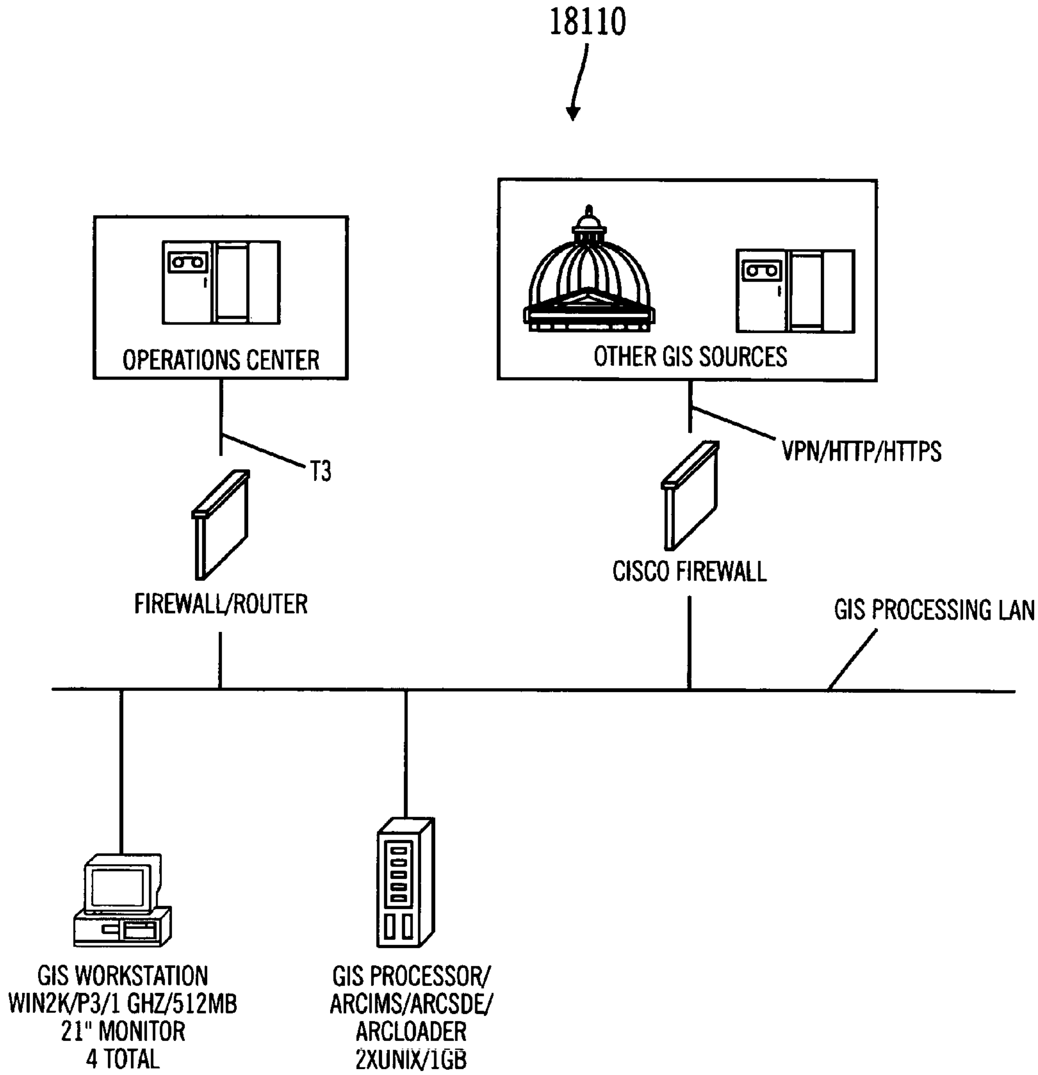

FIG. 181 illustrates a GIS processing network in accordance with certain implementations of the invention.

Figure 182:
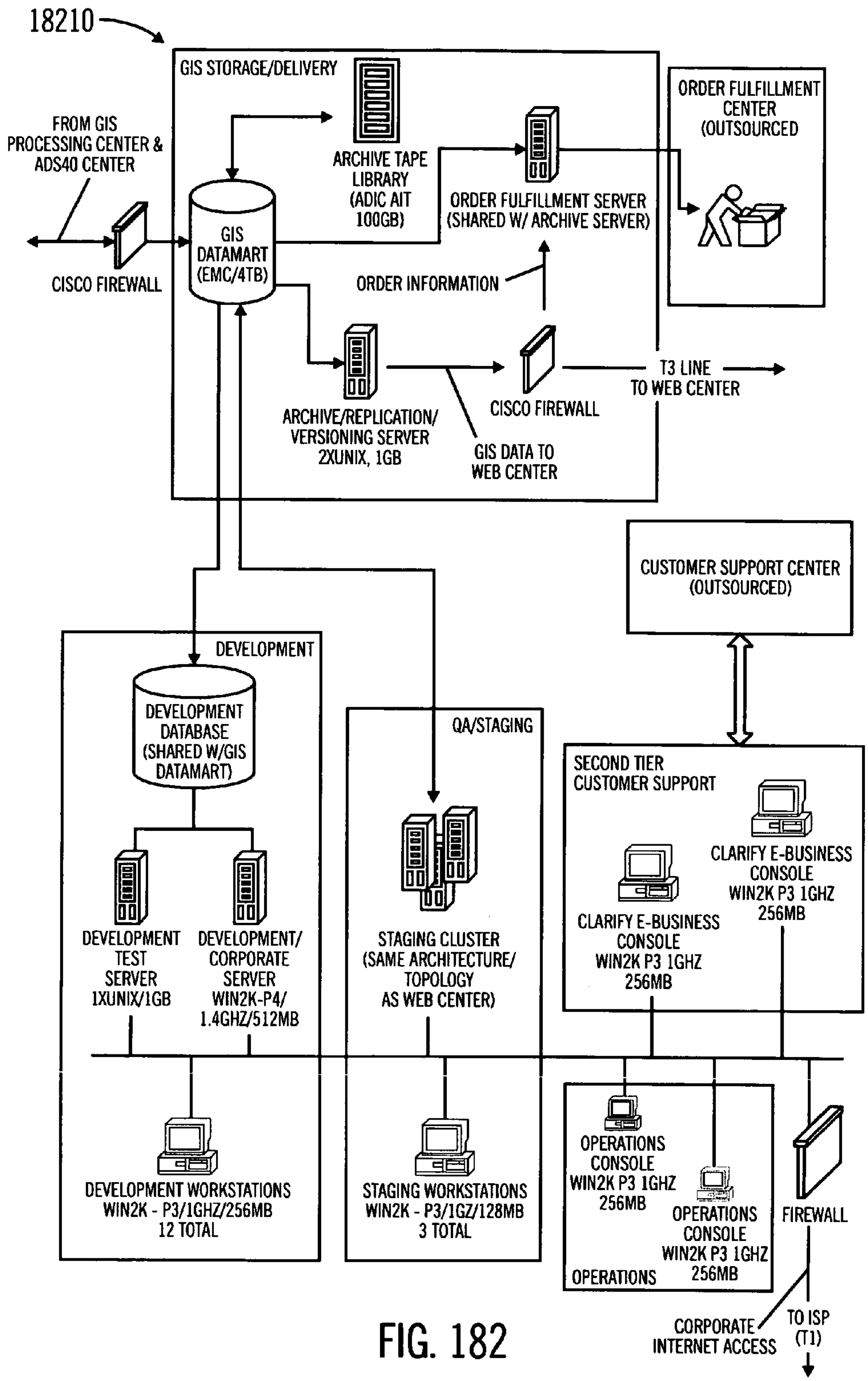

FIG. 182 illustrates an Operations Center in accordance with certain implementations of the invention.

Figure 183:
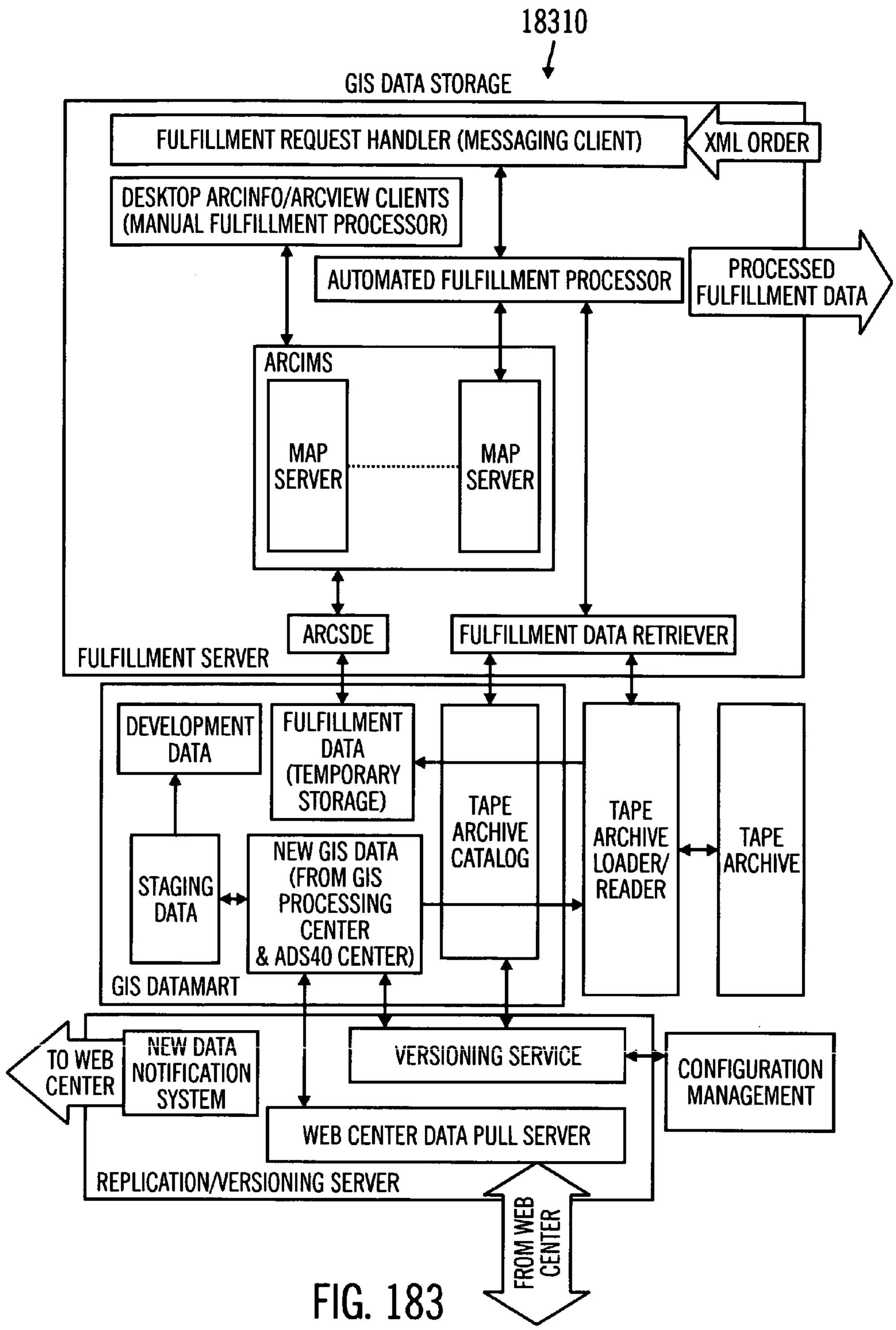

FIG. 183 illustrates GIS storage components in accordance with certain implementations of the invention.

Figure 184:
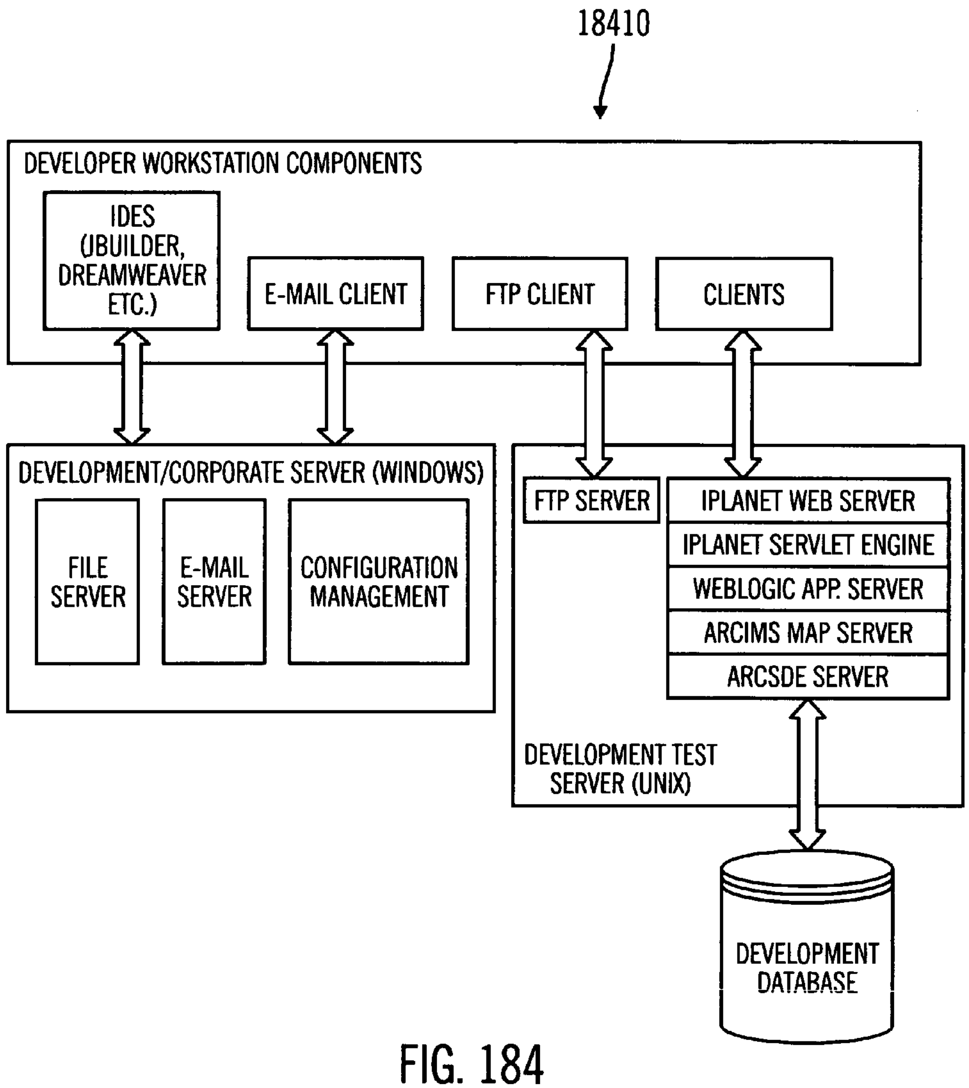

FIG. 184 illustrates development components in accordance with certain implementations of the invention.

Figure 185:
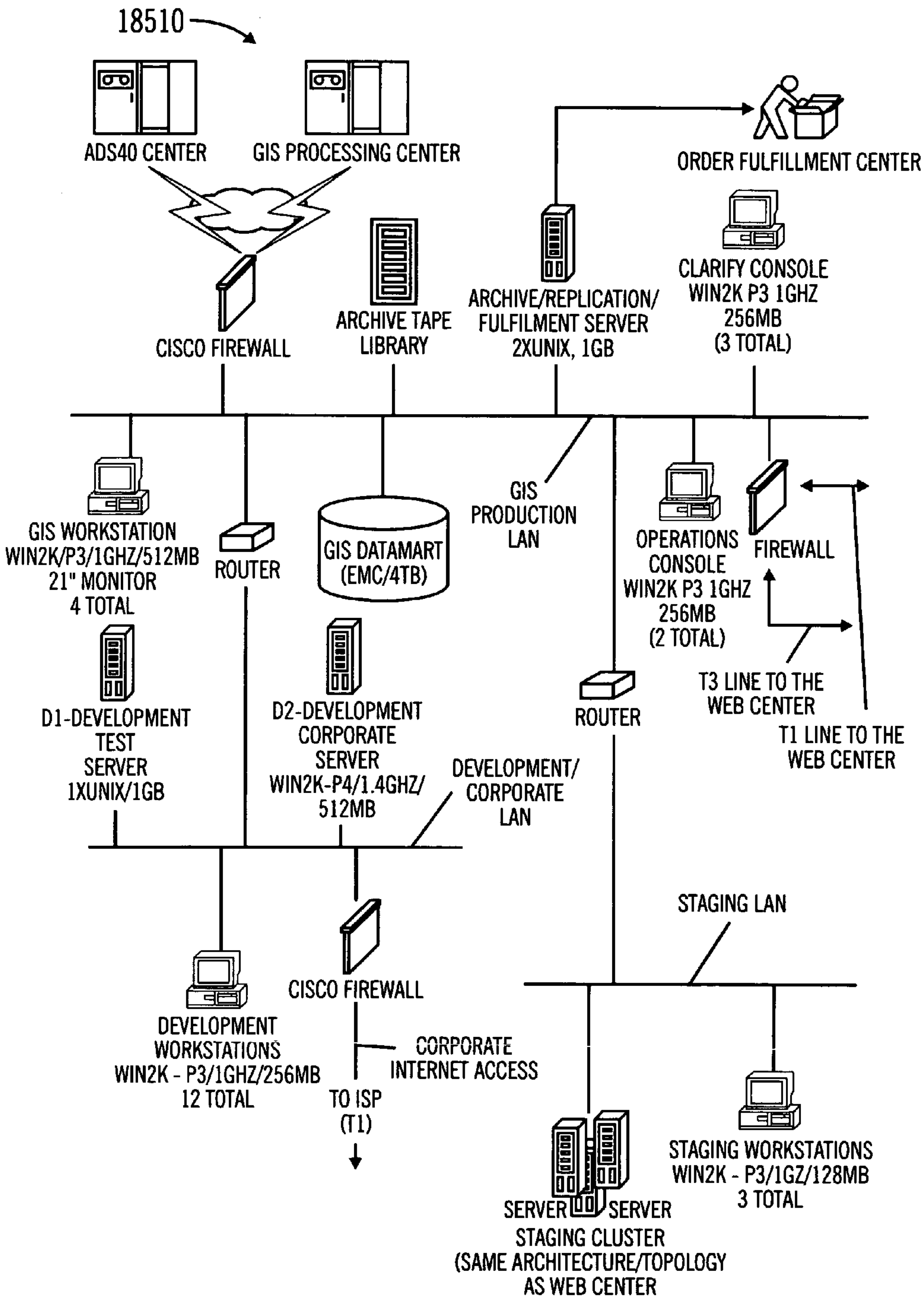

FIG. 185 illustrates an Operations Center network in accordance with certain implementations of the invention.

Figure 186:
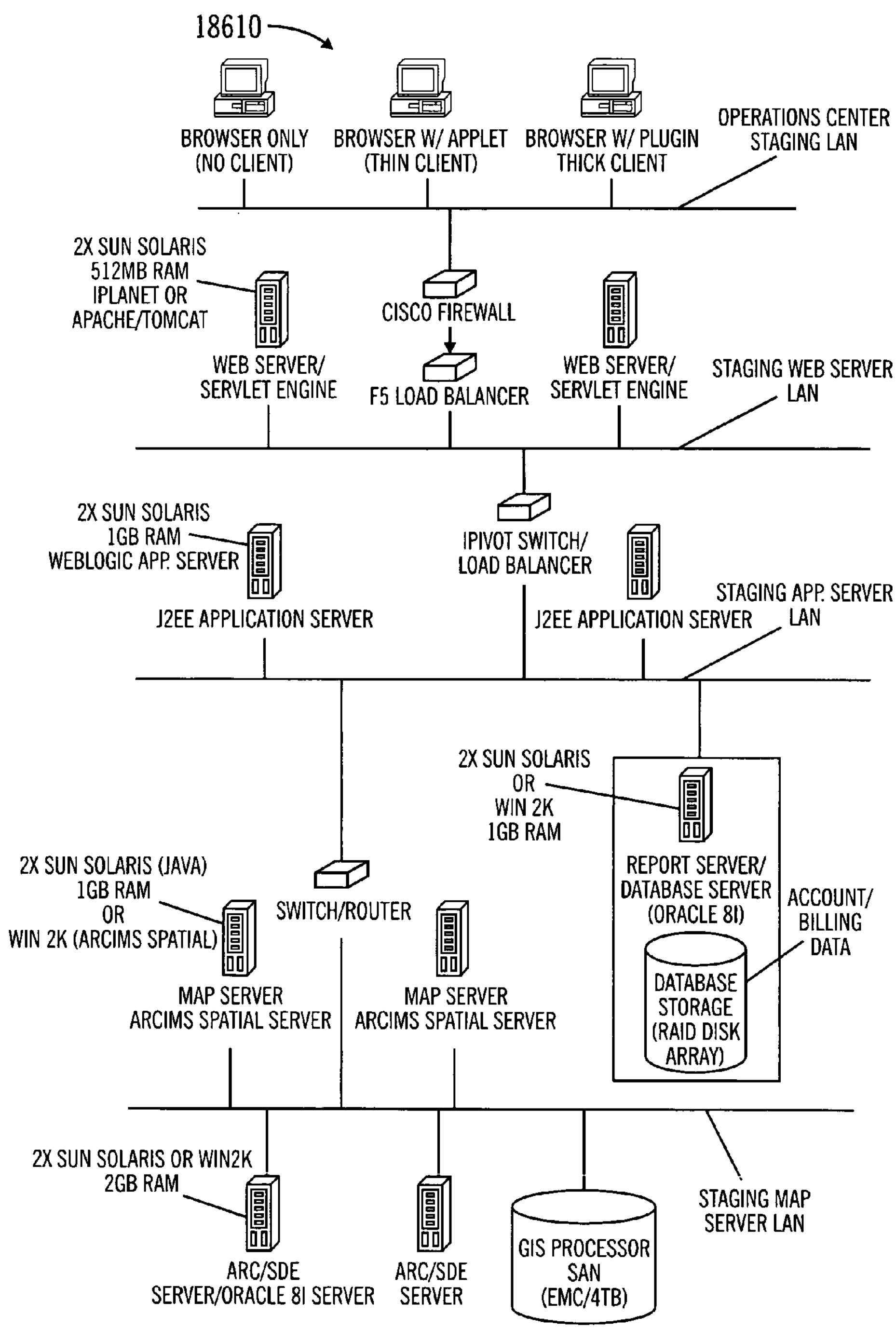

FIG. 186 illustrates a Staging Cluster architecture in accordance with certain implementations of the invention.

Figure 187:
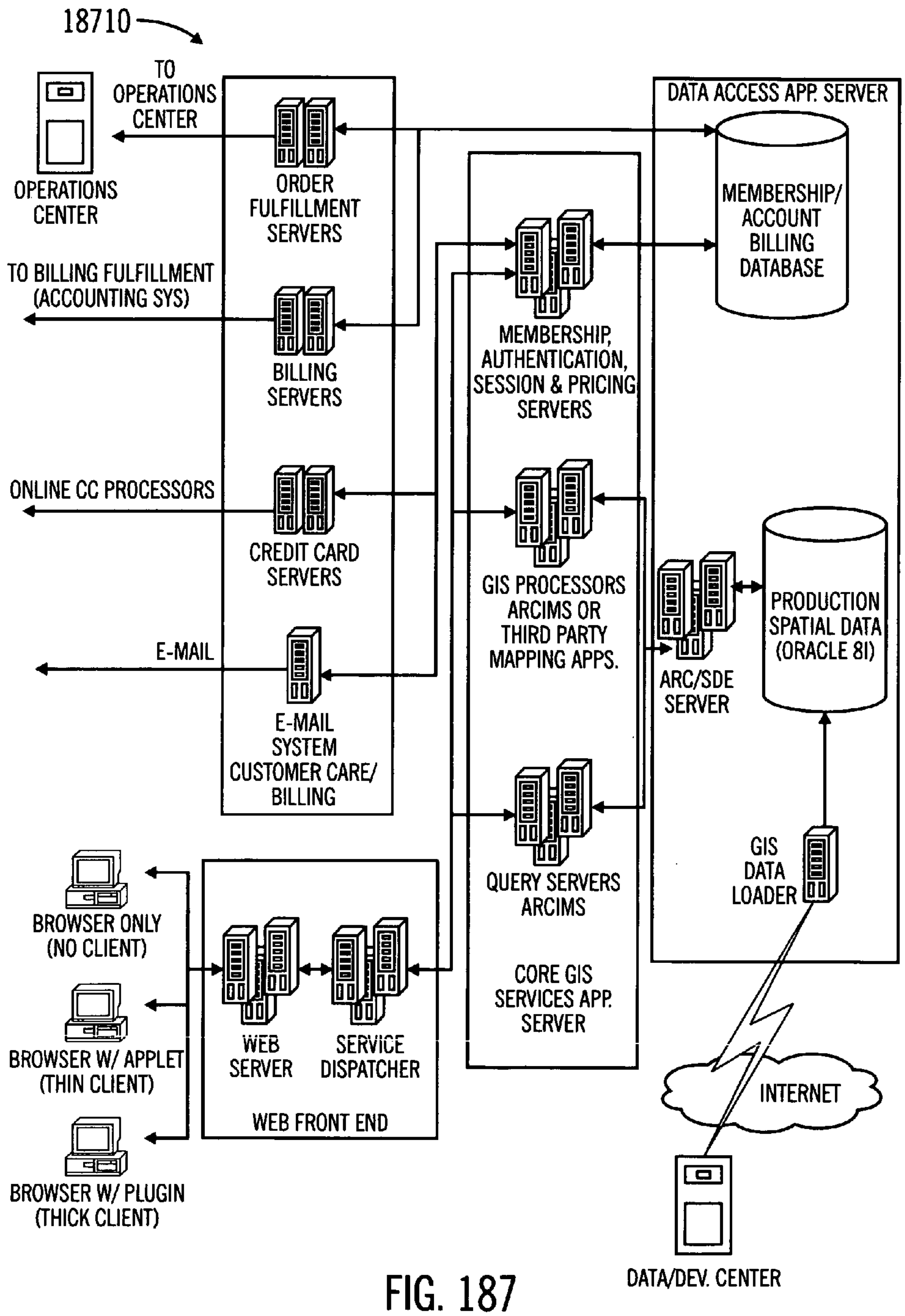

FIG. 187 illustrates a Web Center Functional Architecture in accordance with certain implementations of the invention.

Figure 188:
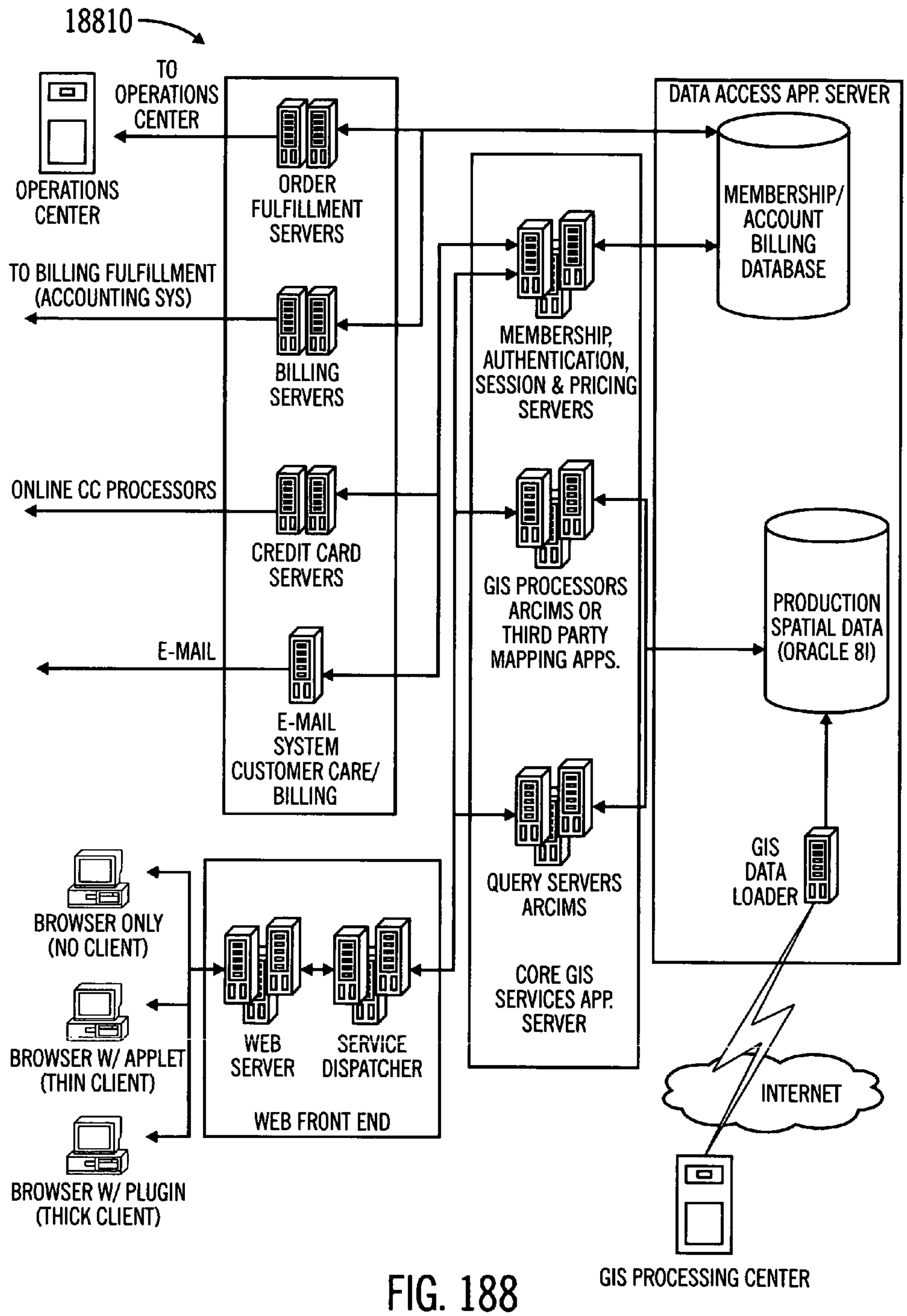

FIG. 188 illustrates an alternative architecture in accordance with certain implementations of the invention.

Figure 189:
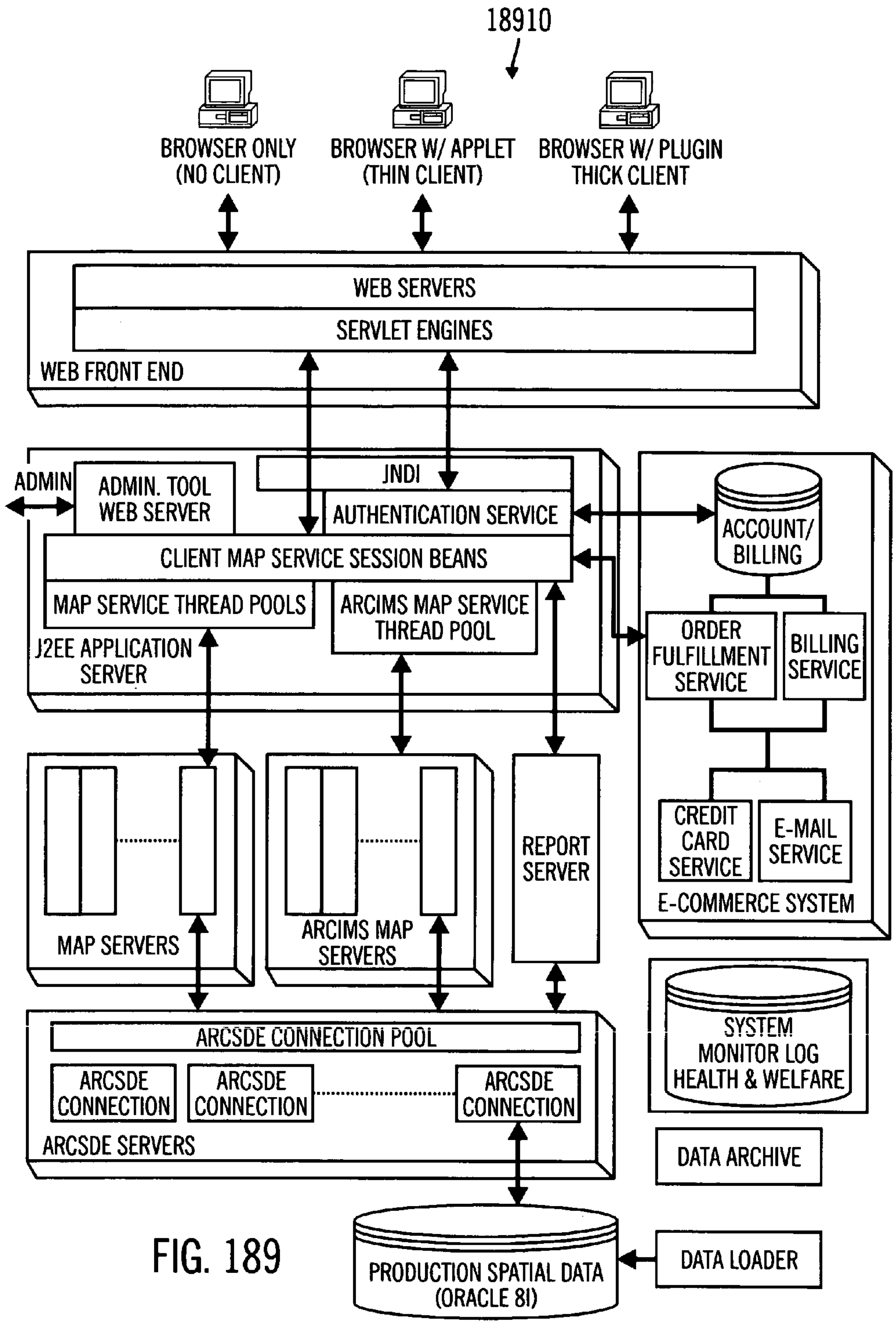

FIG. 189 illustrates a Web Center Component Architecture in accordance with certain implementations of the invention.

Figure 190:
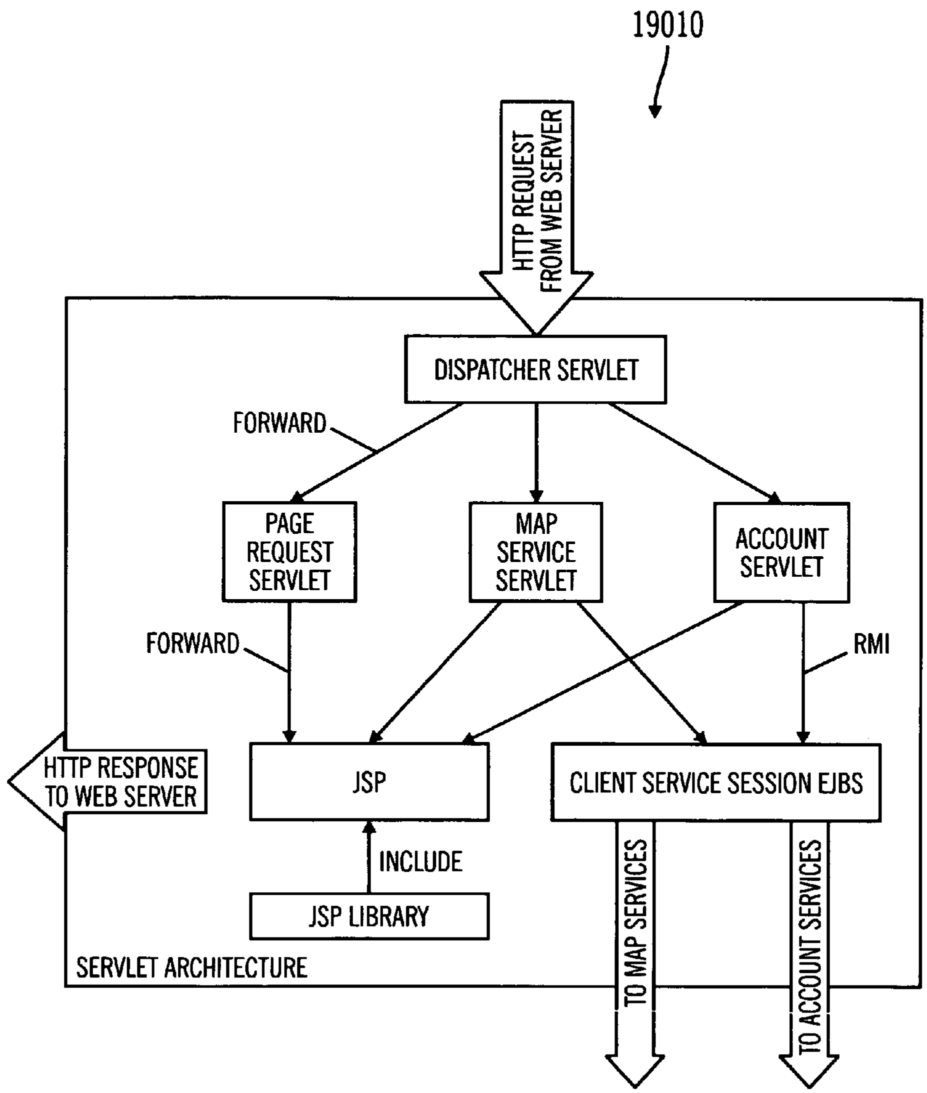

FIG. 190 illustrates a servlet architecture in accordance with certain implementations of the invention.

Figure 191:
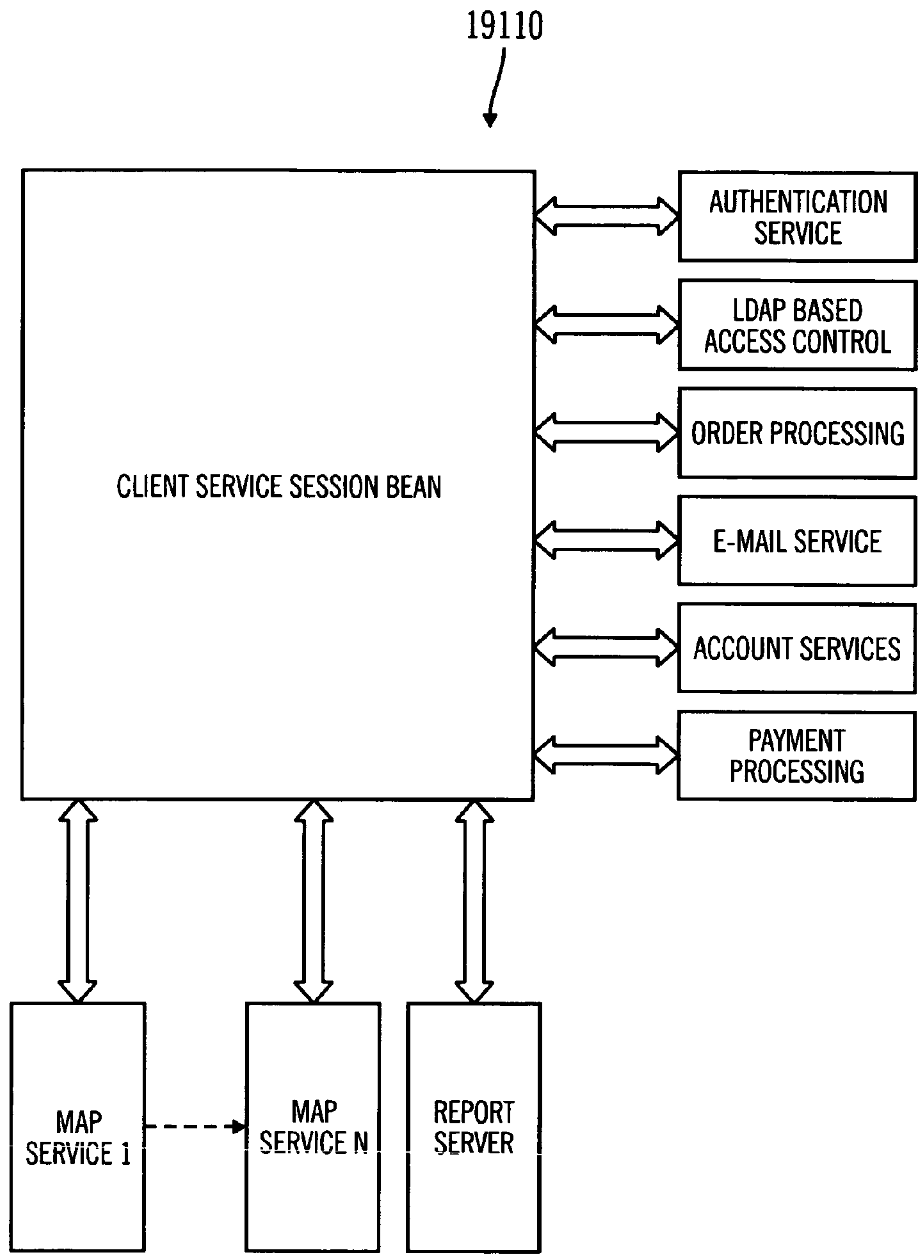

FIG. 191 illustrates a Client EJB Architecture in accordance with certain implementations of the invention.

Figure 192:
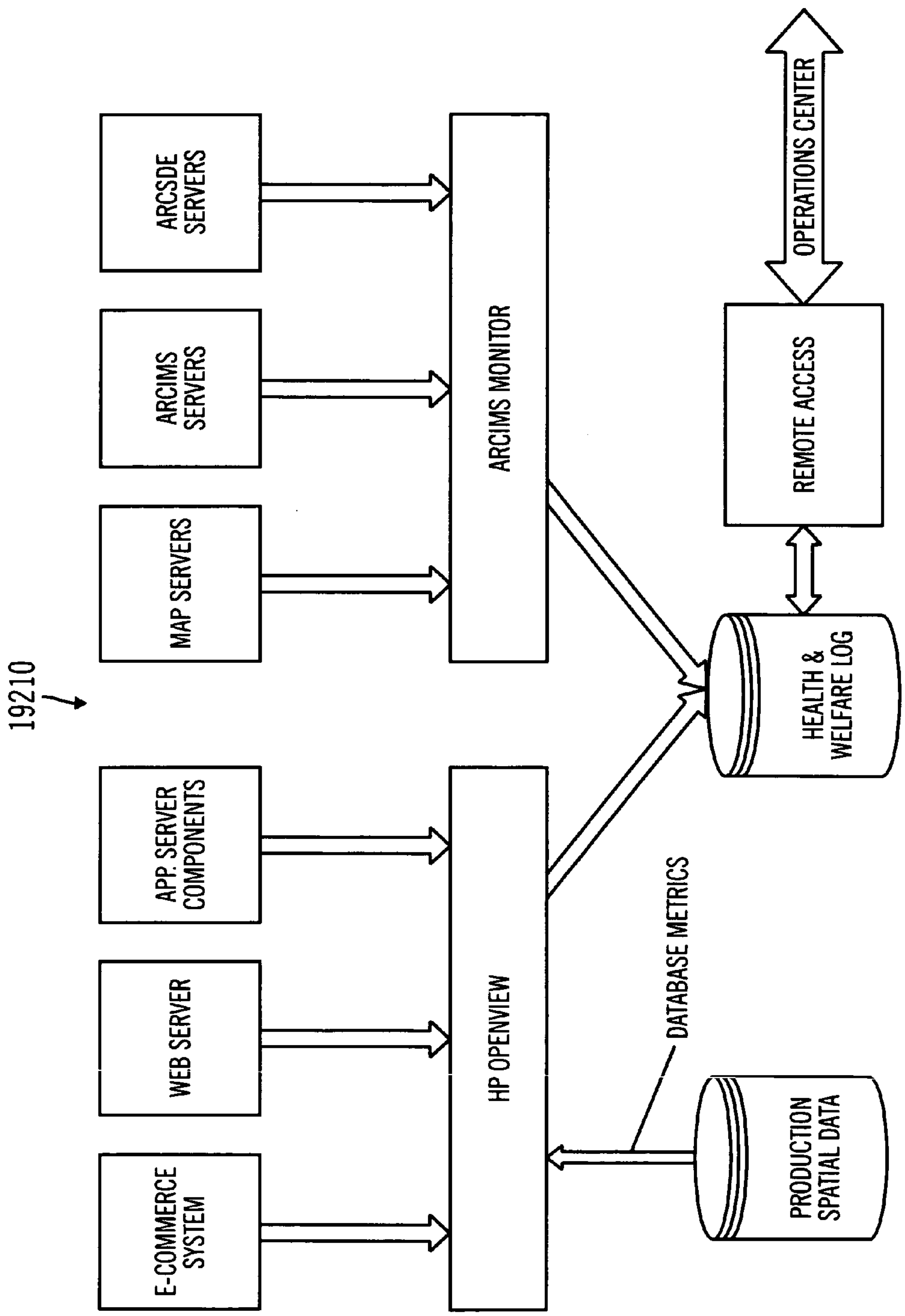

FIG. 192 illustrates Health & Welfare Components in accordance with certain implementations of the invention.

Figure 193:
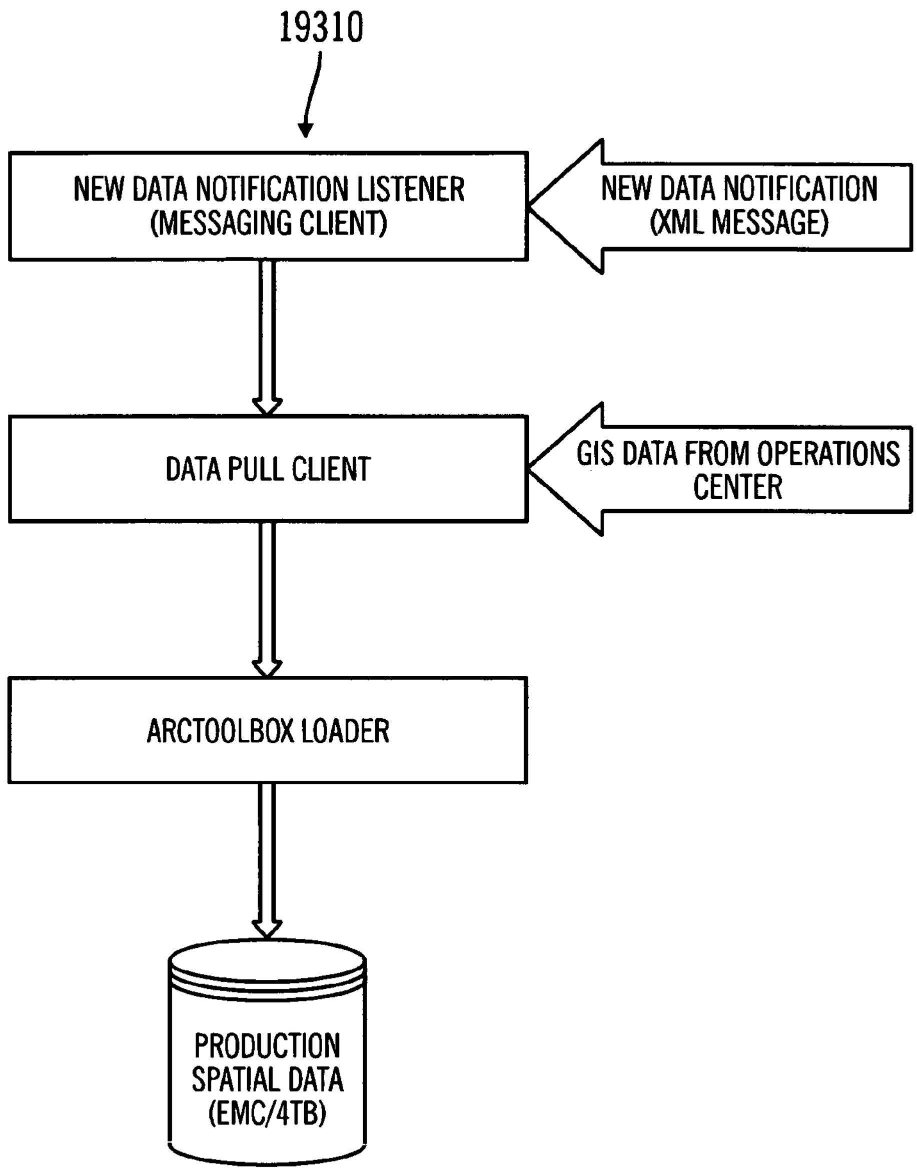

FIG. 193 illustrates a GIS Data Loader in accordance with certain implementations of the invention.

Figure 194:
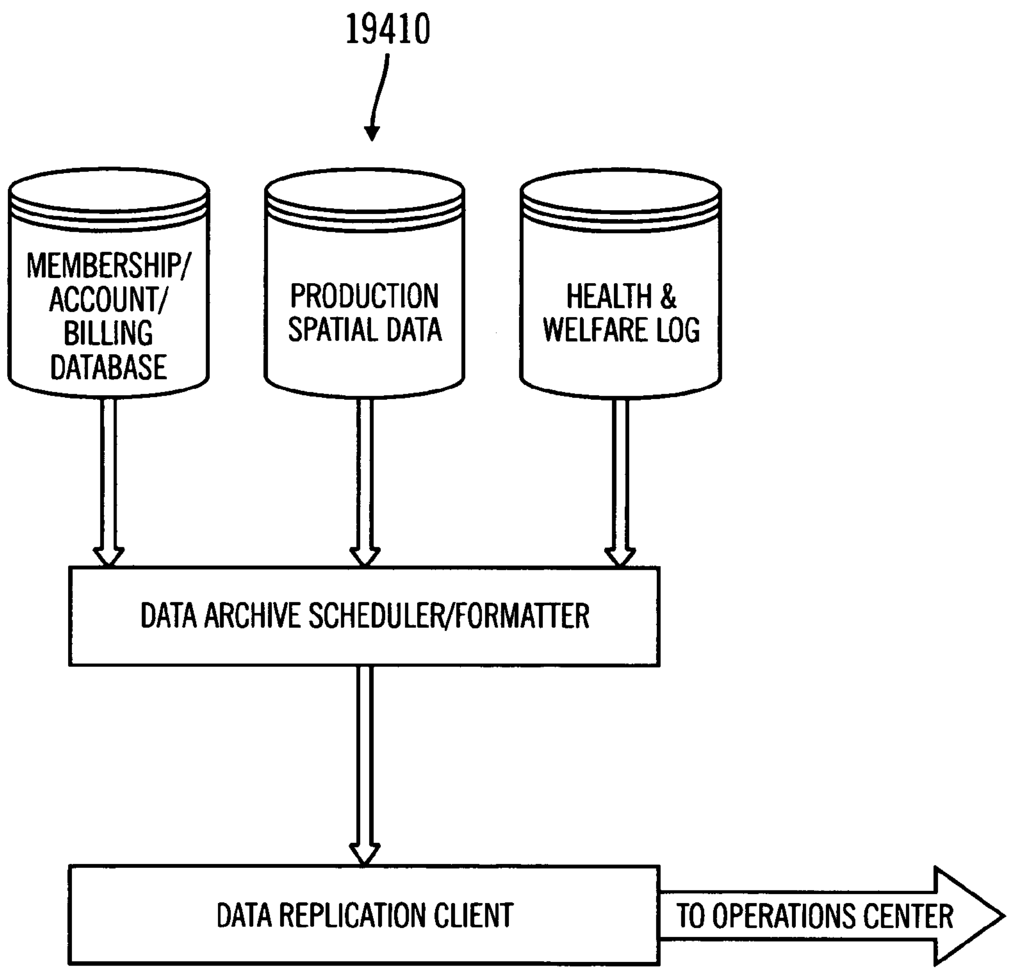

FIG. 194 illustrates a Data Archiver in accordance with certain implementations of the invention.

Figure 195:
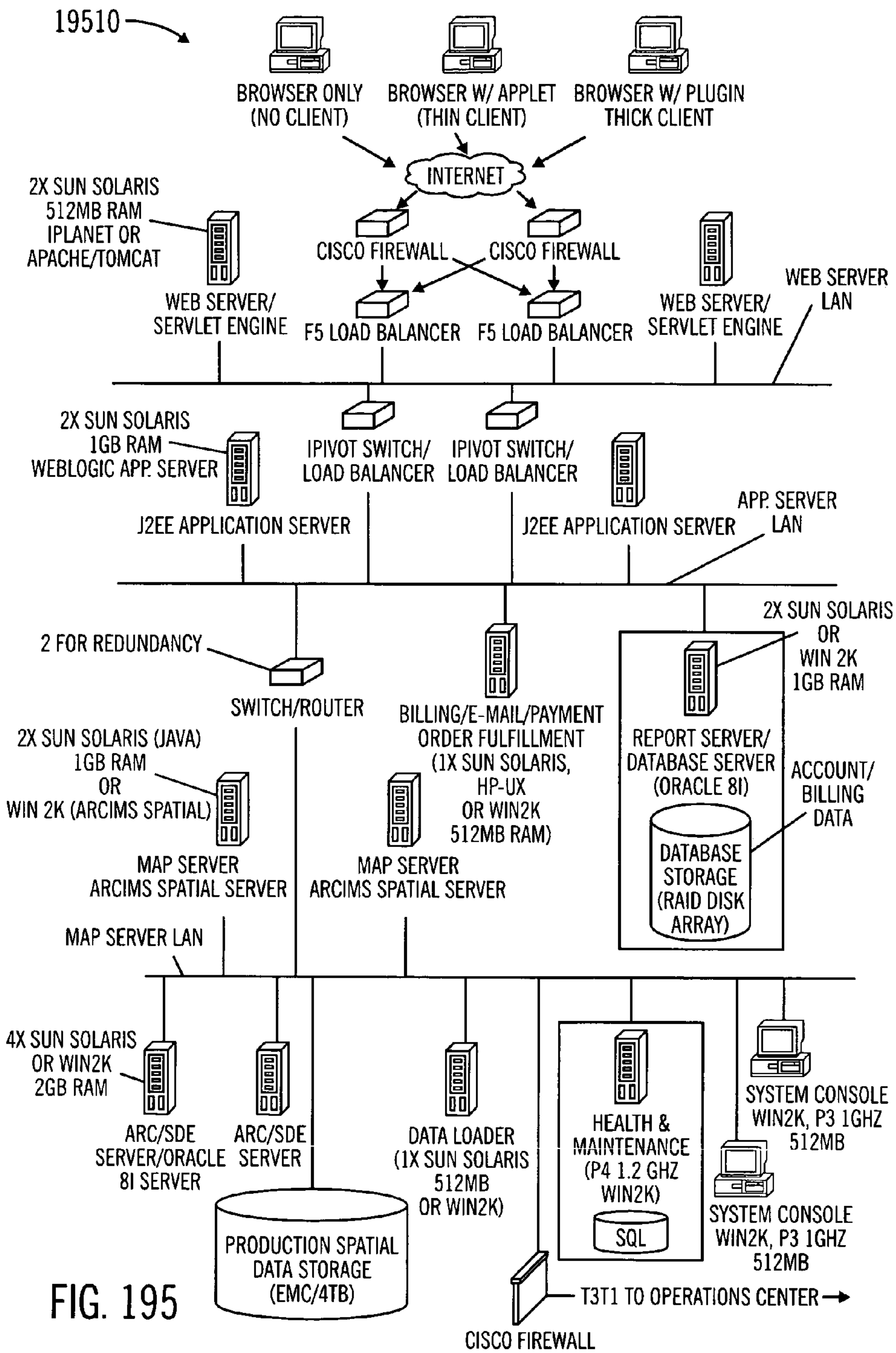

FIG. 195 illustrates an architecture for the hardware, software and network architecture for an enterprise spatial system web deployment in accordance with certain implementations of the invention.

Figure 196:
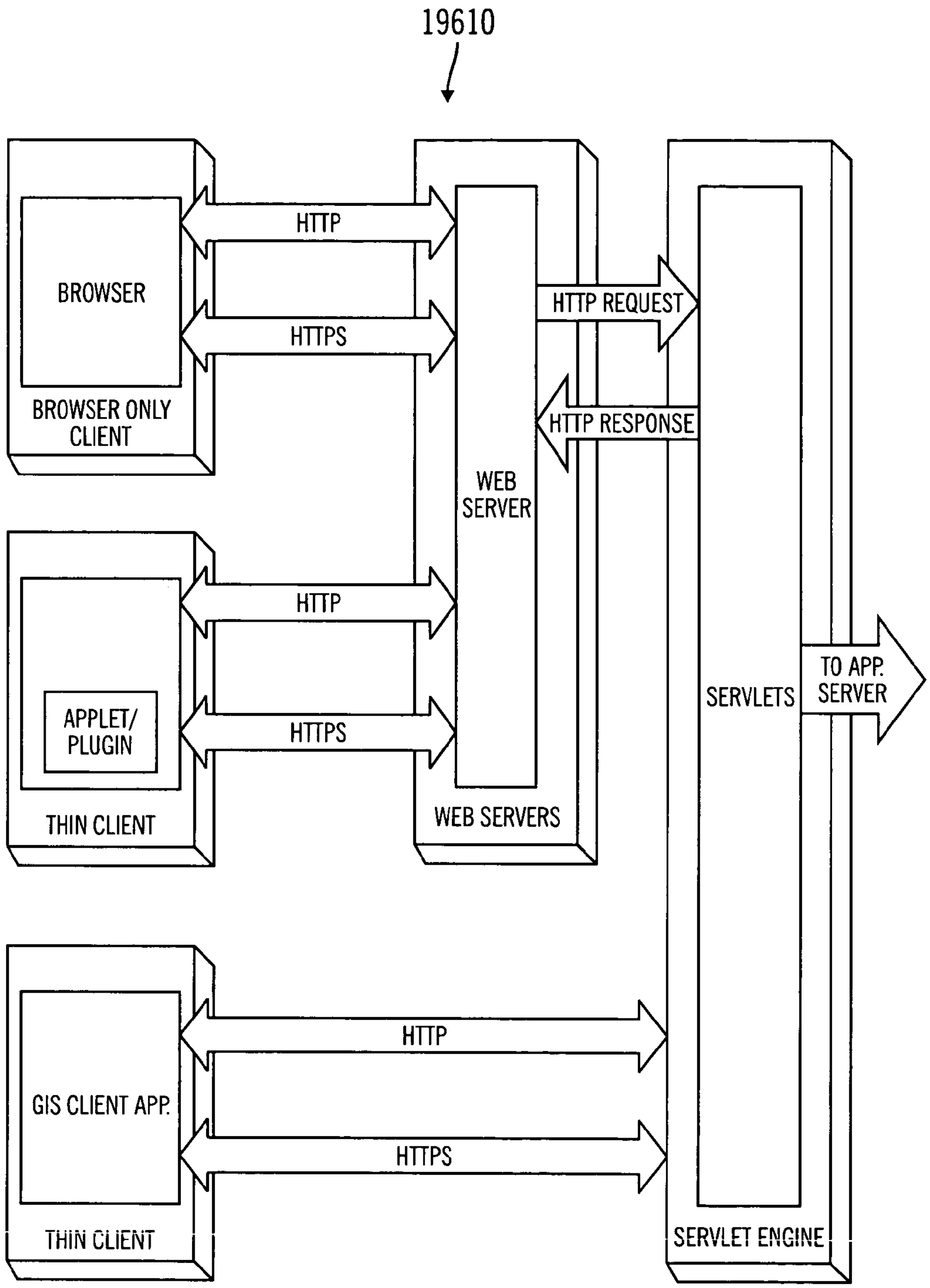

FIG. 196 illustrates a Client Interface Architecture in accordance with certain implementations of the invention.

Figure 197:
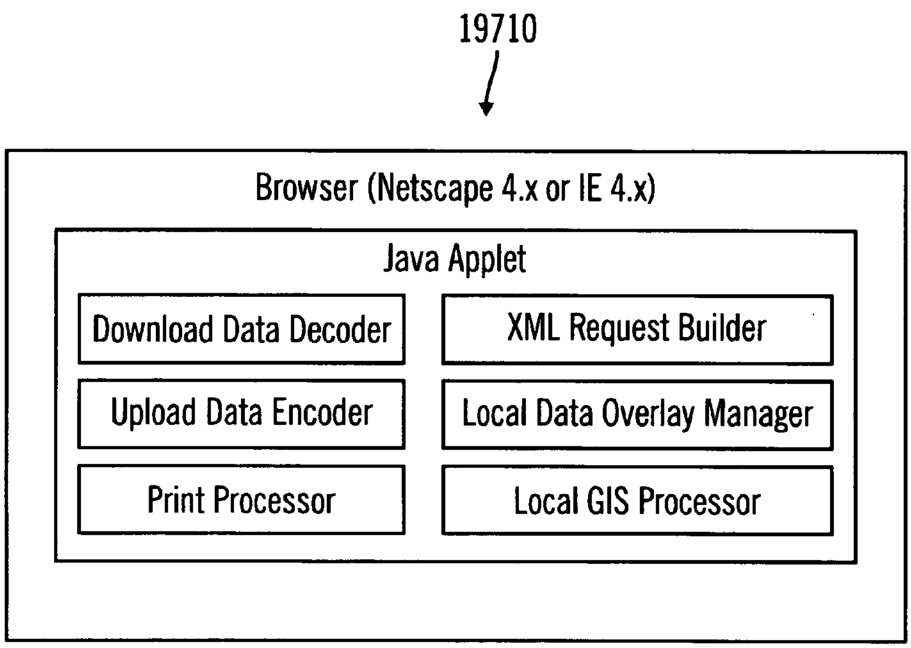

FIG. 197 illustrates a Thin Client Architecture in accordance with certain implementations of the invention.

Figure 198:
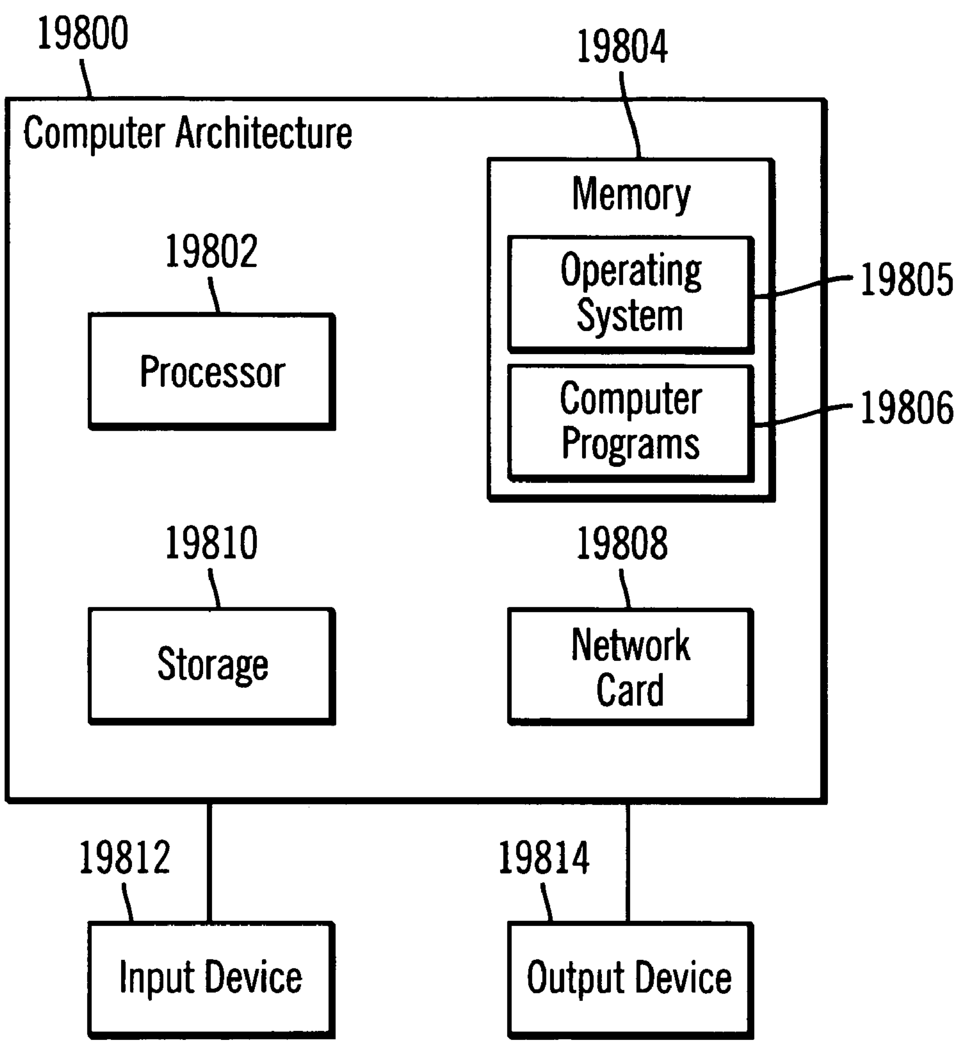

FIG. 198 illustrates an architecture of a computer system that may be used in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

A. Overview

Implementations of the invention provide an enterprise spatial system that supports functions (e.g., viewing, analysis, and other functions) for processing both enterprise data and third party data. The enterprise data may include spatially referenced data and/or non-spatially referenced data, and the third party data may include spatially referenced data and/or non-spatially referenced data. Spatially referenced data refers to data that has associated coordinate data, and non-spatially referenced data refers to data that does not have associated coordinate data.

Implementations of the invention provide analysis of spatially referenced and/or non-spatially referenced data. The results of the analysis may be spatially referenced data and/or non-spatially referenced data. Also, implementations of the invention may store data as data layers, which may include spatially referenced data and/or non-spatially referenced data (e.g., a data element, table, etc.). Although specific examples herein may refer to, for example, graphical objects, images or maps, the techniques of the invention are applicable to any type of data.

The enterprise spatial system may store and/or process spatial and geospatial information, which include, for example, geographic reference data, including, but not limited to, vector data, raster data, and tabular data, such as, customer information, sales data, and marketing data. For spatial data, each data element in a data set has coordinate data associated with the data element, such as an x, y and z coordinate. For geospatial data, the coordinate data is tied to a point on earth. So, for example, the x coordinate becomes longitude, y coordinate becomes latitude, and the z coordinate becomes elevation. Therefore, geospatial data is a subset of spatial data, and geospatial information systems are a subset of spatial information systems. Although examples herein may refer to geospatial data or geospatial information systems, the techniques of the invention are applicable to any type of data or information processing system.

Implementations of the invention provide a method, system, and program for providing data processing systems coupled with one or more live (up to and including 24 hours×7 days) data centers to securely share, access, and/or distribute data from, for example, enterprise data stores at an enterprise combined with hosted data (e.g., enterprise or third party data) from the enterprise spatial system. The combined data is used to generate data layers to allow users to view, analyze, and share spatially referenced data using different client software (e.g., client applications). That is, different client applications may retrieve the same data from the server system and provide different presentations of the data to the user, based on the needs of the user.

More specifically, implementations of the invention provide solutions for the above described problems through, for example, software, which can simultaneously access enterprise data and third party data, and then dynamically generate (e.g., by geocoding) spatially referenced data (e.g., graphical representation data on a map) based on a user's request.

To solve each of the problems identified above, unique solutions within the context of the instant invention have been developed in the following areas: (1) providing processing coupled with live data centers to securely access enterprise data from enterprise data stores and generate data layers from data centers to allow users to manipulate spatially referenced data or dynamically generated spatially referenced data using different client software; (2) providing software solutions to integrate existing enterprise data stores and application software (e.g., from Oracle Corporation, Siebel Systems, ESRI and others); (3) providing security and access control for simultaneously accessing enterprise data and third party data; (4) using compression, tiling, and pyramiding technologies to provide spatial data for fast data access; (5) processing spatial data and uniformly standardizing the spatial data, where standardizing the spatial data refers to presenting the data in one or more well known formats, as opposed to exposing the data in multiple different proprietary formats to client software, which makes writing and maintaining client software that works with the spatial data more simple; (6) providing secure, linearly scalable, web-based architecture; and (7) developing automated geocoding systems that can geocode non-spatially referenced data 'on the fly' to allow for spatially viewing and analyzing other externally available non-spatially referenced data.

Geospatial information is very important for business. In order for companies to have an advantage over other competitors, the companies need to be able to make informed decisions in a short period of time. Analysis based on geospatial information improves understanding and communication of complex relationships, which fosters better decision making. When analysis is based on geospatial information, better business solutions are obtained from utilizing information resources data, analytical technical tools, and decision criteria rules. Here are some examples of how companies can benefit from using geospatial information: (1) sales departments can better understand customer behaviors, sales patterns, and staffing processes; (2) marketing departments can forecast market growth, strategize for public relations, and work on competitive analyses; (3) planning for facility sites such as stores, manufacturing facilities, and cell towers can be done; and (4) managing risks (e.g., modeling investment risks, insurance liabilities, and emergency preparedness) can be planned more effectively.

Implementations of the invention are applicable to systems in which a spatial query is executed to deliver a result. A spatial query is a query for which the query results are identified by analyzing spatial relationships between data. One example of a spatial query is a query to identify all household locations within three miles of a department store. Moreover, implementations of the invention are applicable to all systems in which data (e.g., an image or a report) is generated on a server system and displayed on a client system. Also, implementations of the invention are applicable to Geographic Information Systems (GIS) and decision support systems based on spatial data.

In certain implementations of the invention, a server system is connected to one or more client systems via a network (e.g., the Internet). The server system performs many functions, including, for example: enabling client software to log in to the server system and request and access data; uploading data from client software; retrieving and using data from a data store; generating data layers (e.g., spatially referenced images); sending data to the client software for display to a user; and, handling various notifications to the client software (e.g., a notification regarding new data added to the data store).

B. A System and Method and Computer Product for Coupling a Data Processing Center to a Live Data Processing Center to Provide for Spatially Viewing, Analyzing, and Sharing Enterprise Data and Geospatial Data Across Multiple Users

B.1 Overview

Figure 6:
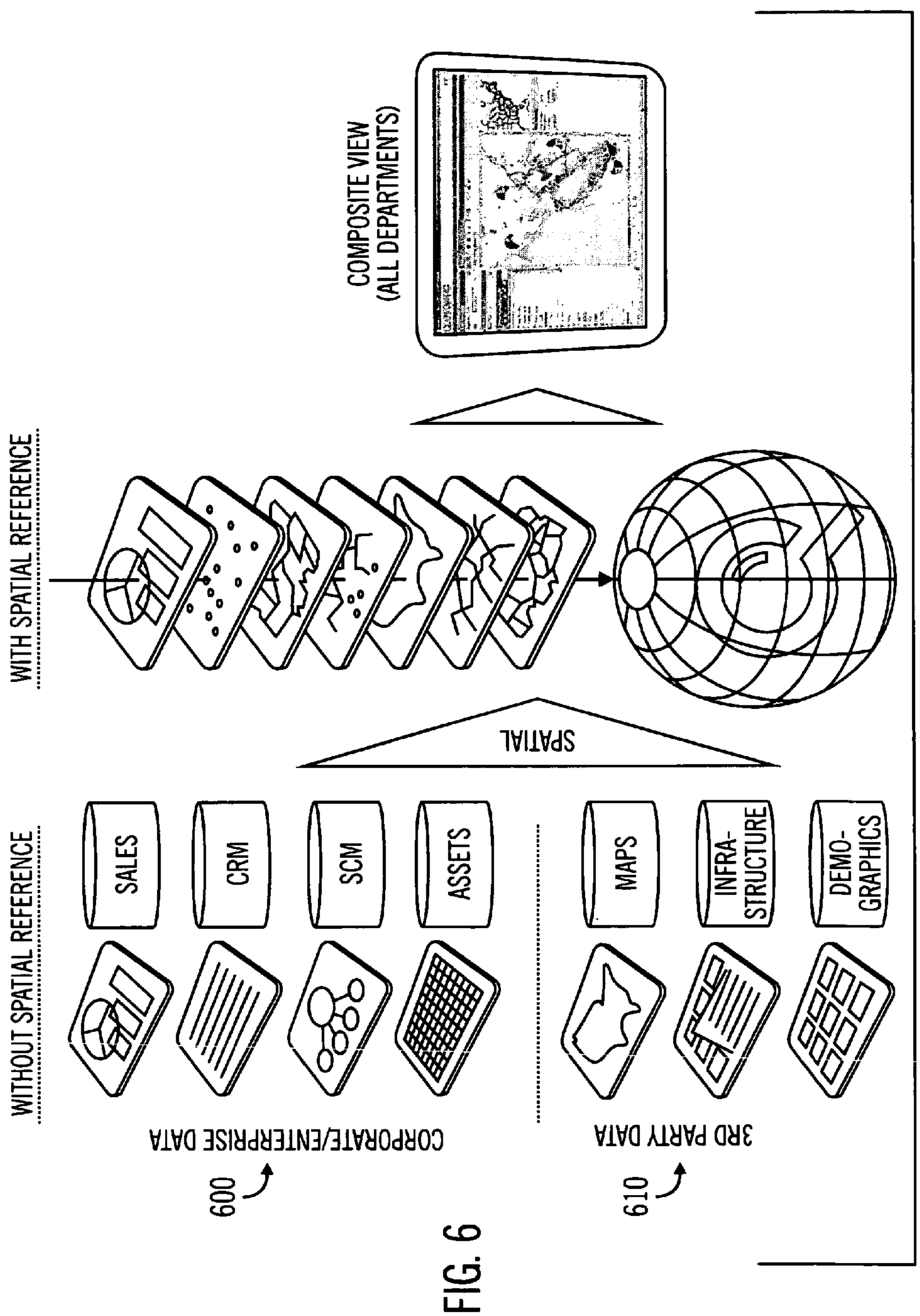
FIG. 6 illustrates the use of spatially referenced data in accordance with certain implementations of the invention.

FIG. 6 illustrates the use of spatially referenced data in accordance with certain implementations of the invention. Enterprise data 600 includes, for example, sales data, Customer Relationship Management (CRM) data, Supply Chain Management (SCM) data, and assets data. Third party data 610 includes, for example, maps, infra-structure data (e.g., roads, lakes, etc.), and demographics data. In the prior art, the enterprise data 600 and the third party data 610 was not combined in a useful manner. With implementations of the invention, the enterprise data 600 and third party data 610 is converted to spatially referenced data by associating geographic information (e.g., longitude and latitude) with non-spatially referenced data (e.g., sales data). Then, data layers 620 are generated with the spatially referenced data, and the data layers 620 are overlaid based on the longitude and latitude values to form a composite image 630 that integrates the enterprise data 600 and the third party data 610. Thus, for example, it is possible to view locations of stores in which sales are high on the composite image 630.

B.2 Architecture Overview

Figure 7:
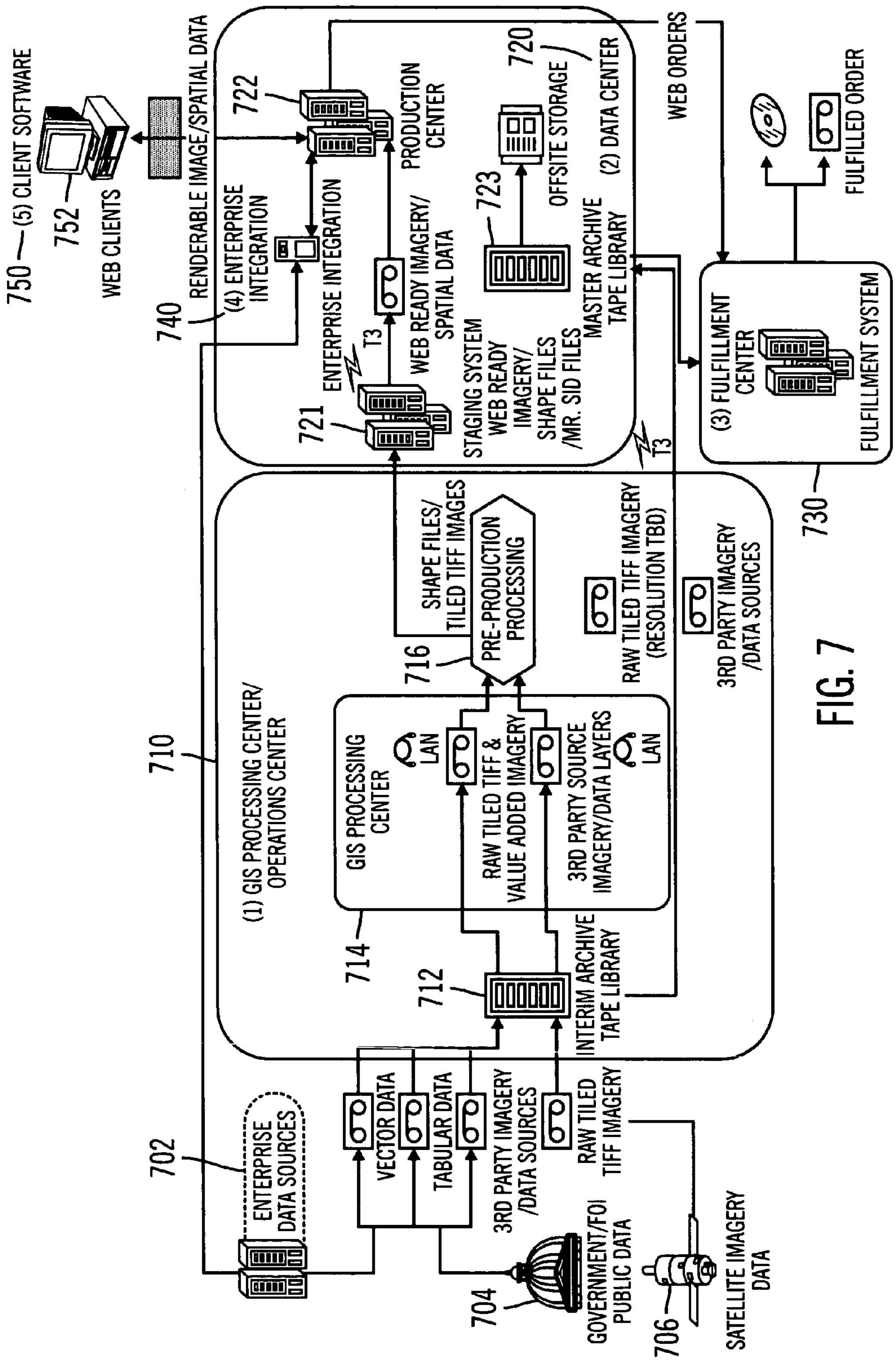
FIG. 7 illustrates, in a block diagram, workflow through a computing environment in accordance with certain implementations of the invention.

FIG. 7 illustrates, in a block diagram, workflow through a computing environment in accordance with certain implementations of the invention. FIG. 7 represents a system data work flow diagram for simultaneously integrating enterprise data with third party data using a processing center and a live data center, processing spatially referenced data, and providing access to the data.

FIG. 7 illustrates several components of an enterprise spatial system provided by implementations of the invention, including (1) a Geographical Information System (GIS) processing center/operations center 710, (2) a data center 720, (3) a fulfillment center 730, (4) enterprise integration 740 (which may be part of the data center 720), and (5) client software 750 (e.g, one or more client applications). The client software 750 executes on a client system 752, which has a display screen on which a UI screen or other data may be displayed for viewing by, for example, a user. Although, one client system 752 is illustrated, it is to be understood that many client systems may access data in the production center 722 at any time, including other server systems acting as clients to the enterprise spatial system. Certain implementations of the invention provide a 24/7 live system that integrates and offers on-demand data (e.g., superior quality geographical imagery, associated industry or enterprise specific data, such as, sales information), and analysis tools to enterprises, government, industry, and the general public.

Prior to implementations of the invention, conventional systems provided no interactive GIS tools for users to access dynamic enterprise data at run time and integrate third party data hosted by a data center. That is, with implementations of the invention, users may access the GIS processing center/operations center 710, which processes data (e.g., converting Tagged Image File Format (TIFF) to Joint Photographic Expert Group (JPEG) format) at run time, and makes the processed data available at run time to users without disrupting the data center 720 operations.

Referring to FIG. 7, enterprise data sources 702, government/Freedom of Information (FOI) public data 704, and satellite imagery data 706 is input to the GIS processing center/operations center 710 in the form of vector data, tabular data, third party imagery, and/or raw tiled TIFF imagery. Although not shown, other types of data may also be input into the enterprise spatial system. In certain implementations, the satellite imagery data 706 is obtained using airplanes flying over areas and taking photographs with cameras that provide high resolution images. The data is stored in an interim archive tape library 712. As a part of processing data, the GIS processing center 714 retrieves data from the interim archive tape library and forwards the data to pre-production processing 716. Ultimately, the data is stored in the production center 722 for client software 750 access.

The GIS processing center/operations center 710 handles many different operations in pre-production processing 716 due to irregularities in GIS data from various sources. For example, the GIS Processing Center performs data compression (e.g., of image data) at run time during the data transformation stage. Compressing data is important because some data (e.g., GIS image data) cannot be accessed over the Internet due to the size of the data. For example, some image data is in a graphical data format called TIFF. TIFF, as understood by those skilled in the art, is a tag-based image file format that is designed to promote the interchange of digital image data. TIFF provides a multi-purpose data format and is compatible with a wide range of scanners and image-processing applications. It is device independent and is used in most operating environments, including Windows®, Macintosh®, and UNIX®. TIFF is one of the most popular and flexible of the current public domain raster file formats. To be able to use GIS image data that may be transferred over the Internet, implementations of the invention convert large image data to a compressed data format, such as JPEG. There are many reasons for using the JPEG file format. JPEG permits a greater degree of compression than other image formats, such as TIFF, enabling quicker downloading times for larger graphics. Furthermore, JPEG documents appear to retain almost complete image quality for most photographs.

There are several important stages in data processing at the GIS processing center 714. The following demonstrate four of the different stages and functions of each stage: (a) data acquisition stage; (b) data extraction stage; (c) data transformation state; and, (d) GIS product inventory creation stage. The data acquisition state procures data from various sources (e.g., enterprise data 702, government/FOI public data 704, and satellite imagery data 706). Data acquisition is an important function of the GIS processing center 714. In the data extraction stage, data is staged for use, the data integrity is verified, and data quality control is provided. In the data transformation stage, the following actions occur on data: color fusion, histograms, matching, mosaicing, resampling, tiling, and compression, which are well known in the art. In the GIS product inventory creation stage, the following actions occur: metadata is created for the data layers, different data layers are described using metadata, data (e.g., vector, rastor or tabular data) is stored in spatial data store, and GIS data is uploaded to the data center 720 for deployment.

The data center 720 includes a staging system 721. Data from the staging system 721 is sent to the production center 722. Data from the staging system 721 may also be stored at a master archive tape library 723 and sent to offsite storage 724. The staging system 721 provides a replica of the production center 722 and is used to test the client software, enterprise spatial system software (e.g., server software at servers in the enterprise spatial system), and data. The staging system 721 is used to ensure that a new version of client software and/or data will work correctly when deployed to the production center 722. The production center 722 is used to store data accessed by users via client software 750.

The data center 720 supports many operations. For example, the data center 720 hosts raster data, vector data, and tabular data for users to access using various client software 750 (e.g., client applications such as, a browser client, a thin client, or an enterprise client). Various techniques of accessing data (e.g., tabular data of sales information) from an enterprise data store and geocoding non-spatially referenced data are supported. In particular, although geocoding may be performed in the GIS processing center/operations center 710, the data center 720 also supports functions that require geocoding in the production center 722. The data center 720 also manages network communications between enterprise users and the data center 720. The data center 720 supports linear scalability to be able to expand the enterprise spatial system provided by implementations of the invention to handle larger data sets (i.e., larger amounts of data) at run time.

The data center 720 provides security and access controls to enterprise users to securely access their enterprise data, allows enterprise users to simultaneously access dynamic data from their enterprise data store 702 and the data center 720, and processes requests from, for example, client applications by supporting client applications' functionality. The data center 720 also supports different types of analytical functions, such as querying for data, generating data reports, retrieving data layers, accessing data, and sharing and/or collaborating with multiple users.

The fulfillment center 730 receives orders for data (e.g., particular data, a particular image or a set of images), prepares the data (e.g., creates or collects the appropriate data), and delivers the data to a requested location. Further details of order fulfillment are provided below.

Enterprise integration 740 allows users to access securely their enterprise data that is stored outside of the data center 720. Enterprise integration 740 also determines whether enterprise data are pre-geocoded or not, and, if the enterprise data is not pre-geocoded, the enterprise data is parsed and geocoding information is provided by determining the proper longitude and latitude information to be associated with the enterprise data elements (e.g., records). The enterprise integration technology 740 also provides the ability to interact with and retrieve data from third party applications using various Application Programming Interfaces (API) exposed by the third party applications and makes the data available to the client systems of the data center 720. The enterprise integration technology 740 also provides various Application Programming Interfaces (API) to third party applications so that different third party applications, including enterprise applications, can access production data from the data center 720. The APIs provide defined function calls to third party applications so that users can interact with the enterprise spatial system provided by implementations of the invention to utilize stored data (e.g., raster data, vector data, and tabular data) for spatially analyzing enterprise data. In addition to accessing data, the APIs also allow third party applications to utilize the various analysis functions provided by the enterprise spatial system.

The client software 750 (e.g., client applications) allows users to manipulate spatial data interactively by making dynamic data requests from the data center 720. The client software 750 includes, for example, browser-based clients, thin clients, thick clients, and enterprise clients. The client software 750 handles all user actions promptly and retrieves spatial data from the data center 720 in a timely manner. To achieve this goal, the client software 750 and the data center 720 rely on using a multiple data layering mechanism. That is, unlike legacy GIS software, the data center 720 does not combine multiple data layers as one composite image when transmitting spatial data to users over a network. Instead, the data center 720 retrieves proper spatial data layers from various data stores based on client requests and converts the data layers to individual images. Then, rather than combining multiple spatial data layers as one raster file or vector file (e.g., JPEG, ASCII Extensible Markup Language (XML) or other forms of binary file), the data center 720 sends the images separately to the client software 750. The client software caches the images for the different spatial data layers to avoid generating new image files every time users change back and forth between different spatial data layers. The client software may combine multiple images to form a composite image that is displayed to a user.

Figure 8:
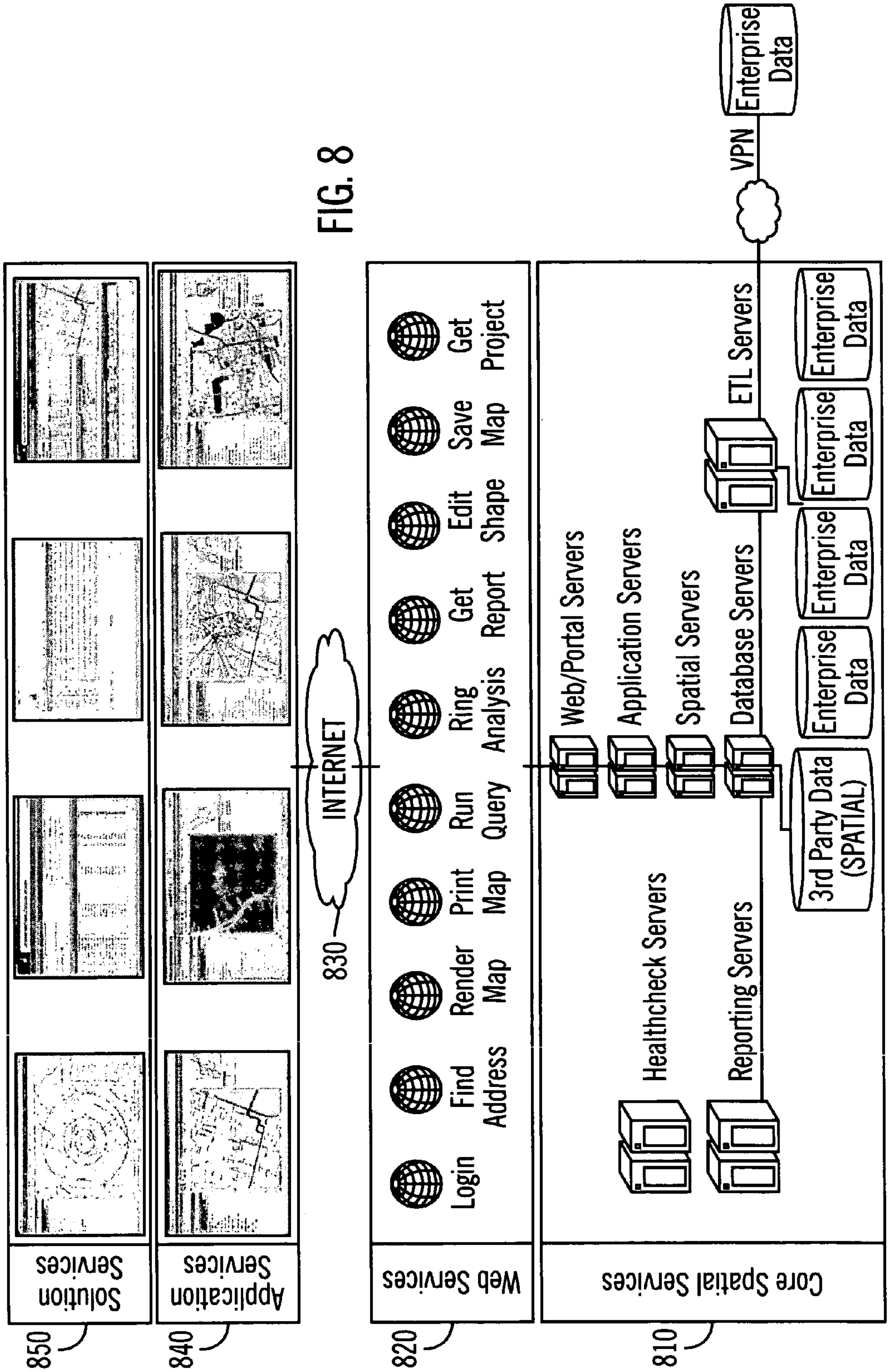
FIG. 8 illustrates services in accordance with certain implementations of the invention.

FIG. 8 illustrates services in accordance with certain implementations of the invention. Core spatial services 810 include, for example, storing third party data and enterprise data for various businesses. Also, enterprise data stored on-site at a business may be accessed, via, for example, a Virtual Private Network (VPN). Healthcheck servers perform tests to ensure that all systems are working correctly. Reporting servers are used to generate reports. Data store servers link Extraction, Transformation, and Loading (ETL) servers connected to locally hosted and remotely hosted enterprise data storage devices, reporting servers, and storage devices storing third party data. Spatial servers perform spatial manipulation of data, which includes, for example, performing spatial queries and rendering spatial data layers. Application servers coordinate the server tasks performed to satisfy requests made by client software (e.g., client software 750). Web/Portal servers provide front end access to different software services provided by the production system 722.

The Web services 820 include, for example, login, finding of addresses, render maps, print maps, run queries, get reports, save maps, and get projects. Projects are saved user views of the data, including the results of spatial analysis performed by the user. The ellipsis indicate that other services may be provided. A network, such as the Internet 830, enables the various services to communicate with each other. Application services 840 perform particular functions. In particular, each application service is a collection of distinct features 2012 that perform particular functions. For example, geocoding is a feature that performs the function of translating an address to a latitude/longitude pair. Solution services 850 perform a combination of application functionality.

Figure 9A:
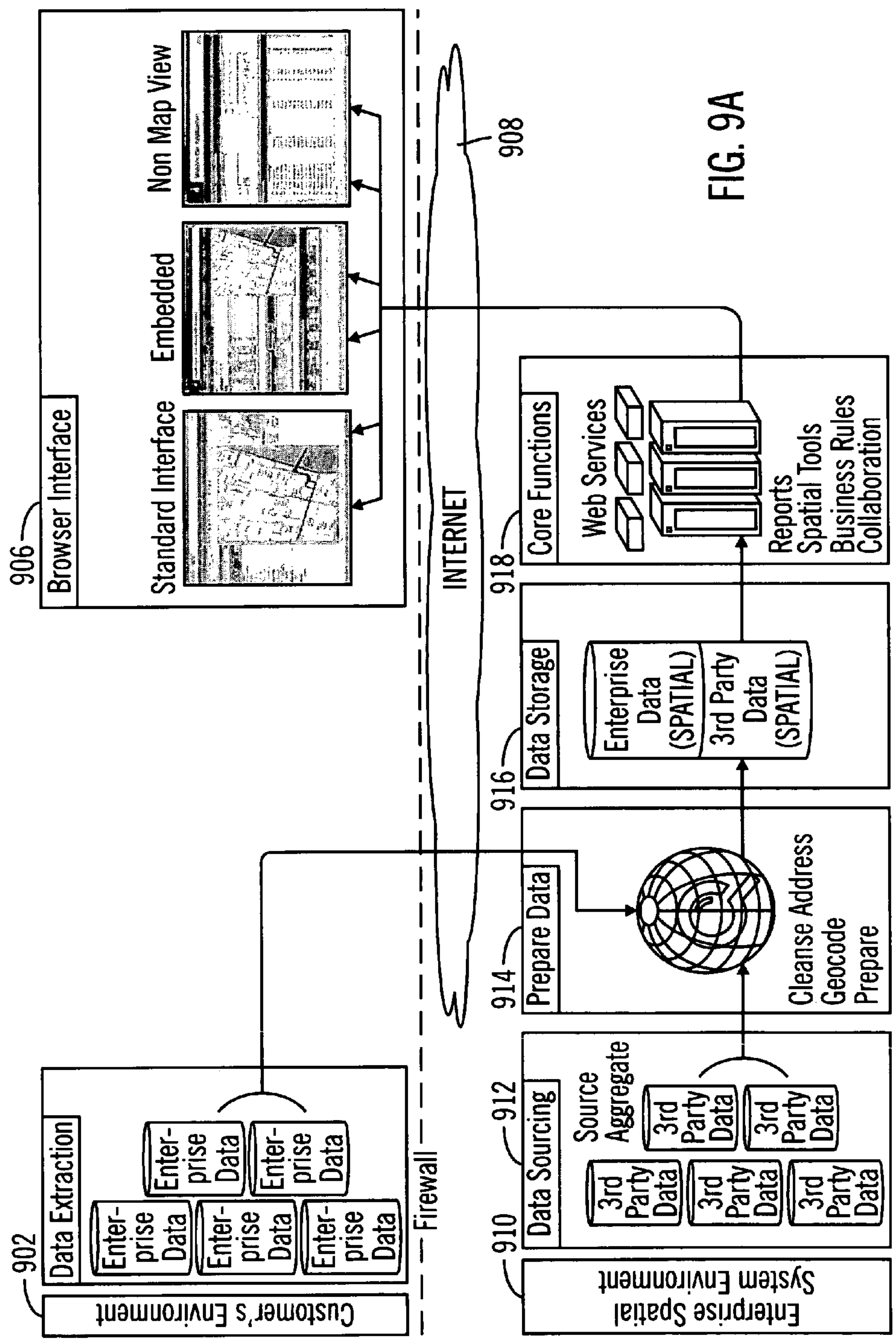
FIGS. 9A–9E illustrate various computer system architectures in accordance with certain implementations of the invention.

FIGS. 9A–9E illustrate various computer system architectures in accordance with certain implementations of the invention. In FIG. 9A, the customer's environment 902 performs data extraction 904, and the extracted data is sent to the enterprise spatial system 910 via a network, such as the Internet 908. In certain implementations, the enterprise spatial system is one in which third party data and/or enterprise data is hosted (e.g., in a data store) and services provided by implementations of the invention are available (e.g., to a user at a client system accessing a server system in the enterprise spatial system via client software).

The enterprise spatial system 910 performs data sourcing 912, prepares data 914, has data storage 916, and performs core functions 918. In data sourcing 912, third party data is aggregated. Preparing data 914 includes, for example, address cleansing, geocoding, and otherwise preparing data. The data storage 916 stores both enterprise and third party data. The core functions 918 include, for example, Web services, report preparation and delivery, spatial analysis functions (such as spatial queries), business rules management, and collaboration among users. Data and results of the core functions supported by implementations of the invention are delivered from the enterprise spatial system 910 to a client software interface, such as a browser interface 906, in the customer's environment via the Internet 908.

Figure 9B:
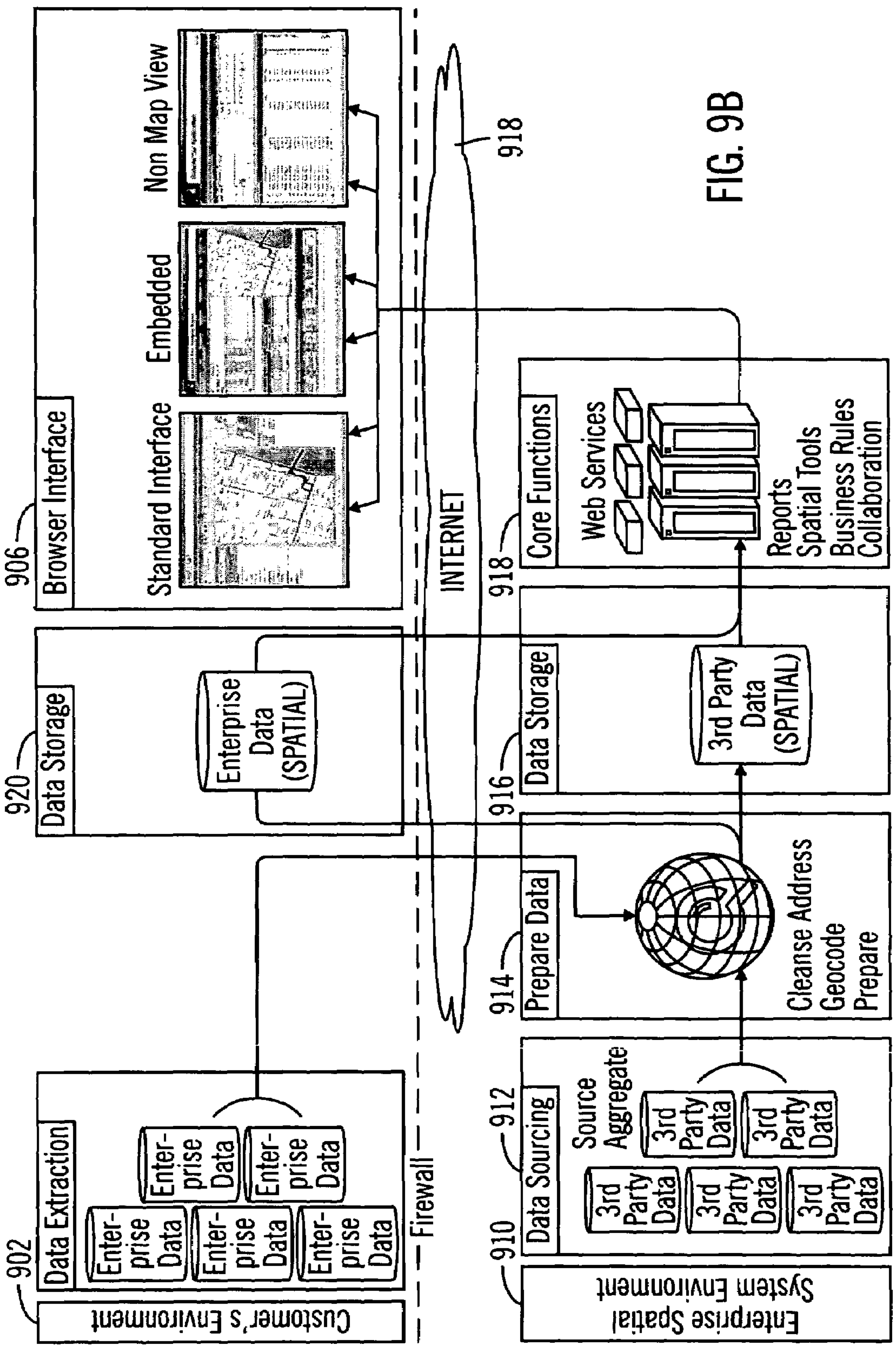

FIG. 9B differs from FIG. 9A in that data storage 916 at the enterprise spatial system 910 stores third party data spatial data. The enterprise data extracted in the customer's environment 902 is sent to the enterprise spatial system 910 for data preparation and is then returned to the customer's environment for data storage 920. The enterprise data is retrieved into the enterprise spatial system 910 from the data storage 920 in the customer's environment 902 when core functions 918 are to be performed.

Figure 9C:
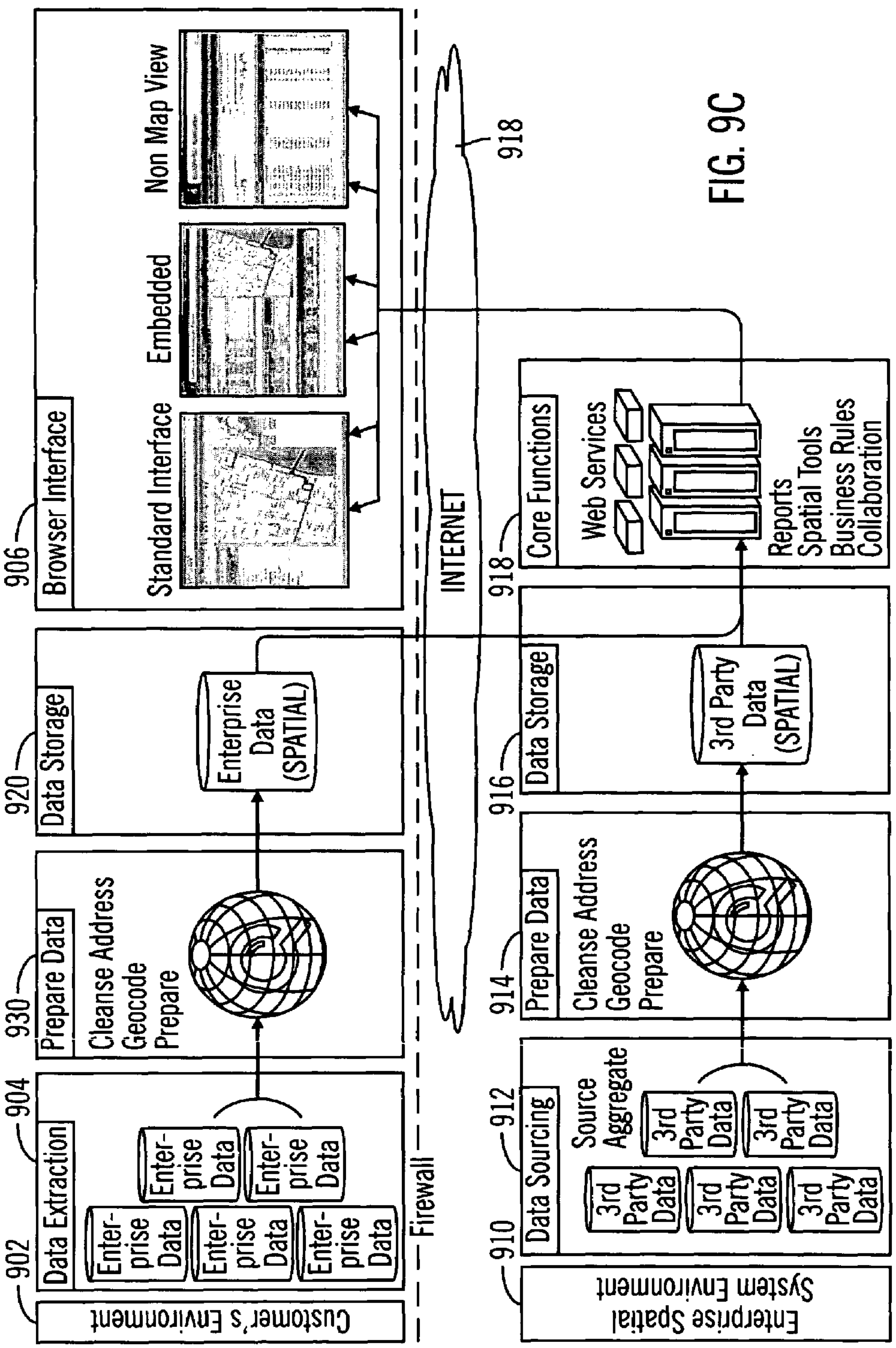

FIG. 9C differs from FIG. 9B in that third party data is prepared 914 in the enterprise spatial system 910, while enterprise data is prepared 930 in the customer's environment 902. The enterprise data is stored in data storage 920 in the customer's environment, and the enterprise data is retrieved into the enterprise spatial system 910 when core functions 918 are to be performed.

Figure 9D:
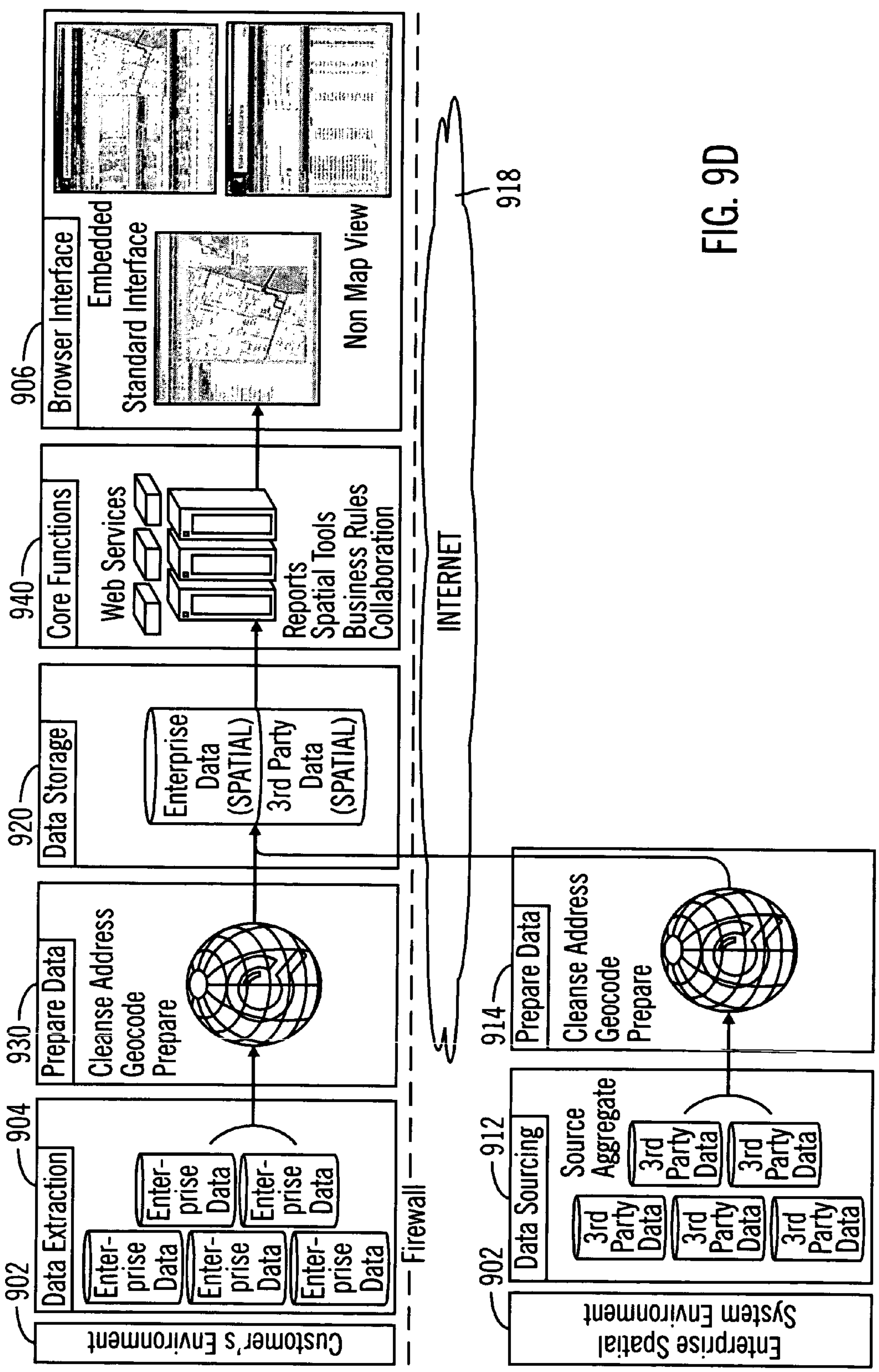

FIG. 9D differs from FIG. 9C in that the data storage 920 in the customer's environment stores both enterprise and third party data spatial data. That is, third party data spatial data is no longer stored in the enterprise spatial system 910. In this illustration, after third party data is prepared in the enterprise spatial system 910, the third party data spatial data is sent to the customer's environment 902 for storage. Additionally, the core functions 940 are performed in the customer's environment 902, rather than in the enterprise spatial system 910.

Figure 9E:
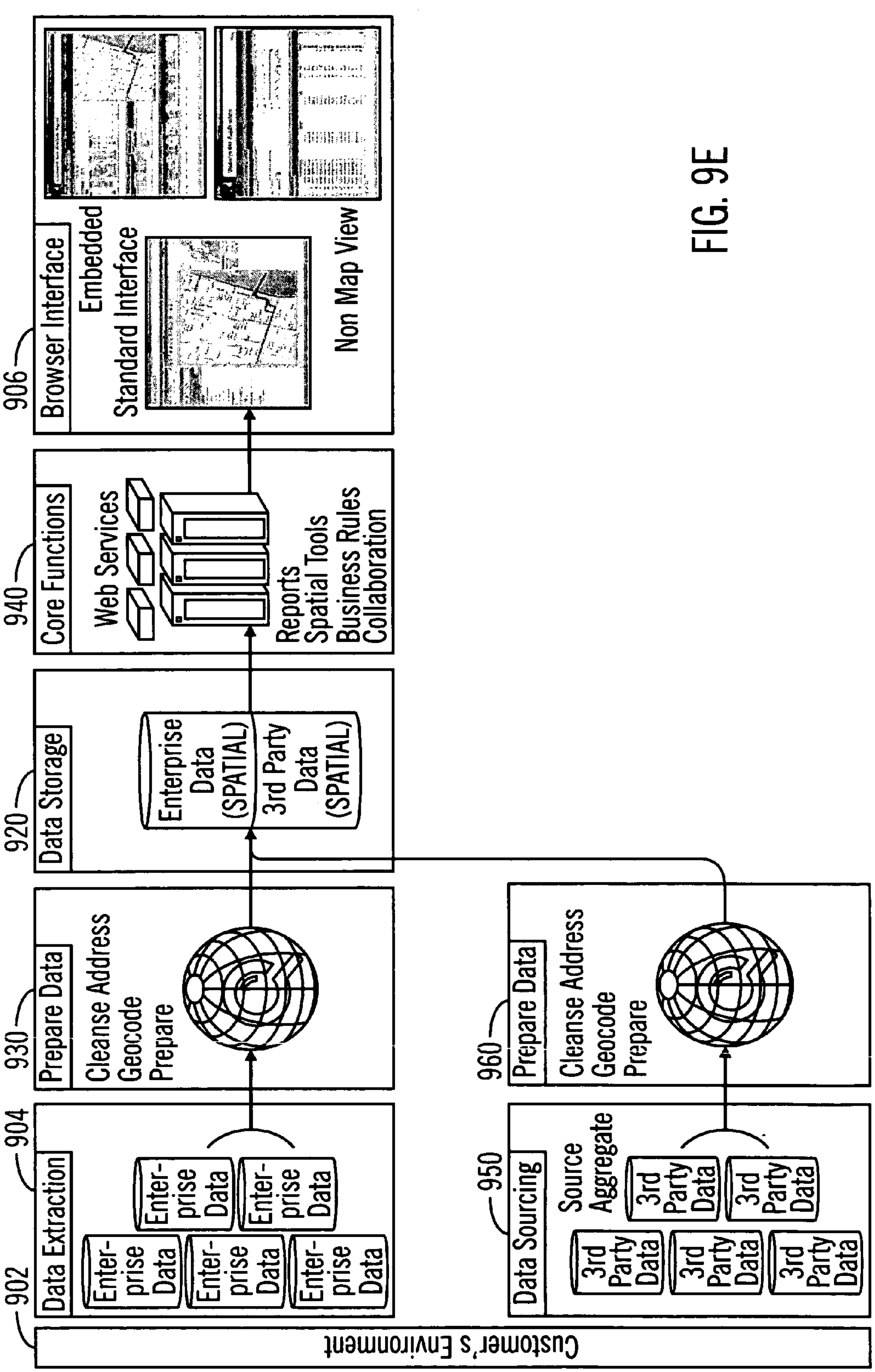

FIG. 9E differs from FIG. 9D in that the enterprise spatial system has been eliminated and all processing occurs in the customer's environment. Therefore, data sourcing 950 and preparing data 960 for third party data occur in the customer's environment 902.

Figure 10:
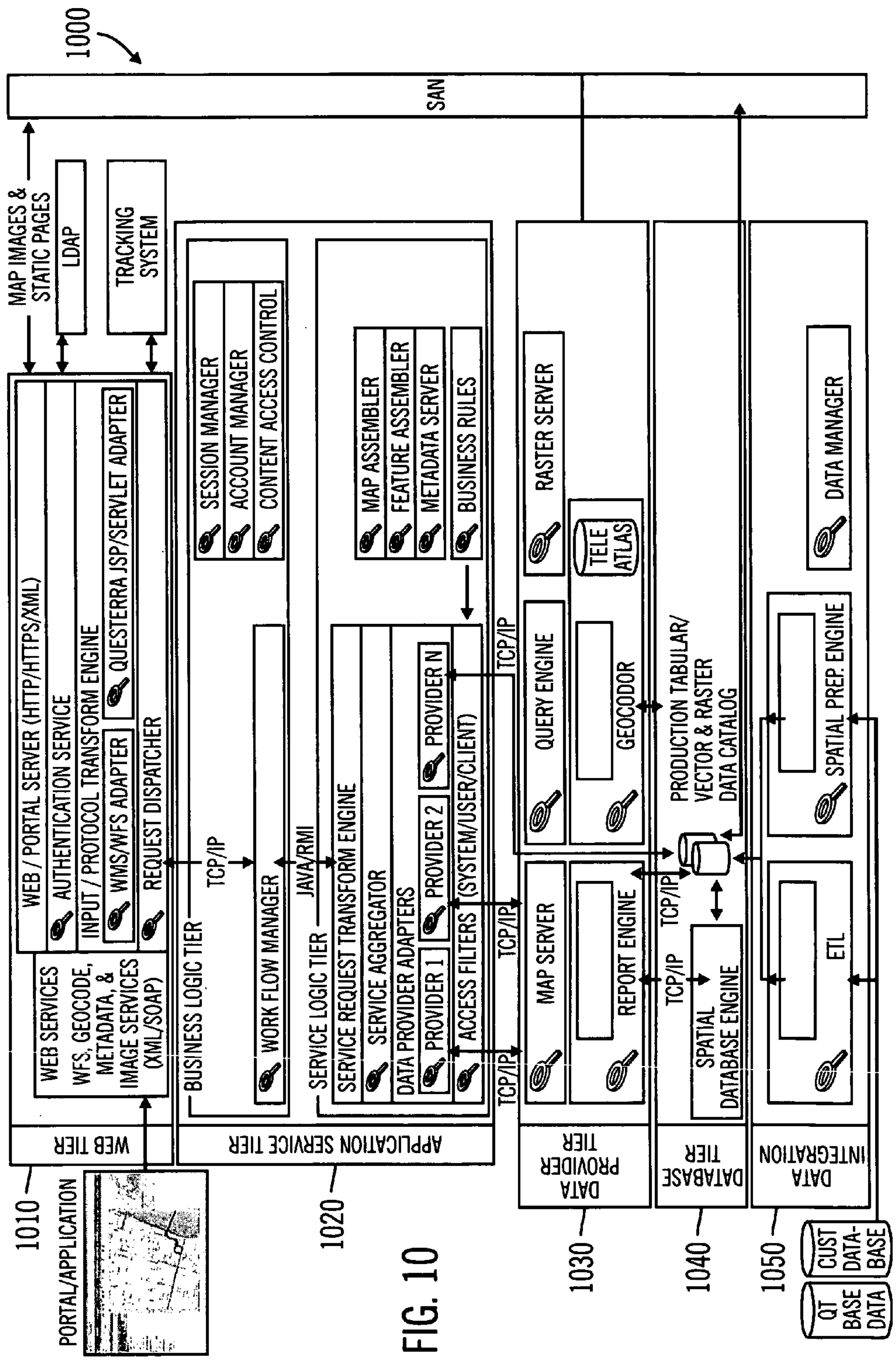
FIG. 10 illustrates a software architecture of a server system in accordance with certain implementations of the invention.

FIG. 10 illustrates a software architecture of a server system 1000 in accordance with certain implementations of the invention. The server system 1000 includes a Web tier 1010, an application server tier 1020, a data provider tier 1030, a data store tier 1040, and a data integration tier 1050.

A Web tier 1010 includes a Web/Portal server, an authentication service, an input/protocol transform engine, a request dispatcher, and Web services components to support requests coming from client software and return different data layers to the client software.

The Web/Portal server communicates via HyperText Transfer Protocol (HTTP), HyperText Transfer Protocol over Secure Socket Layer (HTTPS) or Extensible Markup Language (XML). The Web/Portal server serves up data (e.g., map images and static pages).

In certain implementations, the authentication service is an authentication module that plugs into the authentication framework of the Web/Portal server. One such authentication service uses Lightweight Directory Access Protocol (LDAP) as a back end authentication service provider.

The input/protocol transform engine provides the front end that understands the client protocol and converts the incoming requests to a canonical form to be used by subsequent server components. The input/protocol transform engine does not attempt to parse the actual service requests, but wraps the service requests in a standard form to be parsed subsequently by the service request transform engine in the service logic components of the application server tier 1020.

The input/protocol transform engine supports two transform components: a Web Map Server/Web Feature Server (WMS/WFS) adapter and a Java Server Page (JSP)/Servlet adapter. The WMS/WFS adapter is a Web services front end. In certain implementations of the invention, the Web Map Server/Web Feature Server may be one defined by the Open GIS Consortium, Inc. The JSP/Servlet adapter is a legacy server interface used by client software to send server requests wrapped in XML request packages.

The request dispatcher dispatches the incoming request to one of several subcomponents within the work flow manager, depending on the client software and the actual request being made. The request dispatcher interfaces with a tracking system that performs tracking of user requests and system usage reporting.

An application server tier 1020 is divided into a business logic tier and a service logic tier. The business logic tier includes a work flow manager, a session manager, an account manager, and content access control components to support administrative tasks related to servicing the user requests. The administrative tasks performed at this tier may also include various e-commerce related transactions, such as handling purchase orders, shopping cart management, billing, managing user profiles, and managing accounts.

The work flow manager manages the functions that are adjunct to the services requested by the client software. The work flow manager performs functions, such as checking access control to the data requested by the client, logging, tracking session validation, etc. The work flow manager uses the session manager, account manager, and content access control components to perform these functions. In particular, the work flow manager takes user requests from the client software and then makes function calls to different components to gather results. After gathering results, the work flow manager component aggregates the results, converts the aggregated results to a format expected by the client software, and sends the converted results back to the Web tier 1010. The Web tier 1010 uses the appropriate protocol (e.g., HTTP or XML) to send a response (which includes the results generated by the work flow manager) to the client software request.

An optional content usage monitor component may be included in the business logic tier to monitor contents and resources used and provide the necessary data for billing and resource planning. The content usage monitor component parses requests coming from a user via client software and logs parsed information to monitor how different contents or resources hosted by the server system are used. Contents in this context are application services and data made available to the users by the server system. Resources refer to system resources such as memory, file storage space, CPU utilization etc.

The service logic tier includes a service request transform engine, a service aggregator, data provider adapters, access filters (e.g., system, user or client), map assembler, feature assembler, metadata server, and business rules components to support various service logic.

In certain implementations, the following functions are supported by the service logic tier: image generation using mapping logic, spatial query analysis, report generation, and thematic report generation (i.e., generating a report based on a theme). For example, enterprise data and spatially referenced data may be combined to show different colors on a map to show different sales information based on different counties.

The service request transform engine consists of a collection of parsers and response message builders. The service request transform engine understands the grammar used by the client software to request services from the server system and receive responses back from the server system. In certain implementations, there is one parser/response message builder for each type of client application. In particular, the service request transform engine standardizes client requests into a standard format for the service aggregator.

The service aggregator coordinates the activities of one or more data provider adapters, which retrieve data based on client requests and convert the data to a form requested by the client software, and includes one or more data providers. A data provider adapter may be viewed as an intermediary that translates requests made by the service aggregator to a form that the actual data provider understands. This allows the service aggregator to interact with the data adapters in a common language/syntax. The data provider adapter performs the appropriate translation to pass the request on to the data provider in a possibly different language/syntax expected by the data provider.

A single client request may require more than one data provider to service the request. For example, the data provider required to render a vector layer may be a data provider called the Map Server. The client request may ask for more than one vector layer to be rendered. The service aggregator may instantiate more than one Map Server and coordinate the activities of these data providers to generate the response for the client request. Examples of service aggregators are: map assembler, feature assembler, and metadata server. The service aggregator understands requests from the client software and makes specific function calls to obtain requested data layers or analysis results.

Data provider adapters are plug-in points for back-end data service providers that are aggregated into services that are offered by implementations of the invention. The data provider adapters decouple the protocol and grammar used by a data service provider form the protocol and grammar used by the service aggregator. Examples of data provider adapters are: a Map Server, ArcIMS™ (a service access protocol available from ESRI), Oracle® Spatial Query Engine (a data access protocol available from Oracle Corporation), or ArcSDE™ (a data access protocol available from ESRI).

The access filters are run-time embodiments of data access rules that are set up using metadata. Access filters are applied to all data accesses, irrespective of the data provider used to access the data. In particular, the access filters receive business rules as input and use the business rules to filter data that may be accessed. Access filters may be specified at a system level, at a per user level or by the client software. System filters are applied to all data access requests irrespective of the user accessing the data. User filters are filters that are customized for specific users. So, for example, user filters may be set up such that the users from a particular sales territory will see only data for their own sales territory. Client filters are filtering rules requested by client software (e.g., client applications) based on user input.

The data provider tier 1030 includes a map server, a raster server, a report engine, a query engine, and a geocode server. The map server converts vector data to viewable images. The raster server converts raster data to viewable images. The report engine generates reports requested by clients from data. In certain implementations, the report engine uses Style Reports (which is available from InetSoft Technology Corp.). In certain implementations, the spatial data store engine (e.g., Oracle® Spatial Query Engine) in the data store tier 1040 interfaces with the report engine and data. The query engine provides spatial and non-spatial query access to data. The geocoder provides services to geocode requests from client software. In certain implementations, the geocoder may comprise software available from Sagent.

The data store tier 1040 includes a spatial data store engine and production tabular/vector data and raster data catalog. At this level, data access related functions are provided.

The data integration tier 1050 includes an extraction, transformation, and loading (ETL) component, a spatial data preparation engine, and a data manager. The ETL component is used to perform ETL functions for real-time and batch oriented data processing for hosted data. In certain implementations, the ETL component comprises DT/Studio™ software available from Embarcadero Technologies, Inc. The spatial data preparation engine is used for spatial manipulation of hosted data. In certain implementations, the spatial data preparation engine comprises a Feature Management Engine, which is available for purchase from Safe Software, Inc. The spatial manipulation involves cleansing spatial geometries, merging geometries to make the data rendering faster, re-sampling to create vector pyramid layers, etc. The data manager is used to create and deploy metadata for the hosted data. The data manager is also used to transport and deploy the hosted spatial and non-spatial data.

A Storage Area Network (SAN) connects data and components to other components. Also, there exist network (e.g., Wide Area Network (WAN), Local Area Network (LAN), Internet, etc.) connections to access enterprise data that reside outside of the server system 1000.

Figure 11A:
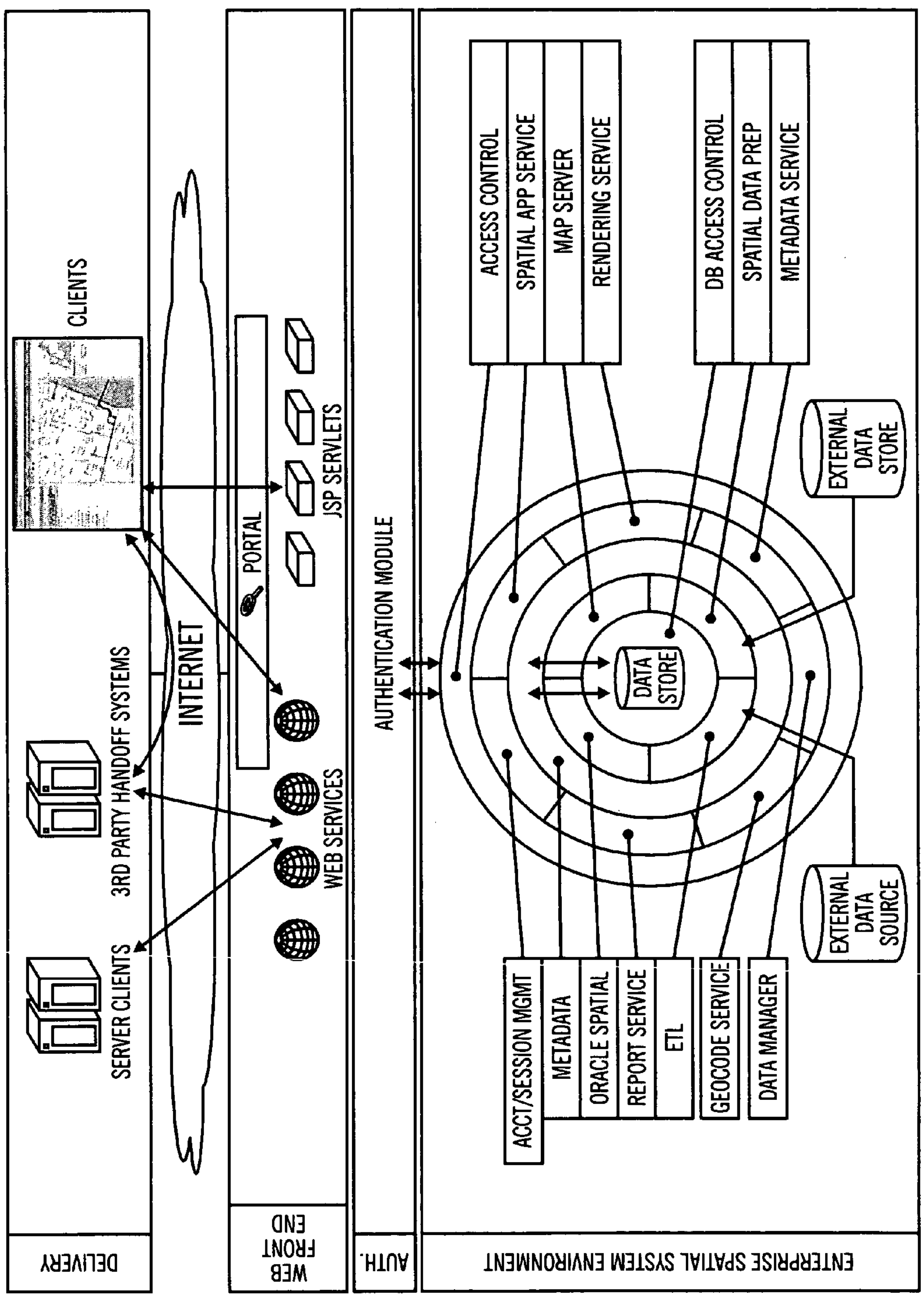
FIGS. 11A and 11B illustrate software and Web services architectures in accordance with certain implementations of the invention.

FIG. 11A illustrates a software and Web services architecture 1100 in accordance with certain implementations of the invention. A data store is accessed via a data store access control layer. The next outer layer includes data provider adapters, such as a map server, an Oracle® Spatial Query Engine, an ETL, and a spatial data preparation component. The ETL interfaces with a third party data source. The spatial data preparation component accesses a third party data store. The ETL and spatial data preparation components are used to store data in the data store. The access to data provider adapters and the data they work with are controlled using metadata about the data providers and the data. Thus, metadata acts as another software layer around the data providers and the data that the data providers work with.

The next outer layer includes all the functions and services offered by implementations of the invention to client software (e.g., client applications). These functions and services include, for example, account/session management (e.g., managing access control), a spatial application service (which provides functions, such as spatial queries, rendering of spatial images etc.), a rendering service, a metadata service (which retrieves and returns metadata about data layers available in the server system), a data manager, a geocode service, and a report service (for creating and generating various reports). The next outer layer includes access control, which controls access to the functions and services at the layer beneath it. The access control layer interfaces with an authentication module. The authentication modules controls security functions such as logging in/logging out. Above the authentication module, resides the Web front end, which includes a portal, Web services/SOAP, and JSP/Servlets. Above the Web front end, are systems to which data and results may be delivered.

Figure 11B:
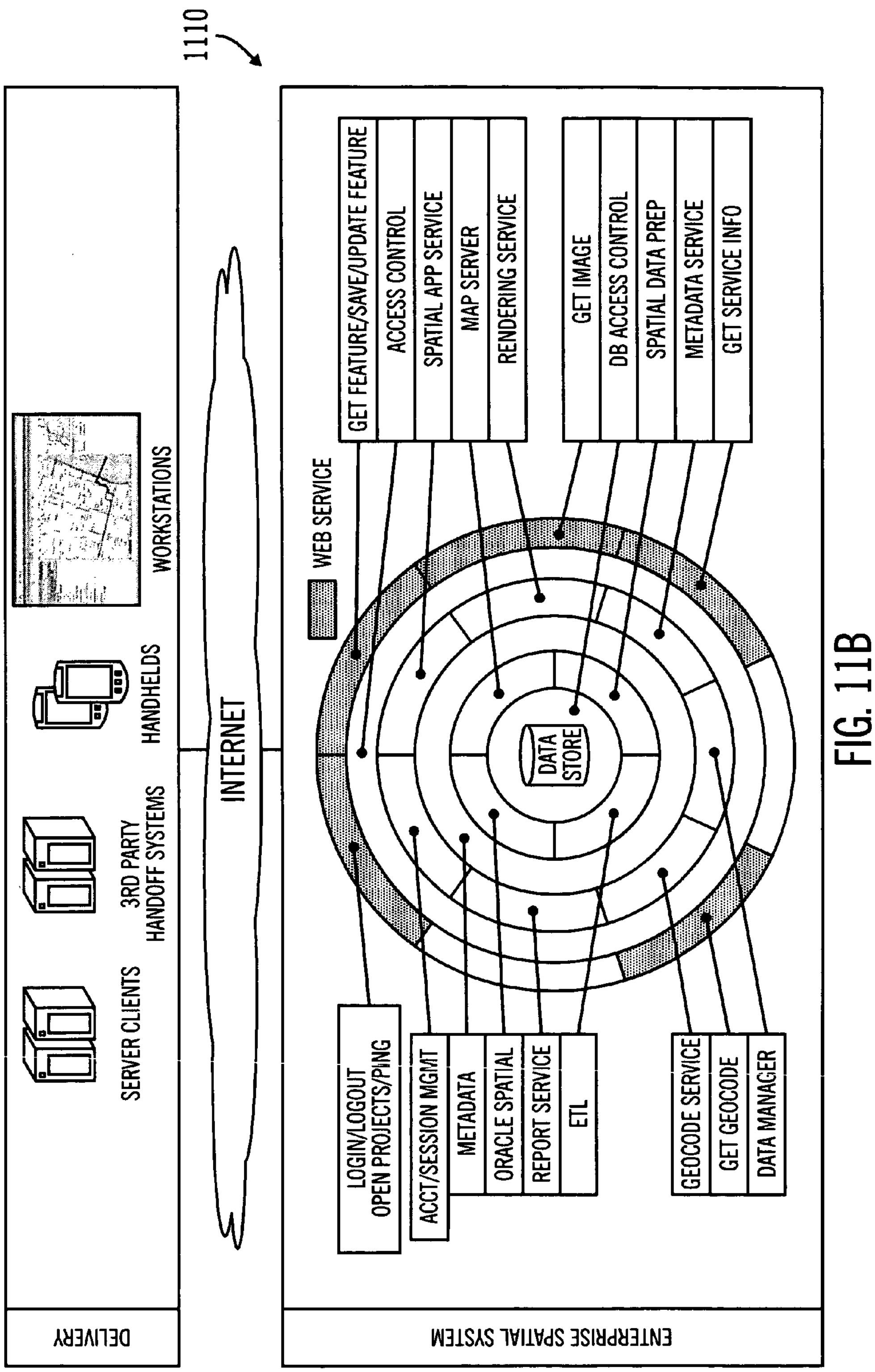

FIG. 11B illustrates an alternative software and Web services architecture 1110 in accordance with certain implementations of the invention. A data store is accessed via a data store access control layer. The next outer layer includes data provider adapters, such as a map server, an Oracle® Spatial Query Engine, an ETL, and a spatial data preparation component (for preparing data by, for example, geocoding the data). The data provider adapters interface with metadata. The next outer layer includes account/session management, a spatial application service, a rendering service, a metadata service, a data manager, a geocode service, and a report service. The next outer layer includes. access control.

The next outer layer includes functions, such as, login/logout, open projects, ping, GetFeatures/Save/UpdateFeatures, GetImage, GetServiceInfo, and GetGeocode. GetFeatures/Save/UpdateFeatures retrieves, saves and updates spatial data in spatial data sets. GetImage generates a viewable image of spatial data. GetServiceInfo retrieves metadata about data sets. GetGeocode retrieves location information such as latitude and longitude from business data such as an address, intersection, name of place, landmark etc.

C. Integrating with Enterprise Data

Currently, many enterprise customers use business support systems (BSS), such as CRM, ERP, and SCM to improve revenue growth, customer satisfaction, and employee productivity. Although BSS solutions are very beneficial to businesses, there are many limitations as well, such as when customers want to visually analyze BSS data that they have stored in their data stores. In the past, there has been no convenient way for companies to integrate their private BSS data with other data and to display the results on specific maps. If a user organization were to integrate its BSS data with other data (e.g., geographic information), it would require substantial capital for purchasing computer hardware, big storage devices, spatial management software, and relevant geographic data as well as the need to constantly update geographic data on storage devices.

By using geospatial information, individuals can work more efficiently because they can view and easily analyze certain situations if a lot of discrepancies exist based on geographic locations. Implementations of the invention are designed to integrate third party organization/enterprise data and spatially referenced data. With reference to FIGS. 9A–9E, third party data and enterprise data may be integrated for use in generating spatially referenced data layers.

For example, the invention systems allow one government user to login from a browser that is hosted by, say, the manager of the invention system to access spatial data. At the same time, this government user can access the data from said user's own data store hosted by its government agency. However, because of access restrictions provided by the system manager, this user cannot access other third party data from different third parties. Furthermore, when users are accessing their organization's data using implementations of the invention, the data is secure and hackers cannot tamper with the data.

Figure 12:
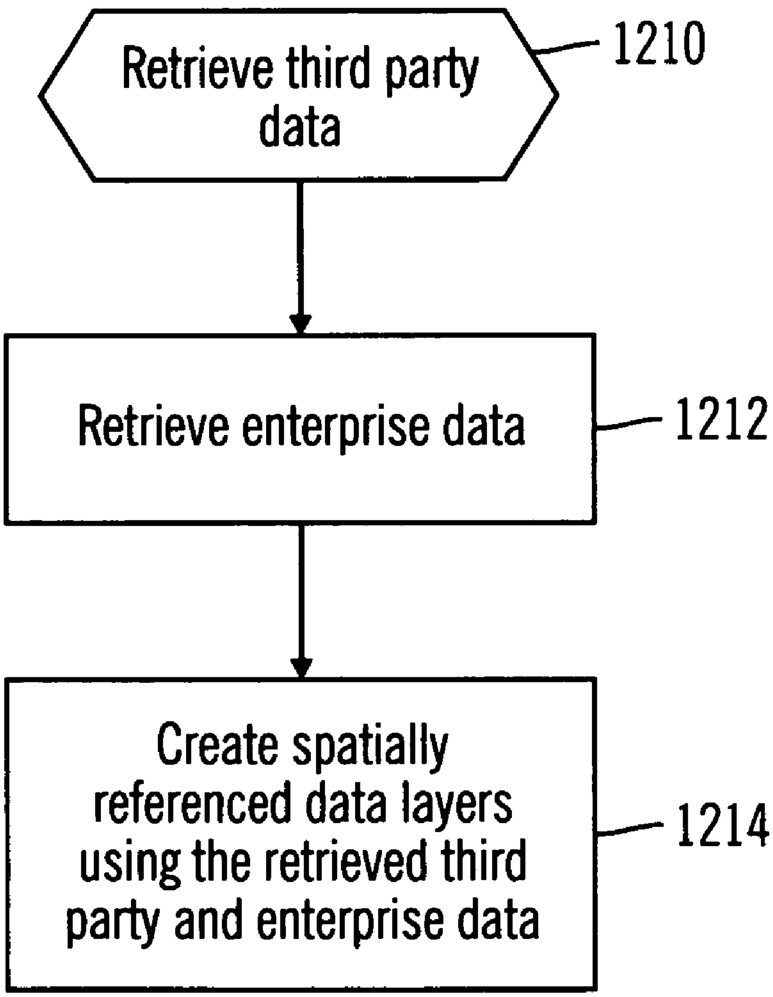
FIG. 12 illustrates processing for integrating third party data and enterprise data in accordance with certain implementations of the invention.

FIG. 12 illustrates processing for integrating third party data and enterprise data in accordance with certain implementations of the invention. Control begins at block 1210 with retrieval of third party data. In block 1212, enterprise data is retrieved. In block 1214, spatially referenced data layers are created using the retrieved third party data and enterprise data.

D. Dynamic Generation, Display, and Manipulation of Multiple Data Layers of Spatially Referenced Data Implementations of the invention provide a technique to generate and display composite images made of multiple data layers. In particular, a server system generates individual spatially referenced images for each data layer, which may be referred to as "image layers". A spatially referenced image or image layer is a type of data layer. The server system sends each individual image layer to client software. The client software overlays the image layers to display them as a single composite image.

Figure 13:
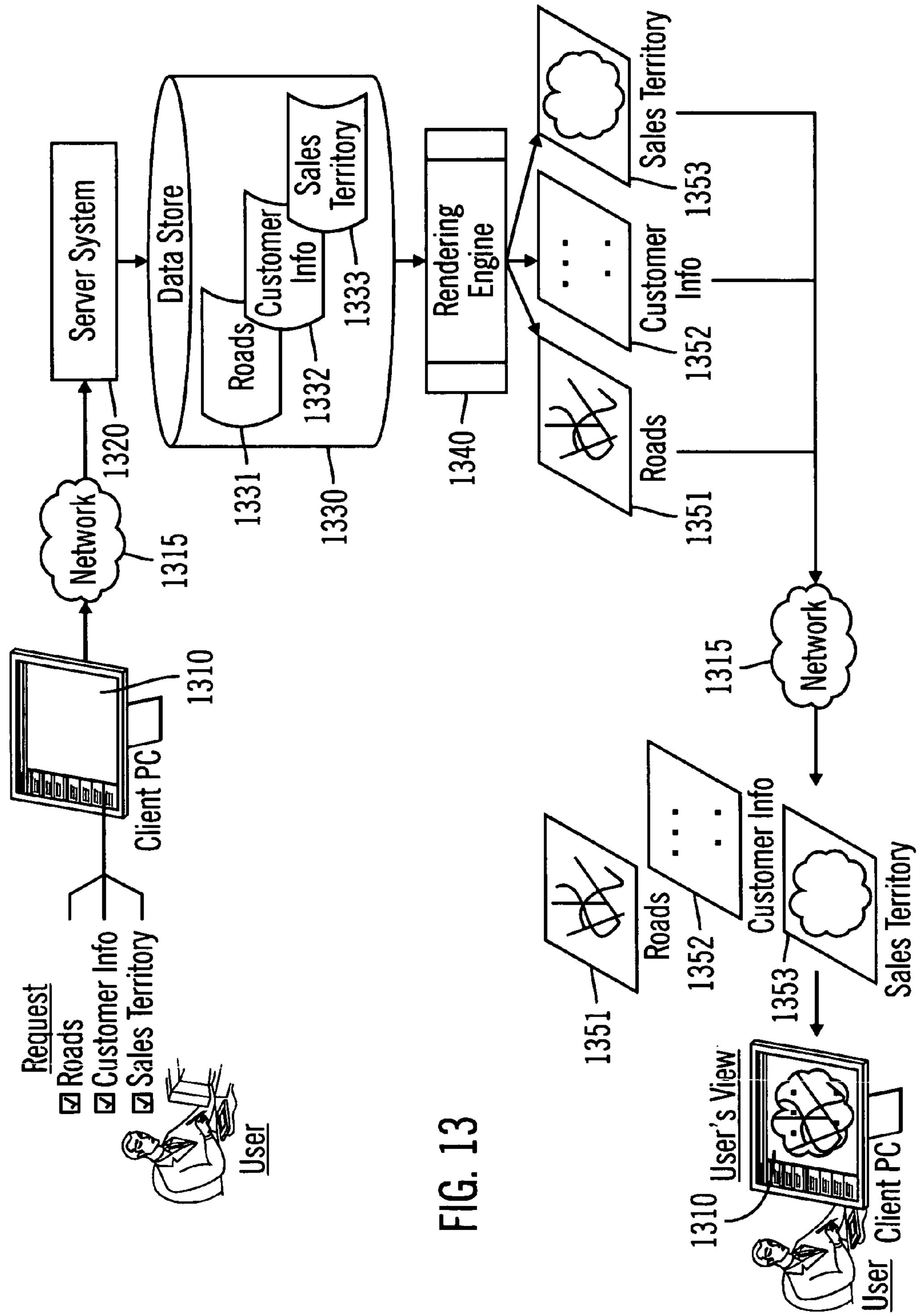
FIG. 13 illustrates multiple data layering in accordance with certain implementations of the invention.

FIG. 13 illustrates multiple data layering in accordance with certain implementations of the invention. Certain implementations of the invention may be implemented in a large distributed computing environment. The computing environment may include, for example, client software 1310, a server system 1320, a data store 1330, and a rendering system 1340. In certain implementations, as illustrated in FIG. 13, the rendering system 1340 is separate from the server system 1320, however, in other implementations, the rendering system 1340 may be part of the server system 1320. A user utilizes the client software 1310 on a computer that is connected via a network 1315 to the server system 1320 to make a request for data. An example of the user's request is a request for a view of customer information and locations in a specific sales territory. The request is sent to the server system 1320, and appropriate data within a data store 1330 is accessed (e.g., raw data, tabular, raster data, vector data, etc.). The data in this example may include customer information 1332, roads information 1331, and/or sales territory boundaries 1333.

Each data set of the retrieved data is processed by a rendering system 1340 to be transformed into a spatially referenced image (e.g., bitmap, JPEG, TIFF, Graphics Interchange Format (GIF), Portable Network Graphics (PNG), etc.). As part of this transformation, the coordinates of the data and a description of how data is to be displayed are embedded into each image layer. The results of the transformation are individual image layers, each of which contains a graphical and text representation of each data set. That is, each data set in the data store corresponds to an image layer. Again, in this example, the image layers consist of a roads image layer 1351, a customer information image layer 1352, and a sales territory image layer 1353.

The individual image layers are sent, via a network 1315, to the client software 1310 at the user's computer. The client software 1310 caches each individual image layer in local memory, and then uses image overlaying techniques known in the art to display the requested image layers to the user. The image layers, in this example, the roads image layer 1351, the customer information image layer 1352, and the sales territory image layer 1353, are individually cached into memory and overlaid and displayed to the user.

Figure 14:
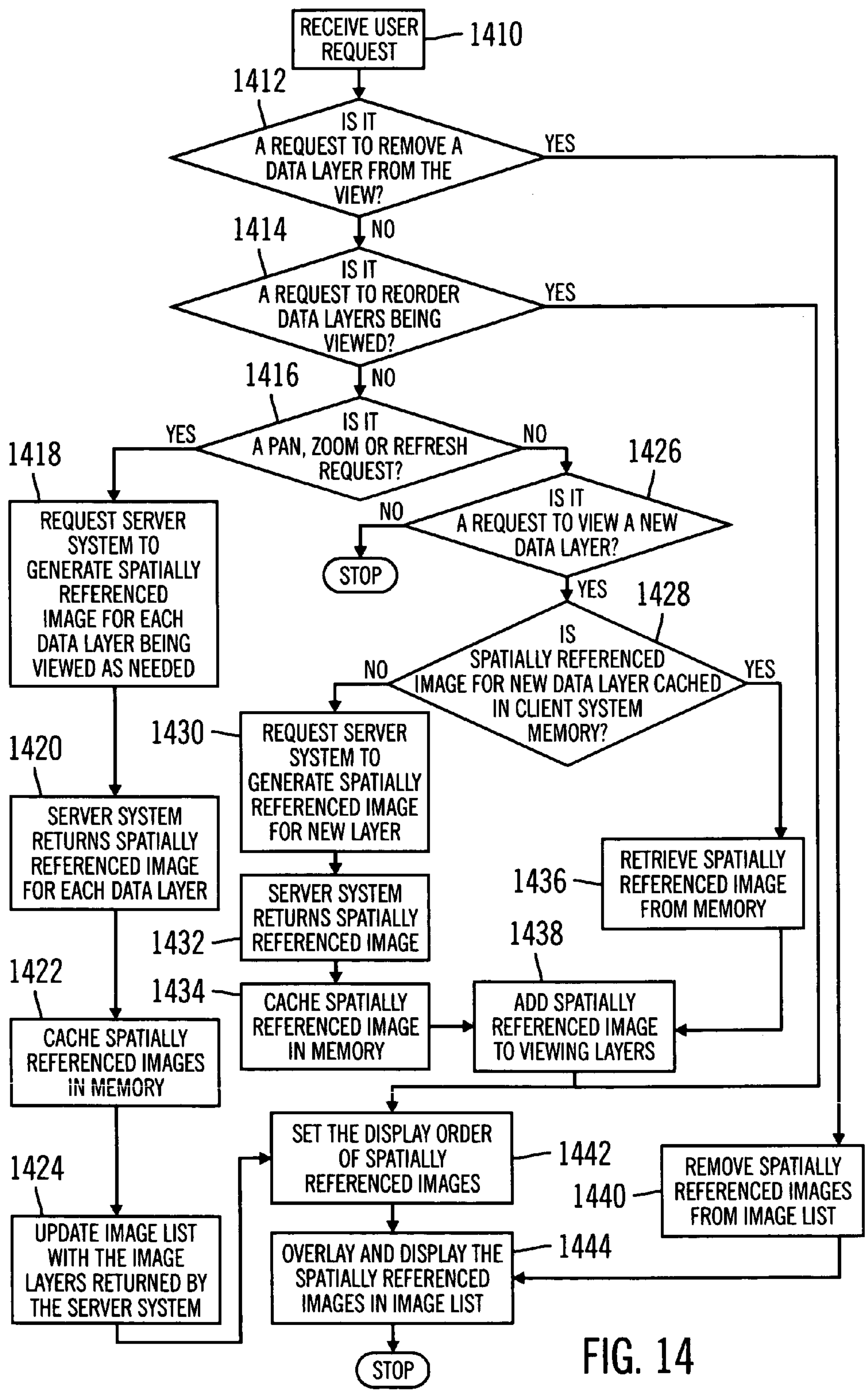
FIG. 14 illustrates logic for multiple data layering in accordance with certain implementations of the invention.

FIG. 14 illustrates logic for multiple data layering in accordance with certain implementations of the invention. Users may view and analyze data spatially in a client-server environment using client software. In particular, image layers are presented to users in the client software UI screen as data layers. The user may choose to view one or more data layers among the data layers available by "turning on" one or more desired data layers in the UI screen. The user may choose not to view a data layer by "turning off" the data layer in the UI screen.

In FIG. 14, control begins in block 1410 with receipt of a user request, which was submitted via a UI screen displayed by client software. The client software allows users to control the viewing of different data layers by providing a Layer Control window in the UI screen that allows the user to turn on and off different data layers ((e.g., using a check box for each data layer on the UI screen). When a user wants to turn off a data layer, the client software does not need to go to a server system to request a new raster or vector data file if the client software already has that data layer in storage (e.g., in memory or on a connected storage device) on a client system. In certain implementations, images layers for data layers are created such that the empty areas in the spatially referenced image are transparent. This allows different data layers to be overlaid on top of each other without affecting the display of the data layers that are below. If a user wants to reorder the way in which data layers are displayed, this can be done, via the user interface, without gathering new raster or vector image files from the server system. When a user changes the order of layers by using the Layer Control window, the client software simply reorders the data layers and redisplays them.

In certain implementations, the client software supports the multiple data layering mechanism by using Dynamic Hyper-Text Markup Language (DHTML). Web browsers support the ability to dynamically display images by inserting what is commonly referred to in the art as image tags into a window in the browser's viewing area. DHTML is used to insert image tags into a viewing window. In certain implementations of the invention, this viewing window is called the Map Control window. The client software running on the user's machine (e.g., a client system) keeps track of the data layers it is manipulating in a memory structure called a layer object. Each layer object has information on where to find the locally cached image for that data layer. The data layers currently being viewed by the user are represented in a list of layer objects. Although examples herein refer to "list" of layer objects, any structure may be used without departing from the scope of the invention. In certain implementations of the invention, the client software inserts one image tag into the Map Control window for each layer object in the list of layer objects. This prompts the browser to fetch the image for that data layer from cache and display it in the Map Control window. When more than one image tag is inserted into the Map Control window, the browser overlays the image in the order in which the image tags are inserted.

That is, the client software manages the spatially referenced images for each data layer independently. The individual spatially referenced images are cached in local memory by the client software. The individual spatially referenced images are combined (e.g., overlaid using well-known overlaying techniques) by the client software based on user input to create a composite image for viewing by a user. Examples of overlaying techniques used by the client software include DHTML in a browser and data overlaying techniques supported by computer programming languages such as Java, C/C++ and C#.

In block 1412, it is determined whether the request is to remove a data layer from the displayed view. If so, processing continues to block 1440, otherwise, processing continues to block 1414. In block 1440, the data layer is removed from the list of data layers being viewed (i.e., the "image" list) by removing the layer object for the data layer from the list of layer objects. In block 1444, the spatially referenced images in the updated list of data layers being viewed are overlaid and displayed (e.g., by clearing the Map Control window and inserting new image tags for all the layer objects left in the list of layer objects). That is, when the user "turns off" a data layer, the client updates the list of layer objects to exclude this data layer from an image list. Although examples herein refer to image "list", any structure may be used without departing from the scope of the invention. Then, the client software overlays the data layers in the list of data layers being viewed and displays the resulting overlaid composite image. The client software is able to perform this processing without communicating with the server system.

In block 1414, it is determined whether the request is to reorder data layers. If so, processing continues to block 1442, otherwise, processing continues to block 1416. In block 1442, the display order of the spatially referenced images associated with the data layers are set to match the user's request. The client software does this by reordering the layer objects in the list of layer objects for spatially referenced images being viewed. Then, processing continues to block 1444, and the spatially referenced images in the reordered image list are overlaid and displayed. This is accomplished by clearing the Map Control window and reinserting image tags into the Map Control window following the new order of image layers. That is, when the user changes the order in which the image layers are viewed or overlaid, the client software reorders the image list and overlays the spatially referenced images in the new order for display without communicating with the server system.

In block 1416, it is determined whether the request is to pan, zoom or refresh. If so, processing continues to block 1418, otherwise, processing continues to block 1426. In block 1418, the client software requests the server system to generate spatially referenced images for each data layer being viewed by the user for which there are no spatially referenced images in cache. In block 1420, the server system generates an individual spatially referenced images for each data layer and returns these as individual spatially referenced images to the client software. In block 1422, the client software caches the spatially referenced images in memory. The image list is updated in block 1424 with the new spatially referenced images returned from the server system. The client software does this by updating the layer objects in the list of layer objects. The client software reorders the image list in block 1442, if needed, based on the order in which the user wishes to view the data layers. Then, in block 1444, the client software overlays the spatially referenced images in the desired order and displays the resulting overlaid image to the user by clearing the Map Control window and reinserting image tags for the images represented in the list of layer objects.

In block 1426, it is determined whether the request is to view a new data layer. If so, processing continues to block 1428, otherwise, processing is complete. When the user "turns on" a data layer, the client software in block 1428 will determine whether the spatially referenced image for the data layer is cached locally in memory at the client system. If so, processing continues to block 1436, otherwise, processing continues to block 1430.

If the spatially referenced image for the data layer is present and cached in local memory, the client software in block 1436 retrieves the spatially referenced image from local memory. Then, in block 1438, the client software updates the image list of images being viewed to include the cached spatially referenced image that has been requested by the user. The client software accomplishes this by adding the layer object for the new image layer to the list of layer objects representing the spatially referenced images being viewed. The client software reorders the image list in block 1442, if needed, and overlays the spatially referenced images in the image list and displays the overlaid image to the user (block 1444) by clearing the Map Control window and reinserting image tags for each of the layer objects in the layer objects list. The client software is able to perform this processing without communicating with the server system.

At block 1428, if it was determined that the spatially referenced image for the data layer the user "turned on" is not cached in local memory, the client software sends a request to the server system in block 1430 to generate the spatially referenced image for that particular data layer. In block 1432, the server system generates and returns the spatially referenced image. When the client software receives the spatially referenced image for the data layer, the client software caches the spatially referenced image to local memory in block 1434. Then, the client software updates the image list to include the newly "turned on" data layer in block 1438 by adding the layer object for the new image layer to the list of layer objects. The client software reorders the image list in block 1442, if needed. Next, the spatially referenced images in the image list are overlaid and displayed to the user in block 1444 by clearing the Map Control window and reinserting image tags for each of the layer objects in the layer objects list.

When the user performs other actions, such as annotation or spatial analysis functions that result in additional spatially referenced images, the additional spatially referenced images are added to the image list in block 1438 as new spatially referenced images, the image list is reordered if needed in block 1442, and a new overlaid image is generated and displayed by the client software in block 1444.

In summary, implementations of the invention provide an efficient technique for updating spatially referenced images seen by the user of client software in a client server environment. Moreover, the time it takes to update the image layer seen by the user of the client software is minimized when the user updates the data layers currently being viewed, since the client software is able to perform the update in local memory at the client system. Also, an efficient technique for updating the spatially referenced images seen by the user of client software is provided, without the need for complex image generation software logic in the client software.

When the user of the client software updates the data layers being viewed the client software performs the update locally at the client system. This minimizes server system data processing load. Additionally, the server system generates new spatially referenced images only for data layers for which a spatially referenced image was not previously created. This also reduces server system data processing load.

E. Accessing and Processing Data Available in Real Time

Implementations of the invention automatically process data (e.g., vector, raster, and tabular data) and automatically enable the processed data in a server system to be viewed spatially by client software. Vector and raster data are updated to allow efficient access to the data in a client/server environment. Location information in tabular data is used to dynamically generate and link spatial coordinate information, such as X/Y or Latitude/Longitude coordinates, to the tabular data. This allows the tabular data to be viewed spatially using the client software. Metadata is dynamically generated based on business rules or instructions that define how the data should be presented in using the client software. Additional metadata is created based on access rules that restrict access to the data.

Conventional systems are unable to provide a real-time automated manner in which data can be acquired into a client server environment and make it viewable as spatially referenced data.

The process of making non-spatially and spatially referenced data available to a client for viewing in a spatial context includes, for example, automated data processing and automated activation of data for use by client software, in real time and without terminating client systems logged in to the server system. Automated data preparation is the process of taking data and automatically transforming the data and/or adding to the data so that the data may be viewed spatially by a client system. Automated activation of the data is the process of automatically, at the server system, making the newly prepared data available to the client system. The data prepared by implementations of the invention is immediately available for the client software to use, without the need to restart any server applications or client software.

Figure 15:
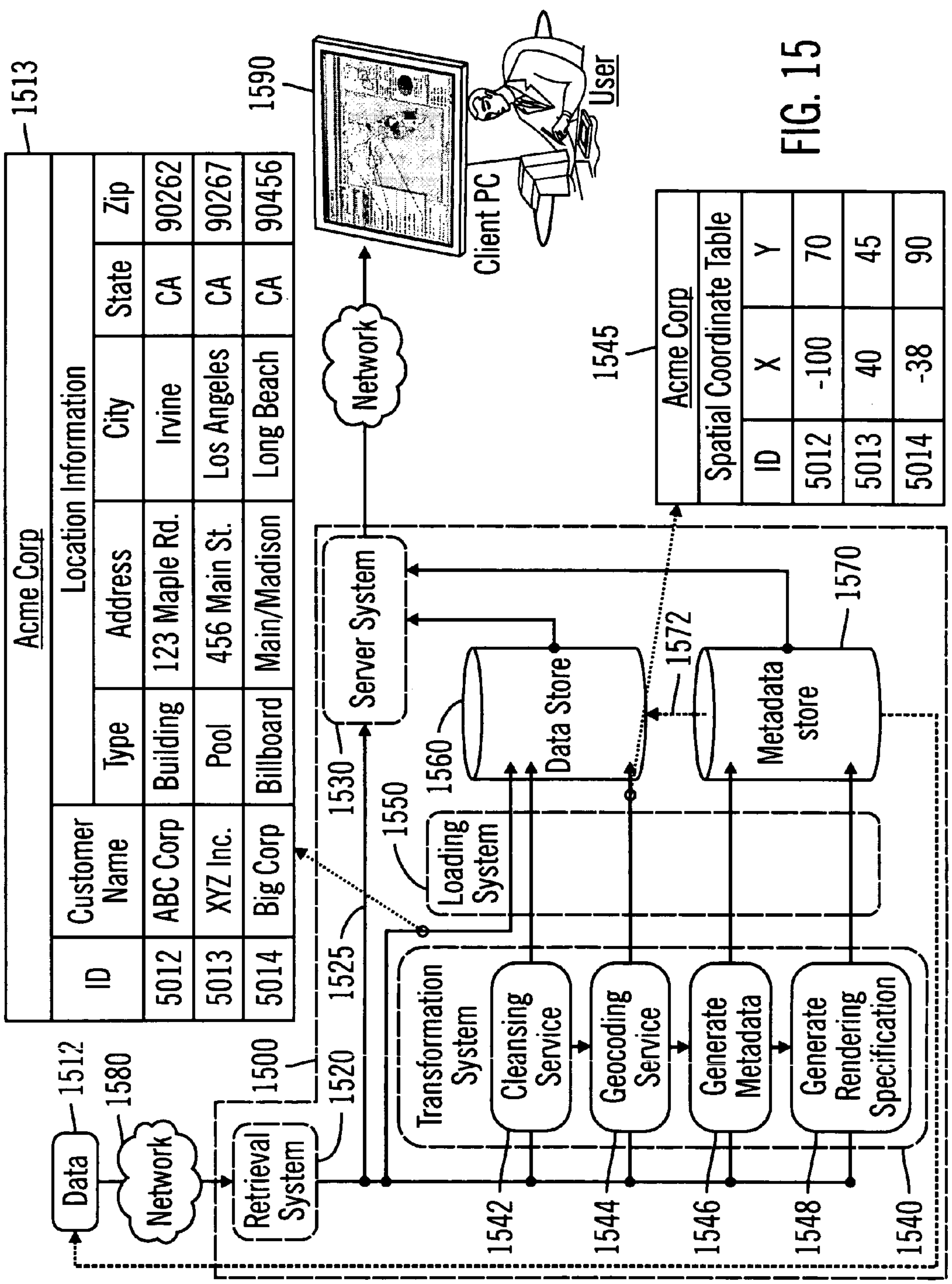
FIG. 15 illustrates a distributed computing environment in accordance with certain implementations of the invention.

FIG. 15 illustrates a distributed computing environment 1500 in accordance with certain implementations of the invention. The lines connecting components/blocks in FIG. 15 represent a particular flow to assist with understanding of the invention, but it is to be understood that data/communications may flow in any direction (e.g., the client software 1590 sends a request for data to the server system 1530). The distributed computing environment includes a retrieval system 1520, a transformation system 1540, a loading system 1550, a data store 1560, a metadata store 1570, and a server system 1530. The transformation system 1540 includes a cleansing server 1542, a geocoding service 1544, metadata generation 1546, and rendering specification generation 1548.

Implementations of the invention allow users at client systems to view both data stored in data stores in the distributed computing environment 1500 (i.e., a type of enterprise spatial system) as well as data stored in a customer's environment (e.g., their own server infrastructure). Examples of data stored in a data store at the distributed computing environment 1500 include a data store table that contains data for roads in the country. The distributed computing environment 1500 also makes data that is obtained from external applications available to its client systems. One such example of this type of data is customer data for a company obtained from a Customer Relationship Management (CRM) system located in the customer's environment.

Implementations of the invention make new data 1512 available to a client system through data preparation and use of metadata. Data preparation refers to preparing the data for viewing spatially. The data preparation process involves one or more of the following sub-processes: data retrieval 1520, data cleansing 1542, geocoding 1544, metadata generation 1546, rendering specification generation 1548, and data uploading 1550. In certain implementations, some of the sub-processes involved in data preparation may not need to be performed when new data is processed by the system. For example, if the data being made available to the clients is already spatially referenced, then geocoding 1544 is not performed on the data. Another example is the case in which the data being made available to the client is retrieved by the server system in real time when the client requests the data. In this scenario, the loading system 1550 is not needed. Unlike conventional systems, all the sub-processes for the data preparation process are performed automatically and, if needed, in real-time.

Data retrieval 1520 is the process of gathering the data that needs to be presented to the client system. Data retrieval 1520 gathers data from sources of data 1512 on a local system or from remote systems across a network 1580. Data retrieval 1520 works with files, data stores, applications (e.g., CRM systems), and client software 1590 (e.g., browsers and standalone client software). An example of data retrieved from a file is a company's inventory data in a file in Comma Separated Values (CSV) format. The same information can also be retrieved from a data store across a network 1580. An example of data retrieved from an application may be a company's customer information retrieved from a CRM system by interfacing with the APIs exposed by the CRM system. Data retrieval 1520 works with client systems that allow users to enter data through client software 1590. For example, when a report of a fire is called in to a dispatch center for a fire department, personnel at the dispatch center may enter the location of the fire in real time using a web page. The data retrieval 1520 gathers the real time data and then automatically loads the data in real time into the data store (e.g.,1160) used by the server system 1530. Then, after data preparation is done, with implementations of the invention, client software 1590 is able to show the location of the fire in real time to the fire department so that they can respond to the fire immediately.

Address cleansing 1542 and geocoding 1544 may also be performed in real time on the data, depending on the format in which the data is entered using the web page. Address cleansing 1542 is the process of updating the address information associated with the data elements to correct inconsistencies in the data in order to accurately assign spatial coordinates to the data to be viewed spatially. For example, address cleansing 1542 corrects a misspelled name of a city in an address. Geocoding 1544 is the process of generating spatial coordinates (e.g., latitude and longitude) that pinpoint a point on earth from location information and associate the point with data. Examples of location information include an address, cross streets, a landmark name (such as The White House), etc. For example, the process of geocoding 1544 will add spatial coordinates such as (X,Y) coordinates for each entry in a data set 1545.

With metadata generation 1546, the metadata about the data that is being prepared is generated and stored in the metadata store 1570. When client software 1590 requests the server system 1530 to view data 1512, the server system 1530 uses metadata stored in a metadata store 1570 to locate, retrieve, and render the data for the client software 1590. For example, if the data is stored in a table in a data store, the metadata includes information, such as the name of the data layer as it will be presented in the client software 1590, the name of the data table in which data is stored, the location of the data store in which the table is located, security credentials required to access the table, information on how to render the data, etc. It would be apparent to those skilled in the art that the metadata mentioned above could alternatively be provided along with the data to be processed and presented to the user spatially, utilizing XML or other message or content descriptive formats.

The rendering specification generation 1548 generates a rendering specification, which describes how data should be presented to the client software 1590. For example, the rendering specification for customer data for a company may specify: "Point size=12, Point color=red". The server system 1530 uses the rendering specification to display a point that is red in color and 12 pixels wide on the display screen of the client system at each point at which a customer is located. The rendering specification may be stored in the metadata store 1570.

Each set of data in the data store 1560 may be associated 1572 with one or more rendering specifications in the metadata store 1570. Thus, implementations of the invention show the same data in different forms to different client software, without creating multiple versions of the same data and storing the multiple versions.

The loading system 1550 loads prepared data into a data store (e.g., 1560) to be used by the server system 1530. In certain implementations, data is passed through the server system 1530 to the client software, without loading the data into data store 1560, via line 1525. For example, if a government or corporate entity does not want their data stored in data store 1560, the data could be retrieved 1520 and passed to server system 1530 for transmission to client software 1590. Implementations of the invention retrieve and display data residing on a customer location across a network 1580 in real time, and, in this scenario, the loading system 1550 may not be needed.

Figure 16A:
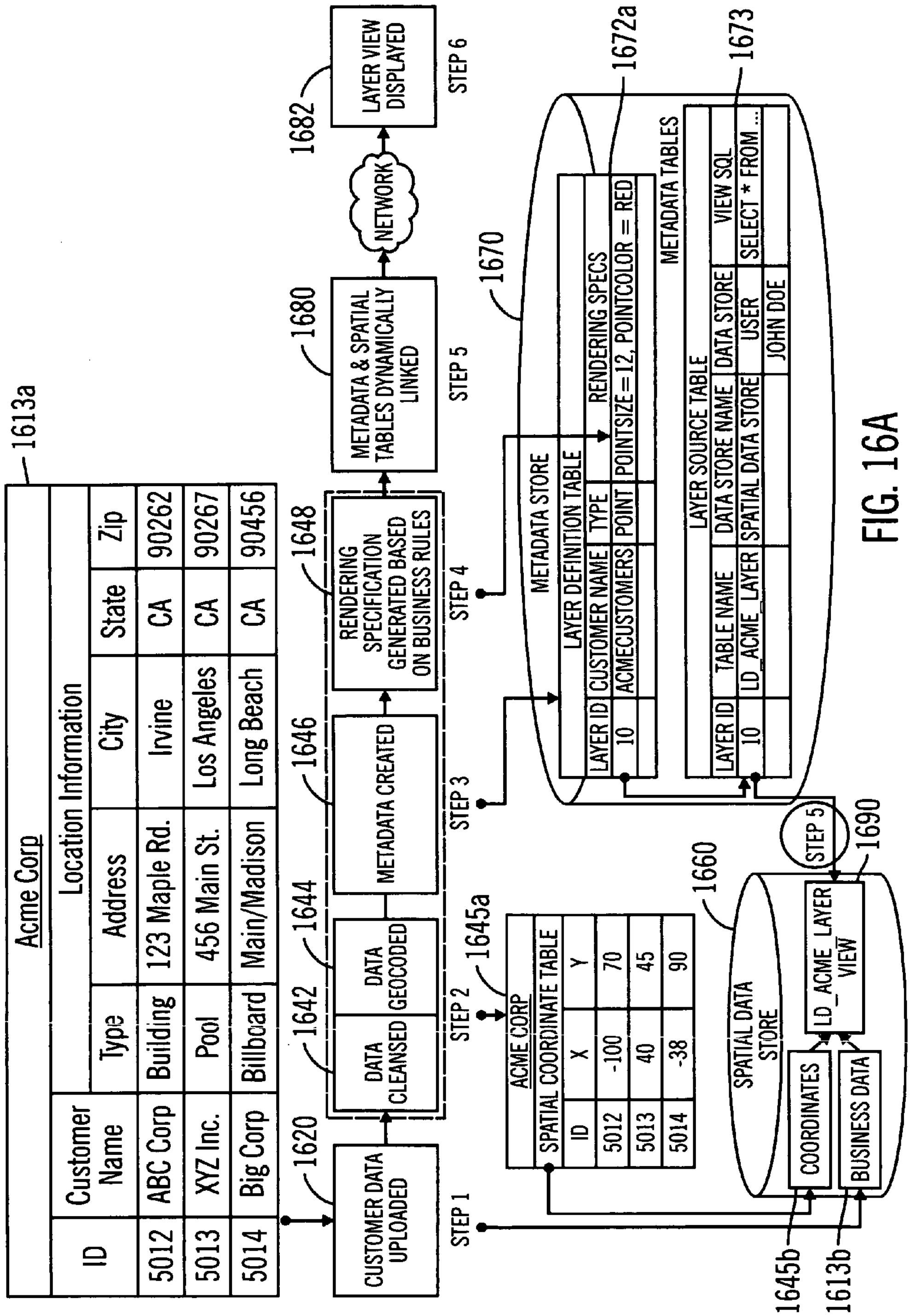
FIGS. 16A–16B illustrate data preparation in accordance with certain implementations of the invention.
Figure 16B:
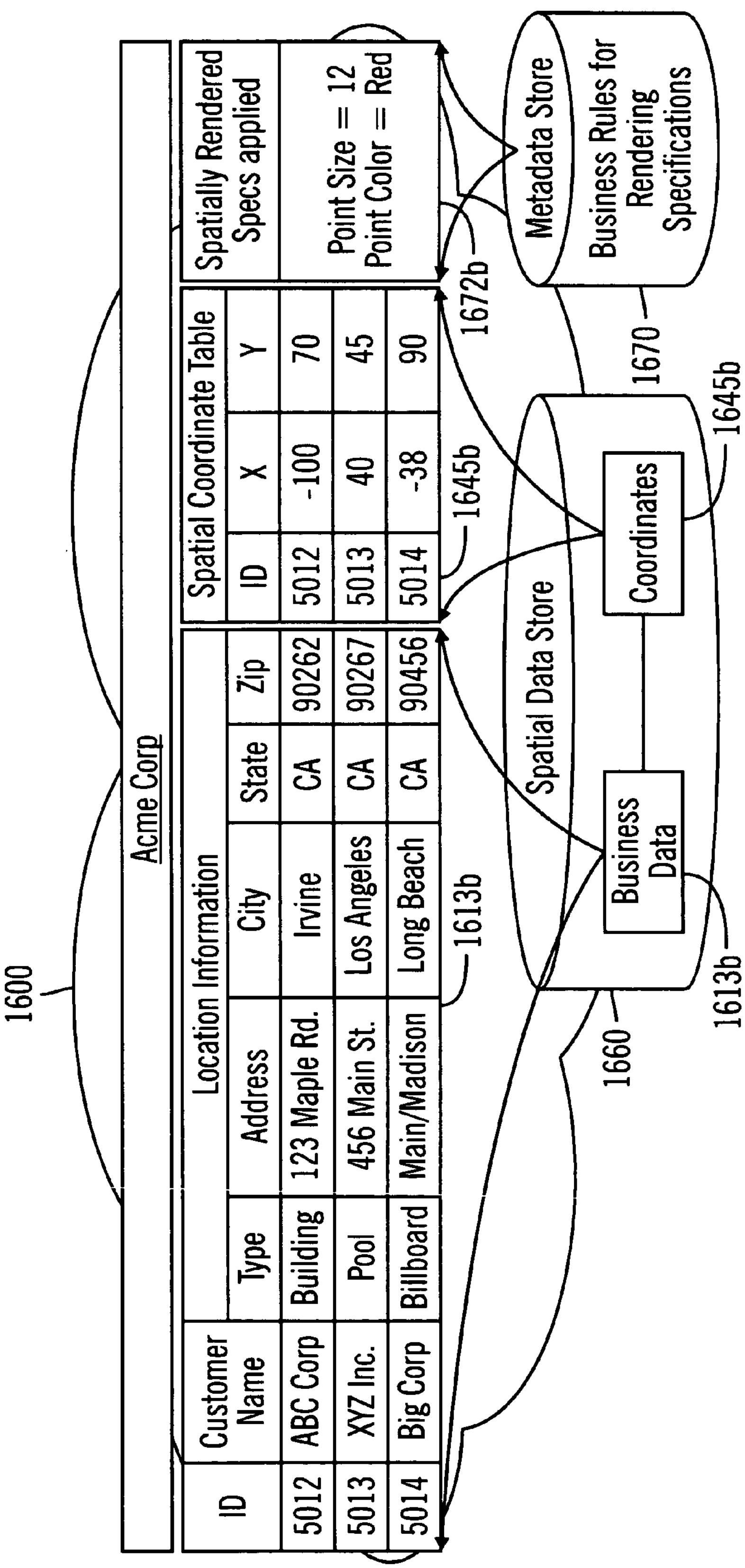

FIGS. 16A and 16B illustrate data preparation in accordance with certain implementations of the invention. Unlike conventional systems, implementations of the invention automate the data preparation process. FIGS. 16A and 16B describe some of the metadata elements created during automated data preparation. Implementations of the invention automate the data preparation process by using another set of metadata (not shown in FIG. 16A or 16B) stored in the metadata store 1570 that describes the data preparation process for each individual set of data.

When the requested data is displayed to the client software 1600, the requested data is not retrieved from a static table. Instead, the client software's 1600 view is a representation of the information that is being displayed from multiple data sources dynamically. These individual and multiple data sources include, but are not limited to, business data 1613*b* and spatial coordinates 1645*b* from separate tables within the spatial data store 1660, as well as, rendering specifications derived from business rules stored in metadata store 1670. Metadata is used to link these multiple tables together dynamically.

In certain implementations, specific software modules perform sub-processes for the data preparation process, and a master software process coordinates the actions of these individual software modules by using metadata in metadata store 1670 to decide which software modules are to be activated to perform the data preparation. For example, the metadata may indicate whether the data includes coordinates, and, therefore, geocoding is not necessary.

The metadata also provides information needed by the individual software modules. For example, a piece of information that the loading system 1550 needs is the name of the table into which the data should be loaded, and this data is provided by the metadata 1673. The metadata also has elements that describe the status and results of each one of the sub-processes of the data preparation process that are performed. The metadata also has data validation procedures that are performed for each sub-process for the data preparation process. The master software process initiates the validation as specified in the metadata.

In FIG. 16A, customer data (e.g., 1613*a*) is uploaded 1620 and stored in spatial data store 1660 as business data 1613*b*. The data is cleansed 1642 and geocoded 1644. The geocoding adds coordinates to data elements (e.g., records) as illustrated by spatial coordinate table 1645*a*, and coordinates 1645*b* are stored in the spatial data store 1660. The business data 1613*b* and coordinates 1645*b* are used to create a spatially referenced data layer view 1690. Metadata is created 1646 and stored in metadata store 1670. A rendering specification is generated based on business rules 1648. For example, the rendering specification for customer data for a company may specify a business rule of: "Point size=12, Point color=red" 1672*a*. In FIG. 16B, this metadata 1672*b* is used by client software 1600 to display data. With reference to FIG. 16A, metadata and spatial tables are dynamically linked 1680. Next, the layer view may be transmitted over a network to client software 1600 and displayed by client software 1600 in FIG. 16B. FIG. 16B illustrates that client software 1600 receives data sent via, for example, from spatial data store 1660 and metadata store 1670. Data 1613*b*, 1645*b*, and 1672*b* each represent one or more data layers.

Figure 17:
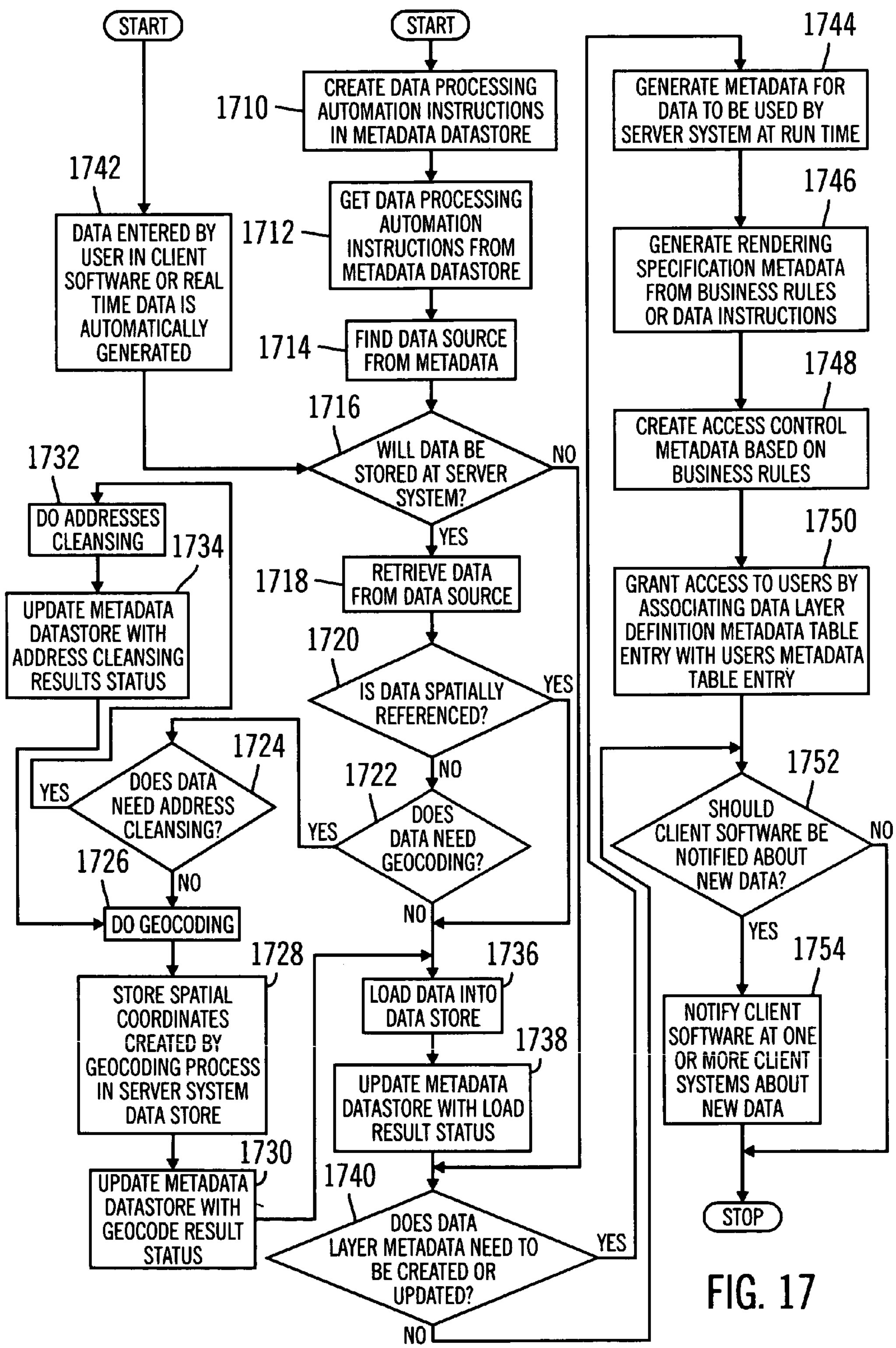
FIG. 17 illustrates logic for data preparation and activation in accordance with certain implementations of the invention.

FIG. 17 illustrates logic for data preparation and activation in accordance with certain implementations of the invention. For one line of logic, control begins at block 1710 with the server system creating data processing automation instructions in the metadata store 1670. Data processing automation instructions are specific directives that a component in the data preparation system understands, and each directive contains all the information that the component needs to perform a specific data preparation process. An example of a data processing automation instruction is an instruction to generate latitudes/longitudes for each data record in a data set from address information in a specific field in the data records. In block 1712, the server system retrieves the data processing automation instructions from the metadata store 1670.

Blocks 1714–1754 represent processing performed automatically based on the data processing automation instructions executed by, for example, a master software process, without user or administrator intervention. In block 1714, an automated process determines the source locations of source data (e.g., application datasets) from the data processing automation instructions. In block 1716, the automated process determines whether the source data is to be stored at the server system based on the data processing automation instructions. If so, processing continues to block 1718, otherwise, processing continues to block 1740. That is, if the source data is to reside on the server system, then the data is retrieved from the current data source (block 1718) for processing and storage in the server system data store as described by blocks 1720 through 1738.

In block 1720, it is determined whether the data is spatially referenced. If so, processing continues to block 1736, otherwise, processing continues to block 1722. In block 1722, it is determined whether the data needs geocoding. If so, processing continues to block 1724, otherwise, processing continues to block 1736. In block 1724, it is determined whether the data needs address cleansing. If so, processing continues to block 1732, otherwise, processing continues to block 1726. In block 1732, address cleansing is performed, and in block 1734, the metadata store 1270 is updated with an address cleansing result status.

In block 1726, geocoding is performed. In block 1728, spatial coordinates created by the geocoding process are stored in the server system data store. In block 1730, the metadata store 1270 is updated with a geocoding result status.

In block 1736, data is loaded into a data store, if needed. In block 1738, the metadata store 1270 is updated with a load result status.

At this point, data layer metadata may need to be updated to reflect the results of the cleansing, geocoding, and data store processes. In block 1740, it is determined whether the data layer metadata needs to be created or updated. If so, processing continues to block 1744, otherwise, processing continues to block 1752. In block 1744, metadata is generated for data to be used by the server system provided by implementations of the invention at run time. In block 1746, rendering specification metadata is generated from business rules or data processing automation instructions. In block 1748, access control metadata is created based on business rules. In block 1750, access is granted to users. In particular, as will be discussed in further detail below, a data layer definition metadata table and a users metadata table are maintained, and access is granted by associating a data layer definition metadata table entry with a users metadata table entry.

In block 1752, it is determined whether client software at one or more client systems should be notified about new data. If so, processing continues to block 1754, otherwise, processing ends. In block 1754, client software at one or more client systems are notified about new data and, optionally, decisions made by the automated process.

Implementations of the invention also provide automated activation of new data. In particular, each set of related data in the server system, such as client locations, roads, rivers etc., is presented as data layers in the client software. Each new set of data prepared by implementations of the invention is made available to the client software as a new data layer. Each data layer seen by the client software has a corresponding data layer representation in the metadata store 1270 in the server system. The metadata associates each data layer representation with a set of roles or users who can view the data in the data layer. When a user connects to the server system, the client software is notified by the server system which data layers the user can view based on the data layer representation associations in the metadata. Based on user actions, the client software can request spatial views of any or all of these data layers. The client software will not view and hence cannot request any data from a server data layer representation that is not associated with the user.

Referring now to FIG. 17, blocks 1744–1748, at the completion of the automated data preparation process for data (i.e., a new data set), all metadata has been created in the metadata store. At this point, the data has a data layer representation in the metadata. However, none of the current users can view the data since the data layer representation for the data is not associated with any of the users of the system. The users can be associated with the data layer representation in one of two ways. First, a software process can be run that takes a predefined user access list, such as a file with user names, and associates each one of these users with the data layer representation in the metadata. Second, an interactive application (e.g., a server based application or client software, such as a browser application) may be used to associate the data layer representation with one or more users.

When a user logs in to the server system, the server system will automatically look for all metadata data layer representations that are associated with the user and make them available for viewing by the user. Once the actions in block 1750 have been done, the server system will find the new data layer representation associated with one or more users who are allowed to see that data layer representation, and the data layer representation will automatically be available to the user. Unlike conventional systems, there is no need to restart the server system.

For another line of logic, control begins at block 1742 and data is entered by a user in client software or real time data is automatically generated. The data being spatially viewed may be updated real-time in a batch process or based on input from a user entering data into client software, by a client software generating data as part of its processing, by a sensor device (such as a smoke detector) generating data or by a location sensing device (such as a GPS enabled device) generating data.

When new data has been introduced to the system, the new data is made available to the user immediately, while the user is accessing and/or already using the system. In certain implementations, the server system will have a special software flag that will indicate whether there is new data in the server system. This software flag is turned on when there is new data. When a client software request reaches the server system, this flag is checked and, if the flag is turned on, the client software is told that there is new data available. The client software can then retrieve the data and view the data without having to restart the client session. If the client system is already connected to the server system using a communication protocol that allows the server system to initiate interactions with the client system, the server system will notify the client system that there is new data available.

Thus, unlike conventional systems, implementations of the invention allow real time update of data sets already being used by client systems. New data can be added to or deleted from the data set. The client systems will automatically view changes to the data sets when they refresh their displayed data view, if they have access rights to the data.

In summary, original data is left intact while being associated with spatial coordinate information to enable the data to be visualized spatially. Thus, the original data may still be processed by existing software. Moreover, the data may be visualized spatially, while allowing existing software currently using the original data to continue to operate correctly. Also, the data may be visualized spatially, while keeping the data and the associated coordinate information in separate data sets, and, if needed, in separate data stores. A server system is able to retrieve and present data residing in a remote location to client software that views spatial data as though the data is residing in a local data store.

Non-spatially referenced data may be associated with pre-existing spatially referenced data to allow new spatial data presentations to the same data set. Additionally, this association is performed dynamically, and the data need not be moved or transferred from its original locations.

Client software may perform spatial analysis and make business decisions by using spatial presentation of currently existing non-spatially referenced data in an automated manner. The process of retrieving, cleansing, geocoding, loading and making the data available to client software in a client server environment is automated.

Data being spatially viewed by client software in a client server environment may be updated real-time without any interruptions to the server and client software. In this context, the data being spatially viewed may be updated real-time in a batch process or based on input from a user entering data into a software user interface, by software generating data as part of its processing, by a sensor device (such as a smoke detector) generating data or by a location sensing device (such as a GPS enabled device) generating data.

A software abstraction level is created that allows data sets to be represented as abstract entities to client software. The term software abstraction level refers to making the data set look like a simple data layer with all the data residing in a local data store, while in fact the data may be acquired real time from some other location (i.e., other than the local data store). In this context, the software abstraction level is used to allow the server system to acquire and process data present in different formats and in different locations without changing the client software and without changing the core server application.

F. Hierarchical Access Control to Spatially Referenced Data Stored in a Conventional Data Store It is a difficult task to provide security and different access controls to data and applications to different employees. For example, user organizations may want to only give certain employees special access rights to BSS data and geographic information because there might be confidential data. However, this can be complicated by the fact that user organizations may want everyone in the organization to have a basic level of access to non-confidential geographic information to improve individual productivity.

Implementations of the invention provide access to spatially referenced data at a data set level or at an individual data element level within the data set. Users can be granted access to (e.g., visually see) or be denied access to entire sets of data. Access can be further restricted to allow users to view only particular subsets of data within a data set. This is done through metadata definitions that are independent of the technology used to store the spatially referenced data.

Figure 18:
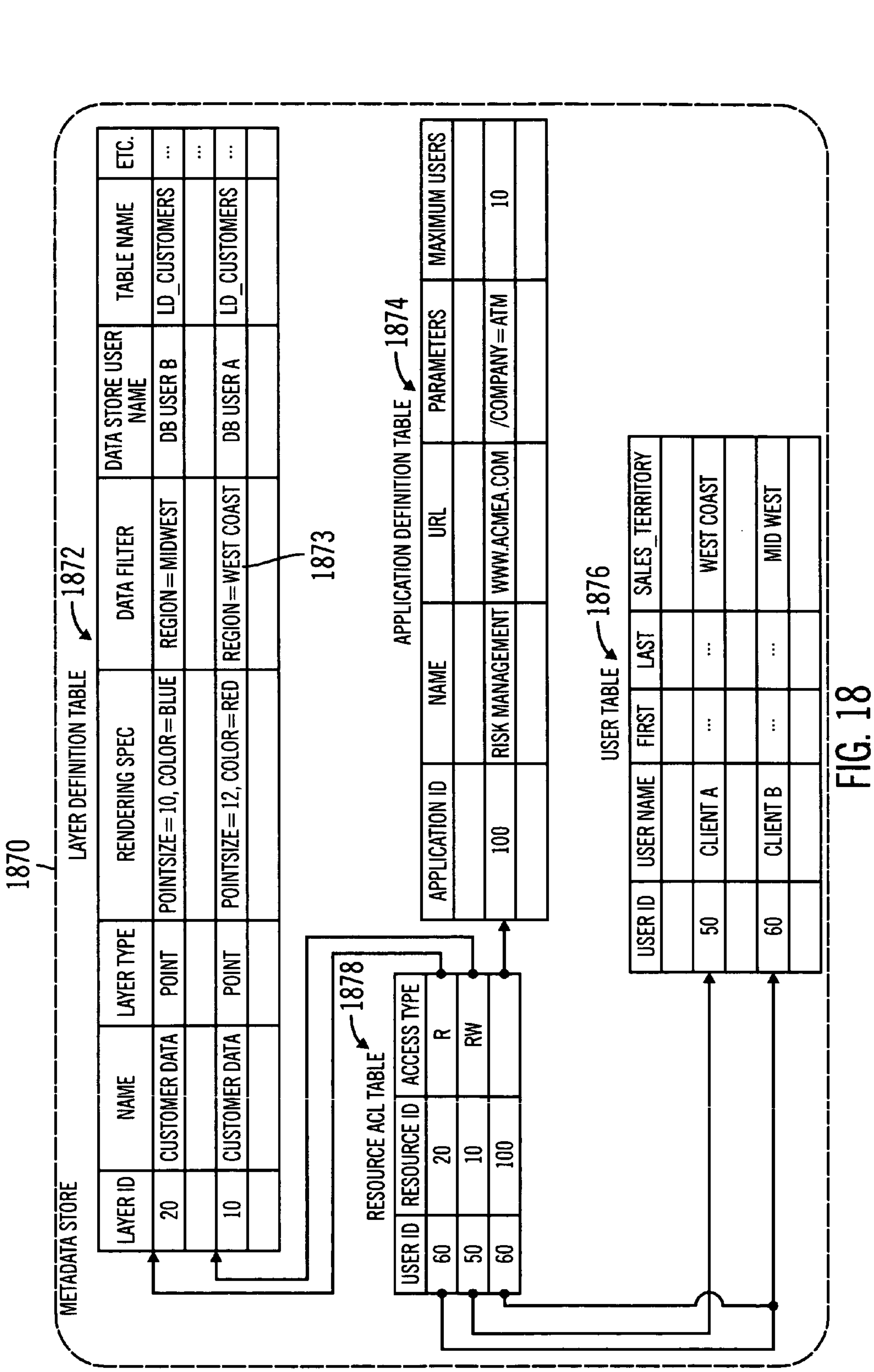
FIG. 18 illustrates metadata stored in metadata store for use in controlling access to data in accordance with certain implementations of the invention.

FIG. 18 illustrates metadata stored in metadata store 1570 (FIG. 15) for use in controlling access to data in accordance with certain implementations of the invention. Metadata is stored in metadata store 1570 for all resources managed and made available to client systems. The resources include, for example, data and application functions. Data is seen by the client software 1590 as data layers in the UI screen. Each data layer presented to the client software 1590 has a corresponding metadata definition in a table, labeled layer definition table 1872 in metadata store 1570. Each application function presented to the user through the client software 1590 has a metadata definition in another metadata table labeled application definition table 1874. The invention system also maintains information about the users, such as login name, first name, last name, etc., in yet another table, labeled user table 1876.

When client software 1590 requests access to a resource (e.g., data or an application function), the server system 1530 accesses this resource using the appropriate metadata table. For example, when the client software 1590 wants to view the data for a data layer (e.g., by selecting the data layer for viewing via a UI screen), the server system 1530 finds the metadata definition for this data layer in the layer definition table 1872. In particular, if the resource is a data layer, the data layer has a layer identifier ("Layer ID"), such as 20, and the server system uses the layer identifier to find the entry associated with the requested data layer.

Then, the server system 1530 uses the information contained in the metadata definition for the data layer to access the data store 1560 (using the data store user name), retrieve the data 1520, transform the data 1540, and present the data to the client software 1590. Implementations of the invention do not allow resources to be accessed if the resources are not represented in the appropriate metadata tables.

Implementations of the invention also maintain access control lists (commonly referred to as ACLs) for each of the resources represented in the metadata tables. The access control list for a given resource is a list of users who can access the resource. Each resource is associated with a list of users, and this association is maintained in a new table, labeled resource ACL table 1878.

Whenever client software 1590 requests access to a resource, the server system 1530 first checks whether the resource is associated with the user by searching the resource ACL Table 1878. If the server system 1530 finds the association, the server system 1530 allows access to the resource. Otherwise, the server system 1530 rejects the request from the client software 1590.

Implementations of the invention also associate data filters with each entry in the layer definition table 1872. A data filter is an assertion that should be valid for all data that is retrieved using that metadata definition. The client software 1590 is allowed to access only data for which the assertion is valid. Take for example data that contains customer information for a company. The data filter associated with the metadata entry for such data may be "Region=West Coast" 1873. The term "Region" in this filter refers to a data element, such as a column name in the data. The term "West Coast" in this filter is the desired column value. Then, the server system 1530 retrieves a subset of the data that has the value "West Coast" in the region column. Even though the data contains customer information for all regions, the user who accesses this data will only view the west coast region data, since the data is restricted by the data filter associated with the metadata.

Additional metadata entries may be created in the layer definition table 1872 for the same data set. Thus, multiple metadata entries can be created for the same data, each with a different data filter. Then, by granting access to the different metadata entries to different users, different users can be privileged or restricted to view different subsets of the same data.

Each user has a unique metadata entry in the user table 1876. The metadata entry contains properties of the user. For example, a user can have a property called "sales territory," and an associated value for the property. This property can then be used in a data filter to allow the user to view only subsets of the data. For example, for a data set that contains customer data, the data filter may be of the form "region=user.sales territory". This filter indicates that only data for which the value in the region column matches the user's sales territory property value should be retrieved for access by the user. Assuming that user A's sales territory property value is "West Coast," and user B's sales territory property value is "Midwest", when user A views the customer data using the client software 1590, only the west coast data is shown to user A, and when user B accesses the same data, only the Midwest customer data is shown to user B.

Associated with each entry in the layer definition table 1872 is a set of credentials used to access the data within the data store 1560, which may be referred to as "access credentials." The access credentials are used to access the data. If the data is stored in a data store 1560, the access credentials may include, for example, the user name and password.

A data set (e.g., a customer data table) in the data store 1560 may be associated with more than one metadata entry in the layer definition table 1872. For example, there may be two entries in the layer definition table 1872 for the customer data table. The first entry may be associated with data store user name DB USER A for client A, and the second entry may be associated with data store user name DB USER B for client B. The data store user names are used to access the data store 1560 in which data, such as the customer data table, resides. Then, the access rules enforced by the data store technology itself may be used to view different data elements within the same data set (e.g., customer data table). For example, client A would be granted access to the first entry in the layer definition table 1872, and client B would be granted access to the second entry in the layer definition table for the customer data table. Client A and client B will access different sets of data, since the server system 1530 will access the back end data store 1560 with data store user name DBUSER A for client A and data store user name DBUSER B for client B. This allows implementations of the invention to leverage the access control functionality provided by the data store (i.e., the data store user names) and use data store access credentials (i.e., the data store user names) that are different from the access credentials supported by implementations of the invention.

Implementations of the invention may use any combination of the above-mentioned techniques for access control at the same time to retrieve subsets of the data for a particular client.

Figure 19:
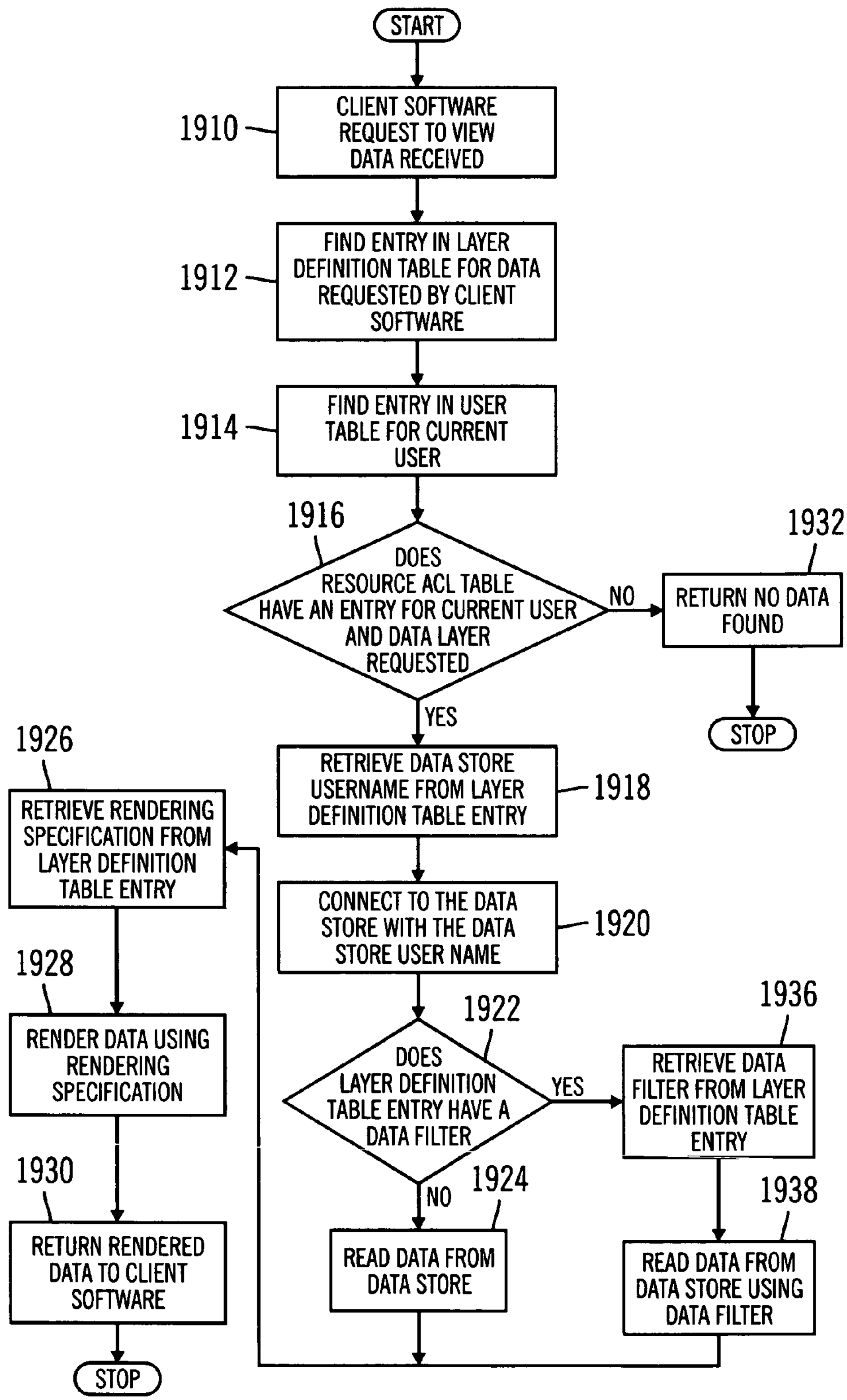
FIG. 19 illustrates logic when a client request to view information as data arrives at the server system in accordance with certain implementations of the invention.

FIG. 19 illustrates logic when a client request to view information as data arrives at the server system in accordance with certain implementations of the invention. Control begins at block 1910 with receipt of a request from client software for data at the server system. The request references a data layer that contains desired data. In block 1912, the server system accesses the metadata store and finds an entry in a layer definition table 1872 (FIG. 18) for the requested data layer, which is referred to as a "layer definition table entry." In block 1914, the server system accesses the metadata store and finds an entry in a user table 1876 (FIG. 18) (a "user table entry") associated with the current user who submitted the request for data via the client software.

In block 1916, the server system accesses the resource ACL table 1878 (FIG. 18) in the metadata store and performs a query to determine whether the current user has access to the requested data layer. If the current user should not have access to the requested data layer, then processing continues to block 1932, otherwise, processing continues to block 1918. In block 1932, the server system notifies the client software that the data request will not be fulfilled and the process ends.

In block 1918, the server system retrieves the data store user name from the layer definition table entry associated with the requested data layer and connects to the data store using the data store user name (block 1920). In block 1922, the server system determines whether the layer definition table entry has a data filter (i.e., whether the layer definition table includes an entry in the data filter column). If so, processing continues to block 1936, otherwise, processing continues to block 1924. In block 1924, data is read from the data store using a data store query. If there is a data filter, the data filter is retrieved from the layer definition table entry (block 1936), and data is read from the data store using a data store query, with the data filter being applied to the data store query to retrieve the requested data layer block 1938.

In block 1926, the rendering specification is retrieved from the layer definition table entry. The data is rendered using the rendering specification (block 1928), and the rendered data is sent to the client software (blocks 1930).

Providing secure access controls to data is important for companies because without this security and access controls, companies cannot integrate and use their enterprise data with geospatial information from the data center. Implementations of the invention provide various administration tools for users to create different organizations, roles and access rights for each data layer and defined area. Each layer or defined area has an associated resource identification value. This resource identification value is associated with a role (e.g., a role in a company, such as manager or administrator).

Figure 20:
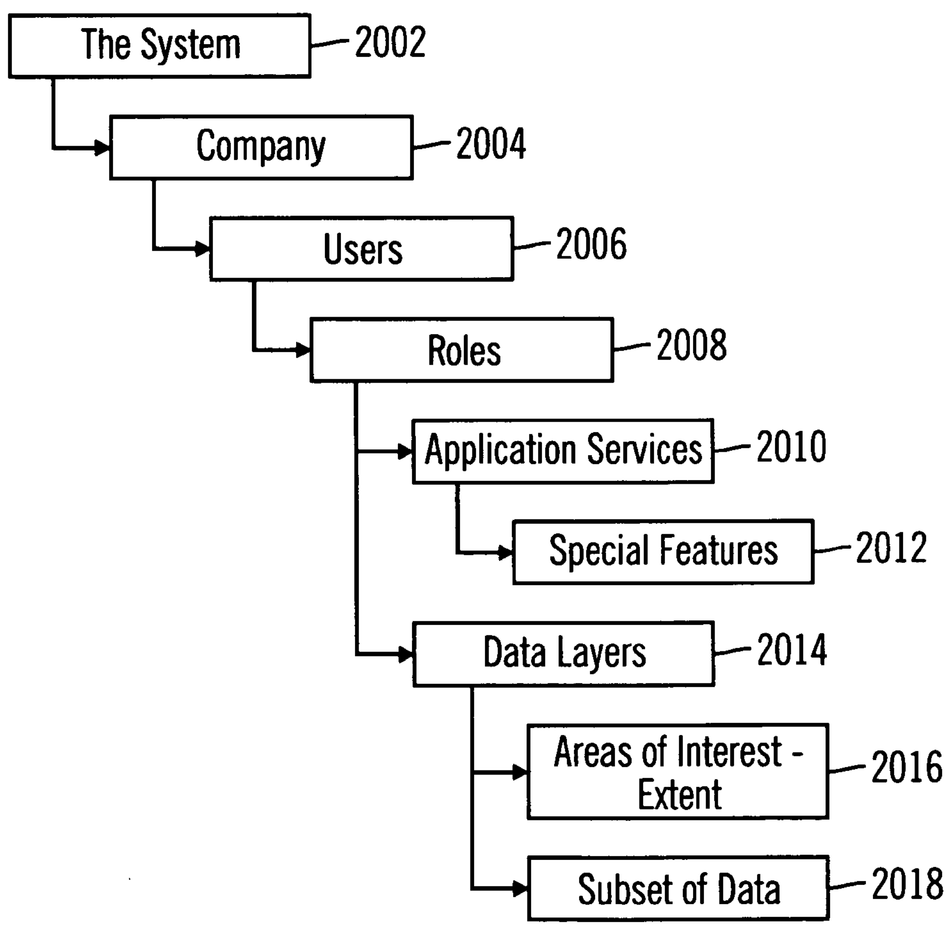
FIG. 20 illustrates a user hierarchy in accordance with certain implementations of the invention.

FIG. 20 illustrates a user hierarchy in accordance with certain implementations of the invention. A user hierarchy is used to administer user access to data, application functions, and other resources. The information in FIG. 20 is used to show the relationship between the various entities in a company and their relationships.

For example, the system (e.g., the enterprise spatial system) 2002 is at the highest level of the user hierarchy. The system 2002 has one or more companies 2004. Each company has one or more users 2006. Each user has one or more roles 2008. Users may be specified using the user's name and associated demographic information. For example, one user may be specified with: Joe Brown, 13834 Sunshine Drive. Then, each user is assigned a role 2008 that exists within the company 2004. Roles include, for example, manager, administrator, advisor, or technician.

Each role has access to one or more application services 2010 and one or more data layers 2014. Each application service is a collection of distinct features 2012 that perform particular functions. For example, geocoding is a feature that performs the function of translating an address to a latitude/longitude pair.

Data layers 2014 have subsets of data 2018 and areas of interest (i.e., viewable extents) 2016, which are subsets of data based on a particular area being viewed. The data layers 2014 form a category of data that is resident in a system 2002 data store. For example, data layers 2014 may include census 2000 data. An area of interest 2016 may be, for example, a regional area of the globe (e.g., United States North West, United States South West, etc.). A subset of data 2018 represents a subset of a data layer 2014 (i.e., data layers 2014 may be broken into subsets using filtering techniques). The subsets of data are given identifiers (e.g., names) so that access can be assigned to roles and users.

In summary, implementations of the invention allow users to view spatially only those data sets to which they have been granted access. Users may be grouped into groups and then further sub-grouped under roles within the groups. In this context, users are granted different access rights based on the group to which they belong and the role that they are assigned within the group. Access to data is granted to users based on metadata that is independent of the data store technology used to store data. Access to data and applications is controlled in a manner in which the access control mechanism is independent of the data store location storage format used by the data store and storage technology used to implement the data store.

A software abstraction level is created using metadata for the data and the application functions that work with this data. Access is granted to data and applications by granting access to the abstract entities in metadata. Therefore, data and applications can be accessed by the server system for the client software when the user has been granted access to the abstract entities for these in metadata. Moreover, data filters are attached to the abstract metadata entities to filter out subsets of the data accessed by the server system using that particular abstract entity. More than one abstract entity may be created in metadata for the same data set in the data store, without creating multiple copies of the data set. Then, different data filters may be attached to the different abstract entities to allow different users to view different subsets of the data based on which abstraction entity they use to access the data.

Different data store access credentials may be associated with different abstract metadata entities for the same data set, and, thus, the data seen by the user may be filtered using the data filtering abilities supported by the data store technology. The data accessed by users may be filtered on a per user basis based on the properties of the user. The data filtering techniques provided by implementations of the invention may be used one at a time or simultaneously in any combinations of data filters.

The access credentials used by the user to access the spatial server system may be detached from the access credentials used to access the data store. The spatial server system may use different access credentials to access different data sets on behalf of the same user. The spatial server system may use the same access credentials to access a data set on behalf of different users.

G. Automating the Process of Choosing and Displaying Data from Pyramided Spatially Referenced Data Implementations of the invention display spatially referenced data (e.g., images) to client software, by automatically choosing one of several data sets containing spatially referenced data corresponding to the scale at which the user requests to view the spatially referenced data. The data sets contain spatially referenced data, at varying scales and varying levels of detail for the same viewing area of interest.

Implementations of the invention provide an application server tier that includes access control and map content configuration management components to handle customized secure access to data. In particular, when a user logs in to the server system, the server system obtains user information to generate a list of different data layers and regions that a user may access based on the user's role information and access controls. Then, the server system returns this list to the client software.

Using the data layer information provided by the server system, the client software creates layer control options and different data layer representations for a user. When a user tries to use panning features to expand the area of certain layers, a user's actions are limited by the access controls. Each user has a pre-defined viewing area (commonly referred to in the art as an "extent") and the enterprise spatial system confines the user to stay within this viewing area while viewing the data.

Figure 21:
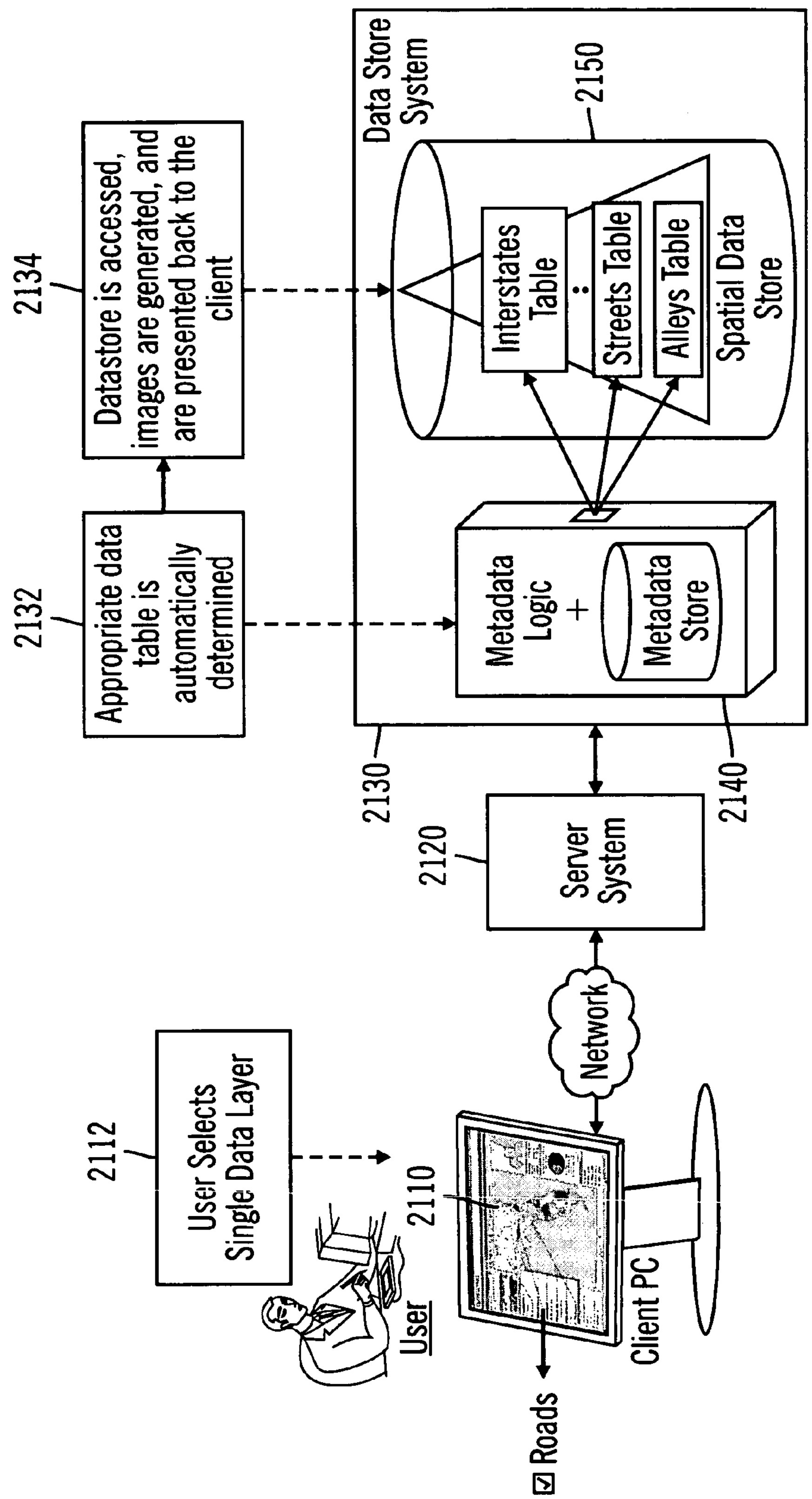
FIG. 21 illustrates a single data layer presentation that is provided for a single pyramided spatially referenced data set in accordance with certain implementations of the invention.

FIG. 21 illustrates a single data layer presentation that is provided for a single pyramided spatially referenced data set in accordance with certain implementations of the invention. A user selects a single data layer (block 2112) to view via, for example, a UI screen provided by client software 2110. A request for the data layer is sent to the server system 2120 via a network. The appropriate data table to use for the request is automatically determined (block 2132) using metadata logic and metadata 2140. Then, the data store 2150 is accessed, data layers (e.g., image layers) are generated, and the data layers (e.g., image layers) are returned to the client software 2110 (block 2134). The spatial data store 2150 and metadata logic and metadata store 2140 are part of a data store system 2130.

Figure 22:
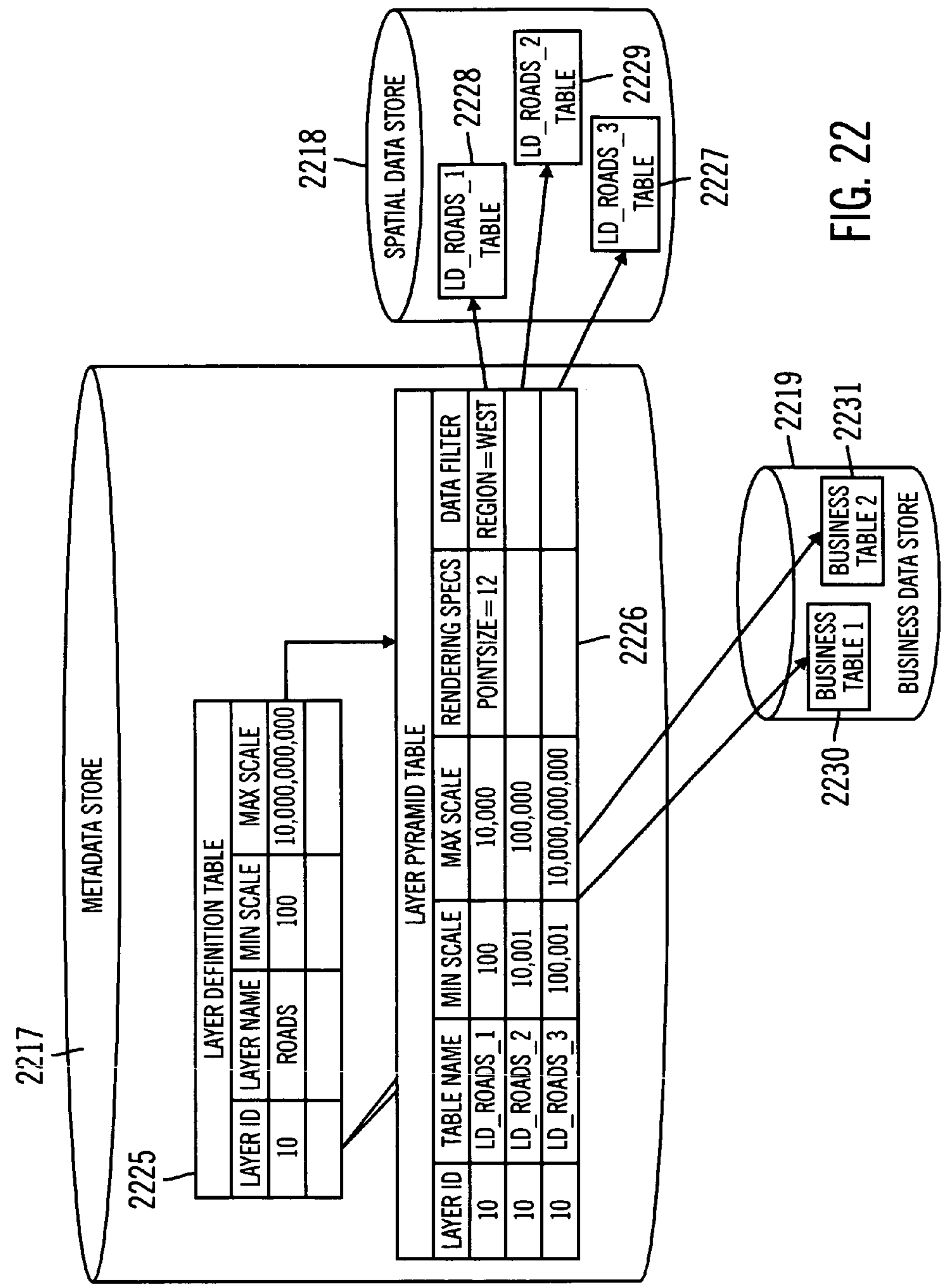
FIG. 22 illustrates a metadata store, a spatial data store, a business data store, and relationships among the data stores in accordance with certain implementations of the invention.

FIG. 22 illustrates a metadata store 2217, a spatial data store 2218, a business data store 2219, and relationships among the data stores 2217, 2218, 2219 in accordance with certain implementations of the invention. FIG. 22 illustrates some tables, although the data stores 2217, 2218, 2219 may store many tables. For ease of understanding, only a subset of the columns in the tables are shown.

A software abstraction level separates the data layers, as the data layers are presented to the user with the client software, from the data set or data sets that contain the data. The software abstraction level is created using metadata stored in a set of data store tables. In particular, for each data layer viewed by the client software, there is a corresponding entry in a layer definition table 2225. For each data set stored in the data store, there is a corresponding entry in a layer pyramid table 2226. The layer pyramid table 2226 contains the name of the data table that contains data, along with the minimum and maximum zoom scales at which the user is allowed to view the data. In certain implementations, there is one layer pyramid table for each entry in the layer definition table. The layer definition table 2225 also may have entries for business tables 2230 and 2231. These tables may also have an entry in the layer pyramid table, even though the business data may not be stored as a pyramid in the data store. The layer pyramid table entries for business tables 2230 and 2231 are not shown in the layer pyramid table 2226.

Each entry in the layer definition table 2225 is associated with one or more entries in the layer pyramid table. For example, the "Roads" data layer represented in the layer definition table 2225 is associated with three entries in the layer pyramid table 2226. In certain implementations, the layer definition table 2225 and the layer pyramid table 2226 each have a layer identifier ("Layer ID") column for use in creating the associations. The three entries in the layer pyramid table in turn point at the three tables 2227, 2228, 2229, respectively, that contain the spatially referenced data for the "Roads" data layer. The layer pyramid table 2226 also contains MinScale and MaxScale columns. The MinScale column indicates the minimum zoom level at which the data corresponding to this entry in the pyramid table can be viewed. The MaxScale column indicates the maximum zoom level which the data corresponding this entry in the pyramid table can be viewed. In the example shown in the layer pyramid table 2226, the first entry in the layer pyramid table 2226 can be viewed from zoom scale levels 100 to 10,000; the second entry can be viewed from zoom scales 10,001 to 100,000; and, the third entry can be viewed from zoom scales of 100,001 to 10,000,000,000. Since all these entries in the layer pyramid table 2226 are linked together by the value 10 in the Layer ID column, these three entries represent a pyramid with three levels for Layer ID 10. The Layer ID of 10 corresponds to the "Roads" entry in the layer definition table 2225. Thus, the three entries in the layer pyramid table represent a layer pyramid with three levels that is actually seen as a single data layer (e.g., the roads data layer) by the client software.

FIG. 22 illustrates a pyramid in which data is stored in data store tables in a single spatial data store 2218. The use of metadata allows the creation of pyramids with any form of data store, including pyramids in which the data for some levels in the pyramid is provided by an application external to the enterprise spatial system. With implementations of the invention, pyramids may be made of different data sets, and the data sets may be physically located in different locations and in different data formats.

The user is presented with one data layer via the UI screen for a pyramided data layer. For the example shown in FIG. 22, the user would be presented with one "Roads" data layer in the UI screen. When the user requests to view the "Roads" data layer at a particular zoom scale, the server system uses the layer definition table 2225 and the layer pyramid table 2226 to automatically determine which data store table among the three for the "Roads" data should be used to satisfy the zoom request. The logic performed by the server system to automatically choose the data set from a pyramid is described below with reference to FIGS. 23 and 24.

Additionally, each entry in the layer pyramid table 2226 may be associated with rendering specifications. This allows for different presentations for the data at different levels in the pyramid to be automatically created. Moreover, each entry in the layer pyramid table 2226 can also be associated with a data filter. The data filter is applied to all data retrieved at that pyramid level to filter out subsets of the data in the data set.

Figure 23:
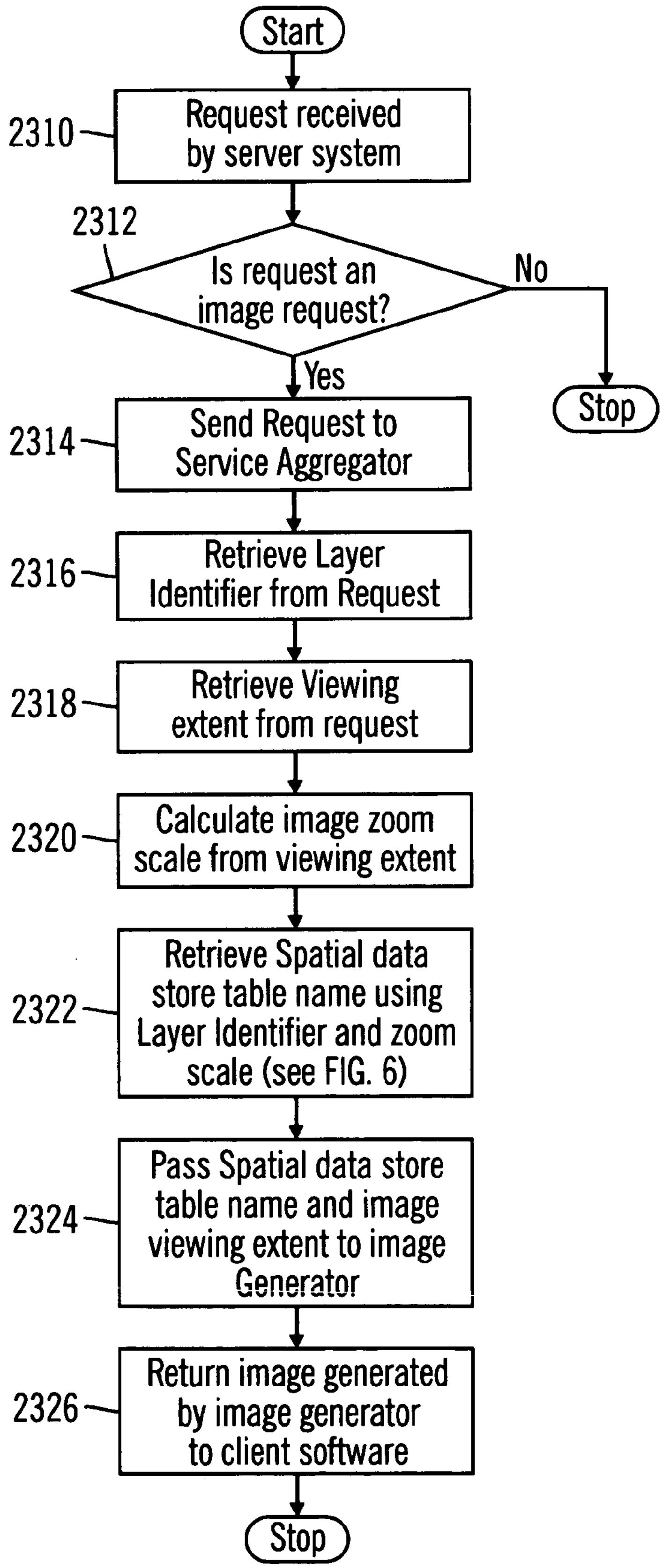
FIG. 23 illustrates logic for processing a client request to view data in accordance with certain implementations of the invention.

FIG. 23 illustrates logic for processing a client request to view data in accordance with certain implementations of the invention. Control begins at block 2310 with the server system receiving a request from client software to view particular information (e.g., an image of roads). In block 2312, the server system determines whether the request is for an image. If so, processing continues to block 2314, otherwise, this processing is complete and other processing occurs. In block 2314, the server system processes the request and sends the request to a service aggregator. In block 2316, a layer identifier is retrieved from the request. The layer identifier may be used to access data in the layer definition table 2225 and the layer pyramid table 2226.

At this point, the server system determines the viewing extent of the requested image based on information received from the client software in the request (block 2318). Then, in block 2320, the server system calculates the zoom scale at which to display the image. The layer identifier and the zoom scale are used to access an entry in the layer pyramid table 2226, then, the appropriate data store table associated with the accessed entry is retrieved from the spatial data store 2218 (block 2322). As an example, when the user requests to view the roads data layer, the server system automatically determines whether to use LD_Roads__1 table 2228, LD_Roads__2 table 2229 or LD_Roads__3 table 2227 to generate the image for the client request. Once the appropriate data store table is determined, that data store table name and image viewing extent are sent to an image generator component of a map server to create the image (block 2324). Then, the server system returns the image to the client software for display (block 2326).

Figure 24:
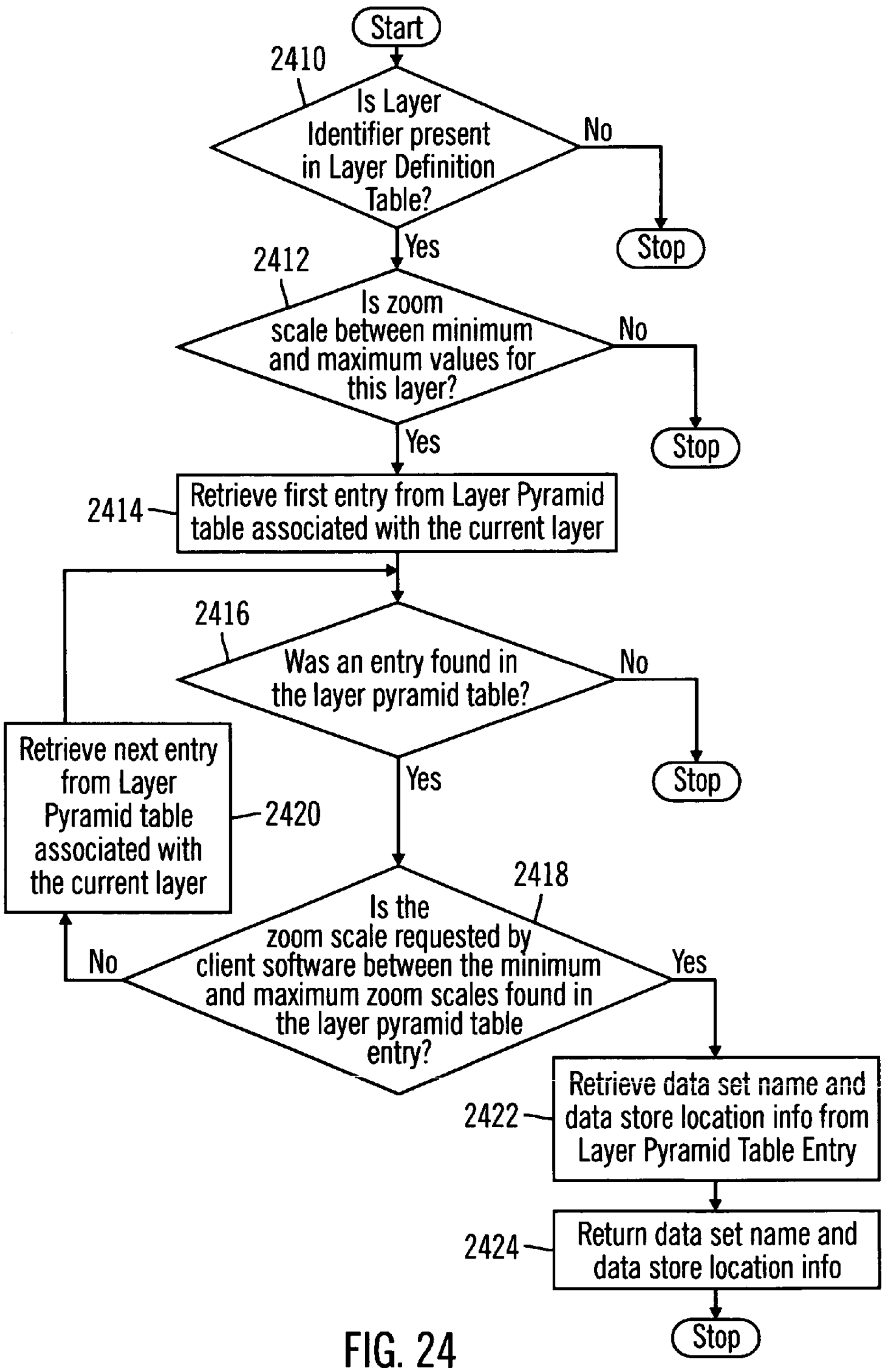
FIG. 24 illustrates logic for the interaction of metadata tables to identify the information to be sent in response from a request for a data layer.

FIG. 24 illustrates logic performed by the service aggregator for the interaction of metadata tables to identify the information to be sent in response to a request for a data layer. Control begins at block 2410 with a determination of whether the layer identifier is present in the layer definition table. If so, processing continues to block 2412, otherwise, this processing terminates. That is, when the request from the client software is being processed, an attempt is made to locate the layer identifier within the layer definition table 2225 in metadata store 2217. In block 2412, it is determined whether the zoom scale is between minimum and maximum zoom scales that have been defined for the requested data layer based on the information extracted from the client software request. In particular, the determination of the zoom scale is made by locating the minimum and maximum zoom scales for the layer identifier in the layer definition table 2225.

In block 2414, by matching the layer identifier values (in the Layer ID columns in tables 2225 and 2226 of FIG. 22) between the layer definition table 2225 and the layer pyramid table 2226, a first entry is retrieved from the layer pyramid table 2226 for the requested data layer. In block 2416, it is determined whether an entry was found in the layer pyramid table 2226. If so, processing continues to block 2418, otherwise, processing terminates. In block 2418, it is determined whether the zoom scale requested by the client software request is between the minimum and maximum zoom scales found in the retrieved layer pyramid table 2226 entry. If so, processing continues to block 2422, otherwise, processing continues to block 2420 to retrieve another entry from the layer pyramid table 2226 associated with the requested data layer.

In block 2422, if the entry in the layer pyramid table 2226 has the requested zoom scale, the data set name and data store location of data are retrieved from the entry. For example, based on the determined scale, an associated data store table name is identified, which in turn determines which Roads table 2227, 2228, or 2229 to use from the spatial data store 2218 (e.g., highways only or highways and streets). In block 2424, the data set name and data store location information are retrieved from the layer pyramid table 2226.

In summary, a single data layer representation is provided in the client user interface for a pyramided spatially referenced data set that is stored in the server as a pyramid with different data sets at different levels in the pyramid. The server system automatically determines the appropriate level in the pyramid to use to respond to a client software request to view a data layer. Once the appropriate pyramid level is determined, the server system automatically finds the data set in the data store and retrieves the data to be viewed spatially.

Pyramids for any spatially referenced data format are created, rather than just raster data as is usually done in conventional systems. Pyramids can be created in which the data for the different levels in the pyramid is located in physically different locations. Pyramids can be created in which the data for different levels in the pyramid may be in different formats.

H. Printing Multiple Data Layers

Figure 25:
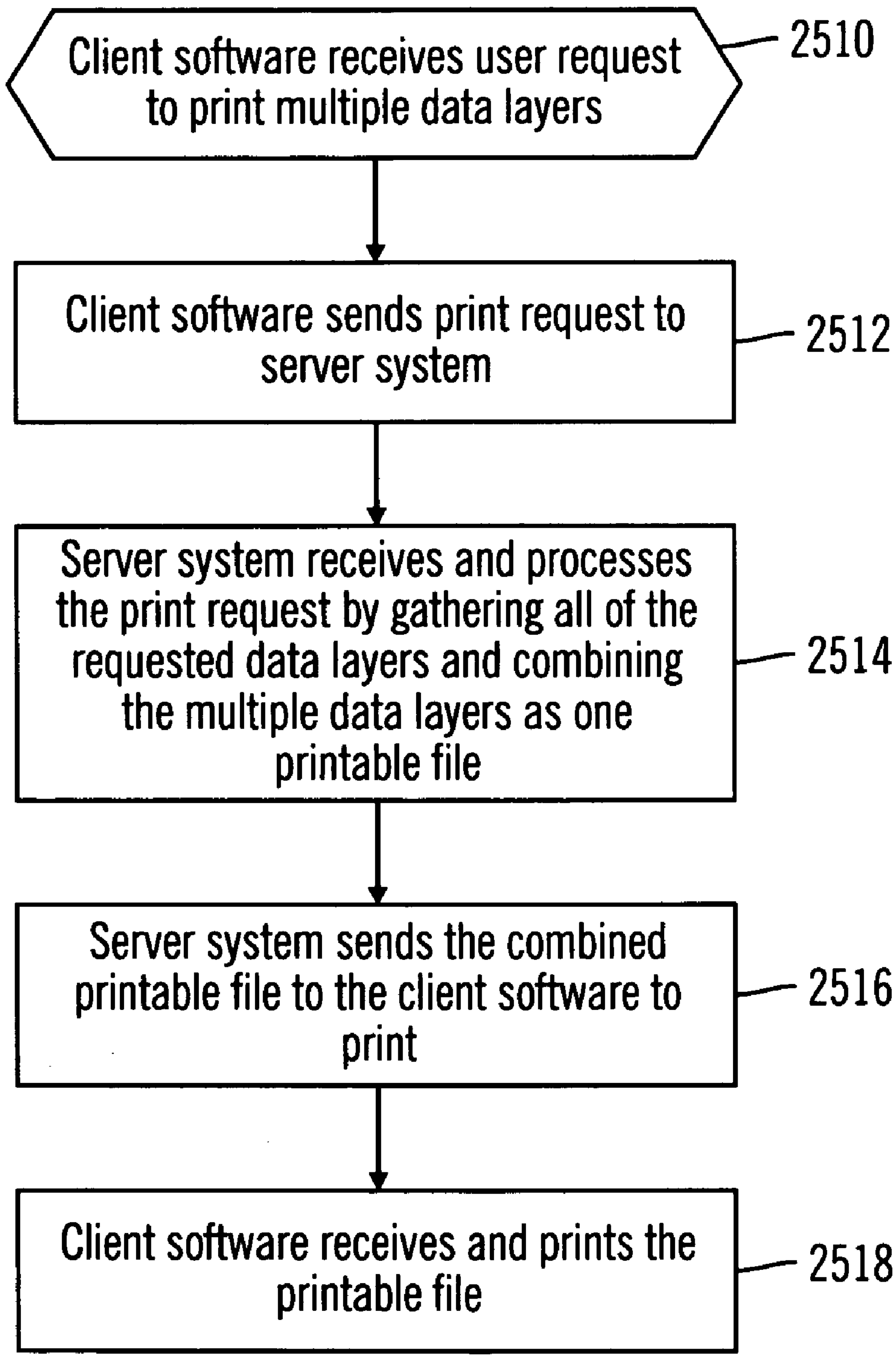
FIG. 25 illustrates logic for printing multiple data layers in accordance with certain implementations of the invention.

Implementations of the invention allow for multiple data layers to be printed. FIG. 25 illustrates logic for printing multiple data layers in accordance with certain implementations of the invention. Control begins at block 2510 with the client software receiving a user request to print a composite image that is formed by overlaying multiple data layers. In particular, when a user clicks on a Print menu to print different data layers that are displayed on a Map Control window, the client software receives the print request. In block 2512, the client software sends the print request to the server system. In block 2514, the server system receives and processes the print request by gathering all of the requested data layers and combining the multiple data layers as one printable file. Then, in block 2516, the server system sends the combined printable file to the client software to print. In block 2518, the client software receives and prints the printable file.

In certain implementations, for handling a Print Preview menu selection by a user, the client software and the server system perform logic similar to the logic used for processing a Print menu selection, but lower resolution data may be used to achieve faster performance, and rather than printing a printable file, the client software displays the printable file.

In summary, for printing multiple data layers, the client software and the server system support printing multiple data layers as one printable file.

I. Fulfillment

Figure 26:
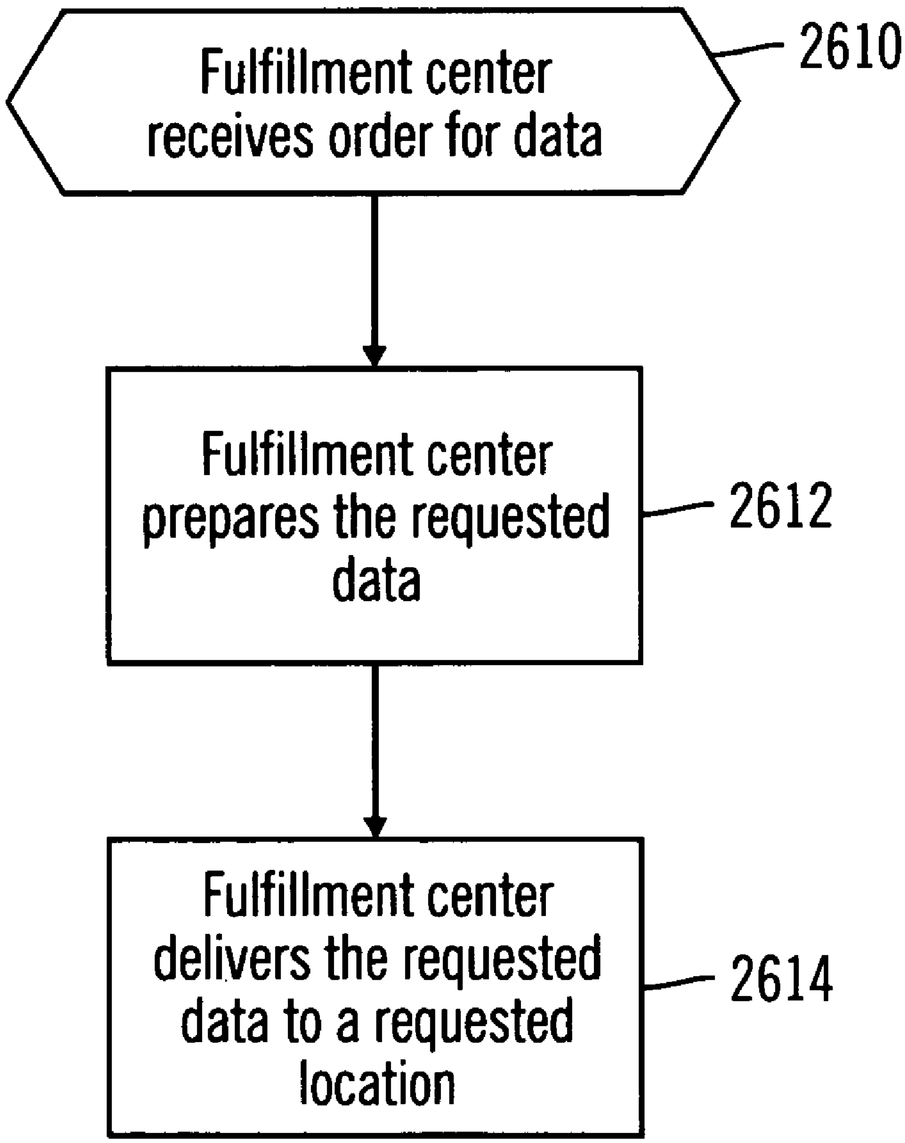
FIG. 26 illustrates logic for order fulfillment in accordance with certain implementations of the invention.

FIG. 26 illustrates logic for order fulfillment in accordance with certain implementations of the invention. The logic illustrated in FIG. 26 will be described with reference to FIG. 7. In FIG. 26, control begins at block 2610 with the fulfillment center 730 receiving an order for data, such as a map or satellite image. A catalog of previous versions of GIS data is maintained at the data center 720, and users are given the option to choose among the various versions listed in the catalog when requesting data from the fulfillment center.

In block 2612, the fulfillment center 730 prepares the requested data (e.g., creates or collects the appropriate data layers. In block 2614, the fulfillment center 730 delivers the prepared data to a requested location. In particular, orders can be delivered in many different forms, such as tape, CD-ROM, or using File Transfer Protocol (FTP).

Orders that cannot be processed directly by the data center 720 will be sent to the fulfillment center 730. Typically, orders that require special GIS processing at the GIS processing center 714 or those that require the transfer of large amounts of data are sent from the data center 720 to the fulfillment center 730. Since a master archive tape library 723 contains all versions of the GIS data, the order fulfillment process is used to retrieve and fulfill the order for an earlier version of GIS data (e.g., original source data).

J. E-Commerce

Managing spatially referenced data effectively is expensive in terms of Information Technology (IT) infrastructure, personnel, data maintenance, and custom application development. Typically, specialized IT departments are charged with maintaining spatially referenced information systems and providing data and applications to internal users. New information is acquired primarily through large, data-development projects that are outsourced to subcontractors such as aerial survey and engineering firms, SIM services companies, and environmental consultants.

As with other IT systems, SIM managers face substantial challenges in delivering solutions to users while keeping costs under control. Implementations of the invention provide a solution in which business managers can subscribe to geospatial information services on a monthly basis and deliver data and applications directly to their users over the Internet. Users gain access to high quality, up-to-date geospatial information and business solutions designed specifically to solve problems in their industry. Thus, users can spend more time focusing on solving problems and making decisions, rather than on learning SIM software and importing and formatting data. IT managers can reduce infrastructure and application development costs, and IT managers can budget more predictably for the information resources needed to support corporate and agency decisions.

The need for well-timed and enhanced decisions require innovative techniques to access relevant and current information, as well as better tools to portray information in practical and valuable ways. The solutions provided and services permitted by implementations of the invention are designed to help executive decision makers, SIM analysts, and government agencies acquire, manage, and utilize spatially referenced information (e.g., imagery), thus, placing decision making power in the hands of those who need it. The solutions provided and services permitted by implementations of the invention reflect a new generation of enterprise decision support services that leverage and integrate the global If enterprise computing investment, ubiquitous computing capability, and SIM. Thus, by providing a comprehensive view of the enterprise and processes in different formats (e.g., vector format, raster format, tabular format, etc.), solutions provided by implementations of the invention generate actionable knowledge, which is knowledge that will enable decision makers within a wide array of public and private entities to explain events, share knowledge, predict outcomes, plan strategies, and make more informed decisions. The unique approach disclosed and claimed herein provides an easy to use, one-stop solution, built on data (e.g., integrated GIS imagery) and tools coupled with interactive easy-to-use mapping applications and up to and including 24/7 service delivery, and offers greater productivity and efficiencies than ever before. Furthermore, implementations of the invention provide the freedom to collaborate and share information in a secure online environment.

The services provided via the server system may be accessed by users who have an account at the server system. The services include, for example, access to data layers generated with enterprise data and/or third party data that is in the form of raster data, vector data, or tabular data. Additionally, one of the services provided is the ability to purchase data through the fulfillment order process.

Figure 27:
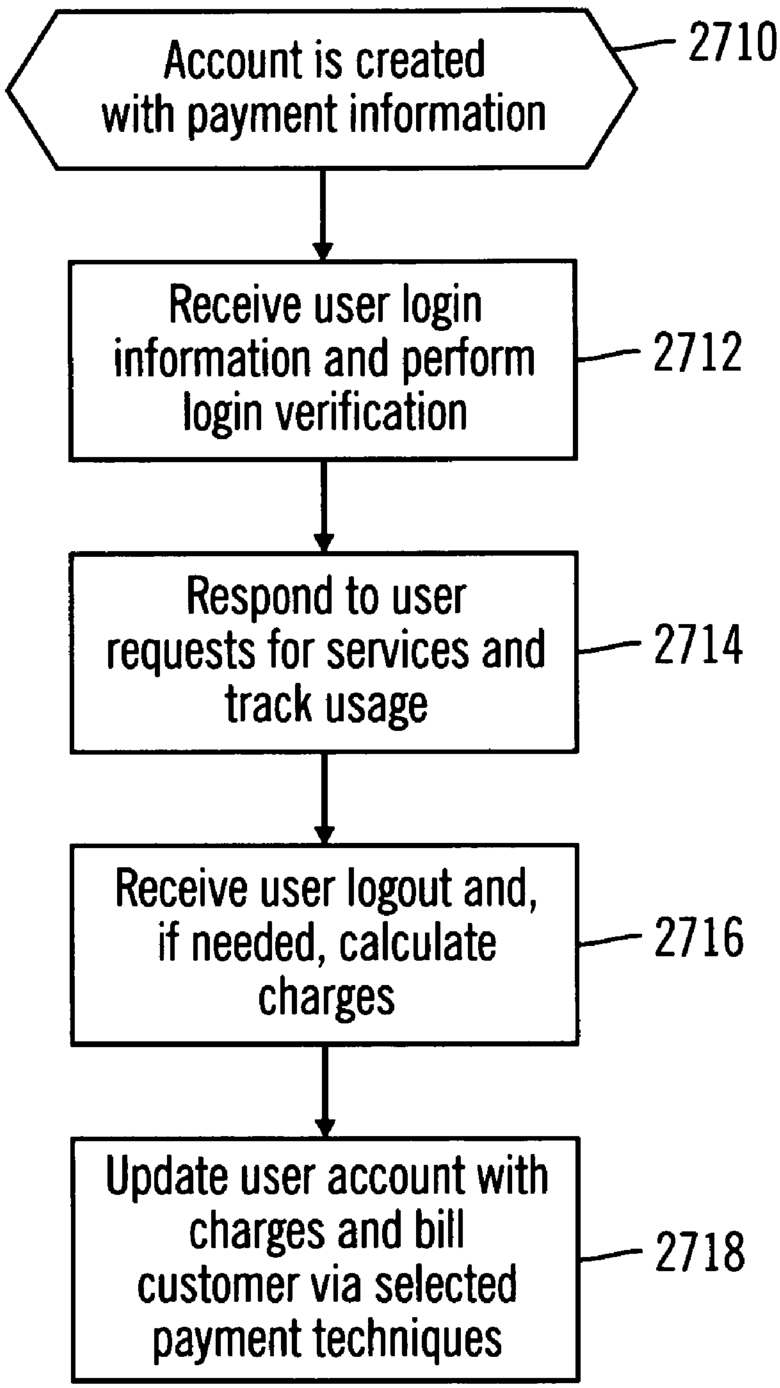
FIG. 27 illustrates logic for e-commerce processing in accordance with certain implementations of the invention.

FIG. 27 illustrates logic for e-commerce processing in accordance with certain implementations of the invention. Control begins at block 2710 with an individual user or a representative of a company creating an account with payment information in the enterprise spatial system. In particular, a user or representative of a company at a client system uses a UI screen provided by client software to log onto a website supported by the server system. The client system may be connected to the server system, via, for example, a network, such as the Internet. To create the account, information, such as first name, last name, and billing information, may be provided. The billing information may include, for example, a credit card type and number (e.g., for an individual) or a billing address to which invoices should be sent (e.g., for a company). Additional information provided would indicate the number of uses who would use the account. The number of users may impact the cost of using the services provided via the server system. For example, if a company wants to give 100 users access to the services provided via the server system, the cost may be less than if the company wanted to give 1000 user access to the services. Also, the account would specify whether charges should be based on individual accesses (e.g., a charge per access to the server system), based on an hourly rate for accesses, or based on a monthly, unlimited use charge. Also, a password may be set up for the account to be used by the server system to provide login verification.

In block 2712, once the account has been set up, a user may access the website supported by the server system and log into the server system, and the server system performs login verification procedures to ensure that the user may log in (e.g., by requesting a password from the user). In certain implementations, just after a user has created a new account, the user is automatically logged into the server system. Then, the user may use the services provided by the server system, including viewing data and purchasing data. A "shopping cart" feature is available to enable user's to store data that is to be purchased while "shopping" for additional data or using other services.

The server system responds to the user's requests for services and tracks usage (block 2714). While tracking usage, the server system may collect information about a particular user that may be stored in a user profile for the user, along with demographic (e.g., address) and other information.

Once the server system receives an indication that the user has logged out, if needed, the server system calculates charges for the usage (block 2716). For example, if the account indicates that users are to be charged based on an hourly rate, the charges would be calculated based on how long the user accessed the services. If the account has a monthly, unlimited use charge, then the calculations are not needed. Then, the account may be updated with the charges, and the customer is billed via one or more selected payment techniques (block 2718). For example, the charges may be billed for each usage or periodically (e.g., monthly), or some combination of these depending on the services used.

In summary, users may subscribe to enterprise spatial system information services (e.g., on a monthly basis or per usage or per hour) and receive data and/or applications via, for example, the Internet. Additionally, various e-commerce related transactions are supported by the server system, such as purchase order handling, shopping cart management, billing, user profile and account management.

K. Handoff and HandBack with a Third Party System

Implementations of the invention allow the dynamic interaction and integration of spatial data with a third party system. In particular, a technique is provided to handoff spatial data and commands to a third party system. Additionally, information may be received back from the third party system for interacting with client software and updating spatial data. Also, a technique is provided for receiving spatial and tabular updates from a handoff to a third party system using an interface technique, such as Web Services (which is a standard, flexible connection technique to allow communication between disparate computer systems using Internet or similar network connection to transfer information and may be used to send XML messages). Moreover, the enterprise spatial system may provide a spatial editor for modifying editable data elements (e.g., graphical objects or tabular data, etc.), while the third party system may implement business rules for validating the editable data elements.

Although the enterprise spatial system of the invention may operate without any interaction with a third party system, in certain implementations, the enterprise spatial system may be used with a third party system to allow the third party system to benefit from the spatial processing provided by the enterprise spatial system. The third party system may interact with and be an extension to the client software. This in effect is an extension mechanism that allows the client software and enterprise spatial system to be extended to incorporate an unlimited number of customer specific functions without making changes to the client software or the enterprise spatial system. The interaction with a third party system is performed by a client software "handoff" during operations supported by the third party system. The term "handoff" refers to an information packet that contains a command and various additional parameters and information, along with a description of a technique for returning control back to the client software. The handoff may be performed using a secure communications mode (e.g., HTTPS, SSL, or other secure communications) between the third party system and the client system to protect the information and integrity of both the third party system and the client system.

Figure 28:
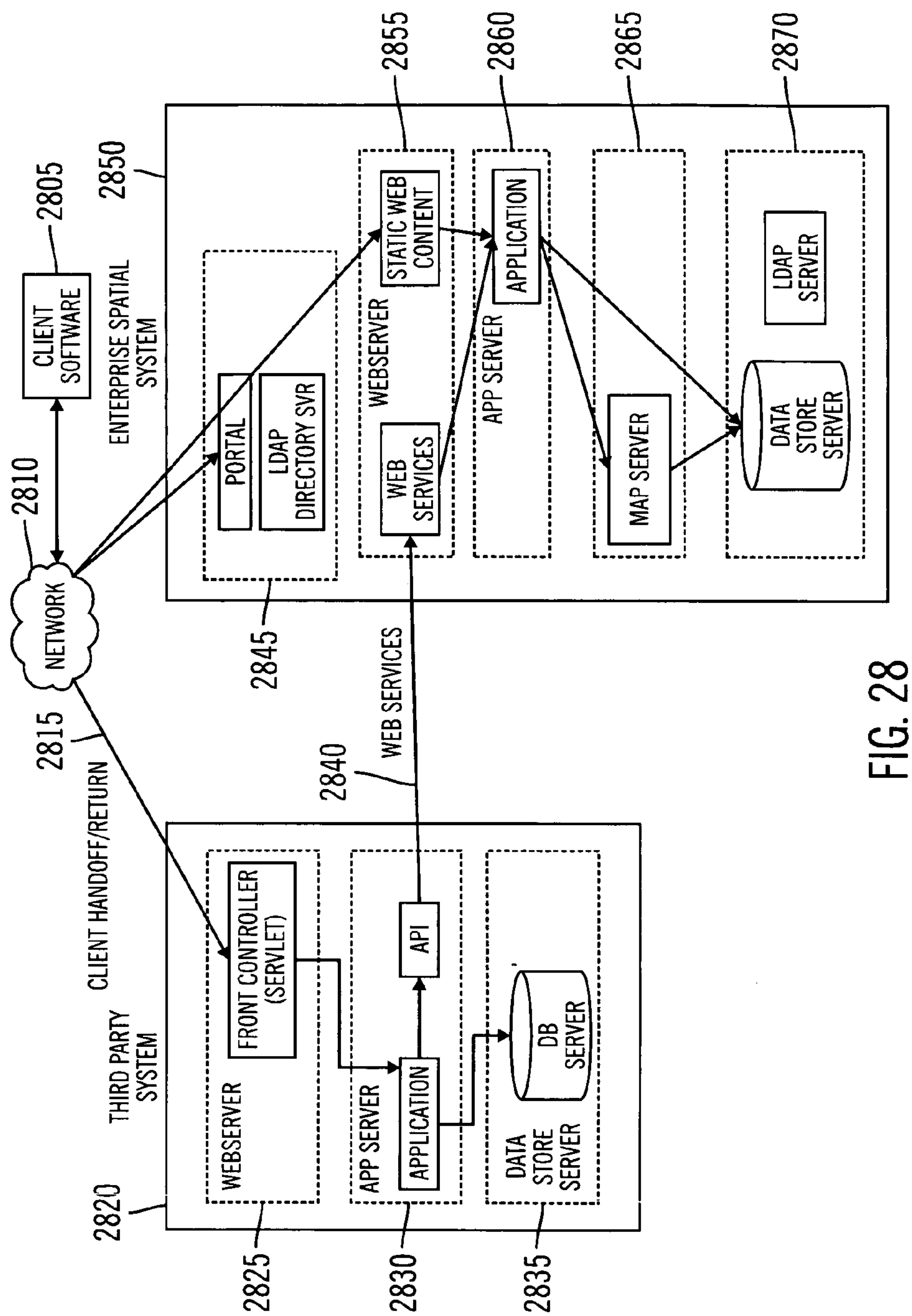
FIG. 28 illustrates an enterprise spatial system interfacing with a third party system in accordance with certain implementations of the invention.

FIG. 28 illustrates an enterprise spatial system 2850 interfacing with a third party system 2820 in accordance with certain implementations of the invention. Client software 2805 at a client system connects to enterprise spatial system 2850 through a network 2810 (e.g., the Internet). An optional front-end portal 2845 may be used for authentication, access control, and other system services. In certain implementations, the enterprise spatial system 2850 includes Web server 2855, application server 2860, map server 2865, and LDAP server 2870. During client handoff of data (e.g., a message), the client software 2805 redirects data to the third party system 2820 through the network 2810. In certain implementations, the third party system 2820 includes Web server 2825, application server 2830, and data store server 2835.

If third party system 2820 wishes to update spatial and tabular information using a Web services connection or other backend systems communication, then the third party system 2820 sends updates using APIs along Web services connection 2840 to Web services of Web server 2855. Although Web Services is shown in FIG. 28, any other API or protocol that supports communication between two computer systems across the network may be used. The network may be an internet or intranet. Moreover, client software 2805 may be used to edit data (e.g., an image or tabular data). Then, the edited data may be passed to the third party system 2820 from the client software 2805 for validation of data, further edits, etc. The third party system 2820 can perform functions on the data, and return the data (possibly modified) to the client software 2805.

One example of how a handoff can work will be described with reference to a spatial editor provided by implementations of the invention. The spatial editor allows a user to quickly and easily edit complicated editable data elements from a server system at the enterprise spatial system using client software (e.g., browser, software application, etc). Further details of the processing performed by the spatial editor will be discussed below.

In some cases, the shape of an editable data element represents real world objects, such as the boundary of a piece of land. Changes to the editable data element may have business implications and rules to be addressed. Therefore, rather than directly updating the server system in the enterprise spatial system with spatial data, the spatial editor may send the edited spatial data to the third party system.

The third party system may perform calculations or checks based upon the editable data element and what the editable data element represents in the third party system. Calculations include, for example, updating the area of a polygon editable data element in acres or square feet and valuation or quantity estimates based upon the new editable data element and any necessary and appropriate calculations.

The third party system may make modifications to the editable data element to meet certain rules. For example, two or more shapes may be modified so that at least one shape overlaps at least another shape (i.e., the shapes overlap) and other editable data element boundaries may be modified (e.g., stretched). Limits on certain spatial features, such as width of roads or offsets from certain boundaries, may also be applied.

The third party system, once it receives the handoff, may send other pages (e.g., pages indicating that information input into fields in a previous page on the display screen are incorrect) to the client software to display to the user or may send status (e.g., a requested operation is not allowed or to request additional information) to a user. Additionally, different functionality may be performed at the third party system (e.g., the third party system calculates data based on tabular data stored at the third party system) that generates additional data. The third party system may return the generated data to the client software for display to the user. Since the user is not aware that processing is performed by the third party system, rather than the client software, the functionality of the third party system appears to be integrated with the client software at the client system.

After verifying that one or more rules have been satisfied, the third party system may update the spatial data through a backend interface (e.g., using various protocols, such as Web Services) at the enterprise spatial system. After the updated data is stored at the spatial data store of the enterprise spatial system, the third party system may send a handback to the client software indicating that the client software should refresh data. The client software may then refresh data from the updated spatial data store.

The third party system may maintain proprietary data that is associated with spatial data in the third party system and deliver this to users through the client software at the client system, without having to host the proprietary data in an outside environment (e.g., the enterprise spatial system). In particular, the third party system may maintain additional information about each editable data element stored in the enterprise spatial system data store. The objects in the enterprise spatial system data store and the corresponding objects in the third party system data store may be correlated using an identifying key called Alternate Key ID (AKID). The use of AKID allows the related data in the two data stores to be synchronized. The use of AKID allows third party systems to maintain proprietary information that can interact with the spatial data stored at the enterprise spatial system and be provided to the user without submitting this information to the enterprise spatial system.

The third party system can also apply secret and proprietary processes to spatial data or the tabular data associated with spatial data, without revealing the processes or hosting them in an outside environment (e.g., the enterprise spatial system), while the proprietary operations and processes appear to happen seamlessly, and the user does not know that there are two environments.

Implementations of the invention, enable client software and/or an enterprise spatial system to accept back changes to a set of spatial references and modify the display or other spatial parameters. That is, after the client handoff, there may be a client handback that returns control from the third party system to the client software. Embedded in the original handoff is a return location so that the client software can handoff to physically or logically different platforms and still receive the handback. The third party system uses the return location, like a return address used in mail, to return control back through the handback mechanism. The handback contains, for example, status information, editable data element changes or creations, and/or other information. This allows a third party system to implement editable data element changes without having to build a backend interface to the enterprise spatial system. That is, the third party system may modify the spatial data stored in a data store at the enterprise spatial system through updated information in the handback to the client software or directly by interacting with the server system at the enterprise spatial system through Web Services.

Implementations of the invention provide the ability to provide commands (e.g., the handoff may include commands, such as merge data) to a third party system with references to the associated spatial data. Also, implementations of the invention provide the ability to provide spatial editable data element information and spatial change information to a third party system. The client software may arrive at a set of spatial references to pass to the third party system by performing spatial queries to the server system at the enterprise spatial system before the handoff is performed.

A third party system may perform additional queries or qualifications off of a data set (e.g., spatial, tabular or both) passed to it in a handoff from the client software . The third party system may use additional data sets already residing at the third party system while performing such additional queries or qualifications of the data. The third party system may send the qualified data back to the client software through the handback, allowing the client software to update the view of the data seen by the user.

Also, the enterprise spatial system is able to accept commands to change spatial data sets, such as Insert, Update and Delete through a backend system interface (e.g., Web Services), allowing the third party system to submit these changes. The enterprise spatial system performs the command and stores updated data in the data store. Moreover, data (e.g., a map image) may be updated based upon the Insert, Update and Delete commands received through the backend system interface. In certain implementations, the update may occur in real time. Then, the client software may receive a handback from the third party system indicating that the client software should refresh its data from the data store at the enterprise spatial system.

The third party system may apply business rules, processes, editable data element validations, and editable data element changes seamlessly with the client software at the client system and have the changes reflected immediately on the display screen at the client computer and in the data store of the enterprise spatial system.

Also, implementations of the invention provide the ability to notify client software at different client systems of changes to spatial data or associated data made by client software at another client system. In certain implementations, the notifications occur automatically, and, in certain other implementations, client software at different client systems would have to register with the enterprise spatial system to receive notifications of changes to spatial data or associated data.

L. Editing Spatially Referenced Data

Implementations of the invention provide advanced editing features in a client software based spatial editor that interfaces to a server system at the enterprise spatial system. The spatially referenced data may include, for example, vector data, raster data, and tabular data, such as, customer information, sales data, and marketing data. Although in certain implementations of the invention, the spatial editor may operate as a standalone spatial editor, the spatial editor has the ability to interface to a third party system during any operation. This allows a third party system to seamlessly modify the user prompts, insert additional display screens and functions, apply business specific logic or tailor the editable data element updates from the spatial editor. Implementations of the invention also provide integration with third party systems using a client software handoff interface and, for example, a Web Services interface.

Implementations of the invention provide a spatial editor (which, in certain implementations, is part of client software) to allow a user to quickly and easily edit complicated editable data elements from a server system using client software (e.g., browser, software application, etc). When used with an optional third party system, additional business logic, editable data element manipulations, and proprietary processes may also be applied.

A composite image is separated into data layers that can be selectively turned on and off through a selectable data layer list. When a data layer is selected for editing, the spatially referenced data associated with that data layer is turned off and the editable data elements (e.g., graphical objects that may be edited) are represented by wire frame outlines. The layer selected for editing is referred to as an "edit layer." The user can turn the edit layer back on to enhance the view of changes and relationships to the original editable data elements while editing.

When a data layer has been selected or editable data elements on a data layer are selected for editing, the client software sends a request for information to the server system based upon the image of the data layer. The server system determines spatially which editable data elements were selected from that data layer and retrieves from the data store all of the attributes of the object, such as vertices, that defined the viewable shape of the object. Other relevant information for the data layer may also be retrieved. The server system sends this information to the client software. The client software represents the editable data elements as associated points on a display screen. This technique allows the user to select editable items off of a multiple layer image, without having to request from the server system all of the editable information about each data layer residing at the client system.

Selected editable data elements may have vertices moved or deleted. Additional vertices or editable data elements may be added. In certain implementations, with spatially referenced data sets, objects (i.e., a type of editable data element) are one of three types: point, line or polygon, and a single data layer contains one of the three types. For example, this restriction prevents copying lines to polygon data layers and copying polygons to line data layers. In implementations of the invention, the user is prevented from creating an invalid editable data element object for a particular data layer or from modifying a valid editable data element object to create an invalid one.

Editable data elements have associated tabular data. Implementations of the invention support the viewing and editing of the associated tabular data. The tabular data has certain defined data types, and the spatial editor will enforce proper validation on entries to ensure that the defined data type restrictions are enforced. Examples of the data types are number, text, number of characters, value limits, etc.

In the spatial editor, a temporary editing buffer is available that allows other editable data elements from different spatial data layers to be added in an editable form. The client software may perform a spatial query against other data layers to retrieve the editable information about those specific editable data elements. If the editable data element type (such as point or line) of a particular object in the temporary buffer matches that of the current edit layer, then the editable data element can be copied from the temporary editing buffer onto the current edit data layer and further modified if desired. The temporary editing buffer is also available to copy portions of editable data elements for attachment to other editable data elements on the editable layer.

The spatial editor is able to copy portions of another line or polygon and append those vertices to the currently selected line or polygon. This copy feature eliminates the need for a snap to function, often used in other spatial editors to match new vertices to existing vertices. The snap to function in conventional systems becomes cumbersome while editing complicated editable data elements since there may be hundreds of vertices and the snap to function must be applied to each vertex one at a time. By eliminating the snap to function, implementations of the invention provide a more efficient editing technique to make an object being edited conform to a pre-existing shape of another object.

For the spatial editor, provided by implementations of the invention, to copy a portion of a line or polygon, two adjacent locations (e.g., vertices) are selected on the initial editable data element (to which data is to be copied), and three locations (e.g., points) are selected on the editable data element from which a portion is to be copied. The three locations indicate the starting location, the direction (used for polygons since clockwise or counter clockwise directions are both valid and optionally used for lines), and the ending location. After these five locations have been selected, the client software adds the selected portion of the object from which points are to be copied to the initial editable data element. This processing may be done against editable data elements in the temporary edit buffer. This editing allows portions of a line to be used as part of a polygon and portions of a polygon to be used as part of a line. Although a portion of a line may be combined with a portion of a polygon, the restriction preventing copying lines of editable data elements to polygon data layers and copying polygons to line data layers is enforced, so that, for example, a portion of a line may not be, by itself, added as a standalone object to a polygon data layer.

For example, for a plot of land bounded by a river, rather than snapping to each vertex that represents the river (possibly hundreds of vertices), the line of the river (i.e., a editable data element) may be copied into the temporary buffer, and a portion of the line of the river to be attached to the polygon representing the plot of land may be copied to the polygon. The plot of land now has a boundary that matches the river, without having to manually match hundreds of vertices. This eliminates a common problem of conventional GIS tools that is the creation of "sliver" polygons. "Sliver" polygons are the many small polygons unintentionally created, often caused by inaccuracies in matching vertices, when trying to match complicated boundaries with hundreds of vertices.

With conventional spatial editors, if a large group of vertices needs to be deleted, they can either be deleted individually or deleted by defining a deletion window. With complicated, irregular editable data elements that are adjacent to each other, it is difficult to define an appropriate window that selects only the desired vertices to delete. On the other hand, with the spatial editor, provided by implementations of the invention, a group of vertices can be deleted by selecting a start location, direction, and ending location on a line or polygon, and then having all of the vertices between the starting and ending locations deleted with a single operation.

Depending on the level of zoom, the complexity of editable data elements and the number of selected editable data elements, there may be more selected vertices than can be quickly and easily converted and sent to the client software for editing. Also, when there are thousands of vertices visible, it is usually not possible to edit the vertices because the density of vertices prevents distinguishing one from another. One solution is to limit the level of zoom, preventing editing above a certain predefined fixed level, but this solution restricts editing in sparse areas and has slow response in dense areas. Rather than limit the level of zoom, with implementations of the invention, the server system does a quick calculation of the total number of vertices for all of the selected editable data elements and prevents editing if this exceeds a threshold. In certain implementations, the threshold is determined to be the maximum number of vertices that may be edited while maintaining good performance and ease of editing. If the threshold is exceeded, the user is notified to zoom in or select specific editable data elements, until the spatial editor allows the editing based upon the number of vertices.

Typically, with client software, the user often attempts an action before the client software indicates that the action is not appropriate. There may be many different editing features that are available, depending on the editable data element, mode of operation, and other spatial features. With implementations of this invention, rather than having the user read various messages, the spatial editor's cursor dynamically modifies itself depending on the mode of operation and which editable data element that the cursor is over to indicate allowed operations and information about the underlying editable data element. The dynamically modifying cursor provides a very quick and intuitive interface for the user.

For instance, when appending a portion of an existing line segment to an editable data element, the user may wish to use an existing vertex on that line or generate a new one. The dynamically modifying cursor will change when the dynamically modifying cursor is over an existing vertex to indicate to the user that an existing vertex will be used, as opposed to creating a new one. In a similar manner, colors and highlighting of editable data elements are used to help the user with operations. For complex polygons, the interior polygon has a special dashed line outline to indicate the difference between a different polygon and one that is the interior of a complex polygon. Once an operation has begun, the dynamically modifying cursor will inform the user when the user is over the editable data element(s) that the user is allowed to select or operate on, and the dynamically modifying cursor indicates that no action is possible when over other editable data elements.

In conventional client software, complicated editing operations are often sent back to the server system for processing to prevent having to put complicated code in the client software. That is, in conventional systems, editing requests are sent from the client system to the server system, the server system performs the editing, and the server system returns a composite image to the client system. In some systems, this can slow the response to the user and increase the support needed by the server system. With the spatial editor, provided by implementations of the invention, multiple operations to a single editable data element can be performed until the user is ready to save the editable data element to the server system, thus enhancing the performance of the system and the interaction with the user. When each editable data element is ready to be saved, the editable data element may optionally be handed off to a third party system for the application of business rules and for validity or other checking before completing the editing request.

In summary, implementations of the invention, the spatial editor provides the ability to turn off and on the image of the edit layer, while maintaining all of the other layer images for reference. Additionally, the ability to turn off and on various other images to provide relative position and background during editing is provided. While editing and maintaining the editing context, the spatial editor allows panning and zooming. The spatial editor provides the ability to load all of the spatial data about the images of a layer from a server based system to support the manipulation of editable data elements. Additionally, the spatial editor provides the ability to perform a spatial query against an image to select single or multiple items to be edited, thereby limiting the time to load data from the server system (e.g., there could be thousands of shapes, and the user may wish to modify three shapes, so only data for the three shapes would be loaded from the server system) and the complexity of the user display.

The spatial editor provides the ability to load editable data elements from various layers into a temporary area for usage on the edit layer, either in whole or in part including mixing of data layer types. The spatial editor provides the ability to copy portions of line segments or polygons directly and to append the portions to existing editable data elements. The spatial editor provides the ability to mark multiple vertices on complicated editable data elements and erase them in a single operation. The spatial editor provides the ability to push the execution of complicated spatial updates (e.g., merging four shapes or other manipulations) to the server system or to a dedicated third party system specializing in such operations using the handoff technique described earlier, instead of executing these on the client software. The complicated spatial manipulations can take advantage of server system based processing power and techniques, while using the spatial data store to take into account interaction with other editable data elements.

The spatial editor also provides the ability to limit the enabling of editing to editable data elements or groups of editable data elements with less than a certain number of visible vertices to enhance performance without needing a fixed zoom level restriction. Moreover, the spatial editor provides a dynamically modifying cursor to indicate allowed operations and information about the underlying points and editable data elements during editable data element manipulations. The spatial editor provides the ability to detect the editable data element type for the current layer and modify the tools to use that object type. The spatial editor allows multiple editing operations locally without the need of server system access. Furthermore, the spatial editor allows the editing of tabular data associated with the spatial object. The spatial editor also supports handing off data to a third party system for application of business rules and logic to editing requests.

Figure 29:
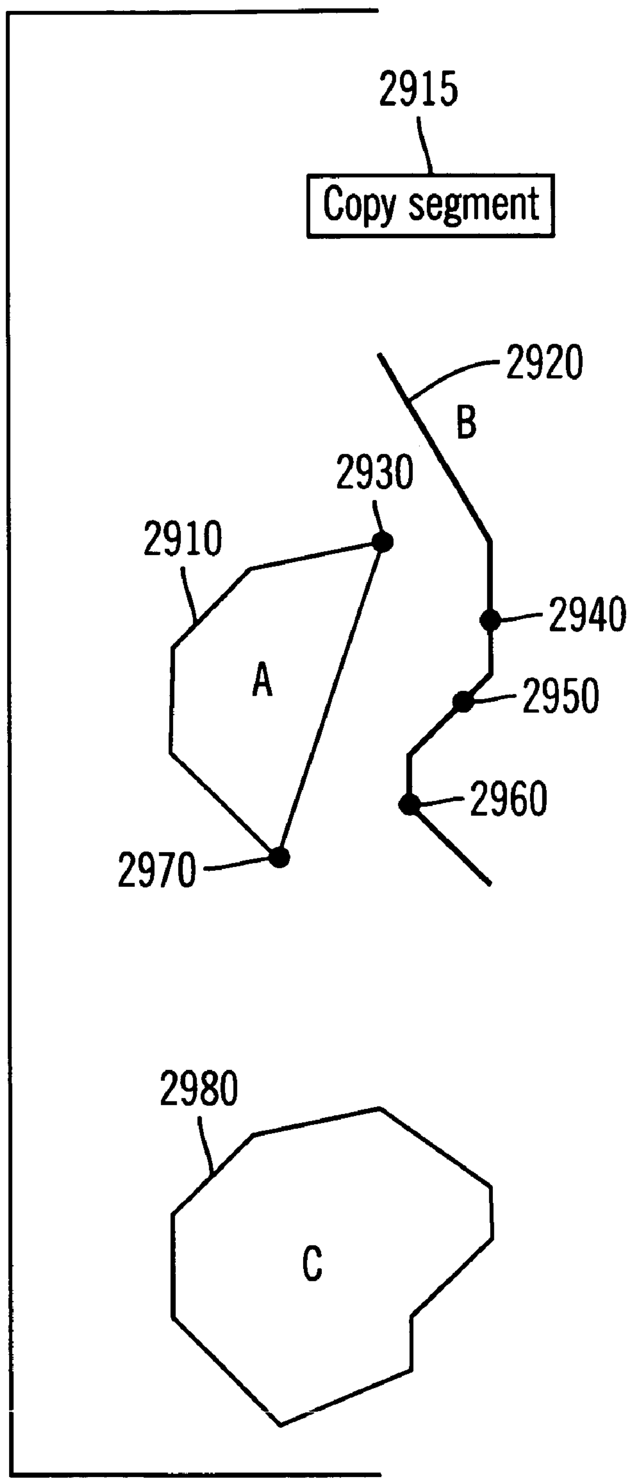
FIG. 29 illustrates an editing example in accordance with certain implementations of the invention.

FIG. 29 illustrates an editing example in accordance with certain implementations of the invention. The spatial editor combines editable data element 2910 with a selected portion of editable data element 2920 to form editable data element 2980. In certain implementations, a user selects editable data element 2910 to receive a portion of another editable data element by, for example, selecting a copy segment command 2915 from a spatial editor UI screen. Next, one of the vertices on the initial editable data element 2910 is selected as the starting location to receive the new segment.

The first location 2940 on the editable data element that contains the desired segment to be copied from editable data element 2920 is selected. In certain implementations, after the first location 2940 has been selected, the next location selected also resides on the editable data element 2920. The next location 2950 indicates which direction to go between the first and last location selected on editable data element 2920. If editable data element 2920 is a polygon or if a portion of the editable data element 2920 is not displayed on a display screen of the client system, then, without an indication of direction, it may be ambiguous as to whether to select the segment that is clockwise or counterclockwise between locations 2940 and 2960. Location 2960 represents the third location selected on editable data element 2920.

Locations 2940 and 2960 may be existing vertices of editable data element 2920 or, if the location selected is not an existing vertex, a new vertex is created. The last location selected 2970 is the ending location on the initial editable data element 2910. When this location 2970 is selected, the spatial editor connects locations 2930 to 2940, connects all of the locations (e.g., vertices) between locations 2940 and 2960, and then connects locations 2960 to 2970. This creates the new editable data element 2980 with a matching boundary between editable data elements 2910 and 2920 at the desired locations.

Figure 30A:
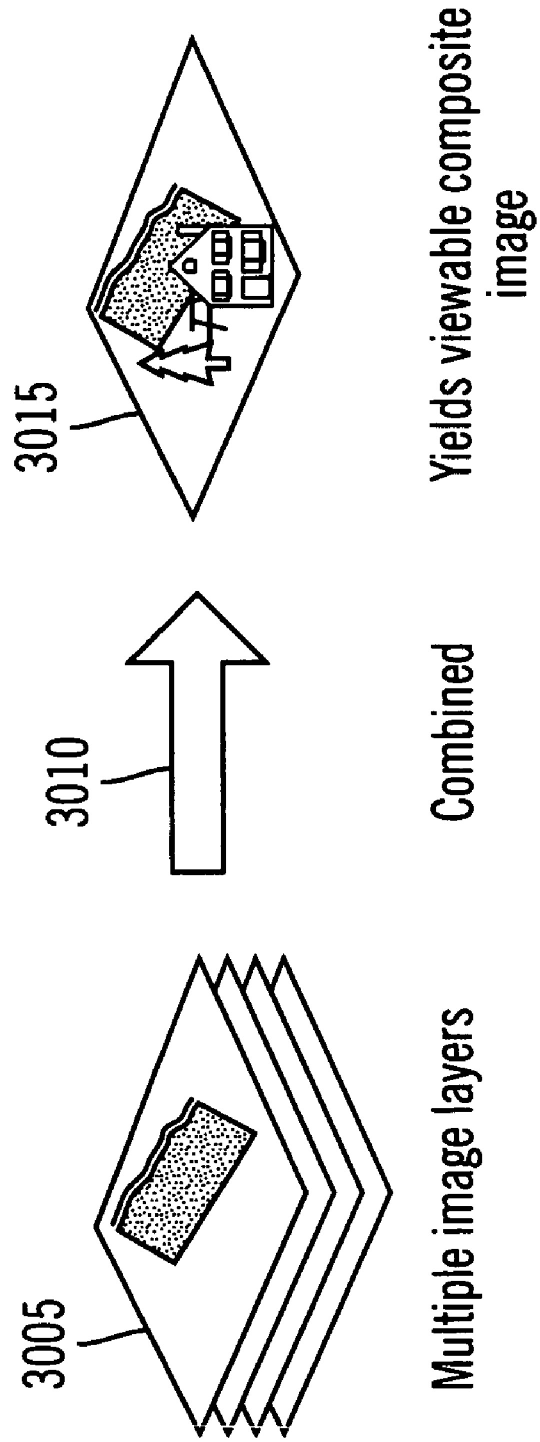
FIGS. 30A–30C illustrate editing in accordance with certain implementations of the invention.
Figure 30B:
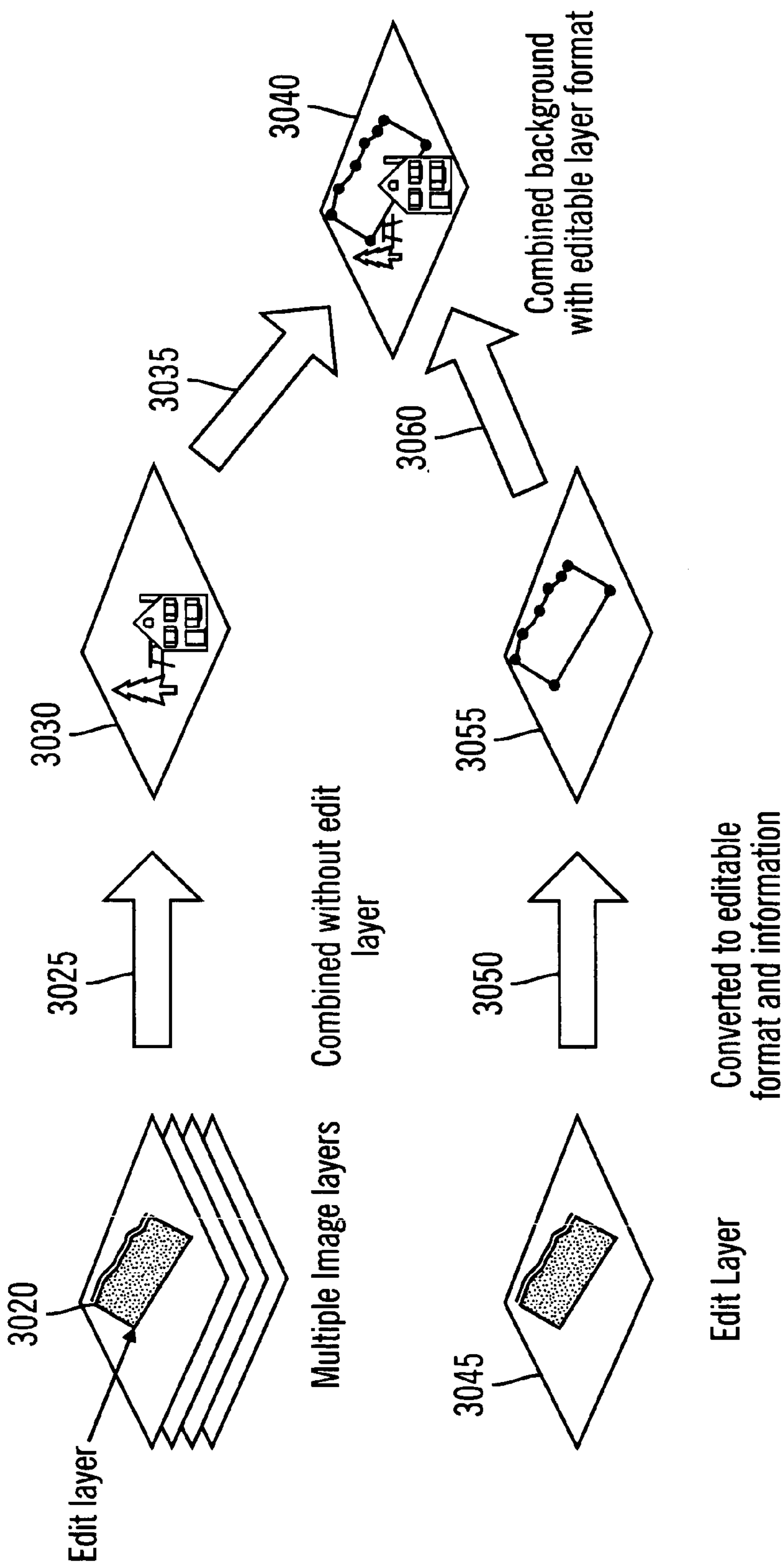
Figure 30C:
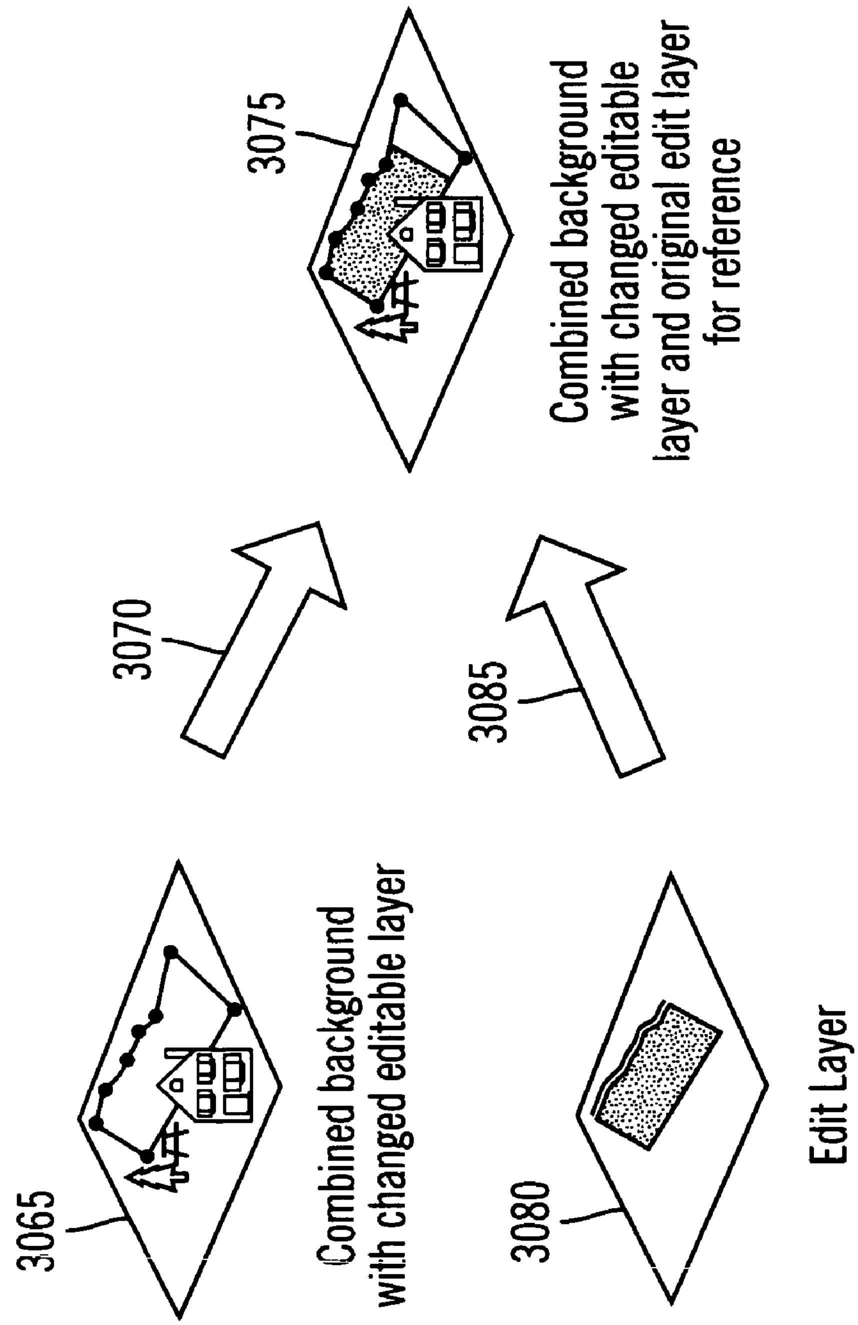

FIGS. 30A–30C illustrate editing in accordance with certain implementations of the invention. In FIG. 30A, a composite image displayed by client software is composed of many images 3005 combined 3010 to form the final composite image 3015.

In FIG. 30B, when a particular image 3020 is selected for editing (i.e., the "edit layer"), a background 3030 for editing is generated by combining 3025 all of the remaining images. The edit layer 3045 is requested from the server system in an editable layer format 3050 by the client software. The term "editable layer format" refers to providing a wire frame outline of each editable data element with the vertex position information available, as is illustrated by edit layer 3055. The edit layer 3055 and the background 3030 are combined 3035 and 3060 to form a combined background with an editable layer format 3040 that is displayed to a user, while editing.

In FIG. 30C, changes can be made to the layer 3040, resulting in a combined background with edit layer changed 3065. If a user wishes to view the changes in the edit layer 3080 relative to the original image of that edit layer 3080, then the edit layer 3080 can be turned on (e.g., via a command in a UI screen), and layers 3065 and 3080 are combined 3070 and 3080 to generate a combined background with changed editable layer and original edit layer for reference 3075.

Figure 1:
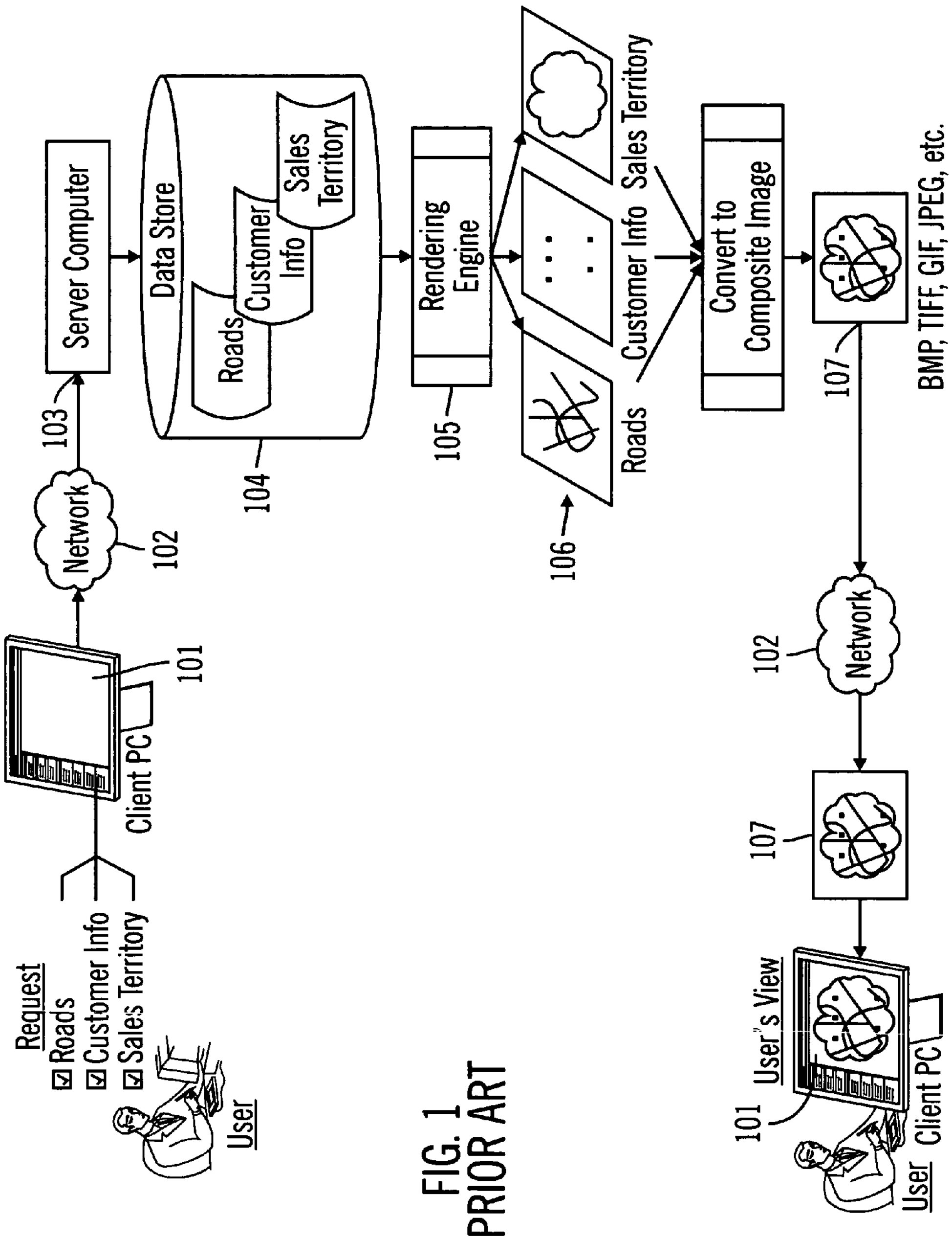
FIGS. 1–5 illustrate various problems in the prior art.
Figure 2:
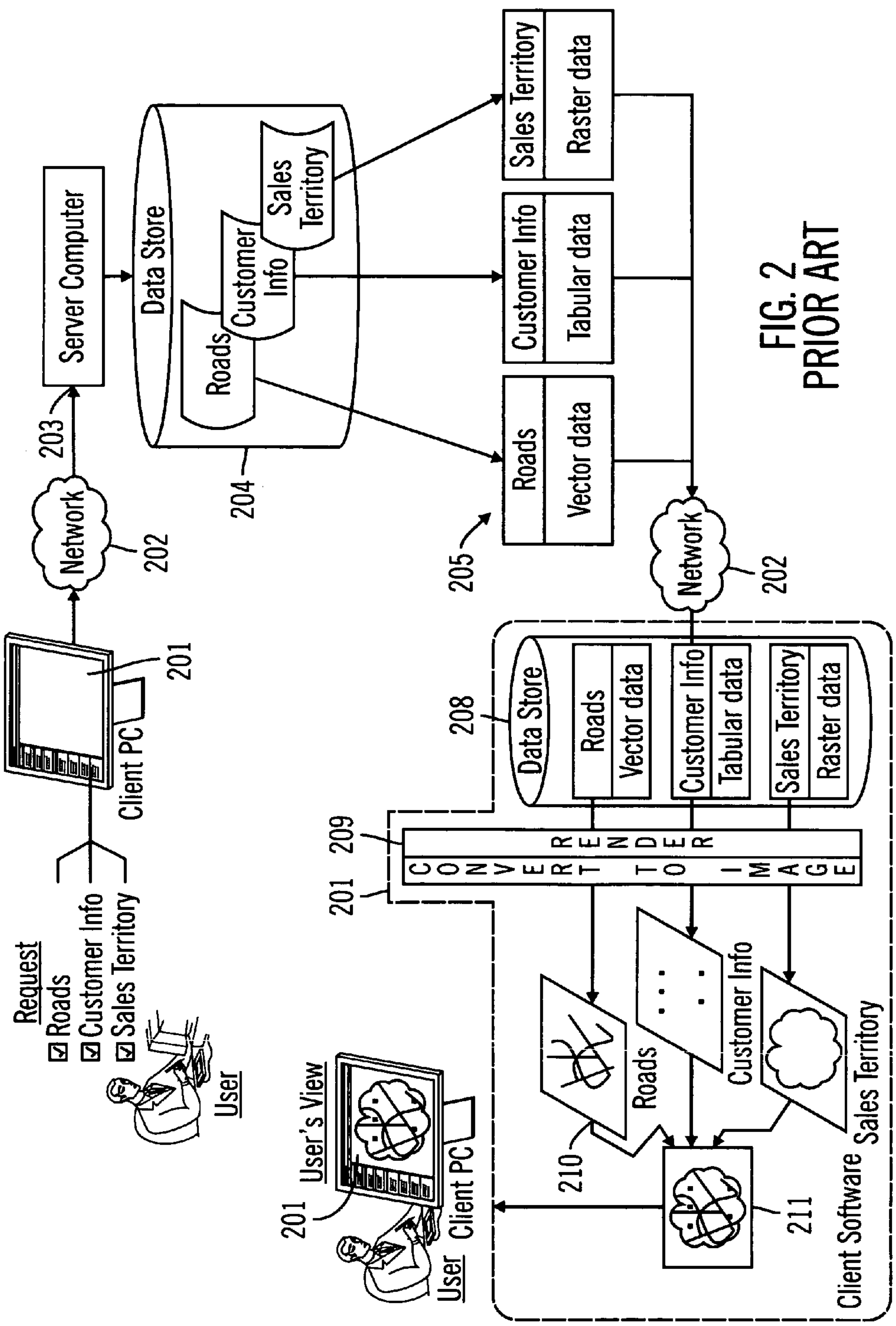
Figure 3:
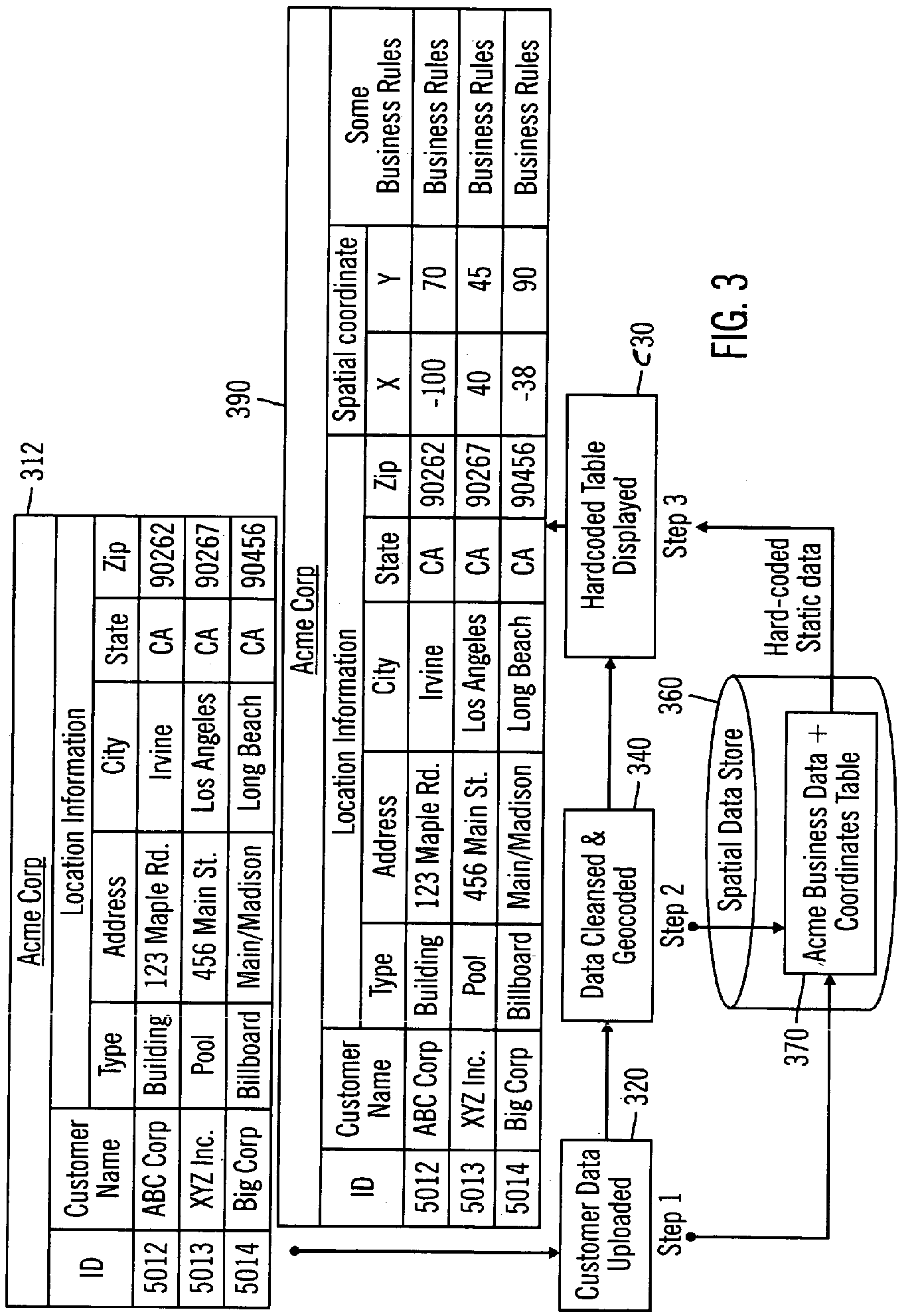
Figure 4:
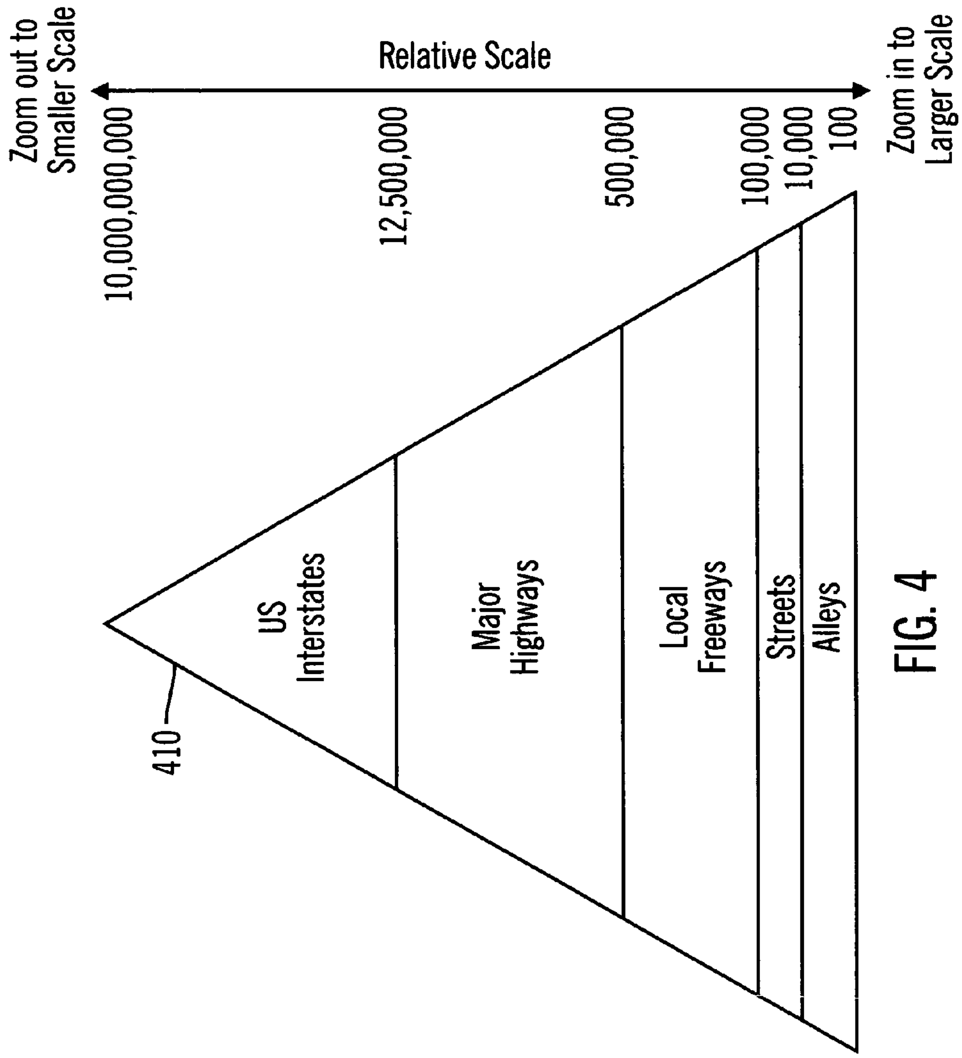
Figure 5:
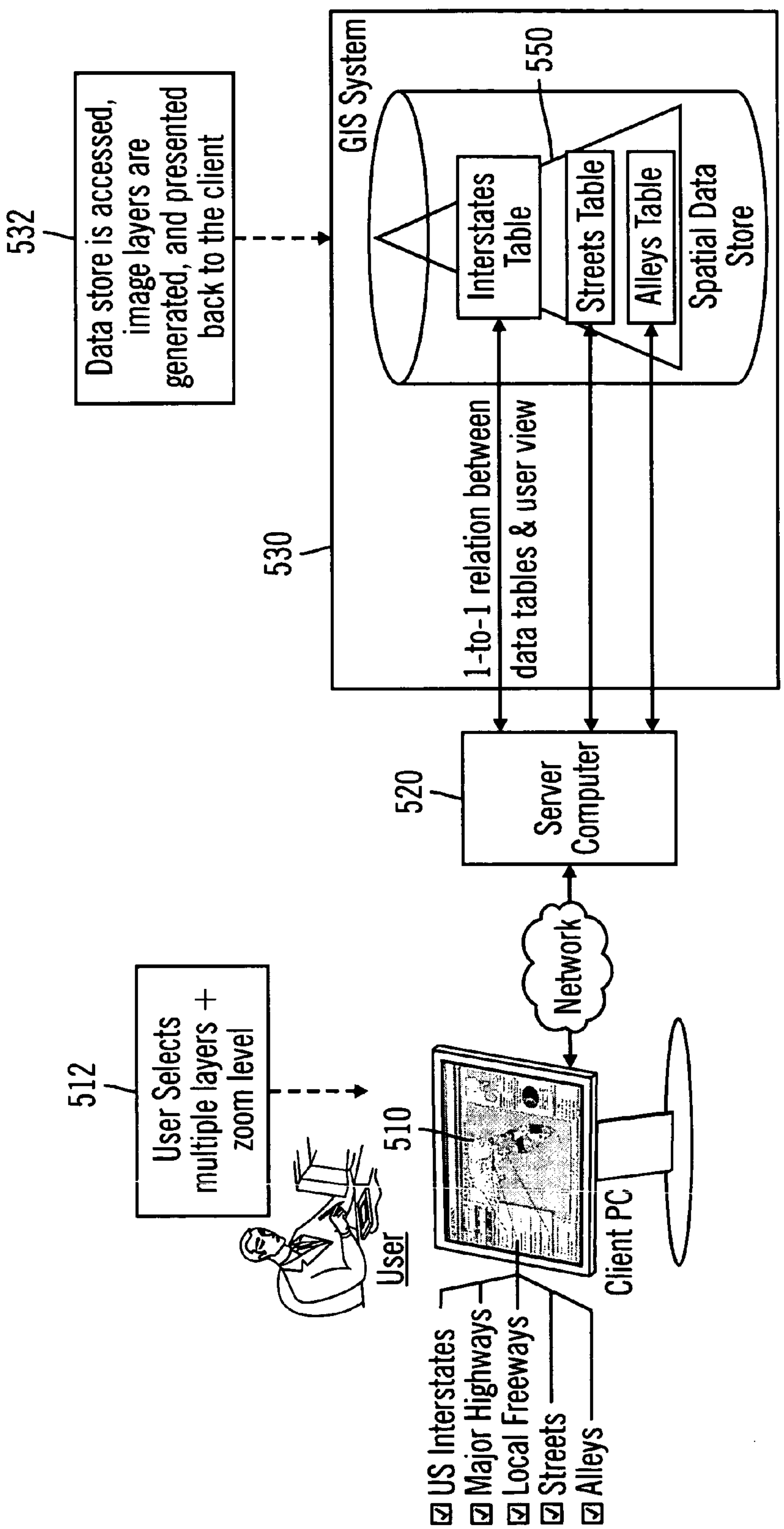
Figure 31A:
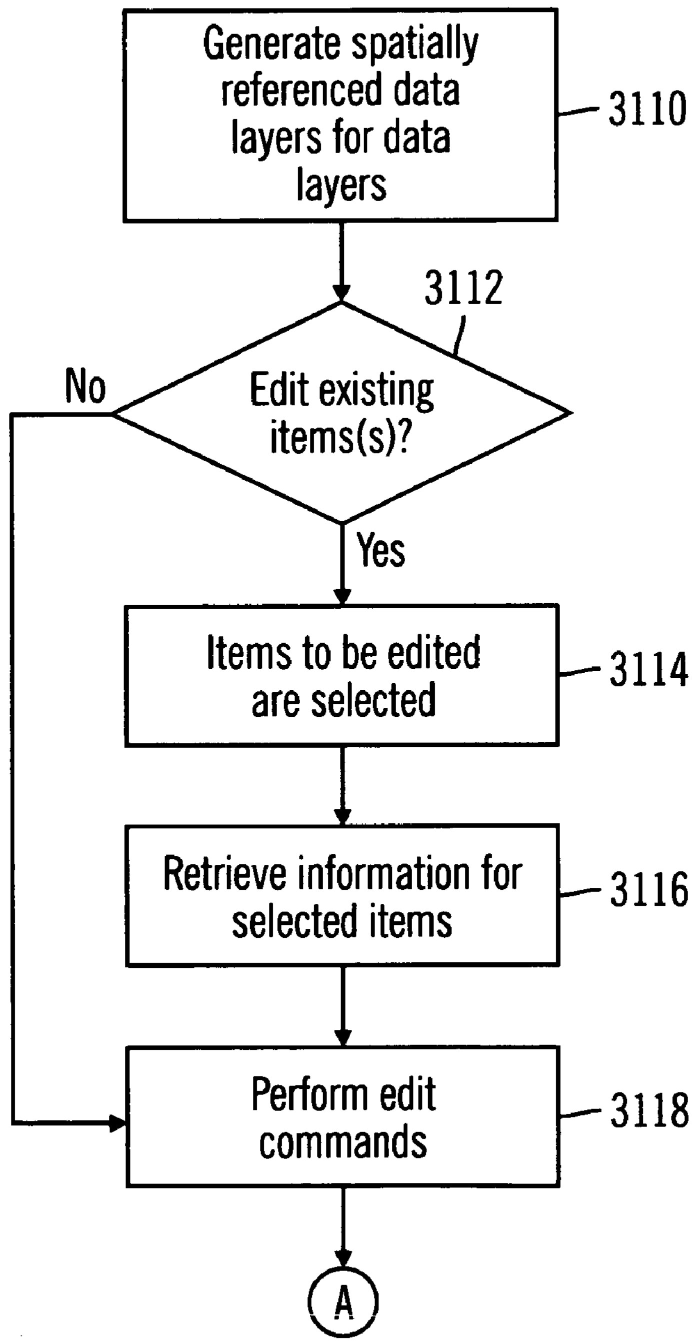
FIGS. 31A–31B illustrate logic for editing in accordance with certain implementations of the invention.
Figure 31B:
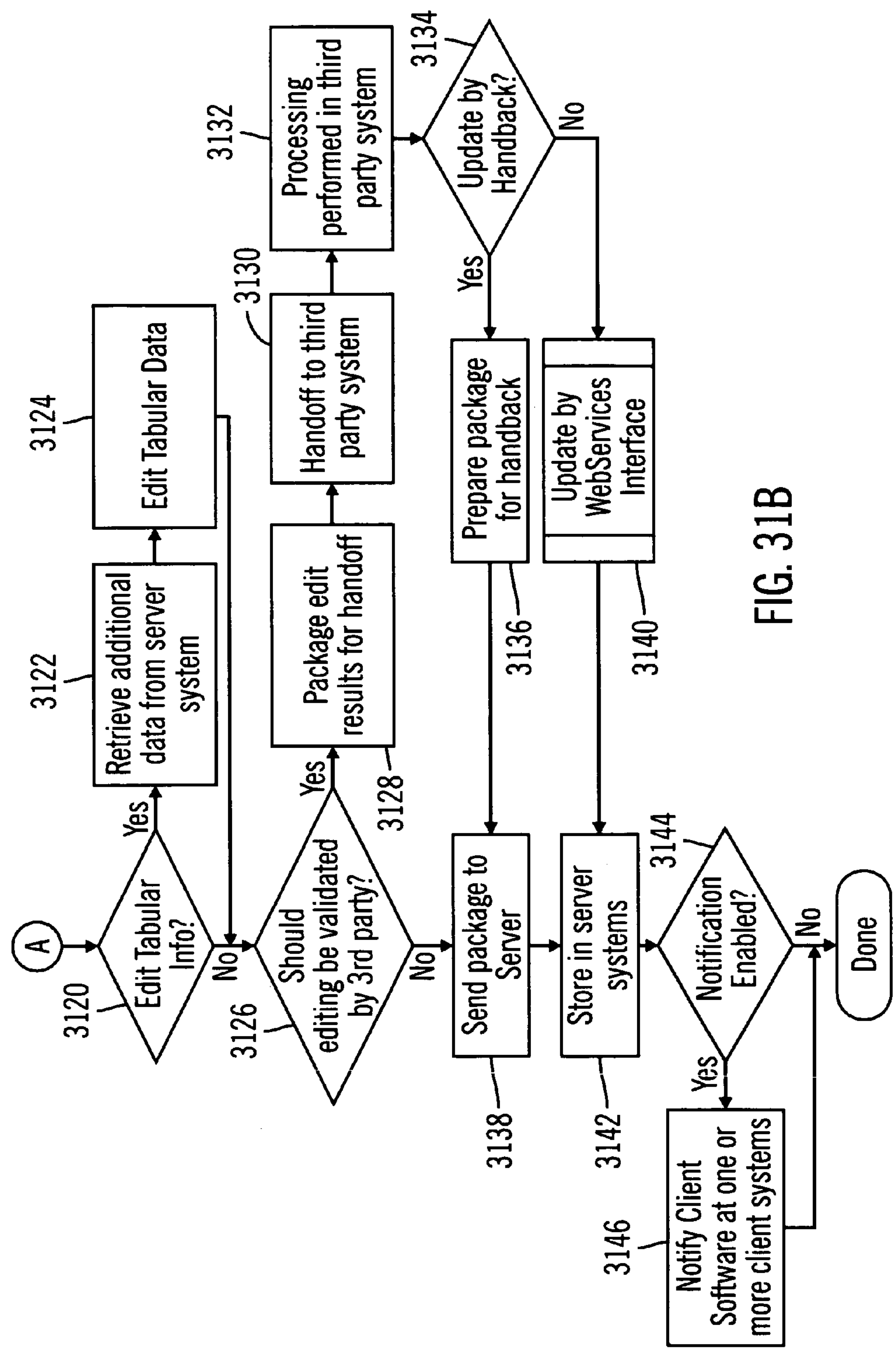

FIGS. 31A–3B illustrate logic for editing in accordance with certain implementations of the invention. Control begins at block 3110 in FIG. 31A with generation of spatially referenced data layers for data layers. In particular, the client software builds a set of spatially referenced data layers and combines them into a composite image (i.e., a viewable image). For example, within the client software, the viewing of the desired background layers and, optionally, the edit layer are enabled, which sets the viewing context for editing. In block 3112, it is determined whether existing items (e.g., editable data elements or tabular data) are to be edited. If so, processing continues to block 3114, otherwise, processing continues to block 3118 (e.g., to create a new editable data element).

In block 3114, items to be edited are selected by, for example a user. The selection may be by spatial query (e.g., submitting a query searching for an address of a plot of land), viewable extent (i.e., a subset of data based on a particular area being viewed, such as a portion of a map that is visible on the display screen), direct selection (e.g., point at a editable data element with a pointing device (e.g., a mouse) and select with the pointing device), etc. In particular, if certain editable data elements need editing, then these may be selected through selection tools, and the client software sends a request to the server system for the data for the editable data elements in an editable format. If all of the objects on a particular layer are desired, then the layer is selected for editing, and the client software sends a request to the server system for the data in editable form for all the editable data elements visible in the edit layer.

In block 3116, information is retrieved from the server system about the selected items. The information may include, for example, coordinate reference information, a unique identifier (e.g., an AKID), and optional tabular information. The server system processes the request for editable data elements, creates a package containing the editable data elements, and transmit the package to the client software. In block 3118, edit commands are performed by the client software. Creation of a new object is one type of edit command. For example, a copy command followed by a save command may be performed.

In block 3120, it is determined whether tabular information is to be edited. If so, processing continues to block 3122, otherwise, processing continues to block 3126. In block 3122, additional tabular information is retrieved from the server system. In block 3124, the tabular data is edited.

In block 3126, it is determined whether editing should be validated by a third party system. If so, processing continues to block 3128, otherwise, processing continues to block 3138. In block 3128, edit results are packaged for handoff. The handoff includes, for example, information and changes to the editable data elements, as well as, session and other system information. In block 3130, the package is handed off to the third party system through, for example, a network or other connection. In block 3132, processing is performed in the third party system. For example, the third party system performs any desired business rule checks and validations on the received command, information, and editable data elements. The third party system may also perform spatial modifications to the editable data element.

In block 3134, it is determined whether there is to be an update by handback (i.e., because the third party system performed spatial modifications). If so, processing continues to block 3136, otherwise, processing continues to block 3140. In block 3136, a package (e.g., with spatial modifications or validation results) is prepared for handback, and the package is sent to the client software (block 3138). The client software sends status or update information to the server system, as needed. In block 3140, the update is performed by a Web Services interface, and data (e.g., status or updated data, such as updated editable data elements or updated tabular data) is stored at the server system (block 3142). That is, the third party system can communicate status information or spatial modifications directly back to the server system through a backend connection such as Web Services.

In block 3144, it is determined whether notification to the client software is enabled. In particular, it is determined whether the updated information or status have been configured for notification. If so, processing continues to block 3146, otherwise, processing ends. In block 3146, any client software at one or more client systems that requested a notification is notified of the updated information or status.

M. Collaborating and Sharing Data

Implementations of the invention allow a user to save all customizations done to the view of the data layers in the client software during a session, including the results of spatial analysis, as a project on the server system. Implementations of the invention allow the same user to open the same saved project at a later time from the client software, and the user session is recreated to the state, as it was when the project was saved.

Implementations of the invention allow a user or a group to share the saved projects with other users or groups, by granting specific access privileges. When a shared user opens the project, that user's user session is set to the state in which the original user session was when the project was saved.

Implementations of the invention enable collaboration among shared users of a project by selectively granting the rights to some of the users to modify the project and make the modifications available to all shared users of the project.

Implementations of the invention allow real-time collaboration among shared users of a project by making changes made to the project by one user immediately available to other shared users.

Implementations of the invention ensure that the sharing of customized views of data through shared projects does not circumvent the basic data set level access controls defined in the server system. In other words, a shared project does not automatically allow a user to view data sets stored on the server system that they are not normally granted access to view or modify.

Implementations of the invention not only enable sharing and collaboration of information among users, but also provide confidentiality, security, and integrity of that information.

Figure 32:
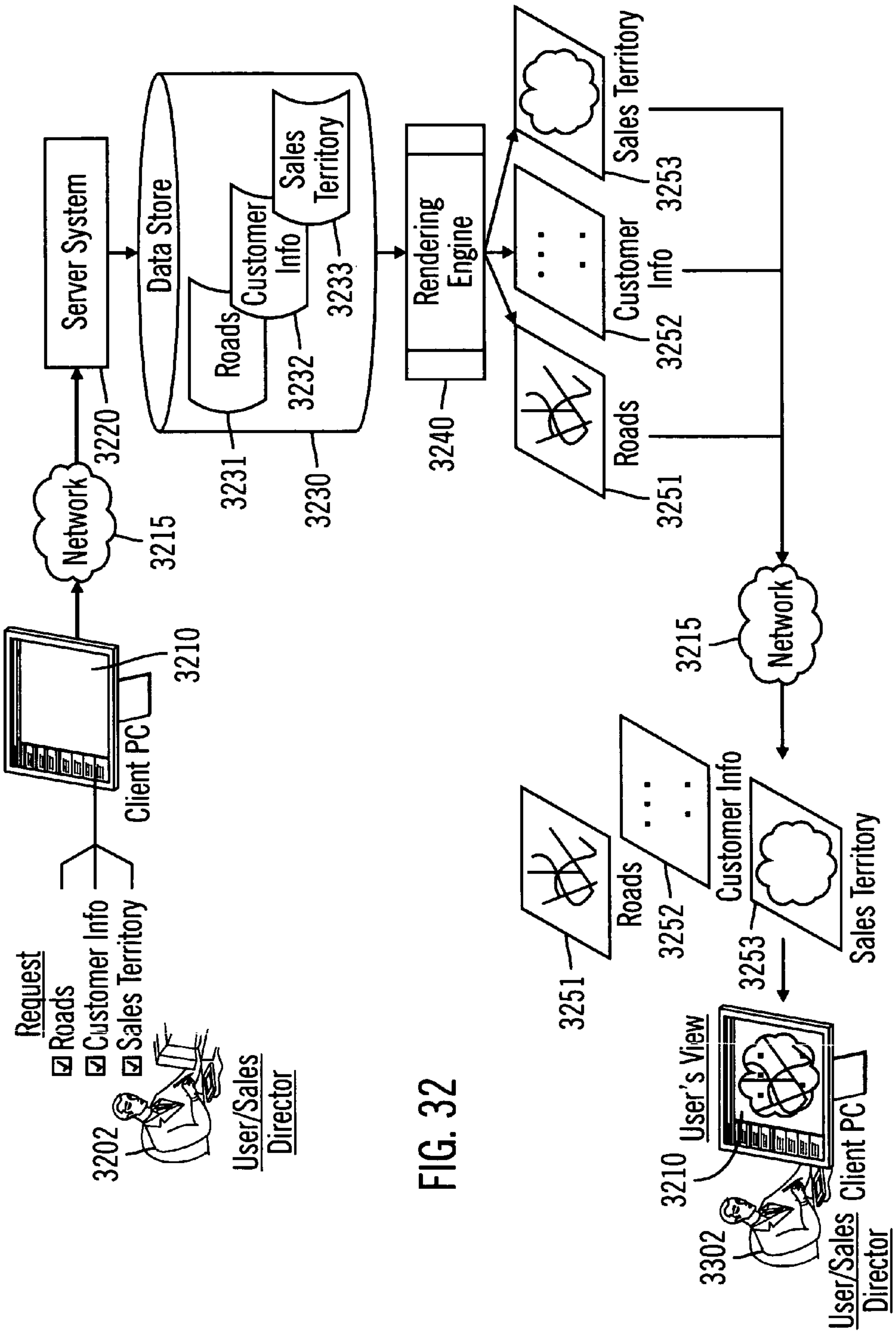
FIGS. 32 and 33 illustrate examples of collaboration in accordance with certain implementations of the invention.

FIGS. 32 and 32 illustrate examples of collaboration in accordance with certain implementations of the invention. In FIG. 32, collaboration is illustrated in a large distributed computer environment, which includes, for example, a client application 3210, server system 3220, data store 3230, and a rendering system 3240. In FIG. 32, a demonstrate of how a user will access, retrieve, and view data from the enterprise spatial system is provided.

A user (e.g., a sales director 3202) is working on a specific new customer acquisition project. The sales director 3202 at a client system uses client software 3210. The client software 3210 and server system 3220 communicate via a network 3215. The sales director 3202, using the client software 3210, accesses the server system 3220, the data store 3230, and the rendering system 3240 to retrieve and view roads 3231, customers 3232, and sales territory 3233 data, within the region. The sales director 3202 retrieves a composite image that may consist of three data layers: a roads data layer 3251, a customer info data layer 3252, and a sales territory data layer 3253. These data layers 3251, 3252, and 3253 are sent to the client software 3210 and displayed to the sales director 3202.

Figure 33:
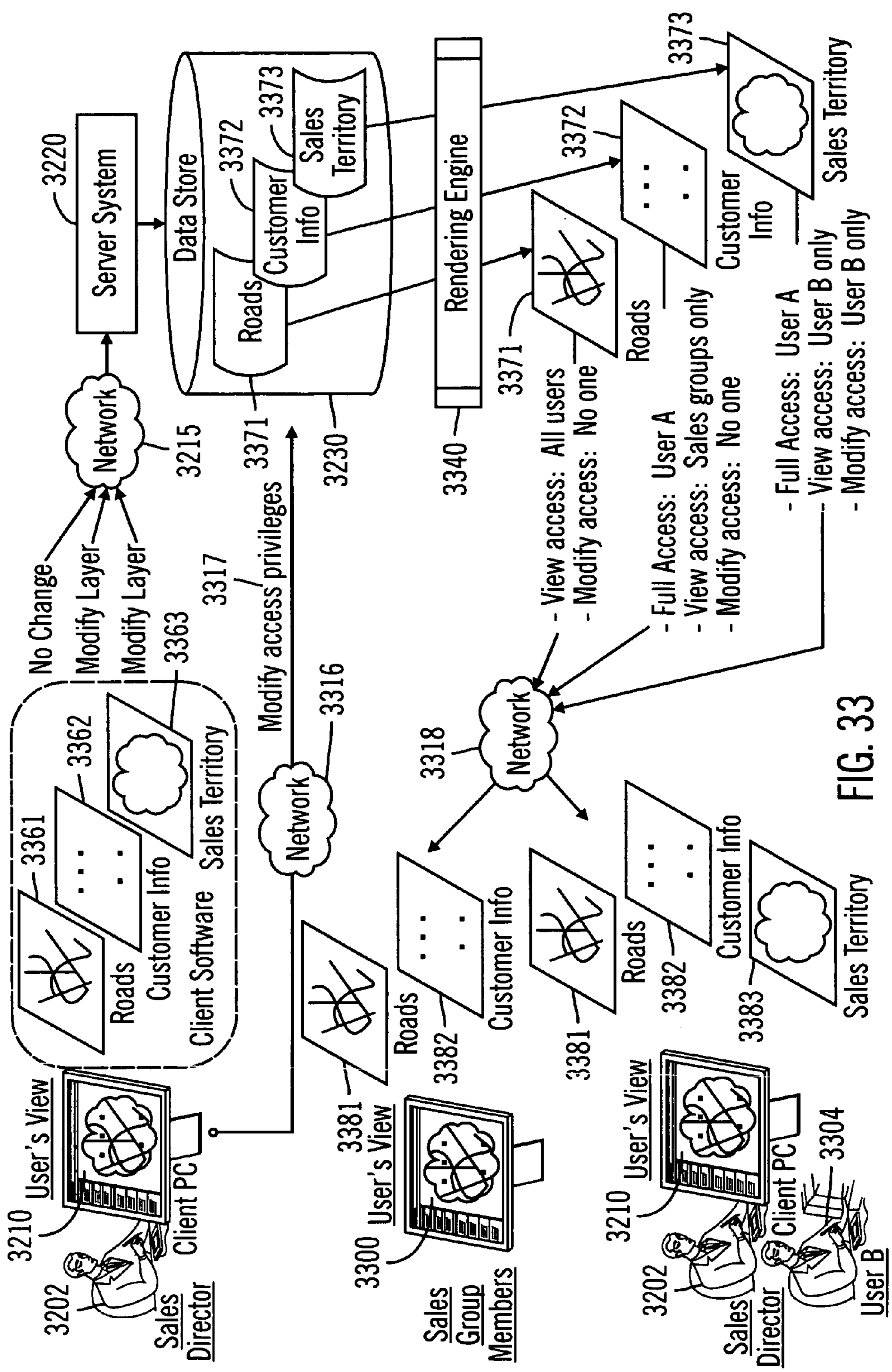

FIG. 33 is used to continue the example of FIG. 32. In FIG. 33, processing that happens after the data layers have been retrieved by the user is illustrated. In particular, for this example, FIG. 33 is used to demonstrate how a sales director 3202 will modify the composite image, assign access privileges, and share a project with others.

In this example, the sales director 3202 may change the order in which the data layers are viewed; add annotations to the composite image, identifying customers of interests 3362; and, perform some analysis and highlight a sales territory 3363.

The sales director 3202 uploads the results of the analysis and the annotations as a saved "project" to the server system 3320 and data store 3230. At this point, only the sales director 3202 may have access to the newly modified project information within the data store 3230. Now the sales director 3202 decides to share this project with team members and seek their input in order to "collaborate". The sales director 3202 will access the enterprise spatial system to assign specific access privileges to team members for this new project. To begin with, the sales director 3202 makes this new "project" accessible to only members of his organization, and no one else within the company. The sales director 3202 grants "view" access to all team members to the project information 3371, and to no other user. The sales director grants "view" access to everyone in the sales group to the customer information 3372. The sales director grants "view & modify" access to the project to team member "B" 3304 to the sales territory data layer 3373, and to no other user.

Now only sales organization members (e.g., 3302) can access the enterprise spatial system and collaborate on this project in varied capacities, but no one else will have such privilege. Sales members have view access to the project layers 3381 and 3382. The sales director 3202 and user "B" 3304 have higher access to the project layers 3381, 3382, 3383, as they can modify the project by changing the way the data is viewed on the client software 3210 and by saving the changes in the server system 3220. When they make changes, all other users who have access to the project will immediately be able to access (e.g., see) any changes.

Figure 34:
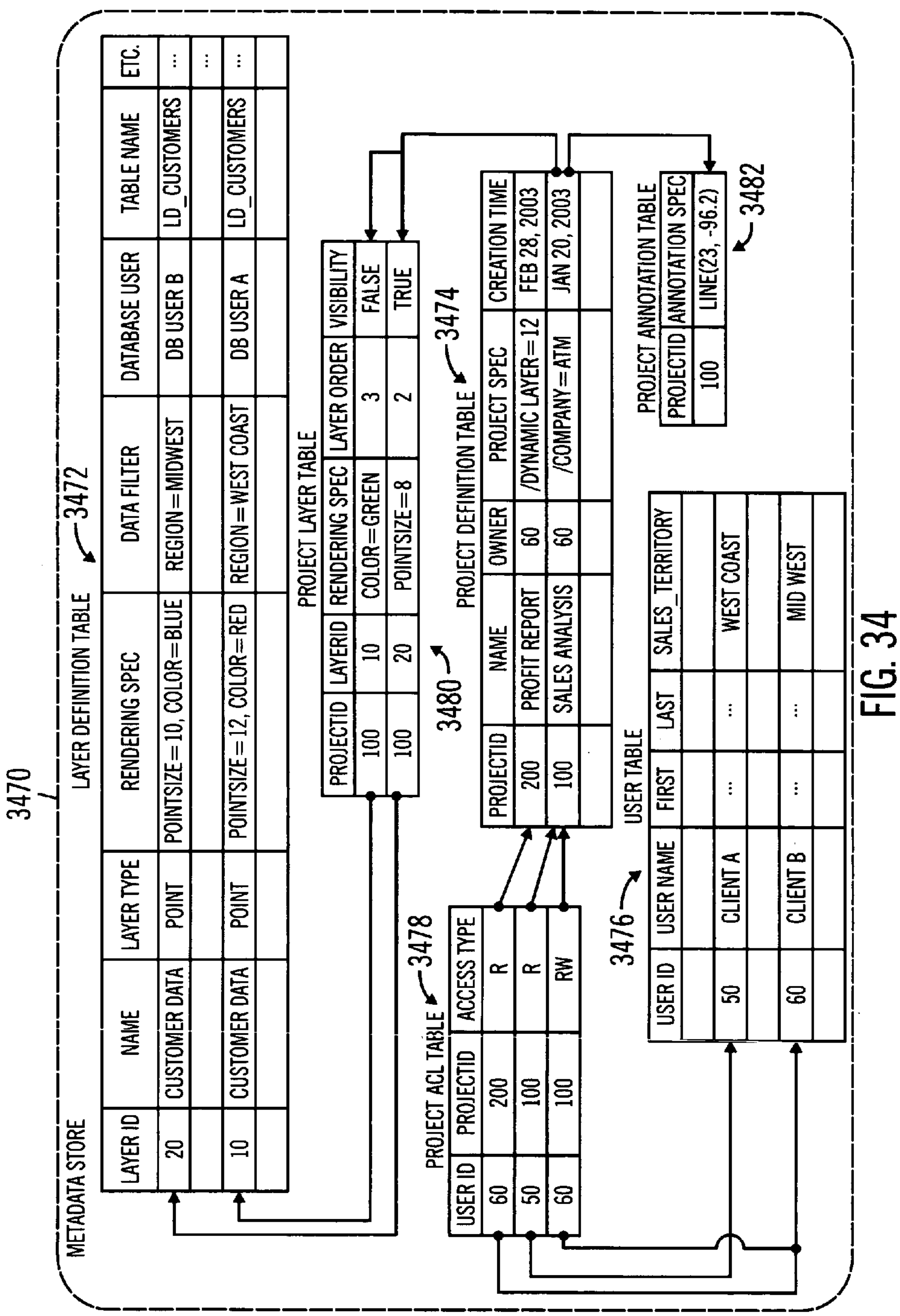
FIG. 34 illustrates metadata tables in a metadata store that are used to enable collaboration in accordance with certain implementations of the invention.

FIG. 34 illustrates metadata tables in a metadata store that are used to enable collaboration in accordance with certain implementations of the invention. The enterprise spatial system maintains metadata information in a metadata store 3470 for all resources managed and made available to the client software. The resources include data and application functions. Data is seen by the client software as data layers in the user interface. Each data layer presented to the client software has a corresponding metadata definition in metadata store 3470 called a layer definition table 3472. The enterprise spatial system also maintains information about the users, such as login name, user's first name, last name, etc. in yet another table called the user table 3476.

When client software requests access to a resource, be it data or application or project function, the server system accesses this resource using the appropriate metadata table. For example, when the client software wants to view the data for a data layer, the server system goes to the layer definition table 3472 and finds the metadata definition for this data layer. Then, the server system 3472 uses the information contained therein to access the data store, retrieve the data, render the data, and present the data to the client software. In certain implementations, resources cannot be accessed by the enterprise spatial system if they are not represented in the appropriate metadata table.

The enterprise spatial system maintains information about projects in the project definition table 3474. Each record of data in the project definition table 3473 represents a project that a user can see. The project definition table 3473 contains information, such as the name of the project, owner of the project, and ProjectSpec, which is a detailed description of everything the client software needs to recreate the project for another user.

The project definition table 3474 is associated with a project layer table 3480. Each row in the project layer table 3480 associates a particular project with a data layer in the layer definition table 3472. For example, the first row in project layer table 3480, links ProjectId 100, which represents a project called Sales Analysis, in the project definition table 3474, with LayerID 10. LayerID 10 is a data layer, called Customer Data in the layer definition table 3420. This indicates that when a user opens this particular project, the user should be presented with the Customer Data layer as one of the layers that the user can view.

The project layer table 3480 contains information on how the associated data layer should be displayed. The Rendering Spec column identifies how the data in the data layer should be rendered. The Layer Order column indicates the order in which the layers should be shown in the client software.

Visibility indicates whether the data layer is automatically made visible when a user opens the project.

The project annotation table 3482 is another table associated with the project definition table 3474. The project annotation table 3482 table contains all information on annotations done by the client software before the annotations are saved as part of the project. The Annotation Spec column in the project annotation table 3482 table contains complete instructions for redrawing the annotation when the project is opened.

The enterprise spatial system maintains access control lists (commonly referred to as ACLs) for each of the projects represented in the project definition table 3480. In certain implementations, the access control list for a given project is a list of users who can access the project. In the enterprise spatial system, this is done by associating each project with a list of users and maintaining this association in a new table called the project ACL table 3478.

Whenever client software requests access to a project, the server system first makes a check to determine whether the project is associated with the user by searching the project ACL table 3478. If the server system finds the association, the server system allows access to the project. Otherwise, the server system rejects the client software request.

Each user of the enterprise spatial system has a unique metadata entry in the user table 3476. The metadata entry also contains properties of the user. The entries in the user table are used to associate users with other entities, such as projects in the enterprise spatial system.

Figure 35:
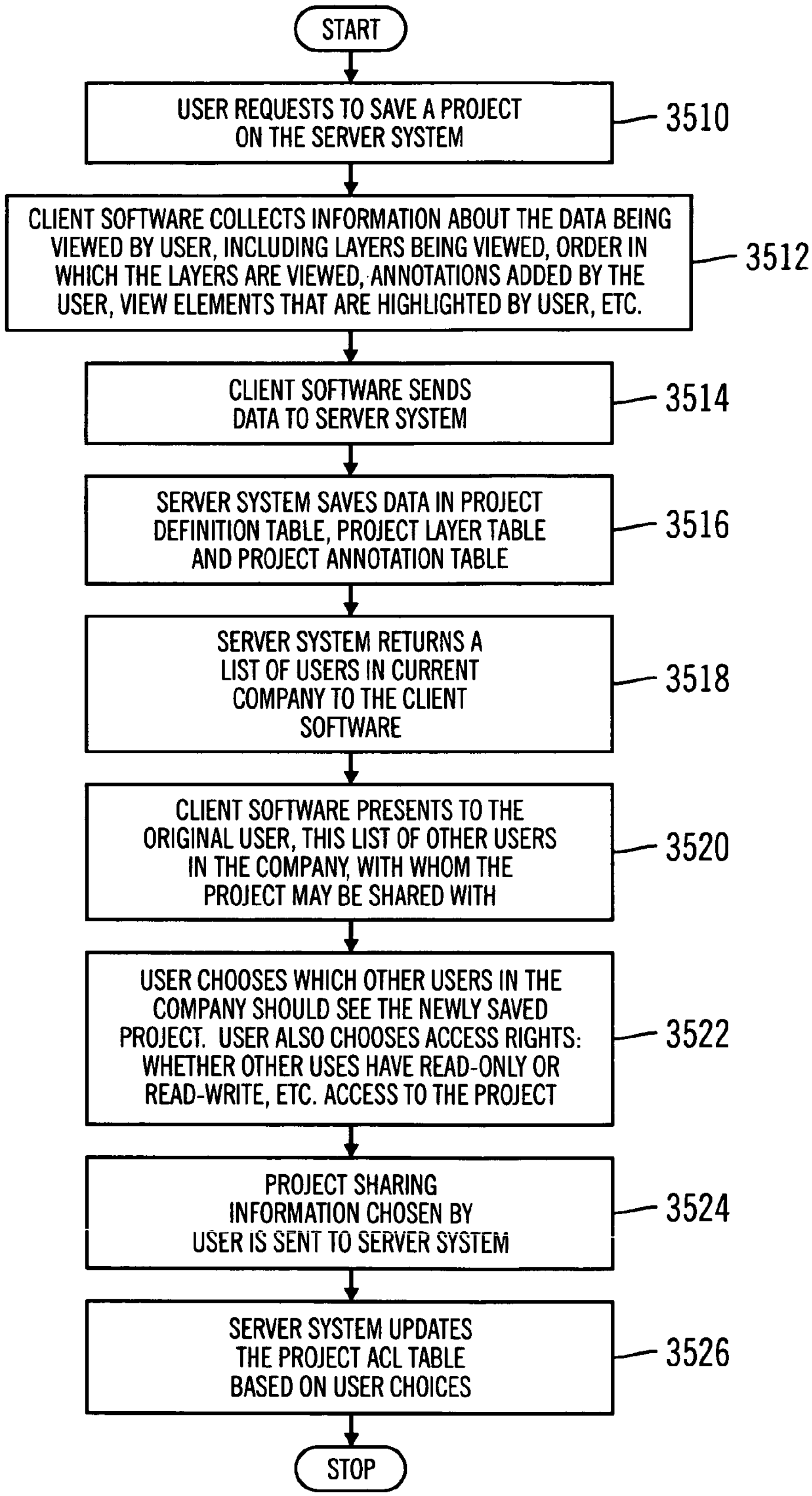
FIG. 35 illustrates logic for enabling collaboration in accordance with certain implementations of the invention.

FIG. 35 illustrates logic for enabling collaboration in accordance with certain implementations of the invention. In particular, the logic describes the process of creating and saving a new "project", with access privileges, to the enterprise spatial system by the client software. Before the logic of FIG. 35 begins, a user has already accessed a composite image containing possible multiple layers, via the client software, and customized the data view by performing actions, such as highlighting objects, adding annotations, etc. The user then wishes to create and save the current customized view as a project onto the enterprise spatial system.

Control begins at block 3510 with the user requesting to save a project on the server system. In particular, the enterprise spatial system allows a user of the client software to request to save a project onto the server system. In block 3512, the client software collects information about the data being viewed by user, including, for example, layers being viewed, the order in which the layers are viewed, annotations added by the user, view elements that are highlighted by the user, etc. In block 3514, the client software sends the data (i.e., the collected information) to the server system. In block 3516, the server system saves the data in the project definition table, project layer table, and project annotation table within the metadata store.

The server system will then return a list of users in the current company to the client software (block 3518). In block 3520, the client software presents to the original user, this list of other users in the company, with whom the project may be shared. In block 3522, the user chooses in which other users in the company should see the newly saved project. The user grants access rights to others (e.g., read-only or read-write, etc. access to the project).

Project sharing information chosen by the user is sent to the server computer (block 3524) SO that the access information may be saved. In block 3526, the server system updates the project ACL table within the metadata store based on the user choices.

Figure 36:
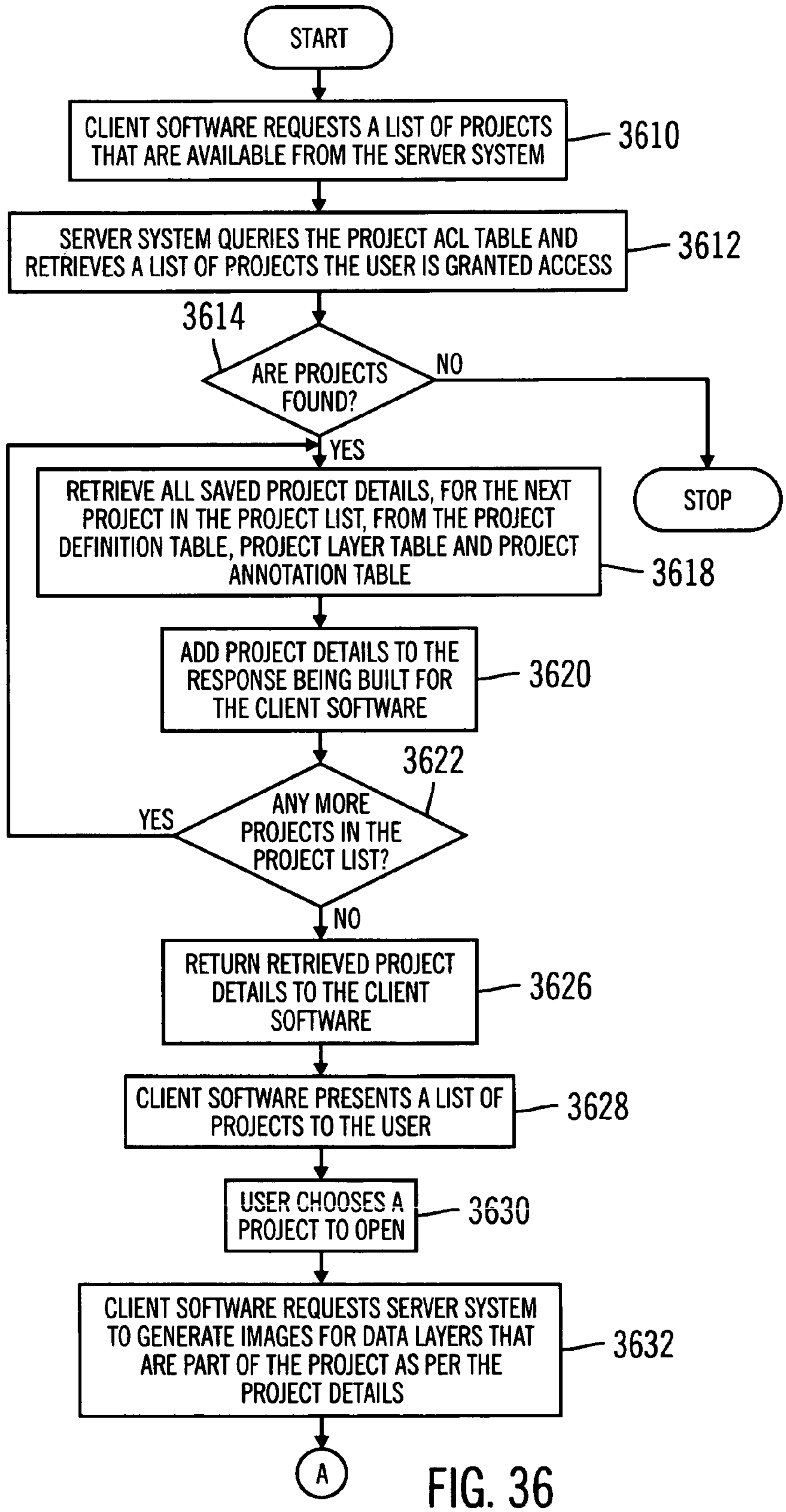
FIGS. 36 and 37 illustrate logic for collaboration in accordance with certain implementations of the invention.
Figure 37:
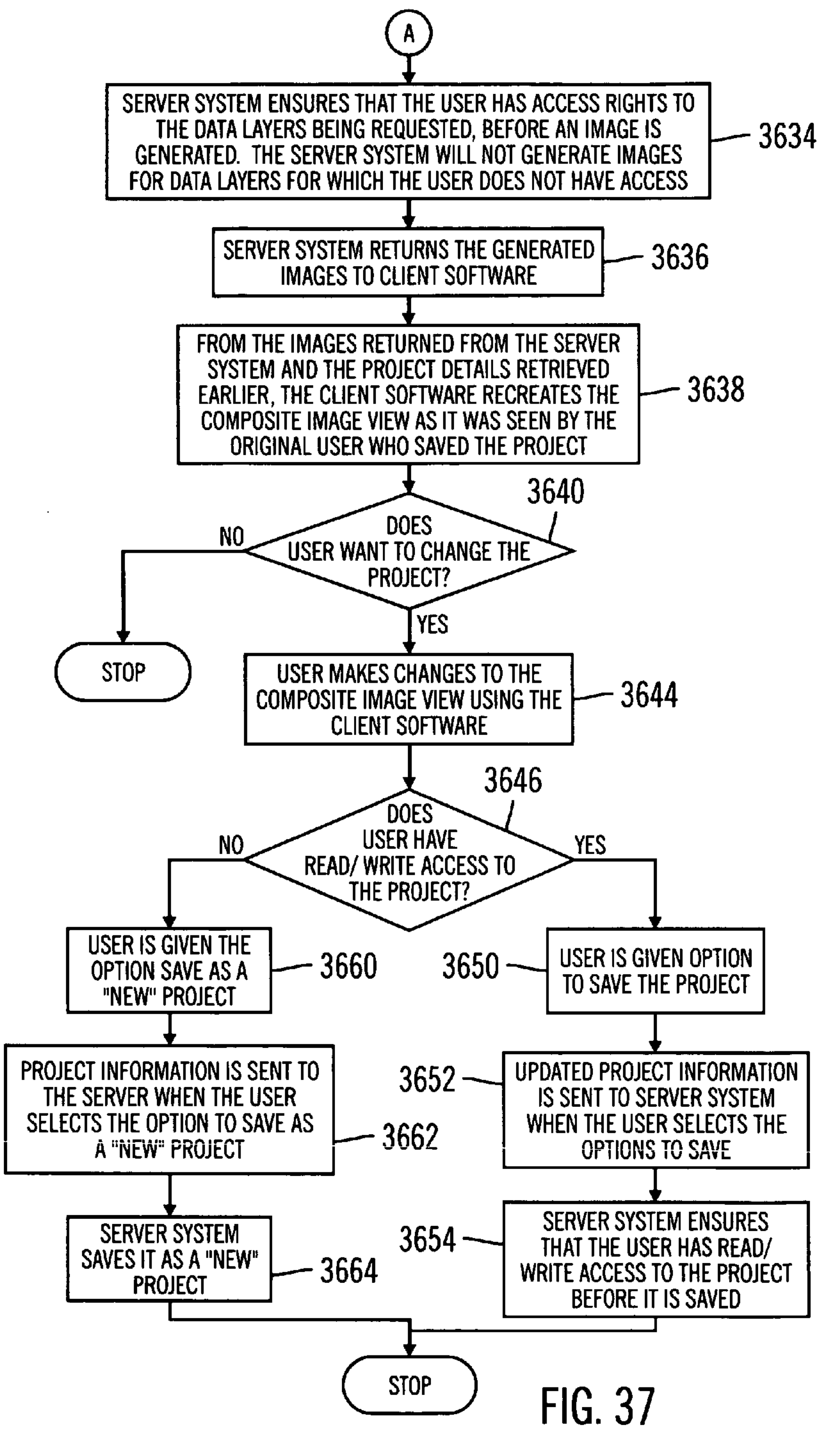

FIGS. 36 and 37 illustrate logic for collaboration in accordance with certain implementations of the invention. The logic of FIGS. 36 and 37 describes the process of accessing, retrieving, opening, editing, and re-saving an already existing "project" in the enterprise spatial system by the client software. Control begins at block 3610 with a user via the client software requesting a list of projects that are available from the server system. In block 3612, the server system queries the project ACL table within the metadata store and, in block 3612. In block 3614, if projects have been found, processing continues to block 3618, otherwise, processing ends.

In block 3618, the server system retrieves all saved project details based on the user's access rights, for the next project in the project list, from the project definition table, project layer table, and project annotation table within the metadata store. In block 3620, the server system adds the project details to the response being built for the client software. In block 3622, if more projects are found, processing continues to block 3618, otherwise, processing continues to block 3626.

In block 3626, the server system returns the retrieved project details to the client software. In block 3628, the client software presents a list of projects to the user. In block 3630, the user chooses a project to open from the list of projects.

Once a choice has been made by the user as to which project to open, the client software requests the server system to generate images for data layers that are part of the project per the project details (block 3632). In block 3634, server system ensures that the user has access rights to the data layers being requested, before the images are generated. The server system will not generate images for data layers for which the user does not have access. The access control mechanism for data sets described in an earlier section is enforced to ensure that the user does not view a data layer that the user is not normally allowed to view.

In block 3636, the server system returns the generated images to the client software. In block 3638, from the images returned from the server system and the project details retrieved earlier, the client software recreates a composite view for the user session as seen by the original user who saved the project. In certain implementations, the recreation of the user session is exactly the session seen by the original user. In block 3640, if the user wants to make any modifications to the project, processing continues to block 3644, otherwise, processing ends.

In block 3644, the user makes changes to the composite image view using the client software. In block 3646, if the user has read/write access to the project, processing continues to block 3650, otherwise, processing continues to block 3660. In block 3650, the user is given the option to save the project and requests that the project be saved. In block 3652, the updated projected information is sent to the server system, for example, when the user selects to save the project (e.g., by clicking a Save button of a user interface). In block 3654, the server system ensures that the user has read/write access to the project before saving the project.

In block 3660, the user is given the option to save the project as a "new" project and requests that the project be saved. In block 3662, the project information is sent to the server system when the user selects the option to save the project as a "new project. In block 3665, the server system saves the project as a "new" project.

That is, if the user does have proper access privileges to save the project, the project will be sent back to the server system to be overwritten and saved. If the user does not have overwrite access privileges, the user will be presented the option to save the modification as a "new" project, rather than overwriting the existing one.

N. Enterprise Spatial System User Interfaces

N.1 Overview

Figure 38:
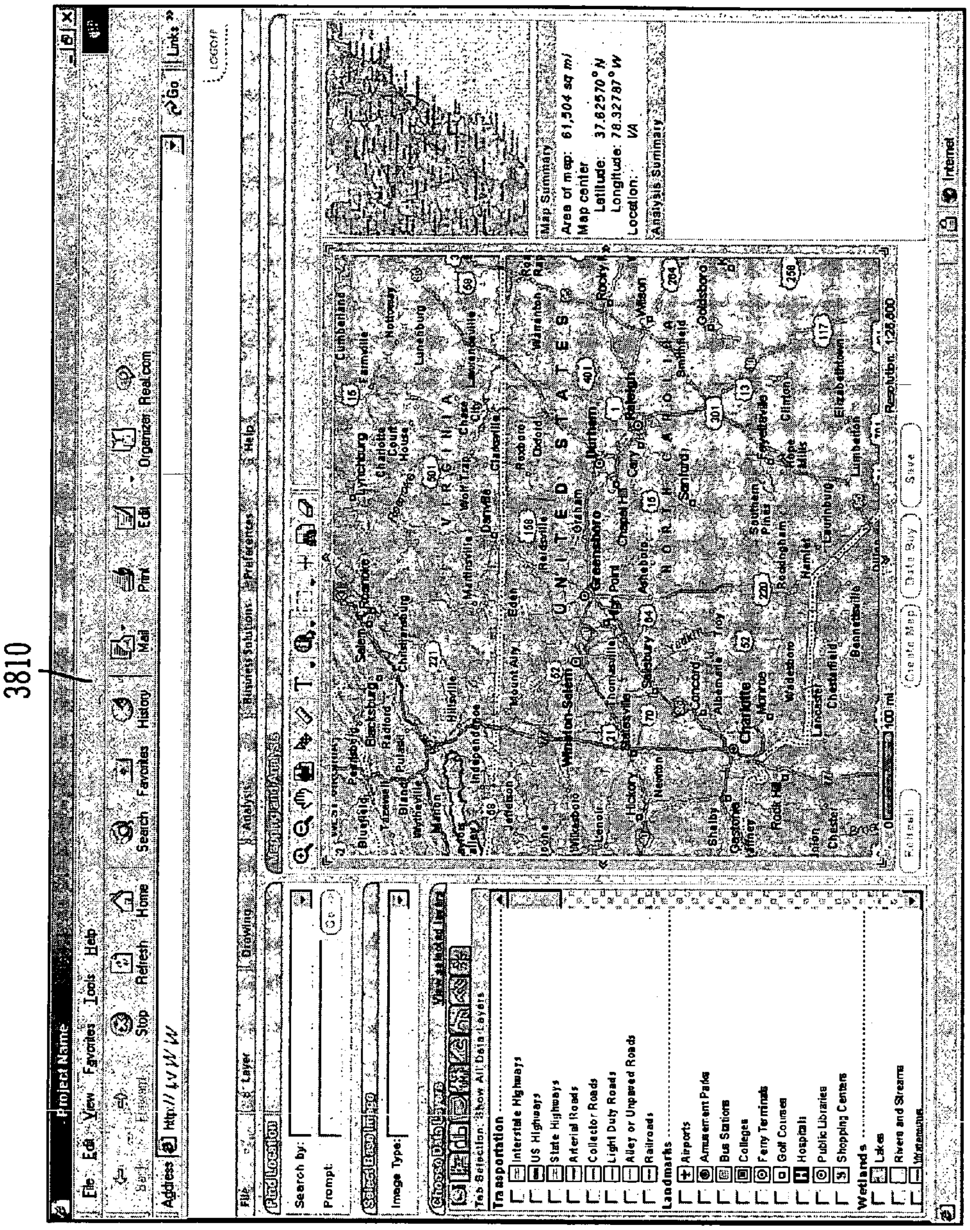
FIG. 38 illustrates a UI screen provided by the enterprise spatial system for online knowledge mapping in accordance with certain implementations of the invention.

The enterprise spatial system provides application services offering access to geographic information and industry-specific business solutions over a network, such as the Internet. A suite of custom, browser-based tools allows customers (i.e., a type of user) to access a multi-terabyte data warehouse containing, for example, high quality aerial photography, satellite imagery, and information on demographics, environmental change, infrastructure and land use patterns. Proprietary aerial imagery is acquired by an advanced airborne scanning system that provides high resolution and up-to-date multi-purpose images. Aerial imagery is combined with value-added data layers to create "image-data bundles" to support industry-specific solutions. FIG. 38 illustrates a UI screen 3810 provided by the enterprise spatial system for online knowledge mapping in accordance with certain implementations of the invention.

Using business solutions provided by the enterprise spatial system, users can conduct industry-specific analyses, create reports, produce map products, and download information for use in other desktop mapping applications. Customers can use information and solutions provided by the enterprise spatial system for various functions, including, for example, facility siting, environmental analysis and monitoring, tracking changes in resources and markets, risk assessment, and asset management.

The enterprise spatial system provides GIS solutions to many levels of users—from administrative assistants to specialized consultants. As a result, the enterprise spatial system is designed so that the core functionality is available in a manner that is intuitive to a novice computer/Internet user, balanced with the need to provide the more sophisticated user with a means of accessing advanced features offered by the enterprise spatial system.

The enterprise spatial system accommodates subscription and transaction based pricing. That is, customers may pay to use services provided by the enterprise spatial system either on a subscription or transaction basis. Both the enterprise spatial system software and the back end architecture support these pricing models. In addition, the processes involved (e.g., the registration process for subscription customers and the purchasing process for transactional customers) are straightforward and quick, so that neither of these processes becomes a possible barrier to entry for the adoption of this service.

The enterprise spatial system is customizable for customers and partners (i.e., a type of user). The enterprise spatial system provides GIS solutions to customers in various industries with varying needs. To best tailor the service offering to each of these unique customers, the enterprise spatial system software allows for some level of customizations to be incorporated for each customer. In addition, the enterprise spatial system software contemplates the integration of co-branding elements for either customers or partners.

In certain implementations of the invention, the enterprise spatial system does not rely upon plugins or a client download. That is, in certain implementations, the enterprise spatial system provides a web application that minimizes reliance upon any software that a customer would need to download, in order to remove another possible barrier to a customer's acceptance of the services offered by the enterprise spatial system.

The enterprise spatial system provides a level of performance that is acceptable to the customer. That is, the enterprise spatial system provides an offering that is data and graphics intensive (e.g., for a web application). Levels of the enterprise spatial system software design consider its impact on the overall performance of the services offered, in order to ensure that the final deliverable is considered acceptable in performance by the customer.

The enterprise spatial system provides for registration of subscribers. Prior to using the enterprise spatial system services, each customer first registers for the service, whether the customer is a subscription user or a one-time, transaction-based customer. The registration process is quick and simple, so as not to serve as a barrier to entry for new customers. The registration process obtains, for example, a user's email address (e.g., for communications) and assigns or requests a user name and password for the customer (e.g., for usage tracking and billing).

A login and logoff process is integrated in the enterprise spatial system, providing the enterprise spatial system software with account information for the user who is logging in. This allows the enterprise spatial system software to offer business tools and data layers to the customer that the particular customer has subscribed to. This account level identification also allows for user profiles/preferences to be established.

The enterprise spatial system allows a user to create a map that is custom suited to their needs by defining, for example, the following attributes of the map: the area covered by the map ("viewable extent" or "area of interest"), the type of image to be used for the map, and the resolution of the map.

As for defining the area covered by the map, a user can define the location of the map in one of several ways. The first option is for the user to type in any information that defines the location, including, for example, the address, city, county, state, and country, for example, into a field of a UI screen. Alternately, the user can visually select the area from a selection map, where the user can "click and drag" on a map (e.g., a national map) to define the location. After the user clicks and drags, the visual selection map will zoom to include only the area that the user selected. At this point, the user can click and drag again to refine the selection. Finally, the user can define the AOI using longitude and latitude values, selecting a United States Geological Survey (USGS) map name, or specifying the name of a place. In addition, after specifying the AOI, the user can fine tune the map location using the tools provided with a map preview function, which is discussed in further detail below.

As for defining a type of image to be used for the map, once the user has selected the area covered by the map, the user is presented with choices for the type of image to use for the map. The types of images available for creating a map will vary depending upon the map area that the user has defined, but may include, for example, color aerial imagery, color infrared, satellite imagery, USGS topographic maps, and others.

As for defining the resolution of the map, the resolutions available to the user are dependent upon the map area and type of image that the user has selected.

A map preview function is available at any time that a customer is working on a map-related task. In certain implementations of the invention, the map preview function displays the custom map on the right hand side of the UI screen. While the term "preview" is sometimes used for a view-only function, the map preview functionality within enterprise spatial system also allows the user to make basic changes to the map by providing a basic set of tools that allow for user manipulation of the map. These tools include, for example, zoom in, zoom out, zoom box, and pan.

By selecting the zoom in tool and clicking on the map, the map area will zoom in by 50%, centered at the click point. By selecting the zoom out tool and clicking on the map, the map area will zoom out by 50%, centered at the click point. By clicking and dragging a rectangular box (a zoom box) on the map, the map area will zoom to the extents of the box. Once the panning tool is selected, the user can "grab" the map and move it, changing the center point of the map. The zoom level remains the same when the pan tool is used, therefore using the panning tool ultimately changes the boundaries that define the area of the map.

The enterprise spatial system allows data to be overlaid onto a map. Once the basic map information has been provided, the user can then select from various "data overlays". These data overlays provide geographic data in a visual manner that can be overlaid and matched up with the map. The categories of data that can be overlaid include, for example, environmental, political boundaries, infrastructure, and demographic data, and more.

For subscription users, various industry-specific data layers may be available (e.g., electric line right of ways). The data available to overlay on the base map is determined by the services that the customer has subscribed to.

The enterprise spatial system provides analysis tools that offer numerous powerful capabilities, including, for example, the following: point 'n view, point n' attribute, measure linear distances, measure user defined areas, and buffering tools. After selecting the point n' view tool, the user is able to click on any data element overlaid on the current map, and a pop up dialog box containing a description of that element appears. The data presented varies based upon the type of data element that the user has selected. The point n' attribute tool allows a user to click on any object on the current map, type in various categories of information that describes the object, and then automatically save out these associated descriptions as a data store record attached to that object. As for measuring linear distances, tools are provided that allow the user to draw lines or complex "polylines" that the enterprise spatial system analysis engine can then use to calculate distances and provide other summary information, as well as detailed reports. As for measuring user defined areas, similar to the linear distance capabilities, numerous tools are provided that allow the customer to draw various custom shapes, which the enterprise spatial system analysis engine can then use to calculate distances and provide other summary information, as well as detailed reports. A wide variety of buffering tools are provided by the enterprise spatial system to allow the user to quickly create offsets from points, lines, areas, editable data elements and more.

The enterprise spatial system provides annotation tools. Once the user has defined the base map and selected any appropriate data layers, annotation tools are provided that allow the user to add custom information to the map. These tools include, for example, text and shape overlay, which allow users to type in text to be overlaid on the map or draw basic shapes such as squares, circles, lines, and polygons that are layered on top of the map.

For customers who have added data onto their base map, the enterprise spatial system offers reports that provide detailed breakdowns of that data within the location boundaries defined by the user. The breakdown of information is unique for each type of data.

The enterprise spatial system supports transaction-based purchases (e.g., for non-subscribers). For those customers who are not subscribers, the enterprise spatial system integrates an e-commerce backend shopping solution to support purchases on a transaction-by-transaction basis, allowing users to pay for an "a la carte" item with, for example, a credit card.

For customers interested in hard copies of their custom maps, the enterprise spatial system provides functionality that allows users to print out a copy of the map, or save the map for later use. If the user chooses to print out a hard copy of the map, the enterprise spatial system allows the user to define various attributes that define the layout of the printout. In certain implementations, the enterprise spatial system will require payment for maps before the maps are printed or saved.

In order to provide the most personalized user experience to all customers, the enterprise spatial system allows customers to create unique profiles that describe, for example, which data layers should be available to the customer, how various preference settings should be setup, and more. In addition, this function allows subscription customers to edit their registration and payment information.

The enterprise spatial system provides browser support. In particular, the enterprise spatial system software is a web-based application service provider (ASP) that supports, for example, the following browsers: Microsoft® Internet Explorer® version 4.x and above and Netscape® 5.x and above.

In certain implementations, the enterprise spatial system software is run without client downloads in order to address, for example, corporations and government entities who do not allow for outside software to be installed on employee systems. This also allows users to access projects while on the road or at another workstation. However, in certain implementations, the enterprise spatial system offers client downloads for functionality that would benefit from a client download. The benefit could come in the form of improved performance, more robust functionality, etc. The user decides whether or not to accept a client download in order to gain the benefits that can be derived from the download.

To accommodate this, the enterprise spatial system is designed in a way that supports a "0 to fat" client download, where a "fat" client download is defined as augmenting approximately 75% or more of the functionality through some level of download. This approach allows users the flexibility to download various client downloads or not, depending upon what is most important to them (e.g., performance vs flexibility). Specifically, with this approach, when a specific function is called, it is determined whether the client download is stored locally at the client system. If a client download is present at the client system, the download is used to perform the functionality. If the client download is not present at the client system, the enterprise spatial system goes to the server system to perform the functionality. Thus, each function that is performed with a client download may also be performed using server system transactions, so, if the user opts not to download a client piece, the functionality is still available at the server system.

N.2 User Interface Guidelines and Standards

This section describes user interface guidelines standards for use in laying out and implementing the various UI screens that comprise the enterprise spatial system in accordance with certain implementations of the invention. The user interface guidelines and standards may be modified without departing from the scope of the invention. Detailed attribute characteristics are provided for the various user interface elements that are used across the UI screens.

As for UI screen layout, standards for UI screen design are provided so that UI screens have a consistent look and feel across the enterprise spatial system.

As for alignment positions, when defining the locations where the various UI elements should be laid out, "approximate" pixel distances are used. Approximate distances are used as it is difficult in the web environment to layout to an exact pixel. However, elements that are defined with a similar location are aligned. For example, a group of UI elements that are described as being "left justified, approximately 5 pixels from the left edge" may not be in actuality 5 pixels from the edge. However, in this example all of the controls are left aligned with each other.

As for enterprise spatial system software dimensional constraints, in designing the user interface for the enterprise spatial system software, in certain implementations, certain assumptions are made, some of which place constraints on the user interface, and therefore are considered in order to understand the design. The assumptions that impact the workspace available to the enterprise spatial system UI include, for example: (1) the enterprise spatial system software is designed to support 800×600 resolutions in a manner that does not require any horizontal scrolling to access the enterprise spatial system software functionality; (2) the enterprise spatial system software does not require a software or plugin download by the user (i.e., the enterprise spatial system software is browser-based); and, (3) Microsoft® Internet Explorer® is the primary browser in use when customers interact with the enterprise spatial system. In certain implementations, the following browser elements are the typical elements that are in "view" to the user: standard toolbars (e.g., set to display in large icon mode), address bar, status bar. After the first two assumptions, the remaining assumptions drive the limitations that the enterprise spatial system encounters with respect to the vertical dimensions available for the enterprise spatial system workspace. Since vertical scrolling is acceptable, these assumptions need not be correct for every customer using the enterprise spatial system software, rather the intent of the assumptions is to provide a targeted dimension of available vertical workspace.

Figure 39:
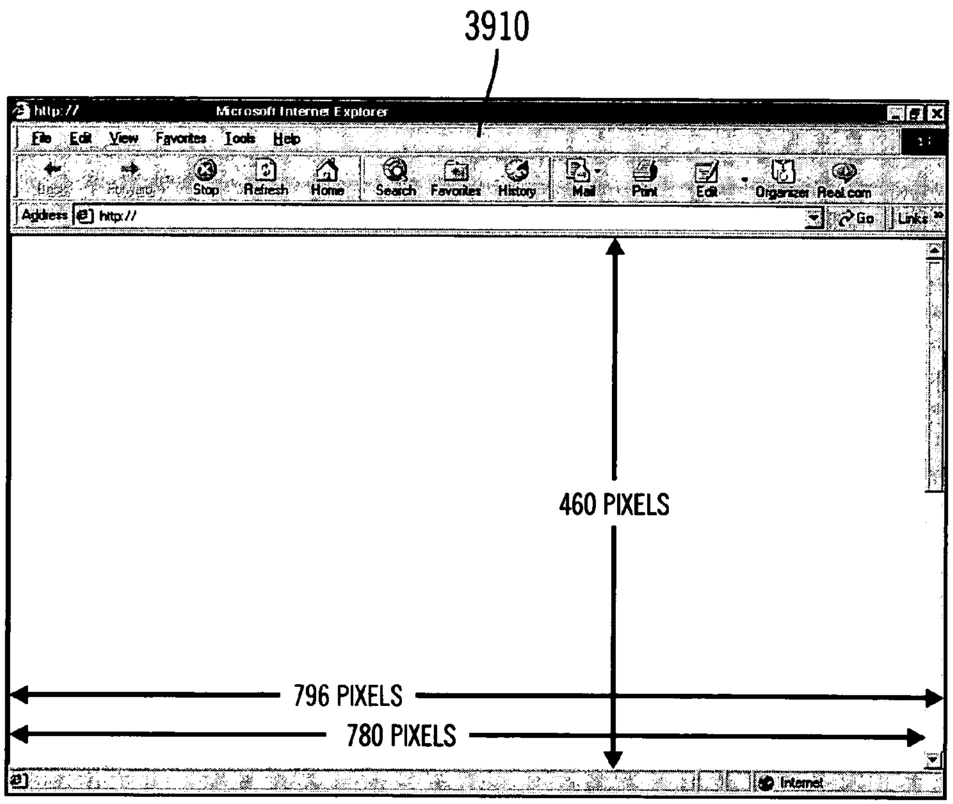
FIG. 39 illustrates in a UI screen constraints in workspace in accordance with certain implementations of the invention.

Based on the assumptions listed above, FIG. 39 illustrates in UI screen 3910 constraints in workspace faced by the enterprise spatial system software in accordance with certain implementations of the invention. Specifically, for the boundaries of the usable area available to the enterprise spatial system, the vertical dimension available for the enterprise spatial system workspace is 460 pixels in height and this dimension has the opportunity to provide a larger workspace, in that vertical scrolling is allowed (although certain implementations minimize vertical scrolling). The horizontal dimension that is available for the enterprise spatial system workspace varies, depending upon whether or not a vertical scroll bar is required on the UI screen at the time. If a vertical scroll bar is not required on a UI screen, the available UI screen width is 796 pixels (which is a maximum distance, and, in certain implementations, horizontal scrolling is not required in the 800×600 mode), and if a vertical scroll is required on a UI screen, the available UI screen width is 780 pixels (which is a maximum distance, and, in certain implementations, horizontal scrolling is not required in the 800×600 mode).

Figure 40E:
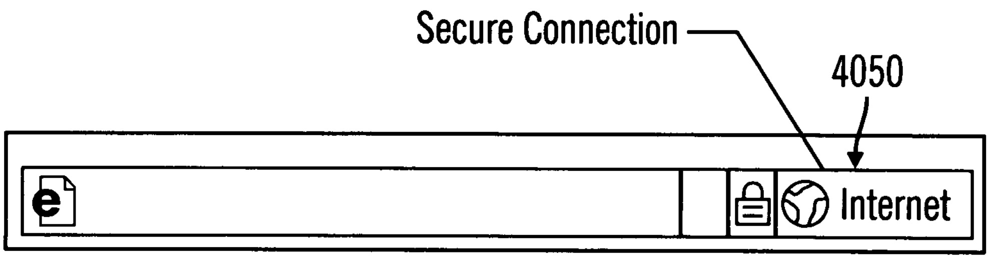

FIGS. 40A–40E illustrate UI screens in accordance with certain implementations of the invention. The UI screens within the enterprise spatial system software leverage certain common UI screen components. These shared components simplify the development effort and provide a consistent user experience throughout the enterprise spatial system software. FIG. 40A illustrates common elements in UI screen 4010 in accordance with certain implementations of the invention.

FIG. 40B illustrates a title bar 4020. The name of the project file that is opened is displayed within the title bar. If the project does not yet have a name, then the text "New Project" appears. The standard title bar text attributes apply.

FIG. 40C illustrates a logoff button 4030 in accordance with certain implementations of the invention. This button is a graphic image that resides on the right side of the logo banner. The size of this banner may be approximately 50 pixels wide by approximately 25 pixels high. Justification of the banner is as follows: the left edge of the logoff graphic is approximately 10 pixels from the right edge of the UI screen and the graphic is centered horizontally within the banner area. Upon a mouse-over (i.e., a mouse or other input devices is moved so that the cursor is over a certain area), the cursor indicates that the area is selectable by the user. Upon selection of the logo, the logoff process begins.

FIG. 40D illustrates menu selections 4040 in accordance with certain implementations of the invention. Drop down menu selections are available from all "full screen" pages within the enterprise spatial system software. The details defining the functionality contained within these menus are provided later in the document. Common attributes of controls include: menu buttons and pull downs. The menu buttons include menu selections, which include, for example, File, Layer, Drawing, Analysis, Business Solutions, Preferences and Help menu selections. Also, individual selections include, for example: within the File Menu: New, Open, Save, Print Map, Email Map, Save Map, Data Buy, and Close; within the Layer Menu: Change Order, Edit Favorites List, Zoom to a Single Layer, and Zoom to All Layers; within the Drawing Menu: Text tool, Line tool, Polyline tool, Rectangle tool, Ellipse tool, and Polygon; within the Analysis Menu: Select Point, Select Line Region, Select Rectangle, Select Ellipse, Select Polygon, Buffer Selection, Custom Query, and Clear Query; within the Preferences Menu: User Name, Password, System Settings, and tool Defaults; and, within the Help Menu: About, Contents, and Index. Also, upon selection of any of the menu buttons, the corresponding pull down menu appear.

FIG. 40E illustrates a secure connection indicator 4050 in accordance with certain implementations of the invention. Once the user gets to the login page, the secure connection indicator appears. This indicator is shown on every UI screen where a secure connection is maintained.

The enterprise spatial system software uses common controls that may be found on many Application Service Provider (ASP) model applications available on the Internet. Using common controls helps to make the enterprise spatial system intuitive for the user, and provides standardization for the enterprise spatial system software. The standards to be applied to these common controls are described in detail in the following section.

Figure 41:
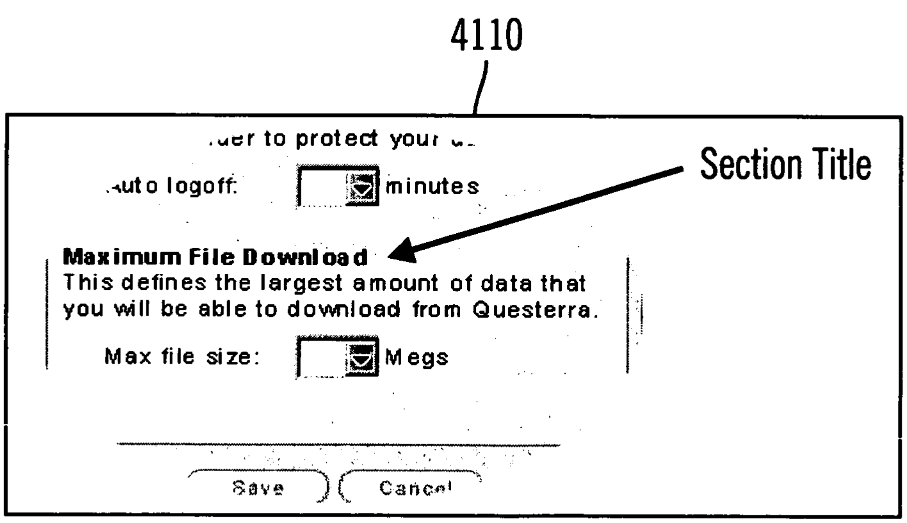
FIG. 41 illustrates a section title in accordance with certain implementations of the invention.

FIG. 41 illustrates a section title 4110 in accordance with certain implementations of the invention. On some UI screens, the controls may be grouped for organizational purposes. For example, a section title is used to divide the work area into the multiple sections and to provide the user with an understanding of the function of a particular section.

Figure 42:
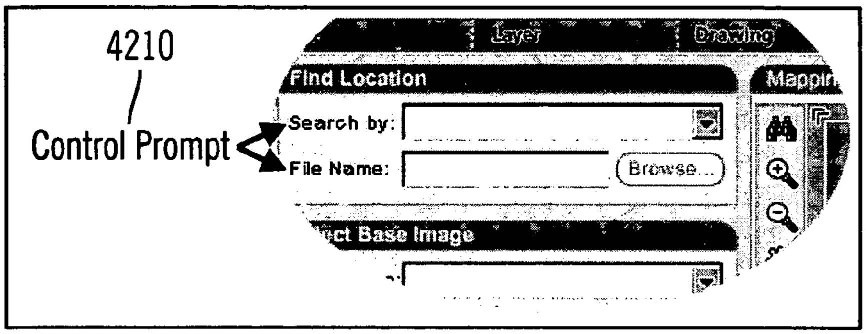
FIG. 42 illustrates a control prompt in accordance with certain implementations of the invention.

FIG. 42 illustrates a control prompt 4210 in accordance with certain implementations of the invention. Typically, each control that is used in the application will have text prompting the user what to do for the given control.

Figure 43:
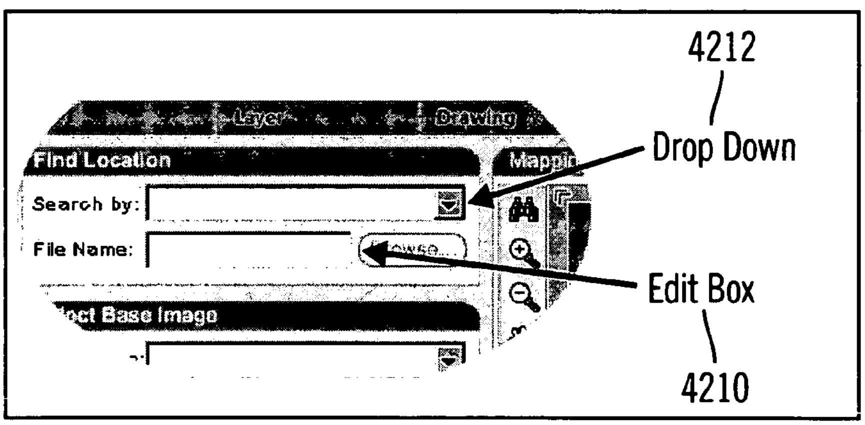
FIG. 43 illustrates an Edit box and a Drop Down list box in accordance with certain implementations of the invention

FIG. 43 illustrates an Edit box 4310 and a Drop Down list box 4312 in accordance with certain implementations of the invention. When an Edit box 4310 or Drop Down list box 4312 is called out, certain standards are attributed to these controls based upon industry standards that define such controls. The edit boxes and drop down list boxes used within the enterprise spatial system software adhere to industry standards. In addition, certain standards that are specific to the needs of the enterprise spatial system UI are followed as well.

Figure 44:
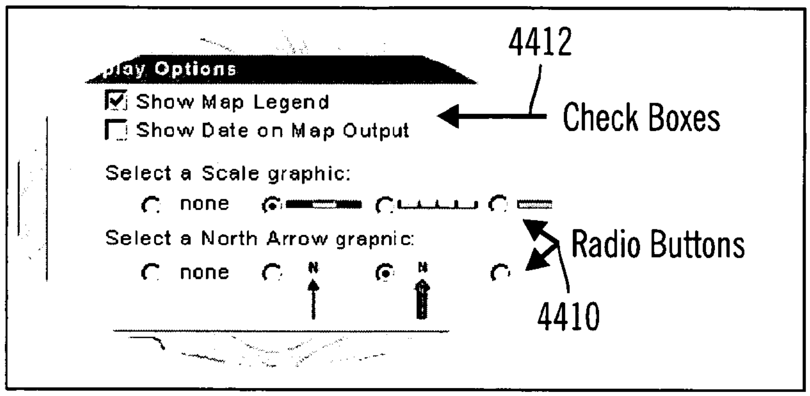
FIG. 44 illustrates Radio button controls and Check Box controls in accordance with certain implementations of the invention.

FIG. 44 illustrates Radio button controls 4410 and Check Box controls 4412 in accordance with certain implementations of the invention. Radio button controls 4410 used within the enterprise spatial system software adhere to industry standards, but also consistently adhere to several placement standards that are unique to the enterprise spatial system.

Figure 45:
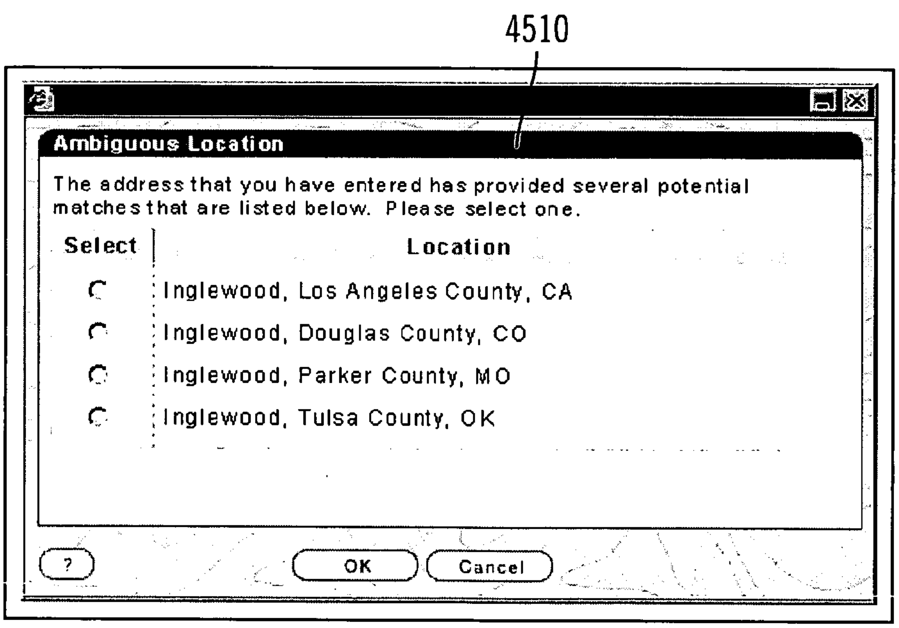
FIG. 45 illustrates a sample Grid Display in accordance with certain implementations of the invention.

FIG. 45 illustrates a sample Grid Display 4510 in accordance with certain implementations of the invention. In some cases, a Grid Display 4510 is required to display multiple items, either for viewing purposes only, or to allow the user to take action of some sort. FIG. 45 illustrates a UI screen that integrates a grid that demonstrates all of the elements that may be required for a given UI screen. A grid consists of multiple columns, separated by lines, with each column having an optional text header. Also, a grid will also contain multiple rows, having embedded edit boxes and embedded check box and radio button controls. The use of embedded edit boxes may also be used in grids, for example, to allow the user to change the quantity of a purchase order. These embedded controls have the same characteristics as standard edit boxes, with the exception that these controls are sized to fit within the column in which they are used. In some grids, check box controls and/or radio controls may be embedded. The check box controls allow the user to "select" items, in order that some action may be undertaken on that item. For example, a user may select an item from the purchase list to be removed from the purchase list. This control has all of the same characteristics of a standard check box control, except that it is embedded within the grid.

Figure 46:
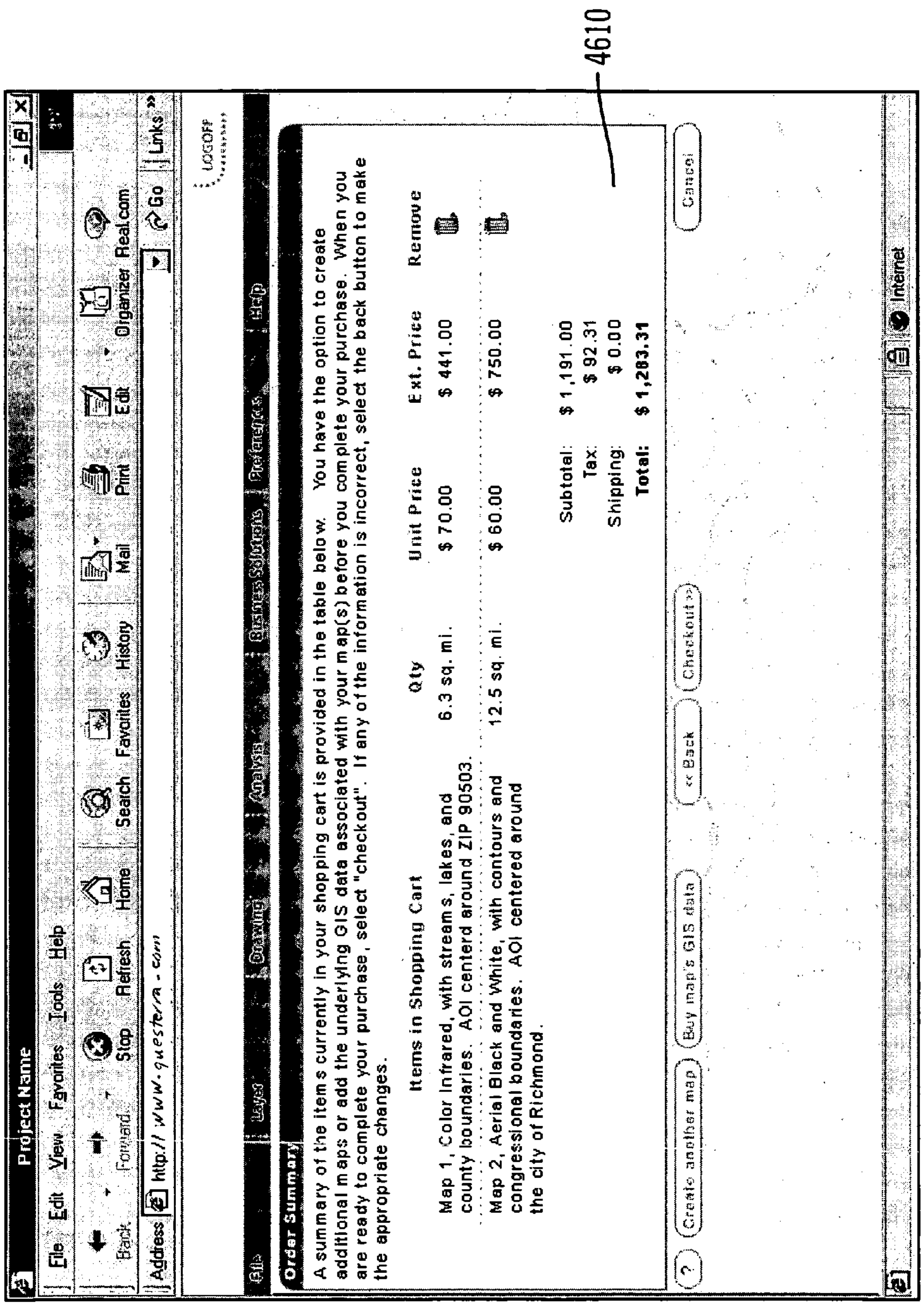
FIG. 46 illustrates a table display in accordance with certain implementations of the invention.

FIG. 46 illustrates a table display 4610 in accordance with certain implementations of the invention. The table display is similar to the grid display, but the table display is typically used to display shopping cart-related information. FIG. 46 illustrates a UI screen that integrates a table used in the shopping cart portion of the enterprise spatial system software. Since there are many similarities with grid displays, table display standards are defined assuming all of the characteristics of the grid display, then defining the differences between the two. Table displays have a summary row, which is an additional box frame located immediately below the main display, with a height sufficient to contain the summary information.

Figure 47:
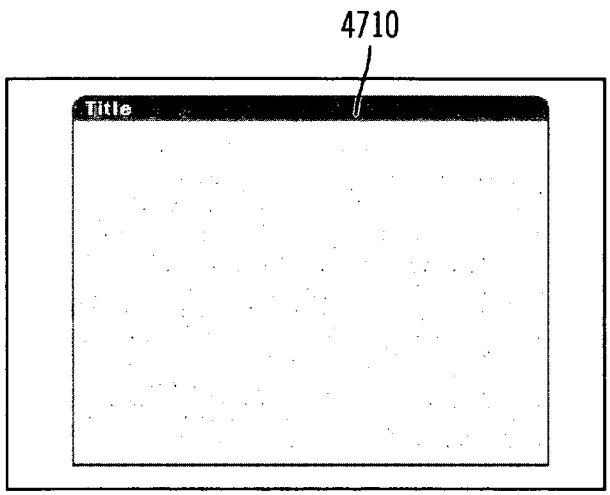
FIG. 47 illustrates a control frame in accordance with certain implementations of the invention.

FIG. 47 illustrates a control frame 4710 in accordance with certain implementations of the invention. Control frames are used to help organize UI screens.

Figure 48:
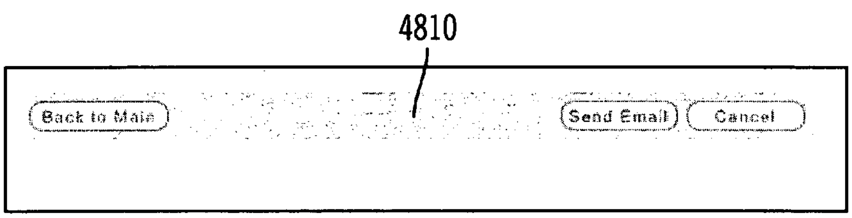
FIG. 48 illustrates command buttons in accordance with certain implementations of the invention.
Figure 49:
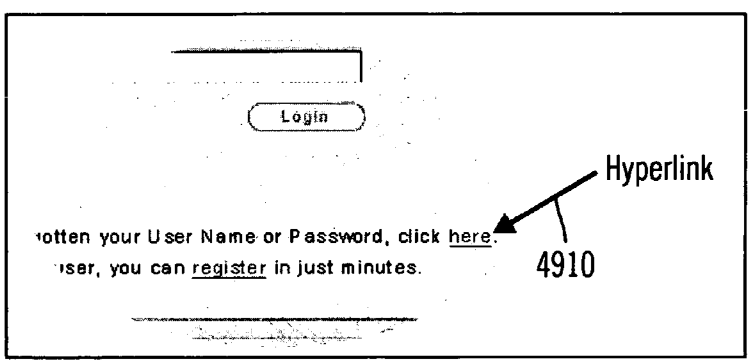
FIG. 49 illustrates hyperlinks in accordance with certain implementations of the invention.

In creating user interface standards for the enterprise spatial system software, the types of buttons that will be used in the design are divided into two categories, command buttons and hyperlink buttons (hyperlinks). FIG. 48 illustrates command buttons 4810 in accordance with certain implementations of the invention. Command buttons refer to those buttons, which, when selected, execute a command of some sort and thus perform an action. Examples of command buttons are shown in FIG. 48. Other examples of command buttons include, for example, print, refresh map, and login. FIG. 49 illustrates hyperlinks 4910 in accordance with certain implementations of the invention. Hyperlinks refer to those buttons, which, when selected, links the user to another UI screen. (e.g., either within the enterprise spatial system software or on the enterprise spatial system marketing website). Hyperlinks function according to standard conventions within the enterprise spatial system software. The detailed attributes are driven by the user's settings in their browser's preference settings.

Figure 50:
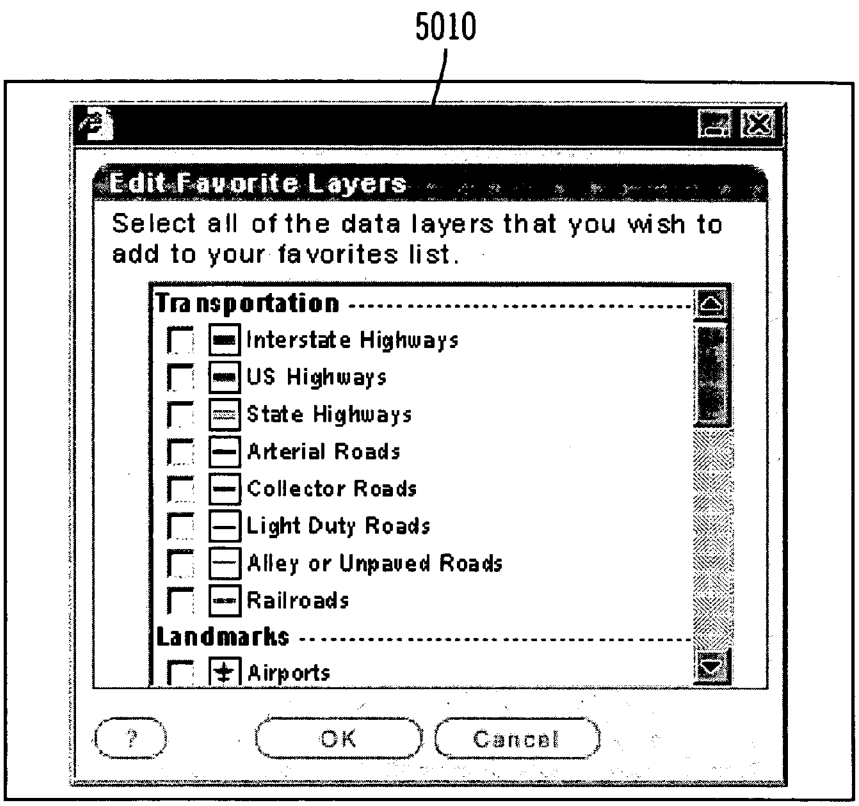
FIG. 50 illustrates a pop up dialog box in accordance with certain implementations of the invention.
Figure 51:
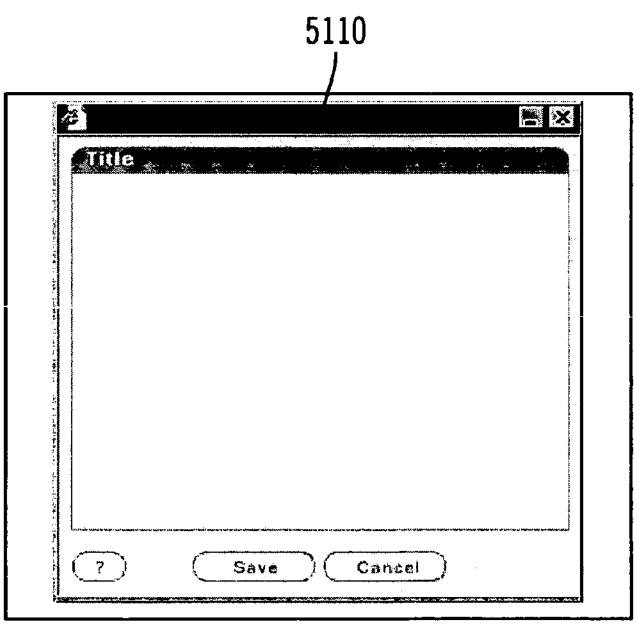
FIG. 51 illustrates a small pop up dialog box in accordance with certain implementations of the invention.
Figure 52:
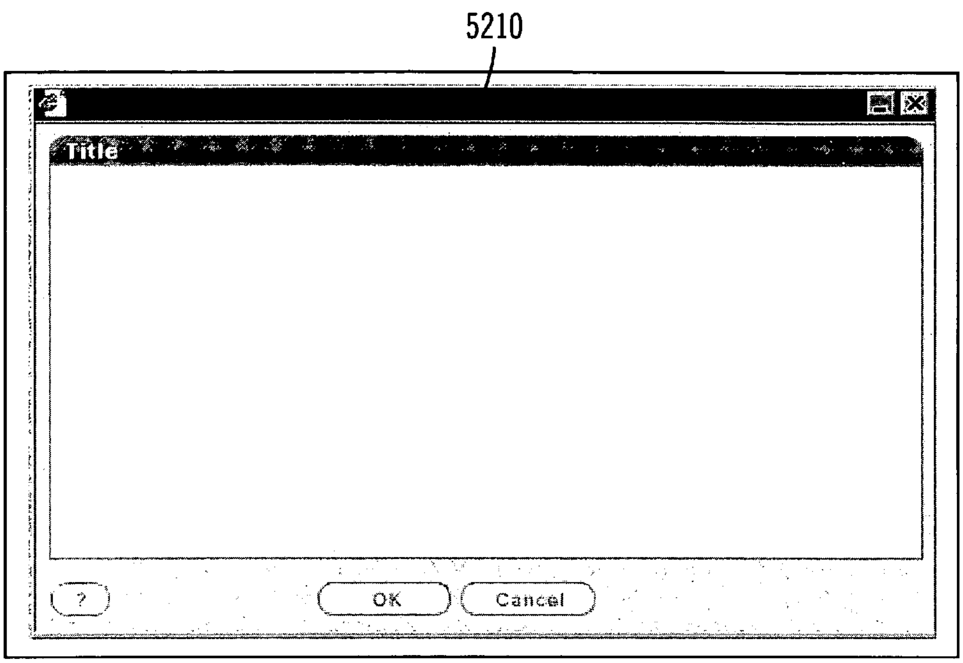
FIG. 52 illustrates a large pop up dialog box in accordance with certain implementations of the invention.
Figure 53:
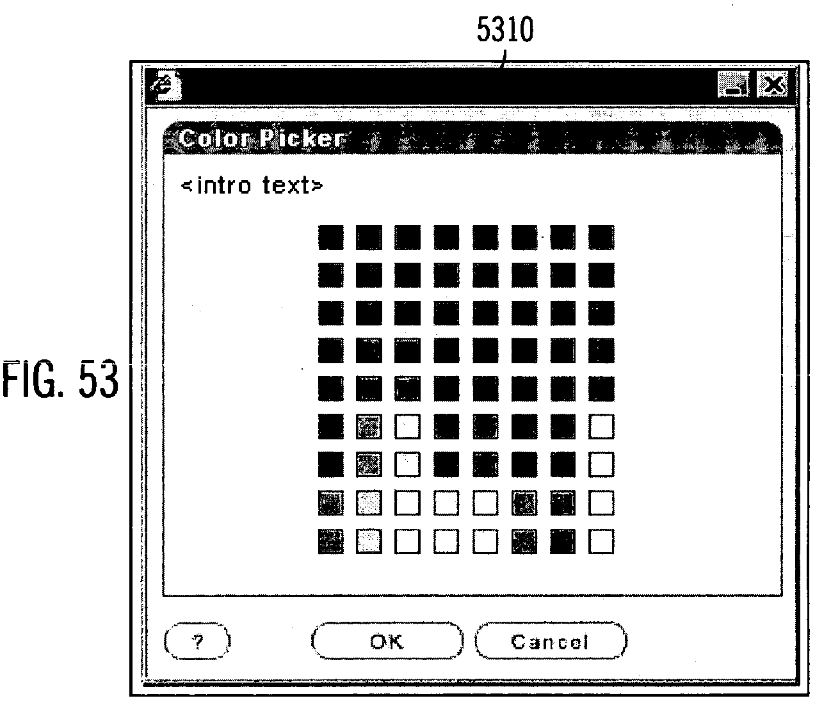
FIG. 53 illustrates a color picker in accordance with certain implementations of the invention.

FIG. 50 illustrates a pop up dialog box 5010 (which is a type of UI screen) in accordance with certain implementations of the invention. In certain implementations, pop up dialog boxes are used infrequently in the enterprise spatial system. pop up dialog boxes are used whenever the user is the middle of a workflow, and some additional information is required from the user in order to proceed. FIG. 51 illustrates a small pop up dialog box 5110 in accordance with certain implementations of the invention. FIG. 52 illustrates a large pop up dialog box 5210 in accordance with certain implementations of the invention. FIG. 53 illustrates a color picker 5310 in accordance with certain implementations of the invention. The color picker is a pop up dialog box that allows the user to change the color of any of several object types, including font color, shape colors, line colors, data layer coloring, etc.

Figure 54:
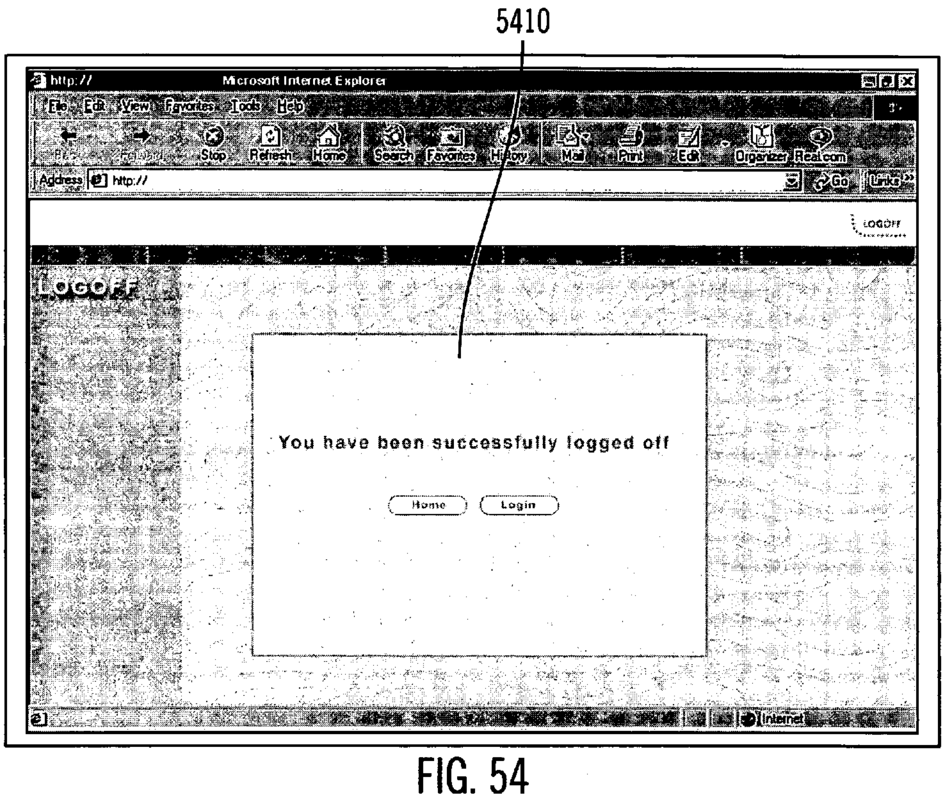
FIG. 54 illustrates a Message UI screen in accordance with certain implementations of the invention.

There are various types of messages that may be communicated to users of the enterprise spatial system. As a result, the enterprise spatial system utilizes several different message handling user interfaces, each appropriate for meeting different needs. Specifically, messages are handled using three (3) different UI formats: message UI screens, message pushing, and pop up message boxes. FIG. 54 illustrates a Message UI screen 5410 in accordance with certain implementations of the invention. Message UI screens are full UI screen messages that populate the entire enterprise spatial system work area. This form of message handling is typically used for confirmation of the completion of tasks, as shown in Message UI screen 5410.

Figure 55:
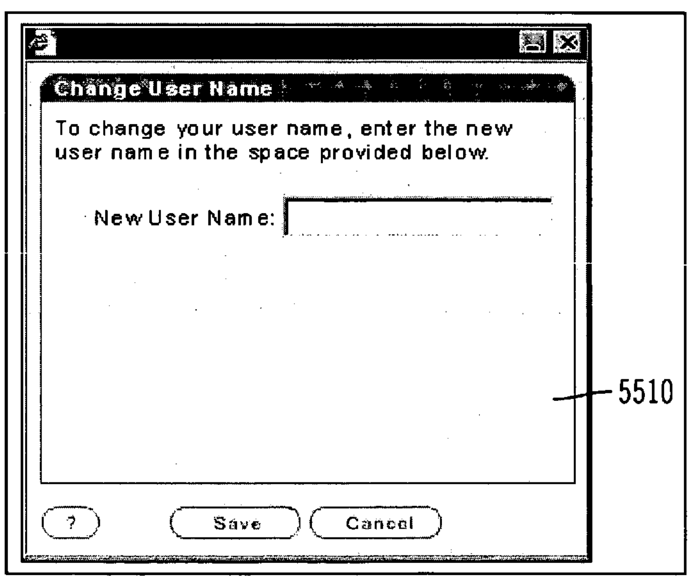
FIG. 55 illustrates a UI screen before an error has occurred in accordance with certain implementations of the invention.
Figure 56:
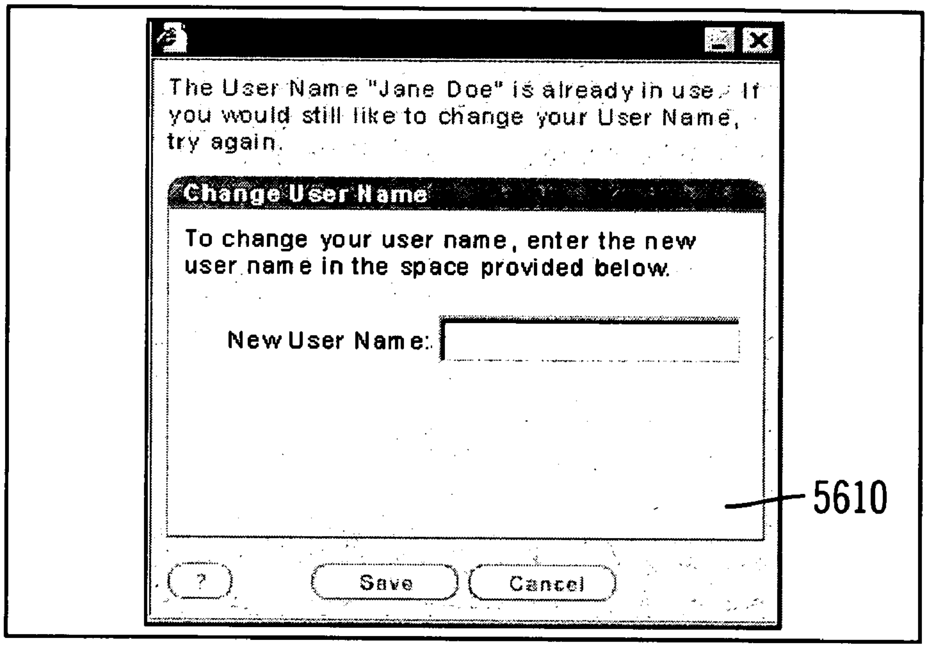
FIG. 56 illustrates UI screen in accordance with certain implementations of the invention.

As for message pushing, the means in which error conditions are handled are important to the overall user experience. By providing consistent messaging with straightforward resolutions, error handling can improve the user's overall approval of the enterprise spatial system. Many of the error messages within the enterprise spatial system software are handled by "pushing" the error message to the top of the UI screen, thus, pushing all other data down the UI screen by the appropriate amount. The error messages themselves vary depending upon the error, and are described further below. Certain UI standards are applied to these error messages, regardless of the error specifics. In particular, FIG. 55 illustrates a UI screen 5510 before an error has occurred in accordance with certain implementations of the invention. After an error has occurred, an error message will be "pushed" to the top of the UI screen, and all other UI screen elements shifted downward as shown below. In this case, a user selected a user name that is not available. FIG. 56 illustrates UI screen 5610 in accordance with certain implementations of the invention. In FIG. 56, the user remains on the same UI screen as in FIG. 55, but an error message now appears at the top of UI screen 5610. In certain implementations, a scroll bar is available, and the user uses the scroll down in order to access the command buttons.

As for pop up error messages, pop up error messaging is used throughout the enterprise spatial system software.

Figure 57:
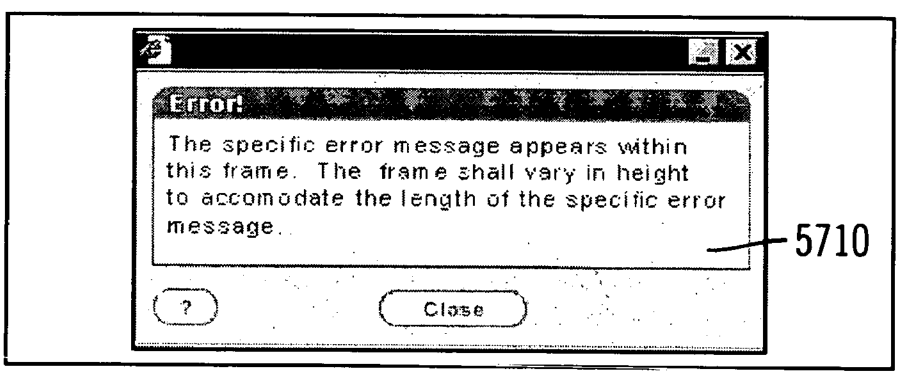
FIG. 57 illustrates a pop up error message in accordance with certain implementations of the invention.

Since the user is likely come across multiple error messages during the course of usage, standards are established to provide consistency in these messages. FIG. 57 illustrates a pop up error message 5710 in accordance with certain implementations of the invention.

The enterprise spatial system provides a registration wizard. Prior to using the enterprise spatial system service, every customer first registers with the enterprise spatial system, whether the customer is a subscription user or a one-time, transaction-based customer. In the case of the subscription user with a site license account, an enterprise spatial system representative may register the customer using the enterprise spatial system admin tool. For transaction-based customers, registration may be handled using a short registration wizard.

The registration wizard process is quick and simplified, so as not to serve as a barrier to entry for new customers. The main registration process obtains the user's email address (e.g., for communications) and assigns or allows the user to choose a user name and password (e.g., for usage tracking and credit card storage). The registration process is designed to be a one-time experience for the customer. Once the customer has completed the registration process, the customer will have a username and password, and will be able to login to the enterprise spatial system service in the future.

Figure 58:
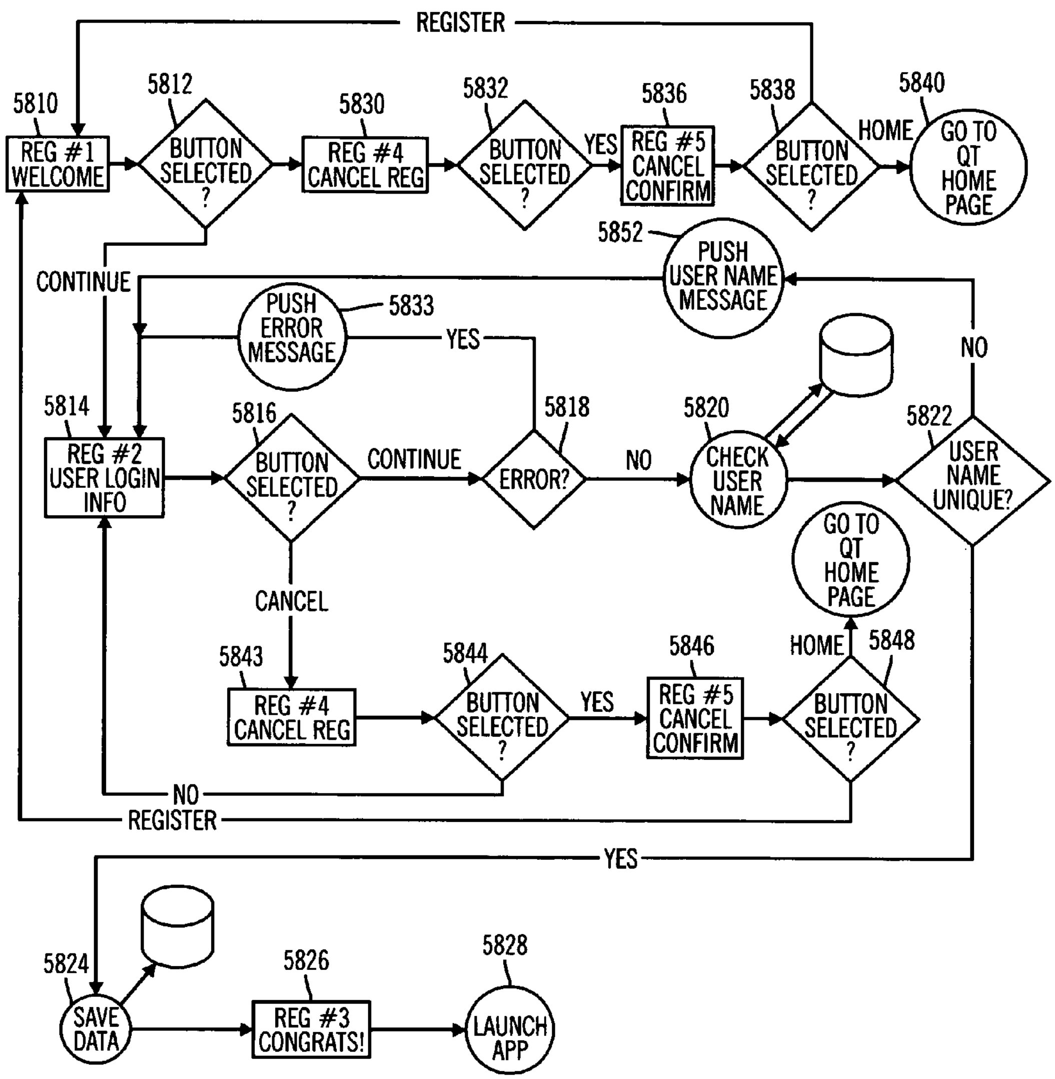
FIG. 58 illustrates logic for the registration process for transaction-based users in accordance with certain implementations of the invention.

FIG. 58 illustrates logic for the registration process for transaction-based users in accordance with certain implementations of the invention. Control begins at block 5810 with a Welcome UI screen being displayed to the user. In block 5812, if a continue button is selected, processing continues to block 5814, otherwise, if a cancel button has been selected, processing continues to block 5830. In block 5814, user login information is collected via a registration UI screen. In block 5816, if a continue button was selected, processing continues to block 5818, otherwise, if a cancel button has been selected, processing continues to block 5843. In block 5818, it is determined whether there is an error. If so, processing continues to block 5853 and an error message is pushed, otherwise, processing continues to block 5820. In block 5820, the user name is checked against a data store. In block 5822, it is determined whether the user name is unique. If so, processing continues to block 5824, otherwise, processing continues to block 5852 and an error message is pushed. In block 5824, data is saved. In block 5826, the user is congratulated for registering via a UI screen. In block 5828, the enterprise spatial system software is available for use.

In block 5830, a cancel registration UI screen is displayed. In block 5832, if a yes button is selected, processing continues to block 5836, otherwise, processing returns to block 5810. In block 5836, a cancellation confirmation UI screen is displayed. In block 5838, if the button selected is home, processing continues to block 5840 and the user is returned to a home page, otherwise, processing returns to block 5810.

In block 5843, a cancel registration UI screen is displayed. In block 5844, if a yes button is selected, processing continues to block 5846, otherwise, processing returns to block 5814. In block 5846, a cancellation confirmation UI screen is displayed. In block 5838, if the button selected is home, processing continues to block 5850 and the user is returned to a home page, otherwise, processing returns to block 5814.

Figure 59:
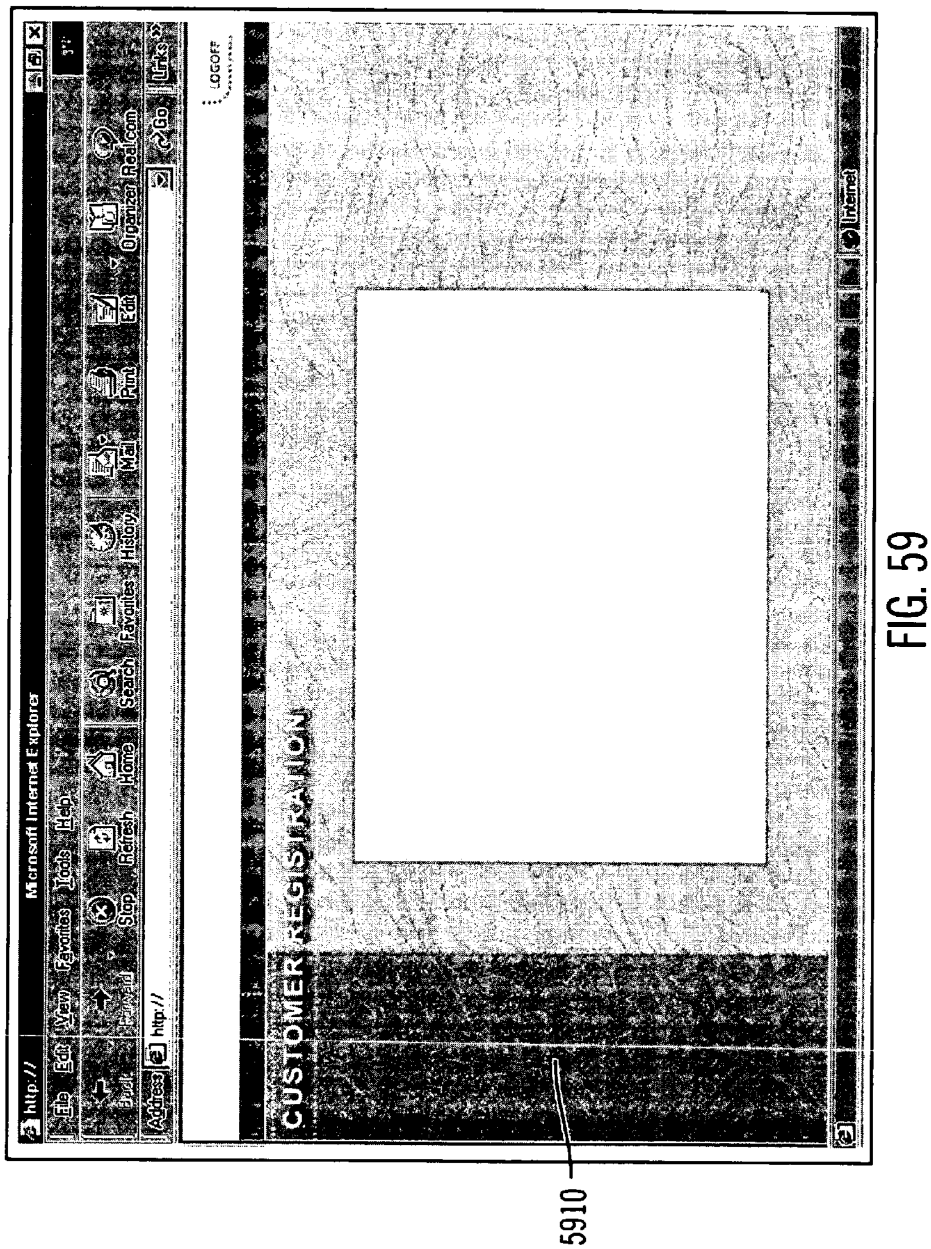
FIG. 59 illustrates common registration wizard elements in accordance with certain implementations of the invention.

FIG. 59 illustrates common registration wizard 5910 elements in accordance with certain implementations of the invention. The registration work window is the area that contains all dynamic information during the registration process. In this window, all of the controls appear on the various UI screens that provide the functionality of the registration wizard.

Figure 60:
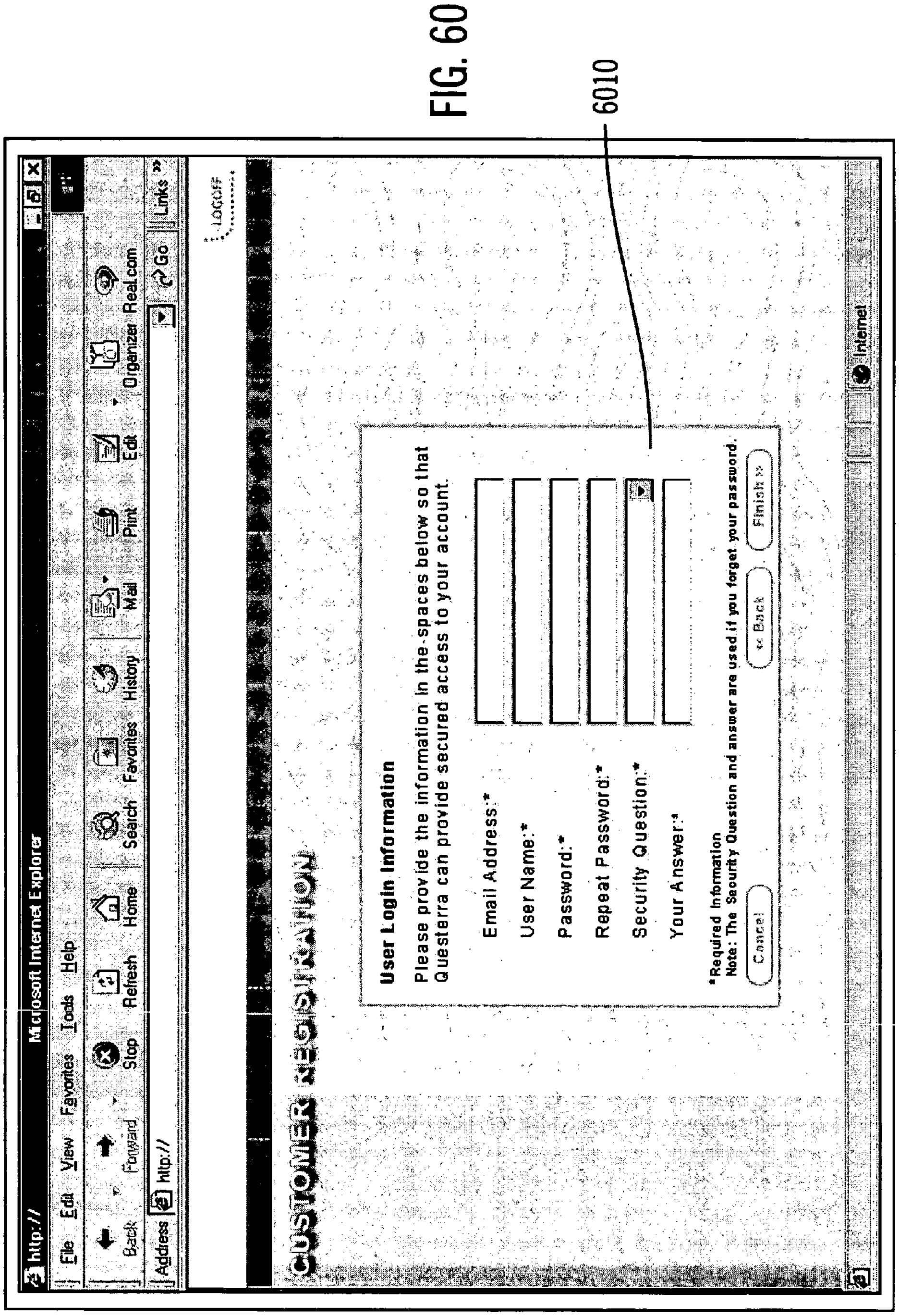
FIG. 60 illustrates a registration UI screen requesting user login information in accordance with certain implementations of the invention.

FIG. 60 illustrates a registration UI screen 6010 requesting user login information in accordance with certain implementations of the invention. A password edit box supports alphanumeric values, supports special characters (e.g., _, %, &, *, #, ', @), is not case sensitive, masks input text, does not cache password that is input, is a required field, and is always available to the user. A repeat password edit box supports special characters (e.g., _, %, &, *, #, ', @), is not case sensitive, masks input text, does not cache repeat password that is input, is a required field, is always available to the user. The secret question drop down box contains, for example, the following questions for selection by the user: "What city were you born in?", "What is your favorite food?", "What is your pet's name?", "When is your anniversary?", and "Mother's maiden name?".

From the UI screen 6010, if the user selects the back button, the user is taken to the Registration UI screen 760, which is a Welcome UI screen. If the user selects the finish button, it is checked that the user has input data into all of the required fields on this UI screen. If not, an error message is pushed to the top of the UI screen, with text reading, "The following information must be provided in order to complete registration with the enterprise spatial system: <cr> <insert names of all fields for which data must be provided (and was not provided), in order based upon UI screen location from top to bottom with a <cr> between each field.". Also, the minimum number of required characters for each field is checked. If any of the fields have fewer characters than the required minimum, an error message will be pushed to the top of the UI screen, with text reading "The <insert field name> requires at least <insert minimum number of characters> characters. Please provide a <Insert field name> with at least <insert minimum number of characters> characters. If multiple fields have failed the minimum character check, then this message appears for each failure, separated by a <cr> and in the same order as their respective fields on the UI screen.

If the User Name edit box has been filled in, a check is made on the server system to make sure that the user has provided a unique User Name. If the User Name provided is not unique, a message is pushed to the top of the UI screen, with text reading, "The User Name <insert User Name> is already in use. Please enter another user name.". The User Name edit box cleared. If the User Name edit box has been filled in, a check is made to determine whether the user name begins with a space. If a space appears at the beginning of the user name, a message is pushed to the top of the UI screen, with text reading, "The User Name that you have provided is invalid, since a User Name cannot begin with a space. Please enter another user name.". The User Name edit box is cleared.

If the Repeat Password edit box has been filled in, a check is made to determine whether the character string matches exactly to the character string provided in the Password edit box. If the two fields do not match, an error message is pushed to the top of the UI screen, with text reading, "The Repeat Password did not match the original password that you provided. Please re-enter the Password and the Repeat Password." The Password edit box is cleared. The Repeat Password edit box is cleared.

If all of the required conditions are met, then the user information is stored. The user name is reserved for use by this customer, and the user is advanced to the next UI screen of the wizard, a Registration UI screen—Congratulations.

Figure 61:
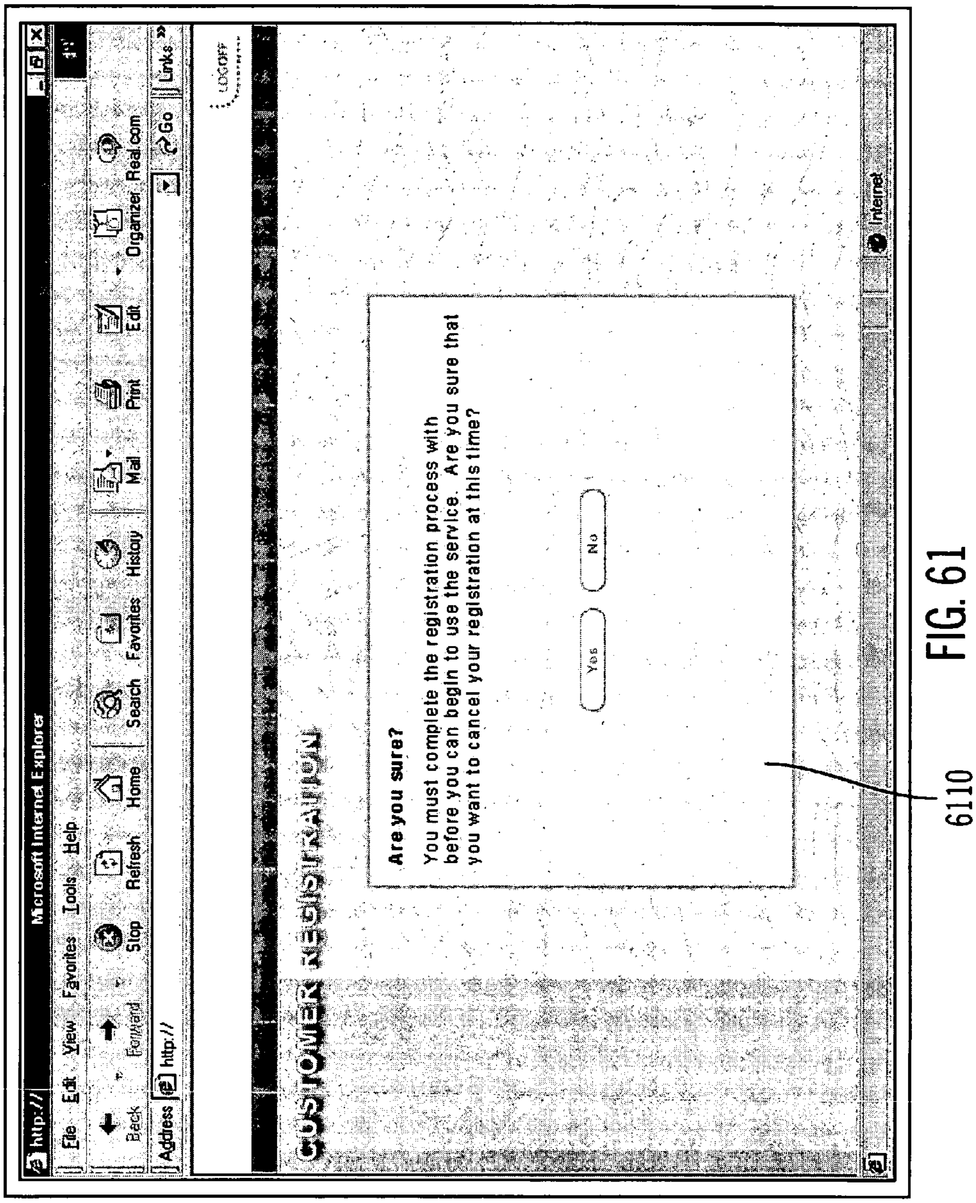
FIGS. 61 and 62 illustrate cancel registration and cancellation confirmation UI screens, respectively, in accordance with certain implementations of the invention.
Figure 62:
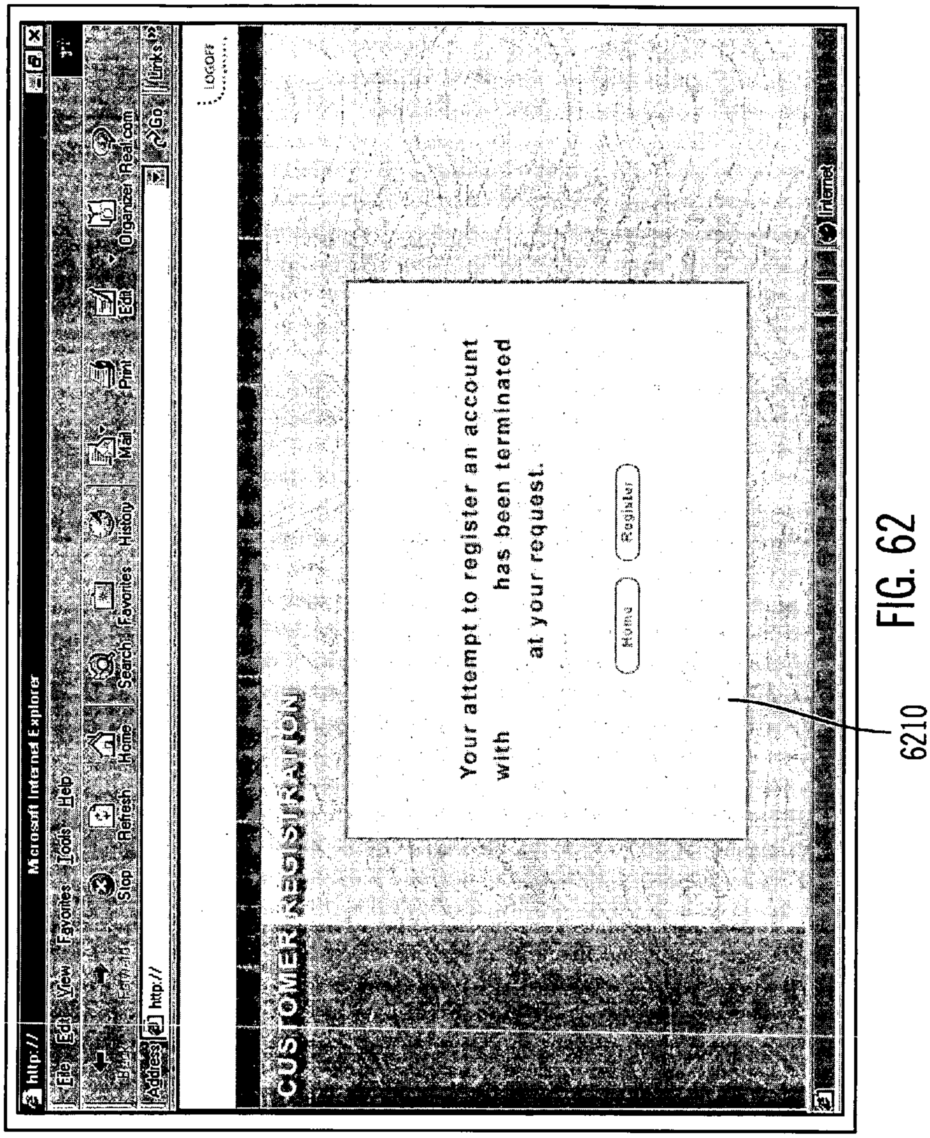

FIGS. 61 and 62 illustrate cancel registration and cancellation confirmation UI screens, respectively, in accordance with certain implementations of the invention. If the user selects the cancel button in UI screen 6010, the user is taken to the registration UI screen 6110 to cancel registration. In UI screen 6110, if the user selects the yes button, registration information gathered up until this point is discarded and the user name is made available to others. The user is linked to the enterprise spatial system homepage. If the user selects the no button, the registration information gathered up until this point is kept. Th user is returned to the registration UI screen 6010 from which the user originally selected the cancel button. The UI screen 6210 is used to confirm cancellation. If the user selects the Home button in UI screen 6210, the user is taken to the enterprise spatial system home page Uniform Resource Locator (URL). If the user selects the Register button, the user is taken to registration UI screen 6010.

In certain implementations, an enterprise spatial system representative is responsible for undertaking the registration process on behalf of a subscription customer. The enterprise spatial system representative registers the customer using an enterprise spatial system admin tool.

As for login, as supporting an e-commerce site, the enterprise spatial system handles various types of information that are of a sensitive nature to the user, including personal contact information and billing/credit card information. The enterprise spatial system protects this sensitive information. As a protection to the customer, a secure login procedure is required to ensure that only authorized individuals have access to a given account. Once the secure login has been completed, the connection remains secure until the point that the user has logged off of the enterprise spatial system. During the entire period that the user is logged on, each UI screen within the application shows the secure connection indicator.

In addition to protecting sensitive customer information, utilizing a login process will allow the enterprise spatial system to collect invaluable information regarding customer usage. For example, the enterprise spatial system determines whether certain low-volume users are responsible for placing a disproportional load on the server system at the enterprise spatial system. The option will also exist to track the usage of customers in order to send personalized communications to the customers based upon their usage. For example, for heavy volume users, a trigger can be set to make sure that a regular phone call is made proactively to make sure that the customer is happy, get feedback for new features, or gauge if there is an interesting public relations (PR) opportunity for the enterprise spatial system. As another example, transactional users who do certain tasks on a regular enough basis so that it makes sense for them to move to a subscription service plan may be tracked and contacted.

Finally, the login process identifies the user and enables the enterprise spatial system to assign profiles to various users that can be used to customize the user experience once the user has successfully logged into the system. The login process serves as the entry point for users accessing the enterprise spatial system. The process is straightforward, and involves retrieving verifying the validity of the user name and password provided by the person attempting to login to the enterprise spatial system software.

Figure 63:
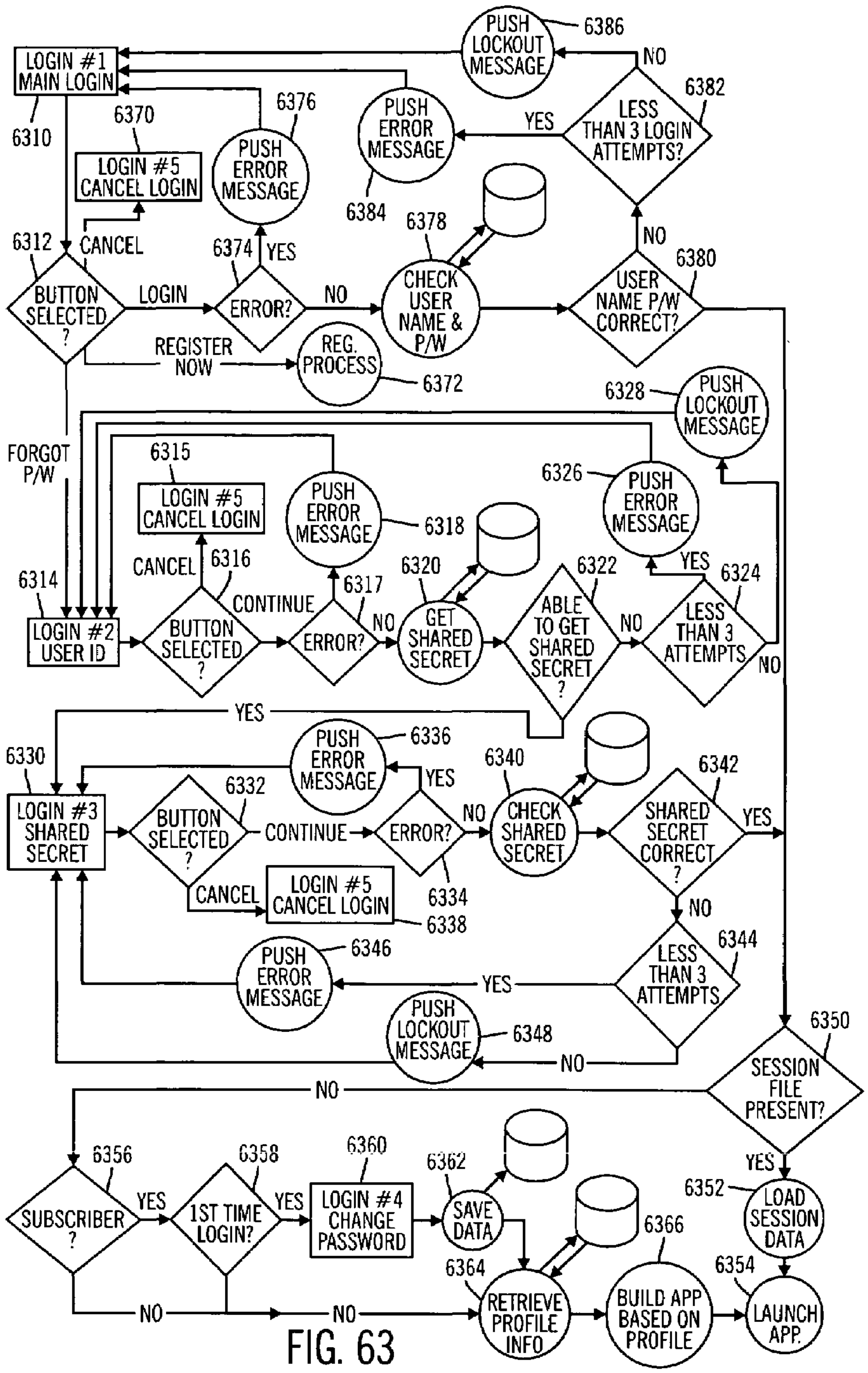
FIG. 63 illustrates logic for login in accordance with certain implementations of the invention.

Although the login process consists of three different UI screens, a significant amount of logic and error handling is required. FIG. 63 illustrates logic for login in accordance with certain implementations of the invention. Control begins at block 6310, with display of a main login UI screen. In block, 6312, if a cancel button was selected, processing continues to block 6370; if a login button was selected, processing continues to block 6374; if a register now button was selected, processing continues to block 6372; and, if a forgot password button was selected, processing continues to block 6314.

In block 6314, a user id UI screen is displayed. In block 6316, if a cancel button is displayed, processing continues to block 6315, otherwise, processing continues to block 6317. In block 6315, a cancel login UI screen is displayed. In block 6317, if there is an error, processing continues to block 6318 and an error message is pushed, otherwise, processing continues to block 6320. In block 6320, the enterprise spatial system attempts to get a shared secret from a data store. In block 6322, if a shared secret was retrieved, processing continues to block 6330, otherwise, processing continues to block 6324. In block 6324, if there have been less than three attempts to login, processing continues to block 6326 and an error message is pushed, otherwise, processing continues to block 6328 and a lockout message is pushed. From blocks 6326 and 6328, processing continues to block 6314.

In block 6330, a shared secret UI screen is displayed. In block 6332, if a continue button is selected, processing continues to block 6334, otherwise, if a cancel button is selected, processing continues to block 6338 and a cancel login UI screen is displayed. In block 63334, if there is an error, processing continues to block 6336 and an error message is pushed, otherwise, processing continues to block 6340. In block 6340, a shared secret received from the user via the shared secret UI screen is checked against the data store. In block 6342, if the shared secret is correct, processing continues to block 6350, otherwise, processing continues to block 6344.

In block 6344, if there have been less than three attempts to enter a shared secret by the user, processing continues to block 6346 and an error message is pushed, otherwise, processing continues to block 6348, and a lockout message is pushed. From blocks 6346 and 6348, processing continues to block 6330.

In block 6350, if the session file is present, processing continues to block 6352, otherwise, processing continues to block 6356. In block 6352, session data is loaded. In block 6354, the enterprise spatial system software is made available for use.

In block 6356, if the user is a subscriber, processing continues to block 6358, otherwise processing continues to block 6364. In block 6358, if this is a first time login, processing continues to block 6360, otherwise, processing continues to block 6364. In block 6360, a change password UI screen is displayed, allowing the user to change the login password. In block 6362, the changed password (if any) is saved. In block 6365, profile information is retrieved. In block 6366, the enterprise spatial system software is customized based on the profile information. Then, processing continues to block 6354.

Figure 64:
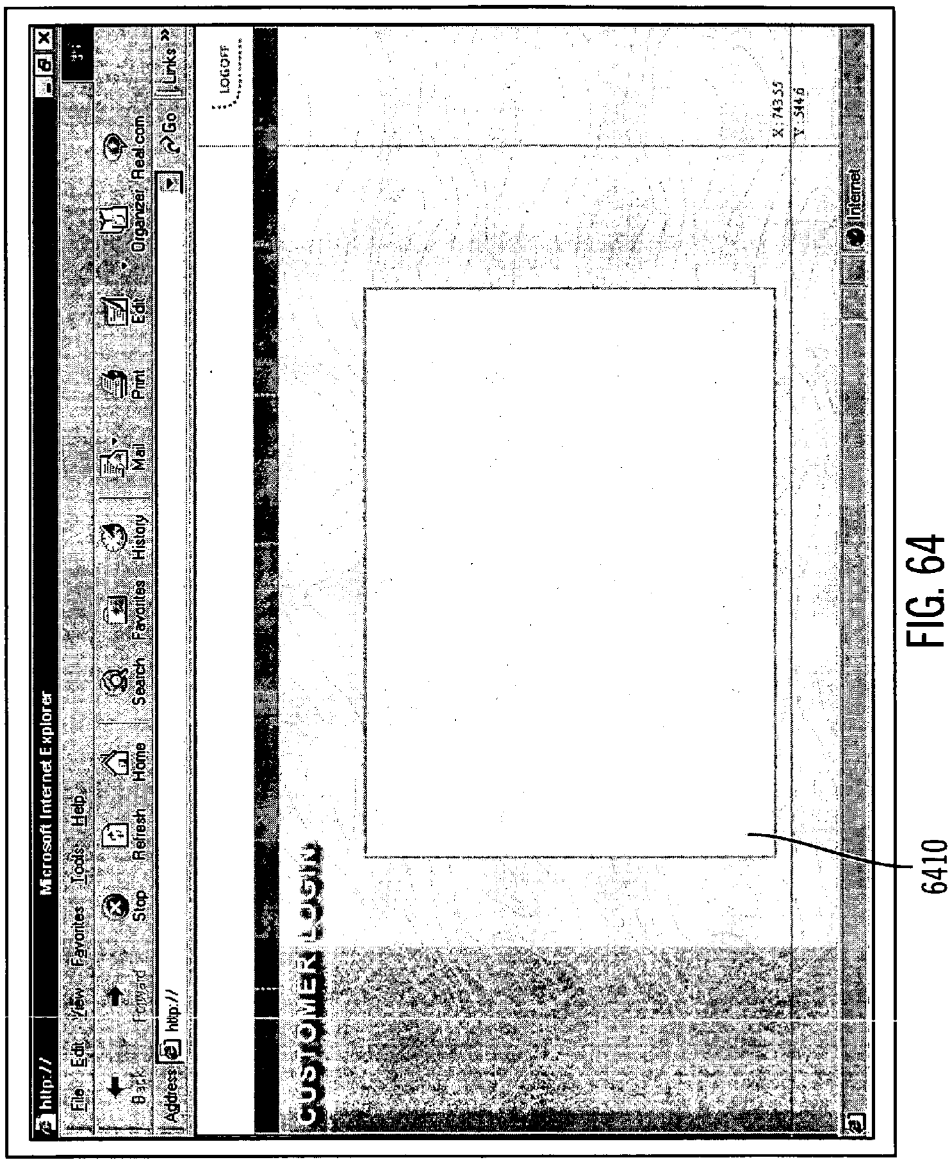
FIG. 64 illustrates common login UI screen elements in accordance with certain implementations of the invention.

As discussed with respect to FIG. 63, there are five UI screens that make up the user experience for the login process. While each of these UI screens is responsible for delivering different functionality to the user, these UI screens still share numerous UI elements. These commonalities warrant an understanding prior to considering the unique details of each UI screen. FIG. 64 illustrates common login UI screen 6410 elements in accordance with certain implementations of the invention.

The common UI elements for the login process are identical to the common elements in the registration wizard, with a minor change. Specifically, the text title reads "CUSTOMER LOGIN".

Figure 65:
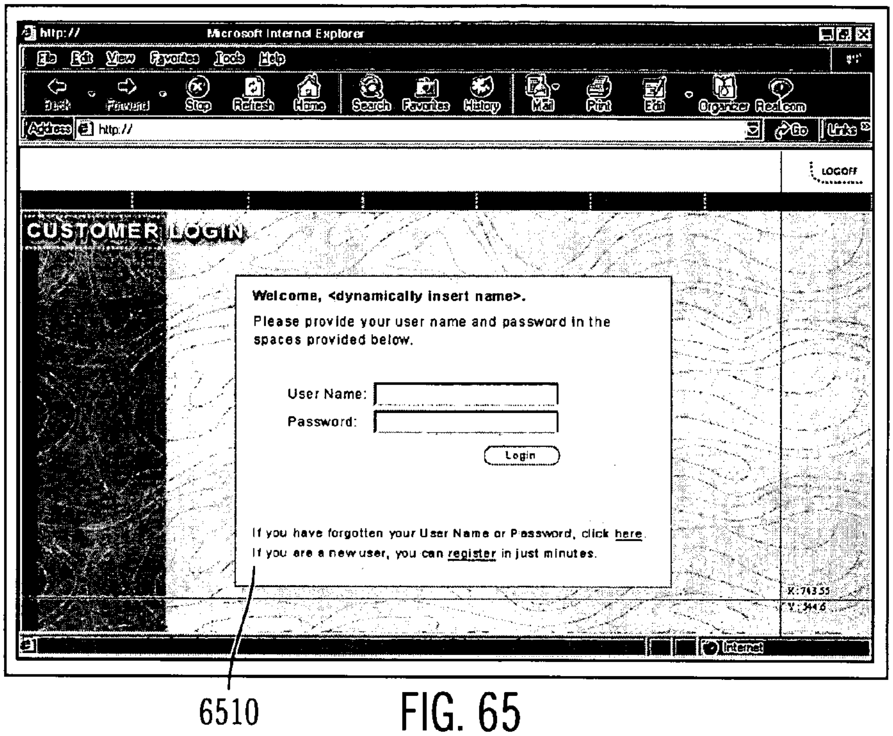
FIG. 65 illustrates a main login UI screen in accordance with certain implementations of the invention.

FIG. 65 illustrates a main login UI screen 6510 in accordance with certain implementations of the invention. A User Name edit box includes, for example, the following attributes: text that reads "User Name:"; display length of the edit box is 25 characters; a maximum length of customer input is 50 characters; a minimum length of customer input is 2 characters; supports alphanumeric values; supports special characters, including "@", "_", "."; is not case sensitive; is a required field; is always available to the user; and, has initial focus when the UI screen is first presented to the user.

The Password edit box includes, for example, the following attributes: text reads "Password:"; display length of the edit box is 25 characters; maximum length of customer input is 25 characters; minimum length of customer input is 6 characters; supports alphanumeric values; supports special characters "_, %, &, *, #, ', @"; is not case sensitive; text that is input is masked; password that is input is not cached; is a required field; and, is always available to the user.

The Login button includes, for example, the following attributes: standard control button attributes and button text reads, "login".

"I forgot" hyperlink includes, for example, the following attributes: standard hyperlink attributes; text is located below all of the fields, left justified and located above the Registration hyperlink; text reads, "If you have forgotten your User Name or Password, click here."; and, the word "here" is a hyperlink.

The Registration hyperlink includes, for example, the following attributes: standard hyperlink attributes; text is located below all of the fields, left and bottom justified; the text reads, "If you are a new user, you can register in just minutes."; and, the word "register" is hyperlink.

In FIG. 65, if the user selects the login button, a check is made to determine whether the user has input data into both the User Name and Password edit boxes. If not, an error message is pushed to the top of the UI screen, with text reading, "The following information must be provided in order to login to the enterprise spatial system: <cr> <insert names of all fields for which data must be provided (and was not provided), in order based upon UI screen location from top to bottom with a <cr> between each field.". A check is made that the minimum number of required characters for each field. If any of the fields have fewer characters than the required minimum: An error message will be pushed to the top of the UI screen, with text reading "The <insert field name> requires at least <insert minimum number of characters> characters. Please provide a <insert field name> with at least <insert minimum number of characters> characters. If multiple fields have filed the minimum character check, then this message shall appear for each failure, separated by a <cr> and in the same order as their respective fields on the UI screen. A check is made to determine whether the User Name and password provided in the Main Login UI screen are valid.

The User Name and Password are considered valid if both of the following conditions are met: the User Name exists in the enterprise spatial system data store (case insensitive) and the password that the user provided matches exactly (although case-insensitive) to the password associated with the account defined by the User Name above. If the check reveals that the User Name and Password are not valid, the "number of login attempts" counter is incremented by one. A check is made to determine whether the number of login attempts is three (3) or more. If the number of login attempts is not three (3) or more, then an error message is pushed to the top of the UI screen, with text reading, "The User Name and/or Password that you provided is invalid. Please enter this information again." Both fields are cleared. If the number of login attempts is three (3) or more, then a user lockout will occur. This will lock the user out from further login attempts for a 24 hour period and pushes the lockout error message "Due to too many login attempt errors, this account cannot be accessed at this time. For security purposes, the account will be locked out for a 24 hour period. To remove this hold prior to the 24 hour period, call the enterprise spatial system customer support at <insert phone #>". This lock out will also trigger that an email be sent to the account owner notifying the owner of the situation.

Also, a check is performed to make sure that a temporary session file is not present on the user's local system. If a temporary session file is present, then the enterprise spatial system software reads the information from the file, and uses this information to set "number of login attempts" counter to one, launch the software to the UI screen that the user was on at the time of interruption, and load all of the data that the user had provided on various UI screens during the previous session.

Figure 68:
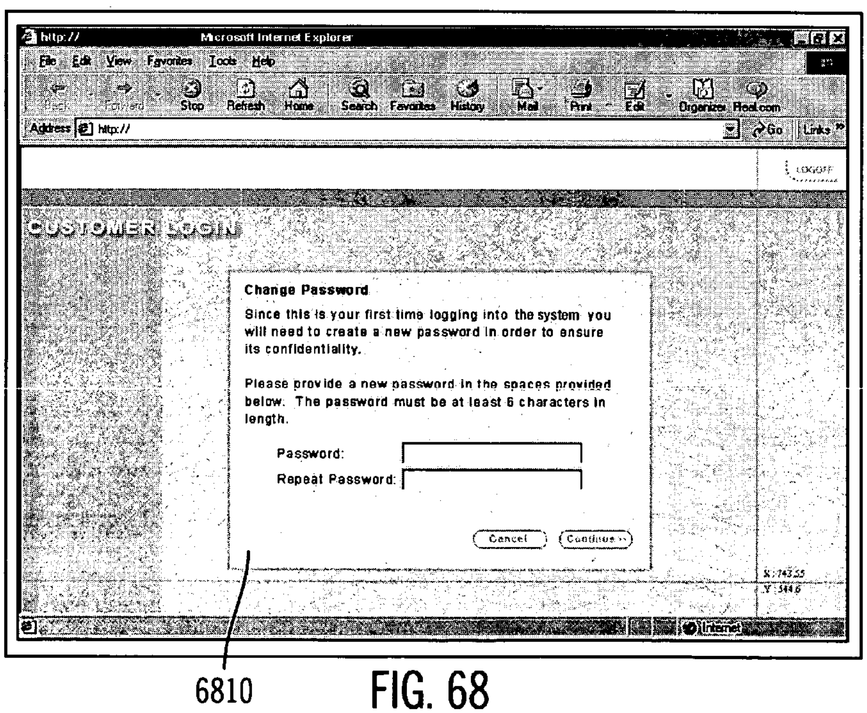
FIG. 68 illustrates a change password UI screen in accordance with certain implementations of the invention.

If the above conditions are met, then "number of login attempts" counter is set to one. If the user is a subscription customer and it is the user's first time logging into the enterprise spatial system, the user is advanced to the change password UI screen (FIG. 68). If the user is not a subscription customer who is logging on for the first time, the user profile is retrieved from the server system. The enterprise spatial system software is built based upon the user profile information. The user is logged into the enterprise spatial system, and advanced to the Welcome UI screen.

Figure 66:
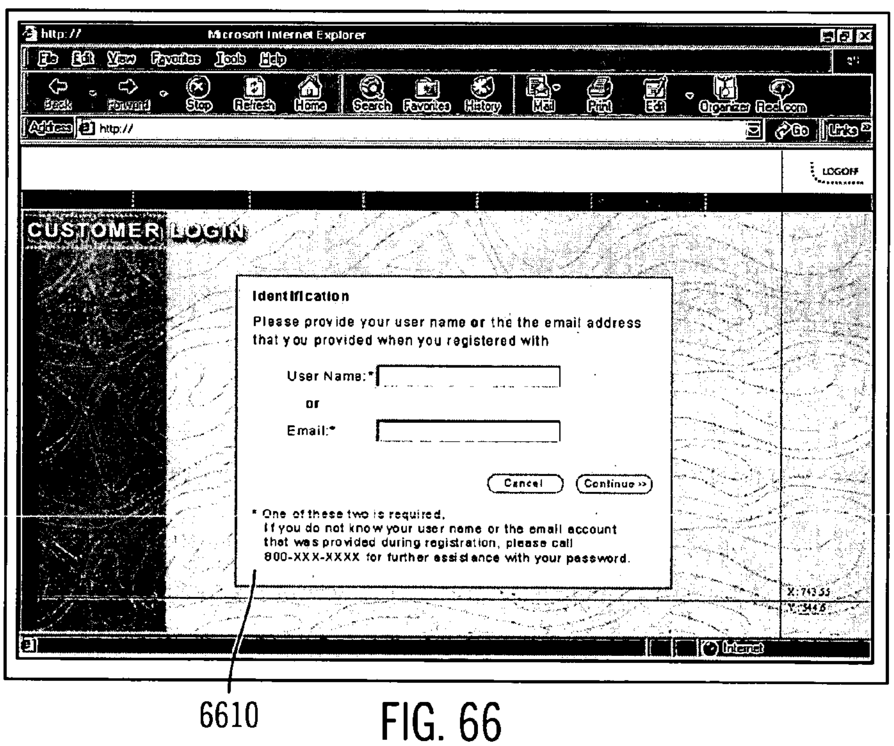
FIG. 66 illustrates a login UI screen in accordance with certain implementations of the invention.

FIG. 66 illustrates a login UI screen 6610 in accordance with certain implementations of the invention. If the user selects the I forgot hyperlink, the user is taken to the login UI screen 6610. If the user selects the Registration hyperlink, the user is taken to the Registration UI screen.

In FIG. 66, the email Address edit box includes, for example, the following attributes: text reads "email Address: *"; display length of the edit box is 25 characters; maximum length of customer input is 40 characters; minimum length of customer input is 5 characters; supports alphanumeric values; supports special characters, including "@", "_", "."; is not case sensitive; is a required field; and is always available to the user.

The Continue button includes, for example, the following attributes: standard control button attributes; button text reads, "continue"; button has a graphic arrow pointing to the right. The Cancel button includes, for example, the following attributes: standard control button attributes and button text reads, "cancel".

In FIG. 66, if the user selects the continue button, a check is made to determine whether the user has input data into either the User Name or the email edit boxes. If not, an error message is pushed to the top of the UI screen, with text reading, "You must provide either your User Name or email address in order to continue the login process with the enterprise spatial system." A check is made to determine whether the minimum number of required characters for the field that the user has elected to fill in. If the field has fewer characters than the required minimum number of characters, an error message is pushed to the top of the UI screen, with text reading "The <insert field name> requires at least <insert minimum number of characters> characters. Please provide a <insert field name> with at least <insert minimum number of characters> characters.". The field is cleared.

A check is made to determine whether the User Name or email address that the user has provided is in the enterprise spatial system user data store. If the check reveals that the User Name or email is not in the data store, the "number of get shared secret attempts" counter is incremented by one. A check is made to determine whether the number of get shared secret attempts is three (3) or more. If the number of get shared secret attempts is not three (3) or more, then an error message is pushed to the top of the UI screen, with text reading, "The User Name or email address that you provided is invalid. Please enter this information again." The field is cleared.

If the number of login attempts is three (3) or more, then a user lockout will occur. This will lock the user out from further login attempts for a 24 hour period and push the lockout error message "Due to too many login attempt errors, this account cannot be accessed at this time. For security purposes, the account will be locked out for a 24 hour period. To remove this hold prior to the 24 hour period, call the enterprise spatial system customer support at <insert phone #>"." This lock out will also trigger that an email be sent to the account owner notifying the owner of the situation.

If the check reveals that the User Name or email is in the data store, the "get shared secrets" counter is set to one. The shared secret question is obtained for the user, based upon the ID provided by either the User Name or the email address. The user is advanced to the shared secret UI screen 6710, which is illustrated FIG. 67 in accordance with certain implementations of the invention. If the user selects the cancel button, the user is taken to the cancel login UI screen.

Figure 67:
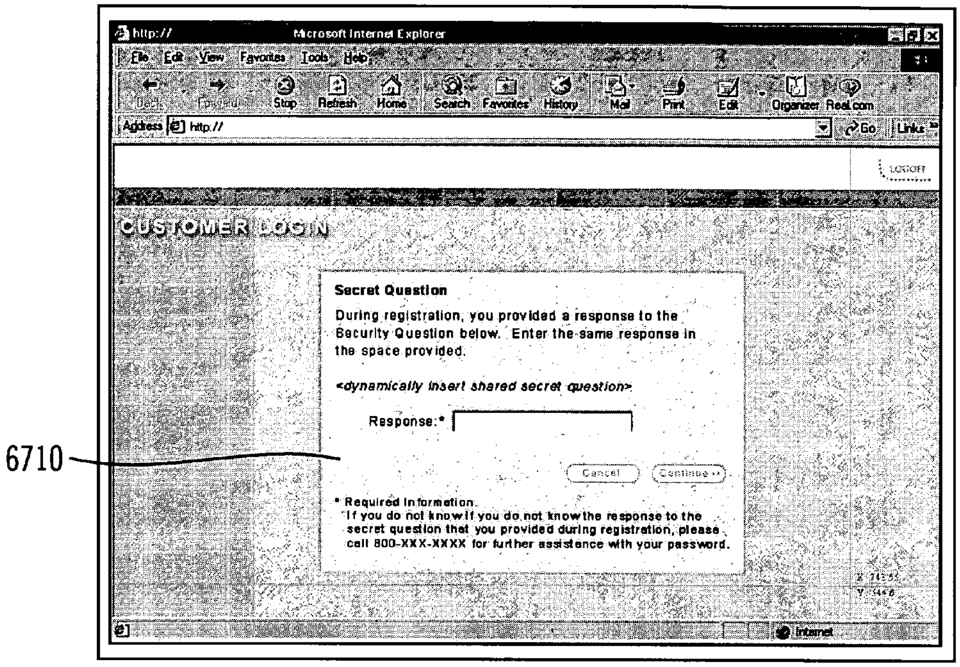
FIG. 67 illustrates a shared secret UI screen in accordance with certain implementations of the invention.

With reference to FIG. 67, the introductory text for the shared secret UI screen reads: "During registration, you provided a response to the Security Question below. Enter the same response in the space provided.". Th shared secret prompt is a dynamic text display area, in which the shared secret for the user is displayed. The secret is obtained from the server system at the enterprise spatial system, based upon the user ID information provided on the user ID UI screen. The Response edit box includes, for example, the following attributes: text reads "Response:*"; display length of the edit box shall be 25 characters; maximum length of customer input is 25 characters; minimum length of customer input is one character; supports alphanumeric values; is not case sensitive; is a required field; is always available to the user; and, has an initial focus when the shared secret UI screen is first presented to the user.

The Continue button includes, for example, the following attributes: standard control button attributes; button text reads, "continue"; and, button has a graphic arrow pointing to the right.

The Cancel button includes, for example, the following attributes: standard control button attributes and button text reads, "cancel".

In FIG. 67, if the user selects the continue button, a check is made to determine whether the user has input data into the Response edit field. If not, an error message is pushed to the top of the UI screen, with text reading, "You must provide a response to your Security Question in order to login to the enterprise spatial system. Provide your response and select "continue". If the Response edit box has been filled in, a check is made on the server system to make sure that the user has provided the correct response to the Security Question.

If the Response is not correct, the "number of answer shared secret attempts" counter is incremented by one. A check is made to determine whether the number of answer shared secret attempts is three (3) or more. If the number of answer shared secret attempts is not three (3) or more, then an error message is pushed to the top of the UI screen, with text reading, "The Response that you provided is incorrect. Please try again.". The Response edit box is cleared. If the number of login attempts is three (3) or more, then a user lockout will occur. This will lock the user out from further login attempts for a 24 hour period and push the lockout error message "Due to too many login attempt errors, this account cannot be accessed at this time. For security purposes, the account will be locked out for a 24 hour period. To remove this hold prior to the 24 hour period, call the enterprise spatial system customer support at <insert phone #>". This lock out will also trigger that an email be sent to the account owner notifying the owner of the situation. If the response is correct, the "answer shared secrets" counter is set to one.

If the user is a subscription customer and it is the user's first time ever logging into the enterprise spatial system, the user is advanced to the change password UI screen 6810, which is illustrated in FIG. 68 in accordance with certain implementations of the invention. If the user is not a subscription customer who is logging on for the first time, the user is logged into the enterprise spatial system, and advanced to the Welcome UI screen. If the user selects the cancel button, The user is taken to the cancel login UI screen.

The change password UI screen 6810 is designed to require subscription customers to change their password at first login. The reason to enforce this is for security purposes, since an enterprise spatial system representative created the user's original password.

In FIG. 68, the Password edit box includes, for example, the following attributes: text reads "Password:"; display length of the edit box shall be 25 characters; maximum length of customer input is 25 characters; minimum length of customer input is 6 characters; supports alphanumeric values; supports special characters "_, %, &, *, #, ', @"; is not case sensitive; text that is input is masked; the password that is input is not cached; is a required field; is always available to the user; and, has an initial focus when the UI screen is first presented to the user.

The Repeat Password edit box includes, for example, the following attributes: text reads "Repeat Password:"; display length of the edit box shall be 25 characters; maximum length of customer input is 25 characters; minimum length of customer input is 6 characters; supports alphanumeric values; supports special characters "_, %, &, *, #, ', @"; is not case sensitive; text that is input is masked; the repeat password that is input is not cached; is a required field; and, is always available to the user.

The Continue button includes, for example, the following attributes: standard control button attributes; button text reads, "continue"; and, the button has a graphic arrow pointing to the right.

The Cancel button includes, for example, the following attributes: standard control button attributes and button text reads, "cancel".

In FIG. 68, if the user selects the continue button, a check is made to determine whether the user has input data into all both of the required password edit boxes on the change password UI screen 6810. If not, an error message is pushed to the top of the UI screen, with text reading, "The following information is provided in order to complete registration with the enterprise spatial system: <cr> <insert names of all fields for which data is provided (and was not provided), in order based upon UI screen location from top to bottom with a <cr> between each field.".

A check is made to determine whether the minimum number of required characters for each field. If any of the fields have fewer characters than the required minimum, an error message is pushed to the top of the UI screen, with text reading "The <insert field name> requires at least <insert minimum number of characters> characters. Please provide a <insert field name> with at least <insert minimum number of characters> characters. If multiple fields have filed the minimum character check, then this message shall appear for each failure, separated by a <cr> and in the same order as their respective fields on the UI screen. The field is cleared.

If the Repeat Password edit box has been filled in, a check is made to determine whether its' character string matches exactly to the character string provided in the Password edit box. If the two fields do not match, an error message is pushed to the top of the UI screen, with text reading, "The Repeat Password did not match the original password that you provided. Please re-enter the Password and the Repeat Password." The Password edit box is cleared. The Repeat Password edit box is cleared. If all of the required conditions are met, then the user's password is updated on the server system at the enterprise spatial system. The user profile is retrieved from the server. The enterprise spatial system software is built based upon the user profile information. The user is logged into the enterprise spatial system, and advanced to the Welcome UI screen. If the user selects the cancel button, the user is taken to the cancel login UI screen.

The enterprise spatial system supports high level navigation. At a high level, the user interface of the enterprise spatial system is designed to put most of the power of the service into a "Main UI screen" that can branch off to complimentary UI screens when needed. More specifically, the Main UI screen covers the functionality that is common to all of the major task workflows within the application, including defining the AOI, selecting base imagery, selecting vector data layers, and more. Once a user indicates the specific workflow that is being undertaken, the application will branch off into UI screens that apply to that workflow.

Figure 69:
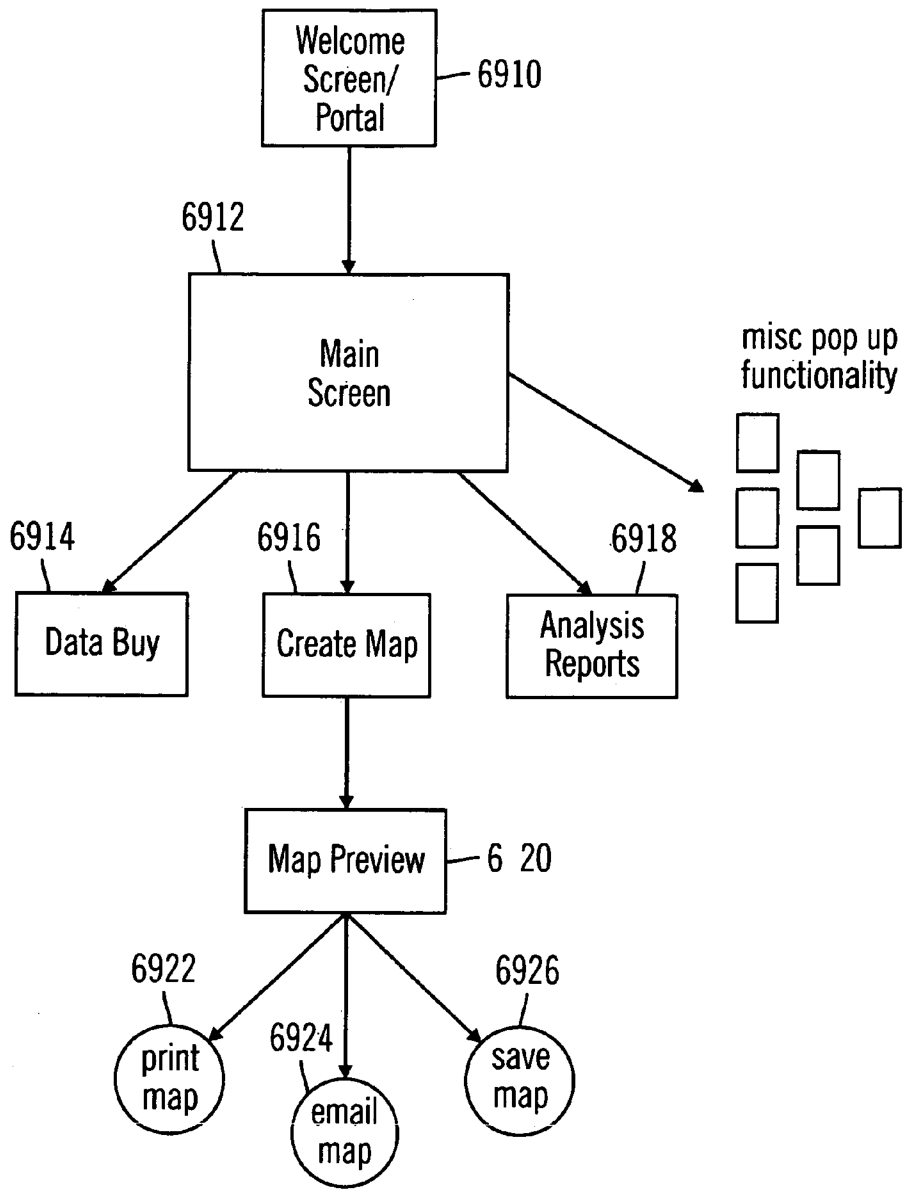
FIG. 69 illustrates conceptual logic for the main UI screen in accordance with certain implementations of the invention

FIG. 69 illustrates conceptual logic for the main UI screen in accordance with certain implementations of the invention. That is, FIG. 69 provides a logical overview of the high level navigation structure of the enterprise spatial system software. A Welcome UI screen (Portal) 6910 is displayed. From there, a user may navigate to a main UI screen 6912. From the main UI screen 6912, a user may select various functionality, such as data buy 6914, create map 6916, analysis reports 6918, or other functionality. From create map 6916, a user may select map preview 6920, and from map preview 6920, a user may select print map 6922, email map 6924, or save map 6926.

In terms of the Welcome UI screen (Portal), the enterprise spatial system provides the ability to be able to customize the enterprise spatial system experience to different customers. There are two components to this customization. The first is being able to create a unique portal that users of a company will pass through on their way to accessing the enterprise spatial system service and tools. The second is to ensure that the enterprise spatial system tools are configurable so that their look and feel can be changed depending on the user, and therefore the company, that is using the enterprise spatial system tools.

In terms of understanding the portal, a portal is a series of HTML pages that users first go through in order to access the enterprise spatial system service. Under the enterprise spatial system design, the portal displays different HTML pages depending on who the user is. This determination is made at the login stage, when the user first logs into the service. The portals are hosted by enterprise spatial system. The portal is built upon a number of frames, which are fluid and dynamic to account for changes in layout and content.

Figure 70:
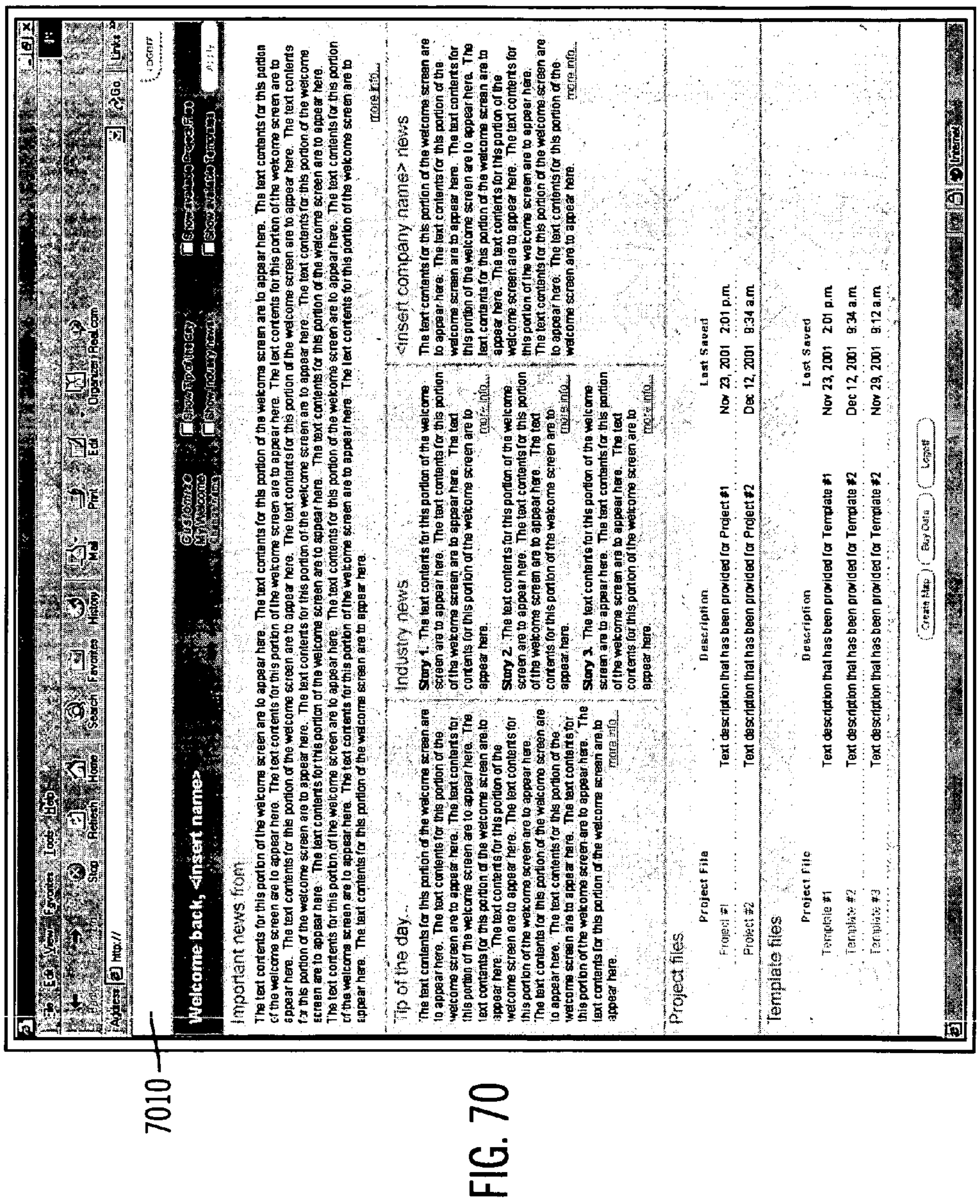
FIG. 70 illustrates sample portal content in accordance with certain implementations of the invention.

That is, the portal content is fluid and dynamic, so some content could change daily, some could change monthly. The portal content is customized to companies. FIG. 70 illustrates sample portal content 7010 in accordance with certain implementations of the invention.

In FIG. 70, the portal is composed of a number of frames, some single column, some multi-column. Each frame has information that can be served may be served by the enterprise spatial system, the company itself, or a third party, such as Reuters.

The portal may include a banner. The header is the top frame, which displays the company branding, in this case the enterprise spatial system logo, as well as, the ability to log off. In most cases this frame should reflect the design of the enterprise spatial system software itself.

The header is a frame that contains a dynamic tag that displays the user's full name. The header also has options for customizing the layout of the portal. The user is able to control what the user sees.

Enterprise spatial system news may be a section of the portal that contains information that is enterprise spatial system specific, such as new product updates, bug information, or up sell opportunities. This section may even be "empty" if there is no enterprise spatial system news, and may appear when needed. Under such a scenario, the layout engine is able to "show and hide" enterprise spatial system news, and adjust the layout of existing content where necessary.

The Tip of the Day is a common feature among many sites where tips are displayed to users helping them use both the product and the service. The tip of the day is generated by the enterprise spatial system, and a new tip is displayed each time the use refreshes the browser.

Industry News is an area on the page where news and events particular to the industry that the user and company operate in are displayed. In certain implementations, industry content is served via third parties tied to the portal vendor. For example, news information from Reuters about the Oil and Gas industry may be displayed.

Company News is an area set aside for the company to be able to communicate directly to staff. In certain implementations, the company is responsible for this content, but this may also require additional help on the enterprise spatial system services side. Each company assigns someone to author the content that appears in the company news area and that enterprise spatial system simply points to their URL from within the portal. This makes all management and review of the content the company's responsibility.

The Document Files section allows the enterprise spatial system to present to the user all the existing projects that the user has been working on, as well as any template/map service files. For most users, this is the fastest way to open a project and to begin working in the enterprise spatial system. By default this section is hidden from view. If the user wishes to always see these files, then the user can select to show the files by choosing the appropriate option under the "Customize My Page" section.

For the Launch buttons, one of the frames within the portal layout contains the buttons which access the enterprise spatial system service. The size, layout, and type of buttons will vary depending on customers. Also, buttons may be added or removed depending on user feedback and relevancy. For example, a button could say, "Click Here to Create Your First Map", or Click Here to Buy Data etc.

O. User Interface

Figure 71:
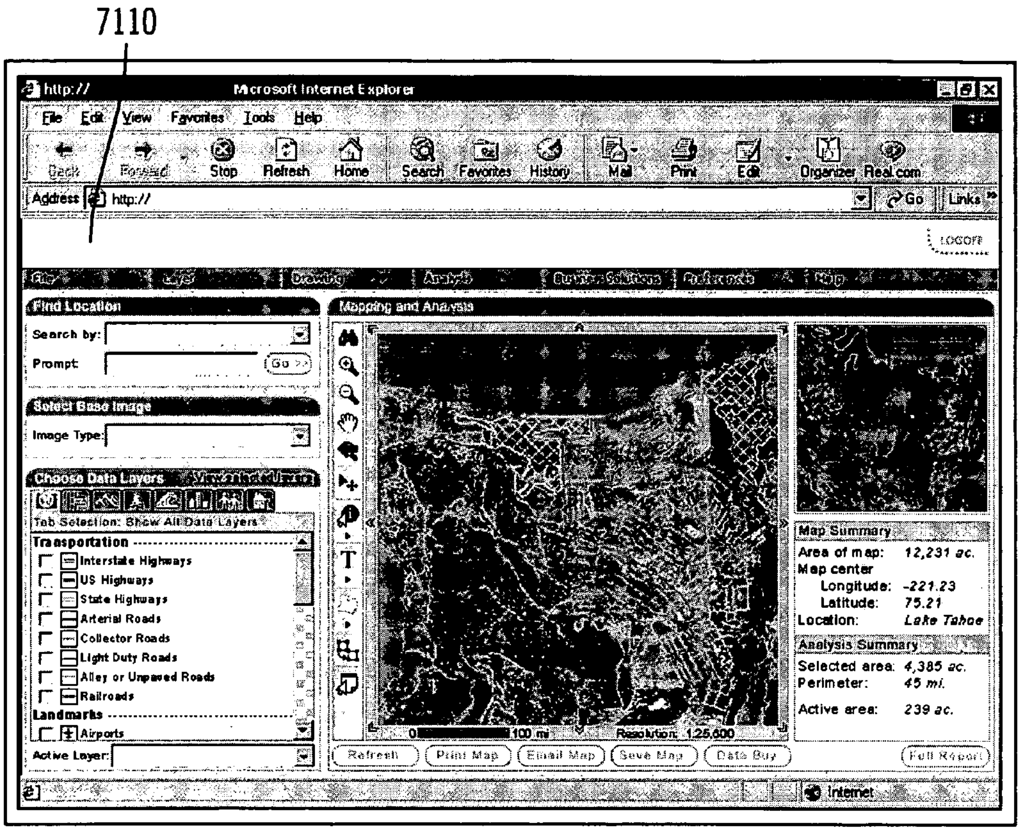
FIG. 71 illustrates a main UI screen in accordance with certain implementations of the invention.

Some of the functionality of the enterprise spatial system software is provided via a main UI screen. The main UI screen is the starting point for any task that the user may wish to undertake, providing the user with the core capabilities required in undertaking any process supported by the application, including: selecting an Area of Interest (AOI); previewing an Area of Interest; selecting base imagery; selecting data layers; and accessing summary information. In addition, the main UI screen provides access to the functionality through various tools in a toolbar, through the drop down menus, and through links to other UI screens. FIG. 71 illustrates a main UI screen 7110 in accordance with certain implementations of the invention.

Given the breadth of the functionality on the main UI screen, the specifications for the main UI screen are discussed one "section" of the main UI screen at a time. Additionally, some of the pop up dialog boxes that compliment the main UI screen will be described herein. Also, there are many menu commands available on the main UI screen.

Figure 72A:
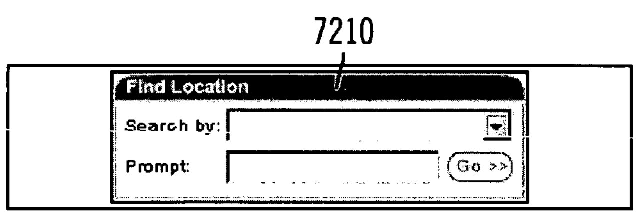
FIGS. 72A–72K illustrate details of a find location portion of the UI screen in accordance with certain implementations of the invention.

FIG. 72A illustrates a find location portion 7210 of the UI screen in accordance with certain implementations of the invention. In FIG. 72A, the Search by drop down box contains a list of Search Categories that are supported by the enterprise spatial system, presented to the user, and including, for example: Address, City, County, State, ZIP Code, Longitude/Latitude, USGS Map, Name of Place, and Previously Saved Area. Selection of one of the drop down list items is required, the drop down box is always available to the user, and the control has the initial focus when the user goes to the main UI screen.

The second control (or group of controls) in the find location portion of the main UI screen appear dynamically (and may be referred to as dynamic controls), based upon the user selection in the Search by drop down box. The dynamic control(s) appear in a dynamic control window, and are updated each time that a user makes a selection from the Search by drop down box.

Figure 72B:
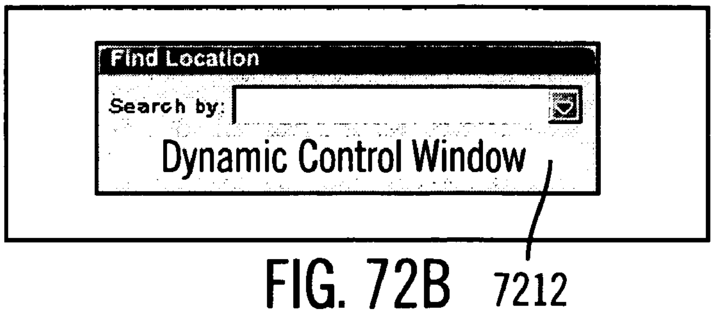

FIG. 72B illustrates a dynamic control window 7212 in accordance with certain implementations of the invention. The dynamic control window is where various controls are populated based upon the user's selection in the Search by drop down. This control is not visible to the user. The window is located directly below the Search by drop down. The size of the window is sufficient to accommodate all of the dynamic controls described herein.

Figure 72C:
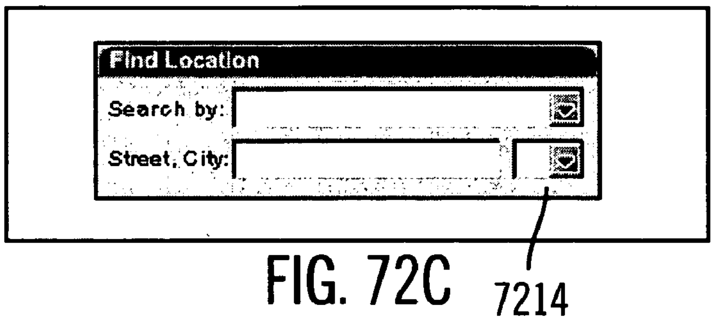

FIG. 72C illustrates address controls 7214 in accordance with certain implementations of the invention. The address controls 7214 include, for example, the following attributes: the text reads "Street, City:" and the address controls 7214 consist of two separate controls, with the first control being an edit box and the second control being a drop down control. The second control includes, for example, the following attributes: text reads "State:"; display length of the edit box is 2 characters; the drop down list contains a full list of abbreviates for states; and, this field is available to the user only when the user has selected "State" from the Search by drop down box. When the drop down list is available, selection of one of the state abbreviations is required. This field is available to the user only when the user has selected "Longitude/Latitude" from the Search by drop down box.

Figure 72D:
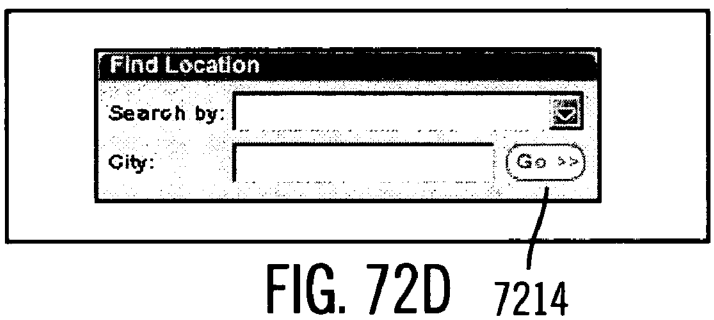

FIG. 72D illustrates a city edit box 7215 in accordance with certain implementations of the invention. This field is available to the user only when the user has selected "City" from the Search by drop down box. When this field is available, this field is a required field. The city edit box 7215 Is used in conjunction with a Go button.

Figure 72E:
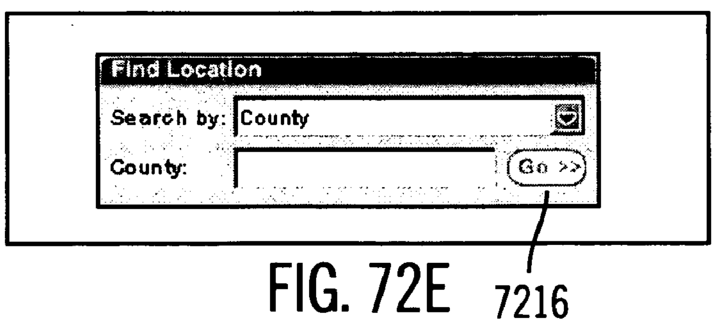

FIG. 72E illustrates a county edit box 7216 in accordance with certain implementations of the invention. This field is available to the user only when the user has selected "County" from the Search by drop down box. When this field is available, this field is a required field. The county edit box 7216 Is used in conjunction with the Go button.

Figure 72F:
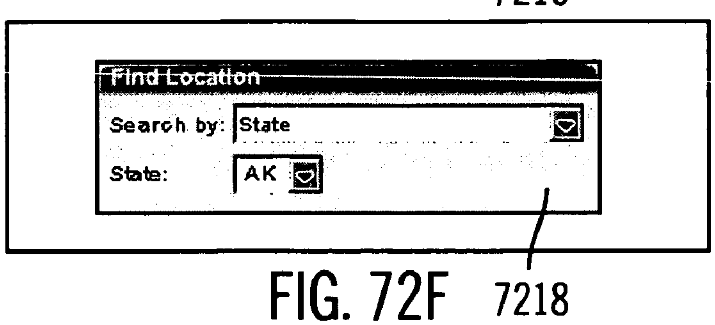

FIG. 72F illustrates a state drop down box 7218 in accordance with certain implementations of the invention. This field is available to the user only when the user has selected "State" from the Search by drop down box. When this drop down is available, selection of one of the state abbreviations is required.

Figure 72G:
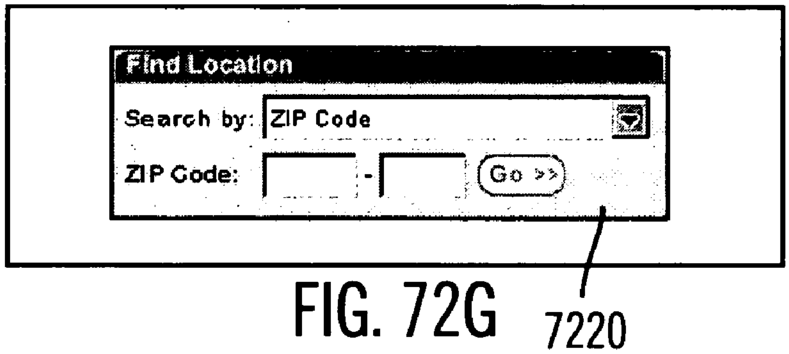

FIG. 72G illustrates ZIP code edit boxes 7220 in accordance with certain implementations of the invention. The Zip code edit boxes consist of 2 separate edit boxes. The first edit box has, for example, the following attributes: this field is available to the user only when the user has selected "ZIP Code" from the Search by drop down box and when this field is available, this field is a required field. The second edit box has, for example, the following attributes: this field is available to the user only when the user has selected "ZIP Code" from the Search by drop down box and this field is not a required field.

Figure 72H:
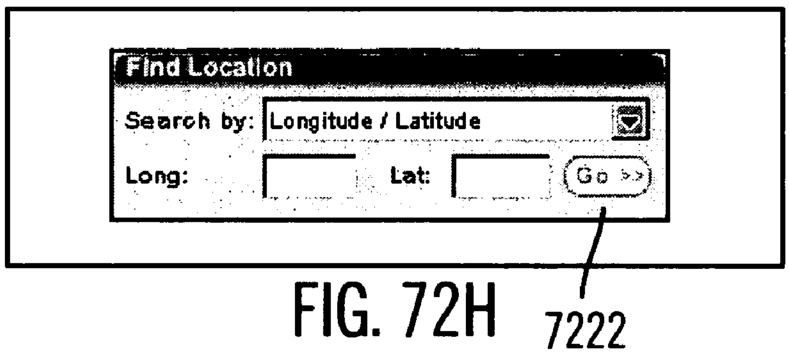

FIG. 72H illustrates longitude/latitude edit boxes 7222 in accordance with certain implementations of the invention. The longitude/latitude edit boxes consist of 2 separate edit boxes. The first edit box has, for example, the following attributes: this field is available to the user only when the user has selected "Longitude/Latitude" from the Search by drop down box and, when this field is available, this field is a required field. The second edit box has, for example, the following attributes: when this field is available, this field is a required field. In between the first and second edit boxes, "Lat:" is displayed. These controls are used in conjunction with the Go button.

Figure 72I:
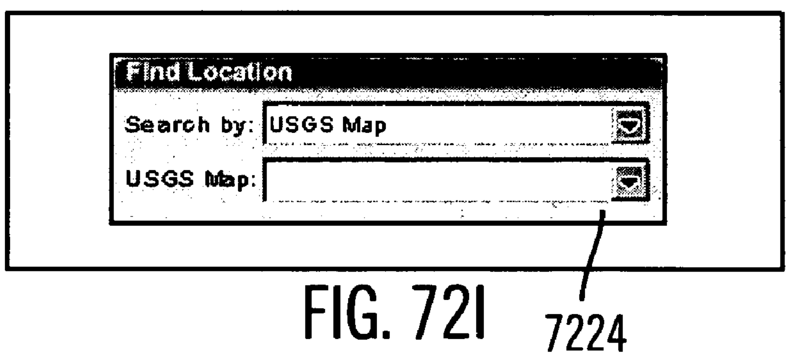

FIG. 72I illustrates a USGS drop down 7224 in accordance with certain implementations of the invention. The USGS drop down 7224 includes, for example, the following attributes: text reads "USGS Map:*"; display length of the drop box is 25 characters; the drop down list contains the complete list of USGS Maps that are available; this field is available to the user only when the user has selected "USGS Map" from the Search by drop down box; when this drop down control is available, selection of one of the maps is required.

Figure 72J:
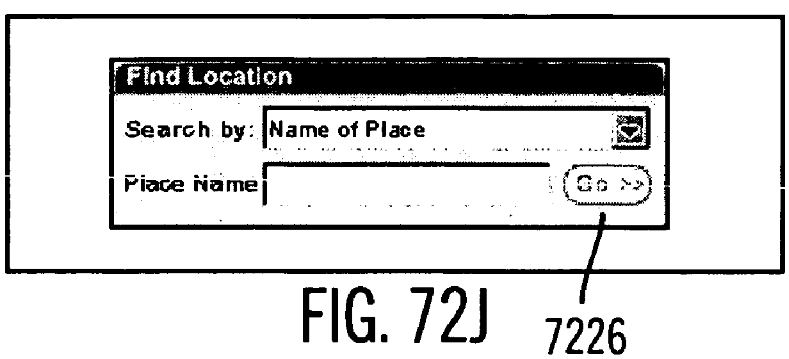

FIG. 72J illustrates a name of place edit box 7226 in accordance with certain implementations of the invention. The name of place edit box 7226 includes, for example, the following attributes: this field is available to the user only when the user has selected "Name of Place" from the Search by drop down box; when this field is available, this field is a required field; this field is used in conjunction with the Go button.

Figure 72K:
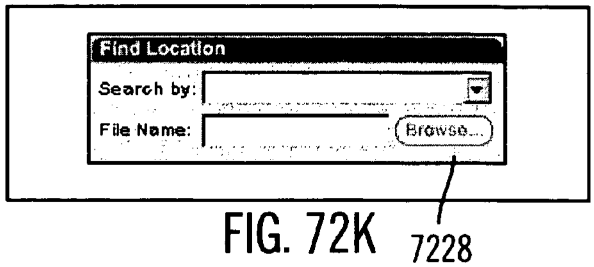

FIG. 72K illustrates a previously saved area edit box 7228 in accordance with certain implementations of the invention. The previously saved edit box includes, for example, the following attributes: this field is available to the user only when the user has selected "Name of Place" from the Search by drop down box; when this field is available, this field is a required field; and the field can be completed by typing in a path and file name, or by browsing to select the file.

The Go button's attributes are standard for control buttons, except that the width of the Go button is 38 pixels. The button text reads, "Go>>". As for the Browse button, all of the Go button's attributes are standard for control buttons, except that the width of the Browse button is 57 pixels. The button text reads, "Browse . . . ".

If the user selects "Address" from the Search by drop down box, the address controls are presented. If a selection is made from the Address controls drop down box, a check is made to determine whether any value was entered into the Street and City edit box. If yes, the format is checked to ensure that the entry is in the form "street address, city". If yes, processing continues. If no, a pop up message appears with the message, "The address has been entered in an invalid format. The address needs to appear in the format 'Street Address, City'." Upon closing the pop up message, the Street Address and City field is cleared.

Figure 73:
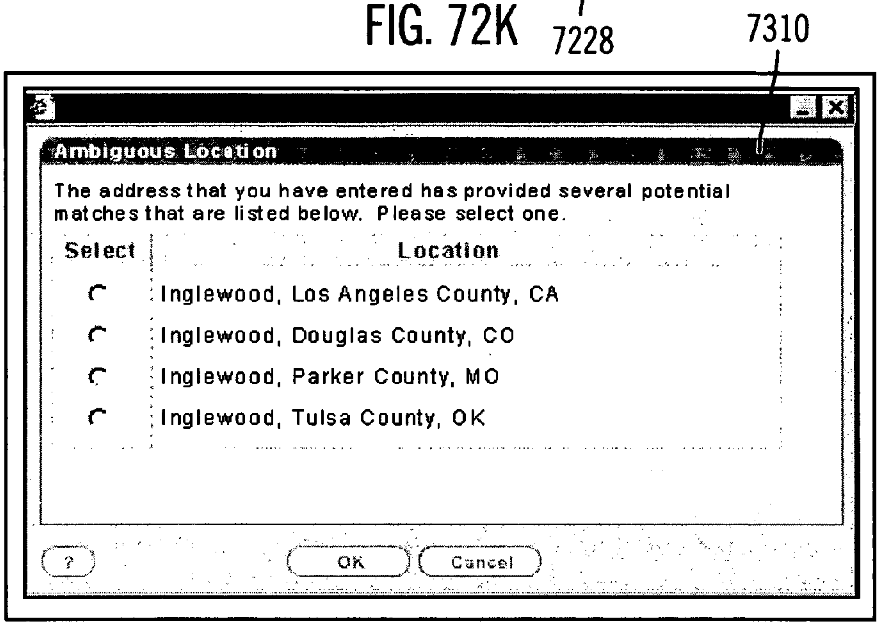
FIG. 73 illustrates an Ambiguous Location pop up dialog box 7310 without a scroll bar in accordance with certain implementations of the invention.
Figure 74:
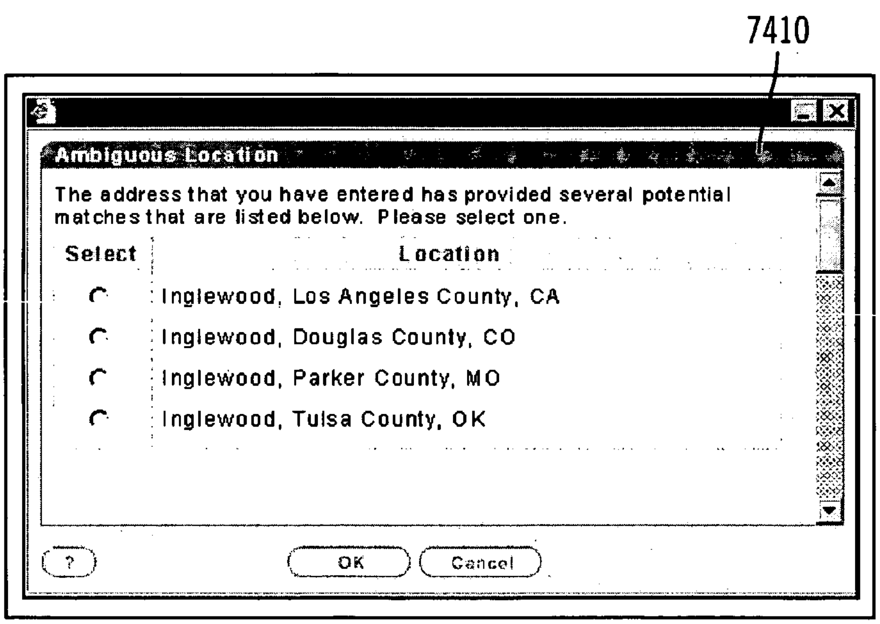
FIG. 74 illustrates an Ambiguous Location pop up dialog box with a scroll bar in accordance with certain implementations of the invention.

If all of the required conditions are met, then, the Area of Interest that the user is attempting to define is determined by checking for a match to the address location provided. If a single match is found, then the center point of the AOI is the street address location. The AOI is defined by the smallest square that envelops a 2 mile buffered area around the street address. If no exact matches are found, but multiple possible matches have been found, then the Ambiguous Location pop up dialog box is displayed. FIG. 73 illustrates an Ambiguous Location pop up dialog box 7310 without a scroll bar and FIG. 74 illustrates an Ambiguous Location pop up dialog box 7410 with a scroll bar in accordance with certain implementations of the invention. If no possible matches are found, the Area of Interest location is defined by the state provided, with the minimum size required to envelop the entire state. A pop up error message appears, with text reading, "The location entered could not be found. The map has been centered on the state provided.".

If a location is determined, the map for the specified location is retrieved. If not, then the Area of Interest location is defined by the state provided, with the minimum size required to envelop the entire state. The Map window is refreshed with the map.

If the user selects "City" from the Search by drop down box, the City edit box is presented and the Go button is made available. If the user selects the Go button, a check is made to determine whether input has been provided into the City edit box. If yes, processing continues. If no, a pop up message appears with the message, "You must enter the name of the city before the search can begin." A check is made to determine whether a sufficient number of characters have been provided. If yes, processing continues. If no, a pop up error message appears, with text reading "The city name requires the input of at least 2 characters. Please provide the city name again." Then, the field is cleared.

If all of the required conditions are met, then, the Area of Interest that the user is attempting to define is determined by checking for a match to the city location provided. If a single match is found, then the AOI is defined by the smallest square that envelops the entire city. If no exact matches are found, but multiple possible matches have been found, then the Ambiguous Location pop up dialog box is displayed. If no possible matches are found, a pop up error message appears, with text reading, "The location entered could not be found with the information provided. Please try again.". If a location is determined, the map for the specified location is retrieved. The Map window is refreshed with the map.

If the user selects "County" from the Search by drop down box, the County edit box is presented. The Go button is made available. If the user selects the Go button, a check is made to determine whether input has been provided into the County edit box. If yes, processing continues. If no, a pop up message appears with the message, "You must enter the name of the county before the search can begin.".

A check is made to determine whether a sufficient number of characters have been provided. If yes, processing continues. If no, a pop up error message appears, with text reading "The county name requires the input of at least 2 characters. Please provide the county name again.". The field is cleared.

If all of the required conditions are met, then, the Area of Interest that the user is attempting to define is determined by checking for a match to the county location provided. If a single match is found, then the AOI is defined by the smallest square that envelops the entire county. If no exact matches are found, but multiple possible matches have been found, then the Ambiguous Location pop up dialog box is displayed. If no possible matches are found, a pop up error message appears, with text reading, "The location entered could not be found with the information provided. Please try again.".

If a location is determined, the map for the specified location is retrieved. The Map window is refreshed with the map.

If the user selects "State" from the Search by drop down box, the State drop down is presented. If the user selects a state from the drop down list, the AOI is defined by the smallest square that envelops the entire state selected by the user. The Map window is refreshed with the map.

If the user selects "ZIP Code" from the Search by drop down box, the ZIP Code edit boxes are presented. The Go button is made available. If the user selects the Go button, a check is made to determine whether input has been provided into the first ZIP Code edit box. If yes, processing continues. If no, a pop up message appears with the message, "You must enter the 5 digit ZIP code before the search can begin."

A check is made to determine whether exactly 5 characters have been provided in the first edit box. If yes, processing continues. If no, a pop up error message appears, with text reading "The ZIP Code search requires that you provide the first 5 digits of the ZIP Code. Please provide the ZIP Code information again." The field is cleared.

A check is made to determine whether the ZIP 5 entry is on the list of valid ZIP codes. If yes, processing continues. If no, a pop up error message appears, with text reading, "The ZIP Code entered could not be found. Please try again.".

If all of the above conditions are met, then the AOI can be defined by the smallest square that envelops the entire ZIP Code (ZIP 5). However, if the user provides a valid +4 to the ZIP, the AOI is refined even further. A check is made if the user has provided any input into the second ZIP Code edit box (i.e. the +4 field). If yes, it is determined if this is a valid +4 for the ZIP Code provided. If yes, the AOI can be defined by the smallest square that envelops the entire ZIP Code (ZIP +4). If no, the AOI for the ZIP 5 is used and an error message is not shown to the user. The map for the specified AOI is retrieved. The Map window is refreshed with the map.

If the user selects "Longitude/Latitude" from the Search by drop down box, the Longitude/Latitude edit boxes are presented. The Go button is made available. If the user selects the Go button, a check is made to determine whether input has been provided into both edit boxes. If yes, processing continues. If no, a pop up message appears with the message, "You must enter both the Longitude and the Latitude before the search can begin."

A check is made to determine whether the format of both the Longitude and the Latitude that the user input is correct.

A check is made to determine whether the first character in both edit boxes is either a numeric value, a "–" sign, or a "+" sign. A check is made to determine whether exactly one "." character appears within the input in both edit boxes. A check is made to determine whether exactly 4 numeric values appear after the "." character. A check is made to determine whether at least 7 characters have been entered. A check is made to determine whether a maximum of 9 characters have been entered. A check is made to determine whether both entries are within the valid range of Longitude and latitude entries. If all of these checks hold true, then processing continues. If the input does not pass any of these checks, a pop up message appears with the message, "The format of the Longitude and Latitude must be in the format '+/– degrees, minutes, seconds'. For example, +33.5458 and –117.7027. For Longitude, East is positive. For Latitude, North is positive. Please enter the Longitude and Latitude in this format."

If the previous checks hold true, then the AOI is determined. The center point of the AOI is the Longitude and Latitude location that the user has provided. The AOI is defined by the smallest square that envelops a 5 mile buffered area around this center point. The map for the specified AOI is retrieved. The Map window is refreshed with the map.

If the user selects "USGS Map" from the Search by drop down box, the USGS Map drop down is presented. If the user selects a map from the drop down list, the AOI is that of the USGS map. The Map window is refreshed with the map.

If the user selects "Name of Place " from the Search by drop down box, the Name of Place edit box is presented. The Go button is made available. If the user selects the Go button, a check is made to determine whether input has been provided into the Name of Place edit box. If yes, processing continues. If no, a pop up message appears with the message, "You must enter the name of the place before the search can begin."

A check is made to determine whether a sufficient number of characters have been provided. If yes, processing continues. If no, a pop up error message appears, with text reading "The place name requires the input of at least 2 characters. Please provide the name of the place again. The field is cleared.

If all of the required conditions are met, then, the Area of Interest that the user is attempting to define is determined by checking for a match to the name of the place provided. If a single match is found, then the center point of the AOI is the location of the place that the user has provided. The AOI is defined by the smallest square that envelops a 5 mile buffered area around this center point. If no exact matches are found, but multiple possible matches have been found, then the Ambiguous Location pop up dialog box is displayed. If no possible matches are found, a pop up error message appears, with text reading, "The location entered could not be found with the information provided. Please try again.".

If a location is determined, the map for the specified location is retrieved. The Map window is refreshed with the map.

If the user selects "previously saved AOI" from the Search by drop down box, the Previously Saved Area edit box is presented. The Browse button is presented, to the right of the Previously Saved Area edit box. The right edge of the Browse button is right aligned with the right edge of the Search by drop down. If the cursor is the in the Previously Saved Area edit box and the user selects the enter key (i.e. indicating that the user has entered the file name), a check is made to determine whether a valid file name (for an enterprise spatial system AOI file) have been entered. If yes, the AOI file is opened, and the Map window is refreshed with the new AOI. If no, a pop up message appears with the message, "A valid Area of Interest was not entered. <cr> You must enter a valid Area of Interest (AOI) file to search for an area in this manner. Either type in a valid AOI file, select the browse button to select the file, or select another way to search for the desired Area of Interest." If the Browse button is selected, the Open AOI dialog box appears.

Figure 75:
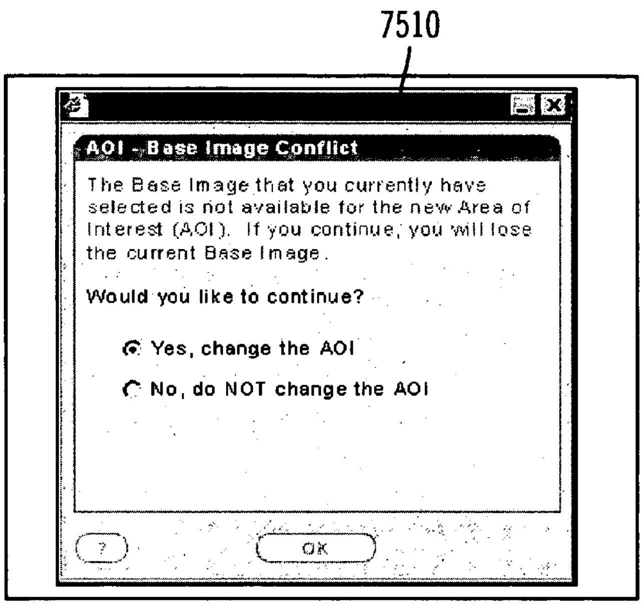
FIG. 75 illustrates a Base Image Conflict pop up dialog box in accordance with certain implementations of the invention.

In any of these cases where the AOI is going to be updated, a check is made whether or not the updated AOI has support for the base image that is currently selected. If the base image is not available for the new AOI, then the AOI—Base Image Conflict pop up appears. FIG. 75 illustrates a Base Image Conflict pop up dialog box 7510 in accordance with certain implementations of the invention. If the user selects to change the AOI, then the Map window is refreshed with the new AOI and reversion to "none" as the Base Image selection is done. If the user chooses to keep the Base Image, the AOI is not updated. If the Base Image is available, the Map window is refreshed with the new AOI.

The Ambiguous Location pop up dialog box 7310 is used when multiple possible location matches are found using the information that the user has input into the Find Location by Address, Find Location by City, or Find Location by County controls. This UI screen allows the user to select from the list of possible locations, providing the enterprise spatial system with the user's intended Area of Interest.

The Ambiguous Location pop up dialog box 7310 meets the standard guidelines for the use of pop up dialog boxes. The pop up is a large pop up dialog box. The pop up appears centered in the work area of the main enterprise spatial system software. For the Title, text reads, "Ambiguous Location" and font is bold. The introductory text for this pop up dialog box is: "The location provided has the following close matches. Please select one."

The Grid Control has standard grid control attributes. The Grid Control is left aligned with both the section title and the introductory text, is located immediately following the introductory text display, consists of two columns (a select column and a location column), and has grid rows. For the Select Column, the column header reads, "Select"; the column width is sufficient to fit the text "Select" with a blank space before and after the text; and, the column contains radio button controls, allowing the user to select only one of the locations that are presented in the grid display. If the user selects a second radio button, then the first radio button that was selected becomes deselected.

For the Location Column, the header for this column reads, "Location"; the width of this column is approximately 385 pixels; and, the cells within this column is populated with the various possible location matches that the enterprise spatial system found. In the case in which the user has entered an address, the cell contains the street address, city, and state for the possible match. In the case in which the user has entered a city, the cell displays the city, county and state for the possible match. In the case in which the user has entered a county, the cell will display the county and state for the possible match. In the case in which the user has entered a place, the cell will display the place name, the county and state for the possible match.

As for Grid Rows, there are as many rows included in the grid display as potential location matches that were found; the row height is determined by the number of lines of data that are displayed in a given row; and, if the number of rows exceeds the number that can be displayed within the work area of the pop up dialog box, then a scroll bar will allow for scrolling of the grid control as shown in FIG. 74.

In FIG. 74, if the user selects the OK button, a check is made to determine whether the user has selected one of the radio buttons from within the grid control. If a radio button was not selected, an error message is pushed to the top of the pop up, with text reading, "You need to provide the best fit location for your area of Interest (AOI). If none of the selections below match your location, select the cancel button and try again." If a radio button was selected, the user's selected location choice is determined by finding the radio button that was selected, and then finding the location associated with that radio button. The selected location is used to define the Area of Interest. If the ambiguous location is an address, the center point of the AOI is the street address location. The AOI is defined by the smallest square that envelops a 2 mile buffered area around the street address. If the ambiguous location is a city, the AOI is defined by the smallest square that envelops the entire city. If the ambiguous location is a county, the AOI is defined by the smallest square that envelops the entire county. If the ambiguous location is a place, then the center point of the AOI is the location of the place that the user has provided. The AOI is defined by the smallest square that envelops a 5 mile buffered area around this center point. The pop up dialog box is closed. The Map window is refreshed with the new AOI on the UI screen from which the Ambiguous Location pop up was launched.

If the user selects the cancel button, the pop up dialog box is closed. If the ambiguous location is an address, the Area of Interest location is defined by the state provided, with the minimum size required to envelop the entire state. A pop up error message appears, with text reading, "An address was not selected. The map has been centered on the state provided." The Map window is refreshed with the new AOI. If the ambiguous location is a city, county, or place, the Area of Interest cannot be determined. A pop up error message appears, with text reading, "The location entered could not be found with the information provided. Please try again.".

The Base Image Conflict pop up dialog box 7510 illustrated in FIG. 75 is used whenever the user has indicated a desire to change the AOI, but the new AOI does not support the Base Image. This dialog box allows the user to decide whether to change the AOI (and lose the Base Image) or keep the Base Image (and lose the changes to the AOI).

In FIG. 75, the pop up dialog box meets the standard guidelines for the use of pop up dialog boxes. The pop up is a small Pop up dialog box. The pop up appears centered in the work area of the main enterprise spatial system software.

Radio buttons present the user with options on how to proceed, given the conflict. The radio buttons are standard in functionality. The list of button choices includes, for example: Yes, change the AOI; and, No, do not change the AOI. The default selection is Yes, change the AOI. The text descriptions are located below the radio button graphic. The Ok button has standard control button attributes and the button text reads, "Ok".

In FIG. 75, if the user selects the help button, the help page that provides online help pertaining to this UI screen appears in a pop up format. If the user selects the OK button, if the "Yes, change the AOI" radio button is selected, the pop up is closed. The AOI is updated according to the command that originally invoked this dialog box. The Map window is refreshed. Reversion to "none" as the Base Image type is performed. If the "No, do not change the AOI" radio button is selected, the pop up is closed and the AOI is not updated in the manner that invoked this dialog box.

Figure 76:
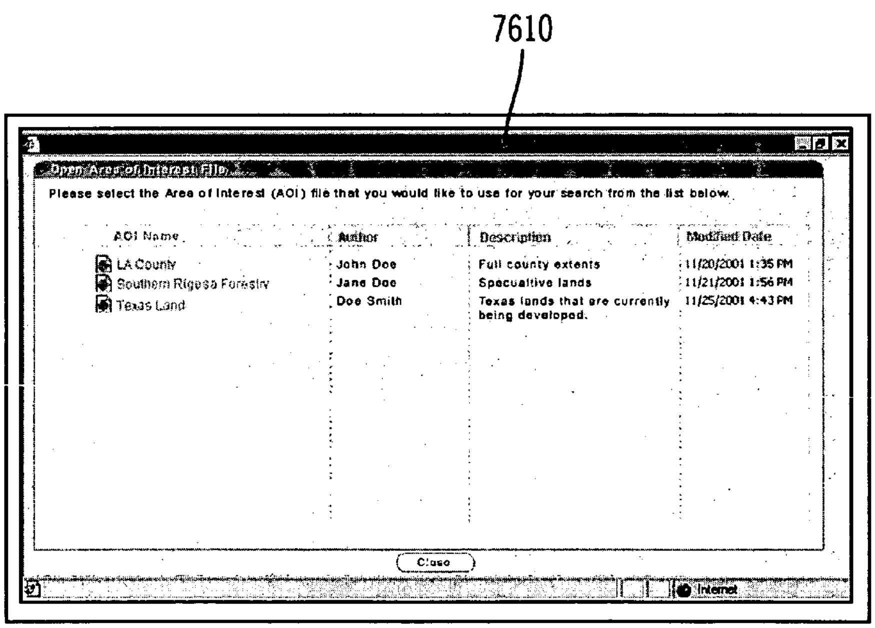
FIG. 76 illustrates an Open AOI File dialog box in accordance with certain implementations of the invention.

FIG. 76 illustrates an Open AOI File dialog box 7610 in accordance with certain implementations of the invention. The pop up dialog box meets the standard guidelines for the use of pop up dialog boxes. The pop up is custom sized. The width is 760 pixels The height is 440 pixels. The pop up appears centered in the work area of the main enterprise spatial system software.

The Open File Control Frame uses standard control frame properties. The frame header reads "Open Area of Interest File". The introductory text reads "Please select the area of Interest (AOI) file that you would like to use for your search from the list below."

The Document Grid Control consists of 4 columns. For Column 1, the column header reads: "AOI Name", and this column displays the hyperlinked name of existing Areas of Interest that are available to the user. For Column 2, the column header reads "Author" and this column displays the fill name of the author of the project. For Column 3, the column header reads "Description" and this column displays any annotated description of the project. For Column 4, the column header reads "Modified Date" and this column displays the date when the document was last modified. This grid is scrollable. There is a Back button at the bottom left of the UI screen.

In FIG. 76, when this UI screen is called, the name and details of for each available AOI are dynamically displayed. Each name is hyperlinked to respective AOI details. If the user clicks the AOI Name, the documents are sorted by AOI Name. If the user clicks the Author title, the projects are sorted by Author. If the user clicks the Description title, the projects are sorted by description. If the user clicks the Modified Date title, the projects are sorted by Modified Date. If the user clicks the name of an AOI, the AOI becomes the selected one. If the user clicks the close button, the pop up window is closed.

Figure 77:
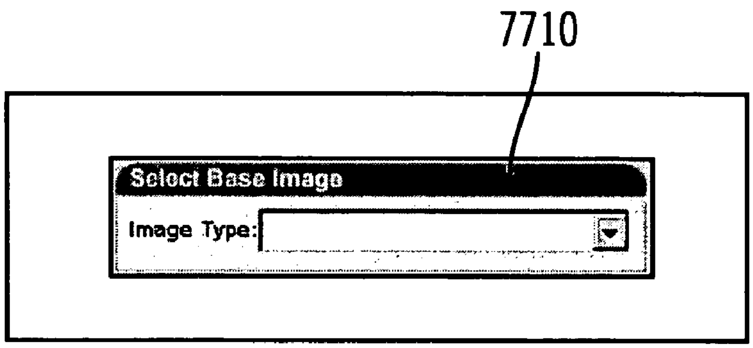
FIG. 77 illustrates a Select Base Image portion of the main UI screen in accordance with certain implementations of the invention.

FIG. 77 illustrates a Select Base Image portion 7710 of the main UI screen in accordance with certain implementations of the invention. This portion of the Main UI screen allows users to select the base map to be used. The base image coverage offered by the enterprise spatial system varies depending upon the AOI, so the Base Image controls are linked to the AOI provided by the user. Based upon the Area of Interest provided by the user, the enterprise spatial system software determines which base maps are available for the specified AOI, and only those images are available as options for selection. Before the user ever selects a base image from the base image drop down control, a default map graphic is displayed within the Map window. This is a type of map that the enterprise spatial system has nationwide access to and will provide the user with context as the user navigates to the desired AOI, without forcing the user to select a base image (i.e., some users will not want a base image, for example if the users are downloading data).

As for the Base Map drop down, the listing within the drop down is dynamic, and is directly impacted by the Area of Interest that the customer has selected on Online Mapping UI screens. All of the base maps that are available for the user's entire AOI are available as selections. Those base maps that are not available for the user's entire AOI are not available as selections. "None" is an available selection and is the default selection. Selection of the "None" option leaves a vector based map representation as the base layer. This field is always available to the user. Selection of one of the Base Image maps is not required.

In FIG. 77, upon selection of the down arrow on the drop down box, the enterprise spatial system software checks for which base images are available for the current AOI. A list of these base images appear in the drop down list. If the user selects one of the available options from the Base Image drop down box, the desired base map as indicated by the user's selection is retrieved. The portion of the base map that is defined by the location of the user's Area of Interest is displayed within the Map window.

Figure 78:
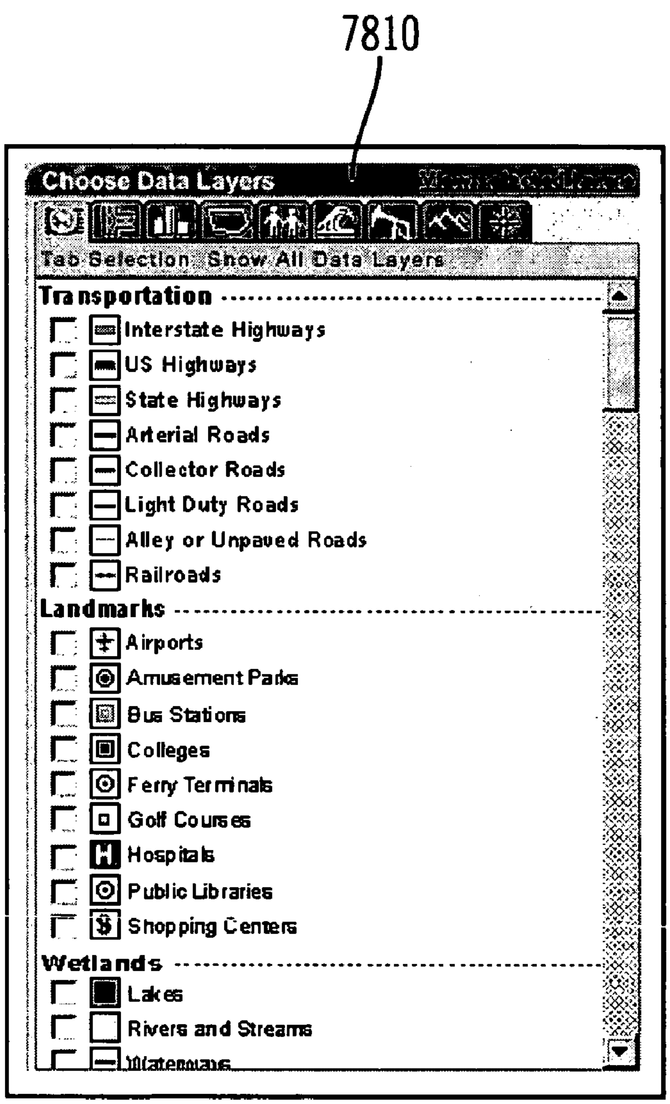
FIG. 78 illustrates a Data Layers UI screen in accordance with certain implementations of the invention.

FIG. 78 illustrates a Data Layers UI screen 7810 in accordance with certain implementations of the invention. The Data Layers UI screen 7810 allows users to select one or more data layers to layer on top of the base map. Based upon the Area of Interest and the base map selected by the user, the enterprise spatial system software will determine which layers are available for overlay. Only those data layers are available as options within this control.

Figure 79:
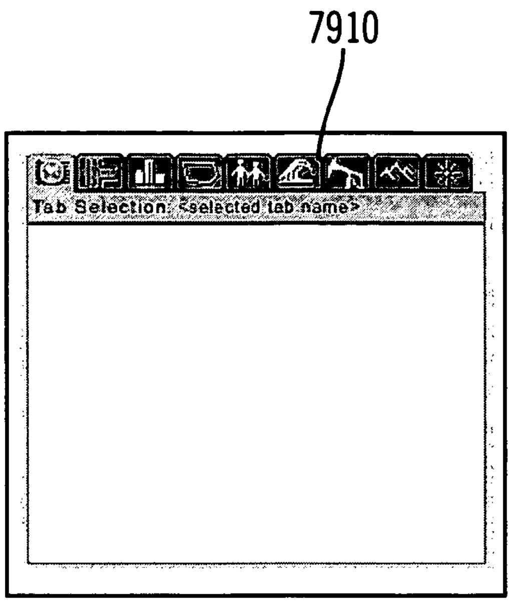
FIG. 79 illustrates custom tab navigation control in accordance with certain implementations of the invention.

In terms of customer data, depending upon who the enterprise spatial system customer (e.g., partner) is, the customer may be allowed to add corporate GIS data into the enterprise spatial system. For users who wish to integrate their own data into the enterprise spatial system software, the enterprise spatial system provides, in certain implementations, a technique by which the data may be brought into the back end. In certain implementations, data is input into the enterprise spatial system using other techniques. In certain implementations, a user interface that automates the process of integrating enterprise data and that allows the user to upload data from their system directly into the enterprise spatial system back end is provided. Additionally, the enterprise spatial system provides secure access to the enterprise data. The data that corporations will provide is often highly sensitive, and the enterprise spatial system ensures that only those who should have access to the data get access to it. The enterprise spatial system also integrates the selection of the enterprise data layers into the enterprise spatial system user interface. Enterprise data layers appear in the same area as enterprise spatial system data layers. However, when enterprise data layers are present, an additional tab category will exist that contains the enterprise data. This is the enterprise data category, and is located immediately to the right of the show all categories tab. In addition, within an "all categories" tab, the enterprise data is the first section of data to be displayed. FIG. 79 illustrates custom tab navigation control 7910 in accordance with certain implementations of the invention. The custom tab navigation control is part of the Data Layers UI screen 7810.

The Data Layers section of the Main UI screen provides the user with a selection of available data layers for selection. Since there may be many data layers to choose from within the enterprise spatial system software, and limited space to display these layers to the user, the layers may be organized into smaller categories. Custom tab controls are used to allow the user to view the data layers one category at a time, in order to minimize scrolling to see the layers.

A Show all categories tab is the first tab available, is selected by default, and has a title area with "Tab Selection: Show All Data Layers". The tool tip for this tab reads: "All Data Categories".

A Enterprise data tab (not shown in FIG. 79) is available if the corporate customer has arranged with the enterprise spatial system to integrate their own data with the enterprise spatial system's data. When available, this tab appears immediately to the right of the Show all categories tab. The title to appear in this tab's title area is "Tab Selection: <insert title provided by corporation>". The tool tip for this tab reads, "<insert tip provided by the partner>".

For a Transportation tab, the location of this tab depends upon whether or not a enterprise data tab is present. If a enterprise data tab is present, then this tab appears immediately to the right of the enterprise data tab. If a enterprise data tab is not present, then this tab appears immediately to the right of the Show all categories tab. The title to appear in this tab's title area is "Tab Selection: Transportation". The tool tip for this tab reads, "Transportation".

A Landmarks tab appears immediately to the right of the Transportation tab. The title to appear in this tab's title area is "Tab Selection: Landmarks". The tool tip for this tab reads, "Landmarks".

A Boundaries tab appears immediately to the right of the Landmarks tab. The title to appear in this tab's title area is "Tab Selection: Boundaries". The tool tip for this tab reads, "Boundaries".

A Demographics tab appears immediately to the right of the Boundaries tab. The title to appear in this tab's title area is "Tab Selection: Demographics". The tool tip for this tab reads, "Demographics".

A Water tab appears immediately to the right of the Demographics tab. The title to appear in this tab's title area is "Tab Selection: Water Data". The tool tip for this tab reads, "Water Data".

An Infrastructure tab appears immediately to the right of the Water tab. The title to appear in this tab's title area is "Tab Selection: Infrastructure". The tool tip for this tab reads, "Infrastructure".

An Environmental tab appears immediately to the right of the Infrastructure tab. The title to appear in this tab's title area is "Tab Selection: Environmental". The tool tip for this tab reads, "Environmental".

A Favorites tab appears immediately to the right of the Environmental tab. The title to appear in this tab's title area is "Tab Selection: Favorites". The tool tip for this tab reads, "Favorites".

An Edit Favorites hyperlink has standard hyperlink attributes. The hyperlink is located to the right of the title within the Favorites tab, and button text reads, "Edit Favorites".

A View Selected Layers hyperlink has standard hyperlink attributes, and button text reads, "View Selected Layers".

A Data Layer check boxes control group consists of multiple check box controls. Each check box control corresponds to a data layer that is available for selection by the user. These check boxes are standard in functionality. The listing of the check boxes is dynamic, and is directly impacted by the Area of Interest that the customer has selected and the base map that the user has selected. The data layers shall consist of vector-based graphics. All of the data layers that are available for the user's entire AOI and for the selected base map are available as check box selections. Those data layers that are not available for the user's entire AOI are not available as check boxes and are grayed out. Those data layers that are not available for the user's base map are not available as check boxes and are grayed out.

The check boxes are organized on the UI screen as follows: the check box controls are organized into main categories of data layer types. These categories are provided below. Each category has a one-to-one correspondence with a tab in the custom tab control. All categories of data layers are displayed within the All Layers tab. Within each tab, the check boxes are arranged into a single column. The location of the column is as follows: left justified and indented approximately 5 pixels from the left edge of the tab control window. In the "All Layers" tab, check box controls begin immediately beneath the appropriate functional area title text. In all other tabs, check box controls appear such that the top edge of the first check box is approximately 5 pixels from the top of the custom tab window. Standard spacing is provided between each check box. The text prompt for each check box control fits within the limited column space provided. Abbreviations are used, if necessary.

If the number of data layers available are such that they cannot all be displayed within the tab window at the same time, then a custom scroll bar control is available to the user. This scroll bar allows the user to scroll only the check box control area, leaving all other controls stationary. If the resolution of the UI screen is higher than 800×600, the Custom Tab window will size to provide a greater amount of vertical space in order to display the maximum number of data layers at one time. None of the check boxes are selected by default. Each check box has a graphic next to it that displays the legend symbol for the data layer.

In FIG. 78 or 79, if the user selects the View Selected Layers hyperlink, the user is taken to the Change Layer Order pop up dialog box, where the user can view the data layers that have been selected and change the order in which the layers is displayed. If the user selects the Show all categories tab, the tab becomes active, the tab title is displayed, and the tab window is filled with the check box controls for all of the data layers that are available within the enterprise spatial system software, grouped into the same categories as the data layer tabs. Those data layers that are not available for the user's AOI will not be available as check boxes and are grayed out. The check boxes are displayed grouped into their categories, in the order that the category tabs are displayed. The beginning of a new category grouping is designated as follows: the title of the category appears, the font is bold, and dash marks appears after the title to continue all of the way to the rightmost edge of the Custom Tab window. The check boxes appear after their respective category title. A new category display appears immediately after the end of the previous one.

Figure 80:
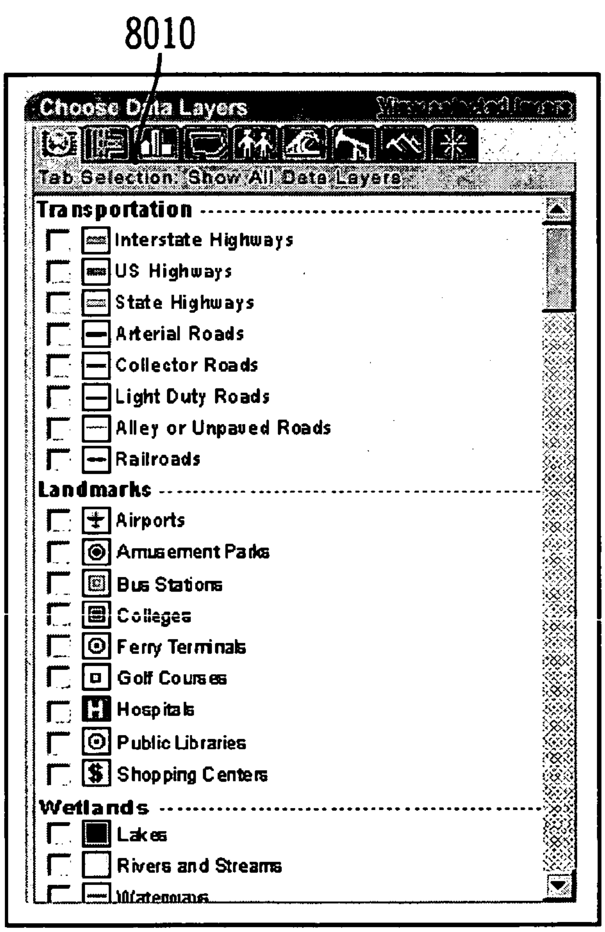
FIG. 80 illustrates a UI screen after the Show all categories tab has been selected in accordance with certain implementations of the invention.

FIG. 80 illustrates a UI screen 8010 after the Show all categories tab has been selected in accordance with certain implementations of the invention. In FIG. 80, if the user selects the Transportation tab: this tab becomes active, the tab title is displayed, and the tab window is filled with the check box controls for all of the data layers that are available within the Transportation category, such as: Geocoded Interstate, US and state highways, arterial roads, light duty roads, alleys, unpaved roads, railroads that allow address searches and routing requests; and, airports, railroad and bus stations, highway interchanges, and ferry terminals. Those data layers that are not available for the user's AOI will not be available as check boxes and are grayed out.

If the user selects the Landmarks tab: this tab becomes active. the tab title is displayed, and the tab window is filled with the check box controls for all of the data layers that are available within the Landmark category, such as: National, state, regional and local parks; and, airports, railroad and bus stations, highway interchanges, ferry terminals, major buildings, town centers, city halls, public libraries, convention centers, observatories, colleges, universities, monuments, memorials, shopping centers, golf courses, amusement parks, fairgrounds, ski resorts, horse and auto racetracks, stadiums, museums, halls, auditoriums, zoos, aquariums, and city centers. Those data layers that are not available for the user's AOI will not be available as check boxes and are grayed out.

If the user selects the Boundaries tab: this tab becomes active, the tab title is displayed, and the tab window is filled with the check box controls for all of the data layers that are available within the Boundaries category, such as: boundaries of counties in conterminous US, county and state codes, county names and area; boundaries of metropolitan areas with area and population; 104th, 105th and 106th Congressional District boundaries; and Zip +4 boundaries for conterminous US. Those data layers that are not available for the user's AOI will not be available as check boxes and are grayed out.

If the user selects the Demographics tab: this tab becomes active, the tab title is displayed, and the tab window is filled with the check box controls for all of the data layers that are available within the Demographics category, such as: 1990 and 2000 US Census data including demographic information and census tract boundaries; and, boundaries of metropolitan areas with area and population. Those data layers that are not available for the user's AOI will not be available as check boxes and are grayed out.

If the user selects the Water tab: this tab becomes active, the tab title is displayed, the tab window is filled with the check box controls for all of the data layers that are available within the Water category, such as: navigable waterways of the conterminous US; major dams and associated lakes; wetland boundaries and classifications; vector representations of rivers and streams; 100 yr and 500 yr flood plain boundaries; and, hydrologic units for major rivers and tributaries. Those data layers that are not available for the user's AOI will not be available as check boxes and are grayed out.

If the user selects the Infrastructure tab: this tab becomes active, the tab title is displayed, and the tab window is filled with the check box controls for all of the data layers that are available within the Infrastructure category, such as: major pipelines, transmission lines and facilities; and, major dams and associated lakes. Those data layers that are not available for the user's AOI will not be available as check boxes and are grayed out.

If the user selects the Environmental tab: this tab becomes active, the tab title is displayed, and the tab window is filled with the check box controls for all of the data layers that are available within the Environmental category, such as: large and small scale soil classification data; small scale geologic classification data; and, vector representations of landscape topography. Those data layers that are not available for the user's AOI will not be available as check boxes and are grayed out.

If the user selects the Favorites tab: this tab becomes active, the tab title is displayed, and a check is made to determine whether the user has added any data layers to the "Favorite" data layers. If yes, then the tab window is filled with the check box controls for the data layers that the user has added to the "Favorites" list. Those data layers that are not available for the user's AOI will not be available as check boxes and are grayed out. If the user has not added any data layers to the "Favorites" list, then the Custom Tab window has the following message displayed within it, which reads, "You do not currently have any data layers in your "Favorites" list. To create a Favorites list, select the Edit Favorites link above". The message is center justified within the entire tab window.

If the user selects a check box control (within any tab), and, if the checkbox was previously unselected, the checkbox becomes selected, and the data layer becomes part of the user's map. The data layer associated with the check box is layered into the map. A check is made to see whether the selected check box is for a "change detection" type of layer, and, if so, additional information is required of the user. If so, a Change Detection pop up appears. The information provided in this pop up is used to determine the appropriate change detection map to use.

After the check, the Map window is refreshed, so that the Map window displays the selected data layer in addition to the other elements that were previously present. The order of display, or "layer order" takes into consideration two rules for the layering of data. First, the layering of data in general is in the following order: Imagery, Polygons, Lines, and Points. Second, if another element already exists in the map for the group to which the data layer belongs, this data layer is placed immediately on top of the top most layer currently in that group.

If the user selects a check box control (within any tab), and if the checkbox was previously in the selected state, the checkbox becomes deselected, and the data layer is removed as part of the user's map. The data layer associated with the check box is removed from the map. The Map window is refreshed, which removes the display of the deselected data layer, while retaining all of the other elements that were previously present.

As for editing legend items, the user has the ability to edit the legend representation for the data overlaid within the enterprise spatial system, whether it be point, line, or polygon data.

Figure 81:
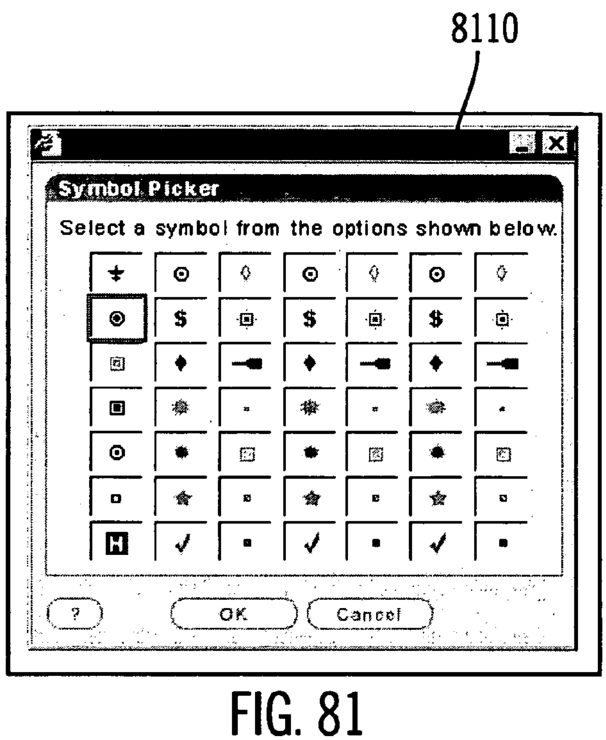
FIG. 81 illustrates a symbol picker UI screen in accordance with certain implementations of the invention.

As for editing point data legends, when the mouse is passed over the legend representation of the point data, the cursor changes to indicate that the legend item can be clicked upon. Upon selection of a point data legend, a modified version of the Color Picker pop up is launched. This pop up is referred to as the Symbol Picker, and has some attributes that differ from the Color Picker. FIG. 81 illustrates a symbol picker UI screen 8110 in accordance with certain implementations of the invention.

Figure 82A:
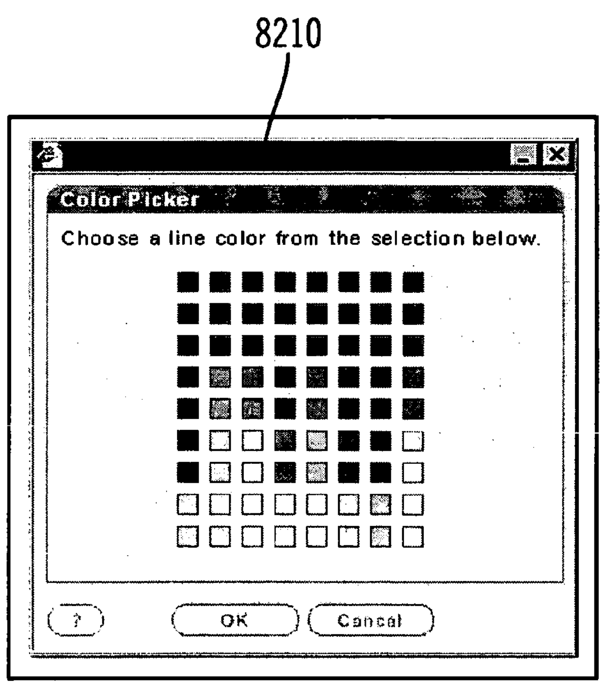
FIGS. 82A–82C illustrate line Color Picker pop dialog boxes in accordance with certain implementations of the invention.
Figure 82B:
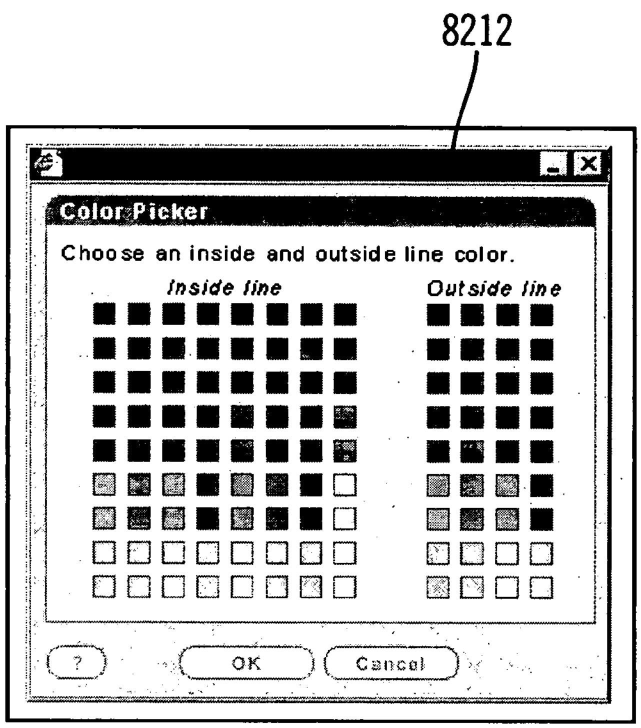

As for editing line type data legends, when the mouse is passed over the legend representation of the line data, the cursor changes to indicate that the legend item can be clicked upon. Upon selection of a line data legend, the enterprise spatial system classifies the line into one of two categories, either a single line or a double line (with a lined border around it). If the line is a single line, the line Color Picker pop dialog box is launched. FIG. 82A illustrates a line Color Picker pop dialog box 8210 in accordance with certain implementations of the invention. If the line is a double line, a modified version of the line Color Picker pop dialog box is launched. FIG. 82B illustrates a modified line Color Picker pop dialog box 8212 in accordance with certain implementations of the invention. In FIG. 82B, the introductory text reads, "Choose an inside and outside line color from the selection below". In addition to the 72 standard color blocks, another group of color blocks is present to allow the user to select the color for the outside line. This group of color blocks includes, for example, 36 blocks, and the colors are defined by the 216 web safe color palette.

In FIG. 82B, immediately above the standard color block, the text "Inside line" is displayed. Immediately above the new color block, the text "Outside line" is displayed. The selected color in the first block defines the color of the inside line data. The selected color in the second block defines the color of the outside line data. All other Color Picker attributes and functionality apply.

Figure 82C:
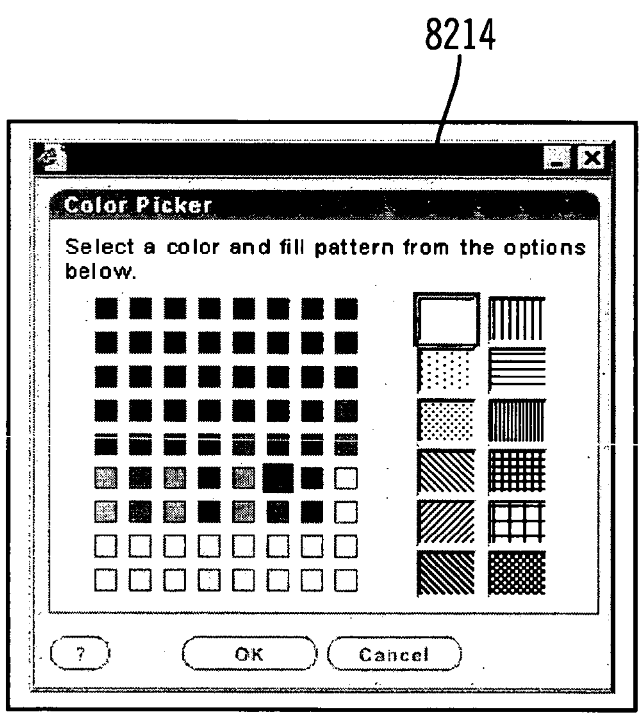

As for editing polygon type data legends, when the mouse is passed over the legend representation of the polygon data, the cursor changes to indicate that the legend item can be clicked upon. Upon selection of a polygon data legend, a modified version of the line Color Picker pop dialog box is launched. FIG. 82C illustrates a modified version of the line Color Picker pop dialog box 8214 in accordance with certain implementations of the invention. In FIG. 82C, the introductory text reads, "Select a color and fill pattern from the options below.". In addition to the 72 standard color blocks, another group of color blocks is present to allow the user to select a pattern fill. The selected color in the first block defines the fill color for the polygon. The selected pattern in the second block defines the fill pattern for the polygon. All other Color Picker attributes and functionality apply.

Figure 83:
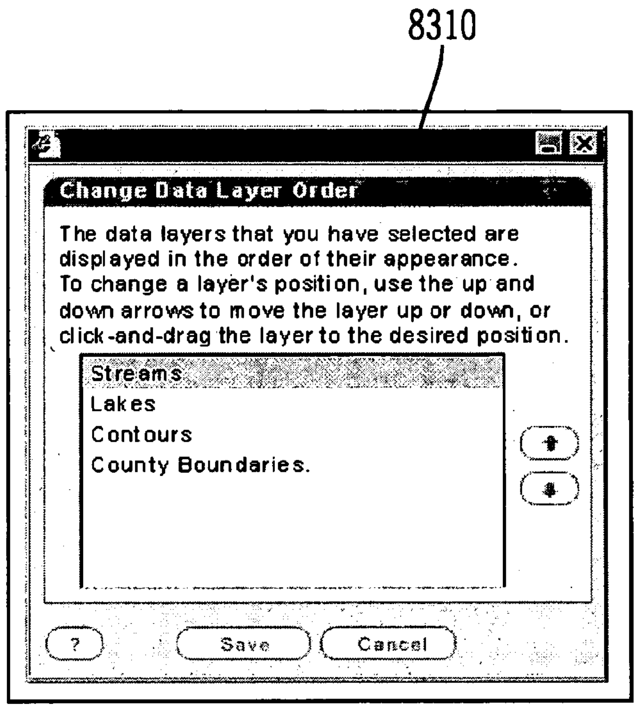
FIG. 83 illustrates a Change Data Layer Order pop dialog box in accordance with certain implementations of the invention.

FIG. 83 illustrates a Change Data Layer Order pop dialog box 8310 in accordance with certain implementations of the invention. The Change Data Layer Order pop up dialog box 8310 is used whenever a user has indicated a desire to rearrange the order of the data layers. The purpose of this dialog box 8310 is twofold: to provide an interface that allows the user to quickly see which data layers have been selected and to allow the user to define in what order the data layers are displayed.

The Change Data Layer Order pop up dialog box 8310 meets the standard guidelines for the use of pop up dialog boxes and is a small Pop up dialog box. The pop up appears centered in the work area of the main enterprise spatial system software.

The Data Layer list box control 8312 consists of three elements, including a list box and two buttons. The Data Layer list box control 8312 displays all of the data layers that are currently active. The order that the data layers are displayed within the Data Layer list box control 8312 is as follows: the lowest data layer is displayed at the bottom of the list, the highest data layer is displayed at the top of the list, and those data layers in between shall continue in order from lowest display to highest display level. The list box control allows for the selection of one item (e.g., the control and shift functionality for selection is disabled). The first item in the list is selected by default.

In FIG. 83, as for the Up Arrow button, all of the Up Arrow button's attributes are standard for control buttons, except for the following: the image width for the Up button is 31 pixels wide and the button shall not have text, rather it has a graphic of an arrow pointed upward.

In FIG. 83, as for the Down Arrow button, all of the Down Arrow button's attributes are standard for control buttons, except for the following: the image width for the Down button is 31 pixels wide and the button shall not have text, rather it has a graphic of an arrow pointed downward.

In FIG. 83, if the user selects an item from the list box, the item shall show a visual indication (e.g., highlight) designating that it is the item currently selected. The item that was previously selected becomes deselected. The selected data layer can now be used with the up arrow, the down arrow, and with click-and-drag functionality.

If the user selects the up arrow button for a selected data layer, and if the selected data layer is not currently the top item in the display order, the selected item will move one level up in the list, the selected data layer will move one level up in the display order (although the refresh will not occur until the pop up window is closed), and the selected item will remain selected. If the selected data layer is currently the top item in the display order, selection of the up arrow button has no effect on the display order.

If the user selects the down arrow button for a selected data layer, and if the selected data layer is not currently the bottom item in the display order, the selected item will move one level down in the list, the selected data layer will move one level down in the display order (although the refresh will not occur until the pop up window is closed), and the selected item will remain selected. If the selected data layer is currently the bottom item in the display order, selection of the down button has no effect on the display order.

If the user "clicks-and-drags" the highlighted data layer selection, the highlighted selected will move up or down the list to the point where the user releases the mouse. The selected item will move up or down in the display order accordingly (although the refresh will not occur until the pop up window is closed).

If the user selects the Ok button, the pop up dialog box is closed. The Map window display is refreshed, with the display of the data layers changed in accordance with the selections made by the user.

If the user selects the cancel button, the pop up dialog box is closed, without affecting the order of the data layers.

Figure 84:
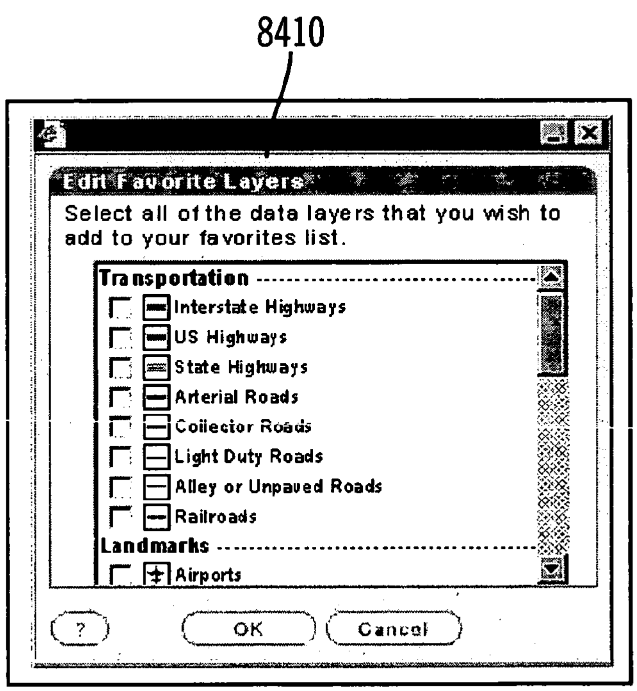
FIG. 84 illustrates an Edit Favorites pop up dialog box in accordance with certain implementations of the invention.

FIG. 84 illustrates an Edit Favorites pop up dialog box 8410 in accordance with certain implementations of the invention. The Edit Favorites pop up dialog box 8410 is used whenever a user wants to edit a data layer favorites list to appear within the Favorites tab. The Edit Favorites pop up dialog box 8410 provides the interface required to create the Favorites list.

The Edit Favorites pop up dialog box 8410 meets the standard guidelines for the use of pop up dialog boxes and is a small pop up dialog box. The pop up appears centered in the work area of the main enterprise spatial system software.

In FIG. 84, Data Layer check box controls 8412 form a control group that consists of multiple check box controls. Each check box control corresponds to a data layer that is available for selection by the user. These check boxes are standard in functionality. The check boxes are displayed grouped into categories. Each category has a one-to-one correspondence with a tab in the custom tab control. The beginning of a new category grouping is designated as follows: the title of the category appears; the font is bold; and, dash marks appears after the title to continue all of the way to the rightmost edge of the Custom Tab window. The check boxes appear after their respective category title. A new category display appears immediately after the end of the previous one. The text prompt for each check box control fits within the limited column space provided. Abbreviations are used, if necessary. A scroll bar allows for the scrolling of the check box controls, and other elements do not scroll.

In FIG. 84, if the user selects a check box control, and if the checkbox was previously unselected, the checkbox becomes selected, and the data layer associated with the check box becomes part of the user's Favorite List. This will add the data layer to the display of available data layers for selection within the Favorites tab. The selected data layer appears in alphabetical order on the Favorites list.

If the user selects a check box control, and if the checkbox was previously in the selected state, the checkbox becomes deselected, and the data layer is removed from the Favorites list.

If the user selects the help button, the help page that provides online help pertaining to this UI screen 8410 appears in a pop up format. if the user selects the Ok button, the pop up dialog box is closed, and the Favorites list is updated. If the user selects the cancel button, the pop up dialog box is closed, without affecting the Favorites list.

Figure 85:
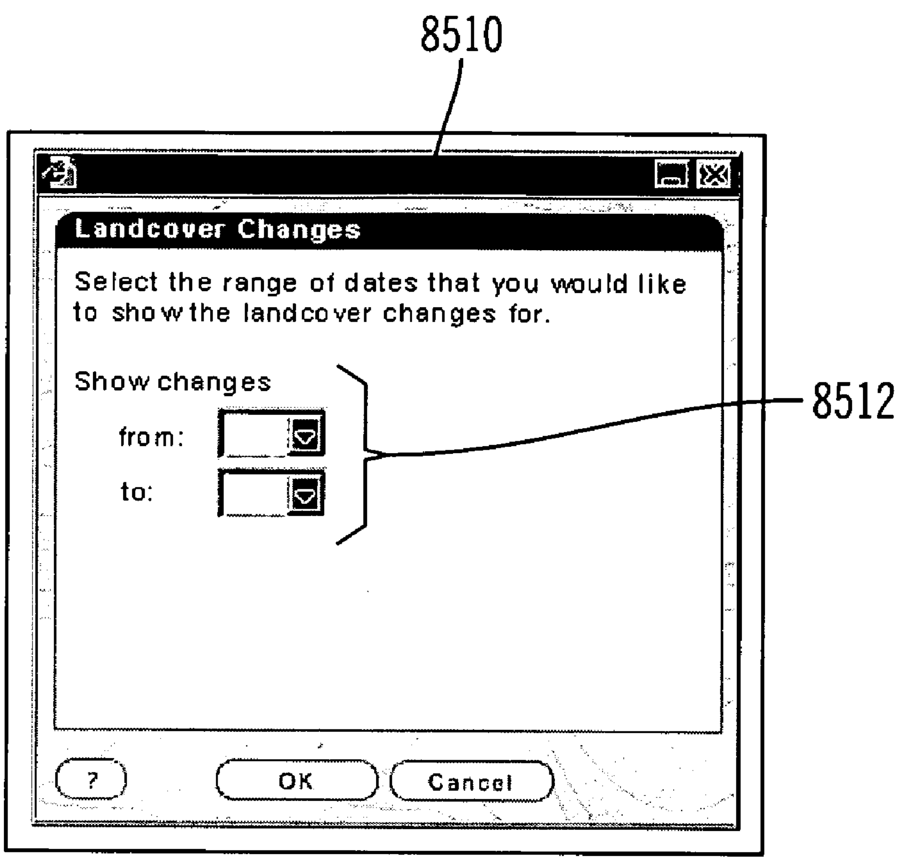
FIG. 85 illustrates a Change Detection pop up dialog box in accordance with certain implementations of the invention.

FIG. 85 illustrates a Change Detection pop up dialog box 8510 in accordance with certain implementations of the invention. This Change Detection pop up dialog box 8510 is used whenever a user selects a change detection type of data layer. The purpose of this UI screen 8510 is to determine the date range over which the user would like the change detection to be applied.

The pop up dialog box 8510 meets the standard guidelines for the use of pop up dialog boxes and is a small pop up dialog box. The pop up dialog box 8510 appears centered in the work area of the main enterprise spatial system software. For Date Range Drop down controls 8512, a prompt reads "Show changes:".

In FIG. 85, if the user selects the Help button, the help page that provides online help pertaining to this UI screen appears in a pop up format. If the user selects the Ok button, if either of the date range drop downs have not been selected, an error message is pushed to the top of the pop up work area, with text reading "You must select both a starting and ending year to use the selected data set. Select the date range and try again, or select cancel to cancel the data set.". If the OK button is selected and the user has selected the date range, a data layer is retrieved based upon the date range given and the pop up dialog box is closed. The Map widow is refreshed, displaying the selected data layer in addition to the other elements that were previously present. The order of display, or "layer order" takes into consideration two rules for the layering of data: first, the layering of data in general is in the following order: Imagery, Polygons, Lines, and Points; and, second, if another element already exists in the map for the group to which the data layer belongs, this data layer is placed immediately on top of the top most layer currently in that group.

If the user selects the cancel button, the pop up dialog box is closed. A pop up error message appears, "The <insert data layer name> data layer will not be added". The check box control that initiated the Change Detection pop up is deselected.

Figure 86:
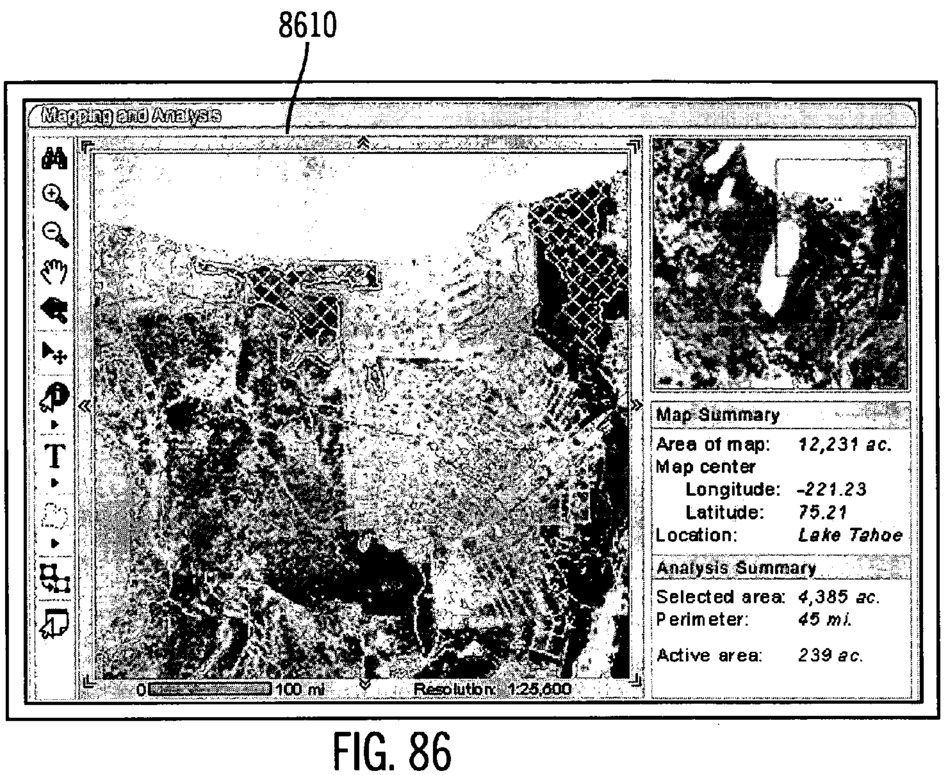
FIG. 86 illustrates a Mapping and Analysis portion of the main UI screen in accordance with certain implementations of the invention.
Figure 87:
FIG. 87 illustrates a Map window in accordance with certain implementations of the invention.

FIG. 86 illustrates a Mapping and Analysis portion 8610 of the main UI screen in accordance with certain implementations of the invention. FIG. 87 illustrates a Map window 8710 in accordance with certain implementations of the invention.

As for functionality, the Map window is a custom control whose function is twofold: display map graphics within the window and scale the map appropriately to fit in the window, without distorting any of the proportions. In particular, the map is cropped appropriately to fit in the window, without distorting any of the proportions. The graphic formats that are supported for display within the Map window include, for example, GIF and JPEG. Before the user ever selects a base image from the base image drop down control, a default map graphic is displayed within the Map window. This is a type of map that the enterprise spatial system has nationwide access to and provides the user with context as the user navigates to the desired AOI, without forcing the user to select a base image (some users will not want a base image, for example if they are downloading data).

Tools from the enterprise spatial system toolbox are active when the user positions the cursor within the bounds of the Map window. The details of these toolbar behaviors are described in further detail below.

The Map window is located immediately within the map frame. The location of the Map window is fixed—the user has no ability to move the window. Whenever a map image is being loaded into the Map window: the previous image shall remain displayed until the new image is ready; and, an animated GIF will indicate to the user that the map is loading. This file is centered within the Map window. The GIF file is provided to development. The user will not be able to undertake any other actions while the map is loading. If the user attempts to undertake another task while a map is loading, a pop up message appears reading, "You will need to wait for the requested map to load before you can begin another task. Please wait for the map to load and try again".

Figure 88:
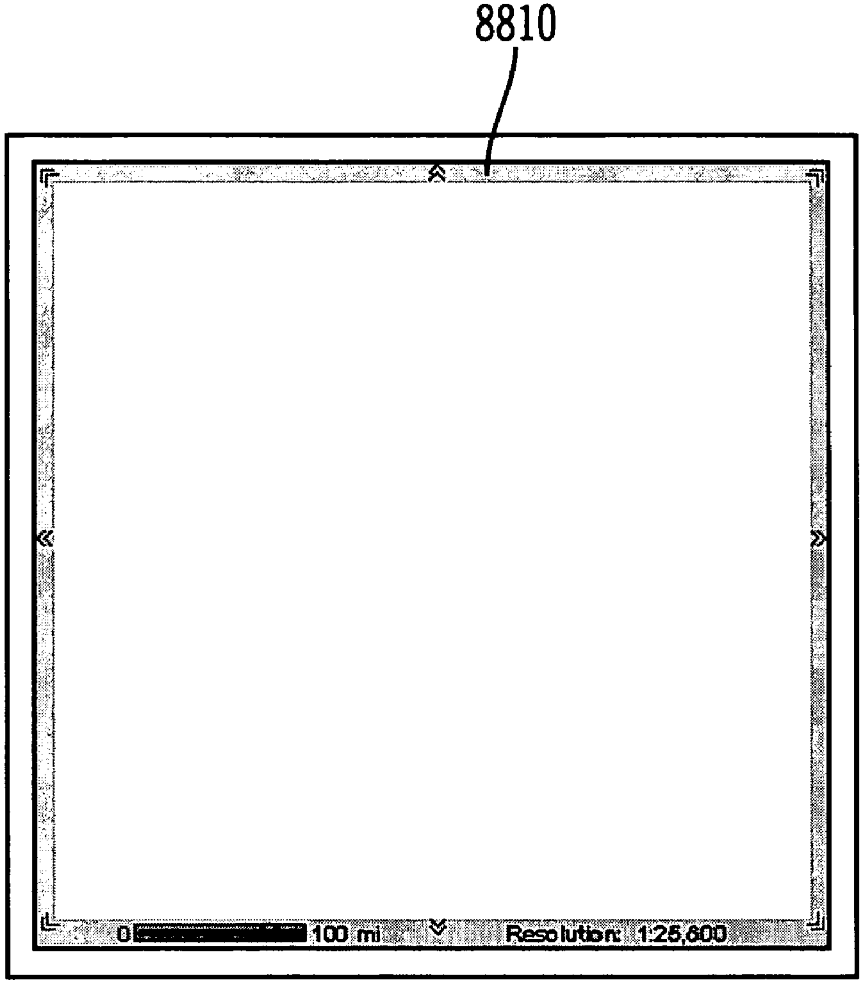
FIG. 88 illustrates a map frame in accordance with certain implementations of the invention.

FIG. 88 illustrates a map frame 8810 in accordance with certain implementations of the invention. The enterprise spatial system supports pan functionality to allow the user to re-define the AOI for the current map. The pan functionality is provided in the double arrows on all sides and corners of the map frame. Upon a mouse-over of any of the double arrows, the cursor shall indicate that the area is selectable by the user.

When the arrows on the left side of the frame are selected, the map will pan to the left in the amount of 50% of the width of the map. When the arrows on the top side of the frame are selected, the map will pan to the top in the amount of 50% of the height of the map. When the arrows on the left side of the frame are selected, the map will pan to the left in the amount of 50% of the width of the map. When the arrows on the bottom side of the frame are selected, the map will pan to the bottom in the amount of 50% of the height of the map. When the arrows on the upper left corner of the frame are selected, the map will pan to the left in the amount of 50% of the width of the map and will pan to the top in the amount of 50% of the height of the frame. When the arrows on the upper right corner of the frame are selected, the map will pan to the right in the amount of 50% of the width of the map and will pan to the top in the amount of 50% of the height of the frame. When the arrows on the lower left comer of the frame are selected, the map will pan to the left in the amount of 50% of the width of the map and will pan to the bottom in the amount of 50% of the height of the frame. When the arrows on the lower right corner of the frame are selected, the map will pan to the right in the amount of 50% of the width of the map and will pan to the bottom in the amount of 50% of the height of the frame.

Before refreshing the map with the panned AOI, a check is made to determine whether or not the updated AOI has support for the base image that is currently selected. If the base image is not available for the new AOI, then the AOI-Base Image Conflict pop up appears. If the user selects to change the AOI, then the Map window is refreshed with the new AOI and reversion to "none" as the Base Image selection is performed. If the user chooses to keep the Base Image, the AOI shall not be updated. If the Base Image is available, processing continues.

The Map window refreshes, painting the map for the newly defined AOI. The arrow tools are available to the user at all times.

As for information display, the bottom side of the frame is wider in order that it can provide area to display information pertaining to the map currently within the frame. Two areas shall exist to display information: one area is to the left of the pan down arrows and another area is to the right of the of the pan down areas. In FIG. 88, the scale and resolution information is displayed within these areas. The information that can be displayed within these area includes, for example: Scale, Coordinates, and Resolution. The user can select up to 2 of these types of information to display in Preferences.

Figure 89:
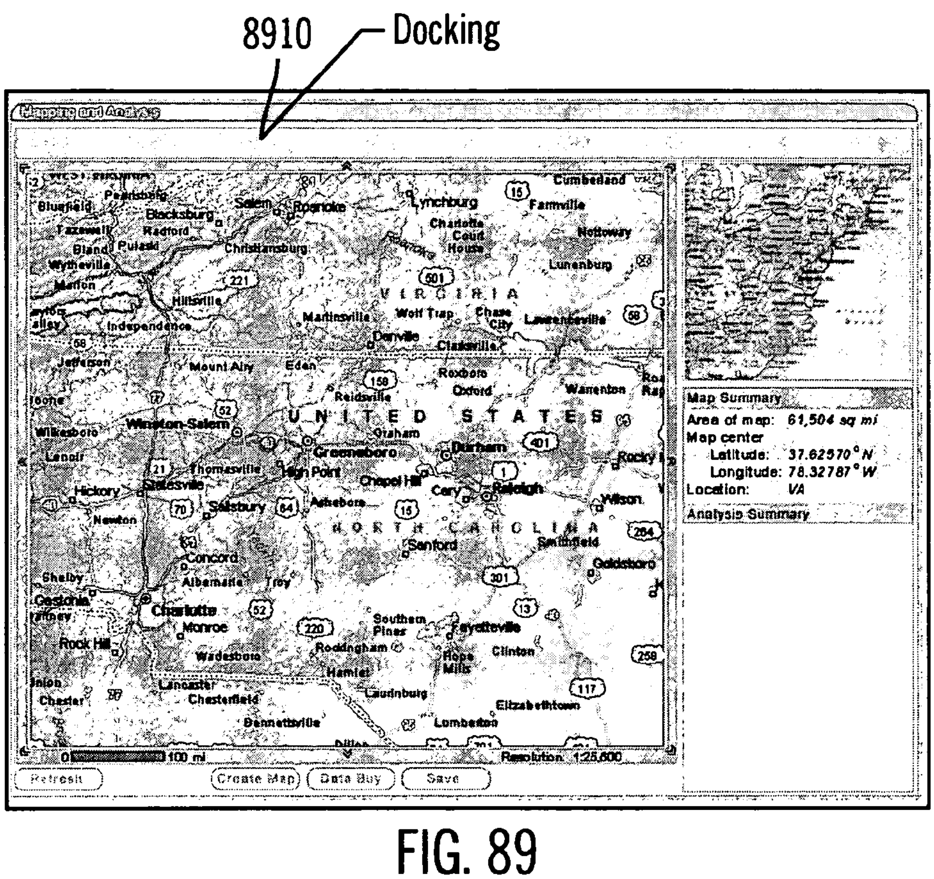
FIG. 89 illustrates a docking bar in accordance with certain implementations of the invention.

The docking bar is located immediately above the map frame and the reference map. This docking bar is where various elements within the enterprise spatial system software are docked. FIG. 89 illustrates a docking bar 8910 in accordance with certain implementations of the invention. The UI elements that are docked in the docking bar include, for example: the toolbar, the attribute bar, and the prompt bar. The toolbar is the primary element docked in the docking bar, and is therefore located to the far left of the docking bar. The attribute bar contains controls that allow the user to define the attributes and settings for various tools within the enterprise spatial system software. The attribute bar is not always present, but when it is, it is located immediately to the right of the toolbar. The prompt bar contains a prompt for the tool that is currently selected on the toolbar. If the attribute bar is present, the prompt bar appears immediately to the right of the attribute bar. If the attribute bar is not present, the prompt bar appears immediately to the right of the toolbar. FIG. 90 illustrates a docking bar 9010 with a toolbar, attributes bar, and prompt bar in accordance with certain implementations of the invention.

Depending upon the resolution that the enterprise spatial system software is run in, there may be insufficient space for all of the appropriate bars to be displayed in their entirety. In this case, the docking bar shall utilize an expansion docking bar. A down arrow button indicates to the user that more information can be displayed within the expansion docking bar. Selection of the down arrow button will expose the expansion docking bar, with the appropriate elements docked. FIG. 91 illustrates expansion docking 9110 in accordance with certain implementations of the invention.

Figure 92A:
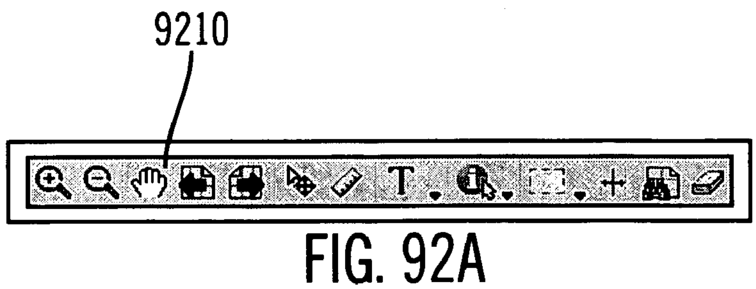
FIGS. 92A–92O illustrate a toolbar, states of an icon, and various tools in accordance with certain implementations of the invention.
Figure 92B:
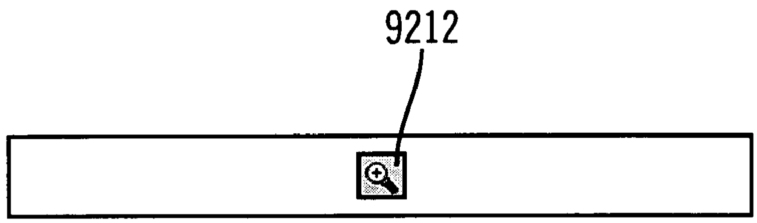
Figure 92C:
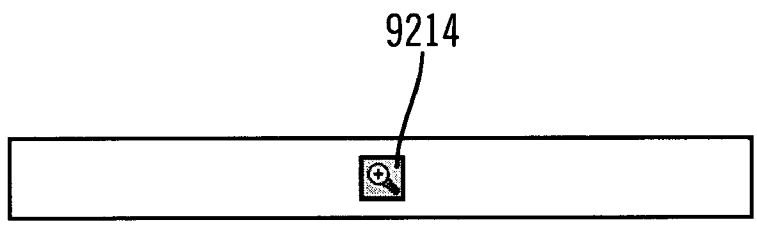
Figure 92D:
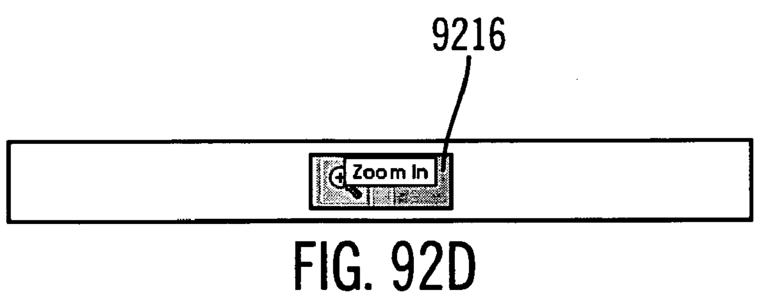
Figure 92E:
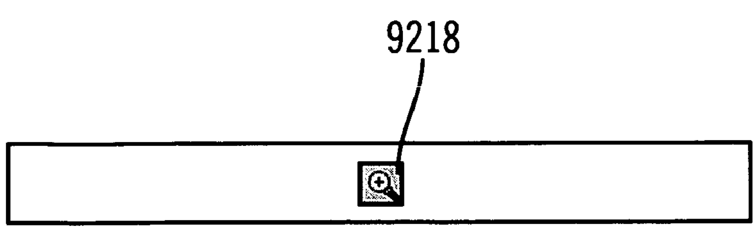

FIG. 92A illustrates a Toolbar 9210 in accordance with certain implementations of the invention. All of the tools that are used within the enterprise spatial system software are located within the "Toolbar". In the case of co-branded enterprise spatial system software, additional tools may need to be added to the toolbar. Each tool is represented by a unique icon, which has several states. FIGS. 92B–92E illustrate some states of an icon in accordance with certain implementations of the invention. In the standard state 9212, the tool is a flat, 2D icon. In the rollover state 9214, the tool is beveled. In the hover state 9216, if the mouse hovers for two seconds over the icon, a tool tip appears. In the selected state, the tool is indented.

Figure 92F:
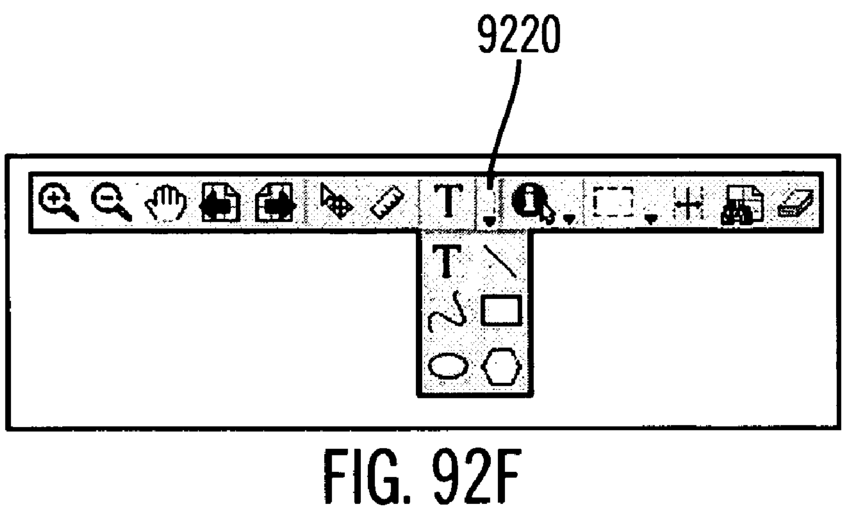

FIG. 92F illustrates expanded tool selection 9220 in accordance with certain implementations of the invention. There are more tools available to the user on the Main UI screen than can fit on the toolbar. The expanded tool selection 9220 allows numerous tools to be available to the user without taking an inordinate amount of space. Special icons are present on the toolbar when an expanded tool selection is available. An expanded tool selection appears when the user selects one of the arrow icons. All other characteristics of the expanded tool selection are the same as the standard toolbar.

Figure 92G:
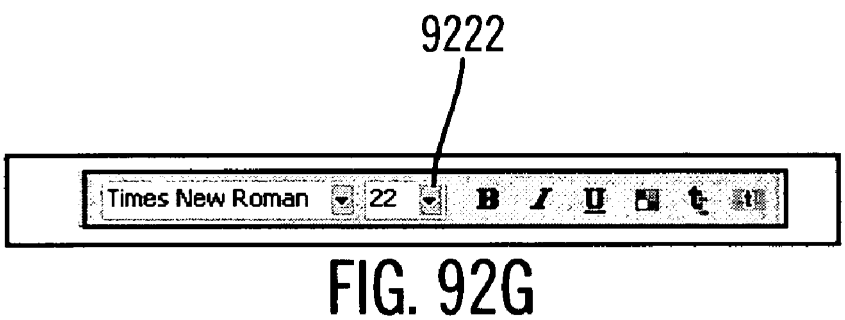

FIG. 92G illustrates an Attributes Bar 9222 in accordance with certain implementations of the invention. For tools that have attribute settings, the attributes bar contains all of the controls required to define the appropriate tool. Every attribute bar is therefore associated with a specific tool and works in conjunction with that tool. The attribute bar is not available for all tools.

Figure 92H:
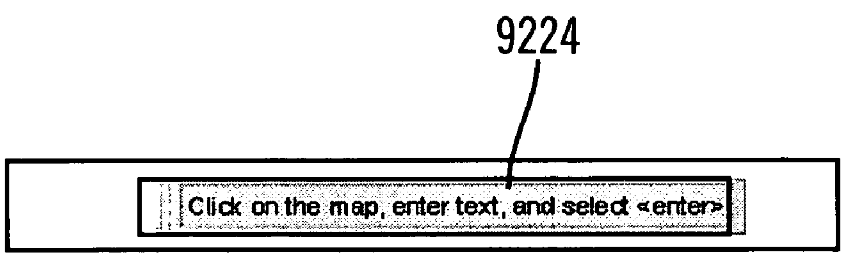
Figure 92I:
Figure 92J:
Figure 92K:
Figure 92L:
Figure 92M:
Figure 92N:
Figure 92O:

FIG. 92H illustrates a Prompt Bar 9224 in accordance with certain implementations of the invention. The prompt bar contains text messages that will guide the user through the use of each of the tools. Every prompt bar is therefore associated with a specific tool. Located within the docking bar, if an attribute bar is present for the selected tool, then the prompt bar is located immediately to the right of the attribute bar. If an attribute bar is not present for the selected tool, then the prompt bar is located immediately to the right of the toolbar. A text window appears within the prompt bar.

A Zoom In tool 2230 allows the user to redefine the AOI for the current map. The tool tip for this tool reads, "Zoom In". The text prompt for this tool reads, "Click on the map or click and drag a specific area to zoom to". There is no attribute bar associated with this tool. When this tool is selected, and when the cursor is passed over the Map window, the cursor is displayed as a magnifying glass with a plus sign in the middle (same graphic as is used in the icon). When the cursor is displayed as a magnifying glass, the user can click on any point on the map. Upon clicking the map, the AOI is updated as follows: the center point of the AOI is the spot in which the user clicked on the map, and the map scale is zoomed in by 50%. When the cursor is displayed as a magnifying glass, the cursor can be used to "click and drag" a rectangular subsection of the Map window. When a user selects a rectangular subsection, this is used to define an updated Area of Interest (AOI) for the map. The map AOI is defined as the smallest square that encompasses the entire rectangle selected by the user.

A check is made to determine whether or not the updated AOI has support for the base image that is currently selected. If the base image is not available for the new AOI, then the AOI-Base Image Conflict pop up appears. If the user selects to change the AOI, then the Map window is refreshed with the new AOI and reversion to "none" as the Base Image selection is performed. If the user chooses to keep the Base Image, the AOI shall not be updated. If the Base Image is available, the Map window is refreshed with the new AOI. This is the default tool that is selected. The tool remains available until another tool is selected, or until the user moves to another UI screen.

A Zoom Out tool 9230 allows the user to redefine the AOI for the current map. The tool tip for this tool reads, "Zoom Out". The text prompt for this tool reads, "Click on the map to zoom out". There is no attribute bar associated with this tool. When this tool is selected, and when the cursor is passed over the Map window, the cursor is displayed as a magnifying glass with a minus sign in the middle (same graphic as is used in the icon). When the cursor is displayed as a magnifying glass, the user can click on any point on the map. Upon clicking the map, the AOI is updated as follows: the center point of the AOI is the spot in which the user clicked on the map and the map scale is zoomed out by 50%.

A check is made to determine whether or not the updated AOI has support for the base image that is currently selected. If the base image is not available for the new AOI, then the AOI-Base Image Conflict pop up appears. If the user selects to change the AOI, then the Map window is refreshed with the new AOI and reversion to "none" as the Base Image selection is performed. If the user chooses to keep the Base Image, the AOI shall not be updated.

A check is made to determine whether the zooming out would cause the user to zoom out beyond the maximum geographical extent for that user. If so, the zoom is to the geographical extent only. A pop up message appears reading, "You have zoomed out to the full extent of the geographical area that you have been granted access to. If you feel that you should have access to geographical areas outside of the current extent, please speak with your enterprise spatial system administrator".

If the Base Image is available, the Map window is refreshed with the new AOI. The tool remains available until another tool is selected, or until the user moves to another UI screen.

A Pan tool 9232 allows the user to redefine the AOI for the current map. The tool tip for this tool reads, "Pan". The text prompt for this tool reads, "Click and drag to pan the current map". There is no attribute bar associated with this tool. When this tool is selected, and when the cursor is passed over the Map window, the cursor is displayed as a hand (same graphic as is used in the icon). When the cursor is displayed as a hand, the user can click on any point on the map to "grab" the map at what becomes the "handle point". While keeping the left mouse button held down, the user can "drag" the map. The user can drag the handle point to any location within the Map window. Upon releasing the handle point, the AOI is updated as follows: the handle point of the map is located at the point where the user released it, the scale of the map AOI will remain at the same scale as it was before the pan action was initiated, the bounds of the AOI are defined by the bounds of the Map window at the time that the user releases the handle point.

A check is made to determine whether or not the updated AOI has support for the base image that is currently selected. If the base image is not available for the new AOI, then the AOI-Base Image Conflict pop up appears. If the user selects to change the AOI, then the Map window is refreshed with the new AOI and reversion to "none" as the Base Image selection is performed. If the user chooses to keep the Base Image, the AOI shall not be updated. If the Base Image is available, the Map window is refreshed with the new AOI.

A check is made to determine whether the panning would cause the move beyond the maximum geographical extent for that user. If so, the map is moved to the geographical extent only. A pop up message appears reading, "You have attempted to move beyond the geographical area that you have been granted access to. If you feel that you should have access to additional geographical areas, please speak with your enterprise spatial system administrator". The tool remains available until another tool is selected, or until the user moves to another UI screen.

A Previous Extent tool 9234 is only available after the user has redefined the map's AOI is any manner, causing a refresh of the Map window. The tool tip for this tool reads, "Previous Map Extent". The text prompt for this tool reads, "Click to view the previous map view". There is no attribute bar associated with this tool. When this tool is selected, the previous map that was displayed within the Map window becomes the current map and the AOI becomes the AOI associated with the previous map.

A check is made to determine whether or not the updated AOI has support for the base image that is currently selected. If the base image is not available for the new AOI, then the AOI-Base Image Conflict pop up appears. If the user selects to change the AOI, then the Map window is refreshed with the new AOI and reversion to "none" as the Base Image selection is performed. If the user chooses to keep the Base Image, the AOI shall not be updated. If the Base Image is available, the Map window immediately refreshes, painting the map for the newly defined AOI.

This tool can be used to go back to 20 previous extents. Unlike other tools, this tool does not remain active. If the user wants to use it again, the user has to select the tool again. Since this tool does not remain active, the tool that was selected previous to its use is the selected tool.

A Next Extent tool 9236 is only available after the user has used the previous extent tool. The tool tip for this tool reads, "Next Map Extent". The text prompt for this tool reads, "Click to view the next map view". There is no attribute bar associated with this tool. When this tool is selected, the next map that was displayed within the Map window becomes the current map and the AOI becomes the AOI associated with the next map in the order. A check is made to determine whether or not the updated AOI has support for the base image that is currently selected. If the base image is not available for the new AOI, then the AOI-Base Image Conflict pop up appears. If the user selects to change the AOI, then the Map window is refreshed with the new AOI and reversion to "none" as the Base Image selection is performed. If the user chooses to keep the Base Image, the AOI shall not be updated. If the Base Image is available, the Map window immediately refreshes, painting the map for the newly defined AOI. If the user uses any means to redefine-the AOI other than the next extent tool, the next extent tool will no longer be available. Unlike other tools, this tool does not remain active. If the user wants to use it again, the user has to select it again. Since this tool does not remain active, the tool that was selected previous to its use is the selected tool.

A Selection/Move tool 9238 allows the user to select objects for various purposes, including: moving an object, deleting an object, and bringing up details on a Point n' Attribute record. The tool tip for this tool reads, "Select Object". The text prompt for this tool reads, "Use this tool to move or select objects". There is no attribute bar associated with this tool. When this tool is selected, and when the cursor is passed over the Map window, the cursor is displayed as a selection arrow (the selection arrow is different in appearance than the standard cursor arrow).

When the cursor is moved over the Map window, the user can click on any object that has been previously created with the spatial software drawing tools, measurement tool, or Point n' Attribute tool. Upon selecting an object, the object becomes highlighted. At this point, the user has the ability to: elect the delete key to delete the object or click and drag to move the object anywhere inside of the Map window.

When the cursor is moved over the Map window, the user also has the option to "click and drag" to define a rectangular area of selection. Every drawing object within the selected rectangle area is considered selected, and will therefore be highlighted and can be moved or deleted.

When the cursor is moved over the Map window, the user also has the option to use the <cntrl> key to select multiple drawing objects. The user first holds down the <cntrl> key. While holding down the <cntrl> key, the user can select multiple objects by clicking on each of them. When finished, the <cntrl> key is released. Every drawing object within the selected rectangle area is considered selected, and will therefore be highlighted and can be moved or deleted.

When the cursor is moved over the Map window, the user also has the option to double-click on any Point n' Attribute record marker (indicated with a graphic of a push pin). Upon a double-click on a push pin marker, the Point n' Attribute pop up appears. The data for the selected record is pre-populated in the Point n' Attribute pop up. The user can edit any of the data in the record. The tool remains available until another tool is selected, or until the user moves to another UI screen.

A Measure tool 9240 allows users to measure linear or poly-linear distances within the Map window. Specifically, the linear distance can cover a simple line (e.g., point-to-point) or can cover a polyline (e.g., point-to-point-to-point . . . ). The tool tip for this tool reads, "Measure Tool". The text prompt for this tool reads, "Define line segment(s) for measurement; double-click to end the line". When this tool is selected, the Measure attribute bar is associated with this tool, and appears within the docking bar immediately to the right of the toolbar. When this tool is selected, and when the cursor is passed over the Map window, the cursor is displayed as a crosshair.

Figure 93:
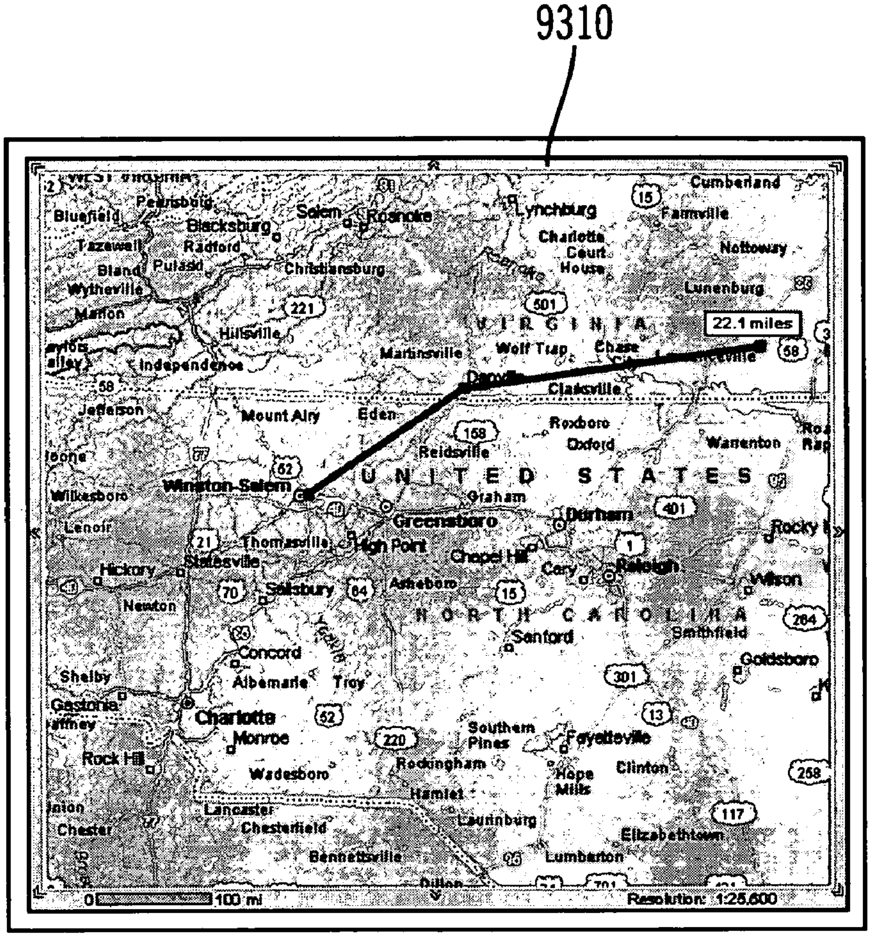
FIG. 93 illustrates an example of measure tool use in UI screen 9310 in accordance with certain implementations of the invention.

When the cursor is displayed as a crosshair, the user can click on any point on the map. Upon clicking the map, the starting point of the line is established. A crosshair remains on the Map, indicating the starting point. As the user moves the mouse, a line segment shall follow the cursor, starting at the previous segment point and ending with the ever-changing location of the mouse cursor. The line is black. The line is 4 pixels in width. The user can define the ending point of the line segment to be measured by clicking the mouse again. A line segment appears, with another crosshair indicating the placement of the segment end point. Upon completion of the line segment, the linear distance of the line segment is displayed near the segment end point, in a tool tip like window as shown in the graphic below. The background behind the text is white, with a one pixel wide black border. The units of measurement for the display is as set in the attributes bar associated with the measurement tool. The user can continue to select the end points of addition segments as much as the user likes. Each of these segment ends is marked with a crosshair, and is added to the polyline. Upon completion of each additional line segment, the linear distance of the polyline is updated within a tool tip like window. The user can define whether the distance is displayed at every segment end point, or only at the last one. To finish the creation of the polyline, the user needs to double-click. The point of the double-click will mark the end point of the polyline. If the user moves the cursor in the area of one of the segment endpoints (within the area displayed as a crosshair), the cursor display shall change to a selection arrow. The user can then click-and-drag the endpoint to move the endpoint to another location. The linear distance of the polyline is updated. The polyline stays within the bounds of the Map window. This is ensured by the fact that the cursor is not available as a crosshair once the mouse leaves the Map window area. The measurement tool remains available until another tool is selected, or until the user moves to another UI screen. FIG. 93 illustrates an example of measure tool use in UI screen 9310 in accordance with certain implementations of the invention.

Figure 94A:
FIGS. 94A–94R illustrate various tools in accordance with certain implementations of the invention.
Figure 94B:
Figure 94C:
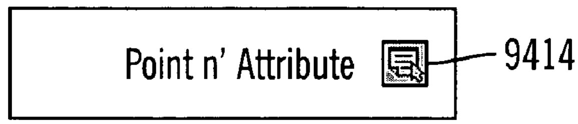
Figure 94D:
Figure 94E:
Figure 94F:
Figure 94G:
Figure 94H:
Figure 94I:
Figure 94J:
Figure 94K:
Figure 94L:
Figure 94M:
Figure 94N:
Figure 94O:
Figure 94P:
Figure 94Q:
Figure 94R:

FIGS. 94A–94R illustrate various tools in accordance with certain implementations of the invention. A Point n' View tool 9410 allows the user to view information that is associated with any point on the current map. The tool tip for this tool reads, "Point n' View". The text prompt for this tool reads, "Click on any data element in the selected layer to view info". When this tool is selected, the Active Layer attribute bar is associated with this tool, and appears within the docking bar immediately to the right of the toolbar.

When this tool is selected, and when the cursor is passed over the Map window, the cursor is displayed as a selection arrow (the selection arrow is different in appearance than the standard cursor arrow). This tool requires that a display window be available on the UI screen where the tool is used. When the cursor is moved over the Map window, the user can click on any point on the map for which the user would like additional information. Upon clicking the map, the information available at that location for the active data layer only is displayed within the Point n' View pop up. If no data underlies the point that the user selected, a pop up error message appears, stating "There is no data for the selected point. Please try again.".

This tool is the default selection within the Information Tools Expansion Toolbar. The tool remains available until another tool is selected, or until the user moves to another UI screen.

A Global Point n' View tool 9412 allows the user to view information that is associated with any point on the current map. The tool tip for this tool reads, "Global Point n' View". The text prompt for this tool reads, "Click on any data element in any visible layer to view info". There is no attribute bar associated with this tool. When this tool is selected, the cursor behave in the following manner, and when the cursor is passed over the Map window, the cursor is displayed as a selection arrow (the selection arrow is different in appearance than the standard cursor arrow).

This tool requires that a display window be available on the UI screen where the tool is used. When the cursor is moved over the Map window, the user can click on any point on the map for which the user would like additional information. Upon clicking the map, the information available at that location across all of the selected data layers is displayed within the Point n' View pop up. If no data underlies the point that the user selected, a pop up error message appears, stating "There is no data for the selected point. Please try again.". The tool remains available until another tool is selected, or until the user moves to another UI screen.

A Point n' Attribute tool 9414 allows the user to input information that is associated with any point on the current map. In the form of a record added to a "Point n' Attribute data store" that is associated with the current project. The tool tip for this tool reads, "Point n' Attribute". The text prompt for this tool reads, "Click on the map to add data store attributes". There is no attribute bar associated with this tool. When this tool is selected, and when the cursor is passed over the Map window, the cursor is displayed as a selection arrow (the selection arrow is different in appearance than the standard cursor arrow).

When the cursor is moved over the Map window, the user can click on any point on the map for which the user would like additional information. Upon clicking the map, the enterprise spatial system will save the exact coordinate location of where the user clicked (longitude/latitude). The Point n' Attribute pop up appears. The tool remains available until another tool is selected, or until the user moves to another UI screen. Point n' Attribute records can be re-opened, moved, or deleted using the selection tool.

A Text Drawing tool 9415 allows users to add text messages on top of their maps. The tool tip for this tool reads, "Add Text". The text prompt for this tool reads, "Click on the map, enter text, and select <enter>". When this tool is selected, the Text attribute bar is associated with this tool, and appears within the docking bar immediately to the right of the toolbar. When this tool is selected, and when the cursor is passed over the Map 20 window, the cursor is displayed as an I-beam.

When the cursor is displayed as an I-beam, the user can click on any point on the map. Upon clicking the map, a flashing cursor appears at the spot where the user clicked on the map. At this point, the user can begin typing in text, and it appears on top of the map as the user types it in. The attributes of the text are the attributes set as the defaults for the text tool. These attributes can be changed after the text has been added using the Change Object Attributes tool. The default settings for the text attributes can be changed using the Change Object Attributes tool. The user indicates the completion of the text by selecting the <enter> key. The text stays within the bounds of the Map window, so the text will automatically wrap if it will otherwise extend beyond the right side boundary. Another text object can be added by clicking the I-beam cursor on another location on the map. Once a piece of text has been added, it can be moved using the Selection\Move tool This tool is the default selection within the Drawing Tools Expansion Toolbar. The tool remains available until another tool is selected, or until the user moves to another UI screen.

A Line Drawing tool 9416 allows users to add lines and arrow annotations on top of their maps. The tool tip for this tool reads, "Draw Line". The text prompt for this tool reads, "Click on the map to define the line's endpoints". When this tool is selected, the Line attribute bar is associated with this tool, and appears within the docking bar immediately to the right of the toolbar. When this tool is selected, and when the cursor is passed over the Map window, the cursor is displayed as a crosshair.

When the cursor is displayed as a crosshair, the user can click on any point on the map. Upon clicking the map, the starting point of the line is established. As the user moves the mouse, a line segment shall follow the cursor, starting at the previous segment point and ending with the ever-changing location of the mouse cursor. The user can define the ending point of the line segment by clicking the mouse again. The line segment appears, with two endpoints. The attributes of the line are the attributes set as the defaults for the line tool. These attributes can be changed after the line has been added using the Change Object Attributes tool. The default settings for the line attributes can be changed using the Change Object Attributes tool. The user is allowed to draw a line that extends beyond the bounds of the currently displayed AOI. If the user tries to draw a line beyond the bounds of a map (as indicated by dragging the line segment beyond one of the sides of the Map window), the enterprise spatial system software pans in the direction that the user has moved the cursor to and continue extending the line. For example, the user may want to trace a street that is 10 miles in length. However, in order to see the street with sufficient clarity to trace it, the user zooms in to a level where the user can only see 6 miles of the road. The user begins tracing the street, then moves the cursor to where the street meets the edge of the Map window. The map should pan is this direction, allowing the user to continue tracing the street section that was previously out of view with a continuous line segment. Another line object can be added by clicking the crosshair cursor on another location on the map. Once a line has been added, it can be moved or deleted using the Selection\Move tool. The tool remains available until another tool is selected, or until the user moves to another UI screen.

A Polyline tool 9418, which is similar to the line tool, allows users to add lines on top of their maps. However, in the case of polylines, the line can consist of multiple segments. The tool tip for this tool reads, "Draw Polyline". The text prompt for this tool reads, "Double-click to end the line segments.". When this tool is selected, the Line attribute bar is associated with this tool, and appears within the docking bar immediately to the right of the toolbar. When this tool is selected, and when the cursor is passed over the Map window, the cursor is displayed as a crosshair.

When the cursor is displayed as a crosshair, the user can click on any point on the map. Upon clicking the map, the starting point of the polyline is established. As the user moves the mouse, a line segment shall follow the cursor, starting at the previous segment point and ending with the ever-changing location of the mouse cursor. The user can define the ending point of the line segment by clicking the mouse again. The line segment appears, with two endpoints. The user can continue to select the end points of addition segments as much as the user likes. To finish the creation of the polyline, the user needs to double-click. The attributes of the polyline are the attributes set as the defaults for the line tool. These attributes can be changed after the polyline has been added using the Change Object Attributes tool. The default settings for the polyline attributes can be changed using the Change Object Attributes tool. The user is allowed to draw a polyline that extends beyond the bounds of the currently displayed AOI. This should function in the same manner as described in the line drawing tool. Once a line has been added, it can be moved using the Selection\Move Tool The tool remains available until another tool is selected, or until the user moves to another UI screen.

A Rectangle Drawing tool 9420 allows users to add squares and rectangles on top of their maps. The tool tip for this tool reads, "Draw Rectangle". The text prompt for this tool reads, "Click and drag the rectangular area". When this tool is selected, the Shape attribute bar is associated with this tool, and appears within the docking bar immediately to the right of the toolbar. When this tool is selected, and when the cursor is passed over the Map window, the cursor is displayed as a crosshair.

When the cursor is displayed as a crosshair, it can be used to "click and drag" a rectangular area within the Map window. This rectangular area defines the area of the rectangle object. A preview of the rectangular area is provided as the user is moving the mouse. To create a perfect square object, the <shift> key has functionality when the rectangle tool is active. If the user holds down the shift key while creating a rectangle as described above, the proportions is constrained so that only squares can be created. The lesser of the x or y distances that the user has dragged the cursor will define the length of the sides of the square. The attributes of the rectangle object are the attributes set as the defaults for the shape objects. These attributes can be changed after the rectangle has been added using the Change Object Attributes tool. The default settings for the rectangle attributes can be changed using the Change Object Attributes Tool and changing the defaults for all shape objects. The rectangle stays within the bounds of the Map window. This is ensured by the fact that the cursor is not available as a crosshair once the mouse leaves the Map window area. Once a rectangle has been added, it can be moved using the Selection\Move tool. The tool remains available until another tool is selected, or until the user moves to another UI screen.

An Ellipse Drawing tool 9422 allows users to add circles and ellipses on top of their maps. The tool tip for this tool reads, "Draw Ellipse". The text prompt for this tool reads, "Click and drag the elliptical area". When this tool is selected, the Shape attribute bar is associated with this tool, and appears within the docking bar immediately to the right of the toolbar. When this tool is selected, and when the cursor is passed over the Map window, the cursor is displayed as a crosshair.

When the cursor is displayed as a crosshair, it can be used to "click and drag" an elliptical area within the Map window. This elliptical area defines the area of the ellipse object. A preview of the elliptical area is provided as the user is moving the mouse. To create a circular object, the <shift> key has functionality when the ellipse tool is active. If the user holds down the shift key while creating a ellipse as described above, the proportions is constrained so that only circles can be created. The lesser of the x or y distances that the user has dragged the cursor will define the diameter of the circle. The attributes of the ellipse object are the attributes set as the defaults for the shape objects. These attributes can be changed after the ellipse has been added using the Change Object Attributes tool. The default settings for the ellipse attributes can be changed using the Change Object Attributes Tool and changing the defaults for all shape objects. The ellipse stays within the bounds of the Map window. This is ensured by the fact that the cursor is not available as a crosshair once the mouse leaves the Map window area. Once an ellipse has been added, it can be moved using the Selection\Move tool. The tool remains available until another tool is selected, or until the user moves to another UI screen.

A Polygon Shape Drawing tool 9424 is similar to the polyline tool, except that upon completion, the points of the line will close to form polygon. The tool tip for this tool reads, "Draw Polygon". The text prompt for this tool reads, "Click to add polygon points; double-click to end". When this tool is selected, the Shape attribute bar is associated with this tool, and appears within the docking bar immediately to the right of the toolbar. When this tool is selected, and when the cursor is passed over the Map window, the cursor is displayed as a crosshair.

When the cursor is displayed as a crosshair, the user can click on any point on the map. Upon clicking the map, the starting point of the polyline is established. As the user moves the mouse, a line segment shall follow the cursor, starting at the previous segment point and ending with the ever-changing location of the mouse cursor. The user can define the ending point of the line segment by clicking the mouse again. The line segment appears, with two endpoints. The user can continue to select the end points of addition segments as much as the user likes. To finish the creation of the polygon, the user needs to double-click. Upon the user double-click, the polygon will close at the segment endpoint that is closest to the position of the double-click. The attributes of the polygon are the attributes set as the defaults for the shape objects. These attributes can be changed after the polygon has been added using the Change Object Attributes tool. The default settings for the polygon attributes can be changed using the Change Object Attributes tool. The polygon stays within the bounds of the Map window. This is ensured by the fact that the cursor is not available as a crosshair once the mouse leaves the Map window area. Once a polygon has been added, it can be moved using the Selection\Move tool. The tool remains available until another tool is selected, or until the user moves to another UI screen.

A Point Selection tool 9426 allows users to select an area defined by a point, so that the data behind the point (for the active layer) is available for: information analysis, visual analysis, buffering analysis, and Boolean query analysis. As for information analysis, display of basic information within the Summary window and display of all of the tabular data in the Full Report UI screen is supported. As for visual analysis, upon selection of the point, the data elements (within the active layer) that touch that point are highlighted. As for buffering analysis, after selecting a point, the user can buffer a radial distance off of that point. As for Boolean query analysis, users are able to undertake a Boolean query consisting of up to two Boolean statements.

The tool tip for the Point Selection tool 9426 reads, "Select a Point". The text prompt for this tool reads, "Click on a data element in the selected layer". When this tool is selected, the Active Layer attribute bar is associated with this tool, and appears within the docking bar immediately to the right of the toolbar. When this tool is selected, and when the cursor is passed over the Map window, the cursor is displayed as an arrow.

When the cursor is displayed as an arrow, the user can click on any point on the map. Upon clicking the map, the point is established. After selecting the point, if an Active Layer has been selected, any data element within the active layer that touches the point is highlighted in yellow on the map. The summary information available for that point is displayed within the Summary window. The detailed tabular information on all data elements within the active layer that touch the point is available to the user if the user selects the Full Report button.

If an Active Layer has not been selected, a pop up error message appears, reading ""You must first select an Active Layer before you can select data elements with this tool. The Active Layer defines which layer the enterprise spatial system will search on when you make a selection. <cr> Please select an Active Layer and try again.". The user can begin selecting additional points anytime after the original point is completed. These points is highlighted in yellow as well, and will invoke the same functionality as the original point. The original point will remain on the map until the user chooses to delete it using the Selection Tool or clear it using the clear button. Once a point has been added, it can be moved elsewhere on the map using the Selection tool. The result is the same as if the user deleted the original point and created a new one in the destination location. The tool remains available until another tool is selected, or until the user moves to another UI screen.

A Line Selection tool 9428 allows users to select an area defined by a polyline, so that the data behind the polyline (for the active layer) is available for: information analysis, visual analysis, buffering analysis, and Boolean query analysis. As for information analysis, display of basic information within the Summary window and display of all of the tabular data in the Full Report UI screen is supported. As for visual analysis, upon selection of the point, the data elements (within the active layer) that touch that point are highlighted. As for buffering analysis, after selecting a point, the user can buffer a radial distance off of that point. As for Boolean query analysis, users are able to undertake a Boolean query consisting of up to two Boolean statements. This is useful to determine the attributes for a custom segment of a street, river, etc. As a polyline, the line can consist of one or multiple segments.

The tool tip for this tool reads, "Select a Linear Path". The text prompt for this tool reads, "Select data elements by dragging a line". When this tool is selected, the Active Layer attribute bar is associated with this tool, and appears within the docking bar immediately to the right of the toolbar. When this tool is selected, and when the cursor is passed over the Map window, the cursor is displayed as a crosshair.

The user first "selects" the polyline area. When the cursor is displayed as a crosshair, the user can click on any point on the map. Upon clicking the map, the starting point of the polyline is established. As the user moves the mouse, a line segment shall follow the cursor, starting at the previous segment point and ending with the ever-changing location of the mouse cursor. The user can define the ending point of the line segment by clicking the mouse again. The line segment appears, with two endpoints. The user can continue to select the end points of addition segments as much as the user likes. To finish the creation of the polyline, the user needs to double-click. After selecting the polyline area, the polyline is highlighted in yellow.

If an Active Layer has been selected, any data element within the active layer that touches the polyline is highlighted in yellow on the map. The summary information available for that area is displayed within the Summary window. The detailed tabular information on all data elements within the active layer that touch the polyline is available to the user if the user selects the Full Report button.

If an Active Layer has not been selected, pop up error message appears, reading ""You must first select an Active Layer before you can select data elements with this tool. The Active Layer defines which layer the enterprise spatial system will search on when you make a selection. <cr> Please select an Active Layer and try again.". The user can begin selecting additional polyline areas anytime after the original polyline is completed. These lines is highlighted in yellow as well, and will invoke the same functionality as the original polyline. The original polyline will remain on the map until the user chooses to delete it using the Selection Tool or clear it using the clear button. Once a line has been added, it can be moved elsewhere on the map using the Selection tool. The result is the same as if the user deleted the original polyline and created a new one in the destination location. The tool remains available until another tool is selected, or until the user moves to another UI screen.

A Rectangle Selection tool 9430 allows users to select an area defined by a rectangle, so that the data behind the rectangle (for the active layer) is available for: information analysis, visual analysis, buffering analysis, and Boolean query analysis. As for information analysis, display of basic information within the Summary window and display of all of the tabular data in the Full Report UI screen is supported. As for visual analysis, upon selection of the point, the data elements (within the active layer) that touch that point are highlighted. As for buffering analysis, after selecting a point, the user can buffer a radial distance off of that point. As for Boolean query analysis, users are able to undertake a Boolean query consisting of up to two Boolean statements.

The tool tip for this tool reads, "Select a Rectangular Area". The text prompt for this tool reads, "Drag a rectangular area to select data elements in the selected layer". When this tool is selected, the Active Layer attribute bar is associated with this tool, and appears within the docking bar immediately to the right of the toolbar. When the cursor is displayed as a crosshair, it can be used to "click and drag" a rectangular area within the Map window. This rectangular area defines the area of selection for analysis. A preview of the rectangular area is provided as the user is moving the mouse. To create a perfect square object, the <shift> key has functionality when the select rectangle tool is active. If the user holds down the shift key while creating a rectangular area as described above, the proportions is constrained so that only squares can be created. The lesser of the x or y distances that the user has dragged the cursor will define the length of the sides of the square.

After selecting the rectangular area, the rectangle is highlighted in yellow. If an Active Layer has been selected, any data element within the active layer that touches the rectangle is highlighted in yellow on the map. The summary information available for that area is displayed within the Summary window. The detailed tabular information on all data elements within the active layer that touch the rectangle is available to the user if the user selects the Full Report button.

If an Active Layer has not been selected, a pop up error message appears, reading ""You must first select an Active Layer before you can select data elements with this tool. The Active Layer defines which layer the enterprise spatial system will search on when you make a selection. <cr> Please select an Active Layer and try again.".

The user can begin selecting additional rectangular areas anytime after the original rectangle is completed. These rectangles is highlighted in yellow as well, and will invoke the same functionality as the original rectangle. The original rectangle will remain on the map until the user chooses to delete it using the Selection Tool or clear it using the clear button. Once a rectangle has been added, it can be moved elsewhere on the map using the Selection tool. The result is the same as if the user deleted the original rectangle and created a new one in the destination location.

This tool is the default selection within the Analysis Tools Expansion Toolbar. The tool remains available until another tool is selected, or until the user moves to another UI screen.

An Ellipse Selection tool 9432 allows users to select an area defined by an ellipse, so that the data behind the ellipse (for the active layer) is available for: information analysis, visual analysis, buffering analysis, and Boolean query analysis. As for information analysis, display of basic information within the Summary window and display of all of the tabular data in the Full Report UI screen is supported. As for visual analysis, upon selection of the point, the data elements (within the active layer) that touch that point are highlighted. As for buffering analysis, after selecting a point, the user can buffer a radial distance off of that point. As for Boolean query analysis, users are able to undertake a Boolean query consisting of up to two Boolean statements.

The tool tip for this tool reads, "Select an Elliptical Area". The text prompt for this tool reads, "Drag an elliptical area to select data elements in the selected layer". When this tool is selected, the Active Layer attribute bar is associated with this tool, and appears within the docking bar immediately to the right of the toolbar.

When the cursor is displayed as a crosshair, it can be used to "click and drag" an elliptical area within the Map window. This elliptical area defines the area of selection for analysis. A preview of the elliptical area is provided as the user is moving the mouse. To create a round object, the <shift> key has functionality when the select ellipse tool is active. If the user holds down the shift key while creating a elliptical area as described above, the proportions is constrained so that only circles can be created. The lesser of the x or y distances that the user has dragged the cursor will define the height and width of the circle.

After selecting the elliptical area, if an Active Layer has been selected, any data element within the active layer that touches the elliptical area is highlighted in yellow on the map. The summary information available for that area is displayed within the Summary window. The detailed tabular information on all data elements within the active layer that touch the elliptical area is available to the user if the user selects the Full Report button. If an Active Layer has not been selected, a pop up error message appears, reading ""You must first select an Active Layer before you can select data elements with this tool. The Active Layer defines which layer the enterprise spatial system will search on when you make a selection. <cr> Please select an Active Layer and try again.".

The user can begin selecting additional elliptical areas anytime after the original ellipse is completed. These ellipses is highlighted in yellow as well, and will invoke the same functionality as the original ellipse. The original ellipse will remain on the map until the user chooses to delete it using the Selection Tool or clear it using the clear button. Once an ellipse has been added, it can be moved elsewhere on the map using the Selection tool. The result is the same as if the user deleted the original ellipse and created a new one in the destination location. The tool remains available until another tool is selected, or until the user moves to another UI screen.

A Polygon Selection tool 9434 allows users to select an area defined by a polygon, so that the data behind the polygon (for the active layer) is available for: information analysis, visual analysis, buffering analysis, and Boolean query analysis. As for information analysis, display of basic information within the Summary window and display of all of the tabular data in the Full Report UI screen is supported. As for visual analysis, upon selection of the point, the data elements (within the active layer) that touch that point are highlighted. As for buffering analysis, after selecting a point, the user can buffer a radial distance off of that point. As for Boolean query analysis, users are able to undertake a Boolean query consisting of up to two Boolean statements.

The tool tip for this tool reads, "Select a Polygon Area". The text prompt for this tool reads, "Define the polygon area that will select data elements in the selected layer". When this tool is selected, the Active Layer attribute bar is associated with this tool, and appears within the docking bar immediately to the right of the toolbar.

The user first "selects" the polygon area. When the cursor is displayed as a crosshair, the user can click on any point on the map. Upon clicking the map, the starting point of the polygon is established. As the user moves the mouse, a line segment shall follow the cursor, starting at the previous segment point and ending with the ever-changing location of the mouse cursor. The user can define the ending point of the line segment by clicking the mouse again. The line segment appears, with two endpoints. The user can continue to select the end points of addition segments as much as the user likes. To finish the creation of the polygon, the user needs to double-click. Upon the user double-click, the polygon will close at the segment endpoint that is closest to the position of the double-click.

After selecting the polygon area, the polygon is highlighted in yellow. If an Active Layer has been selected, any data element within the active layer that touches the polygon is highlighted in yellow on the map. The summary information available for that area is displayed within the Summary window. The detailed tabular information on all data elements within the active layer that touch the polygon is available to the user if the user selects the Full Report button. If an Active Layer has not been selected, a pop up error message appears, reading ""You must first select an Active Layer before you can select data elements with this tool. The Active Layer defines which layer the enterprise spatial system will search on when you make a selection. <cr> Please select an Active Layer and try again.".

The user can begin selecting additional polygon areas anytime after the original polygon is completed. These polygon is highlighted in yellow as well, and will invoke the same functionality as the original polygon. The original polygon will remain on the map until the user chooses to delete it using the Selection Tool or clear it using the clear button. Once a polygon has been added, it can be moved elsewhere on the map using the Selection tool. The result is the same as if the user deleted the original polygon and created a new one in the destination location. The tool remains available until another tool is selected, or until the user moves to another UI screen.

A Select by Copy tool 9436 allows the user to copy a data element from one layer to another, at which point the shape of the copied data element becomes the selection area. The tool tip for this tool reads, "Select by Copying an Object". The text prompt for this tool reads, "Use this tool to select data elements by copying a shape from anther layer". When this tool is selected, the Active Layer attribute bar is associated with this tool, and appears within the docking bar immediately to the right of the toolbar. When this tool is selected, and, when the cursor is passed over the Map window, the cursor is displayed as a selection arrow (the selection arrow is different in appearance than the standard cursor arrow).

When the cursor is moved over the Map window, the user can click on any point on the active data layer. If an Active Layer has been selected prior to the selection of a point, the Copy Object pop up appears, allowing the user to input a layer to copy the object to. Upon closing the pop up, the shape outline (i.e. point, line, or polygon shape file) of the selected editable data element is copied to the layer that the use indicated in the Copy Object pop up. The Active Layer then switched to the "copy to" layer. The outline shape appears, and functions as if the user had used any of the analysis selection tools to create that shape file (i.e. it defines the area selected for analysis). The user can use the selection tool to select this point, line, or polygon and the result is the selection of the associated area for analysis.

If an Active Layer has not been selected prior to the selection of a point, a pop up error message appears, reading ""You must first select an Active Layer before you can select data elements with this tool. The Active Layer defines which layer the enterprise spatial system will search on when you make a selection. <cr> Please select an Active Layer and try again.".

The tool remains available until another tool is selected, or until the user moves to another UI screen.

A Buffer tool 9438 allows users to "buffer", or create an offset, from a data element that exists on the active data layer. The tool tip for this tool reads, "Buffer". There is no text prompt for this tool, in that it merely launches a pop up dialog box". There is no attribute bar associated with this tool.

Before selecting this tool, the user first select one or more data elements. When the user selects the buffer tool, the enterprise spatial system checks that at least one data element within the visible layers has been selected using one of the analysis selection tools. If no data element within the visible layers has been selected, an error message appears within a pop up reading, "One or more data elements must be selected before the buffer tool can be used. Please use one of the selection tools to select the data elements that you would like to buffer, and try again." If at least one data element within the visible layers has been selected, the Buffering pop up dialog box appears. This dialog box allows the user to input a linear buffering offset distance.

Once the user has provided the buffering information, the buffering is applied to the map. The buffer area that the user has defined is overlaid on the map as a new polygon, displayed in the color that the user selected in the buffering pop up. If the user chose to use the buffer to select data elements on a specific layer, the enterprise spatial system will look for data elements touching anywhere within the buffered region and on the selected layer. Any such data elements are selected (e.g., highlighted in yellow). The analysis attributes become available to the customer in the Analysis Summary window. The Full Report button becomes available. The full report is available by selecting the full report button. The buffered area remains displayed until the user selects another area for analysis.

Since the buffer tool primarily is used only to launch a pop up, it does not remain selected after its use. Instead, the tool that was selected previous to its use is the selected tool. Each time that the user wants to use this tool, the user selects the tool.

A Query tool 9440 allows the user to define a Boolean query for an active layer and highlight the data within the Map window. The tool tip for this tool reads, "Query". There is no text prompt for this tool, in that it merely launches a pop up dialog box. There is no attribute bar associated with this tool.

When this tool is selected, it immediately launches the Boolean Query pop up dialog box. If the user successfully defines a query in this dialog box, then the results are highlighted in the Map window. The Full Report button is available. Upon selection, the full report will launch the detailed attribute data for the data that meets the Boolean criteria.

Since the query tool primarily is used only to launch a pop up, it does not remain selected after its use. Instead, the tool that was selected previous to its use is the selected tool. Each time that the user wants to use this tool, the user selects the tool.

A Clear tool 9442 allows the user to clear the analysis or buffer that is currently active and highlighted within the Map window. This tool shall only become available when one or more data elements are currently selected (e.g., highlighted). Otherwise, the tool is grayed out and unavailable. The tool tip for this tool reads, "Clear Analysis". There is no text prompt for this tool, in that it's action takes effect immediately. There is no attribute bar associated with this tool.

When this tool is selected, it immediately clears any active analysis. Highlighted items on the map is cleared. Information in the Analysis Summary window is cleared. The Full Report button will no longer be available. Since the clear analysis tool primarily is used only to launch a pop up, it does not remain selected after its use. Instead, the tool that was selected previous to its use is the selected tool. Each time that the user wants to use this tool, the user selects the tool.

Figure 95A:
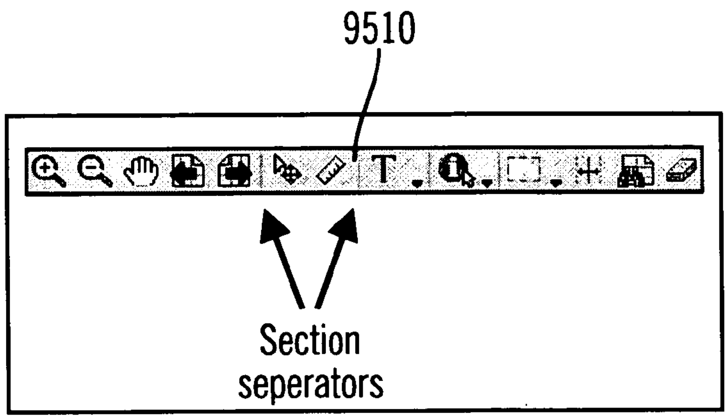
FIGS. 95A–95F illustrate toolbars in accordance with certain implementations of the invention.

As for tool icon grouping, the icons for the various tools are grouped together according to functionality, in order to help users find "like functionality". Two forms of grouping exist. The first is to separate groups into various "sections". The sections are separated with a beveled line. FIG. 95A illustrates section separators (e.g., 9510) in accordance with certain implementations of the invention.

Figure 95B:
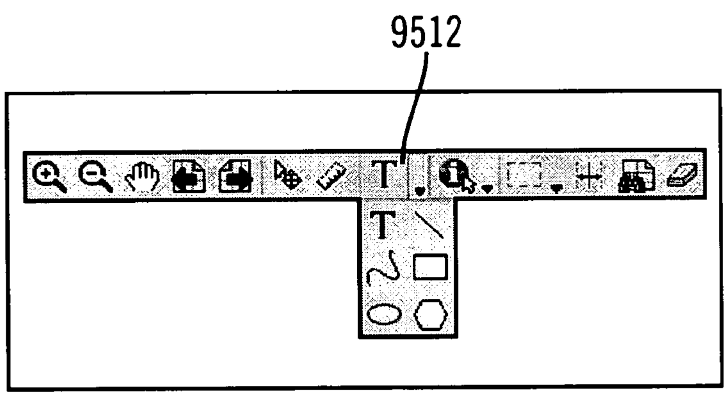

The second form of grouping is to group icons together into an "expanded tool view". This is used when the tools are very similar in functionality, in order to save space or o reduce the amount of clutter on the toolbar. This control uses a selection arrow to open an expanded toolbar area. The expansion is located inside of the main toolbar, top aligned with the top of the arrow button fro that expansion toolbar. The expansion toolbars display two columns of tools. Standard Rollover effects are used. When a user selects an icon from the expansion, the expanded toolbar closes. The selected icon is now the primary icon for that expansion and is visible on the main toolbar. The icon is shown as selected on the main toolbar. When the expansion toolbar is used, there is a default icon available from the main toolbar. FIG. 95B illustrates grouping of tools into expansion toolbars 9512 in accordance with certain implementations of the invention. As shown in FIG. 95B, the Text tool is the default tool for the Drawing tools Expansion Toolbar.

Figure 95C:
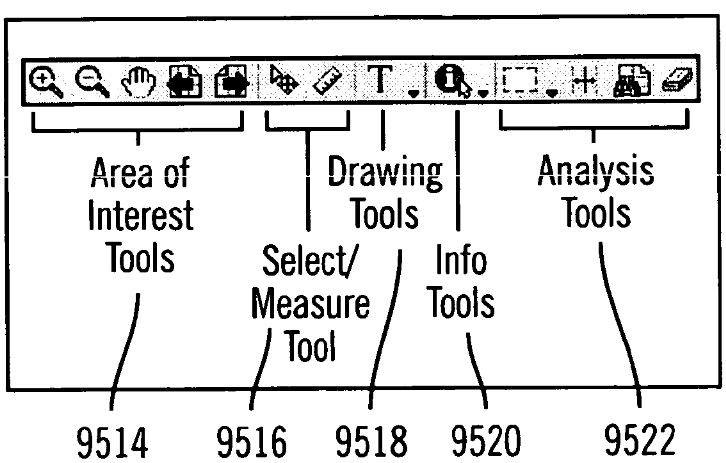
Figure 95D:
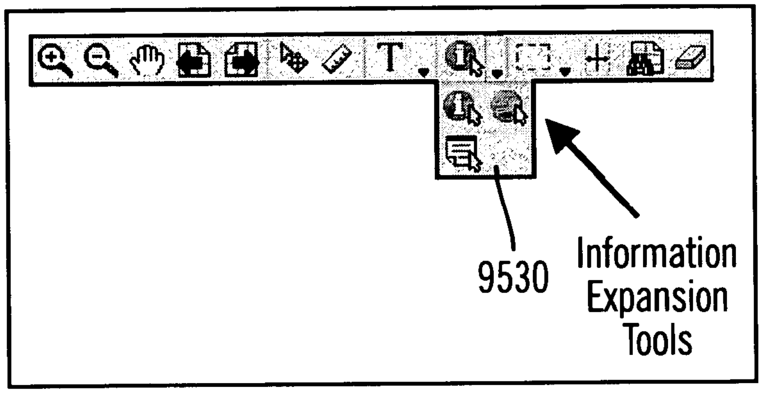
Figure 95E:
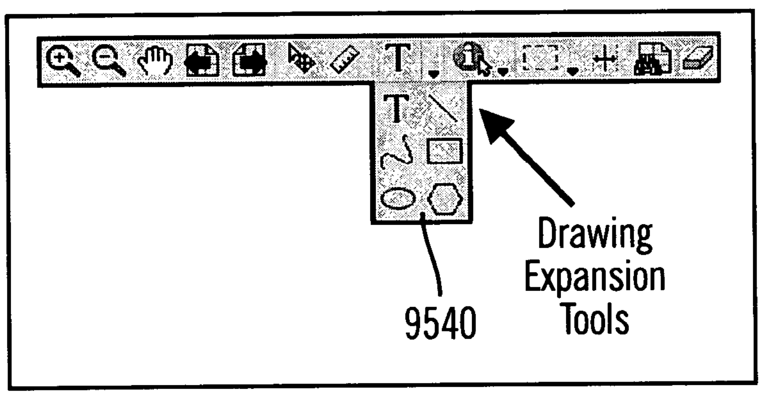
Figure 95F:
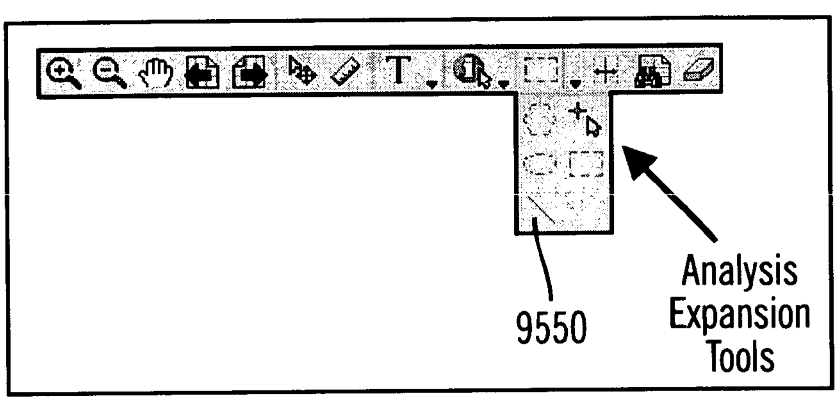

In the information expansion tools, the default tool is the Point n' View. In the analysis expansion tools, the default tool is the select rectangle tool. FIG. 95C illustrates sections 9514, 9516, 9518, 9520, 9522 within a toolbar in accordance with certain implementations of the invention. The expansion toolbars available within the enterprise spatial system software include an Information Tools Expansion Toolbar, a Drawing Tools Expansion Toolbar, and an Analysis Tool Expansion Toolbar. FIG. 95D illustrates an Information Tools Expansion Toolbar 9530 in accordance with certain implementations of the invention. FIG. 95E illustrates a Drawing Tools Expansion Toolbar 9540 in accordance with certain implementations of the invention. FIG. 95E illustrates an Analysis Tools Expansion Toolbar 9550 in accordance with certain implementations of the invention.

FIG. 96 illustrates a table 9610 in which tools described herein may be grouped in accordance with certain implementations of the invention.

Figure 97A:
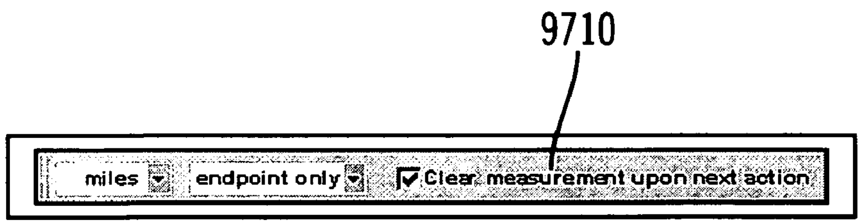
FIGS. 97A–97D illustrate attribute bars in accordance with certain implementations of the invention.

FIG. 97A illustrates a Measure attribute bar 9710 in accordance with certain implementations of the invention. The Measurement attribute bar is available whenever the user has selected the measurement tool and gives the user various options for use with the measurement tool, including the ability to define the unit of measurement, show measurements only at the endpoint or at each segment of the polyline, and determine whether the measurement will automatically be cleared when the user starts a new task. The attribute bar meets the standard guidelines for the use of attribute bars. The attribute bar pop up appears immediately to the right of the toolbar within the docking bar.

A Measurement Unit drop down list contains the full list of available units of measurement, to include, for example, miles, yards, feet, kilometers, and meters. A Display Location drop down list contains “endpoint only” and “all segments” options.

In FIG. 97A, if the user makes a selection from the measurement unit drop down list, the unit of display is changed for the next measurement action. If the user makes a selection from the display location drop down list, and if the user selects “endpoint only”, the distance measurement is displayed at the last segment endpoint of the polyline for future measurement actions. Every time that a new segment is added to the polyline, the display is updated so that the distance is displayed only at the new endpoint. If the user selects “all segments”, the distance measurement is displayed at every line segment endpoint in the polyline. Every time that a new segment is added to the polyline, the display is updated so that the distance is also displayed at this new segment endpoint.

If the user selects the Clear measurement checkbox, the line segment(s) and measurement display are cleared at the user’s next action within the enterprise spatial system software (i.e. upon the user selecting another control within the enterprise spatial system software). If the user deselects the Clear measurement checkbox, the line segment(s) and measurement display will not be cleared at the user’s next action within the enterprise spatial system software. This is useful if the user wants to create a map that includes, for example, the measurement information.

The user has to use the selection tool to select the measurement “line”, and chose the delete key to remove the measurement from display. A pop up message appears, stating “You have chosen to leave the measurement display on the map until you chose to delete it. To delete the measurement display, chose the Select Tool <insert graphic of tool>, use the cursor to select the measurement display, then select the delete key”. The user’s selection(s) in these areas shall remain in effect until: the user changes the selection or the measurement tool is no longer active.

Figure 97B:
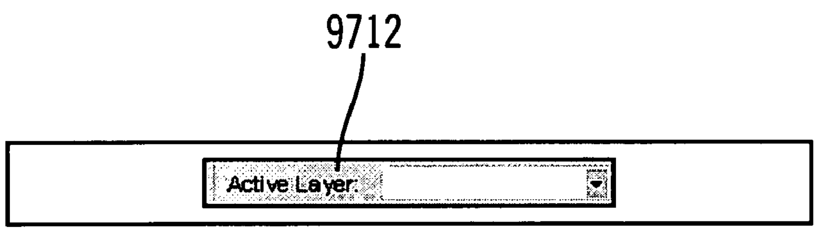

FIG. 97B illustrates an Active Layer attribute bar 9712 in accordance with certain implementations of the invention. This attribute bar is used whenever any analysis tool is selected that requires the selection of an active layer. The attribute bar meets the standard guidelines for the use of attribute bars. The attribute bar pop up appears immediately to the right of the toolbar within the docking bar.

An Active Layer drop down list contains the full list of data layers that are currently set as visible. The current active layer, if there is one, is displayed. Selection of a new font from the drop down is optional. This drop down box is always available to the user. This control has the initial focus.

In FIG. 97B, if the user makes a selection from the Active Layer drop down list, then the active layer is updated to the selected layer.

Figure 97C:
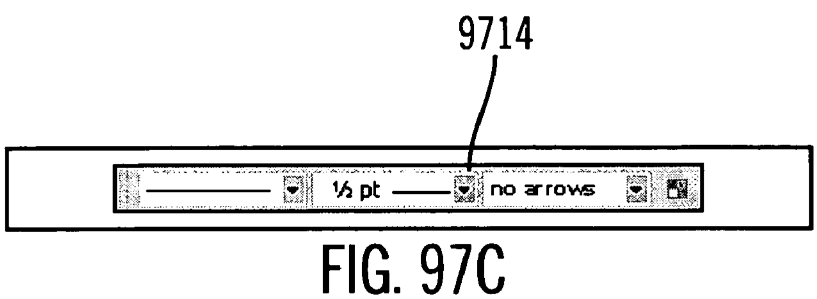

FIG. 97C illustrates a Line attribute bar 9714 in accordance with certain implementations of the invention. This attribute bar is used whenever a user wishes to change the one or more of the attribute settings for a line that has been or is draw on the map.

Figure 97D:
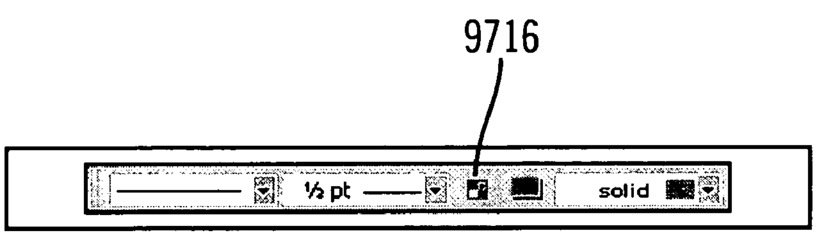

FIG. 97D illustrates a shape attribute bar 9716 in accordance with certain implementations of the invention. This attribute bar is used whenever a user wishes to change the one or more of the attribute settings for a rectangle, ellipse, or polygon shape that has been or is draw on the map.

Figure 98A:
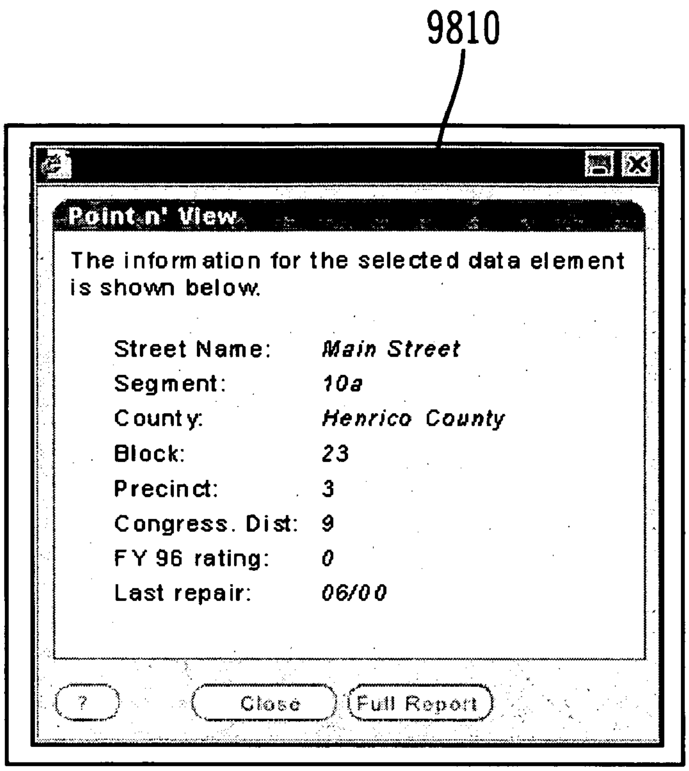
FIGS. 98A–98B illustrates Point n' View pop up dialog boxes in accordance with certain implementations of the invention.

FIG. 98A illustrates a Point n' View pop up dialog box 9810 in accordance with certain implementations of the invention. A Point n' View pop up dialog box is used whenever a user wishes to determine the underlying attribute data for a specific data element on the active layer. For each data layer available from the enterprise spatial system, the top attribute elements (e.g., up to six per) are marked for inclusion in the Point n' View summary. Dynamic display is supported. With the Dynamic Field Name Display: the field name is dynamically inserted; this text appears immediately below the introductory text; this text is indented approximately 10 pixels; the font is Arial; the point size of the font is 11; the font to be used is normal; the text color is black; and, there is no aliasing of the text. With the Dynamic Attribute Text: the attribute information for the associated field is inserted; this text is to the right of the field name; the font is Arial; the point size of the font is 11; the style of the font is italic; the text color is black; and, there is no aliasing of the text.

If the user selects the Full Report button, the pop up is closed. The Full Report pop up is launched for the data element that was displayed within the Point n' View pop up.

Figure 98B:
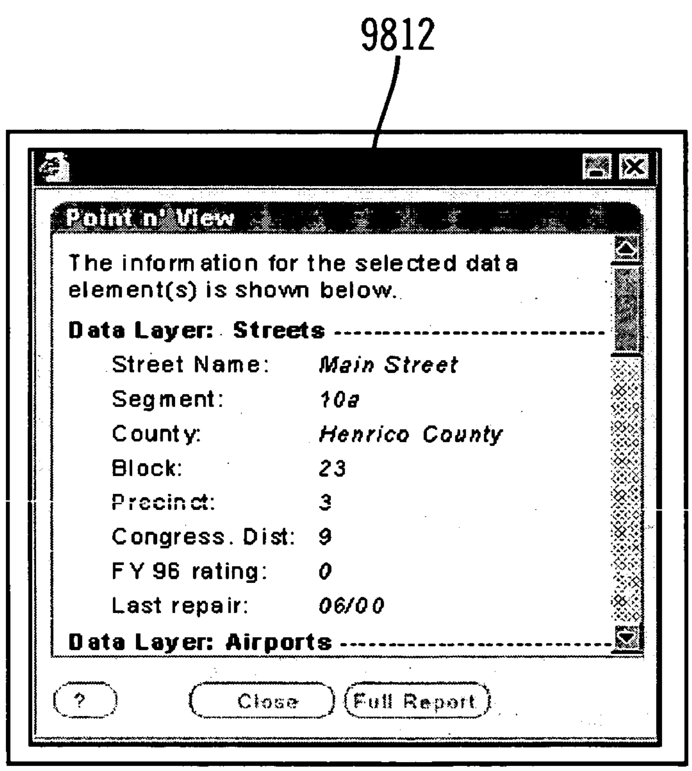

FIG. 98B illustrates a Global Point n' View pop up dialog box 9812 in accordance with certain implementations of the invention. This pop up dialog box is very similar to the Point n' View pop up dialog box, except that it is used whenever a user wishes to determine the underlying attribute data for a specific data element on all visible data layers. The differences between this pop up and the Point n' View are as follows: the pop up area is scrollable and the dynamic data for each layer is presented to the user; each layer is separated with a label, reading “Data Layer: <insert data layer name”; and, the Full Report button will launch the full report for all of the data layers.

Figure 99:
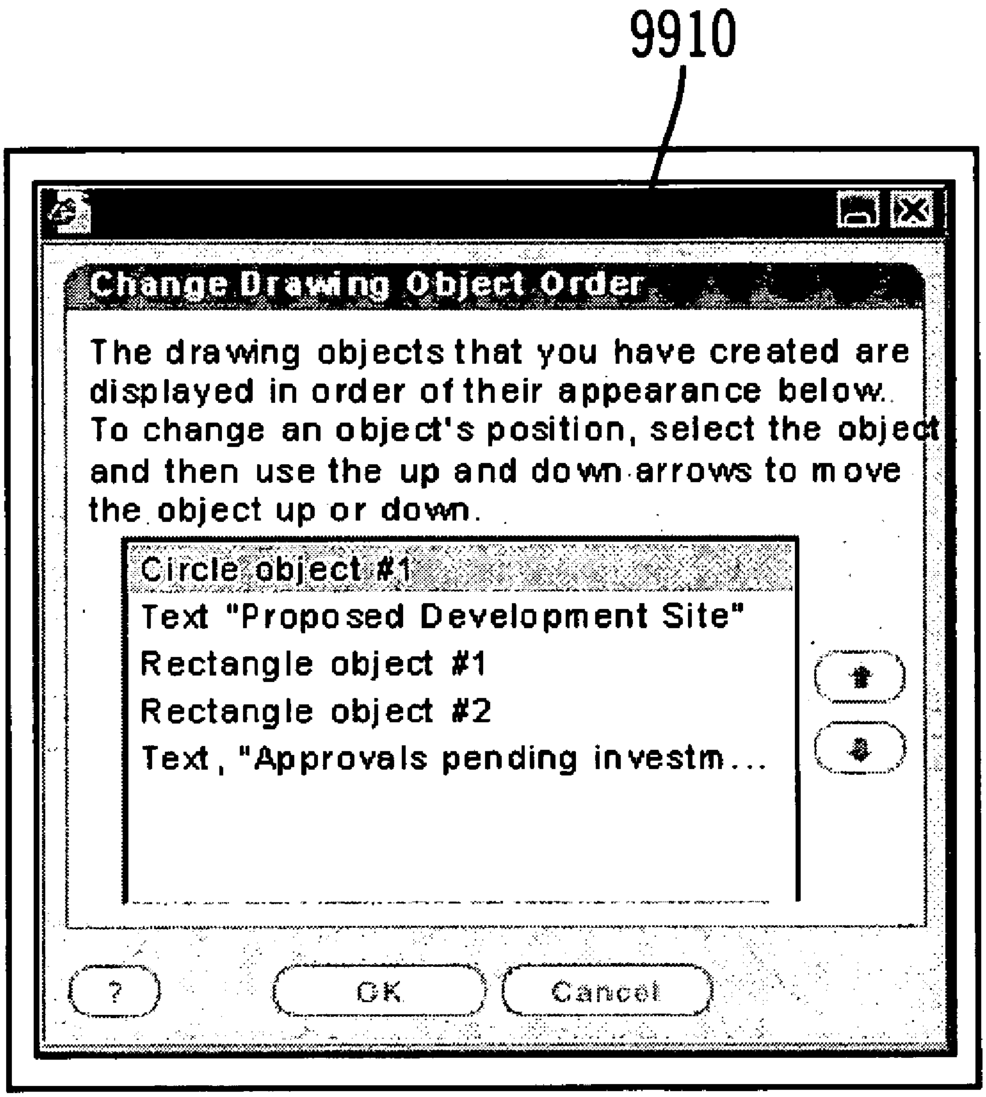
FIG. 99 illustrates a Change Drawing Object Order pop up dialog box in accordance with certain implementations of the invention.

FIG. 99 illustrates a Change Drawing Object Order pop up dialog box 9910 in accordance with certain implementations of the invention. This pop up dialog box is used whenever a user has indicated a desire to rearrange the order of the various drawing objects created by the user. The purpose of this UI screen is to provide an interface that allows the user to define in what order the drawing objects is displayed. Drawing objects as a group, are displayed on top of all other map layers. A Data Layer List Box control consists of three elements, including a list box and two buttons.

Figure 100:
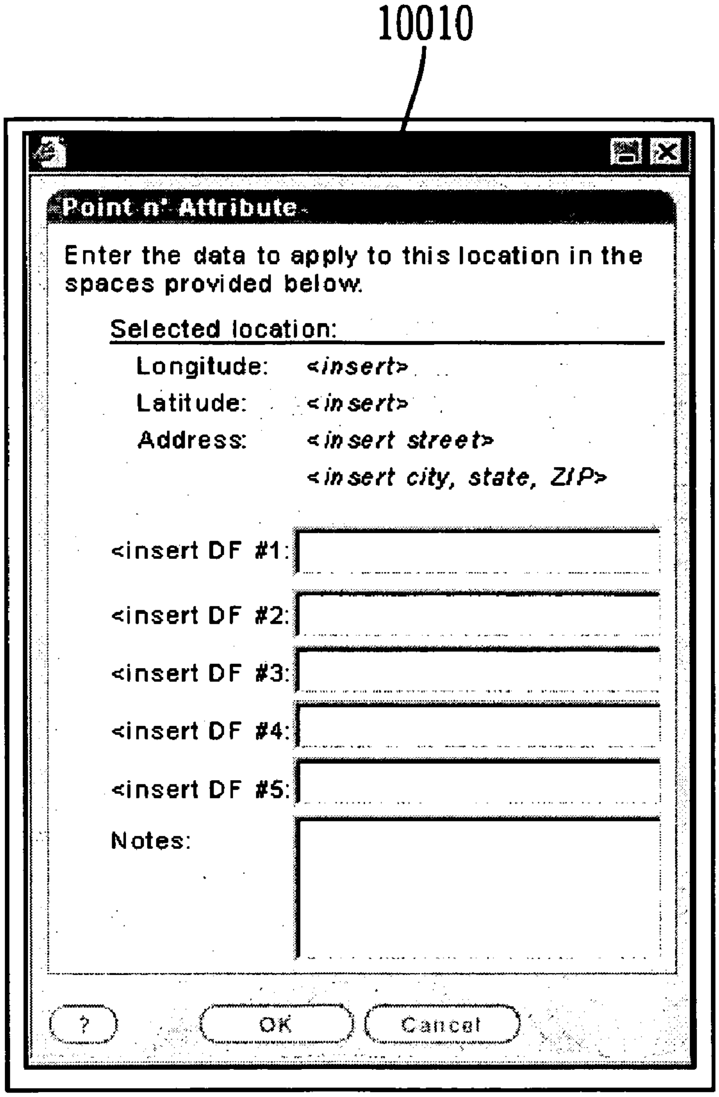
FIG. 100 illustrates a Point n' Attribute pop up dialog box in accordance with certain implementations of the invention.

FIG. 100 illustrates a Point n' Attribute pop up dialog box 10010 in accordance with certain implementations of the invention. Every project has an associated data store that is reserved for the user to provide input to. The Point n' Attribute functionality allows the user to add data to this data store, and more specifically, add data that gets tied to an exact spatial location. The data can then be exported for use in any number of different software (e.g., applications)s.

This pop up dialog box 10010 provides the Point n' Attribute functionality and is accessed when the user selects the Point n' Attribute tool from the toolbar on the main UI screen. As for longitude dynamic text, the longitudinal position that the user clicked upon with the Point n' Attribute tool active is dynamically inserted in degrees, minutes, and seconds. As for latitude dynamic text, the latitudinal position that the user clicked upon with the Point n' Attribute tool active is dynamically inserted in degrees, minutes, and seconds. As for address dynamic text, a check is made to determine whether an address can be found from the latitude and longitude values. If yes, then the address 1 and address 2 lines of the address are dynamically inserted in the following location: the text is to the right of the static prompt, and the text is aligned with all of the field controls in this pop up dialog box.

Before the Point n' Attribute pop up dialog box is launched, a check is made to determine whether this is this first time that the Point n' Attribute data store has been accessed for this project. If yes (if it is the first time), then the Setup Point n' Attribute pop up dialog box is launched and successfully completed before this pop up dialog box appears to the user. If no (i.e. if the data store has already been setup), then the Point n' Attribute pop up dialog box becomes available to the user.

When the pop up dialog box is first launched, data for the dynamic displays is retrieved. For example, the longitudinal position that the user clicked upon with the Point n' Attribute tool (in degrees, minutes, and seconds) is retrieved and inserted into the Longitude Dynamic Text control. Also, the latitudinal position that the user clicked upon with the Point n' Attribute tool (in degrees, minutes, and seconds) is retrieved and inserted into the Latitude Dynamic Text control. A check is made to determine whether an address can be found for the longitude and latitude that the user clicked upon with the Point n' Attribute tool. If yes, then the address 1 and address 2 lines of the address are dynamically inserted into the dynamic address text.

Figure 101:
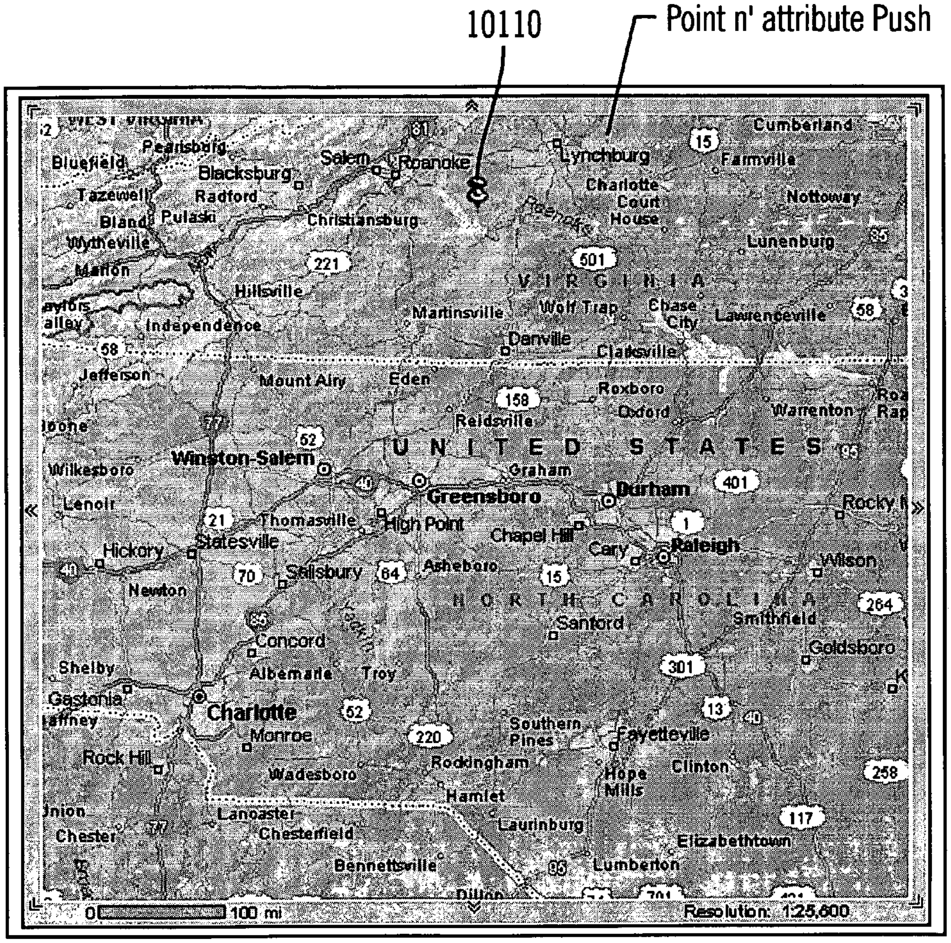
FIG. 101 illustrates a push pin in accordance with certain implementations of the invention.

If the user selects the OK button, then the following actions are performed: a new record is added to the Point n' Attribute data store for the current project; all of the data entries provided by the user is stored in the data store in their appropriate fields; the longitude is stored in a longitude field that is automatically created for the record; the latitude is stored in a longitude field that is automatically created for the record; the address, if found, is stored in an address field that is automatically created for the record; the date of input is stored in a date field that is automatically created for the record; the data store record is saved; a graphic of a "push pin" is placed on the map on the spot where the user clicked with the Point n' Attribute tool. FIG. 101 illustrates a push pin 10110 in accordance with certain implementations of the invention. The push pin is an indication that the user has associated a data store record with that location. The user can click on the push pin with the selection tool. This will launch the Point n' Attribute pop up dialog box, pre-filled with the data that exists for that record. The user can edit or view the data.

Figure 102:
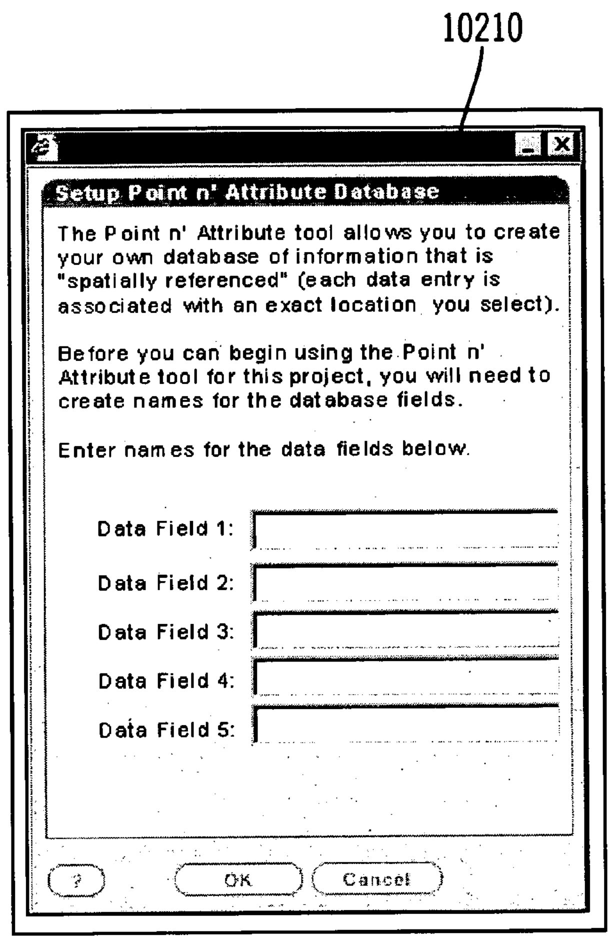
FIG. 102 illustrates a Setup Point n' Attribute pop up dialog box in accordance with certain implementations of the invention.

FIG. 102 illustrates a Setup Point n' Attribute pop up dialog box 10210 in accordance with certain implementations of the invention. This pop up dialog box appears when a user selects the Point n' Attribute tool for the first time in a given project to allow the user to custom define the field names for the Point n' Attribute data store file to be associated with this record.

Figure 103:
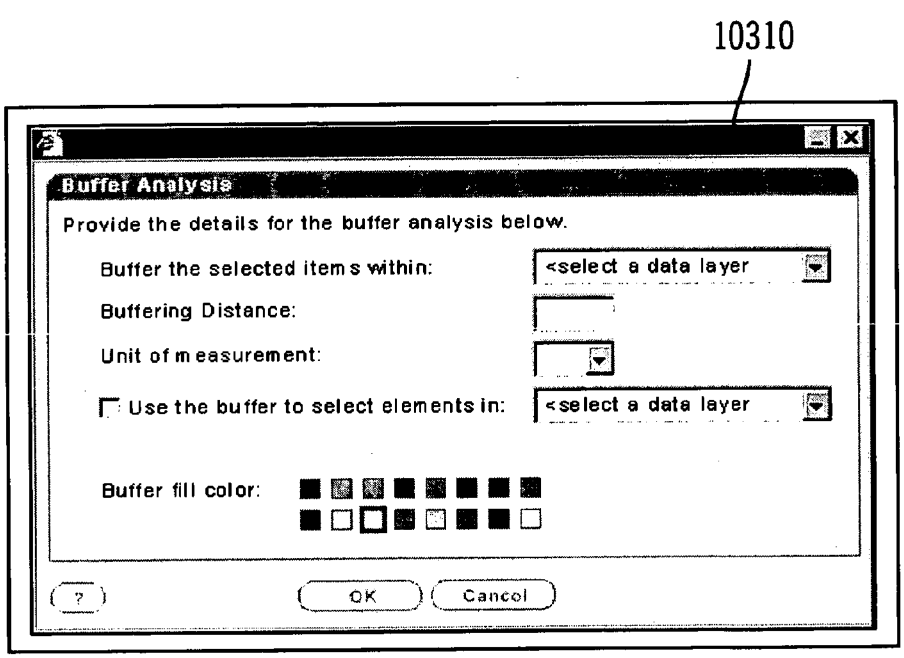
FIG. 103 illustrates a Buffering pop up dialog box in accordance with certain implementations of the invention.

FIG. 103 illustrates a Buffering pop up dialog box 10310 in accordance with certain implementations of the invention. This pop up dialog box is used whenever a user wishes to buffer a linear distance off of a selected data element or data elements. This pop up dialog box is accessed when the user has selected the buffer tool from the toolbar on the main UI screen.

Figure 104:
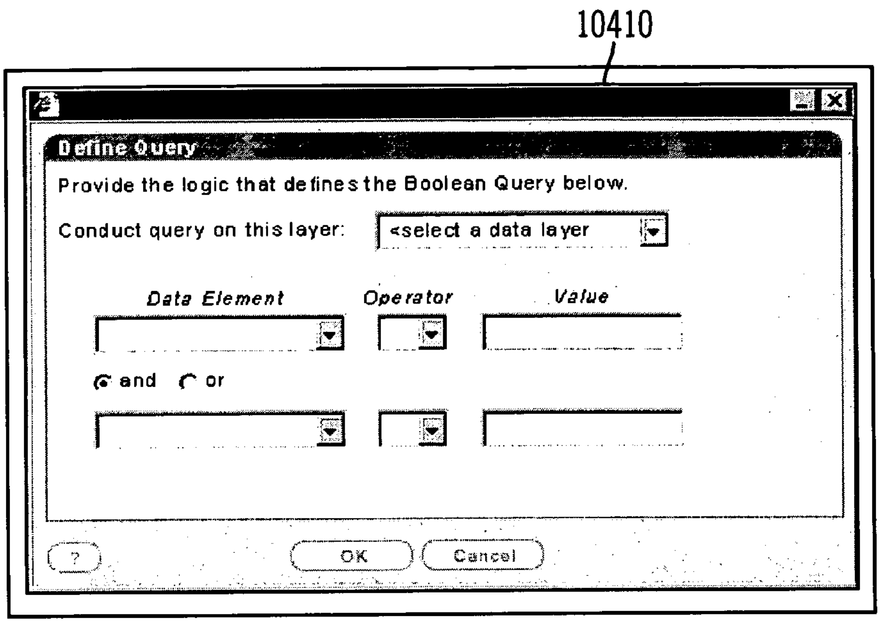
FIG. 104 illustrates a Boolean Query pop up dialog box in accordance with certain implementations of the invention.

FIG. 104 illustrates a Boolean Query pop up dialog box 10410 in accordance with certain implementations of the invention. This pop up dialog box is used when the user wants to run a Boolean query against the active data layer. This pop up dialog box is launched when the user selects the Query Tool from the toolbar.

Figure 105:
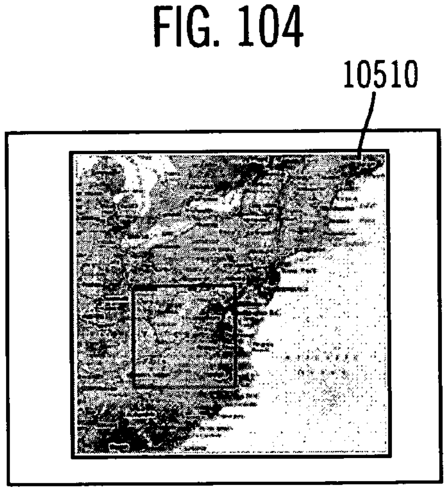
FIG. 105 illustrates a reference map in accordance with certain implementations of the invention.

FIG. 105 illustrates a reference map 10510 in accordance with certain implementations of the invention. The map display within the reference window is the default imagery used in the enterprise spatial system software, independent of the imagery selection made by the user. The Map window is a custom control whose function is twofold. First, a "reference" map is displayed within the window to provide a frame of reference as to where the Area of Interest (as displayed in the Main Map window) is with respect to the greater geographical area. A red square outline is overlaid on the map representing the area of the AOI. As the user zooms in, zooms out, or pans, the square shall move and size appropriately to represent the size and location of the AOI.

Second, the area of the map contained within the reference Map window is determined as follows: initially, the area of the reference Map is the "geographic constraint" area for the user (i.e. each user is set up so that they can only work within a certain geographic area—the starting reference map is this area); when a user zooms in closely with the AOI to the point where the red square would get smaller than 5 pixels by 5 pixels in size, the reference map is zoomed in such that the AOI is ½ the height of the new reference map and ½ the width of the new reference map; and, when a user zooms out beyond the extent of the reference map, the reference map shall zoom out by an equal amount (although it does not zoom out beyond the geographical constraint setup for the user).

The reference map allows the user to pan the AOI. When the cursor is passed over the red rectangle, the cursor is displayed as a hand (same graphic as is used in the pan icon). When the cursor is displayed as a hand, the user can click on any point on the map to "grab" the map at what becomes the "handle point". While keeping the left mouse button held down, the user can "drag" the red rectangular area anywhere within the reference map area. Upon releasing the handle point, the AOI is updated to the AOI enclosed within the moved rectangular region. A check is made to determine whether or not the updated AOI has support for the base image that is currently selected. If the base image is not available for the new AOI, then the AOI-Base Image Conflict pop up dialog box appears. If the user selects to change the AOI, then the Map window is refreshed with the new AOI and reversion to "none" as the Base Image selection is performed. If the user chooses to keep the Base Image, the AOI shall not be updated. If the Base Image is available, the Map window is refreshed with the new AOI.

As for the reference map window location, the reference map is located immediately to the right of the map frame. The reference map is top aligned with the map frame. The location of the Map window is fixed—the user has no ability to move the window.

As for the reference map border, a border separates the Map window from the map frame.

Figure 106:
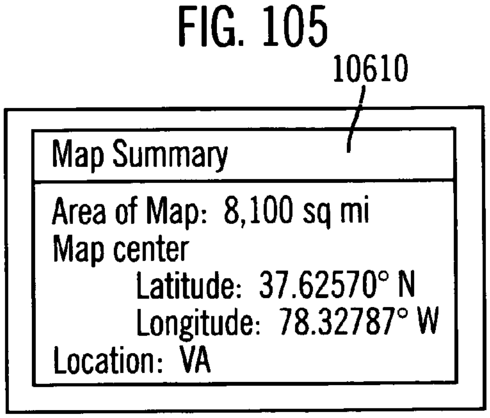
FIG. 106 illustrates a Map Summary window in accordance with certain implementations of the invention.

FIG. 106 illustrates a Map Summary window 10610 in accordance with certain implementations of the invention. The purpose of this portion of the main UI screen is to allow users to view basic information about the Area of Interest that has been defined. It is a display area that is updated every time that the user update the AOI The detailed characteristics are as follows. As for longitude dynamic text, the Longitude of the center point of the AOI is dynamically inserted, and the value is presented to the user in the format dd.mmss D, where: "dd" is the degrees, "mm" is the minutes, "ss" is the seconds, and D is the one letter representation for direction (E=east, W=west). As for location dynamic text, the largest location enclosed within the AOI is dynamically inserted.

Figure 107:
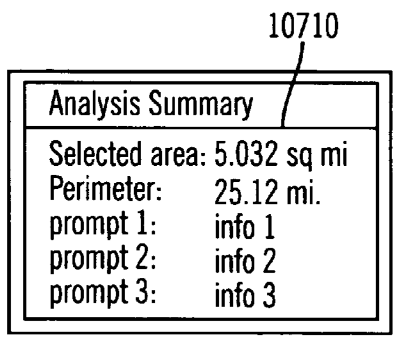
FIG. 107 illustrates an Analysis Summary window in accordance with certain implementations of the invention.

FIG. 107 illustrates an Analysis Summary window 10710 in accordance with certain implementations of the invention. The purpose of this portion of the main UI screen is to provide summary information about the data in the Active Layer and within a user-defined area. It is a display area that is updated every time that the user changes the analysis selection area.

As for layer specific dynamic text, this area of the UI screen displays information about the data within the Active Data Layer. Each data layer has different information about it that is most important, and as a result has different information that is displayed within the final 3 lines of display remaining within the Analysis Summary window. This control, therefore, is flexible enough to support a variety of information types that will vary from data layer to data layer. The dynamic text consists of two components: a dynamic prompt and dynamic information. The dynamic prompt is the field name for the information displayed. The dynamic information is the cumulative information for the corresponding field for all data elements within the analysis area.

Figure 108:
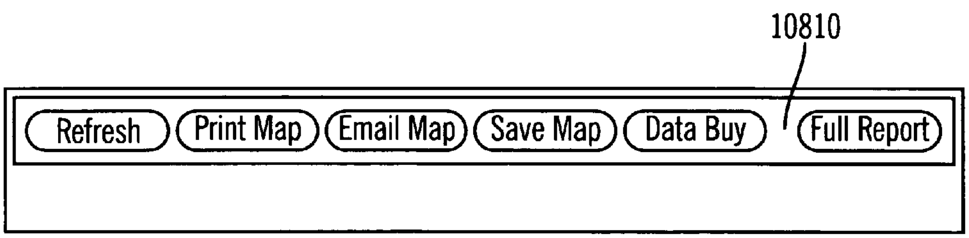
FIG. 108 illustrates Command buttons in accordance with certain implementations of the invention.

FIG. 108 illustrates Command buttons 10810 in accordance with certain implementations of the invention. These various buttons provide functionality that is described in the specific areas that they address.

Figure 109:
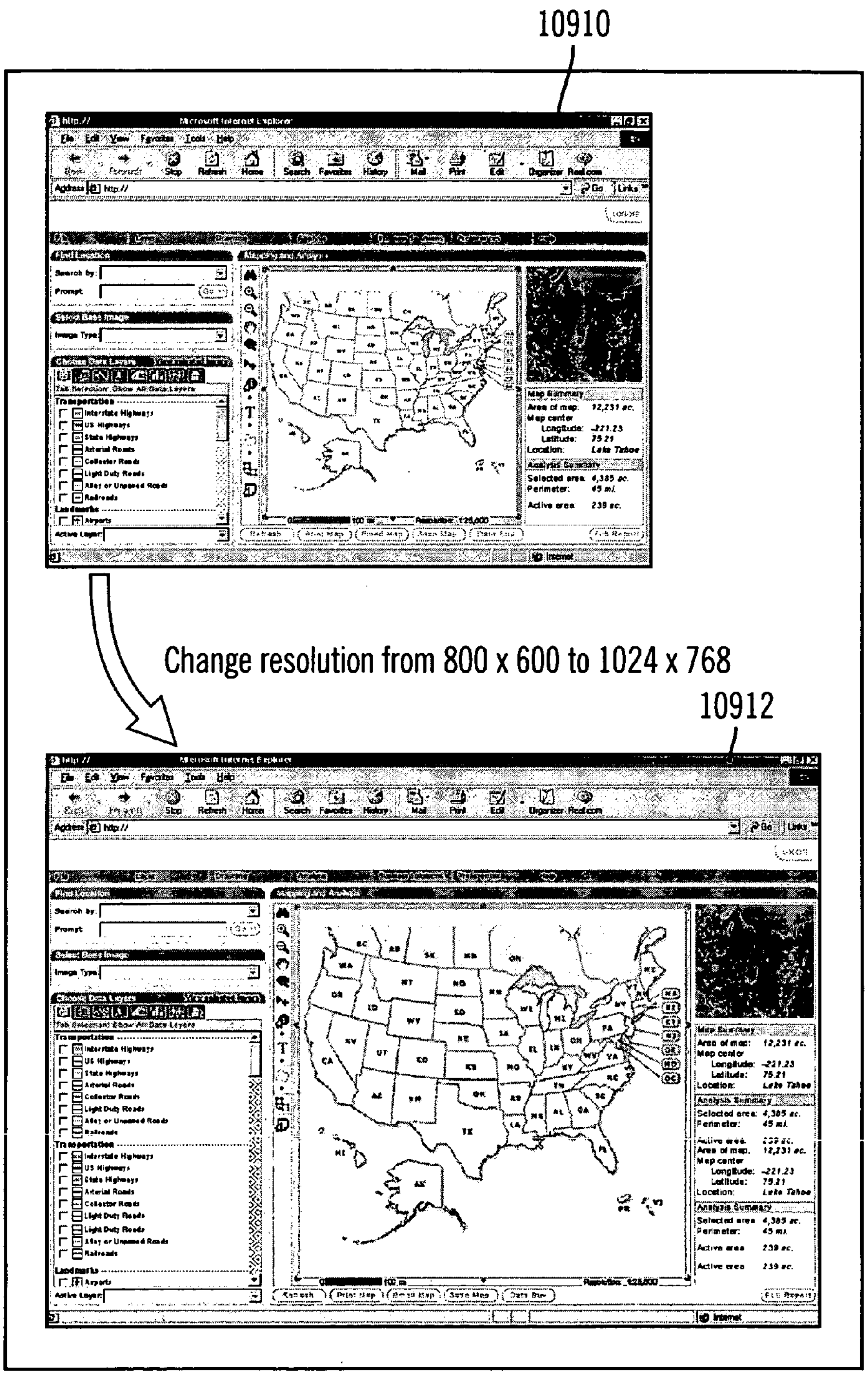
FIG. 109 illustrates scaling the main UI screen to a different resolution UI screen in accordance with certain implementations of the invention.

FIG. 109 illustrates scaling the main UI screen 10910 to a different resolution UI screen 10912 in accordance with certain implementations of the invention. The following sections of the main UI screen resize automatically when the customer is at resolutions that are higher than 800×600: Data Layers Custom Tab window, Map window, and Analysis Summary Display.

In certain implementations, the Map window is the only control on the enterprise spatial system UI screen that automatically resizes when the customer is at resolutions that are higher than 800×600. The Map window resizes to the maximum size that the UI screen will allow. The scaling is proportional, and skewing of the proportions does not occur. If the user is at a higher resolution than 800×600, then downward resizing of the browser window will scale the Map window down accordingly. In this event, the Map window is not scaled to a size smaller than the default Map window size of 325×325 pixels. If the user is in either 800×600 resolution or 640×480 resolution, then downward resizing of the browser window does not scale the Map window down accordingly. The Map window remains at the default size of 325×325 pixels, and scroll bars are used to access all of the map elements. The user can not choose to scale the window by "clicking and dragging" on the map frame. FIG. 110 illustrates table 11010 that identifies the size of the Map window at some resolutions in accordance with certain implementations of the invention.

P. Creating a Map

Once the user has defined the elements of a map on the main UI screen (e.g., defined the AOT, data layers, base image, and cartographic elements), the enterprise spatial system software allows users to "create" a map. Creating a map entails defining the various layout attributes for the map, and then printing, emailing, or saving the map.

Figure 111:
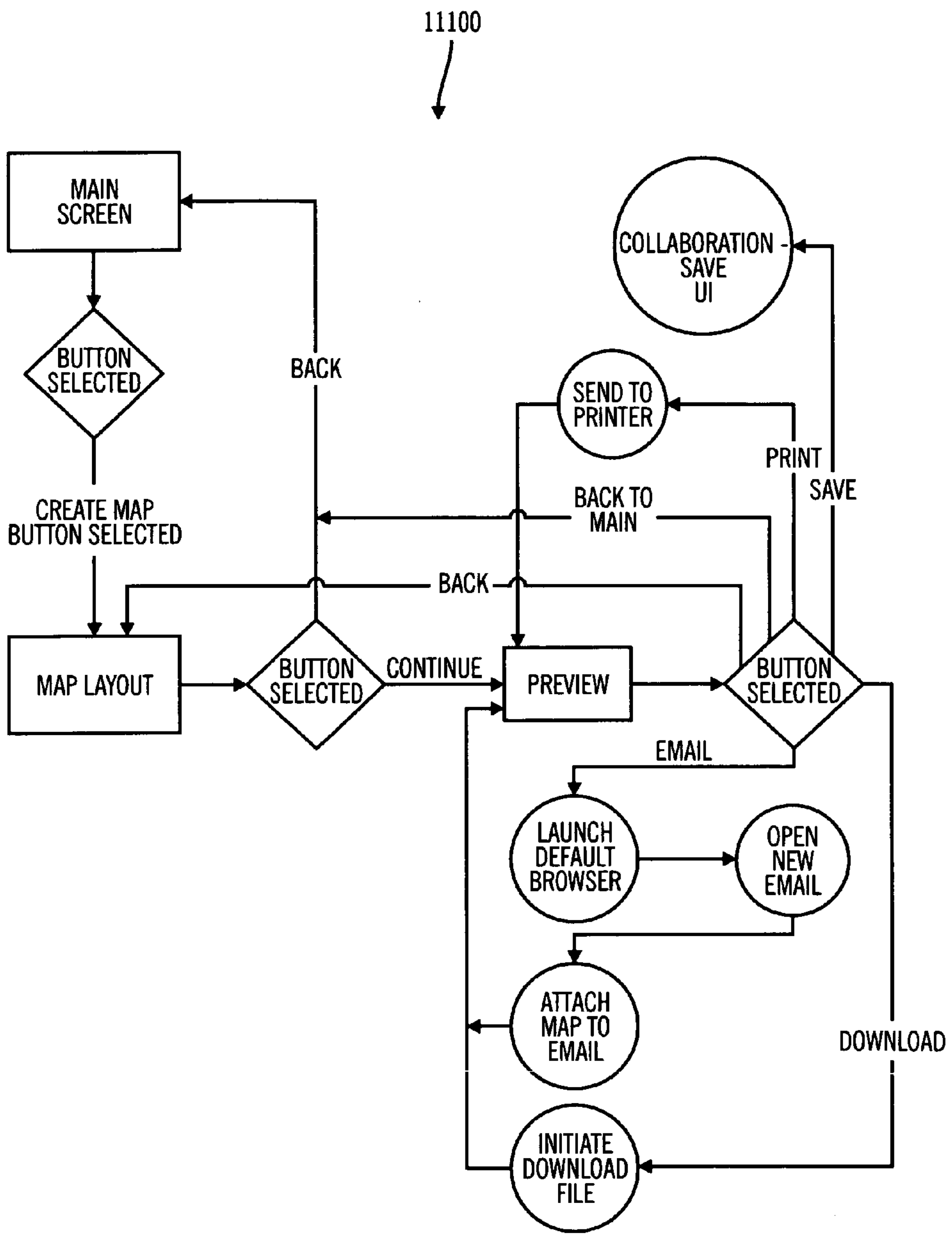
FIG. 111 illustrates logic for creating a map in accordance with certain implementations of the invention.

FIG. 111 illustrates logic 11100 for creating a map in accordance with certain implementations of the invention. From a main UI screen, if a user selects a map button, the user is taken to a map layout UI screen. From there, the user can select a continue button to go to a preview UI screen. The user can then save a map, send the map to the printer, email the map, or download the map to a file.

Figure 112:
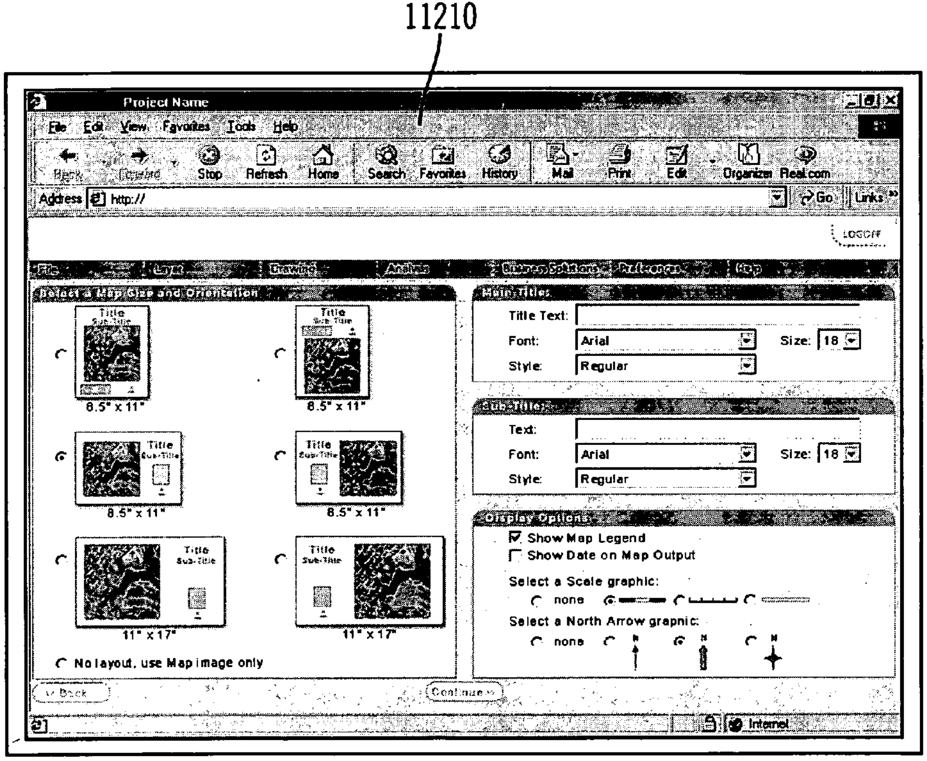
FIG. 112 illustrates a map layout window in accordance with certain implementations of the invention.

FIG. 112 illustrates a map layout window 11210 in accordance with certain implementations of the invention. Within the File Menu, the available menu commands on this UI screen include, for example: New Project, Open Project, Save Project, and Close. Within the Preferences Menu, the available menu commands on this UI screen include, for example: User Name, Password, System Settings, and Change Default AOI. Within the Help Menu, The available menu commands on this UI screen include, for example: About, Contents, and Index. All other commands are visible to the user, but grayed out.

Figure 113:
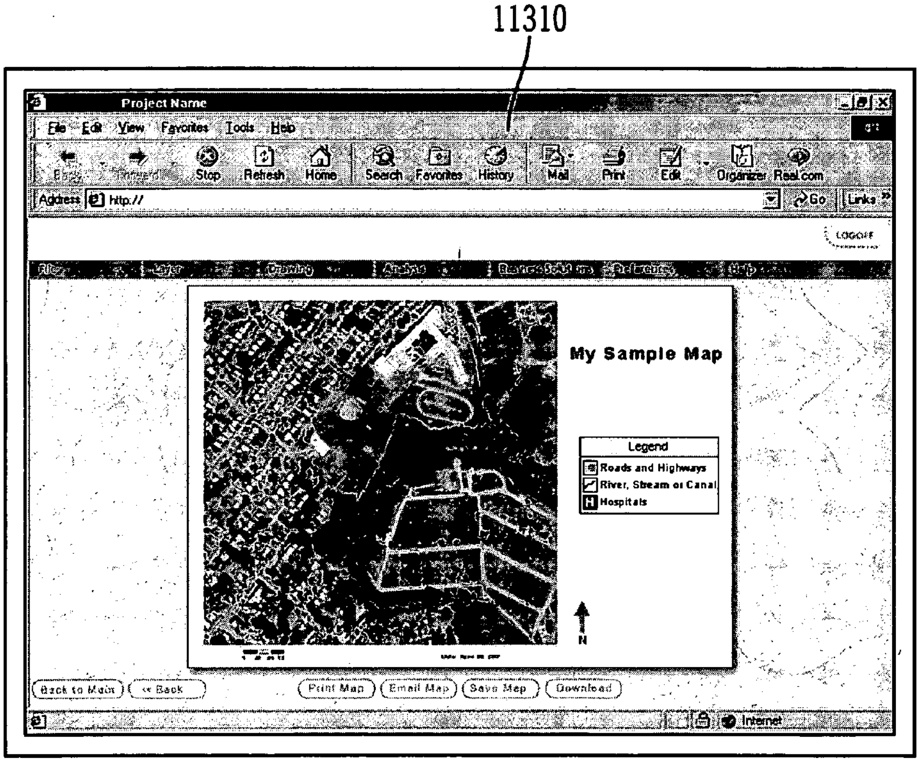
FIG. 113 illustrates a Map Preview UI screen in accordance with certain implementations of the invention.

FIG. 113 illustrates a Map Preview UI screen 11310 in accordance with certain implementations of the invention. This UI screen provides the user with a preview of the map, and gives the user the option to print, email, or save the map. The preview display window occupies the majority of the UI screen's area, and is where the preview of the map will actually be displayed. The background graphic is the main component that is displayed within the display window. The background visually represents the paper background for the map.

The preview elements include, for example: the map that the user has created is shown in the preview; the map will still be covered with the enterprise spatial system watermark in order to prevent the user from saving the file from the UI screen display; and, all of the elements that the user selected from the Map Output UI screen is represented in the preview.

Figure 114:
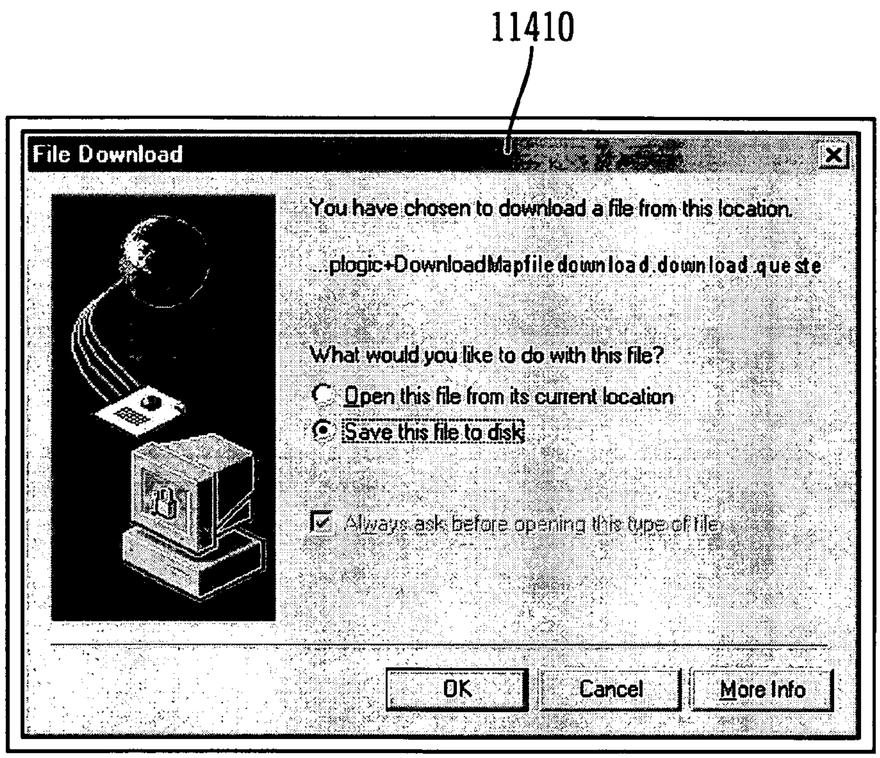
FIG. 114 illustrates an example of a download dialog box in accordance with certain implementations of the invention.
Figure 115:
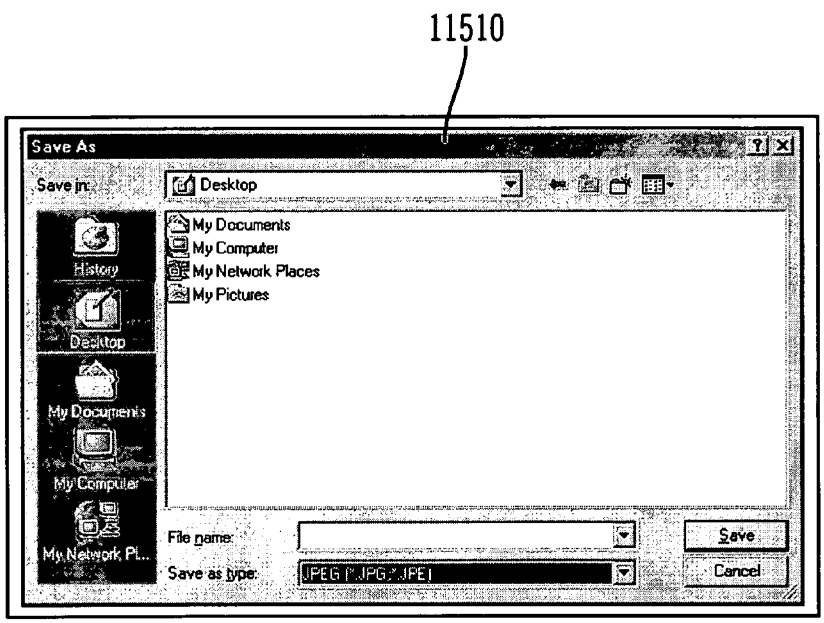
FIG. 115 illustrates a save file UI screen in accordance with certain implementations of the invention.

If the user selects the download button, the map file is delivered to the user. The standard browser download dialog box is presented to the user, allowing the user to determine how the file is handled in accordance with standard web download protocols. FIG. 114 illustrates an example of a download dialog box 11410 used for the Microsoft® Internet Explorer® in accordance with certain implementations of the invention. The file types to save out to include, for example: JPG, WMF, and PDF. The file type defaults to JPEG in certain implementations. FIG. 115 illustrates a save file UI screen 11510 in accordance with certain implementations of the invention.

Once the user has defined the Area of Interest on the main UI screen, the enterprise spatial system software allows users to "go shopping" for the raw data that the enterprise spatial system has for the selected area. The user can purchase any combination of raster and vector data for the designated area, provide the file formatting options, and then continue through a checkout process.

Figure 116:
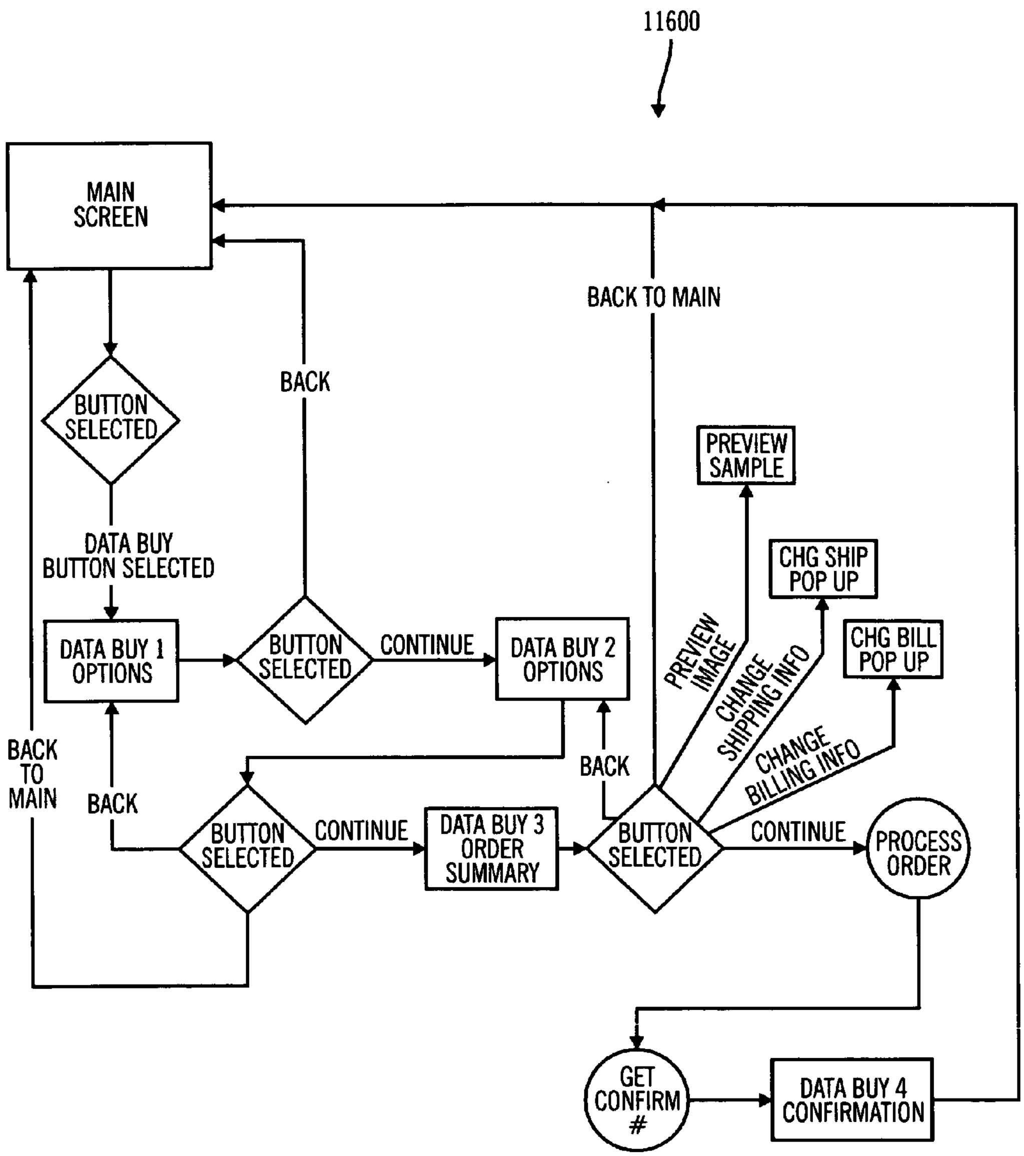
FIG. 116 illustrates logic for purchasing data in accordance with certain implementations of the invention.

FIG. 116 illustrates logic 11600 for purchasing data in accordance with certain implementations of the invention. From the main UI screen, if the data buy button is selected, a firs data buy options UI screen is displayed. From here, if the continue button is selected, a second data buy UI screen is displayed, and, from here, if the continue button is selected, a third data buy order summary UI screen is displayed. From here, a user may preview an image, change shipping information, change billing information or select a continue button to process and order. When the order is processed, a confirmation number is given to the user, and a fourth data buy confirmation screen is displayed.

Figure 117:
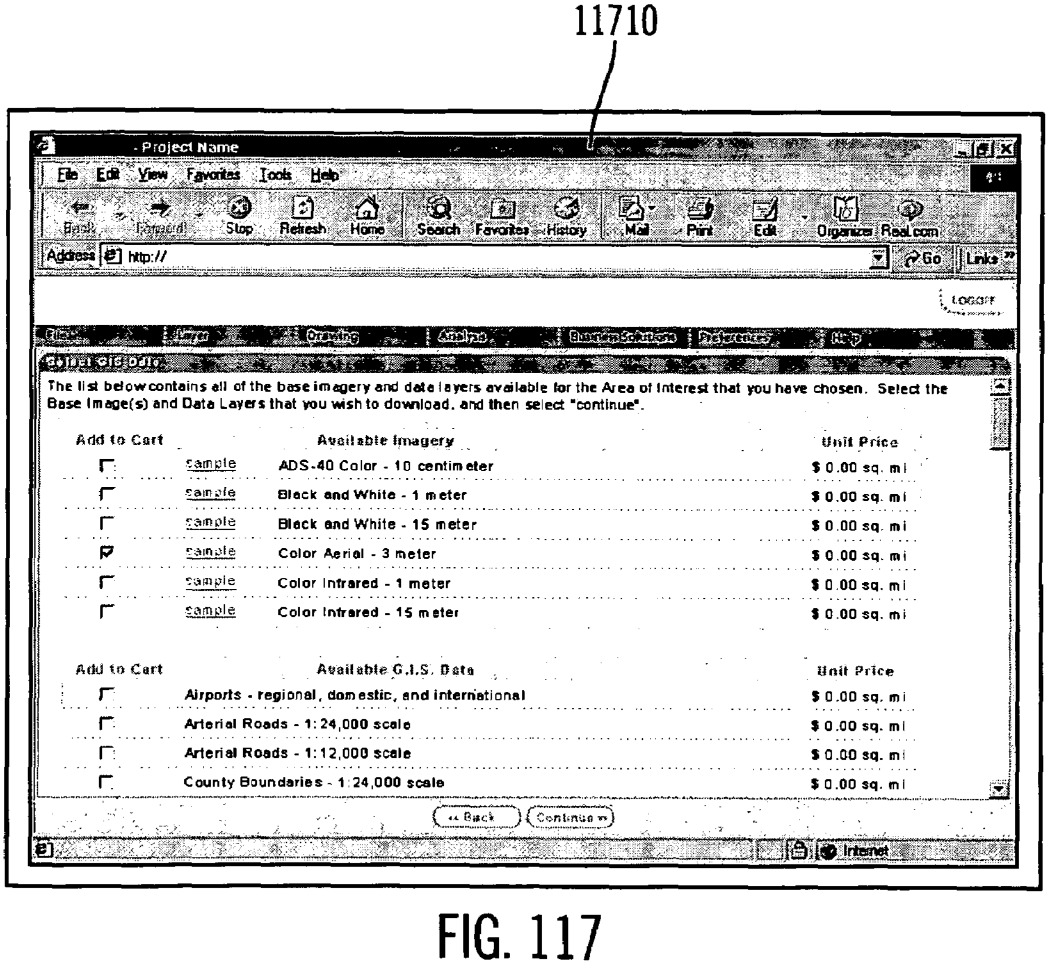
FIG. 117 illustrates a first data buy UI screen in accordance with certain implementations of the invention.

FIG. 117 illustrates a first data buy UI screen 11710 in accordance with certain implementations of the invention. In this UI screen 11710, a user may select imagery and data layers to create a map. In particular, the UI screen 11710 includes a list that contains all of the base imagery and data layers available for the Area of Interest that a user has chosen.

Figure 118:
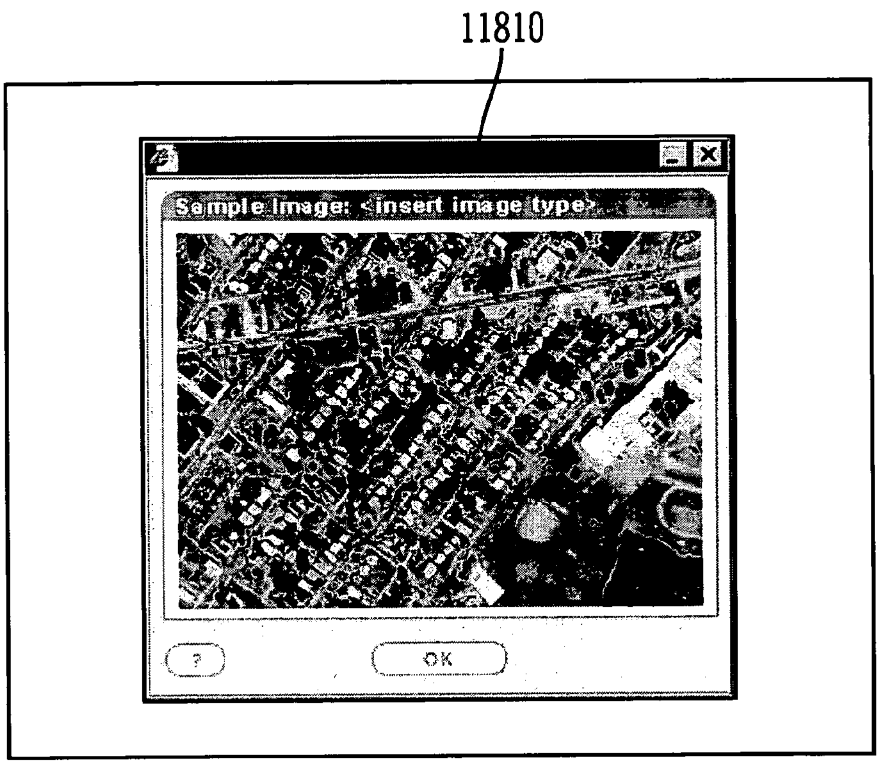
FIG. 118 illustrates an example imagery pop up dialog box in accordance with certain implementations of the invention.

FIG. 118 illustrates an example imagery pop up dialog box 11810 in accordance with certain implementations of the invention. This pop up dialog box is used to give users an understanding of the quality levels of the various types of imagery that is available through the enterprise spatial system by providing sample images. The sample images are in not tied to any settings, including the AOI that the user has selected for the current project. Instead, the sample images are simply image samples.

FIG. 119 illustrates a second data buy UI screen 11910 providing data options in accordance with certain implementations of the invention. This UI screen shows a list of data options a user can choose. FIG. 120 illustrates a third data buy UI screen 12010 with a purchase summary in accordance with certain implementations of the invention. From this point forward in the data buy process, the focus is on shopping cart functionality.

Figure 121:
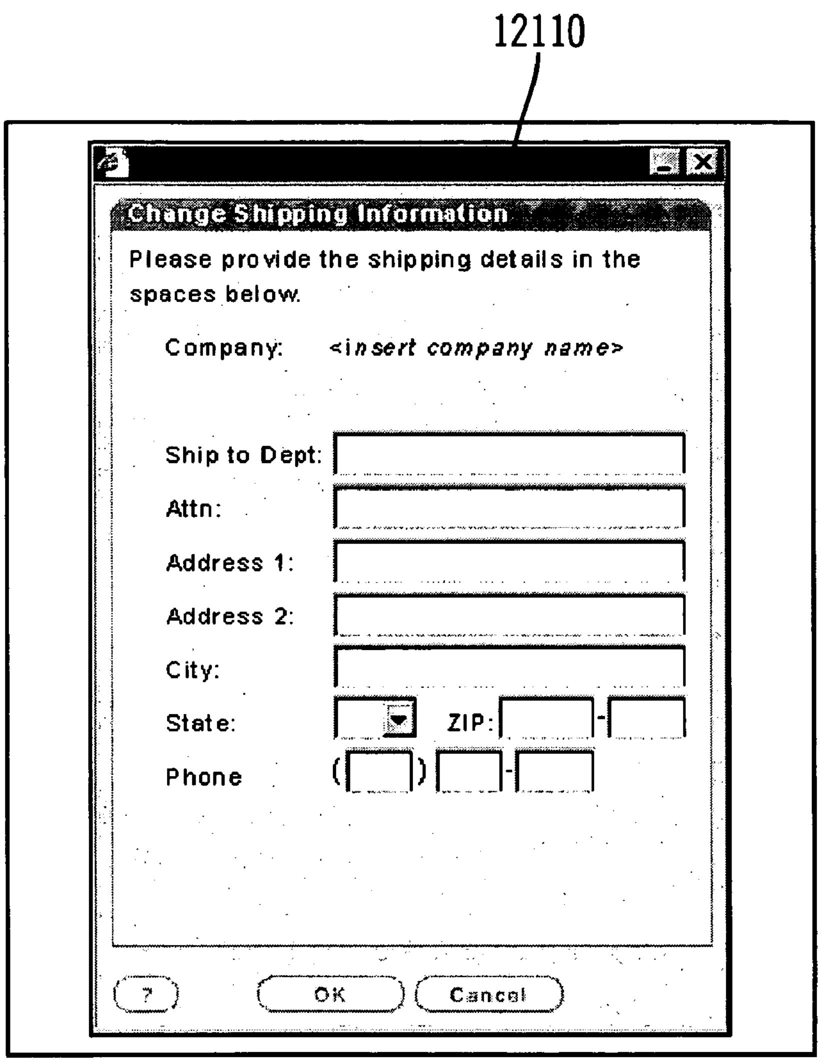
FIG. 121 illustrates a change shipping information pop up dialog box in accordance with certain implementations of the invention.

FIG. 121 illustrates a change shipping information pop up dialog box 12110 in accordance with certain implementations of the invention. This pop up dialog box appears when a user is undertaking the process of purchasing data, and has indicated a desire to change shipping information by selecting the "change Shipping Info" link on the third data buy UI screen. The purpose of this UI screen is to provide an interface that allows the user to change the shipping information for an account. Once the changes have been made, the changes will apply for all future shipments of data until the user elects to change the shipping information once again.

Figure 122:
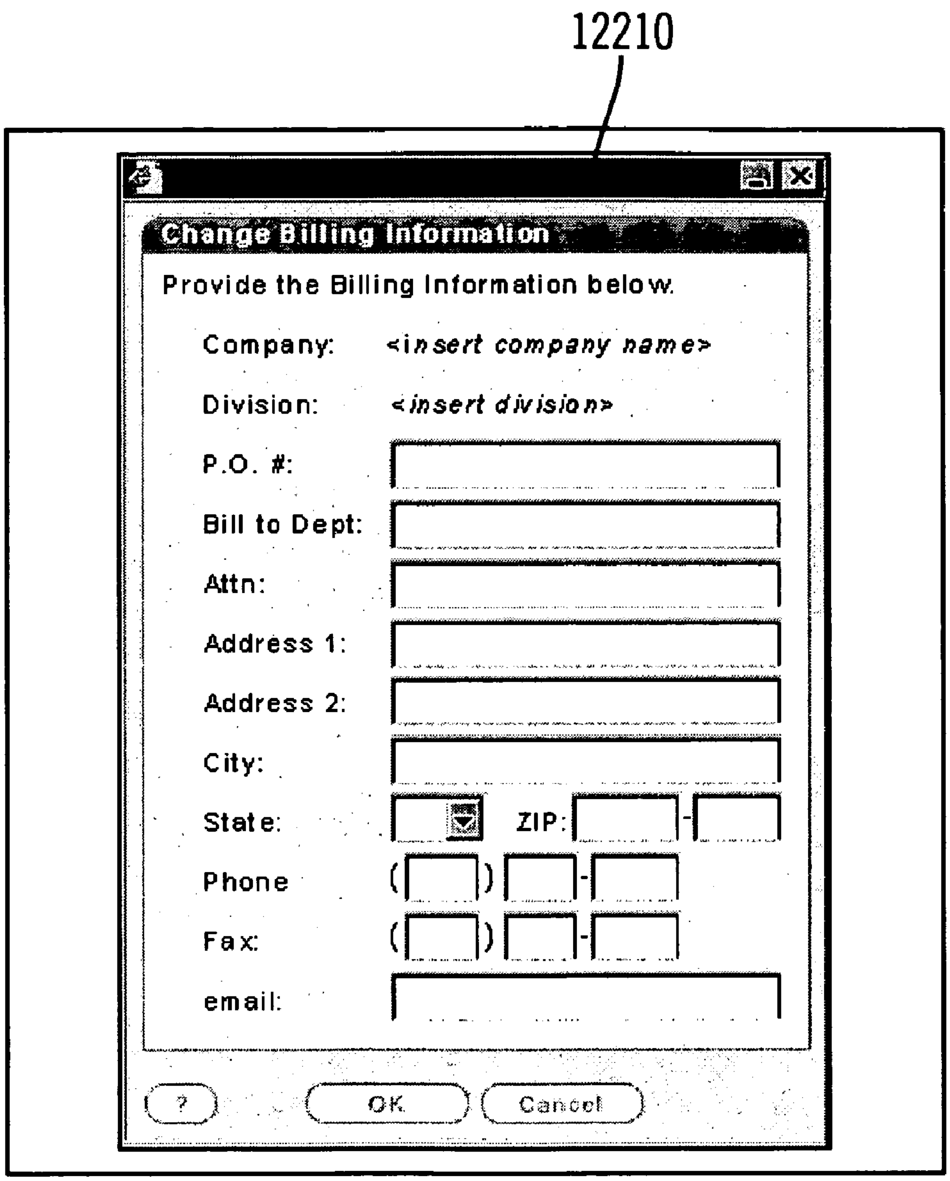
FIG. 122 illustrates a change billing information pop up dialog box in accordance with certain implementations of the invention.

FIG. 122 illustrates a change billing information pop up dialog box 12210 in accordance with certain implementations of the invention. This pop up dialog box is used when a user is undertaking the process of purchasing data, and has indicated a desire to change their billing information by selecting the "Change Billing Info" link on the third data buy UI screen. The purpose of this pop up dialog box is to allow the user to change the billing information associated with an account. Once the changes have been made, the changes will apply for all future shipments of data, unless the billing information is changed again.

Because the enterprise spatial system maintains control over the billing information, this pop up dialog box is available to the enterprise spatial system administrators. If a company would like to change the billing information associated with their account, the company would send an updated purchase order that shows the change in billing information. It is after this purchase order is received that the enterprise spatial system administrator will change the billing information for the account.

Once the user has highlighted one or more data elements on the main UI screen (e.g., with a data selection tool, buffer tool, or query tool), the user can access the underlying attribute data for the element(s) by selecting a "full report" button, located near the bottom right portion of the UI screen. Selection of this button launches the Full Report pop up dialog box. This dialog box provides a large grid display that contains all of the data contained within the active data layer and located within the boundaries defined by the user's polygon. This UI screen displays attribute data, allows the user to export or print data, and allows the user to run a query in order to see only a subset of the attribute data.

Figure 124:
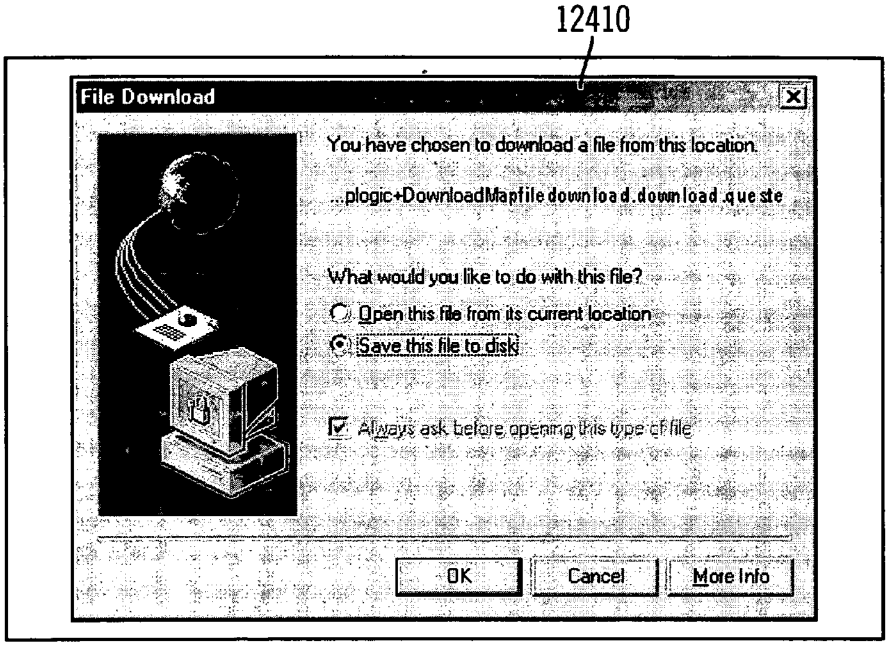
FIG. 124 illustrates a download dialog box in accordance with certain implementations of the invention.

FIG. 123 illustrates a Full Report pop up dialog box 12310 in accordance with certain implementations of the invention. If the user selects the Query Hyperlink, the UI screen is refreshed with the Full Report pop up dialog box with Boolean Query UI screen. If the user selects the Export button, a .csv (comma separated values) format text file is downloaded to the user's system. The standard browser download dialog box is presented to the user, allowing the user to determine how the file is handled in accordance with standard web download protocols. FIG. 124 illustrates a download dialog box 12410 used for the Microsoft® Internet Explorer® in accordance with certain implementations of the invention.

Figure 125:
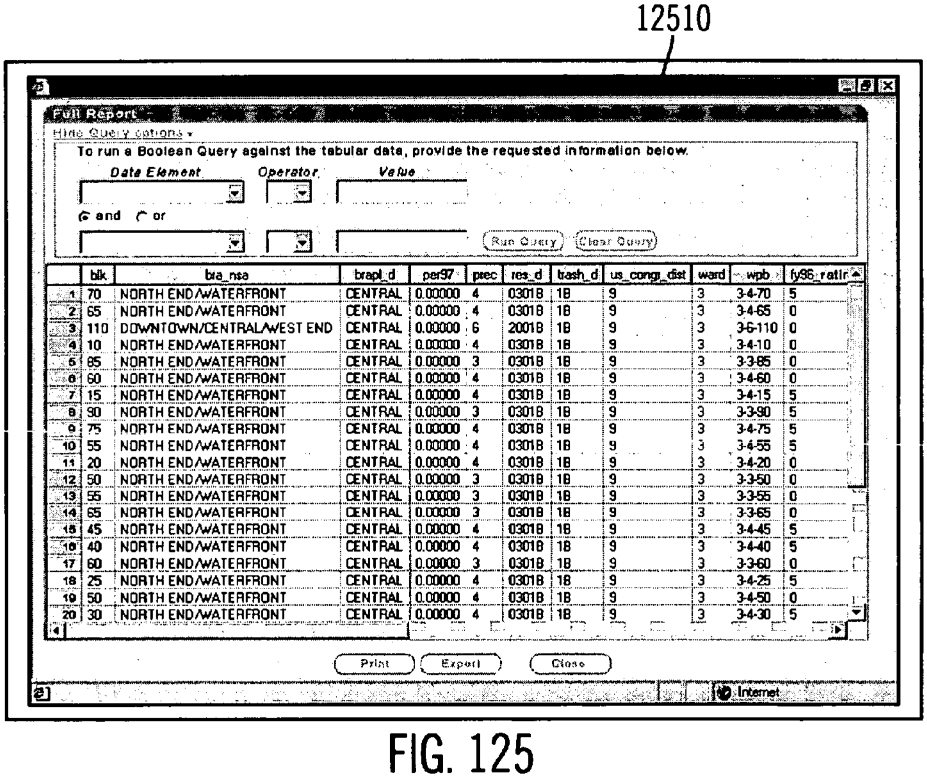
FIG. 125 illustrates a Full Report pop up dialog box with Boolean query in accordance with certain implementations of the invention.
Figure 126:
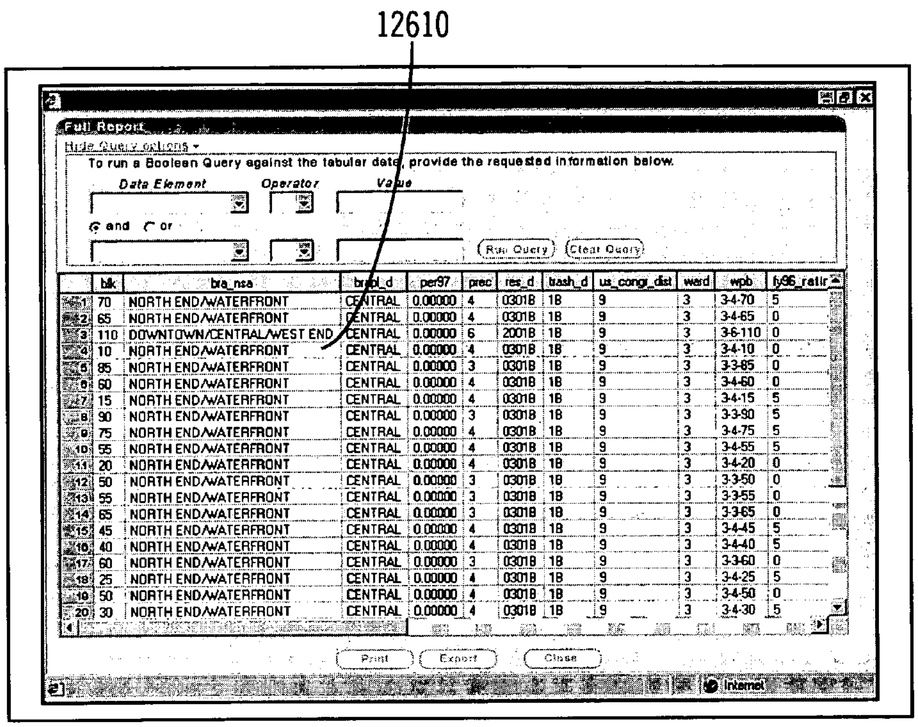
FIG. 126 illustrates highlighting in a Full Report pop up dialog box with Boolean query in accordance with certain implementations of the invention.

FIG. 125 illustrates a Full Report pop up dialog box 12510 with Boolean query in accordance with certain implementations of the invention. This UI screen is a derivation of the Full Report pop up dialog box, and is used when the user wants to run a Boolean query against the tabular attribute data. Most of the attributes and functionality of this UI screen are the same as with the Full Report pop up dialog box, with a few exception. If the user runs a query, the rows of the data elements that meet the query criteria are highlighted. FIG. 126 illustrates highlighting (e.g., 12610) in a Full Report pop up dialog box 12510 with Boolean query in accordance with certain implementations of the invention.

Figure 127:
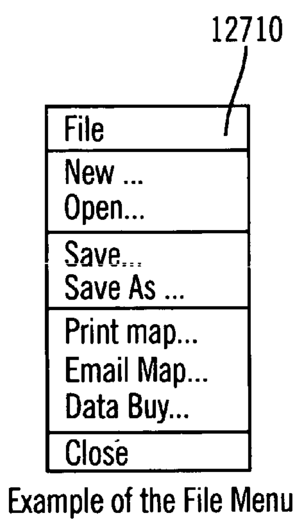
FIG. 127 illustrates a file menu in accordance with certain implementations of the invention.

Document collaboration is a useful aspect of the enterprise spatial system as it provides users with the ability to save their work for future use as well as share their work with others. Central to document collaboration is the ability to be able to notify members when a document has been saved, or placed on the enterprise spatial system, and who should have access to this document. Some documents may be files, such as map image files, while others are records, such as a project or AOI. When working with documents, there are three basic operations that a user can perform, New, Open and Save, each of which is describe in greater detail below. FIG. 127 illustrates a file menu 12710 in accordance with certain implementations of the invention. In certain implementations, documents are saved on the enterprise spatial system server and are not saved locally.

In terms of a New operation, under the enterprise spatial system design, a user can create a new project based on existing settings or on an existing template/map service. Each time the enterprise spatial system is run, a default project is opened which is based on the default AOI. When opening, the enterprise spatial system server creates a new temporary record to avoid accidentally overwriting the original AOI project. Once open, the user can change the AOI and begin work on a project.

In terms of an Open operation, when performing an Open operation, users will be able to open existing projects as well as previously saved map images. In certain implementations, as their work is saved on the server, users have folder management capabilities, such as being able to add, edit and delete folders.

In terms of Save operations, there are several save operations that a user can perform, including, for example: saving a project, a project template, an AOI, and saving a map image to file. To save a project, when a user is ready to save work, the user chooses the File: Save or File Save As command. If the project has not yet been saved, e.g., it is a temporary project, then the Save UI screen appears. If the project has been already saved and the user chooses the File: Save command, then the existing project is immediately updated. If the user chooses the File: Save As command, the Save UI screen is always displayed, irrespective of whether the project has been previously saved. On the Save UI screen, the user is able to choose whether or not to save the project as a project file or a project template. However, the save to project template option may be available if the user has the appropriate administration privileges. If not, then the user is saving to a project by default.

Apart form being able to save projects, the enterprise spatial system will also allow users to save project templates. Project templates are basically projects with predefined and pre-selected data layers. For example, company A, a forestry company, only wants field representatives to be able to see data layers specific to conducting financial stand analysis. While the AOI may consist of over 30 layers, only 5 are specific to financial stand analysis. By using a project template, the field representatives will only see the data layers relevant to them, therefore improving the user experience and usability by removing redundant data layers that can easily confuse.

In terms of creating project templates, the enterprise spatial system provides the ability to determine who within an organization has the privileges to create them, and conversely, who is able to see and use them.

With the enterprise spatial system, users are able to save the current Area of Interest (AOI). This has the same function as changing the default AOI via the Preferences: Change Default AOI command. This option provides greater flexibility for users, and helps them easily change their default so that it always opens to a specific area that interests them, for example, Los Angeles, rather than the entire US. This ability to define the AOI also allows a company and/or supervisor to set the area of interest that they have subscribed to. This avoids showing unnecessary information to a user if it is determined that they do not have rights to that particular area. Based on the above requirement, the enterprise spatial system ties an AOI to both a company and user.

There are times when a user will want to be able to save the map that they are currently working on to an image file. This could be because they want to place the image in a document or use it in a presentation, or perhaps to keep a record of their work. A user could always right-click on the image and use the browser's right "Save Picture As" command, but this may not be such an obvious feature to the novice user. Therefore the enterprise spatial system make provides this functionality at the Save UI screen where users can easily see their options.

Figure 128:
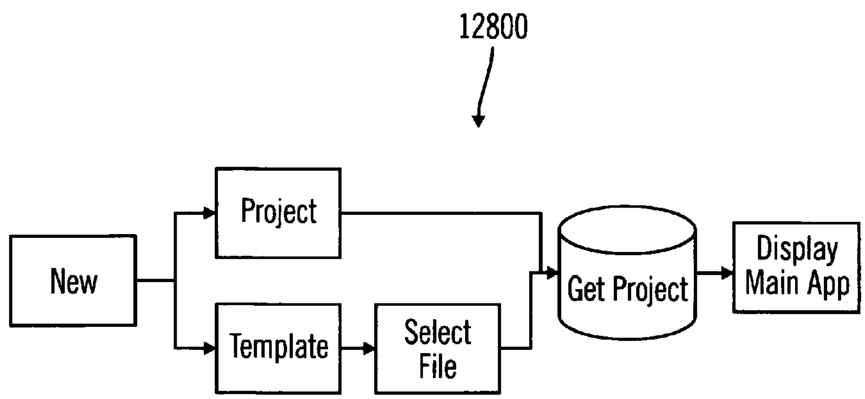

When creating a new project, users have the choice to either select a project which is based on their existing settings, or a project based on an existing template/Map Service. If choosing a template/map service, they are prompted to first select the appropriate project before continuing. FIG. 128 illustrates processing 12800 for a New operation in accordance with certain implementations of the invention.

Figure 129:
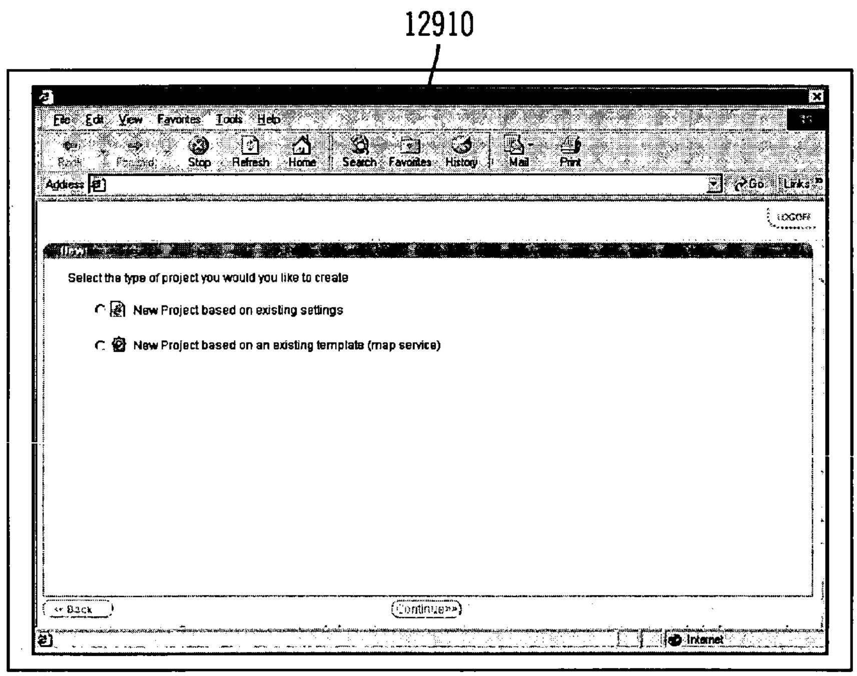

When the user clicks the New Project command, the New Project UI screen is displayed, and a check is made to identify any existing projects and/or project templates. FIG. 129 illustrates a New Project UI screen 12910 in accordance with certain implementations of the invention.

Figure 130:
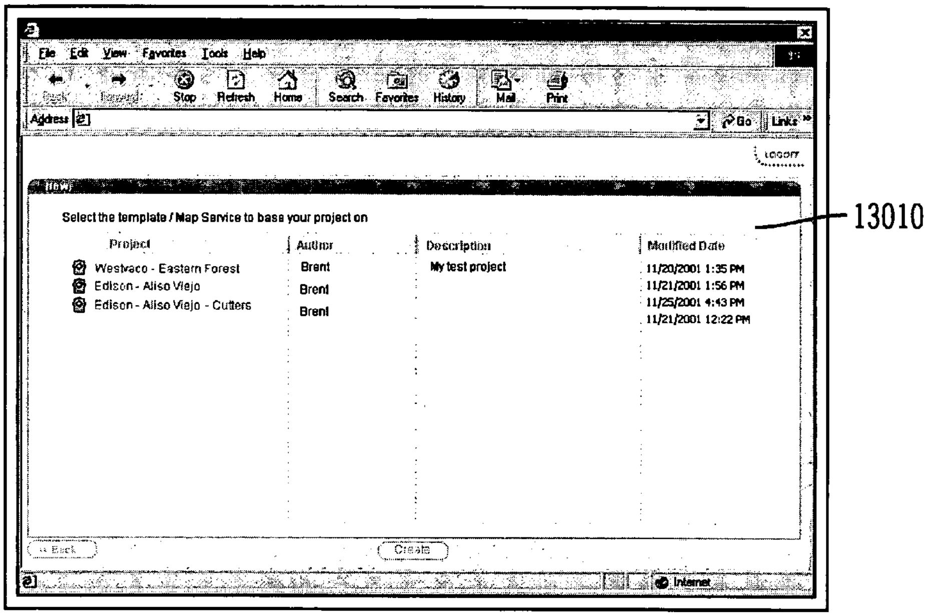

FIG. 130 illustrates a Select Template UI screen 13010 in accordance with certain implementations of the invention. When this UI screen is called, display the name and details of the project template are dynamically displayed within the 4 column template grid.

Figure 131:
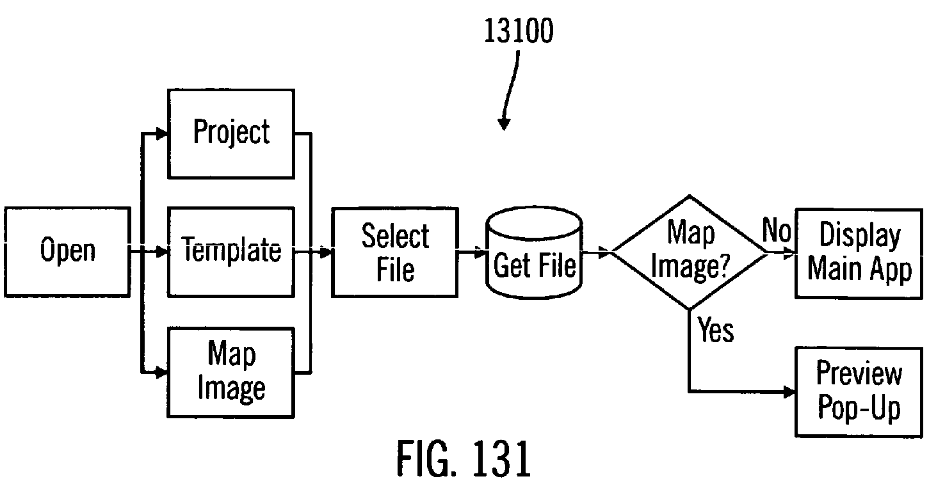

The Open operation allows the user to open a server-side project, template or map image. In all cases the process is the same, except when opening a map image. In this instance the map image will display in a separate Preview pop-up window. FIG. 131 illustrates processing 13100 for an Open operation in accordance with certain implementations of the invention.

Figure 132:
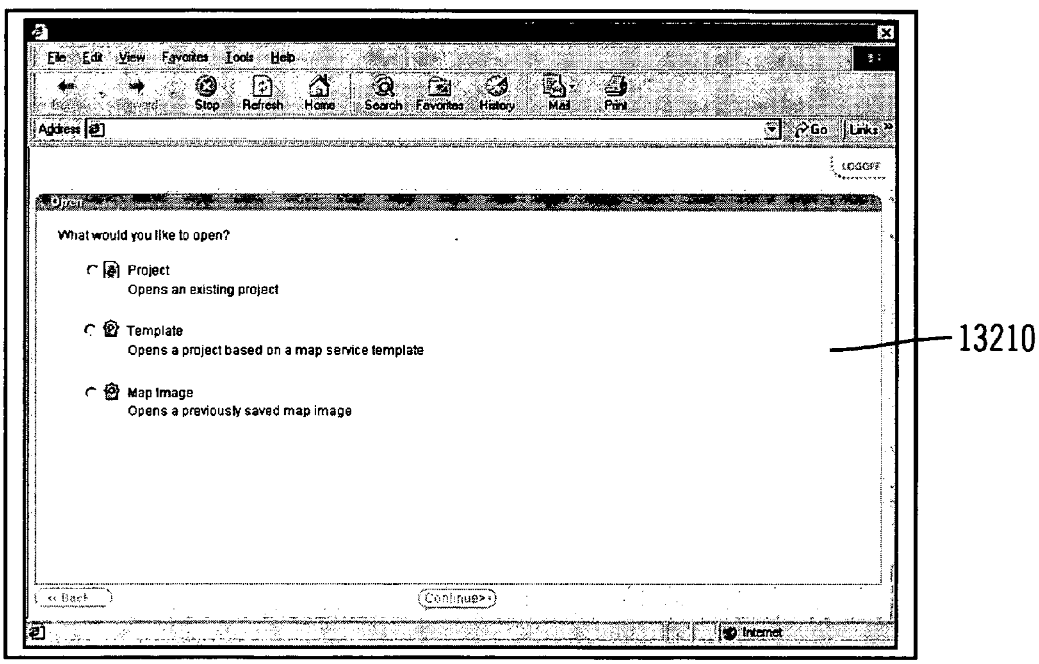

FIG. 132 illustrates an Open Project UI screen 13210 in accordance with certain implementations of the invention. A user can open different types of files.

Figure 133:
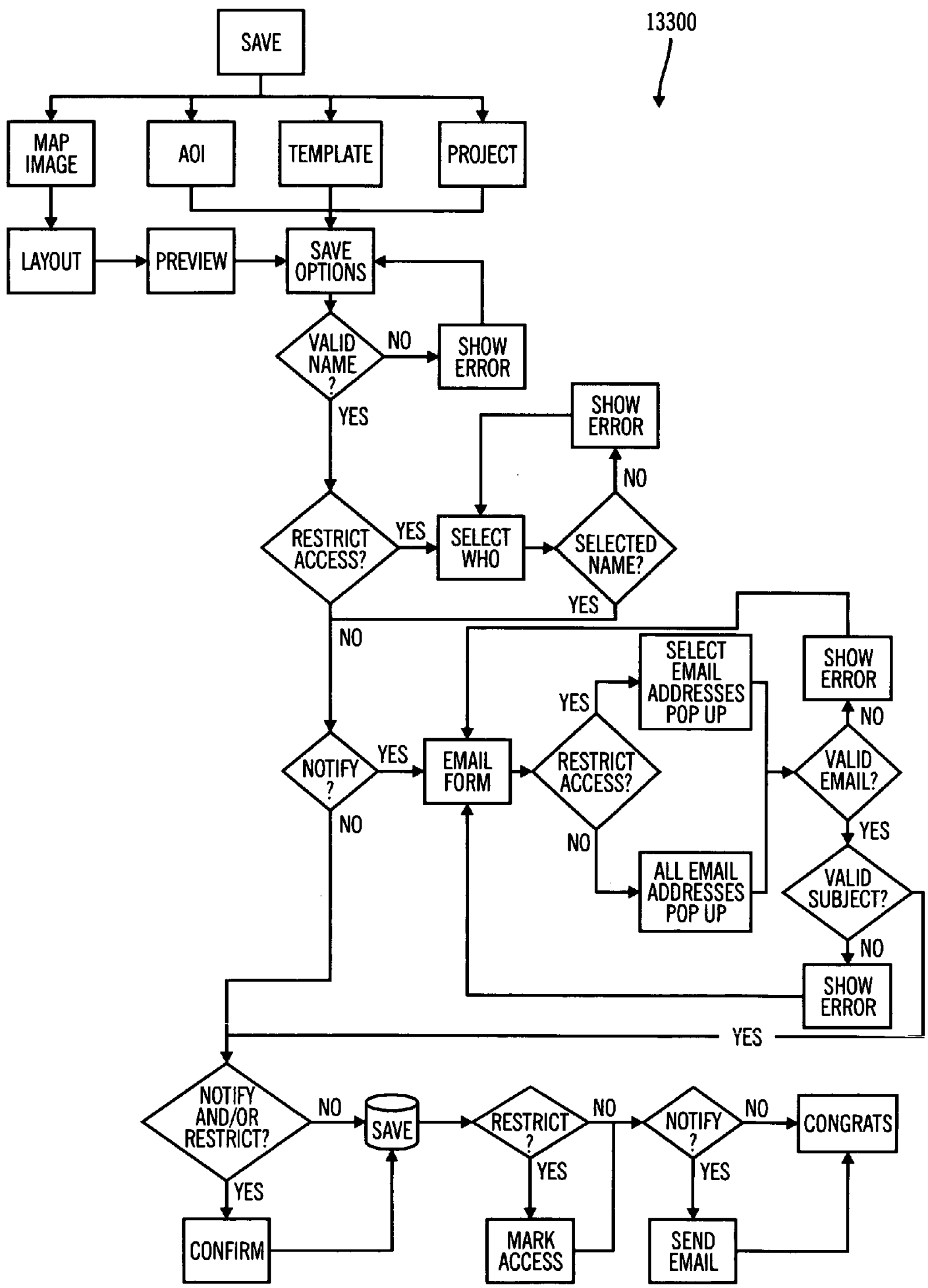

The Save operation allows the user to save on the enterprise spatial system server a project, template, AOI or map image. In all cases the process is the same, except when saving a map image. In this instance the map image will first go to the layout and previews UI screens and then back to the save options. During the save operation, the user is able to notify members of the document as well as restrict access to the document. FIG. 133 illustrates logic 13300 for processing a Save operation in accordance with certain implementations of the invention.

Figure 134:
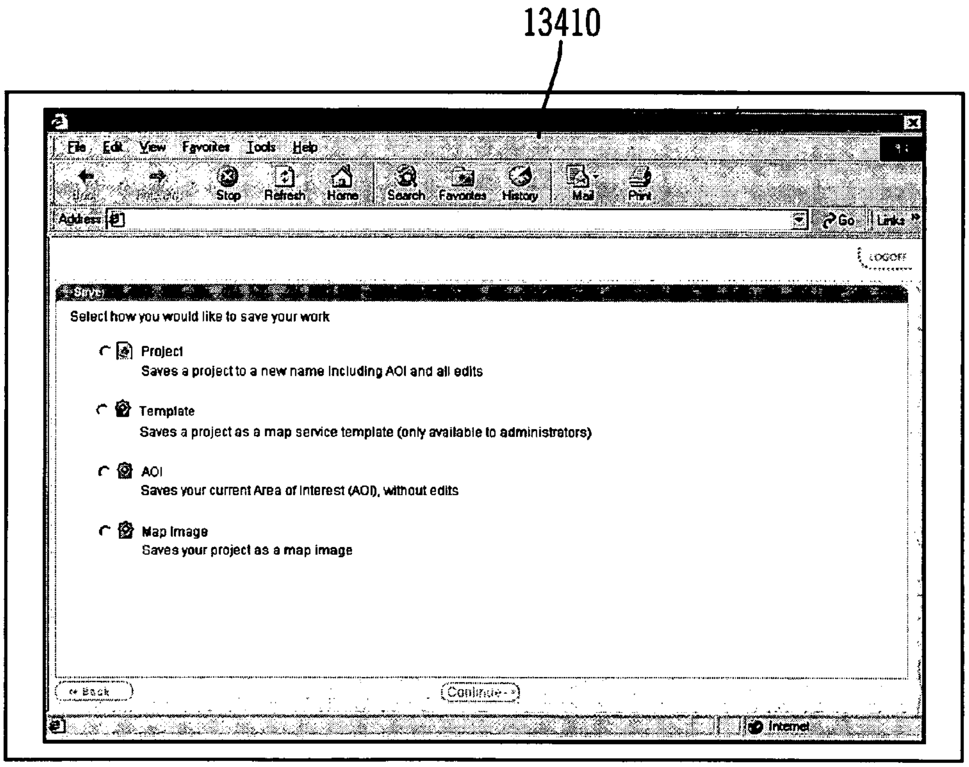

Files can be saved as one of the following types: project—saves a project to a new name including AOI and all edits; template—saves a project as a map service template (in certain implementations, only available to administrators); AOI—saves current Area of Interest (AOI), without edits; or map image—saves project as a map image. FIG. 134 illustrates a Save Project UI screen 13410 in accordance with certain implementations of the invention.

Figure 135:
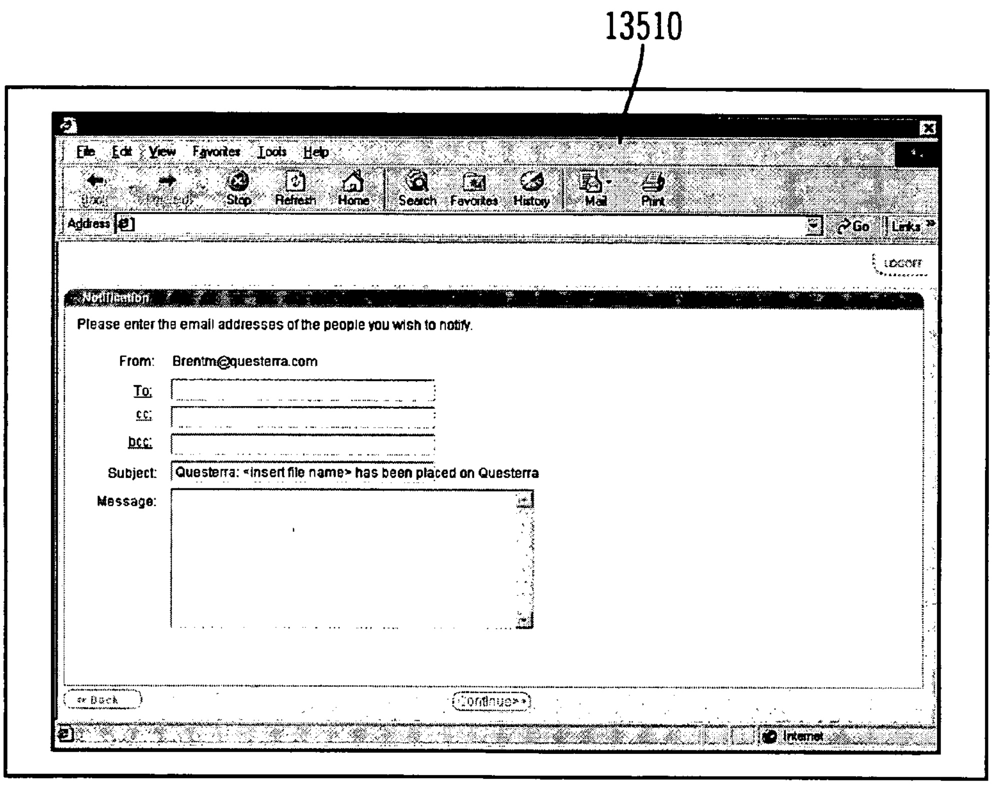

An Email Form UI screen is used to notify other people via email. FIG. 135 illustrates an Email Form UI screen 13510 in accordance with certain implementations of the invention.

The enterprise spatial system provides support for transactional customers. Customers may purchase enterprise spatial system services on a transaction by transaction basis. In order to accommodate these "transactional" customers, the enterprise spatial system software is modified in order to ensure that the customer can not get any significant value (e.g., email a map image) from the enterprise spatial system services until payment has been received.

Figure 136:
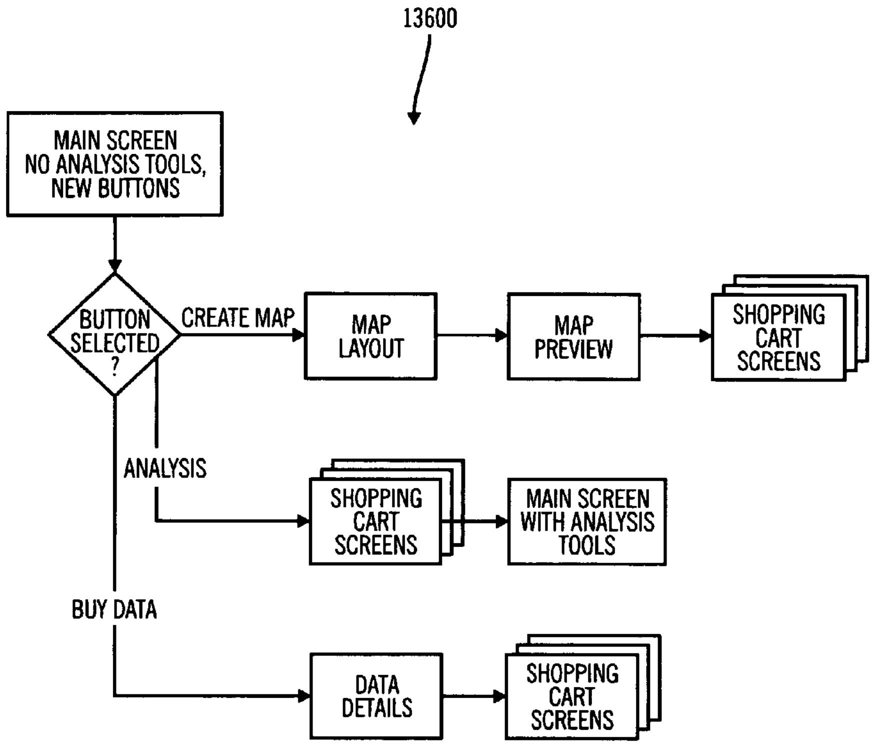

The following section describes the requirements for supporting transactional customers by describing those requirements that differ from subscription customers. FIG. 136 illustrates logic 13600 for supporting transactional customers in accordance with certain implementations of the invention. From the main UI screen, a user may create a map, perform analysis, or buy data.

The main UI screen is modified for the transaction user, so that the analysis tools are not immediately available to the user. Instead, an "Analysis" button at the bottom of the UI screen will provide the transactional user with the path to accessing this functionality.

In any of the 3 major task areas (map creation, analysis, and data buy), the user has to go through some shopping cart functionality before they get anything of value from the enterprise spatial system. For each task, however, the specifics of the shopping cart functionality vary somewhat.

Figure 137:
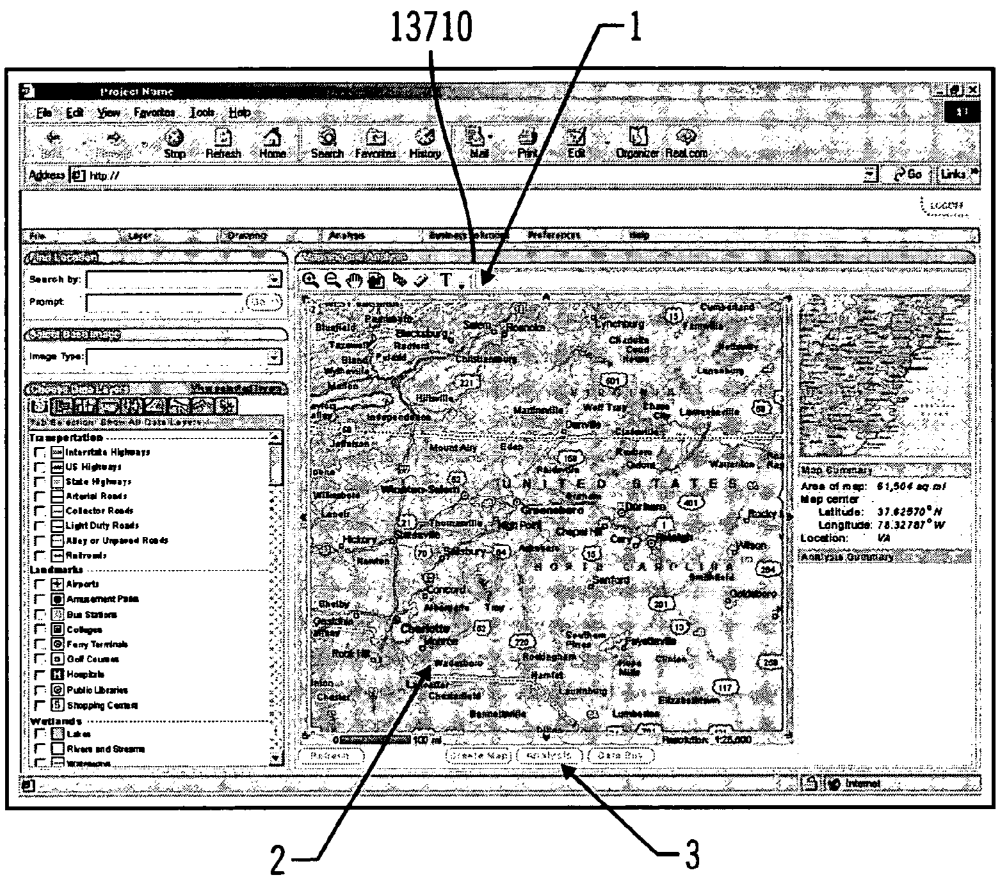

FIG. 137 illustrates a main UI screen 13710 for supporting transactional customers in accordance with certain implementations of the invention. The transactional user is presented with a modified version of the main UI screen (that a subscription customer would see) when the user first enters the enterprise spatial system software. For example, the Analysis tools are not available to the user by default. The user goes through the shopping cart and agree to pay for the analysis tools before they can become available. Also, the enterprise spatial system watermark is displayed on top of the map that is displayed within the Map window. The goal behind the display of the watermark is to prevent users from saving a usable version of the map graphic using a print UI screen utility. The watermark extends over as much of the graphic as possible. To reduce the distraction of the watermark to the user, the watermark is barely visible. A treatment such as the following is used: the font is large and bold; the font is black in color; and, the text is displayed at 25% opacity. This watermark is displayed on top of any representation of a map that can be downloaded from the browser, including on the map preview UI screen. Moreover, the buttons at the bottom of the UI screen have changed to allow the user to indicate which major task is undertaken. This is needed because each task has slightly different shopping cart experiences. The buttons will therefore include, for example, "Create Map", "Analysis", and "Data Buy".

Figure 138:
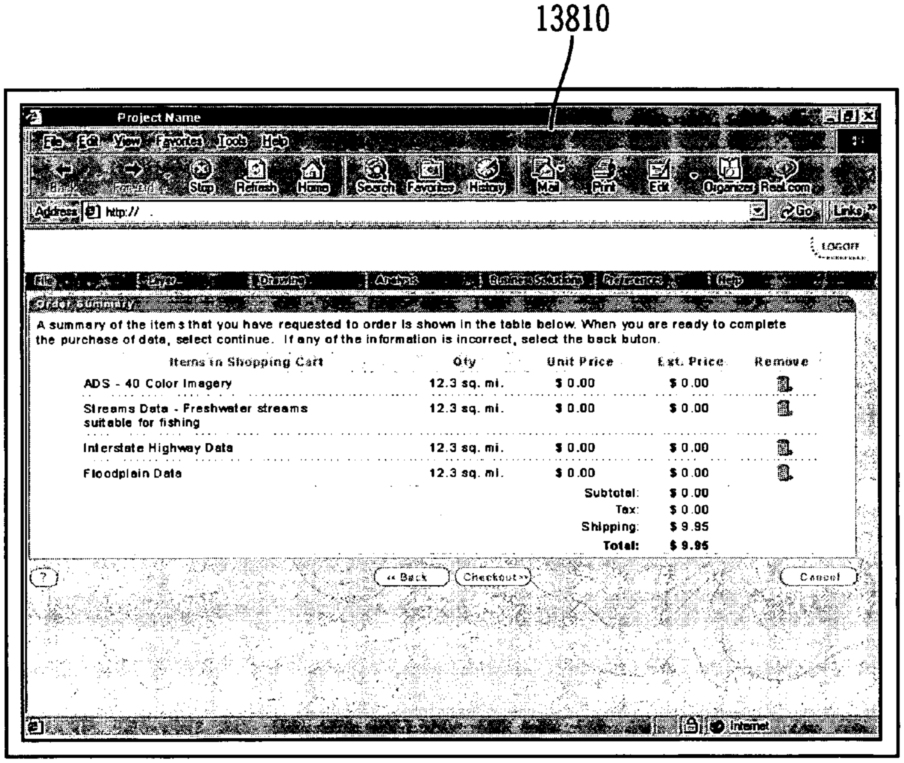

FIG. 138 illustrates a first Shopping UI screen with an Order Summary 13810 in accordance with certain implementations of the invention. This UI screen always marks the beginning of the shopping cart process for the user.

Figure 139:
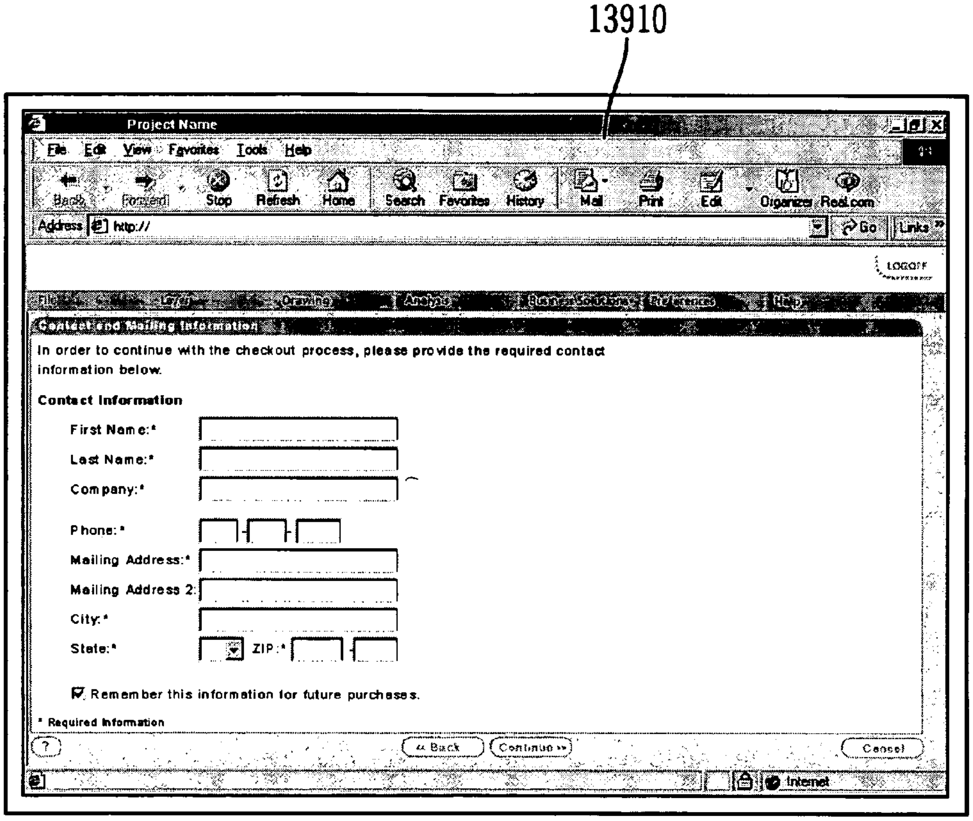

FIG. 139 illustrates a second Shopping UI screen with Contact Information 13910 in accordance with certain implementations of the invention. This UI screen may be pre-populated with information that the user provided in an earlier session with the enterprise spatial system, if at that time, the user selected a Future Purchases checkbox.

FIG. 140 illustrates a third Shopping UI screen with Payment Information 14010 in accordance with certain implementations of the invention. This UI screen is used to gather payment information from customers. This UI screen may be pre-populated with information that the user provided in an earlier session with the enterprise spatial system, if at that time, the user selected the Future Purchases checkbox.

FIG. 141 illustrates a fourth Shopping UI screen with Purchase Summary 14110 in accordance with certain implementations of the invention. If the user selects the purchase button, the order is processed. The user's credit card is run. A confirmation email is sent to the user. The item is delivered according to the means specified by the user.

FIG. 142 illustrates a fifth Shopping UI screen with Acknowledgment 14210 in accordance with certain implementations of the invention. Once the purchase transaction has been completed, the Acknowledgment UI screen appears. This UI screen provides the user with formal acknowledgment that the purchase has been completed, and provides a printable version of the information contained on the fourth Shopping UI screen with Purchase Summary. In addition, if a download was involved in the process, this UI screen allows the user to download the file again in the event of a download error.

If the user enters the shopping cart from the "Create Map" functionality, the shopping cart will exhibit some differences from the generic shopping cart described above. FIG. 143 illustrates logic 14300 for entering the shopping cart from the create map functionality in accordance with certain implementations of the invention. When creating a map, the shopping cart functionality begins immediately after the preview UI screen.

FIG. 144 illustrates a first Map Shopping UI screen with Order Summary 14410 in accordance with certain implementations of the invention. This UI screen represents a shopping order summary. If the user selects the Create another map button, the current map is saved to the shopping cart. If the user selects the Buy map's GIS data button, the current map is saved to the shopping cart.

FIG. 145 illustrates a second Map Shopping UI screen with Purchase Summary 14510 in accordance with certain implementations of the invention.

If the user enters the shopping cart by selecting "Analysis" from the main UI screen, the shopping cart will exhibit some differences from the generic shopping cart described above. FIG. 146 illustrates logic 14600 for entering the shopping cart by selecting analysis form the main UI screen in accordance with certain implementations of the invention. When used for the payment of analysis functionality, the shopping cart functionality begins immediately after the main UI screen.

If the user enters the shopping cart from the data purchase UI screens, the shopping cart will exhibit some differences from the generic shopping cart described above. FIG. 147 illustrates logic 14700 for shopping cart functionality when the user enters the shopping cart from the data purchase UI screens in accordance with certain implementations of the invention. When used for the data buy, the shopping cart functionality begins immediately after the data purchase details UI screens.

From a Data Buy Shopping UI screen with Order Summary, if the user selects the checkout button, the user is advanced to the next UI screen of the shopping cart experience to unlock the analysis tools. If the user chose to fulfill the data by CD ROM delivery, the next UI screen is Analysis Shopping UI screen with Contact Information. If, in an earlier session with the enterprise spatial system, the user chose to save contact information, this information is prepopulated into this UI screen. If the user chose to download the data, the next UI screen is Analysis Shopping UI screen with Payment Information. A Data Buy Shopping UI screen with Purchase Summary provides a purchase summary for customers.

The File drop down menu (e.g., 12710 of FIG. 127) provides various types of functionality that are related to file management and use issues. Among other things, this menu provides functionality to open, save, print, and email files.

The New menu item provides access to the new file functionality. The Open menu item provides access to the open file functionality. The Save menu item provides access to the save file functionality. The Print Map menu item allows the user to branch off to the map printing portion of the enterprise spatial system software. The Email Map menu item allows the user to branch off to the portion of the enterprise spatial system software that allows the user to email a map. The Save Map menu item allows the user to branch off to the map saving portion of the enterprise spatial system software. The Data Buy menu item allows the user to branch off to the data buy portion of the enterprise spatial system software.

The Export Pn'A Data function exports the Point n' Attribute data store to a comma delimited text file on the user's hard drive. This function makes use of standard browser functionality. Upon selection of this menu item, a .csv format text file is downloaded to the user's system. The standard browser download dialog box is presented to the user, allowing the user to determine how the file is handled in accordance with standard web download protocols. FIG. 148 illustrates a download dialog box 14810 used for the Microsoft® Internet Explorer® in accordance with certain implementations of the invention. Selection of the "Open . . . " option will load the txt file into the enterprise spatial system software that the user has setup to handle text files. Selection of the Save . . . " option will launch the browser's Save As dialog box.

The Layer menu allows the user to access functionality that specifically applies to the data layers (vector data) within the enterprise spatial system software. Specifically, this menu provides functionality that defines the user's favorite layers (for use in the Favorites tab), defines the layer order, and perform various zoom to layer extent functionality. Within the Layer menu, the commands include, for example: Change Order, Edit Favorites, Zoom to Layer Extent, and a Zoom to All Layers' Extents menu item.

The purpose of the Change Order menu item is to allow the user to define the order in which the visible data layers are displayed within the Map window. The purpose of the Edit Favorites List menu item is to allow the user to define the layers that appear for selection within the "Favorites" tab in the data layers portion of the main UI screen.

The purpose of the Zoom to layer extent menu item is to allow the user to zoom to the extent of a single layer. Upon selection of this drop down menu item, the enterprise spatial system software shall determine the number of layers that are currently set as visible. If more than one date layer is visible, then selection of this drop down menu item shall launch the Zoom layer pop up dialog box. If one data layer is set to visible, the enterprise spatial system software shall determine the smallest AOI that bounds the extents of all of the specific data layer that the user has made visible. Then, a check is made to determine whether or not the updated AOI has support for the base image that is currently selected. If the base image is not available for the new AOI, then the AOI-Base Image Conflict pop up dialog box appears. If the user selects to change the AOI, then the Map window is refreshed with the new AOI and reversion to "none" as the Base Image selection is performed. If the user chooses to keep the Base Image, the AOI shall not be updated to reflect the Zoom to All command. If the Base Image is available, the Map window is refreshed with the new AOI that reflects the zoom to the extent of all layers. If no data layers are currently set as visible, a pop up dialog box error message appears, reading, "You must have at least one data layer visible before you can use this command".

FIG. 149 illustrates a Zoom layer pop up dialog box 14910 in accordance with certain implementations of the invention. This pop up dialog box is used whenever a user selects to zoom to the extent of a single data layer by selecting the "Zoom to layer extent command" from the Layers drop down. The purpose of this UI screen is to allow the user to define the layer whose extent the user would like to zoom to. The user will only be able to select from those layers that are set as visible at the time that the pop up dialog box is invoked.

The purpose of the Zoom to all Layers' Extents menu item is to allow the user to zoom to the extent of all layers that are visible at the time that the user selects this menu item. Upon selection of this menu item, the enterprise spatial system software determines the smallest AOI that bounds the extents of all of the data layers that the user has made visible. A check is made to determine whether or not the updated AOI has support for the base image that is currently selected. If the base image is not available for the new AOI, then the AOI-Base Image Conflict pop up dialog box appears. If the user selects to change the AOI, then the Map window is refreshed with the new AOI and reversion to "none" as the Base Image selection is performed. If the user chooses to keep the Base Image, the AOI shall not be updated to reflect the Zoom to All command. If the Base Image is available, the Map window is refreshed with the new AOI that reflects the zoom to the extent of all layers.

The purpose of the Drawing menu is to provide the user with access to functionality related to the area of cartography. Specifically, this menu provides options to access toolbar functionality in an alternative manner, and also gives the user a mechanism to quickly turn all drawing objects off and on (i.e. make them visible and invisible). Within the Drawing menu, commands include, for example: Text Tool, Line Tool, Polyline Tool, Rectangle Tool, Ellipse Tool, Polygon Tool, and View/Hide Drawing Objects.

The purpose of the Text Tool menu item is to provide an alternate means by which the user can access the Text Drawing Tool functionality. The purpose of the Line Tool menu item is to provide an alternate means by which the user can access the Line Drawing Tool functionality. The purpose of the Polyline Tool menu item is to provide an alternate means by which the user can access the Polyline Drawing Tool functionality. The purpose of the Rectangle Tool menu item is to provide an alternate means by which the user can access the Rectangle Drawing Tool functionality. The purpose of the Ellipse Tool menu item is to provide an alternate means by which the user can access the Ellipse Drawing Tool functionality. The purpose of the Polygon Tool menu item is to provide an alternate means by which the user can access the Polygon Drawing Tool functionality. As for the View/Hide Drawing Objects menu item, all of the drawing objects that are created within a specific project are stored on a single layer. The View/Hide Drawing Objects command is a toggle function that turns this drawing object layer on and off (i.e., makes the layer visible or invisible).

The Analysis menu is designed to provide an alternate means by which the user can access functionality that exists within the toolbar on the main UI screen. Within the Analysis menu, the commands include, for example: Select Point, Select Line Region, Select Ellipse, Select Polygon, Buffer Selection, and Boolean Query.

The purpose of the Select Point menu item is to provide an alternate means by which the user can access the Select Point Tool functionality. The purpose of the Select Line Region menu item is to provide an alternate means by which the user can access the Select Line Tool functionality. The purpose of the Select Rectangle menu item is to provide an alternate means by which the user can access the Select Rectangle Tool functionality. The purpose of the Select Ellipse menu item is to provide an alternate means by which the user can access the Select Ellipse Tool functionality. The purpose of the Select Polygon menu item is to provide an alternate means by which the user can access the Select Polygon Tool functionality. The purpose of the Buffer Selection menu item is to provide an alternative way to access the Buffering functionality within the enterprise spatial system. The purpose of the Boolean Query menu item is to provide an alternative way to access the Boolean Query functionality that is offered from both the toolbar and the full report.

The user can access a Preferences UI screen at any time by selecting the Preferences menu from the Main menu selections. FIG. 150 illustrates selection of the Preferences menu 15010 in accordance with certain implementations of the invention. Preferences are set using a series of UI screens, all of which have the same functionality for all users, regardless of whether the user is a transactional or subscription based user.

The customer is granted limited ability to customize the enterprise spatial system software. There are several functions that a user is allowed to undertake. For example, the user is allowed to change his/her user name as many times as he/she likes. However, each time that the user changes the name, the change to a new user name is contingent upon the availability of that user name, as every user name that is established within the enterprise spatial system is unique.

Similarly, the user is allowed to change his/her password as often as he/she would like. Since the user has to log in with the correct password to even see the User Profile UI screen, the password can be changed without requiring the user to enter the current password. By default, the enterprise spatial system will automatically log a user off the enterprise spatial system after 30 minutes of non-activity, and the user may change this default auto-logoff setting.

The user may also select the UI screen to first appear after login. When the user first logs into the enterprise spatial system, the first UI screen that appears is the Welcome UI screen, which provides helpful information. However, some users may want to bypass this UI screen and go straight to the Online Map and Analysis wizard, for example. This user profile function allows the user to define their starting point within the enterprise spatial system. The user may select the default AOI. This is the AOI that appears when the user first logs in, or starts a new project. This will also be the AOI for the reference map.

The user preferences are set using multiple Pop up dialog boxes, each responsible for defining specific preferences.

FIG. 151 illustrates logic 15100 for processing a logoff in accordance with certain implementations of the invention. The logoff process is the process by which a user terminates the enterprise spatial system session that was initiated at login. Once the user has logged off from the enterprise spatial system, none of the functionality of the service is available to the user until the user successfully completes the login process. The user can access the logoff UI screen at any time by selecting the "Logoff" button in the upper right portion of the UI screen.

FIG. 152 illustrates common Logoff UI screen 15210 elements in accordance with certain implementations of the invention. During the logoff process, the pull down menus are not available to the user. The menus will still appear to the user, but they are grayed out and unavailable for selection.

FIG. 153 illustrates a first Logoff UI screen 15310 in accordance with certain implementations of the invention. FIG. 154 illustrates a Logoff Confirmation UI screen 15410 in accordance with certain implementations of the invention. This UI screen serves as a termination point, and relies upon the customer using the web browser to navigate to whatever task the user is interested in after completing the enterprise spatial system task.

Once a user has successfully logged in to the enterprise spatial system, a unique "session" is begun. A session is closed at the time when the user logs off of the enterprise spatial system. Whenever a user is within a session, there are several requirements that apply to the saving of information that the user has provided on various UI. screens throughout the enterprise spatial system software.

Once the user is within a login session, there are two areas of session information that are supported: UI screen caching and the remembering of a task progress. The enterprise spatial system has the ability to take advantage of the browser's caching abilities to handle the storing of information in certain circumstances. The specific situation of concern is when an enterprise spatial system customer is working within one of the "mini-wizards" within the enterprise spatial system software. In the enterprise spatial system, the "<Back" and "Continue>" buttons are the equivalent in functionality to the browser's "<Back" and "Forward>" buttons. As a result, the caching that the user experiences is similar to the experience that the user would expect when navigating with a standard browser. Specifically, if a user progresses forward within a wizard from UI screen "x" to UI screen "y" (as shown with arrow 1 of FIG. 155), the information that the user provided in UI screen x is cached even though the user is now on UI screen y. This way, when the user selects the "<Back" button on UI screen y, UI screen x appears and is populated with the information that the user had previously provided. FIG. 155 illustrates navigation using the Back button 15510 and using the continue button 15512 in accordance with certain implementations of the invention.

Similarly, after using the "<Back" button to navigate to previous UI screens, when the user selects the "Continue>" button to move forward, any information that the user had previously provided appears in the appropriate UI screens.

The wizard UI screens are cached as long as the user is actively working within the wizard. A user is considered active within the wizard from the time in which any information is entered on the first UI screen of the wizard, until any one of the following occurs: the user cancels the wizard, the wizard has been successfully completed by the user or the user elects to logoff from the enterprise spatial system.

In some cases, a login session is disrupted by a dropped connection. The saving of session information is important when a user's progress within an active task is interrupted to a loss of connection to the enterprise spatial system servers. FIG. 156 illustrates processing when there is a dropped connection 15610 in accordance with certain implementations of the invention. In this example, the user is in the process of printing an online map, and is on the layout UI screen of the print map wizard. At this point, the user loses connection, for any reason (e.g., the user's Internet connection went down, the enterprise spatial system went down, the user's computer crashed, etc.). This is represented by arrow 1 of FIG. 156. The desired experience is that when the user re-establishes a connection with the enterprise spatial system (arrow 2), and successfully logs into the enterprise spatial system, then the user will immediately resume at the point in the task where he/she left off (arrow 3).

To accomplish this, the enterprise spatial system software constantly saves information to a temporary file on the user's local system. This file contains all of the information for the current session and all of the tasks in progress. The file is periodically updated upon each selection of a continue or back button. This session file is deleted upon successful logoff.

At login, the enterprise spatial system software checks for the presence of the temporary session file (if a file is present, the enterprise spatial system software knows that the user was unable to successfully logoff from the enterprise spatial system). If a temporary session file is not present, then the user logs in as normal, and the default UI screen is launched. If a temporary session file is present, then the enterprise spatial system software reads the information from the file, and uses this information to launch the enterprise spatial system software to the UI screen that the user was on at the time of interruption and load all of the data that the user had provided on various UI screens during the previous session.

The e-commerce related transactions touch upon all areas that are related to the billing and fulfillment relationship with the customer, and therefore cover numerous areas throughout the enterprise spatial system software. Specifically, the e-commerce related transactions provide: support for the enterprise spatial system subscription Pricing Plans; subscription-based billing; transaction-based billing; evaluation modes (i.e. non billing mode); tracking specific usage information; and, a back end interface to the fulfillment system. The enterprise spatial system provides a flexible e-commerce system.

The enterprise spatial system derives revenue from customers who have agreed to pay for the enterprise spatial system service on a recurring basis. As a result, the e-commerce system supports a subscription-based pricing model. The pricing model is very flexible. In certain implementations, the specific pricing that is offered is tailored from customer to customer, based upon a number of variables that come into play. The specific variable areas that effect the pricing include, for example, the following: the number of users that a given customer has; the "type" of each user (i.e. the role assigned to these users); the amount of storage space that the customer requires on the enterprise spatial system servers; functionality subscribed to; whether or not the customer wishes to use premium data, and if so the quantity, quality, and type of data; whether or not the company has purchased premium support; and, when support for the upload of customer data is available, whether or not the user uses this service will affect the price.

Within each of these variable areas, a number of predefined options are available for the sales force to offer to the customer. Also, pricing plans may be tailored to fit the service to the specific needs of an organization, but still remain within a structured pricing plan. FIG. 157 illustrates a structure 15710 that shows variables that are involved in the pricing structure in accordance with certain implementations of the invention. In addition to defining the variables the come into play in the pricing model, the structure 15710 shows which variables are considered part of the base subscription, and which fall within the realm of the premium level offerings. The base features are common across all customers so all customers have the same access to these same features. These based features is priced based upon the number of users. The variation comes into play when a customer decides upon the mix of premium additions. As implied by the naming convention, when a customer includes, for example, components from the "Premium Additions" category, the customer is charged an additional amount beyond the base subscription fee.

A basic variable that affects the pricing structure is the number of users who have access to the enterprise spatial system. In addition, each licensed user can be classified into one of several "roles", which define the type of user. In certain implementations, the roles available for subscription-based users will include, for example, the "power user" and the "viewer". The power user has access to all of the enterprise spatial system functionality. The viewer user will not have access to certain functionality. Support for the number of users can be provided in a manner that does not significantly impact the architecture of the enterprise spatial system software, but instead is handled via internal enterprise spatial system processes.

In certain implementations, the process for setting up the licensed users is as follows. A sales person reaches an agreement with a customer that includes, for example, x number of "role A" users and y number of "role B" users. The customer will provide the enterprise spatial system with a list of the employee names and their corresponding role. The subscriber accounts are setup by a the enterprise spatial system employee (or an outsourced employee) using the enterprise spatial system Admin tool. When an individual is setup, a unique user name is assigned to that user, along with a temporary password. The enterprise spatial system can control the number of users by controlling the number of unique user name that are given to the customer. In essence, when a customer buys a license for "n" users, that company is given "n" user names tied to those users that allow the users to access the enterprise spatial system. Thus, there are no requirements on the enterprise spatial system to accomplish the goals of supporting a variable number of users covered in the license agreement As a user is added with the Admin Tool, the enterprise spatial system employee is able to assign a role to the user, by selecting from a list of available roles. Upon login, the user's role is ascertained, and the enterprise spatial system software offers functionality appropriately based upon that user's role (i.e. certain functions of the software may not be available to some users). Roles can define whether or not the user can: access certain business solution, save data, upload customer data, have access to an unlimited geographic area, or if geographical constraints are in place for the user, request data fulfillment, or access premium data (or more granular data).

Every customer is provided a base amount of storage space on the enterprise spatial system servers as part of their subscription. This storage can be used to save maps, upload data (e.g., at a later time), etc. The amount of base storage that is allocated to a customer is flexible, so that this variable can be tied to a subscription level, number of users, or any other variable. The pricing plan is setup up so that the customer is not supposed to exceed this storage amount. The enterprise spatial system provides reports that show the amount of storage being used by a customer, broken down by user. A process is put into place where the Account Manager will conduct a quarterly review, and if the customer is exceeding the agreed upon amount, then the contract is modified to compensate the enterprise spatial system accordingly. In certain implementations, the enterprise spatial system does not begin compiling charges to the customer once the base amount of storage has been exceeded. Instead, the enterprise spatial system automatically generates reports that indicate whether or not a customer has exceeded the agreed to amount.

Business Solutions provide additional functionality and value-add that is targeted at specific vertical markets. These solutions provide analytical tools, and may also be bundled with premium data. In certain implementations, the Business Solutions suite consists of multiple Business Solutions, each with its own discreet functionality and separate UI elements. The enterprise spatial system needs to be designed so that access to each Business Solution can be turned on or off for a given customer, independent of all other Business Solutions. In other words, if the enterprise spatial system has three Business Solutions available (A, B, and C), then the enterprise spatial system allows for any combination of these Business Solutions to be available to a customer (i.e., No Business Solutions, A only, B only, C only, A & B, A &C, B & C, A & B & C).

The availability of Business Solutions is tied to user roles, so that within a company, some users may have access to Business Solutions while others do not. Also, different users may have access to different subsets of Business Solutions.

The next "Premium Addition" variable that is considered as part of the pricing support relates to the customer's use of premium data. Premium data will include, for example, ADS-40 imagery, but may also include, for example, other data that the enterprise spatial system has to pay a "per use" license on. Therefore, support for premium data assumes that any type of data can be charged to the user as premium data.

As a Premium Addition, the customer is charged more based upon the use of Premium Data. Specifically, the service charges to the customer is based upon: the quantity of data (e.g., square miles), the quality of data, and the type of data. A pricing grid that shows quality of data on one axis and type of data on the other may be used to determine price. The pricing in the grid is per square mile, so multiplying this number by the square miles of that data will yield the price. In some cases, Premium Data is bundled with Business Solutions. As a result, a customer may choose not to pay for any Premium Data, but still access certain types of Premium Data by subscribing to Business Solutions.

In certain implementations, determining the price for the premium data is automated. In certain implementations, sales individuals of the enterprise spatial environment discuss the data needs with the customer upfront, and decide upon the total amount of Premium Data that the customer anticipates using on a monthly basis, and this is built into that customer's monthly charges. In certain implementations, the enterprise spatial system tracks all usage of premium data, tied to the user name, so that at the end of each month, analyses can be conducted to determine whether the total amount of Premium Data that the customer actually uses is more than anticipated. If so, sales individuals are responsible to adjust the monthly fee for Premium Data.

The enterprise spatial system is able to modify the service fee paid by a customer after the account has been established, with a line item in the billing labeled "Premium Data costs". Whenever the enterprise spatial system introduces new data to its offerings, a "quality" level os associated to the data, along with a "type" tag.

The Premium Data used by a custom is tracked in detail, allowing for the generation of a report that includes, for example, the following fields: Date, User Name, Customer Account. Name of the data, the quantity of data used (e.g., in square miles), the quality of the data, the data type, and Output (e.g., map, download, analysis).

Restrictions prevent certain users from accessing premium data. In certain implementations, in addition to giving every user a role, every user is given a "yes/no" classification with respect to accessing Premium Data.

The enterprise spatial system provides extensive reporting, allowing for flexible reports to be generated on the various types of information that are being tracked.

In certain implementations, the enterprise spatial system e-commerce system may to interface with an accounting system outside of the enterprise spatial system environment. The data tracked and stored in the e commerce system can be exported into the accounting system for billing purposes.

The enterprise spatial system user interface has been designed with the notion that the enterprise spatial system may to offer partners or corporate customers a co-branded version. Therefore, there are a number of "placeholders" for various branding elements in the user interfaces. A partner can select which of these elements, if any, are appropriate to provide the partner with sufficient co-branding value.

There are several co-branding elements that have been integrated into the enterprise spatial system software UI screens.

As for the Welcome UI screen, the Welcome UI screen is a useful tool in providing communications with the enterprise spatial system users. Since the enterprise spatial system software has been designed to pull these communications from "non hard-coded" sources, these communications can be provided by the Partner to the enterprise spatial system, allowing the Partner's messages to get directly to the users of their co-branded offering. FIG. 158 illustrates co-branding for a welcome UI screen 15810 in accordance with certain implementations of the invention.

The banner graphic that typically is used is a the enterprise spatial system branded graphic, but in the case of a co-branded offering, the Partner has the option use this space to integrate it's own graphics, and thus its own branding, into the enterprise spatial system software. The header graphic has the option to have a Partner URL link embedded in it, so that if a user clicks on the header graphic, the user can be taken to the Partner's site. Upon user selection of the co-branded header graphic, a new browser window will automatically be launched. The new window will link the user to the partner-designated URL. This URL needs to be flexible, to allow for quick changes and the ability to rapidly deploy co-branded versions of the enterprise spatial system. In certain implementations, the enterprise spatial system requires that the enterprise spatial system logo still remain on a co-branded banner. In this case, a URL link is required for this logo as well.

As part of the portal, the enterprise spatial system will allow the company to have a company news section on the portal page. Company news is an area set aside strictly for the company to be able to communicate directly to their staff. In certain implementations, the company is responsible for this content. Each company may assign someone to author the content that appears here, and the enterprise spatial system may point to their URL from within the portal. This makes all management and review of the content the company's responsibility. It is expected that not all companies will require this section, particularly if it means utilizing their own resources to manage the content.

The main UI screen offers the greatest amount of co-branding opportunities to partners of the enterprise spatial system. FIG. 159 illustrates an example of a co-branded version of the main UI screen 15910 in accordance with certain implementations of the invention. As for the banner graphic, the same details apply as on the Welcome UI screen. As for customizable frame graphics, the graphics that make up the frame for the various functional areas of the main UI screen can be changed out for co-branded version. As a result, the color of the entire frame and the styling of the header can be customized for the co-branded experience. As for customizable menu graphics, the graphical elements that make up the pull down menus can be customized for every partner. This may mean that in addition to having a different look, co-branded menus may have different names.

As for navigational links to outside software (e.g., application) URLS, the enterprise spatial system software supports an architecture that allows the enterprise spatial system to host the main software, but also branch off to other software that may be hosted by a partner of the enterprise spatial system. In the example co-branding UI shown in FIG. 159, the enterprise spatial system links to other software through a tab control interface. In this example, the partner would be hosting the "WebCruiser, Web Reports, and Calculators applications on their sites. From these application sites, the partner would provide similar links back to the co-branded enterprise spatial system software site.

As for customer data, depending upon who the Partner is, there may be a need to allow the Partner to add corporate GIS data into the enterprise spatial system software. For users who wish to integrate their own data into the software, the enterprise spatial system provides a means by which the data is brought into the back end (e.g., enterprise spatial system employees process data into the enterprise spatial system or a user interface that automates the entire process and allows the user to upload data from their system directly into the enterprise spatial system back end may be used). The enterprise spatial system also provides secure access to this data. The data that corporations will provide is often highly sensitive the enterprise spatial system ensures that only those who should have access to the data get access to it. The enterprise spatial system integrates the selection of the corporate data layers provided by the customer into the enterprise spatial system UI. Corporate data layers appear in the same area as the enterprise spatial system data layers. However, when corporate data layers are present, an additional tab category will exist that contains the corporate data (the title of the tab and it's tool tip are provided by the partner). This is the corporate data category, and is located immediately to the right of the show all categories tab. In addition, within the "all categories" tab, the corporate data is the first section of data to be displayed.

The enterprise spatial system also provides additional tools. A co-branded version of the enterprise spatial system support additional tools on the toolbar.

As for other UI screens and pop up dialog box windows, these UI screens offer a subset of similar co-branding opportunities to partners of the enterprise spatial system. FIGS. 160 and 161 illustrate examples of a pop up dialog box 16010 and of a co-branded version of a secondary UI screen 16110 in accordance with certain implementations of the invention. In both cases, there are elements that can be co-branded on these types of UI screens.

In FIG. 160, as was the case with the standard the enterprise spatial system main UI screen, the standard pop up dialog box has a subtle graphical background of a topographical map in a shade of the enterprise spatial system brown. In a co-branded offering, the Partner can select from any of the following choices to occupy the background graphic window: a Partner provided co-branding graphic, the default the enterprise spatial system background graphic or a solid colored background.

The graphics that make up the frame for the various functional areas of the main UI screen can be changed out for co-branded version. As a result, the color of the entire frame and the styling of the header can be customized for the co-branded experience.

FIG. 162 illustrates a table 16210 of valid US state codes in accordance with certain implementations of the invention. The state codes are valid for use in drop down boxes that require customer input of U.S. state information.

FIG. 163 illustrates a table 16310 of information to display in the Ambiguous Address pop up dialog box in accordance with certain implementations of the invention. Table 16310 provides the types of information that are displayed to a customer in the ambiguous pop up dialog box, based upon the types of information that the user has provided to the enterprise spatial system. Depending upon the information that was provided by the user, the information that is displayed within these cells will vary. The types of information that is displayed are all of those types of information that the user provided, plus any higher-level information that the enterprise spatial system could extrapolate. The specific rules are provided in the table 16310.

FIG. 164 illustrates a table 16410 of map layers of scale dependency in accordance with certain implementations of the invention. FIG. 165 illustrates a table 16510 of some raster and vector data to be used in the enterprise spatial system software in accordance with certain implementations of the invention. Other data sets, such as premium data for oil/gas/electric and public lands survey data, may also be available, although not represented in table 16510.

FIGS. 166A and 166B illustrate another table 16610 of some raster and vector data to be used in the enterprise spatial system software in accordance with certain implementations of the invention.

Q. Web Center

The enterprise spatial system provides application services and integrates and offers on-demand superior quality geographical imagery, associated industry specific data and analysis tools to government, industry and the general public. The enterprise spatial system' accurate and continually updated geographical information is offered by both one-time use and periodic subscription based models.

In certain implementations of the invention, the enterprise spatial system service is made up of several areas, including, for example: GIS Data Sources (e.g., aerial/satellite geographical imagery and public domain information; an ADS Processing Center for ADS400 Arial GIS imagery processing prior to delivery to the GIS Processing Center; a GIS Processing Center for integration and formatting of aerial, satellite and public domain information for delivery to an Operations Center; an Operations Center, which provides software development, data validation, production staging, network operations, fulfillment support and tier-two customer service; a Web Center, which is a Web based, ASP model service providing on-demand access to geographical imagery data mart and membership data; and an Order Fulfillment Center for order processing and customer data request fulfillment.

Both the Operations Center and Web Center are housed in facilities using infrastructure consistent with running a high availability, global internet operation. The Data Sources that are processed by the Data Center are provided through a combination of the enterprise spatial system managed and out-sourced suppliers.

Aspects of the various centers may be split or merged depending upon, for example, the logistical constraints on the locations of GIS and development personnel expertise. Provisions to support center functional separation will be indicated herein. The following discussion will be directed to the overall service and operational functionality to be provided by the Web Center.

The functional components required to host the the enterprise spatial system on-line service offering in a third party hosted Web Center, include, for example: all systems contained within the Web Center that are used to support service offerings; all system interface points into, or out of, the center for both normal operations and maintenance; and any reliance on external systems supporting Web Center operations.

In certain implementations, the enterprise spatial system Web Center is a secure, un-staffed, ASP model web hosting facility. The purpose of the Web Center is to host the enterprise spatial system on-line service offering that provides data (e.g., current GIS imagery and supporting data) and business analysis tools to its customer base. The Web Center receives and hosts integrated datasets from the Operations Center, provides the enterprise spatial system customer base access to these datasets in an adhoc, on-demand basis, and processes the billing of associated customer usage charges and orders. All customer order fulfillment beyond the adhoc image and data queries such as bulk data requests shall be forwarded to, and processed by, the Order Fulfillment component.

FIG. 167 illustrates the business process and data flow 16710 supported by the enterprise spatial system service and operational facilities in accordance with certain implementations of the invention. The Web Center's role in the business process is as both an analytical datamart for the on-demand access by enterprise spatial system customers and as a catalog of all current and historical data (e.g., imagery plus supporting data) available for bulk purchase.

The enterprise spatial system service offering hosted by the Web Center can be grouped into functional service groups, which are illustrated in FIG. 167. Each of the services groups is made up of a set of components that provide part of, or support part of, the overall service offering. As for Web Services, a Web based user interface exposes the core business and administrative functionality of the Business Application Services to clients (e.g., browser only, thin client, and thick client). As for application Services, a stateless, transactional application service exposes business functions for access control, content navigation, content delivery, account management and administration services that can be accessed in either a client/server or server-to-server model. As for Content Services, a set of middle tier application components accessed through the business services generate and deliver business content, including, for example, Map Servers, Report Servers and email servers. As for E-Commerce Services, a set of middle tier application components accessed through the applications services handle account financial, billing, and payment functions. As for Data Services, a set of data stores contain live production data uses to support continuous operations including a user membership data store, a special image data mart, a business rules data store, and a health & welfare data store. As for Maintenance Services, a set of Web Center administration services used on a continual/scheduled basis to maintain and monitor the Web Center operations include, for example, spatial dataset loaders, health & welfare management servers, and archival/restore servers. In certain implementations, service components contained within the Web center are directly or indirectly related to this focus.

The Web Services, a Web Server based user interface, is the primary external interface to access the Application Services. The Web Services interface exposes the core business and administrative functionality of the Application Services to all Web Center clients. These clients shall include, for example, both the enterprise spatial system customer base and the enterprise spatial system operational staff.

The Web Service provides a user interface to navigate the Web Center's site and execute the Application Services via the access control security layer. Once authenticated, the suite of Application Services available to the client shall be adjusted based on their access level and granted role. The Web Services access business related Data Services via the Application Services. FIG. 168 illustrates Web Services 16810 in accordance with certain implementations of the invention.

The Web service allows client functionality access through different types of client interfaces, such as, browser-only client; thin client; and thick client. The use of a specific client interface depends upon individual users needs and business constraints directing their implementation.

A browser only client is supported to allow clients to access the system without requiring a downloaded plug-in or control. This feature requires almost all client processing to be accomplished in the middle-tier application layers of the Web Center. In certain implementations, not all service functionality is available to browser only clients. Exact limiting features are determined, for example, based on architectural feasibility.

For a thin client, the enterprise spatial system provides a web browser based user experience enabled by a thin client downloaded browser plug-in or control. The thin client solution is designed to interact, and exchange data between, the resources on both the clients local computer and the application middle tier services in the Web Center. The downloadable plug-in or control is designed to provide the full client functionality feature set with an efficient performance profile over all client network connections from a minimum of a 56K modem and higher. Multi-platform support (including, for example, Internet Explorer® and Netscape® browsers (both 4.x and higher) on Windows®, Macintosh®, and Linux® operating systems) is provided for the thin client user interface. In certain implementations, a Java solution is used to satisfy the multi-platform support constraints.

The thin client solution interfaces with the Web Services via standard internet protocols including HTTP, HTTPS and FTP. Authenticated connections are supported over, for example, a standard, 128 bit SSL session. The thin client component to be downloaded is downloadable in a reasonable time period over the minimum support network connection speed. A reasonable time period may be, for exmaple, between 30 seconds and 2 minutes. Thin client design considerations is implemented in concert with the Application and Data Services tiers to maximize the resource availability and performance characteristics of the intended client functionality to be supported.

The thick client interface solution requires no user interface provided by the Web Services. In certain implementations, the thick client interface solution may be implemented as an additional connector on an alternate web server port exposed to the internet to accept and pass thick client requests through to the Business Application Services layer. The thick client application is subject to the same network connectivity requirements as the thin client solution. The thick client application supports, for example, all functionality available to the thin client solution and may support additional functions or features.

As for consumer client functionality, the role of the client interface component of the enterprise spatial system Web Services is to deliver flexible, on-demand access to the comprehensive suite of data (e.g., imagery, vector, and tabular) and analysis functionality as both an interactive analysis service and as a catalog for bulk data ordering fulfilled through the Order Fulfillment desk. The complete set of client functionality includes, for example, both the interactive analysis features and additional administrative/account management support required to provide a comprehensive, consumer business service.

The enterprise spatial system supports two different customer models: subscription user and one-time, transaction-based customer. When first attempting to access the enterprise spatial system service, every customer registers an account with the service regardless of the type of customer. In the case of the subscription user with a site license account, an enterprise spatial system representative may register the customer using the enterprise spatial system Admin tool. For transaction-based customers, registration may be handled using a short registration wizard.

The registration wizard process is very quick and simplified, so as not to serve as a barrier to entry for these new customers. The main goals of the registration process is to get the user's email address (e.g., for communications), and assign the user with a user name and password (e.g., for usage tracking and credit card storage). Registration information includes, for example, general information about the customer and billing information. The registration process is designed to be a one-time experience for the customer. Once the customer has completed the registration process, the customer will have a usemame and password and be able to login to the enterprise spatial system service.

As an e-commerce site, The enterprise spatial system will be trusted to handle various types of information that are of a sensitive nature to the user, including personal contact information and billing/credit card information. All sensitive customer information is protected to assure that the trust of the wide customer audience is not violated. As a protection to the customer, a secure login procedure is used to ensure that only authorized individuals have access to a given account.

In addition to protecting sensitive customer information, utilizing a login process allows the collection of invaluable information regarding customer usage. The option also tracks and uses customer's usage to tailor personalized communications to that user.

The login process serves as the entry point for users accessing the enterprise spatial system. The process involves retrieving and verifying the validity of the user name and password provided by the person attempting to login to the enterprise spatial system application.

The "Online Mapping" button is available to transaction-based customers. This button provides the user with access the Online Mapping wizard, which provides the majority of functionality to the transactional user. The functionality provided by the Online Mapping wizard can be broken down into two main sections: map creation and map purchasing.

The first part of the Online Mapping wizard provides several UI screens that allow the users to undergo the process for creating a map, including, for example: selecting the Area of Interest (AOI); selecting the base map image; selecting the various data layer features; and, setting up the look and feel of the map. The user views the working map in a viewing window on the right hand side of the UI screen.

The user defines the location of the map for example, by National Map selection or Advanced Location Search. The National Map selection feature allows the user to visually select the area from a national map by clicking on the desired location. After the user clicks on the desired location, the map window shall zoom to include, for example, only the area that the user selected. At this point, the user can click further to refine the selected map window view. The Advanced Location Search option allows the user to type in information that defines the location, including the address, city, state, and country. The map window shall zoom in to the desired location.

Once the AOI has been selected, the base map image format is selected to suit the user's needs by defining several image attributes. For example, the type of image to be used for the map is defined. Once the user has selected the area covered by the map, the user will be presented with choices for the type of image to use for the map. The types of images available for creating a map will vary depending upon the map area that the user has defined, but may include, for example, color aerial imagery, color infrared, satellite imagery, USGS topographic maps, and others. Also, the map resolution is defined. The resolutions available to the user will be dependent upon the map area and type of image that the user has selected.

In certain implementations, throughout the map creation process, the map contains an embedded watermark as part of the base image. This watermark is removed during the map purchase process and is not included in the final image delivered to the consumer.

The type of image attributes available to the consumer is based on a subscription level and associated access rights.

Once the basic map information has been provided, the user can then select from various "data overlay" features. These features provide data (e.g., geographic) in a manner that can be overlaid and matched up with the map. The categories of features that can be overlaid include, environmental, political boundaries, infrastructure, and demographic data. The user is able to manipulate the specific features and their attributes that are overlaid on the base map image. The following modifiable attributes are supported for the data layer overlays: the number and type of data layers overlays; the order that data layers are overlaid on the base image; the text font, point size and color; and, the line type, color and thickness. The type of features available to the consumer is based on subscription level and associated access rights.

For subscription users, various industry-specific data layers may be available (e.g., electric line right of ways). The data available to overlay on the base map is determined by the services that the customer has subscribed to.

The look and feel of the working map can be adjusted using the various tools on the map toolbar. A map toolbar with a set of functions is available at any time that a customer is working on a map-related task. For example, a Zoom In tool is the default tool. By selecting the zoom in tool and clicking on the map, the map area will zoom in by 50%, centered at the click point. By selecting the Zoom Out tool and clicking on the map, the map area will zoom out by 50%, centered at the click point. By clicking and dragging a rectangular box (a "Zoom Box") on the map, the map area will zoom to the extents of the box. Once the panning tool is selected, the user can "grab" the map and move it, changing the Center point of the map. The zoom level remains the same when the pan tool is used, therefore using the panning tool ultimately changes the boundaries that define the area of the map.

A Previous Image tool is available after the user has either zoomed or panned an image. Selection of this tool followed by a click on the map reloads the image that had previously occupied the Map Window. After selecting a Point n' View tool, the user is able to click on any data element overlaid on the current map, and a pop up dialog box containing a description of that element will appear. The data presented will vary based upon the type of data element that the user has selected. The Point n' Attribute tool allows a user to click on any object on the current map, type in various categories of information that describes the object, and then automatically save out these associated descriptions as a data store record attached to that object. The Text Drawing tool allows a user to click on any point on the current map, type in text information and then automatically save out these associated as a data store record attached to that map point.

A series of tools will be provided that allow users to type in text to be overlaid on the map, or draw basic shapes such as squares, circles, lines, and polygons that are layered on top of the map. For example, a Rectangle Drawing tool allows users to add squares and rectangles on top of their maps. A Circle Drawing tool allows a user to click on any point on the current map, insert a circle, adjust the diameter and then automatically save out these associated as a data store record attached to that map point. A Line Drawing tool allows a user to click on any point on the current map to start a line, click on a second point to end and draw the line, and then automatically save out these associated as a data store record attached to the map. A Custom Shape Drawing tool allows a user to click on any point on the current map to start a line, click on any number of subsequent connected points to draw additional lines, and the press escape to end the shape and automatically save it out as an associated data store record attached to the map.

The consumer is provided a set of final formatting options to facilitate a printed form of image for presentation. These options shall include, for example, the following attributes: Map Title and Description, Map Size and Layout, and Other Display Options.

After the map has been adjusted to its final form, the user is able to purchase the map. The map purchasing functionality is accomplished through the shopping cart module in the enterprise spatial system. The purpose of the shopping cart module is to provide a means by which the enterprise spatial system can conduct transactional-based purchases. The shopping cart provides an interface to the user that walks the user through the process of approving the transaction and following it through completion. The shopping cart process involves multiple steps, including, for example gathering various types of information required for the transaction, such as, contact information, shipping information, billing information, and more. Once completed, the shopping cart module presents the user with a summary of the proposed transaction, for verification by the user prior to executing the transaction. Finally, the transaction is conducted with the enterprise spatial system servers, after which the user is provided with an acknowledgment of the transaction that can be printed and stored as a physical record of the transaction.

The UI screen design has been designed, so as to allow the enterprise spatial system software to easily interface with and utilize various shopping cart technologies available on the market.

For subscriber customers, an advanced user experience is provided to augment basic map generation with GIS analysis tools and other functions. To support a more complete GIS analysis suite, some sets of tools are provided to the subscription users to help them in their analysis. These tools shall include, for example, GIS buffer creation, measurement, and annotation tools.

Creating buffers allows the user to create a buffer area from a data element, user defined point, or a segment on the map. The purpose of the buffering tool is to ultimately highlight a type of data within that buffer area. The user can define the buffer area by clicking on the preview of the map. If the user selects a data element, that data element will be highlighted. If the user selects on segment of a data element (e.g., a segment of a stream, road, power line right of way, etc.) then that particular segment is highlighted. A user can selected multiple elements and segments using standard Windows <shift> and <ctrl> functionality. The user also has the option of selecting a point on the map that has no underlying data elements associated with it. Once the point(s) or segment(s) have been defined, the user can provide a distance to define the buffer area. In certain implementations, when working with a buffer, the user works with one type of data layer (point, line or polygon) at a time, so the user cannot select a "point" and a "line segment" as the foci for a buffering operation. For example, the user chooses a line segment from the "roads" layer a point from the "houses" layer, but both cannot be done simultaneously.

Additional advanced tool features provided as part of the enterprise spatial system service include, for example, the ability to measure both linear distances and user-defined areas.

The linear distances tool allows users to measure a linear distance between two points on the map. After selecting this tool, the user identifies 2 points on the map (e.g., in the preview window). The distance between the two points is returned via an "info window". The "info window" may be a specified area on the page for tool responses or a separate small window (e.g., whichever is "cleaner"). An additional "tracking log" may be used to store this response for reporting at a later date. In certain implementations, the measurement may not be overlaid on the map just reported to the user in the "info window". The distance can be represented in any of several units. Moreover, in certain implementations, the answer is reported with multiple units (e.g., in both miles and kilometers, or feet and meters) depending on map scale. This additional requirement would support internationalization for non-US (metric) users.

Similar to the linear distance tool, the user defined areas tool allows users to measure an area enclosed within multiple points. After selecting the measure area tool, the user identifies as many points on the map as required to define the boundaries of the desired area (e.g., in the preview window). After all points required to enclose the area have been defined, the area is calculated and returned via an "info window". In certain implementations, the "info window" and/or the "tracking log" function in the same manner as described for linear distances. Depending on map scale, the area is reported in miles squared (i.e., $mi^2$) ($km^2$), acres (hectares) and/or feet squared ($ft^2$) ($m^2$). Area scale thresholds are defined and used to determine which units to use. For example, miles (km) and square miles (square kilometers) would be used at scales less than 1:50,000 and other units at scales greater than this. Moreover, as with linear distances, in certain implementations, the answer is reported with multiple units (e.g., in both miles and kilometers, or feet and meters) depending on map scale. This additional requirement would support internationalization for non-US (metric) users.

The enterprise spatial system service features include, for example, annotation tools that operate in a similar manner to the measurement tools. The annotation tools include, for example, support for both linear distances and user defined areas.

The linear distances tool allows users to annotate a linear distance between two points on the map. After selecting this tool, the user identifies 2 points on the map (e.g., in the preview window) in the same manner as they measure linear distances. Unlike the measurement tool, the 2 points, line and distance are overlaid on the map. An additional tracking log may be used to store this response for reporting at a later date. The distance can be represented in any of several units. Moreover, in certain implementations, the answer is reported with multiple units (e.g., in both miles and kilometers, or feet and meters) depending on map scale. This additional requirement would support internationalization for non-US (metric) users.

Similar to the linear distance tool, the user defined areas tool allows users to annotate an area on a map indicated by multiple (e.g., three or more) points. After selecting the annotate area tool, the user identifies as many points on the map as required to define the boundaries of the desired area (e.g., in the preview window) in the same manner as they measure user defined areas. Unlike the measurement tool, the points, interconnecting lines and area calculation are then overlaid on the map. In certain implementations, the "info window" and/or the "tracking log" function in the same manner as described for measuring linear distances. Depending on map scale, the area is reported in miles squared (i.e., $mi^2$) ($km^2$), acres (hectares) and/or feet squared ($ft^2$) ($m^2$). Area scale thresholds is defined and used to determine which units to use. Initial expectations are that miles (km) and square miles (sqkm) would be used at scales less than 1:50,000 and other units at scales greater than this. Moreover, as with linear distances, in certain implementations, calculations may use and report multiple units (e.g., in both miles and kilometers, or feet and meters) depending on map scale. This additional requirement would support internationalization for non-US (metric) users.

For subscription customers who have overlaid industry-specific data, the enterprise spatial system will offer reports that provide detailed breakdowns of that data within the location boundaries defined by the user. The breakdown of information will be unique for each type of data. A data layer is supported. This functionality may additionally be provided to transactional customers.

For customers interested in hard copies of their custom maps, the enterprise spatial system will provide functionality that allows users to print out a copy of the map, or save the map for later use. If the user chooses to print out a hard copy of the map, the enterprise spatial system allows the user to define various attributes that define the layout of the printout. To address the issue of transactional users obtaining products without paying for the products, a watermark is overlaid on all served base imagery prior to purchase.

To support bulk data purchases as an additional the enterprise spatial system service, the enterprise spatial system provides for the selection and ordering of a bulk dataset. A bulk dataset is selected in a similar manner to individual map images. A difference between map and bulk data purchases are that no direct image is rendered and delivered immediately to the consumer. Also, individual imagery or data layer feature datasets may be purchased separately or together, either overlaid or as separate datasets. The general user experience differs only in the few areas applicable to the preview and delivery differences to support ease of use.

In order to provide a personalized user experience to all customers, the enterprise spatial system allows customers to create unique profiles that describe which data layers are available to the customer, how various preference settings are setup, and more. In addition, the customer profile function allows subscription customers to edit their registration and payment information.

Similar to the user profile functionality, the change subscription level feature allows users to change the subscription plan that they have signed up for. In certain implementations, this feature is broken out from the user profiles feature for marketing purposes.

The user can access online help UI screens at any time by selecting the “Help” button in the primary navigation bar. The enterprise spatial system Help file is intuitive for the user, having a look and feel that is common to online applications.

The user interfaces for all Administration functions are implemented as browser based and hosted by the Web Services. A set of consoles for accessing the Admin Tool functions are housed both in the Operations Center and also in the Web Center for local administration when personnel are there. The general set of Admin functions supported include, for example: Access Control Management, SKU/Billing Plan Management, Account Registration Information, Activity History, Order Status/History, Billing Status/History, Payment Status/History, Correspondence History, and System Maintenance.

Each of the various Web Center systems have differing functional roles but all are centrally managed using the common Administration user interface. Each of the systems may support a customized Administration user interface.

All business application functionality available in the Web Center is protected by an Access Control management system. The Access Control system is role based with a set of roles both predefined and configurable as different combinations of functionality is required. Each business application function available in the Web Center is individually controllable as a right granted or revoked from a specific user role. All client access, operations or consumers, is controlled using pre-assigned roles.

The Admin Tool allows the operations personnel the ability to: view a list of all available roles; view a list of all available business functions; view a list of all roles that contain a specific business function; view a list of all business functions contained in a specific role; add, remove and/or modify a specific role; add or remove a business function to or from a specific role; view a list of all accounts, both operations and customers, that have a specific role; and, add, remove and/or modify the role assigned to a specific account. All non-registered, transactional consumers are granted access to a limited set of the system’s business functions under an automatically granted ‘Unregistered User’ access role.

The enterprise spatial system provides different billing models, including: Transactional charges and Subscription billing. The Admin Tool supports the management of different datasets, one for each billing model. Transactional Billing Accounts configured for transactional billing is billed based on transactional usage controlled through the Application Services. All Application Services for which it is determined that transactional charges apply are configured with a SKU comprising charge details and rules. All charge SKUs are associated with Application Service transactions. Transactional charge SKUs contain, for example, the following information/attributes: SKU ID, SKU Description, SKU Status, and Dash Number business rule list (with Dash #, rule criteria and amount).

All SKUs contain one or more specific charge rates. Each charge rate is uniquely configurable based upon optional business rules to allow for different billing rates given different purchasing conditions. Each unique billing rate for a particular SKU is uniquely identified by a dash number suffix appended to the SKU Id. All SKU business rules are configured to resolve to a single SKU dash number under all conditions. The Admin Tool allows the operations personnel to: view a list of all SKUs in the system; view a list of all dash numbers for a specific SKU; view a list of all transactions executed for a specific; SKU; and, add, modify or remove a SKU or SKU dash number. Each list report is ordered chronologically in reverse order (if applicable) and filtering is allowed using any combination of the criteria recorded including a Date Range. The chronological order can optionally be reversed.

Accounts configured for subscription billing are processed and submitted on a periodic (e.g., monthly) basis by an automated Billing System. Each account configured for subscription billing is assigned a particular billing Rate Plan. Each billing Rate Plan is configured with an number of revisions each with charge details and rules. Billing Rate Plans contain the following information/attributes: Rate Plan ID, Rate Plan Description, Rate Plan Status, Dash Number business rule list (with Dash #, rule criteria and amount), and Current Dash Number. All Rate Plans contain one or more specific charge rates. The rules and charge amount for each charge rate is uniquely configurable to allow for the revision of an existing rate plan while grand fathering all existing users of that rate plan. Each unique Rate Plan is uniquely identified by a dash number suffix appended to the Rate Plan ID. All Rate Plan business rules are configured to resolve to a single Rate Plan dash number under all conditions.

The Admin Tool allows the operations personnel to: view a list of all Rate Plans in the system; view a list of all dash numbers for a specific Rate Plan; view a list of all transactions executed for a specific Rate Plan; and, add, modify or remove a Rate Plan or Rate Plan dash number. Each list report is ordered chronologically in reverse order (if applicable) and filtering is allowed using any combination of the criteria recorded including a Date Range. The chronological order can optionally be reversed.

All chargeable services provided by the enterprise spatial system require a registered account. All operations personnel require an account to access the system for administration and maintenance functions. The Admin Tool provides functionality to manage all types of accounts.

As for basic account information, the Admin Tool allows operations personnel to view a list of all system accounts. The operations personnel are allowed to filter the list by various criteria to limit the list of users returned from the account query. The operations personnel are able to select any individual account listed in the system and view the account information for that particular account. Account information includes, for example, the following items as a minimum set of data: Account ID; Account Name (e.g., short account name); Account Password (e.g., adheres to safe password criteria and is stored encrypted); Account Email Address. Account Type (e.g., Transactional, Subscription, Operations); Account Access Role; Account Status (e.g., Active, Restricted, Closed); Account Holder Full Name (e.g., First, Last, Initials); Mailing Address City, State/Province, Country, Zip/Postal Code; Phone & Fax; Demographic data; Billing Method (e.g., Transactional or Subscription); Billing Rate Plan (e.g., if Subscription); Payment Method (e.g., Automatic Credit Card, Statement, or Bill Parent Account); Payment Tax Status/Rate, Billing Status (Current, 30 Days, 60 Days, 90 Days, Over 90 Days); Billing Address, City, State/Province, Country, Zip/Postal Code; Credit Card Information (e.g., CC #, Exp. Date, Batch #, CC Type, Name on CC); Billing cycle day (e.g., 1–28); Date last payment received; Date last statement submitted; Date last CC charge attempted; and, Optional Child Account list.

Some of the data items in the system are optional entry items. Additional services to validate Zip/Postal codes, email, and phone/fax numbers are implemented to reduce potential customer services calls and improve overall consumer experience.

For consumers performing transactional purchases, account information is collected at the end of the shopping cart purchase experience. The basic information entered as part of the transactional account registration include, for example, the minimum amount of information to validate and process the credit card charge. All transactions performed under the same session is attributed to the same account id. Attempts are made to match credit card information and/or source IP information to link subsequent transaction to an existing un-registered user's account for historical analysis.

For subscription accounts, the enterprise spatial system personnel with the ability to create consumer accounts process an account application and manually create and manage the consumer's account using the Admin tool. The Admin Tool provides, for example, the following functions: adding or modifying an account and its information; adding a child account to a parent account; and, generating a notification email to the account holder. All changes to basic account information automatically generate and transmit a confirmation email to the account holders email address. All changes to child account information additionally generate and transmit a carbon copy (CC) email to the parent account holders email addresses.

For operations accounts, the enterprise spatial system personnel with the ability to create operation's accounts manually create and manage the operations account using the Admin tool. The Admin Tool provides the ability to add or modify an operational account and its information. All operational accounts are created as child accounts of the enterprise spatial system master account. All operational account changes shall automatically generate and transmit a confirmation email to the account holders email address. All changes to and operational account shall additionally generate and transmit a carbon copy (CC) email to the master the enterprise spatial system account email addresses.

The Admin Tool provides the ability to view a historical list of all transactions performed by the Web Center Application Services. Each transaction is recorded with, for example, the following information/criteria: Account ID (Un-registered users automatically have an account assigned based on session), Transaction ID, Date and Time, Transaction Execution Duration, Transaction Type (using SKU where appropriate), and Transaction Completion Status. The transactional history report is ordered chronologically in reverse order and can be filtered by any of the criteria recorded, including a Date Range. The chronological order can optionally be reversed. Transactional history is recorded on all types of business operations executed by the Application Services including both operations and consumer functions.

Each application service transaction executed by a consumer that results in a service order, billable or not, is assigned an Order ID and recorded in an Order Work Queue for fulfillment. Orders can be fulfilled automatically or by Customer Fulfillment. Those orders processed automatically have only one workflow entry recorded indicating that it was completed automatically. Those orders processed by customer fulfillment is entered in the work queue with the status "Pending Delivery". These work orders are reviewed continually by customer fulfillment and executed in the order by received. When a work order is completed by Customer Fulfillment, an additional entry is entered in the work queue log for that work order to indicate its completion.

The Admin Tool allows the operations personnel to view a list of all work orders for all accounts. Each work order transaction include, for example, the following information/criteria: Order ID, Transaction ID, SKU ID, Date and Time opened, Date and Time closed (same as opened if automated), Order Status (Delivered automatically, Delivered by Order Fulfillment, Pending Delivery), Billing ID, Billing Status (Statement Submitted, Automated billing in process, Paid), Operator/Customer Service User (if not automated), and Notes. The Admin Tool allows the operations personnel to obtain an order work queue report ordered chronologically in reverse order and filtering is allowed using any combination of the criteria recorded including a Date Range. The chronological order can optionally be reversed. Additional administrative reports are added to draw statistical report to analyze order fulfillment processing times to aid in process improvement.

Each Application Service transaction SKU that is configured with an associated charge is recorded as a debit in a financial billing log for the requesting account. Each charge will then be collected based on the account's billing mode; either immediately by automated credit card/bank processing or through a monthly billing process. Monthly billings are accomplished by either automated credit card/bank processing or by mailed/e-mailed statements. Regular mailed billings may not be used for non-subscriber accounts. When a billing attempt is successfully processed, a credit is recorded on the account's financial billing log. No charge is recorded until the Order Status indicates that the order has been delivered. Payments made by regular mail is posted to the consumer's account through the Admin tool.

The Admin Tool allows the operations personnel to view a list of all billing transactions, both debits and credits for all accounts. Each billing transaction include, for example, the following information/criteria: Payment ID, Account ID (un-registered users automatically have an account assigned based on session), Date and Time, Credit or Debit, SKU ID, Credit/Debit Amount, Credit/Payment method (if credit; Automated, Statement, or Accounting Correction), Debit Type (if credit; On-line transaction or phone order), Billing Status (Statement Submitted, Automated billing in process, Paid), Order Status (Delivered automatically, Delivered by Order Fulfillment, Pending Delivery). The Admin Tool allows the operations personnel to obtain a billing history report ordered chronologically in reverse order and filtering is allowed using any combination of the criteria recorded including a Date Range. The chronological order can optionally be reversed.

Each transactional order or periodic account billing that results in a charge paid through the Credit Card/Bank processing system is recorded in a Automated Payment Transaction Queue for record status through completion. Payments processed are entered in the transaction queue with the status "Pending Completion". When the payment system completes the transaction with the financial system, the payment transaction queue entry is updated with the completion time and the appropriate completion status. It is expected that the SET automatic payment system is used to fulfill credit card processing. All SET applicable processing status is accounted for in the payment transaction queue status.

The Admin Tool allows the operations personnel to view a list of all payment transactions for all accounts. Each payment transaction include, for example, the following information/criteria: Payment ID, Account ID (Un-registered users automatically have an account assigned based on session), Date and Time initiated, Date and Time completed, Charge amount, Billing Status (Charge in process, Charge Approved/Paid, Charge Denied), and Notes. The Admin Tool allows the operations personnel to obtain an payment queue report ordered chronologically in reverse order and filtering is allowed using any combination of the criteria recorded including a Date Range. The chronological order can optionally be reversed. Additional administrative reports is added to draw statistical report to analyze credit card payment processing times to aid in process improvement.

All correspondence with a consumer account holder is recorded in a correspondence log (a "correspondence history"). Each correspondence entry includes, for example, the following information: Account ID, Date and Time, Correspondence Type (E-mail, fax, phone, statement, mailed notice), Received or Sent, Text of correspondence, Notes, and Operator/Customer Service User (if not automated). The Admin Tool allows the operations personnel to obtain a correspondence history report ordered chronologically in reverse order and filtering is allowed using any combination of the criteria recorded including a Date Range. The chronological order can optionally be reversed. An additional function of the Admin Tool is to monitor and control the various processes, services and systems operating in the Web Center. This user interface is a centralized status and control monitoring console that collects data and feeds-back commands to control various system components. The following functions are supported by on the system management console: the enabling and disabling of individual servers and software components hosted in the Web Center; the shutdown and restarting of individual servers and software components hosted in the Web Center; the monitoring of current status of each server and software component hosted in the Web Center; the monitoring of status of each process in the batch process queue; the monitoring of status of each task in a specific processes work queue; and, the modification of all system level business rules.

The system management functions control all components of the Web Services, Application Services, E-Commerce Services, Content Services, Data Services, and Maintenance Services. Additional monitoring and control features are available for the Health & Welfare, Replication, Archival/Restore, and Billing Systems.

In certain implementations, the central component of the Web Center is the Application Service that acts as a functionality provisioning system that binds all Content and Data Services into a cohesive business suite to service client requests posted through the Web Services. The Business Application Services are implemented as a stateless, transaction system that controls access to, and use of, all Web Center services except for the Web Services sub-system. FIG. 169 illustrates an application services overview 16910 in accordance with certain implementations of the invention.

The Business Application Service supports all the enterprise spatial system business functions required by the various client interfaces exposed by the Web Services to the Web Center's external interfaces. The Application Services provides the interface for both the operations personnel and the enterprise spatial system' customer base.

The Application services shall maintain a session for all client business services required. Each session is established upon the initial request posting from the Web Services. Each session is held active as long as the transaction is in process. The session terminates when the appropriate client response is generated and forwarded to the Web Services. Each subsequent client request shall open a new transactional session. Each transaction is logged in an history log to aid in maintenance and performance/usage analysis.

Each client transaction requested is associated with a specific client account to derive granted rights and record transactions against. If no account is identifiable, the Application system shall create and use a non-registered user account instead.

The Application Services ensures that each client requesting a transaction has been granted the right to access that business function. To determine the client's access rights, the Application Services validates that the role assigned to the client's account includes, for example, the business function that the client is attempting to execute. If the business function has not been granted, the Application Services denies the client request and forwards that status as a response to the Web Services. If the business function has been granted, then the Application Services executes the requested business function and returns the resulting status and any data that may need to be returned as part of the business functions completion.

All functionality exposed by the Application Services to the Web Services is segmented into discreet, atomic transactions called business functions. Each terminal state of each transaction is deterministic to assure an atomic transaction model and that the enterprise spatial system is not left in an indeterminate state at any time. Any error condition encountered is gracefully handled to prevent a partially completed transaction.

The business function breaks down the original client request and utilizes the components of the Content and E-Commerce Services required to satisfy the overall functional request. The business function layer assures that only the desired system functionality is provided to the client and done so using a secure, role based access control system.

In certain implementations, business functions can be grouped into three basic categories: Content Navigation, Content Delivery and System Maintenance.

As for content navigation, an aspect of the Web Center's functionality is a large, spatially oriented data store. This data store contains large amounts of detailed imagery and associated business data. A set of the business functions is implemented to support many different techniques for navigating the large content datasets. To navigate this large dataset, the spatial data store is organized using layers of content directories that cover a broad area and have course accuracy. These content directories are used to narrow down queries for data and imagery to a much smaller domain before higher granularity data is requested from the more densely populated layers of the spatial data store. These higher level, coarsely populated datasets are the directories that are used by the Web Services to help expose the overall offering to the consumer. This exposure facilitates their navigation of the large volumes of data in a logical and business oriented manner, thereby increasing the usability of the site and the satisfaction of their requirements for the service.

Additionally, horizontal navigation of the datasets is facilitated by bi-directionally cross-referencing of the tabular and spatial data. This further facilitates the ease of consumer movement between the datasets and effectively provides an alternate method for navigating either types of data by approaching one from the other. These business functions require broad search criteria and return large, coarsely orient datasets in return. The returned datasets are formatted and presented to the consumer for individual item or smaller, windowed selections. These selections are then re-requested using the higher granularity business functions designed for final form content delivery. In some cases, depending upon need, several layers of continually granular directory layers could be used. A simpler, varying query criteria technique is used to navigate the non-spatially oriented content of the e-commerce system. Like the spatial data, once a granular list is returned, a specific element would be used for detailed content delivery.

As for content delivery, after using content navigation functions to drill down into a very narrow and specific area of data, the Content Delivery business functions are used to retrieve final form data for viewing, analysis and other types of processing. A specific image or associated data layer retrieved is used as the spatial focal point for further client requests for manipulation of that dataset. Alternate business functions are available to size, reformat, crop, layer and otherwise process data (e.g., GIS information).

Other Content Delivery business functions are used to format all tabular forms of spatial and non-spatial datasets required to fulfill additional client features. These additional client features include, for example, worksheet oriented data view and other account related administration functions.

The third group of Application Services business functions are system maintenance functions used by operations to monitor and maintain systems operations. These business functions are query-based results sets and associated feedback controls related to administering system within the Web Center. The system maintenance business functions include, for example, transactions used to navigate, analyze and adjust consumer data sets of both E-Commerce and Content Services. Additional Administration business functions are used to monitor and manage the various server resource pools and background management functions including the Health & Welfare System, Replication System and Archival/Retrieval System.

In certain implementations the interface model used to access the Application Services is a Client/Server model through the Web Services exposed to both the Intranet and Internet. However, the Application Services interface is architected to be client agnostic and allows Server-to-Server interface implementations that can utilize the same transactional interface as the Client/Server model.

The Content Services are comprised of a set of middle tier application components accessed through the Application Services. The content services shall generate and deliver business content including images, reports and ads. Each of these services is constructed independently, have direct access to all necessary spatial and membership data. FIG. 170 illustrates content services 17010 in accordance with certain implementations of the invention.

There are two main Content services hosted in the Web Center: Map Servers to generate geographical imagery combined with data layer overlays; and Report Servers to generate formatted, non-geographical image oriented content such as reports and emails. Both Content services prepare data for delivery over either the Web or Email. Ad Servers, the third Content service, augment web and email user experiences.

The Web Center Map Servers generate geographical imagery combined with data layer overlays for client delivery. The Map Servers shall accept Content generations requests from the Business Application Services containing coordinate, resolution and associated data layer requirements. The Map Servers locate, retrieve, merge and prepare all required geo-data based on the Business Application Services initial request. The Map Servers navigate the Spatial Datamart to all data requirements. In certain implementations, the spatial datamart contains all data required to service any geo-image request made by the Business Application Services. The resulting content generated by the Map Servers is delivered back to the Business Application Services for forwarding to the Web Services or attached to an for delivery.

The Map Servers support generation of imagery and query datasets in both GeoTIFF and Shape file formats. Additionally, the images and query datasets can be forwarded through the Business Application Services to the Report Server. The Report Servers support the conversion of imagery and/or datasets into a PDF format file for attachment to an email or delivery on a Web page by the Web Services.

The Web Center Report Servers format and prepare all non-geographical oriented content for client delivery. The Report Servers accept Content generation requests from the Business Application Services containing raw data, business rules and a presentation template reference.

Unlike the Map Servers, the Report Servers locate and retrieve the requested presentation template and then merge all provided raw data provided into the template. No direct access to the any data service other than the file system that hosts the template files is required. The resulting content is delivered back to the Business Application Services for forwarding to the Web Services or Email Servers for delivery.

The Report Servers support generation of emails in, for example, both standard text and HTML formats. Additionally, the Report Server is able to convert the generated content into, for example, a PDF format file for attachment to an email or delivery on a Web page by the Web Services.

All administrative reports and email content is generated using the Report Servers. The Report Servers are used to augment the Web Services content delivery when appropriate and in Web experience areas where aspects of format and layout may be more fluid than the general user experience. Business rules for content format and optional PDF passwords may be used.

The Web Center supports Ad insertion services to augment the Web Content. For example, ad insertion may include static ad graphics integrated as part of the standard web experience files. Additionally, dynamic ad content insertion based on account demographics is supported. Additions to demographic data may be added to support advanced ad servicing decision services and associated business rules. All ad content serviced is tracked and recorded for analysis and ad content provider billing.

The E-Commerce Service, like the content services, is comprised of a set of middle tier application components accessed through the Application Services. The E-Commerce Services hosts, manages, and delivers supporting e-commerce functionality including Account Management, Billing and E-Mail/Fax services. Each of these services is constructed independently and have direct access to all necessary spatial and membership data. FIG. 171 illustrates e-commerce services 17110 in accordance with certain implementations of the invention.

The overall E-Commerce functionality includes account management and e-mail aspects, which are integrated with a custom Billing System and accessed by custom Application Service transactions.

The following Account Management functionality categories are provided by the E-Commerce Services: Access Control Management, SKU/Billing Plan Management, Account Registration Information, Activity History, Order Status/History, Billing Status/History, Payment Status/History, and Correspondence History. Each functionality category has a Web Services user interface for administration and to store/manage its related datasets in the Membership Data store.

The enterprise spatial system services include, for example, an automated Billing System that can track and prepare customer billing statements on both an adhoc and scheduled basis. The Billing System is a one aspect of the overall e-commerce service leveraging components of the Web Service and the Membership Data store. If the customer is an unregistered transactional customer, the Billing System is triggered to immediately to process the transaction charge using the credit card payment system. If the client is a registered as a subscription customer, they can opt for either immediate transactional billing or periodic billing. Periodic billing is billed at its appropriate service level billing rate and billed at the end of the monthly billing cycle based on an account billing cycle date.

Subscription account periodic billing include, for example, using a batch process to generate account billing statements. The batch process may run daily at one or more specific run times that are adjustable through the Administration user interface. The Administration Services user interface shall also support suspension and resumption of the billing batch process, status review of past, current and daily pending accounts, and manual removal or addition of accounts for billing. In certain implementations, the batch process would be run at the least busy time of the day.

All accounts with a periodic billing cycle date matching the batch run date is processed by the Billing System and a bill submitted to the customer. Billing cycle dates are randomly assigned from 1 to 28 during customer registration to assure an even statistical spread of the number of accounts processed by the Billing System each day of the month. The initial task of the batch Billing Process is to query all accounts to process for that day and add them to a processing queue. Then the Billing Process generates and submits the bill for each subscription account in the order they occur in the Billing queue. When generating the statement for each account, the Billing System is able to automatically charge the bill amount to the customer's credit card account through an on-line credit card processing system. If the customer has selected this options, the billing system shall proceed with the automatic charge and update the account status according to the response from the credit card processing system.

The Billing System submits the account billing data to the Report Service for merging with the appropriate billing document template. The specific billing document template used shall depend upon an number of factors including: the method the customer requested to receive their billing statements when they registered; their account status; and their subscription mode and level.

The Billing System submits all billing statements out of the Web Center via email. The customer is able to elect to receive their billing statement directly by email and in on of three formats: text email; HTML email, or PDF attachment email. PDF attachment emails may optionally be secured using a password pre-established by the customer as part of their account registration process.

The Report Service merges billing data with delivery document templates, optionally generates PDF attachments, and then submits the email to the Email Service for routing out of the Web Center. If the customer did not elect to receive automated email delivery of their billing statement, the Billing System shall direct the Report Service to generate a PDF format statement and PDF format mailing label. The generated email with its PDF attachments shall then be directed to the Order Fulfillment desk for printing and regular mail service delivery.

Transactional usage data is collected on all customer operations regardless of the clients registration status or billing mode. The e-commerce shopping cart user experience shall omit the price column and total transactional charge lines when transactions are processed on subscription accounts.

The Web Center Email System provides an asynchronous notification system used to deliver information and content to both the enterprise spatial system customers and operational staff. The Email System is primarily used to deliver automated billing statements, user experience notifications, customer fulfillment requests and health & welfare notifications. The Email System receives content and addressing criteria from the Business Application Services using a standard email API. The Email Servers do not perform any manipulation of the content prepared by the Report Servers except where required to support email delivery.

The Email System delivers all email using, for example, the standard internet STMP protocol. Email directed to the customer base is delivered over the public internet. Email directed to operations or customer fulfillment is delivered over a private intranet with the public internet serving as an backup. However, an alternate, loosely coupled messaging system could be used to deliver fulfillment requests given it does not require a tightly bound interface that could inadvertently interfere with web center operations. Email receipt notices may be provided in certain implementations.

Bulk or batch Email deliveries are supported, and the email servers are provisioned to support potential volume scaling. Fax support is supported using an E-Mail driven fax server hosted in the Operations Center. Use of Fax services is directed based on user account registration options.

The Data Services are comprised of a set of data stores and files systems with their associated data access servers containing all live production datasets required for continuous operations. Each Data Service is implemented as a separate data store or file system with cross-references stored where necessary to correlate activities and transactions. FIG. 172 illustrates data services 17210 in accordance with certain implementations of the invention.

In certain implementations, the data services are dynamic data stores. All dynamic data stores are hosted, for example, on a centralized file system or Storage Area Network (SAN) system, such as an EMC or RAID device. The SAN device may be used to centralize the administration of all dynamic data stores. In certain implementations, the optimal design for the implementation of the SAN devices is a direct connection to each server in the Web Center on an alternate physical interface (such as Fibre Channel) separate from the LAN used for server-to-server communications. The storage on the SAN device is partitioned to ensure security between servers.

Access to the functionality provided by the Web Center is controlled through the E-Commerce/Membership Data store. The E-Commerce Data store is integrated together with the access control service and e-commerce system by the Business Application Services to control the administration, provisioning and usage billing for all system services.

The E-Commerce/Membership Data store contains support for user data components, such as: Access Control Management (a system level data store of Access Roles and their associated rights to access Business Functions and Functional Attributes); SKU/Billing Plan Management (a system level data store of billable operations with descriptions, pricing data and any applicable business rules); Account Registration Information (account details including name, address information, billing information, account options, account status and access rights for both operational and customer accounts and access to any Web Center functionality requires and active account in the E-Commerce Data store); Activity History (a history of all transactional operations performed or requested by each individual account); Order Status/History (a history and current status of all pending and processed customer orders both manual and automatically fulfilled); Billing Status/History (a history, or ledger, of all service charges and associated payments against made against an individual account); Payment Status/History (a history and current status of all pending and processed automated credit card transactions); and, Correspondence History (a history of all communications sent to and/or received from the account holder, which may be integrated with a customer service system).

The E-Commerce Data store is implemented as a directory oriented data store and, in certain implementations, is intended to leverage industry standard components. For example, the E-Commerce Data store may be an LDAP compliant data store engine with a programmable transaction interface and support for customizable data objects and schema structure required for the above datasets. In certain implementations, Microsoft® Site Server may be used.

An important Web Center component of the enterprise spatial system service is the Spatial Datamart. The datamart is an integrated dataset containing all geographical imagery and related data layers required to support the full client user experience. The Spatial Datamart is designed and/or selected based on support of various criteria, such as: Multiple/simultaneous spatially oriented index method including Latitude/Longitude and UTM, and the final index types to be used are driven by, for example, empirical testing; Granularity and dataset size limitations on queries with broad coordinate ranges, and this is accomplished through pre-configured index layers and associated images that merge a volume of data points at a lower layer into a single, summary image containing a data point overlay of those points as part of the image, and the exact number of layers and summary images shall depend upon, for example, empirical analysis, and may vary between various dataset sections of the datamart; VLDB dataset partition management organized based on spatial coordinate distribution, and one primary index is chosen to spatial data partitioning around; Top tier industry standard raster and vector data formats. Initially this is expected to be GeoTIFF and Shape files; Spatial index links to supporting tabular datasets for cross-referencing and alternate query orientations; Data access of cropped raster images based on vector polygon query coordinates, which assures that no more data is retrieved from the data services than is required; and, Compression/decompression services to reduce storage size requirements and access time, which may have negative impact on both processor and RAM resource requirements but is worth while based on the data access speed improvement.

The Spatial Datamart is architected in close concert with the client user experience to maximize the performance of on-demand, ad-hoc query and image access. Significant architectural attention is given during the special data store design phase to assure maximum client performance without causing individual client requests to place excessive resource demands on the various application tiers in the Web Center.

FIG. 173 illustrates a spatial datamart 17310 in accordance certain implementations of the invention. In certain implementations, the spatial datamart is implemented using the ESRI Arc/SDE system on Oracle® 8i data store, although any software or data store may be used.

The various systems hosted in the Web Center generate different sets of health & welfare data intended to help monitor the system's operation and to provide a source of data that can be used for statistical analysis and facility planning by any part of the enterprise spatial system organization.

The suite of health & welfare data collected include, for example, raw transactional data from various system sources. The data sources are collected in either data store form or log files that are periodically archived and purged. There are several categories of systems that generate health & welfare data including, for example: OEM networking and server components that host the enterprise spatial system service; OEM supplied service components integrated into the enterprise spatial system service software; and the enterprise spatial system developed software.

Both the OEM component procurement process and the enterprise spatial system development process that provision Web Center systems include, for example, health & welfare data collection and maintenance a key criteria in their selection or design. When evaluating or designing these systems, an emphasis is placed on the collection and storage of monitored data points. The health & welfare data points collected are configurable based of the number and nature of data points that each system component requires to be monitored monitor. Additionally, each component has the ability to be configured to generate and source metric data directly as an optional feature. All collected data points are stored in a uniform data store format to facilitate centralized data management and leverage of common analysis and administration tools. Choosing an industry standard data format, such as SNMP based MIBs, allows the procurement and use of OEM supplied analysis and administration tools.

Up front attention to component health & welfare ensures a sufficient and appropriate level of visibility for operational maintenance and performance analysis when components are integrated together.

Both the enterprise spatial system developed software and OEM purchased application software that are to be hosted in the Web Center may have life-cycle maintenance requirements that include, for example, updates on a periodic basis. Periodic updates of application software are best facilitated by storage on a central data store and loading once during each server's startup sequence. Installations of software updates then only requires the update loaded in a single location in the Web Center and each of the affected server's restarted in order to load the new application software.

All Web Center applications are stored on a centralized storage device, such as a SAN system, and then downloaded to each server upon that server's request. Deployment of all Web Center application software is accomplished by the replication server using a "pull" model file transfer from the Operations Center's systems. All replication server "pull" requests are initiated through the administrative functions of the Business Application Services. To assure secure data transfer, all administrative functions are only allowed through the access control system and network interfaces configured to only allow file transfers initiated from the replication servers in the Web Center.

During system operations, the need for server-to-server and server-to-client exchange of images files and other large datasets may be required. As part of the system architecture, provisions are made to support both a direct network file transfer from source server to requesting server and also passing of files through a central storage service connected through an alternate physical interface (or other local area network) to both servers. To exchange files using centralized storage, the sending server shall place a file on the central storage service and then send a message containing the file location to the requesting server process. A similar technique is used for client-to-server exchanges except transmission shall always be over an internet network connection and accomplished using, for example, FTP instead of NFS or SAN mounted drives. A benefit of supporting an alternate file transfer method is to either eliminate or limit the duration of time and number of servers that are required to handle large datasets directly in RAM and removes the transfer from the peer-to-peer network. This helps assure system scalability by limiting important resource utilization to only absolutely necessary functions. It is especially effective when interfaces between requesting and sourcing servers are implemented using a message queuing format.

The Temporary File Sharing technique is most effective when the network and file system access is done over different physical topologies (e.g., Ethernet vs. Fiber Channel SAN). However, it is still effective in limiting RAM usage when file systems are NFS mounted over the LAN.

An additional requirement satisfied by implementation of a centralized file system is to support centralized administration and maintenance of temporary file stores. Areas designated on the SAN devices for temporary file storage is periodically purged to clear any stray files not purged automatically by the requesting services when finished.

The Maintenance Services are comprised of a set of Web Center applications with their own servers and consoles that can be remotely operated through the Application Services using a Web Services user interface. The Maintenance Services are used to schedule and/or execute operational functions required to maintain and monitor the Web Center operations. FIG. 174 illustrates maintenance services 17410 in accordance with certain implementations of the invention.

When triggered, either on-demand or scheduled, each service performs its function either through the Application Services interface or directly against its applicable dataset. The Application Services interface is used when access to content services is required as part of the Administration Services function. A standardized administration framework, such as SMS or other SNMP MIB based administration system, may be used if it is capable of being extended to integrate all required administrative services.

An aspect of the health & welfare of an un-staffed Web Center facility is the ability to remotely monitor and administer all systems and processes. A uniform and centrally managed health & welfare technology standard is chosen for the collection, storage and administration of all data sources. All systems procured or developed for the Web Center is compliant to the chosen standard. All health & welfare system administration is accessed via web browser through the Web Services interface. The health & welfare component of the Administrative services user interface supports the following functions: the enabling and disabling of all available data sources (both discrete data sources and log files); the addition and removal of metric calculation criteria (discrete data sources only); the adjustment of existing metric calculation criteria (discrete data sources only); the archival and purging of one, or any group of, data sources (both discrete data sources and log files); timestamp range limited selection and viewing of raw data in either tabular or log file form (both discrete data sources and log files); a query and reporting function that allows the selection and graphing of any number of compatible data sources (discrete data sources only); the addition, enabling, disabling and removal criteria for triggering asynchronous operational alert messages (discrete data sources only); and, at least three levels of alert messages including: Informational, Warning, and Alarm. (discrete data sources only).

An application hosted by the Operations facility receives and displays all alert messages received from the Web Center. In certain implementations, this alert system may be implemented using email and later enhanced.

All data of interest is able to be collected as either discrete data elements or as calculated metric based on preset criteria or both. All systems that are identified as requiring metric data generation support dynamic, remote administration of metric calculation criteria.

Raw and metric data collected is used by operations to isolate system performance bottlenecks and analyze future production capacity changes. Application usage data is used by the development and marketing groups to focus and prioritize resources on areas functionality that are servicing higher customer demand.

In certain implementations, since there are many uses of the health & welfare data, all possible data sources that can be identified are collected. The systems are not required to provide additional, unpredicted data points without the potential for restarting the server or component intended as the source of the data. However, the system is able to disable, or turn off, any existing data source without the need for either a system level or component level restart. A uniform technology standard, such as SNMP compliant agents and MIB data repositories, may be used for the collection and storage of discrete data elements. Additional support for the management of server log files is provided. A centralized archival and purging system is defined to support both SNMP and log file data.

Existing remote console systems, such as OpenView®, may service some portion of the Health and Welfare system functionality.

A Replication System is implemented in the Web Center with the primary function of transferring data in bulk between the Web Center and the Operations Center. The Replication System is operated only be operated through the Administration system of the Web Services and support both on-demand and timed batch job submissions. The Replication System initiates all exchanges of data between the Web Center and the Operations Center. The Replication System does not accept any external connections or requests except from the Web Services.

A primary function of the Replication system is to handle data transfers for archival and retrieval. All deployment of application software and GIS datasets is accomplished as if it were an archive restore. Deploying software and data into the production system in this manner may impose an additional requirement on both the application and GIS dataset development environments to be able to generate their deployable images in the Replication System's archive format.

The Replication System supports an additional feature to allow the transfer of selected data in their exact form without any conversion or compression. This may not be the most efficient means of transport between the two facilities and may be restricted to specific datasets such as data hosted on standard file systems.

The Replication System includes, for example, a tape system to support Web Center local loading and archiving of components as a backup precaution.

An Archival System is implemented to support both the archival and retrieval of any set of dynamic data housed on the centralized data store in the Web Center. In certain implementations, the archival system is a tape based storage system housed in Operations Center.

Since the Web Center is un-staffed in certain implementations, a two-step archival/retrieval process may be implemented to eliminate the need for Operations personnel to enter the Web Center to perform the process.

Requests to initiate an archival are made using the Administration system hosted by the Web Services. Once the archival criteria is specified (including when, what and where to archive), a job is submitted to the Replication Service to perform the archival. At the designated time, the Replication Service shall perform the archival of the specified data and "push" it, in a compressed archival form, either directly on to a tape device or to a disk storage area both hosted in the Operations Center.

Requests to initiate an archive restore are performed in the same manner as archiving except in reverse. Restore request made through the Administration system shall configure the required Replication Service job. When initiated, the Replication Service shall "pull" the archive from the Operation Center source location and load it into place in the Web Center Data Services. An additional process to bring the restored archive on-line is required and accomplished through the Administration system.

All archival and restore processes are executed non-intrusively having no impact on availability of any of the system's operational components. The performance impact of the archival and restore processes is limited to the minimal system resource usage required to perform the operation again without impact system availability. It is expected that the final restore process shall impact resource system availability as the restored archive is brought back on-line. The level of impact a restore shall impose is dependant upon what component of the system is being restored.

The Replication Service archival/restore system supports optional encryption of the requested dataset. The Replication Service shall use best practice industry accepted archival cryptography standards to perform any encryption functions required. Not all types of archives are restorable into the production environment. The need to restore health & welfare data is not expected to be a requirement at launch or in the future. Current and historical operational status of the archival system is available through the Administration system. The operational status and history of the archival system is logged as part of the health & welfare system.

The Web Center functionality is reliant upon supporting systems, interfaces and business processes operated in the Operations Center and other external entities. Both the on-going production operations and the life-cycle system deployment process are tied to these supporting peer systems.

As indicated in the Business Process/Dataflow (FIG. 167), the Web Center operates with integrated support from the Operations Center, and other external entities in order to maintain operations on a continual, high availability basis. Each of these support processes is implemented as remote managed, automated systems, where possible, to ensure minimal direct interaction with the Web Center by operations personnel. FIG. 175 illustrates operational dataflow for the Web Center 17510 in accordance with certain implementations of the invention.

Operationally, the Web Center is highly integrated with the Operations Center and relies on the interfaces with the Operations Center to function. There are several categories of data and interfaces addressed, including: Production GIS Data, which is transmitted to the Web Center and loaded into production use under a strict Quality Control process; Production Applications, which are transmitted to the Web Center and loaded into production use under a strict Quality Control process; Order Fulfillment Data, which is transmitted from the Web Center to be processed by systems and personnel in the Operations Center for delivery to the customer base; and, Operational Monitoring/Usage Data, including both web center health & welfare status information and operational maintenance controls passed between the Web Center and the Operations Center.

As for production GIS Data, a primary function performed in the Operations Center is to transform all disparate data sources into a unified, production ready dataset that can be validated and loaded into the Web Center for production use. A newly developed dataset follows a strict, two-step Quality Control process to be deployed and brought on-line. The first step is to load the data into its final production location in the Web Center (e.g., via a direct, dedicated, high-volume network link controlled by, for example, a Replication System). The production enabling second step is accomplished through the Administration Services. The health & welfare section of the Administration Services allow operations to set the state of the new dataset to on-line and to take off-line any old dataset that it may be replacing. As part of its business rules, the core Business Application Services always accesses datasets using a version control flag that identifies which dataset to use. Therefore, the next client activity that accesses the affected dataset shall vector to the newly enabled dataset instead of its now obsolete predecessor. The Web Center only maintains only current datasets to maximize use of limited production resources. Obsolete datasets are purged from the Web Center after they are no longer being accessed. This process ensures that any in-process client activities are completed on the same dataset version they were initiated upon and eliminates any potential for termination or other adverse affect on the client experience. The Operations Center maintains all past versions of GIS Data as a historical library.

As for production applications, the deployment of production applications to the Web Center is accomplished in a similar manner to that used to deploy GIS datasets. A newly developed application component also follows a strict, two-step Quality Control process to be deployed and brought on-line. The first step is to load the new component into its final production location in the Web Center (e.g., via a direct, dedicated, high-volume network link controlled by, for example, a Replication System). The production enabling second step is accomplished through the Administration Services. The health & welfare section of the Administration Services allow operations to set the state of the new component to on-line and to take off-line any old component that it may be replacing.

However, deploying application components differs from datasets in that to bring the newly enabled component into use usually requires restarting that component. In most cases there is a pool of components of the same type running and available in the Web Center at any time. To initiate the use of the newly deployed component, each of the components is gracefully shut down and restarted using the Administration Services. The restart of the down pool component is initiated using the newly installed component instead of the original one. This technique shall limit the impact of software deployment to a small reduction in the pool population.

Slightly different techniques are used to support interdependent data store schema and application component upgrades that are done in concert. This process is conducted by first applying a data store upgrade on a live data store that only added data store components (any deletions of data store components that are actively in use could bring down the service). Then the new application software is deployed and brought on-line as normal. The new software supports two operation modes: backward compatible to the previous version of software; and also in the new form that utilizes the additional data store services. The new software's operational mode is based on an active data store version business rule that forces the new application to write data in the mode compatible with the previous software. Once all instances of the application component have been replaced and restarted, the Administration services are used to set the data store version business rule to the new version. Initially it may be required to restart each application component a second time to force it to accept the new business rule. Implementing business rule refresh command for all affected components would be an optimal solution to the problem of cached business rules.

This data store/application upgrade technique prevents old application components from encountering new, unknown and invalid data during the period of time the new application is transitioned in. It also prevents the need for any bulk data migration process since each data record is converted the first time it is encountered by the new application software in the course of processing normal, client requests. To accomplish the automatic data migration feature, every data record in every table in the data store is stamped with a version stamp and the new application software reads data either an old or new form and also writes out in either an old or new form. The input form used is directed by which version of data the new application encounters when it reads the data store. The output form used is directed by the data store version business rule setting.

The Web Center maintains only current application components to maximize use of limited production resources. Obsolete application components are purged from the Web Center after they are no longer being accessed. This process ensures that any in-process client activities are completed using the same application version they were initiated with and eliminates any potential for termination or other adverse affect on the client experience. The Operations Center maintains all past application versions in an archive library.

During a user session, any user can request a dataset delivered to the user. This dataset could be any size or format that the system is capable of generating. The Web Center takes all order transactions and generates a request containing the details of the consumer's order. This request is sent to a queue at the Order Fulfillment desk in the Operations Center, or Order Fulfillment Center, for completion and delivery. In certain implementations, the order processing queue implemented via an email infrastructure.

The Order Fulfillment desk generates the requested image/data order as per the customer request and delivers it to the customer. The delivery method may be, for example, through email with attachments or regular terrestrial shipping process, depending upon the nature of the customer's request and the amount or format of the data requested.

Some orders are capable of being automatically processed and delivered by either the Web Center or the Order Fulfillment desk. All automated delivery is accomplished through email containing attachments and an additional notification of the completed delivery being copied to the Order Fulfillment desk. A limiting factor for the automatic delivery of data is the end size of the data image requested. Email attachment size limits are gathered from each user as part of the registration process. Additionally, a system default attachment size limit is employed.

The Web Center delivers email with attachments directly to the consumer when the requested image meets the limit criteria and the requested format is the same a as the format in which the images are stored in the Web Center data store. All systems required to process images into alternate formats and onto requested delivery media is resident in the Operations Center due to the high reliance on Operations personnel involvement.

As for operational monitoring/usage data, sustaining the Web Center containing a high-availability, scalable web service environment requires the implementation of a comprehensive health & welfare monitor/control system. The health & welfare system covers all components and layers that comprise the Web Center's systems. The three primary monitor groups that is addressed include: Networking Infrastructure (all networking components status, usage and control provisions natively available is supported); OEM Software Services (all software component resource footprints, status and control provisions are supported even if not natively available); and, Business Applications Services (all client usage information is tracked and logged with controls implemented through business rules evaluated during client functionality execution).

All health & welfare data is collected, monitored and archived for future analysis. Active monitoring of available data is accomplished through review of raw logs, exception events, and programmed statistical limit controls. Implementations depend upon constraints of each specific component or system being monitored or controlled. Remote operations are limited to controls that have limited or no impact of service availability.

In terms of Web Center to financial institutions processing, a primary interface to support fully electronic customer experience is to support billing charges on-line. As part of customer registration, a consumer can elect to be billed by credit card either on a one-time or on-going basis. Support for standard interfaces to on-line credit card processing facilities, such as CyberSource®, is supported. These interactions are done over a private, leased line and not over the public internet for increased security. Additional provisions are provided to support address verification services.

In terms of Web Center to Internet, the Web Center, as an ASP model managed service, is connected to its customer base via the internet. This interconnection takes on two forms: direct web browser based interactive access and asynchronous email services to support the user experience.

Both browser and email based connectivity may be standard internet protocol based, including, for example, SMTP, HTTP and HTTPS, or may be other protocols.

As for the production deployment process, maintaining a stable, high availability web service requires the enforcement of a strict Quality Control process for the introduction of new production application software and business data into the production environment. This Quality Control process is important to isolate the production environment from the introduction of a non-validated system component with unpredictable behavior that could jeopardize the web service. The Web Center's Quality Control process is implemented using a multi-stage deployment cycle that provides this key level of isolation required. FIG. 176 illustrates a deployment process workflow 17610 in accordance with certain implementations of the invention.

The Web Center's multi-stage deployment cycle is implemented using three environments and a controlled process to move components between the environments.

As for development, all software and production data is developed, integrated and prepared for production deployment in a development environment where source code, tools and data are very fluid and have limited controls. The production data is prepared using the GIS Processing System housed in the GIS Processing Center. The various Web Center production software components is developed and unit tested with their own individual development environments either housed in the Operations Center.

All production software and data components are prepared for production deployment in a specific deployment format and media. Once ready for production, the candidate software/data releases are delivered to a Quality Assurance team for validation in a Staging environment.

As for staging, each production candidate component (both application and data) is validated in a Staging environment by a Quality Assurance team to ensure a high degree of candidate integrity prior to introduction into the production environment. The Staging environment is and an exact representation of the Production environment but housed in the Operations Center. The production candidate component is installed into the Staging environment by the Quality Assurance team from the exact media to use for installation into the production environment.

The Quality Assurance team executes a pre-written validation test plan designed to verify all aspects of both the operational and functional integrity of the candidate software/data component. If any disqualifying failure occurs during the validation test execution, the release candidate component is rejected and returned to development or GIS Processing for correction and re-submission to the Staging validation process. Once the release candidate component has been passed through the Staging environment validation process by the Quality Assurance team, it is approved as a production release and delivered to the production environment for installation and made available for use.

As for production, the Web Center production environment is comprised of all the system components required to provide a high-availability web based managed service facility. The production environment is implemented with provisions for zero or limited down-time impact for ongoing software, hardware and data upgrades throughout its life-cycle maintenance.

A two step deployment technique is implemented for installing and bringing components on-line in the production environment. All components are able to be fully installed in their final production form in the production environment without any impact to existing operation. Once installed and fully operational, each component is explicitly on-line and put into production use. Client components or systems that utilize each component being deployed shall employ a service director or dispatcher that monitors the on/off-line state of each of the components in order to assure the use of the proper, on-line component intended.

As for centralized data storage, the Web Center is designed to be a secure, un-staffed operational facility housed in a larger facility staffed by non-the enterprise spatial system employees. A limited amount of operational support, such as server power cycling, can be provided by the hosting facility staff. Overall, the system is designed as a remotely accessed, monitored and administered facility.

To achieve a fully un-staffed facility, all dynamic data is centrally stored and administered. Dynamic data is defined as any operational or business data that changes over the life-cycle of the systems maintenance. This includes, for example, all core data store services, file systems hosting temporary or application level data files, or any logging/health & welfare data generated by the system. All data of this nature is hosted, for example, on a central SAN system(s) that can be loaded, backed up, and managed from a central console/maintenance system. All application software and business data is loaded from and accessed on the central data store. All output for health & welfare is directed to the central data store in either for form of a data store storage record or system logging files.

All server operating systems are considered to be static data stores and shall reside on the local hard drives of their respective servers within the Web Servers. When no dynamically created data will reside on the local hard drive, no archiving of server local hard drives are required. Installation or restoration of local server operating system installations is serviced using an image server that connects to the target server and downloads an operating system image over the LAN. Data archival is therefore implemented for the SAN system. hn certain implementations, the image installer system in the Web Center is a CD based juke-box system.

As for security considerations, the Web Services interface is the Web Center's only interface exposed on an externally connected network that supports incoming connection requests. All other incoming connections are disallowed. Other systems such as the email system shall either be used for outgoing communications only or request external data using a "pull" model like the Replication System. All "pull" model service requests are initiated from inside the Web Center through administrative functions provided by the Business Application Services. All "pull" model requests are implemented over private network connections between the vault and external, trusted sites.

The Web Services exists in a network isolated DMZ to assure comprehensive isolation between the public internet and the Web Center's middle-tier systems. The Administration system component of the Web Services is hosted on a separate Web Server(s) from the client user experience and the network tuned to limit access to those servers. This shall assure both improve security for important administration systems but also a high level of on-demand access isolated from the public internet network traffic. The Business Application Services are the Web Center's only system that processes incoming connection requests from the Web Services. No Data Services are connected directly to an externally connected network and only servers housed within the Web Center have read and write access to the Data Services.

R. System Architecture

In certain implementations, the enterprise spatial system provides application services that integrate and offer on-demand superior quality data (e.g., geographical imagery and associated industry specific data) and analysis tools to government, industry and the general public. The enterprise spatial system' accurate and continually updated data is offered as both one-time use and periodic subscription based models.

This section describes a high level system architecture for the enterprise spatial system. The description contains the functional, component, and deployment architecture for the enterprise spatial system Web Center environment. The specifications for hardware and software systems required to develop, build and run the enterprise spatial system are described.

The Web Center loads the latest available processed data (e.g., imagery and its supporting data) from the Operations Center; delivers the data to the enterprise spatial system customer base upon demand; and then processes and bills the related usage charges for each customer.

FIG. 177 illustrates data flow 17710 in accordance with certain implementations of the invention. The data flow (FIG. 177) unifies separate architectural pieces into an enterprise spatial system overview.

In certain implementations, the enterprise spatial system consists of six distinct functional environments. They are the ADS40 Processing Center, the GIS Processing Center, the Operations Center, the Web Center, the Fulfillment Center and the Customer Service Center. All the primary processing of the GIS data for client consumption is performed between the ADS40 Center and the GIS Processing Center. The Operations Center is the hub of all activities in the enterprise spatial system enterprise.

In addition to directing all the enterprise spatial system activities, the Operations Center also hosts the enterprise spatial system software development, software QA, GIS data QA, GIS data archival, Web Center staging, order fulfillment processing and second tier customer support. First tier customer support is performed at the Customer Support Center, which may be outsourced to a third party. The Order Fulfillment Center provides the logistics for actual media creation, packaging and shipping of the orders. The Web Center System is a pure hosting environment that can be managed remotely by the enterprise spatial system personnel from the Operations Center.

A high level description of the ADS40 Center design is provided for overall system reference, but the actual architecture and system configurations may vary. The ADS40 Center is an image collection and processing facility that is built around the ADS40 camera imagery and the LH Systems Geo Vault System. The ADS40 Center does not have any direct involvement in the business processing, such as order fulfillment done by the enterprise spatial system. The ADS40 Center generates deployment neutral aerial imagery. FIG. 178 illustrates an ADS40 center architecture 17810 in accordance with certain implementations of the invention.

The ADS40 Center archives raw image data recorded by the ADS40 cameras. The raw imagery recorded by the ADS40 cameras needs to be preserved as "film" in order to resolve possible disputes over the authenticity of the data provided to the end users. The raw imagery from the ADS40 cameras will be archived to a tape library. In certain implementations, digital signatures may need to be attached to the imagery after acquisition to ensure the authenticity of the image data.

Beyond the archival of the raw data from the cameras, all processed image data is passed to the Operations Center. The data flow from the ADS40 Center to the Operations Center is one-way. In a stable operating environment, data will arrive intact and will be processed without any further corruption or loss at the Operations Center. When it is not cost effective to design an automated process for re-transmitting data from the ADS40 Center to the Operations Center, initiation of retransmission will be done manually.

The ADS40 Center performs data preprocessing. The raw image data recorded by the camera may not be usable as such by other GIS processing applications. Several levels of processing are required before the data is in a form usable by third party GIS processors, including the GIS processing applications used at the Operations Center. The ADS40 Center performs this initial processing of the raw imagery, such as ortho-rectification to make the image data usable by the Operations Center and the Order Fulfillment System at the Operations Center.

Software components include LH Systems Ground Processing System and Geo Vault System and LH Systems Client Software. The LH Systems Ground Processing System provides the preprocessing functionality required for the ADS40 imagery. The Geo Vault System provides the archiving functionality of the ADS40 data. The LH Systems client software installed at the workstations will be used to work with ADS40 data coming off the camera. The client software also provides integrated access to the Geo Vault catalog stored in the Oracle data store and the actual image data stored in the archive tapes.

External Software APIs include an ADS40 Data retrieval API. In certain implementations, the ADS40 Center will not provide any GIS data specific external APIs for automatic retrieval or retransmission of data from the ADS40 Center. Retransmission of ADS40 data us initiated through a manual process, such as through e-mails. All aerial image data usable by applications in the GIS processing arena is archived at the datamart in the Operations Center.

The hardware requirements at the ADS40 Center are defined by for example, how the Geo Vault System is purchased. The Geo Vault System defines the hardware configuration if it is purchased as a turnkey solution. Otherwise another hardware configuration may be used. FIG. 179 illustrates a GIS processing center 17910 in accordance with certain implementations of the invention.

A high level description of the GIS Processing Center design is provided for overall system reference, but actual architecture and system configurations may vary. The GIS Processing Center acquires, processes and prepares the data coming from various third party data sources to the point where the data is ready for uploading to the operations Center. This center may be an outsourced GIS processing center and may not be involved in the enterprise spatial system operational functions such as order fulfillment.

A function of the GIS Processing Center is to collect GIS data from enterprise and third party sources. The GIS Processing Center also performs value-added post processing of the ADS40 imagery and collected GIS data.

The GIS processing facility does not archive or maintain storage of any of the data it processes. The GIS Processing Center compiles and processes the various input data and then passes it on to the Operations Center for archiving, QA and deployment.

FIG. 180 illustrates a GIS processing component architecture 18010 in accordance with certain implementations of the invention. The GIS Processing Center uses various software tools (e.g., from ESRI and other vendors) for all data manipulation. FIG. 181 illustrates a GIS processing network 18110 in accordance with certain implementations of the invention.

In certain implementations, an ArcSDE™ data access protocol provides access to input GIS data for the GIS Processing Center. The ArcSDE™ data access protocol's ability to simultaneously work with multiple sources for GIS data is leveraged to interface with multiple disparate data sources. The ArcSDE™ data access protocol directly accesses ADS40 data from the Operations Center. The processed data is moved to the Operations Center datamart using a loader, such as ArcToolbox™ loader.

The server software used for GIS processing is ArcIMS™ software with the ArcSDE™ data access protocol providing the data access. In certain implementations, one instance of ArcIMS™ software and one or two instances of ArcSDE™ software are run on the GIS Processor machine in FIG. 181, and can be scaled up when higher throughput of data is desired.

The input to the GIS processing system is the ortho-rectified image data from the Operations Center Datamart, publicly available GIS data, GIS data acquired from third parties, and other data. In certain implementations, the desktop software used by the GIS processing personnel is ESRI's ArcGIS™ Desktop. The GIS data processed with desktop software is saved in the GIS Datamart at the Operations Center.

FIG. 182 illustrates an Operations Center 18210 in accordance with certain implementations of the invention.

The Operations Center is responsible for the archival and management of GIS data made available to the enterprise spatial system clients and all the software deployed in the enterprise spatial system enterprise. The Web Center may be operated remotely from the Operations Center.

The Operations Center archives and maintains all the processed image data and the associated GIS layers in the GIS Datamart. In certain implementations, at any instance, the GIS Datamart in the Operations Center has an exact copy of the data deployed at the Web Center. In addition, the GIS Datamart also contains previous versions of the data deployed at the Web Center. In effect, the GIS Datamart is a data warehouse for all data ever deployed at the Web Center.

A subcomponent of the GIS Data Storage/Delivery component at the Operations Center is the Versioning/Replication Server that replicates production data from the GIS Datamart to the Web Center Datamart. The Replication Server allows the Web Center to pull the data from the Operations Center. The Replication Server does not push the data to the Web Center. The data deployed to the Web Center datamart is automatically versioned by this server. This allows easy roll back of Web Center data when unexpected problems are encountered at the Web Center that require restoring to previous stable versions of the data.

In certain implementations, software development for the enterprise spatial system organization is performed at the Operations Center. Software integration with third party software may also performed in the Operations Center. The development data store hosts the Configuration Management data and all other data required for the operation of the development center. The software developed by the development center is, in certain implementations, portable Java code, and the environment is a Windows® environment.

The Operations Center will host the staging cluster, which will be used to QA the software developed by the development group. Software QA is done on a staging cluster that is architecturally the same as the Web Center environment. The staging cluster will access the GIS Datamart for GIS data. Since the GIS Datamart contains exactly the same data as in the Web Center, the QA is in effect done against the equivalent of live data.

Staging is the final QA of the software deployed at the Web Center and the GIS data deployed at the Web Center. Staging is also used to QA any new GIS data that will be pushed to the Web center. Preferably, staging requires an exact replica of the Web Center software/hardware environment to identify software and data issues. This approach may not be cost effective when the cost of the software/hardware system deployed at the Web Center is of the order of millions of dollars. Therefore, for any scaled layer in the Web Center architecture that has a cluster/farm of two or more hardware boxes/software instances, the staging cluster has at least two of the hardware machines/software instances. This allows staging to test out fail-over and identify software race conditions and deadlocks. If the Web Center has three or more hardware boxes/software instances, it is preferable to have at least three hardware boxes/software instances in the staging cluster. Many deadlock issues and load management issues don not surface until there are more than two machines/software instances in a cluster or server farm.

Orders that cannot be fulfilled directly by the Web Center will be sent to the Operations Center for fulfillment. Typically, orders that require special GIS processing at the Operations Center or those that require the transfer of large amounts of data are sent from the Web Center to the Operations Center. Since the GIS archive at the Operations Center contains all previous versions of GIS data, the order fulfillment process will be used to retrieve and fulfill orders for earlier versions of GIS data. A catalog of previous versions of the GIS data will be kept at the Web Center and the users will be given the option to pick among the versions listed from the catalog. The Order Fulfillment Server will work with the GIS Datamart at the Operations Center and does not require any interfaces with the GIS Processing Center or the ADS40 Center.

The Operations Group working out of the Operations Center will perform all functions relevant to running the Web center and the Operations Center. This includes, for example, monitoring the Web Center using the Health & Welfare System installed at the Web Center. The Health and Welfare System used, such as Open View®, will be accessible from the Web Center and accessible remotely from the Operations Center. There will be dedicated Health & Welfare user consoles both at the Web Center and at the Operations Center for this purpose. The systems in the Web Center will be instrumented with SNMP compliant Agents/MIBs to allow these systems to be monitored and controlled remotely.

In certain implementations, maintenance of all the software/hardware systems deployed at the Operations Center will be the responsibility of the Operations Group. The Operations Group will do all system maintenance functions not supported by the staff at the web-hosting environment. The Operations staff will also be responsible for the uploading and deploying of data, imagery and application releases to the Web Center.

In certain implementations, the Operations Center will provide second tier customer support for the enterprise spatial system clients, and a first tier customer support will be outsourced to a third party. A third party customer relationship management (CRM) tool may be used as the primary customer data access tool at the Operations Center. The CRM product may be integrated with the in-house bug-tracker software to track customer reported problems.

The Operations Center will also provide the software/hardware required for the enterprise spatial system corporate infrastructure such as e-mail services, payroll systems and ERP systems.

FIG. 183 illustrates GIS storage components 18310 in accordance with certain implementations of the invention. The GIS Datamart may be, for example, an Oracle® 8i data store running on a SAN solution for data storage. Another option for the storage device may be, for example, a NetApp 840 RAID storage solution.

The GIS Datamart is partitioned into at least five separate data store instances. The five instances will be used for GIS Processing, Staging Data Storage, Development Testing Data Storage, Temporary Fulfillment Data and the GIS Archive Catalog. The GIS Data data store is used to store new image data coming in from the GIS Processing Center and the ADS40 Center. The lifespan of the data in this data store extends from the time it arrives from the GIS Processing Center or ADS40 Center to the time the validated data is loaded to the Web Center. The data will be archived before it is pushed to the Web Center.

The GIS data for the staging cluster is stored in the Staging Data data store. Typically the data in this data store will reflect the data in the Web Center data store plus the new data that is being validated. Upon successful validation, the new data will be replicated to the Web Center data store and at that point the data in the Staging Data data store will match the data in the Web Center data store exactly. The Staging Data data store is then ready to receive the next batch of new GIS data.

The Development Data data store is a scaled down version of the data in the Staging Data data store. The data in this data store may be populated based on developer requests. This data is used for unit testing of software components being developed or integrated by the development team.

The Fulfillment Data data store holds the GIS data retrieved from the tape archive for order fulfillment. Further processing of data may need to be done such as clipping, reformatting or reprojecting layers depending on customer requests and access rights. The GIS data will be held in this area while processing is performed. The lifespan of the data in this data store extends from the time the data is retrieved to the time the processed data is sent to the Order Fulfillment Center.

The GIS Archive Catalog is a catalog of all the data stored in the tape archives. All data is retrieved from the tape archive using the GIS Archive. The Versioning Server will update the catalog as it stores new data and updates old data with new versions. The Order Fulfillment Server will use the catalog to retrieve the data required to fulfill the order.

The GIS Data store Server can also host other data store instances to be used by systems such as Configuration Management, E-mail Servers, Message Queue Servers etc. The decisions to use or not use the GIS Data store Server for these functions will be done on a case by case basis depending on the needs of these software systems.

The software development environment may be, for example, a Windows® based environment. Software development and unit testing is done on the individual developer machines. The software packages installed on the user machines will vary depending on individual development roles. FIG. 184 illustrates development components 18410 in accordance with certain implementations of the invention.

The Web Servers and Application Server instances needed for integration testing will be run on the Development Test Server machine. Multiple instances of Web Servers and Application Servers will be run on this machine to allow multiple developers to perform integration testing simultaneously without collisions.

The Configuration Management System and development file servers will run on the Development/Corporate Server. This machine will also host e-mail services, for example, the Microsoft® Exchange® Server for e-mail services for an entire corporation. The production GIS Data will also be versioned using the Configuration Management System.

Since the enterprise spatial system is developing an online system that supports many (e.g., thousands of) simultaneous users, the QA process uses automated tools to perform load testing. Additional software may be used for problem tracking between QA and the Development Group. Software QA will be performed with the GIS data in the Staging Data data store that mimics the data in the Web Center data store. In certain implementations, Software QA is not done with new GIS data from the GIS Processing System in the Staging Data data store unless the new software being validated requires new data that is not yet in the Web Center.

Staging is done for both new software and new GIS data. Staging is the primary environment where new GIS data is tested and validated. Staging is done for data and new software separately. When GIS data is being staged, the software running on the staging cluster matches the software running in the Web Center. When software is being staged, the data in the Staging Data data store matches the data in the Web Center. The only exception to this mode of operation is when the new software being tested requires new GIS data or new GIS data format that has not yet been deployed to the Web Center.

The protocol for initiating the Replication Server to replicate GIS data to the Web Center after successful staging is defined using the Configuration Management system. A placeholder will represent each batch of new GIS data in the Configuration Management System in a similar manner as the software pieces are handled. The QA of the GIS data can then proceed the same way as normal software QA. In this way, the handover of production GIS data to the Replication Server can be automated. With this approach, the Configuration Management Systems versioning capabilities will be used to version the GIS data. This avoids the cost of developing and managing a new versioning system for the GIS data. Because versioning of production GIS data is handled through the Configuration Management System, the CM System has to be robust and top-tier in the configuration management arena.

The Replication Server triggers the replication of QA'd production data from the Operations Center to the Web Center. From a Web Center security point of view it is against 'best practice' to allow an external entity such as the Replication Server residing in the Operations Center to push production data into the Web Center. Attacking or 'hacking' this interface may allow someone to load inappropriate material into the Web Center data store. Therefore, the data will be pulled from the Web Center. A data loader running in the Web Center will pull the data from the GIS Datamart in the Operations Center when new data is available. The data loader can either poll the Operations Center on a fixed time interval for new data or it can be notified about new data through a messaging system. The notification mechanism using a messaging system will be used since loading of data into the Web Center comes in bursts and there is no need for the loader to poll the Operations Center constantly.

The Replication Server in the Operations Center therefore has several roles, including, for example: version the data, trigger the archival of the data to tape, and then notify the data loader in the Web Center.

There is no need to package the new GIS data for replication since the data is already sitting as a uniquely identifiable package in the GIS Data data store. This also makes versioning and archiving easier since the new data is all in one place. This will also be less error prone since the new data is isolated from other data and it can be locked until the archiving system and the Web Center data loader are available.

Versioning will be done through the Configuration Management System as described earlier. In that scenario the only action required of the Replication Server is to link the versioned placeholder for the data in the Configuration Management System with the index for the new data in the archive catalog data store.

Triggering the data loader in the Web Center to load the new data will be done through an XML message sent through a messaging interface. The enterprise spatial system environment involves very complex interplays between various individually operating software systems and components in different locations. It is therefore required to have a full-featured messaging solution deployed to facilitate automated communication between the software entities.

Order fulfillment, that cannot be performed directly between the Web Center and the client, can be performed in one of two ways. The order information can be transmitted from the Web Center to the Operations Center using e-mail. The person at the Operations Center receiving the e-mail can initiate the order fulfillment process.

Another solution is to use a messaging interface between the Web Center and the Operations Center for Order Fulfillment. The Web Center sends asynchronous XML messages to the Order Fulfillment Server as soon as an order is received. The Order Fulfillment Server interprets the XML message and retrieves all the required data and processes the data. The processed request is sent to the Order Fulfillment Center for the final physical packaging of the data for physical delivery. For online delivery methods such as FTP, the processed data will be sent to the designated FTP server. This automated solution is cost effective and scalable since any human interaction is at the very end of the fulfillment process, if needed at all. In certain implementations, the final stage of the Order Fulfillment process may be outsourced to a third party Fulfillment Center.

All the software tools required to administer and maintain networks (e.g., of Windows® and Sun® Solaris® machines) are available to Operations personnel. The enterprise spatial system environment does not require any special software tools beyond the tools needed in a mixed network of, for example, Windows® and Sun® Solaris® machines. The only exception are the tool(s) required to remotely monitor and manage the Web Center. Personnel who are authorized to administer the Web Center will have access to monitoring consoles at the Web Center and at the Operations Center. Deployment of new software to the Web Center can be automated or performed manually.

Second tier customer support will be handled at the Operations Center. CRM e-business solutions may be used as software for the call center. The CRM system may be tied to a problem tracking system to facilitate seamless problem tracking from the call center, to QA, to the development group.

The Operations Center hosts a myriad of activities ranging from development, to corporate IT, to handling production data. As a result, it is important to segregate the network so that network problems, congestion and operational errors in one area of the Operations Center do not adversely affect other functional areas of the Operations Center. The Operations Center network is segregated into three LAN segments; the GIS Production LAN, the Development/Corporate LAN and the Staging LAN. FIG. 185 illustrates an Operations Center network 18510 in accordance with certain implementations of the invention.

The GIS Production LAN hosts all the machines that deal with production GIS data that pass through the Operations Center. This LAN segment is in effect a logical extension of the LAN segments in the Web Center. It is important to ensure that Production GIS data processing is not affected by traffic and activities on the other networks in the Operations Center.

The Staging LAN is segregated in to its own LAN segment so that stress testing done in this segment does not affect the performance of the other services in the Operations Center. Segregation of the staging clusters also ensures that the QA and performance tests that are done are not colored by the LAN activity caused by other processes in the Operations Center.

The Development/Corporate LAN hosts everything that is not directly related to GIS Production data and the staging activities. All corporate workstations, file servers, e-mail servers, payroll systems etc. reside on this LAN. All development servers and workstations also reside on this LAN segment.

The Staging Cluster is a self-contained cluster of machines that replicate the machines and the deployment architecture of the Web Center. FIG. 186 illustrates a Staging Cluster architecture 18610 in accordance with certain implementations of the invention.

In certain implementations, the machines deployed in the Staging Cluster are the same type of machines as the ones deployed in the Web Center in terms of manufacturer, processors and memory configurations. The Staging System, however, does not have as many machines as in the Web Center at each level in the architecture hierarchy. Wherever there are two or more machines in a server farm or a cluster in the Web Center, there will be at least two in the corresponding server farm or cluster in the Staging Cluster. Three of each is preferable.

In certain implementations, the Staging Cluster includes, for example, the Health & Welfare Monitoring Server and the Replication Server. It is preferable to have these servers in the Staging Cluster to flush out any interference to normal Web Center operation caused by the Health & Welfare System or by the Replication Service.

As for external communication links, the Operations Center is connected to the Web Center with two independent communication links: a low volume link such as a, fractional T1 and a high volume link such as a T3. Both links terminate into firewalls at both ends of the link.

The low volume link between the Operations Center and the Web Center is used for application administration, e-mail and order traffic. The high volume link between the two is used for back end data (e.g., spatial data and application software) deployment to the Web Center and Operations monitoring data back from the Web Center. Even though the high bandwidth line can be used for all traffic between the Web Center and the Operations Center from a bandwidth point of view, there are other reasons for keeping them as two separate lines. One is that they have different security requirements. The other is that it provides some level of redundancy. In certain implementations, the lines are leased from two different telecom providers, and a protocol is available for routing the different datasets over either one of the lines, if the occasion arose to do so.

The T3 link may have a QoS controller that guarantees priority bandwidth for Administration functions during high volume data loads. This allows the T3 line to be used as a backup to the T1 line and prevent negative impact to Operations during data loading. The Operations Center may also provision a VPN over the Internet to be used as a tertiary backup measure.

There is a high volume communication link between the Operations Center and the ADS40 Center. All ADS40 data will pass through this link. The same link will also be used for administrative traffic between the Centers such as e-mails.

There is a high volume communication link between the GIS Processing Center to the Operations Center. This same link is used for all administrative traffic between the Operations Center and the GIS Processing Center.

The Web Center provides a highly scalable, high throughput and high availability online system to deploy the enterprise spatial system software service. The system is architected to run in a third party hosted environment that is monitored and managed remotely from the Operations Center.

The enterprise spatial system is architected to achieve several design goals. The enterprise spatial system is scalable at each tier in the architecture. The enterprise spatial system scales seamlessly from a prototype system deployed on a single machine for development testing at the Operations Center to a large-scale web deployment at the Web Center. Each layer is tunable independently based on the traffic at that layer and the software deployed at that layer.

The enterprise spatial system server software is platform neutral. The enterprise spatial system software is not dependent on any single third party application provider, although the enterprise spatial system may use third party applications.

The enterprise spatial system is available 24/7/365. The enterprise spatial system has no or few single points of failure. The preferable solution has "no single point of failure". A system that has no single point of failure is also a system that can be maintained easily by hot swapping in and out redundant hardware/software systems with minimal impact on system up time.

The enterprise spatial system (hardware and software) is upgradeable and maintainable without bringing the enterprise spatial system service down. Many software components and hardware are hot swappable.

Since the enterprise spatial system service is hosted by a web-hosting center, physical access to the live system is limited, the enterprise spatial system personnel are able to monitor and control the system from a remote location. All hardware systems and software systems are enabled for monitoring by a full-featured health and maintenance system.

FIG. 187 illustrates a Web Center Functional Architecture 18710 in accordance with certain implementations of the invention. FIG. 187 illustrates an architecture 1870 that uses ArcSDE™ as the data access layer between the core Map Service components and the GIS data store.

From a functional perspective this is a basic three-tier architecture with the presentation tier, business logic middle tier, and the back end data storage tier. The actual deployment of this functional system is an n-tier system.

A typical web front end is proposed with, in certain implementations, no business logic present. The web front end acts as a dispatcher to route the incoming client requests to the appropriate middle tier business logic server. The responses from the middle tier business logic servers are formatted and returned to the clients.

Much of the processing done in the Web Center is done at the Core GIS Service/Application Server layer. The services at this layer are deployed behind an Application Server. The Application Server acts as a workflow engine that coordinates the sequence of actions performed by the various business entities at this tier.

In terms of the Data Access Application Server, ArcSDE™ servers provide access to the GIS data in the GIS data store. The data in the account/billing data store is accessed directly through native data store access methods.

The Customer Care/Billing servers provide all the business services for the enterprise spatial system enterprise. Functions such as billing, credit card processing, e-mail services and order fulfillment processes are either performed by these servers or are triggered by these servers.

FIG. 188 illustrates an alternative architecture 18810 in accordance with certain implementations of the invention. FIG. 188 contrasts the architecture 18710 with an architecture 18810 that leverages the spatial data access functionality provided by Oracle® 8i Spatial, thus eliminating the need to use ArcSDE™ servers. Thus, various architectures are encompassed by implementations of the invention.

FIG. 189 illustrates a Web Center Component Architecture 18910 in accordance with certain implementations of the invention.

The Web Server can be any mainstream Web Server (e.g., with J2EE support). The servlet engine can be any mainstream (e.g., J2EE) compliant servlet engine that works with other components.

FIG. 190 illustrates a servlet architecture 19010 in accordance with certain implementations of the invention. The servlet engines follow the model2 servlet architecture. A dispatcher servlet receives all incoming HTTP requests. It forwards the request to the appropriate servlet depending on the incoming request. The incoming requests can be broadly categorized as page requests, map service requests and account requests. The page request serviet will forward the incoming request to the appropriate JSP. The map service servlet will call the EJB that can provide the service requested by the client, gather the response from the EJB and forward it on to the JSP to format the response. The account servlet will call the appropriate account management EJB, gather the response from the EJB and forward it on to the JSP to format the response to the client. The JSPs will include, for example, other JSP pages from the JSP library. The JSP library contains JSPs for page artifacts commonly used across multiple pages such as company logos, license agreements and commonly displayed tables.

The servlets act as a dispatcher for the incoming client requests. Requests are dispatched to different map service EJB session beans that are registered with the JNDI server depending on the incoming request. Using the JNDI provides an abstraction layer for the EJB session beans allowing more freedom in deploying and configuring the EJB session beans. The servlets are not hard coded for specific URLs where the EJBs are deployed. This allows dynamic deployment of Map Servers without affecting the web front end.

In certain implementations, a J2EE Application Server hosts all the enterprise spatial system business workflow logic. This server can be run either in a server farm with a load balancer in front of it or it can be run as a cluster. The clustering option is very attractive when the entity beans are deployed in the Application Servers that access the data store through a data store connection pool provided by the Application Server. Clustering allows a single connection pool to be shared among all the instances of the Application Server. In the enterprise spatial system architecture, this is not an issue since the data store access occurs at a lower level through the ArcSDE™ servers. Therefore, the Application Servers can be run in a server farm.

Authentication and access control can be performed either by the services provided by the Application Server or by third party authentication and access control software. Third party authentication software provides a more robust security solution. For the first release of the enterprise spatial system product, the Application Server provided authentication services could be used. Since the enterprise spatial system does allow adhoc anonymous purchase by non—the enterprise spatial system account holders, all traffic to the Web Server does not go through the Authentication Service. The Authentication Service is used only when the user logs in.

The Client Map Service Session Beans are the workflow managers of the enterprise spatial system Web Center. These are stateless session beans and can be scaled across an Application Server farm with a load balancer in front. The client session beans provide access to the pool of Map Servers at the next level in the architecture.

FIG. 191 illustrates a Client EJB Architecture 19110 in accordance with certain implementations of the invention. Session beans control access to the map services and ensure that only authorized clients access map services. Access is also allowed after appropriate billing actions have taken place. For example, if a client requests a fee based mapping service, the session bean will first check whether the client has an active account. If the account is present it will make the appropriate billing updates to the account before initiating the map service. If the client does not have a valid account, it will reject the response and send it out to the servlet engine to initiate an adhoc purchase using a credit card. Upon return from the client with the credit card data, the session bean will initiate a charge against the credit card using the credit card service. The session bean will initiate the map service only after a successful credit card transaction is made. The client session beans also control the workflow for each incoming client request. An incoming client map service request may be handled by a sequence of individual map service functions. The client session bean will invoke these map service functions in order and return the final result to the client. This simplifies the client by hiding internal workflow details from the client side.

The session beans also control the initiation of e-mail notices in response to client requests or client actions. All the enterprise spatial system business functions such as account management, logging, billing related activities, order processing etc. are handled or are initiated by the Client Map Service session beans at the Application Server tier. This leaves the tiers below with pure map service functions.

The Administration Tool Web Server is not exposed to the external Internet, since the Application Server sits in a LAN segment separated from the Client Web Server DMZ. Only personnel connected to the enterprise spatial system intranet can see this Administration Tool Web Server. As an additional level of security, administration tool access will be protected with, for example, a smart card based authentication scheme.

Map Servers are given their own tier in the architecture due to the large amount of data that moves back and forth between the Map Server and the data store and the processor intensive nature of the Map Server operations. The data access layer is directly below the Map Server tier. This structure also allows the Map Servers to be modularized to one layer allowing new map services to be incorporated with minimal impact to the rest of the system. Third party map services can be incorporated easily as long as they are compatible with the data access layer. Another benefit is that the machines hosting the Map Servers can be scaled without impact to the other layers that need not be scaled as fast as the Map Servers. In certain implementations, the enterprise spatial system will host ArcIMS™ Spatial Servers at this layer. The Spatial Servers typically work with a statically assigned ArcSDE™ connection. The ArcIMS™ implementation does support a pool of ArcSDE™ data store connections, which is a desirable solution from the architectural purity point of view.

Since the ArcIMS™ Spatial Servers are statically associated with the ArcSDE™ connections, a pool of ArcIMST™ threads at the Application Server layer will be used to achieve a scalable architecture. This also requires an ArcIMS™ Spatial Server manager running on the Application Server to manage the statically initiated Spatial Servers.

The Report Servers run at the Map Server layer and perform report generation functions based on its input data and report specifications.

In certain implementations, ArcSDE™ servers are used to access the spatial data in the Oracle® 8i data store. The ArcSDE™ server architecture introduces restrictions on how the data store can be accessed from the Application Server. Preferably, the data store connection pooling mechanism provided by the leading J2EE Application Servers would be used to access the data store. Wherever possible, entity beans with bean managed persistence are used to encapsulate the ArcSDE™ connections.

All the business functions such as account management, billing, credit card processing and order processing will be handled by an e-commerce solution, which may be a third party e-commerce solution. A shopping cart implementation is available to quickly enable the web site for online commerce.

All account information, activity history, billing history, correspondence history, etc. is held in a data store instance separate from the GIS Spatial data store instance. The main storage box that houses the GIS Spatial data store may also be used to store the Account/Billing data store.

As for the Health & Welfare System, Java components developed by the enterprise spatial system are instrumented as per the JMX specifications, in certain implementations. JMX specifications allow important components to be monitored and controlled remotely through a management console. JMX provides a very powerful means of monitoring and controlling resource pools such as thread pools, data store connection pools etc. FIG. 192 illustrates Health & Welfare Components 19210 in accordance with certain implementations of the invention.

The GIS Data Loader is a service that loads new GIS data from the Operations Center to the Web Center Spatial Data store. FIG. 193 illustrates a GIS Data Loader 19310 in accordance with certain implementations of the invention. The GIS Data Loader is notified through a messaging service when new data is available to be loaded. The GIS Data Loader will initiate a secure dialog with the Operations Center and retrieve the new data from the Operations Center.

In certain implementations, the Web Center does not have any data archival functions, and the data archival functions reside at the Operations Center. Normal operations at the Web Center generate data such as account history and billing history that is archived. The Data Archiver allows data from the Web Center to be archived at the Operations Center. FIG. 194 illustrates a Data Archiver 19410 in accordance with certain implementations of the invention.

The Data Archive Scheduler/Formatter gathers data from the Account/Billing data store, the Health & Welfare Data store and the Production Spatial Data data store at predefined intervals. It does the necessary data transformation and cleansing functions. Sensitive data that is archived will also be encrypted by this component. The Data Replication Client establishes a secure session with the Replication Server at the Operations Center and sends the data over to the Operations Center.

In certain implementations, the raster data is expected to be stored in the Production Spatial data store in Mr SID format. The various layers on top of the raster imagery may be handled as vector graphics stored within the data store. The ArcSDE™ server may store the layer data in its own proprietary format in the data store for efficient access. The data store uses multiple/simultaneous spatially oriented index methods including Latitude/Longitude and UTM. ArcSDE™'s ability to represent raster datasets in resampled pyramids could be used to improve drawing performance and reduce data store access times. Each level in the pyramid is a resampled representation of the raster data at a lower resolution than the image at the next lower level in the pyramid. So each higher level in the pyramid contains the image at a more generalized level. The Map Servers can access a particular layer in the pyramid depending on the resolution requirements of the map service request.

The number of levels in the pyramid is arrived at by profiling and empirical analysis of the datasets in the datamart. Each layer in the pyramid requires more storage space. So a balance has to be achieved for the number of layers based on the dataset requirements for the actual the enterprise spatial system software. Since raster data is stored as a set of tiles at each level in the pyramid, cropped raster images are accessed based on vector polygon query coordinates for the tiles covering the image. This assures that no more data is retrieved from the data services than are required.

The production data store contains only the latest version of the GIS data. It will also access a catalog of the various versions of all available data to allow users to order versions different from the one that is available in the Web Center.

FIG. 195 illustrates an architecture 19510 for the hardware, software and network architecture for an enterprise spatial system web deployment in accordance with certain implementations of the invention. FIG. 195 shows the relationship and data flow between the hardware/software components deployed in the Web Center.

The Web Servers will be deployed in an independent network segment. The Web Servers are exposed to the Internet and are the first target for hackers. Separating the Web Servers into a separate layer creates a kind of DMZ that restricts access to the core servers in the Web Center. A second firewall may be added to the layer between the Web Servers and the Application Servers to tighten down security.

The Web Servers are deployed as a farm and they do not maintain any states on user sessions.

The Application Servers host all the EJBs that make the map services available to the users. The Application Servers host all the workflow logic. The Application Servers are deployed as a farm, but may also be deployed as a cluster or in another form.

The Map Servers are GIS processing engines that do not carry state. This allows easy deployment of new map services without affecting the higher layers in the architecture. They will be deployed as a server farm and pooled at the layer above. The map services will be segregated based on how processor/memory intensive these services are and then deployed on more or less powerful CPUs as appropriate. The dispatching to the different services on the different CPUs is assigned at a higher level.

The ArcSDE™ servers are statically assigned to the Map Servers at the layer above. The Application Server will host an ArcSDE™ monitor service that monitors the health of the various ArcSDE™ connections and terminate, initiate and assign ArcSDE™ connections to Map Servers as needed.

The client interface to the Web Center will be either HTTP or HTTPS based. All forms containing sensitive and personal data will go over the HTTPS link and other data will go over HTTP. The enterprise spatial system Architecture is designed to support verious types of clients, including, for example: Browser only, Browser plus Applet (Thin Client), and Browser plus download (Thick Client). FIG. 196 illustrates a Client Interface Architecture 19610 in accordance with certain implementations of the invention.

The browser client sends and receives HTML forms. There are no applets or plugins to download.

The thin client works with a lightweight plugin or Java applet downloaded to the client browser. The plugin provides the ability to do local manipulation of GIS data. The browser's native support for the HTTP and HTTPS protocol will be used for communication with the Web Server. The applet/plugin is not involved in the communication path. FIG. 197 illustrates a Thin Client Architecture 19710 in accordance with certain implementations of the invention. In particular, FIG. 197 illustrates a high-level component architecture of the client download applet.

The XML request builder builds the XML request that will be sent to the Web Server for processing. The Web Server will accept XML requests in ArcXML format and also possibly in other formats defined by the enterprise spatial system for functions not supported by ArcIMS™.

The Local Data Overlay Manager component handles the retrieval of GIS data from local storage merging the same with the GIS data retrieved from the Web Server. The local GIS processor does all local manipulation of the GIS image in the browser. This can include, for example, local zooming in and out, adding annotations on the map etc. The download data decoder is used to unpack the data coming down from the Web Server. Typically this will involve uncompressing the data and pulling out the components of a composite image. The Upload Data Encoder is used when GIS images locally manipulated or changed are uploaded to be saved. The actions involved will typically be to put together the layers of the image in a format expected by the server and then compressing it for quick upload.

The print processor prepares the currently displayed GIS image for printing. The actual printing will be done by the browser print function. The applet/plugin does not perform client operating system printing. The print processor pre-processes the image data by applying all the GIS layers to the raster data for the printer.

Corporate the enterprise spatial system clients who have dedicated connections to the enterprise spatial system will typically use thick clients. The thick client will communicate directly with the servlet engine using the HTTP and HTTPS protocols. The Web Server will be bypassed since the thick client is not browser based. Going directly to the servlet engine allows the current infrastructure to be used to support thick clients in the future with no infrastructure changes on the Web Center.

MapQuest is a registered trademark or trademark of MapQuest.com in the United States and/or other countries. Autodesk MapGuide is a registered trademark or trademark of Autodesk, Inc. Microsoft Internet Explorer and Windows are registered trademarks or trademarks of Microsoft Corporation in the United States and/or other countries. Macintosh is a registered trademark or trademark of Apple Computer, Inc. in the United States and/or other countries. UNIX is a registered trademark or trademark of The Open Group in the United States and/or other countries. ArcIMS, ArcGis, ArcToolbox, and ArcSDE are registered trademarks or trademarks of ESRI in the United States and/or other countries. Oracle is a registered trademark or trademark of Oracle Corporation in the United States and/or other countries. DT/Studio is a registered trademark or trademark of Embarcadero Technologies, Inc. in the United States and/or other countries. Netscape is a registered trademark of trademark of Netscape Communications in the United States and/or other countries. Linux is a registered trademark or trademark of Linus Torvalds in the United States and/or other countries. CyberSource is a registered trademark or trademark of CyberSource in the United States and/or other countries. OpenView is a registered trademark of trademark of Hewlett-Packard Company. Sun and Solaris are registered trademarks or trademarks of Sun Microsytems Corporation in the United States and/or other countries.

ADDITIONAL IMPLEMENTATION DETAILS

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Affay (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Although spatially referenced images were described as being created with points associated with longitude and latitude (e.g., X,Y components), the images may be described with other spatial data, such as a third dimensional component (e.g., X, Y, Z components).

The logic described using certain figures referred to specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of certain figures was described as being implemented in software. The logic may be implemented in hardware, in programmable and non-programmable gate array logic or in some combination of hardware, software, or gate array logic.

FIG. 198 illustrates an architecture of a computer system that may be used in accordance with certain implementations of the invention. The computer architecture 19800 may implement a processor 19802 (e.g., a microprocessor), a memory 19804 (e.g., a volatile memory device), and storage 19810 (e.g., a non-volatile storage area, such as magnetic disk drives, optical disk drives, a tape drive, etc.). An operating system 19805 may execute in memory 19804. The storage 19810 may comprise an internal storage device or an attached or network accessible storage. Computer programs 19806 in storage 19810 may be loaded into the memory 19804 and executed by the processor 19802 in a manner known in the art. The architecture further includes a network card 19808 to enable communication with a network. An input device 19812 is used to provide user input to the processor 19802, and may include, for example, a keyboard, mouse, pen-stylus, microphone, touch sensitive display screen, or any other activation or input mechanism known in the art. An output device 19814 is capable of rendering information transmitted from the processor 19802, or other component, such as a display monitor with a display screen, printer, storage, etc. The computer architecture 19800 of the computer systems may include fewer components than illustrated, additional components not illustrated herein, or some combination of the components illustrated and additional components.

The computer architecture 19800 may comprise any computing device known in the art, such as a mainframe, server, personal computer, workstation, laptop, handheld computer, telephony device, network appliance, virtualization device, storage controller, etc. Any processor 19802 and operating system 19805 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A computer-implemented method for providing access to spatial data, including, receiving a request for data; and retrieving enterprise data, wherein at least a portion of the enterprise data is non-spatially-referenced data;

and comprising:

retrieving third party data, wherein at least a portion of the third party data is non-spatially referenced data;

integrating the enterprise data and the third party data, wherein the integration includes generating data layers, wherein each data layer includes at least one of spatially referenced data or non-spatially referenced data and wherein the data layers are capable of being overlaid on top of one another to fonn a composite image that combines the enterprise data and the third party data and combines the spatially referenced data with the non-spatially referenced data;

processing the integrated data, wherein the processing includes converting the data layers to individual images and updating metadata for the data layers, wherein the metadata is capable of being used to respond to other requests for data; and returning the individual images separateiy in response to the request, wherein the individual images may be combined to form different composite images by combining the individual images in different layer orders or by combining a subset of the individual images.

2. The method of claim 1, further comprising:

coupling a data processing center to a live data processing center to provide for viewing of the spatially referenced results.

3. The method of claim 1, wherein processing the integrated third party data and enterprise data comprises at least one of:

cleansing the integrated third party data and enterprise data; and geocoding the third party data and enterprise data.

4. The method of claim 1, wherein the results comprise data layers in a first order and further comprising:

modifying an order of the data layers.

5. The method of claim 1, further comprising:

updating at least one of the third party data and enterprise data in real time.

6. The method of claim 1, wherein the spatially referenced results comprise data layers and further comprising:

providing hierarchical access control to each of the data layers.

7. The method of claim 1, wherein the spatially referenced results comprise data layers further comprising:

storing the data layers as pyramided data;

receiving a request to scale a first data layer; and automatically selecting a second data layer to be returned in response to the request.

8. The method of claim 1, wherein the spatially referenced results comprise data layers and further comprising:

combining the data layers to form a printable file.

9. The method of claim 1, further comprising:

receiving an order for stored data;

collecting the requested data; and forwarding the collected data to a requested location.

10. The method of claim 1, further comprising:

providing at least one of purchase order handling, shopping cart management, billing, user profile management, and account management.

11. The method of claim 1, further comprising:

enabling sharing of the spatially referenced results across multiple users.

12. The method of claim 1, further comprising:

enabling editing of the spatially referenced results.

13. The method of claim 1, further comprising:

generating the spatially referenced results using metadata.

14. A computer-implemented method for providing access to spatial data, including, receiving a request for data; and retrieving enterprise data, wherein at least a portion of the enterprise data is non-spatially-referenced data;

and comprising:

retrieving third party data, wherein at least a portion of the third party data is non-spatially referenced data;

integrating the enterprise data and the third party data, wherein the integration includes generating data layers, wherein each data layer includes at least one of spatially referenced data or non-spatially referenced data and wherein the data layers are capable of being overlaid on top of one another to form a composite image that combines the enterprise data and the third party data and combines the spatially referenced data with the non-spatially referenced data;

processing the integrated data, wherein the processing includes converting the data layers to individual images and updating metadata for the data layers, wherein the metadata is capable of being used to respond to other requests for data;

returning the individual images separately in response to the request, wherein the individual images may be combined to form different composite images by combining the individual images in different layer orders or by combining a subset of the individual images;

sending a handoff to a third party system; and receiving at least one of a handback from the third party system or updated data.

15. A system for providing access to spatial data, including:

means for receiving a request for data;

means for retrieving enterprise data, wherein at least a portion of the enterprise data is non-spatially-referenced data;

and comprising:

means for retrieving third party data, wherein at least a portion of the third party data is non-spatially referenced data;

means for integrating the enterprise data and the third party data, wherein the integration includes generating data layers, wherein each data layer includes at least one of spatially referenced data or non-spatially referenced data and wherein the data layers are capable of being overlaid on top of one another to form a composite image tat combines the enterprise data and the third party data and combines the spatially referenced data with the non-spatially referenced data;

means for processing the integrated data, wherein the processing includes converting the data layers to individual images and updating metadata for the data layers, wherein the metadata is capable of being used to respond to other requests for data; and means for returning the individual images separately in response to the request, wherein the individual images may be combined to form different composite images by combining the individual images in different layer orders or by combining a subset of the individual images.

16. The system of claim 15, further comprising:

means for coupling a data processing center to a live data processing center to provide for viewing of the spatially referenced results.

17. The system of claim 15, wherein processing the integrated third party data and enterprise data comprises at least one of:

means for cleansing the integrated third party data and enterprise data; and means for geocoding the third party data and enterprise data.

18. The system of claim 15, wherein the results comprise data layers in a first order and further comprising:

means for modifying an order of the data layers.

19. The system of claim 15, further comprising:

means far updating at least one of the third party data and enterprise data in real time.

20. The system of claim 15, wherein the spatially referenced results comprise data layers and further comprising:

means for providing hierarchical access control to each of the data layers.

21. The system of claim 15, wherein the spatially referenced results comprise data layers further comprising:

means for storing the data layers as pyramided data;

means for receiving a request to scale a first data layer; and means for automatically selecting a second data layer to be returned in response to the request.

22. The system of claim 15, wherein the spatially referenced results comprise data layers and further comprising:

means for combining the data layers to form a printable file.

23. The system of claim 15, further comprising:

means for receiving an order for stored data;

means for collecting the requested data; and means for forwarding the collected data to a requested location.

24. The system of claim 15, further comprising:

means for providing at least one of purchase order handling, shopping cart management, billing, user profile management, and account management.

25. The system of claim 15, further comprising:

means for enabling sharing of the spatially referenced results across multiple users.

26. The system of claim 15, further comprising:

means for enabling editing of the spatially referenced results.

27. The system of claim 15, further comprising:

means for generating the spatially referenced results using metadata.

28. A system for providing access to spatial data, including:

means for receiving a request for data; and means for retrieving enterprise data, wherein at least a portion of the enterprise data is non-spatially-referenced data;

and comprising:

means for retrieving third party data, wherein at least a portion of the third party data is non-spatially referenced data;

means for integrating the enterprise data and the third party data, wherein the integration includes generating data layers, wherein each data layer includes at least one of spatially referenced data or non-spatially referenced data and wherein the data layers are capable of being overlaid on top of one another to form a composite image that combines the enterprise data and the third party data and combines the spatially referenced data with the non-spatially referenced data;

means for processing the integrated data, wherein the processing includes converting the data layers to individual images and updating metadata for the data layers, wherein the metadata is capable of being used to respond to other requests for data;

means for returning the individual images separately in response to the request, wherein the individual images may be combined to form different composite images by combining the individual images in different layer orders or by combining a subset of the individual images;

means for sending a handoff to a third party system; and means for receiving at least one of a handback from the third party system or updated data.

29. An article of manufacture for providing access to spatial data, wherein the article of manufacture is capable of causing operations, the operations including:

receiving a request for data;

retrieving enterprise data, wherein at least a portion of the enterprise data is non-spatially-referenced data;

retrieving third party data, wherein at least a portion of the third party data is non-spatially referenced data;

and comprising:

integrating the enterprise data and the third party data, wherein the integration includes generating data layers, wherein each data layer includes at least one of spatially referenced data or non-spatially referenced data and wherein the data layers are capable of being overlaid on top of one another to form a composite image that combines the enterprise data and the third party data and combines the spatially referenced data with the non-spatially referenced data;

processing the integrated data, wherein the processing includes converting the data layers to individual images and updating metadata for the data layers, wherein the metadata is capable of being used to respond to other requests for data; and returning the individual images separately in response to the request, wherein the individual images may be combined to form different composite images by combining the individual images in different layer orders or by combining a subset of the individual images.

30. The article of manufacture of claim 29, wherein the operations further comprise:

coupling a data processing center to a live data processing center to provide for viewing of the spatially referenced results.

31. The article of manufacture of claim 29, wherein operations for processing the integrated third party data and enterprise data further comprise at least one of:

cleansing the integrated third party data and enterprise data; and geocoding the third party data and enterprise data.

32. The article of manufacture of claim 29, wherein the results comprise data layers in a first order and wherein the operations further comprise:

modifying an order of the data layers.

33. The article of manufacture of claim 29, wherein the operations further comprise:

updating at least one of the third party data and enterprise data in real time.

34. The article of manufacture of claim 29, wherein the spatially referenced results comprise data layers and wherein the operations further comprise:

providing hierarchical access control to each of the data layers.

35. The article of manufacture of claim 29, wherein the spatially referenced results comprise data layers and wherein the operations further comprise:

storing the data layers as pyramided data;

receiving a request to scale a first data layer; and automatically selecting a second data layer to be returned in response to the request.

36. The article of manufacture of claim 29, wherein the spatially referenced results comprise data layers and wherein the operations further comprise:

combining the data layers to form a printable file.

37. The article of manufacture of claim 29, wherein the operations further comprise:

receiving an order for stored data;

collecting the requested data; and forwarding the collected data to a requested location.

38. The article of manufacture of claim 29, wherein the operations further comprise:

providing at least one of purchase order handling, shopping cart management, billing, user profile management, and account management.

39. The article of manufacture of claim 29, wherein the operations further comprise:

enabling sharing of the spatially referenced results across multiple users.

40. The article of manufacture of claim 29, wherein the operations further comprise:

enabling editing of the spatially referenced results.

41. The article of manufacture of claim 29, wherein the operations further comprise:

generating the spatially referenced results using metadata.

42. An article of manufacture for providing access to spatial data, wherein the article of manufacture is capable of causing operations, the operations including:

receiving a request for data; and retrieving enterprise data, wherein at least a portion of the enterprise data is non-spatially-referenced data;

and comprising:

retrieving third party data, wherein at least a portion of the third party data is non-spatially referenced data;

integrating the enterprise data and the third party data, wherein the integration includes generating data layers, wherein each data layer includes at least one of spatially referenced data or non-spatially referenced data and wherein the data layers are capable of being overlaid on top of one another to form a composite image that combines the enterprise data and the third party data and combines the spatially referenced data with the non-spatially referenced data;

processing the integrated data, wherein the processing includes converting the data layers to individual images and updating metadata for the data layers, wherein the metadata is capable of being used to respond to other requests for data;

returning the individual images separately in response to the request, wherein the individual images may be combined to form different composite images by combining the individual images in different layer orders or by combining a subset of the individual images;

sending a handoff to a third party article of manufacture; and receiving at least one of a handback from the third party article of manufacture or updated data.

* * * * *

UNITED STATES PATENT AND TRADEMARK OFFICE

CERTIFICATE OF CORRECTION

PATENT NO. : 7,107,285 B2
APPLICATION NO. : 10/388666
DATED : September 12, 2006
INVENTOR(S) : von Kaenel et al.

It is certified that error appears in the above-identified patent and that said Letters Patent is hereby corrected as shown below:

Column 175

Line 34, delete “fonn” and insert -- form --.
Line 43, delete “separateiy” and insert -- separately --.

Column 177

Line 4, delete “tat” and insert -- that --.
Line 33, delete “far” and insert -- for --.

Signed and Sealed this

Twenty-fifth Day of March, 2008

JON W. DUDAS
*Director of the United States Patent and Trademark Office*